US006992718B1

(12) United States Patent
Takahara

(10) Patent No.: US 6,992,718 B1
(45) Date of Patent: Jan. 31, 2006

(54) ILLUMINATING APPARATUS, DISPLAY PANEL, VIEW FINDER, VIDEO DISPLAY APPARATUS, AND VIDEO CAMERA MOUNTING THE ELEMENTS

(75) Inventor: Hiroshi Takahara, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/386,991

(22) Filed: Aug. 31, 1999

(30) Foreign Application Priority Data

| Aug. 31, 1998 | (JP) | 10-276723 |
| Dec. 24, 1998 | (JP) | 10-376856 |
| May 11, 1999 | (JP) | 11-129448 |

(51) Int. Cl.
*H04N 5/222* (2006.01)

(52) U.S. Cl. .................. 348/333.09; 348/341
(58) Field of Classification Search .......... 348/333.01, 348/333.06, 333.08, 333.1, 333.11, 333.13, 348/335, 207.99, 333.09, 341, 207.1, 65; 396/374; 353/98; 345/7, 8, 87, 102
See application file for complete search history.

(56) References Cited

U.S. PATENT DOCUMENTS

| 5,185,712 | A | * | 2/1993 | Sato et al. ............. 348/333.08 |
| 5,300,976 | A | * | 4/1994 | Lim et al. .................. 396/374 |
| 5,315,334 | A | * | 5/1994 | Inana ......................... 396/374 |
| 5,499,053 | A | * | 3/1996 | Itoh ...................... 348/333.08 |
| 5,528,297 | A | * | 6/1996 | Seegert et al. ........... 348/333.1 |
| 5,748,237 | A | * | 5/1998 | Ueda et al. ............ 348/333.08 |
| 6,118,476 | A | * | 9/2000 | Morito et al. .................. 348/65 |
| 6,547,400 | B1 | * | 4/2003 | Yokoyama ................... 353/98 |
| 6,646,678 | B1 | * | 11/2003 | Kobayashi ............... 348/207.1 |
| 2001/0050716 | A1 | * | 12/2001 | Hashimoto et al. .... 348/333.01 |

FOREIGN PATENT DOCUMENTS

| JP | 5-252427 | 9/1993 |
| JP | 8-186744 | 7/1996 |
| JP | 10-206849 | 8/1998 |

* cited by examiner

*Primary Examiner*—Tuan Ho
(74) *Attorney, Agent, or Firm*—RatnerPrestia

(57) ABSTRACT

Light emitted from a white LED 15 is converted by a lens 11 into light having an excellent directionality. The light illuminates a display panel 863 from the direction of an angle $\theta_k$. The display panel 863 is a polymer dispersed liquid crystal display panel in a normally white mode. The display panel 863 modulates incident light by scattering it, the scattered light is incident on a magnification lens 866, and light from the magnification lens reaches an eye 21 of the observer. Light which passes straight through a liquid crystal layer in the display panel 863 is absorbed by an optical absorbing film 12. The observer fixedly positions his/her eye 21 to an eyepiece cover 852 and observes the displayed image.

2 Claims, 193 Drawing Sheets scattering method
"black"

"white"

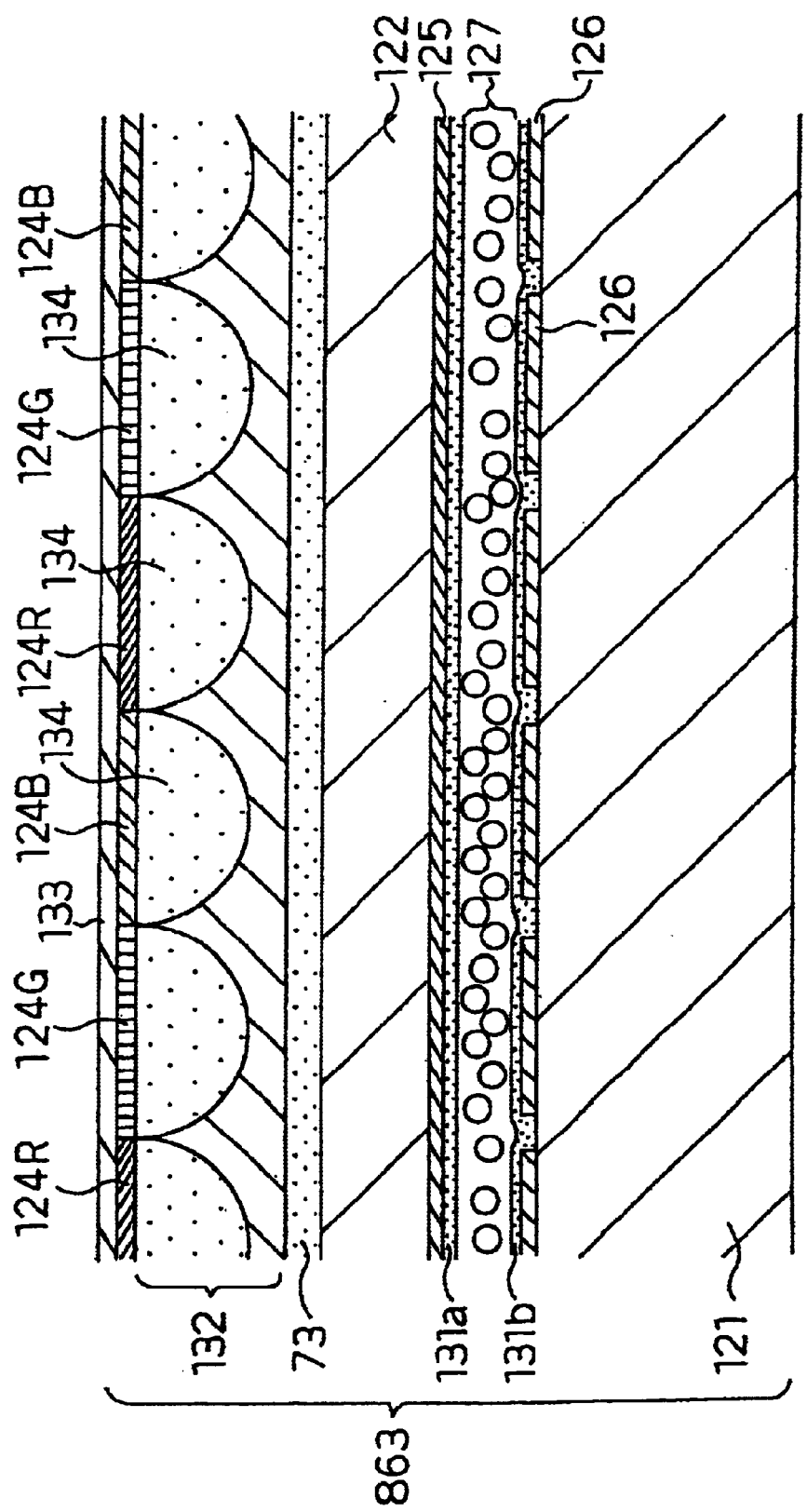

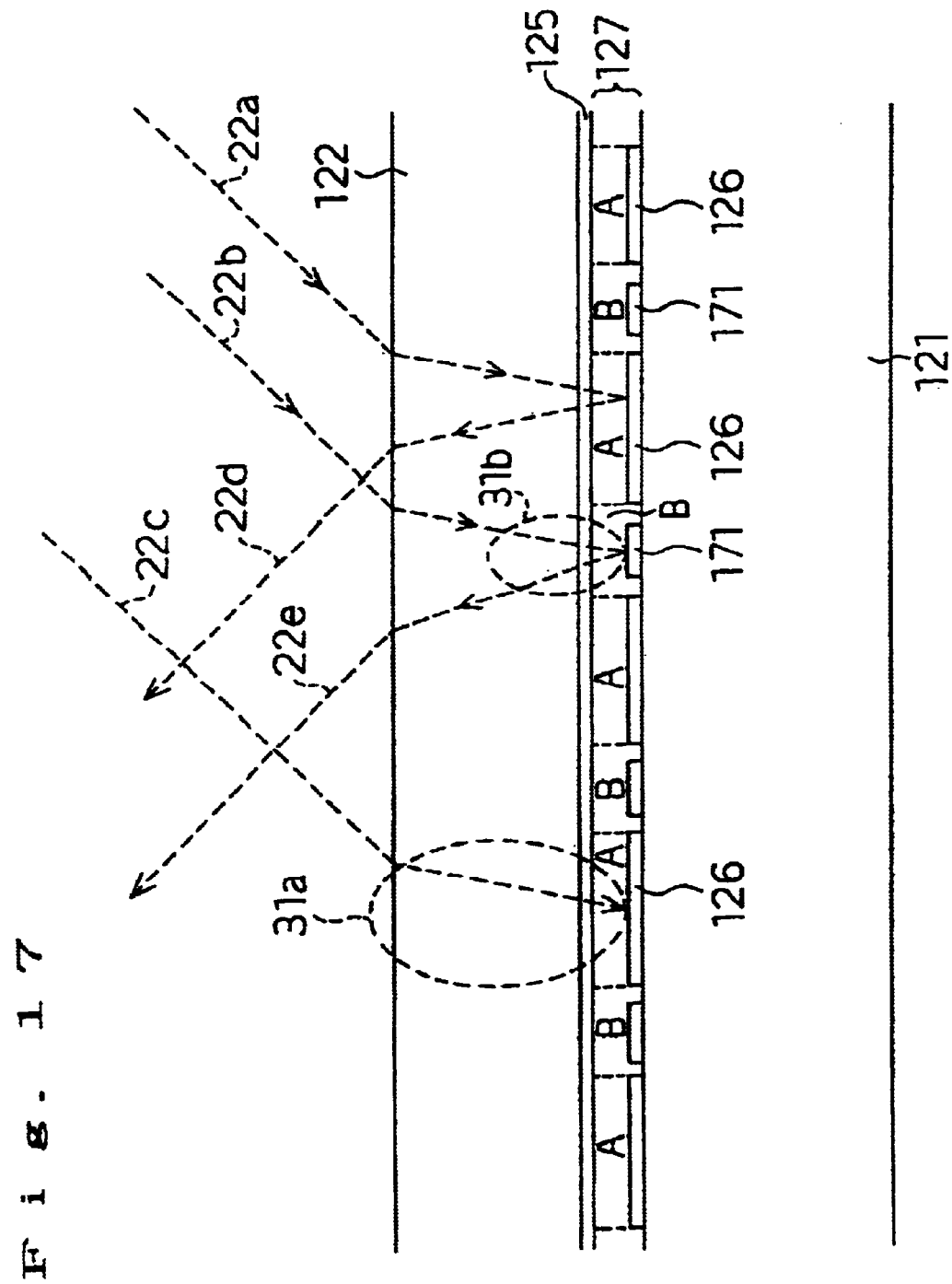

Fig. 30
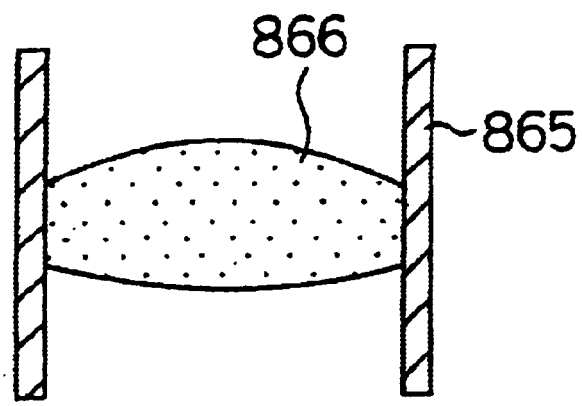
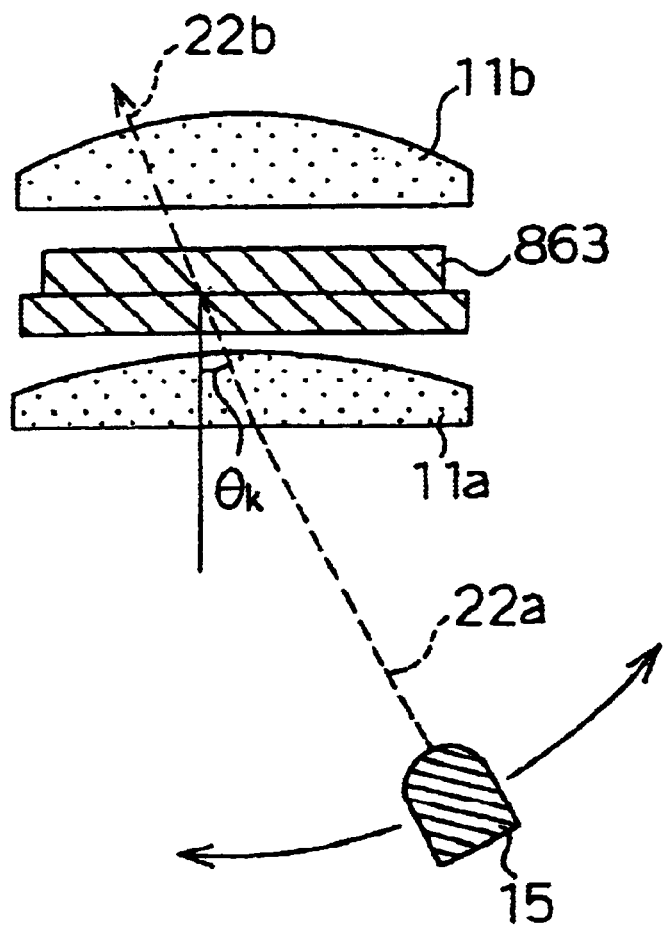

Fig. 33
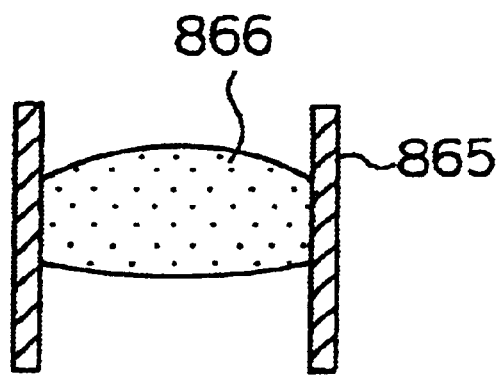
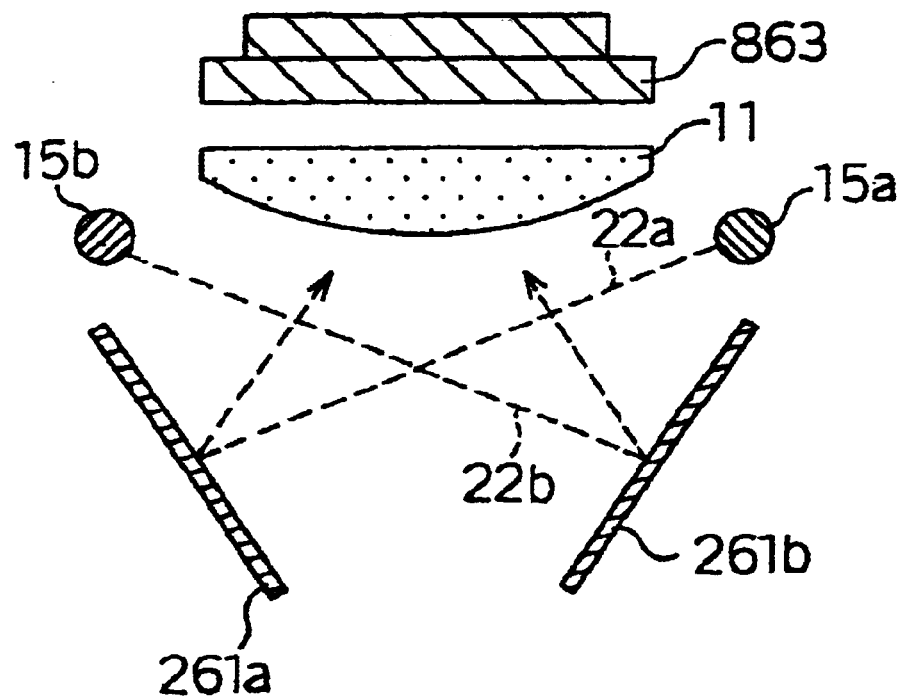

Fig. 42
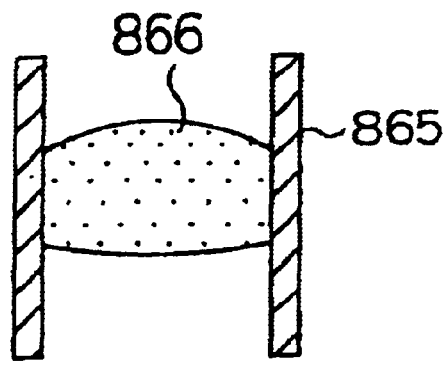
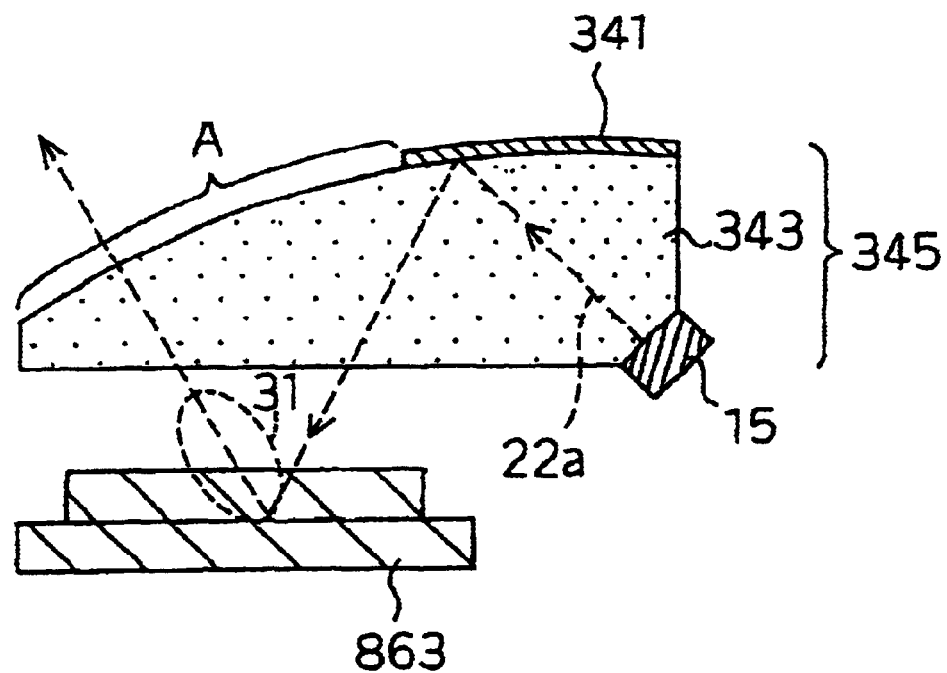

Fig. 44
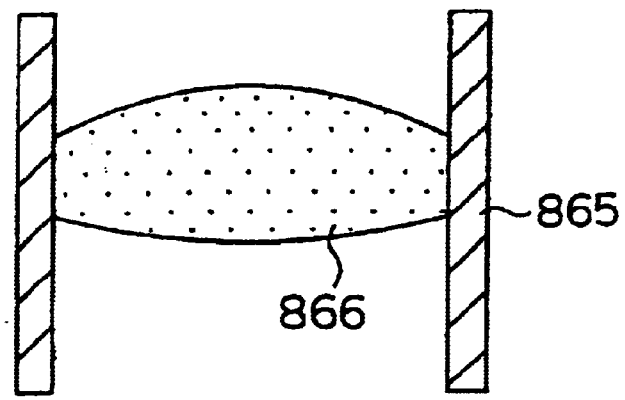
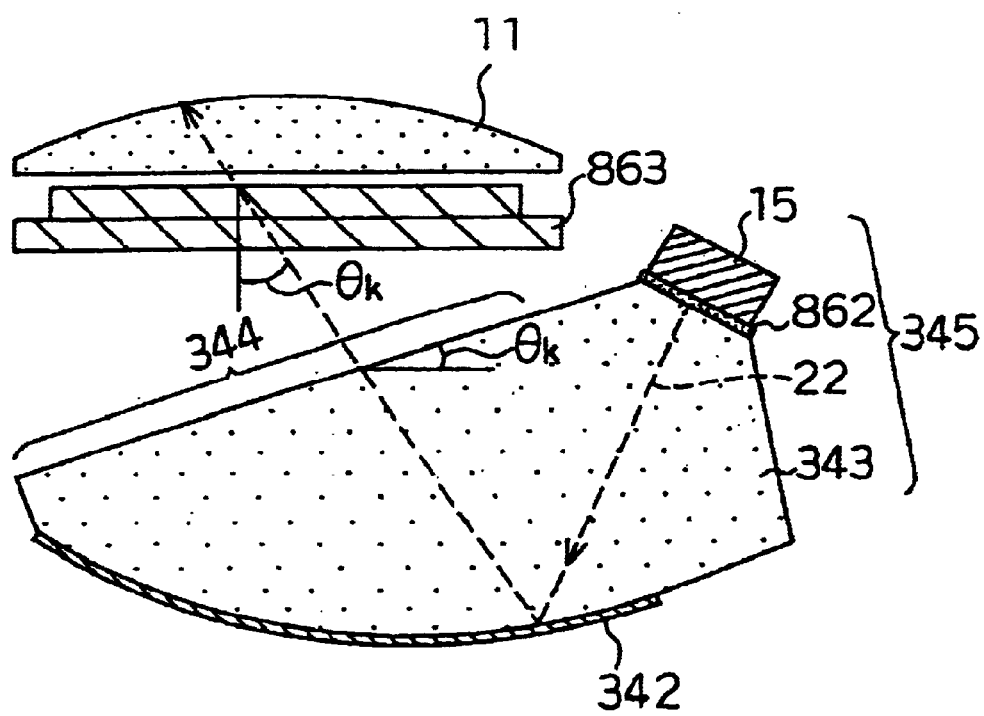

Fig. 81
21
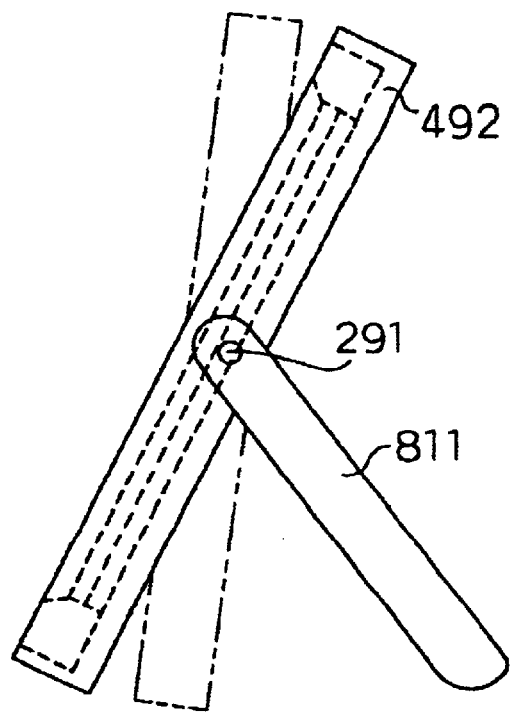

15a  901

15a  901

901

15a 15a  15b  15c
901

15a

15

902

15a
15b
15c
15d
15e
15f
15g
15h

Fig. 98
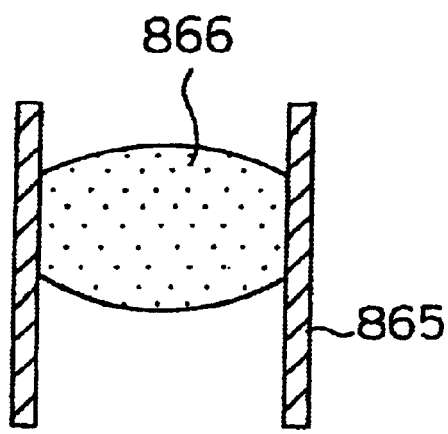
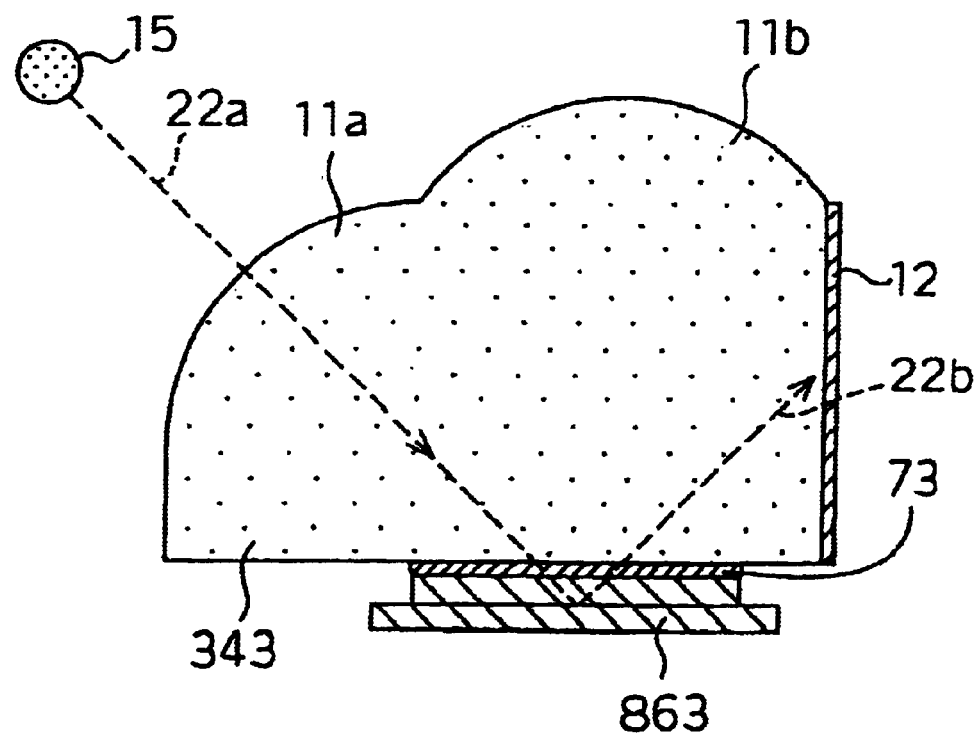

| R+ | G− | B+ | R+ | G− | B+ | R+ | G− | B+ |—126
|---|---|---|---|---|---|---|---|---|
| B+ | R+ | G− | B+ | R+ | G− | B+ | R+ | G− |
| G− | B+ | R+ | G− | B+ | R+ | G− | B+ | R+ |
| R+ | G− | B+ | R+ | G− | B+ | R+ | G− | B+ |
| B+ | R+ | G− | B+ | R+ | G− | B+ | R+ | G− |
| G− | B+ | R+ | G− | B+ | R+ | G− | B+ | R+ |

Fig. 123 (b)

| R− | G+ | B− | R− | G+ | B− | R− | G+ | B− |—126
|---|---|---|---|---|---|---|---|---|
| B− | R− | G+ | B− | R− | G+ | B− | R− | G+ |
| G+ | B− | R− | G+ | B− | R− | G+ | B− | R− |
| R− | G+ | B− | R− | G+ | B− | R− | G+ | B− |
| B− | R− | G+ | B− | R− | G+ | B− | R− | G+ |
| G+ | B− | R− | G+ | B− | R− | G+ | B− | R− |

Fig. 124 (a)

|  | | | | | | | |
|---|---|---|---|---|---|---|---|
| first row | R+ | G− | B+ | R+ | G− | B+ | R+ | G− | B+ — 126 |
| second row | R− | G+ | B− | R− | G+ | B− | R− | G+ | B− |
| third row | R+ | G− | B+ | R+ | G− | B+ | R+ | G− | B+ |
|  | R− | G+ | B− | R− | G+ | B− | R− | G+ | B− |
|  | R+ | G− | B+ | R+ | G− | B+ | R+ | G− | B+ |
|  | R− | G+ | B− | R− | G+ | B− | R− | G+ | B− |

Fig. 124 (b)

| R− | G+ | B− | R− | G+ | B− | R− | G+ | B− — 126 |
|---|---|---|---|---|---|---|---|---|
| R+ | G− | B+ | R+ | G− | B+ | R+ | G− | B+ |
| R− | G+ | B− | R− | G+ | B− | R− | G+ | B− |
| R+ | G− | B+ | R+ | G− | B+ | R+ | G− | B+ |
| R− | G+ | B− | R− | G+ | B− | R− | G+ | B− |
| R+ | G− | B+ | R+ | G− | B+ | R+ | G− | B+ |

Fig. 125

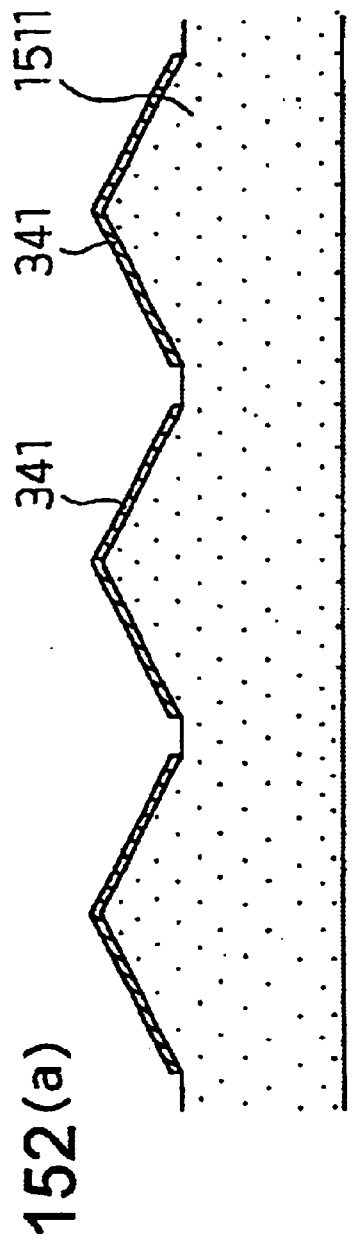
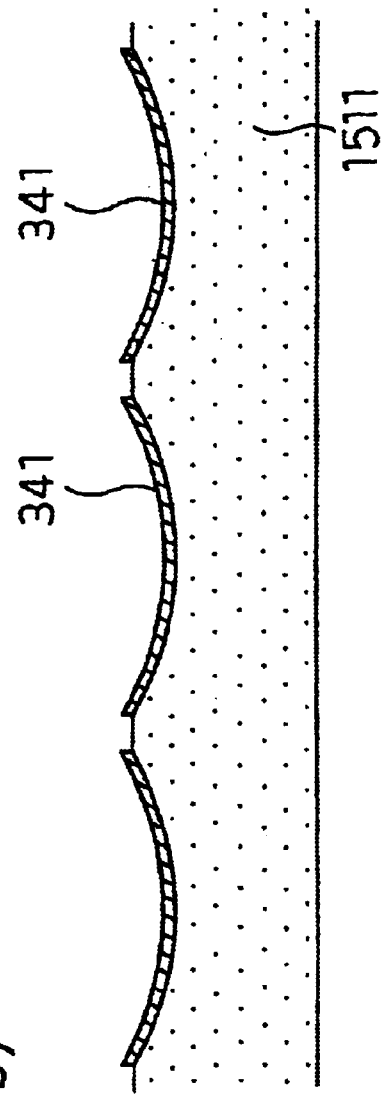
Fig. 152(a)
Fig. 152(b)

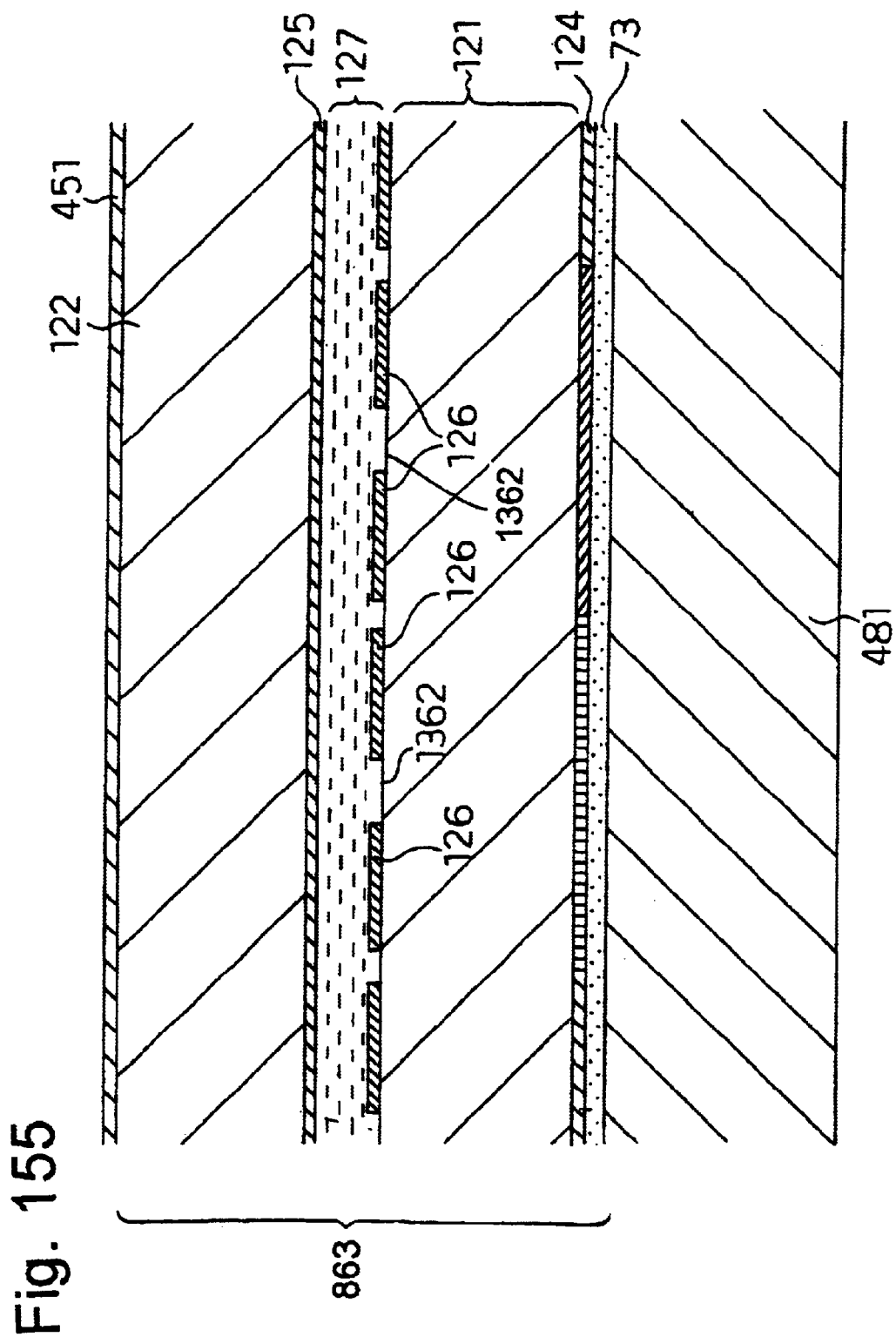

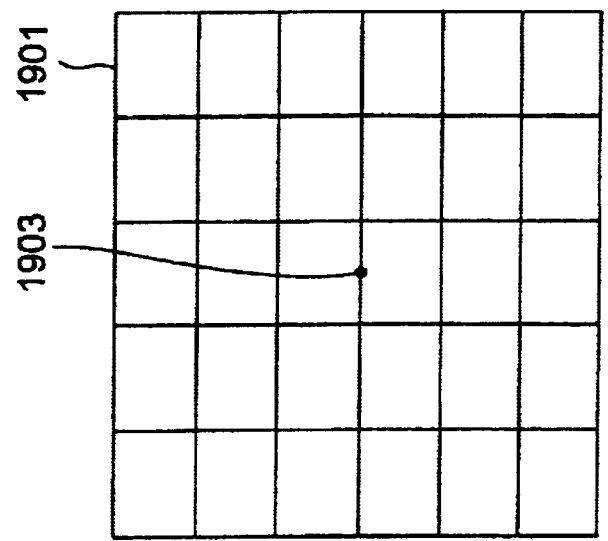
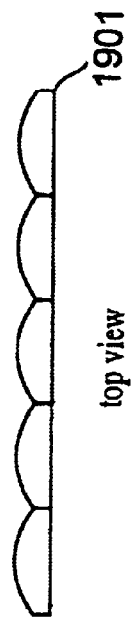
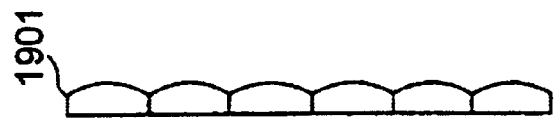

ILLUMINATING APPARATUS, DISPLAY PANEL, VIEW FINDER, VIDEO DISPLAY APPARATUS, AND VIDEO CAMERA MOUNTING THE ELEMENTS

BACKGROUND OF THE INVENTION

1. Field of the Invention

The present invention relates to an illuminating apparatus and a display panel which are used for a video camera or the like, a view finder and a video camera which use the illuminating apparatus, a video display apparatus, a method of driving the display panel, and the like.

2. Description of the Related Art

A conventional view finder will be first described. In the specification, an element in which at least a light source (light generating means) such as a light emitting device and an image display apparatus (light modulating means) such as a liquid crystal display panel, not of a self light emitting type are integrally formed is called a view finder.

The appearance of a view finder is shown in FIG. 85 as an example. A cross section of the conventional view finder is illustrated in FIG. 86. Shown in the diagrams are the body 851, an eyepiece cover 852, an eyepiece ring 865, and a display panel 863 such as a twist nematic (TN) liquid crystal display panel.

In the body 851, the liquid crystal display panel 863 and a light source 861 such as a backlight are disposed. A magnification lens 866 is disposed in the eyepiece ring 865. By adjusting the degree of insertion of the eyepiece ring 865, the position of the magnification lens 866 can be changed, thereby enabling the focus to be adjusted according to the eyesight of the observer.

The thickness of the liquid crystal layer in the display panel 863 is about 4 to 5 $\mu$m. The display panel has a color filter made of a mosaic resin. On both sides of the display panel, polarizers functioning as a polarizer 864a and an analyzer 864b are disposed. The view finder is attached to the video camera body by a mounting fitting 853.

A video system such as a video camera using such a view finder is required to be small and light from the viewpoint of portability and operability, and to be low power consuming. In order to be small and light, since the capacity of a battery which can be mounted is limited, lower power consumption is demanded more and more. Accordingly, in the view finder as well, low power consumption is required. Even when a liquid crystal display panel of lower power consumption is used, if the power consumption of the backlight is large, the power consumption of the whole video equipment is not low.

For example, there is a conventional view finder using a liquid crystal display panel having the effective display area of 0.5 inch, which consumes total 0.7 W in which 0.3 W is consumed by a liquid crystal display and drive circuit and 0.4 W is consumed by the backlight. It is consequently an important subject to reduce the power consumption of an illuminating apparatus as a component of the view finder.

There is also a problem that the size of the conventional backlight 861 is too large to reduce the size and weight of the equipment.

As to the conventional view finder, there is also a problem that a diffuser 862 (refer to FIG. 86) provided to make the backlight a plane light source having little luminance unevenness causes deterioration in the efficiency for light utilization.

More specifically, when a diffuser having a low degree of light diffusion is used, a light emission pattern of a fluorescent tube appears on the display plane of the liquid crystal display panel, which deteriorates the display quality. Although a diffuser whose degree of light diffusion is higher than that of the conventional one is therefore used, generally, the higher the diffusion is, the lower the light transmittance. Consequently, the efficiency for light utilization is lowered.

SUMMARY OF THE INVENTION

It is an object of the invention to solve the various conventional problems and provide small, light, and low-power illuminating apparatus and view finder and a video camera or the like mounting them.

One aspect of the present invention is a view finder comprising
  light generating means,
  converging means for converting light emitted from the light generating means into substantially parallel light,
  display panel of a reflecting type, and
  a magnification lens for allowing a display image on the display panel to be enlargedly observed by the observer.

A further aspect of the present invention is a view finder comprising
  a LED for emitting a while light,
  a concave transparent block having reflecting means on the back face,
  display panel of a transmitting type, and
  a magnification lens for allowing a display image on the display panel to be enlargedly observed by the observer,
  wherein the light emitted from the white LED is converted by the reflecting means into substantially parallel light and illuminates the display panel.

Another aspect of the present invention is a display panel comprising
  a first substrate having pixel electrodes which are arranged in a matrix,
  a second substrate,
  a liquid crystal layer sandwiched by the first and second substrates, and
  a color filter formed or disposed on the surface position of the first or second substrate,
  wherein when it is assumed that a thickness of the substrate on which the color filter is formed or disposed is t, the angle of principal ray passing through the substrate is θ (deg.), a pitch of forming pixels is a, and a pixel aperture ratio is p, the following expression is satisfied.

$$t \le \frac{4a(1 - \sqrt{P})}{\tan\theta}$$

Still another aspect of the present invention is a view finder comprising
  a light guide plate,
  a light generating device which is disposed or formed at an edge of the light guide plate and generates white light,
  a liquid crystal display panel of a reflecting type disposed on one face of the light guide plate, and
  a convex lens disposed on the top face of the light guide plate.

Yet another aspect of the present invention is a video display apparatus comprising
- a liquid crystal display panel of a reflecting type,
- an arm connected to the display panel, and
- a light emitting part disposed or formed at an end of the arm,
- wherein the direction of light incident on the display panel can be varied by the arm.

Still yet another aspect of the present invention is a display panel driving method, said display panel having three primary color filters, comprising the steps of
- allowing a phase of video signals of two colors in the three primary colors and a phase of the video signals of the two colors to have opposite polarities,
- inverting the phase of the video signal every frame, and
- inverting the phase of the video signal every pixel row.

A further aspect of the present invention is a display apparatus comprising
- an array substrate having a reflecting film commonly used by pixels and pixel electrodes which are arranged in a matrix,
- a second substrate,
- a liquid crystal layer sandwiched by the second substrate and the array substrate, and
- an illuminating apparatus,
- wherein the reflecting film has a light transmitting part in a position corresponding to each pixel, and a capacitor is formed by using the reflecting film and the pixel electrode as electrodes.

The 8$^{th}$ invention of the present invention is a display panel comprising
- a reflecting film formed in a saw-toothed shape,
- an insulating film formed on the reflecting film,
- a pixel electrode which is a transparent electrode formed in a matrix on the insulating film,
- a counter electrode formed on the pixel electrode, and
- a light modulating layer sandwiched by the counter electrode and the pixel electrode.

A still further aspect of present invention is a projection display apparatus comprising:
- light generating means;
- a display panel having an array substrate including pixel electrodes arranged in a matrix, a counter electrode substrate in which a counter electrode is formed, a polymer dispersed liquid crystal layer sandwiched by the counter electrode and the pixel electrode, a microlens array adhered to the counter electrode substrate or the array substrate, and an optical absorbing film disposed on the surface of the substrate to which the microlens array is not adhered, and
- projecting means for projecting the light modulated by the display panel.

A yet further aspect of the present invention is a projection display apparatus comprising
- light generating means,
- a rotary filter for time-divisionally splitting light emitted from the light generating means into rays of three primary colors,
- a motor for rotating the rotary filter,
- a projection lens for projecting the light split by the rotary filer, and
- a casing for sealing the periphery of the rotary filter and the motor.

A still yet further aspect of the present invention is an illuminating apparatus comprising
- a light emitting device, and
- a concave mirror for reflecting light emitted from the light emitting device, and
- wherein the concave mirror has a part smaller than the half of a parabolic mirror or the other concave face as a reflecting face, and
- the light emitting device and the concave mirror are disposed so that the emitted rays are substantially parallel to each other.

An additional aspect of the present invention is a video camera comprising
- light generating means,
- condensing means for converting light emitted from the light generating means into substantially parallel light,
- a display panel of a reflecting type,
- a magnification lens for allowing a display image on the display panel to be enlargedly observed by the observer, and
- an image pickup lens.

A view finder of the invention uses, for example, a reflection type display panel. Preferably, a polymer dispersed (PD) liquid crystal display panel is used as the display panel. The display panel is irradiated with parallel rays from oblique directions. Light scattered by the display panel is condensed by a magnification lens and the display image is enlarged. As a light source for illuminating the display panel, a white LED is mainly used.

For example, in the display panel, when a distance from the position where a color filter 124 is formed to a liquid crystal layer 127 is set to t($\mu$m) (refer to FIG. 103), the aperture ratio of pixels is P, the size of one pixel is a ($\mu$), and the angle formed by light which transmitted the color filter and the normal line of the pixel is 0, the following expression is satisfied.

$$t \le \frac{4a(1 - \sqrt{P})}{\tan\theta} \qquad \text{(Expression 1)}$$

The view finder in the embodiment of the invention has, for example, a structure such that the distance between the display panel and the magnification lens can be changed. When the view finder is extended, the switch of a lamp illuminating the display panel is turned on to light the lamp.

In a view finder according to another embodiment of the invention, for example, a white LED is attached to one end of a convex lens. A part of light emitted from the white LED goes out from the convex lens and illuminates the display panel. The convex lens also functions as a magnification lens.

In a view finder according to another embodiment of the invention, for example, a light source emitting light to the display panel is integrally attached to a transparent block.

In a video display apparatus according to another embodiment of the invention, for example, a monitor window of standard white or black display is formed. The observer of the video display apparatus adjusts a tilt of the video display apparatus while watching the monitor to an angle at which the display image can be watched easiest.

In a video display apparatus according to another embodiment of the invention, for example, an arm is attached to one end of the display panel and a light emitting device is disposed at an end of the arm. The observer adjusts the apparatus by moving the arm to a position at which an image of the display panel is watched easiest. Preferably, the arm is made by a transparent plate and a prism or the like which changes the directivity of incident light or the light travelling direction is formed in the transparent plate.

BRIEF DESCRIPTION OF THE DRAWINGS

FIG. 13 is a diagram showing the configuration of the display panel of the invention.

FIG. 17 is a diagram showing the configuration of the display panel of the invention.

FIG. 30 shows the configuration of the view finder of the invention.

FIG. 33 shows the configuration of the view finder of the invention.

FIG. 42 shows the configuration of the view finder of the invention.

FIG. 44 shows the view finder of the invention.

FIG. 81 is a diagram for explaining the video display apparatus of the invention.

FIG. 98 shows the configuration of the view finder of the invention.

FIG. 120 illustrates the configuration of the driving circuit of the display panel of the invention.

FIG. 121 shows the configuration of the video display apparatus of the invention.

FIGS. 122(*a*) and 122(*b*) are diagrams for explaining the method of driving the display panel of the invention;

FIGS. 123A and 123B are diagrams for explaining the method of driving the display panel of the invention.

FIGS. 124A and 124B are diagrams for explaining the method of driving the display panel of the invention.

Figure 125:
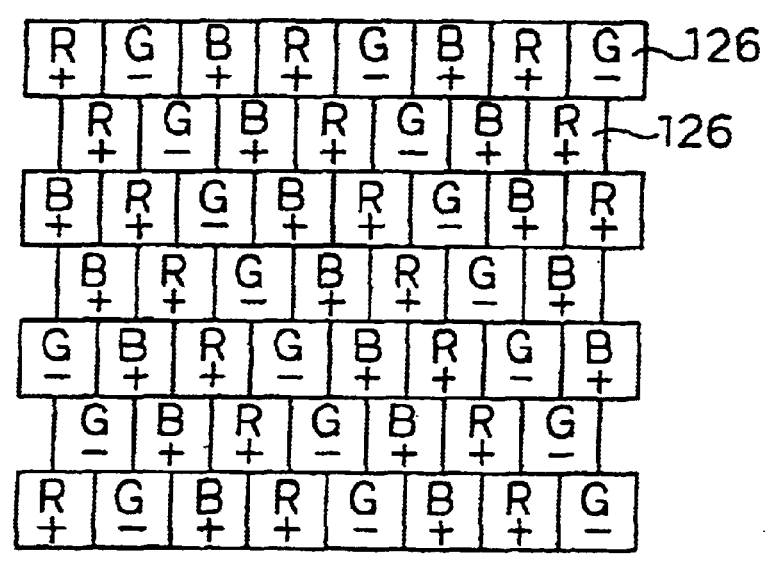

FIG. 125 is a diagram for explaining the method of driving the display panel of the invention.

Figure 126:
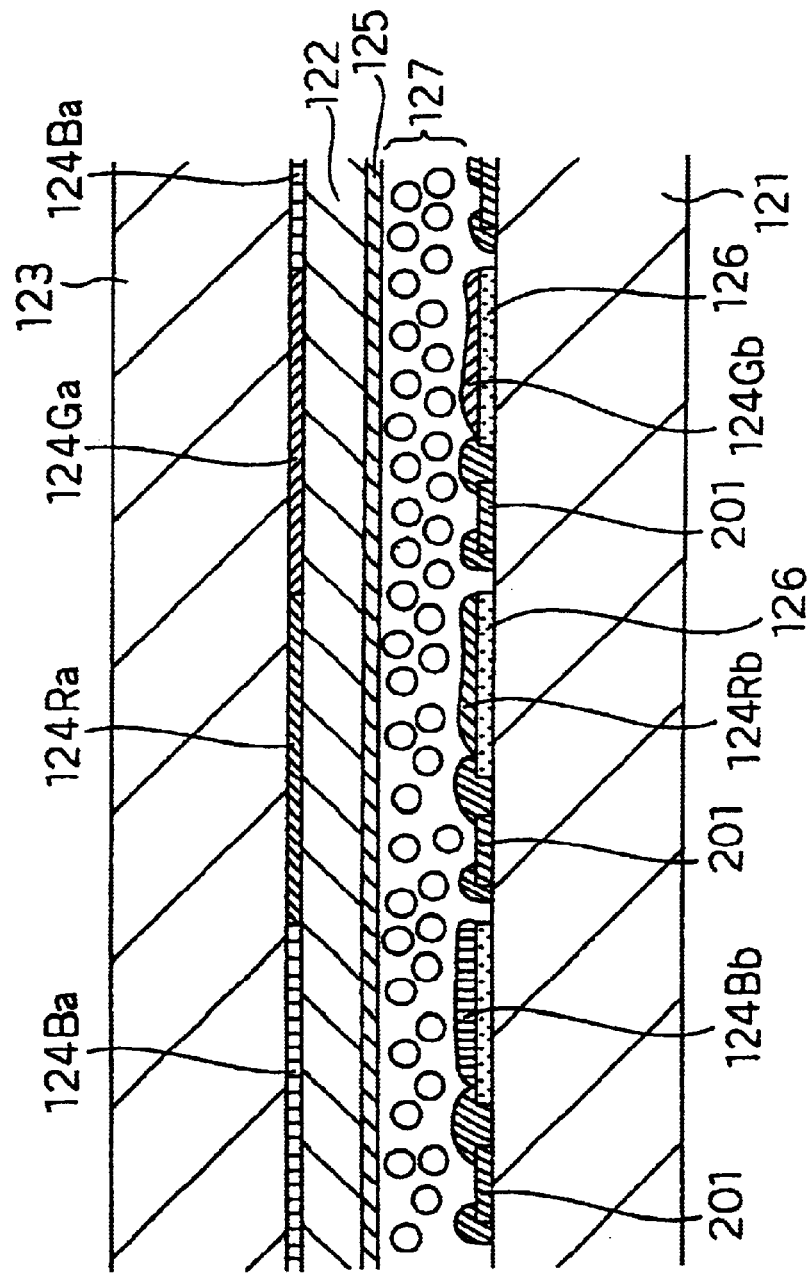

FIG. 126 shows the configuration of the display panel of the invention.

Figure 127:
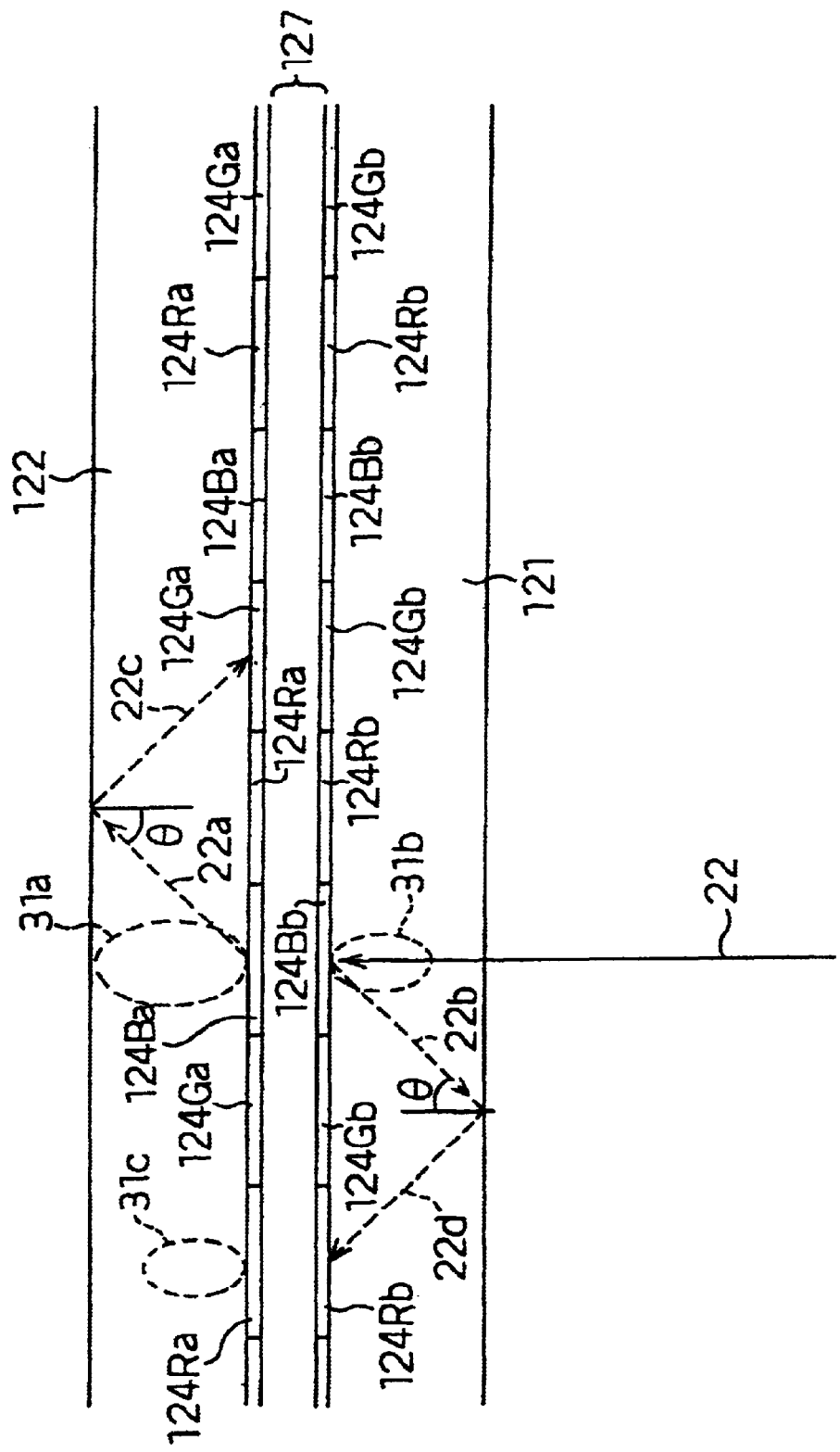

FIG. 127 is a diagram for explaining the display panel of the invention.

Figure 128:
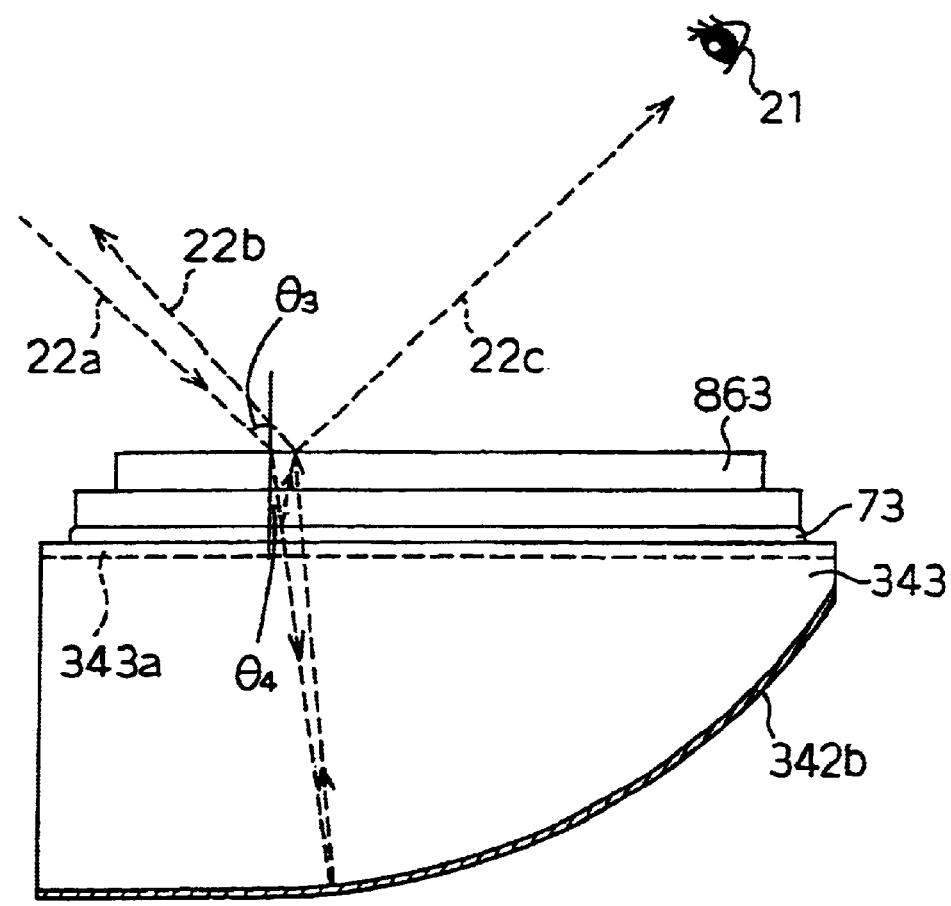

FIG. 128 is a diagram for explaining the video display apparatus of the invention.

Figure 129:
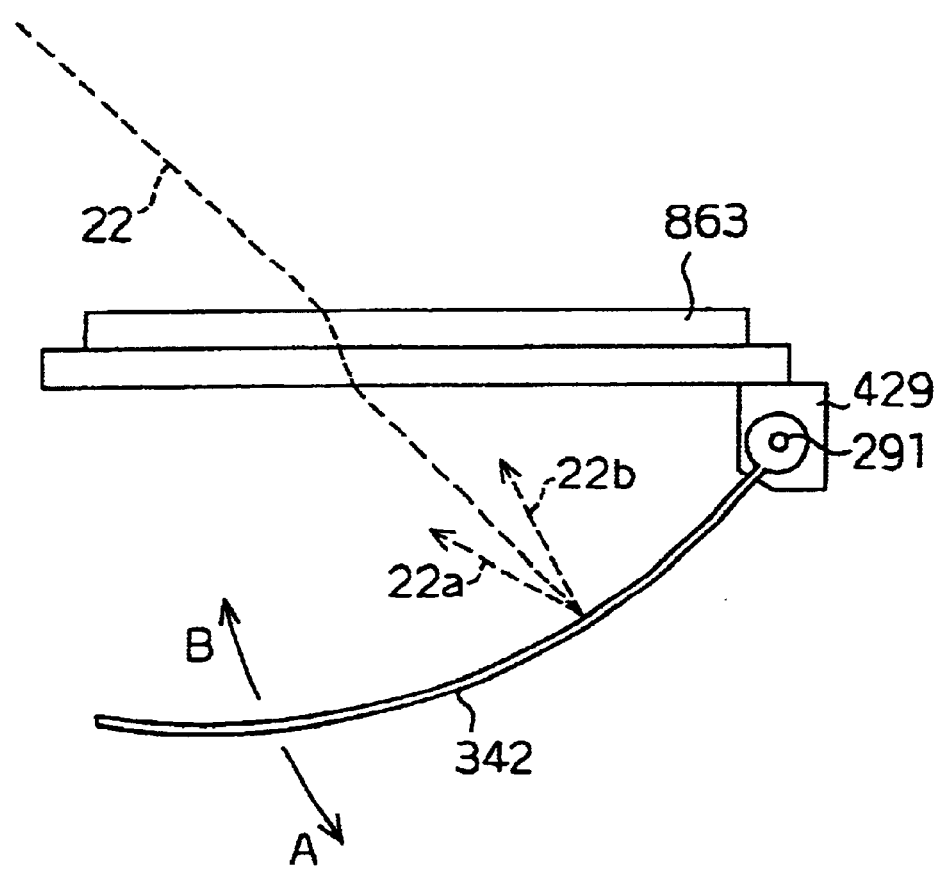

FIG. 129 is a diagram for explaining the video display apparatus of the invention.

Figure 130:
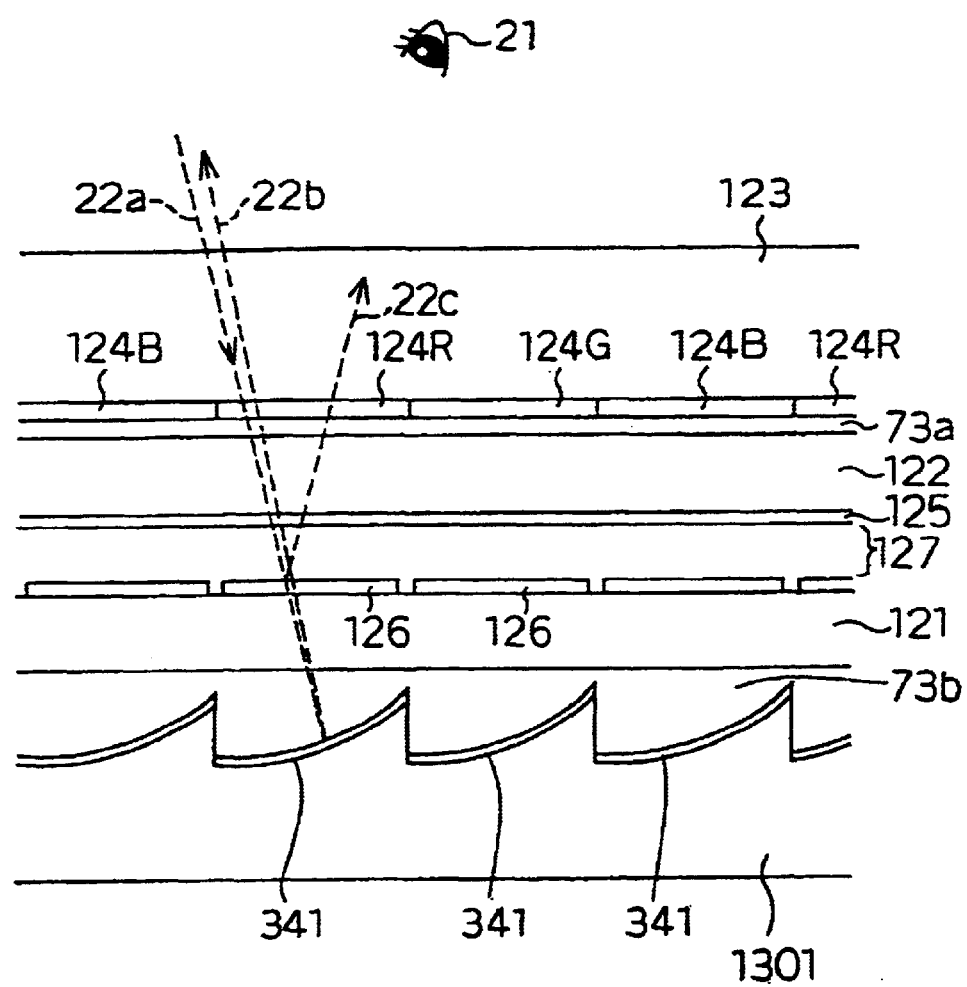

FIG. 130 is a diagram for explaining the display panel of the invention.

FIGS. 131(a) to 131(d) are diagrams for explaining the display panel of the invention.

Figure 132:
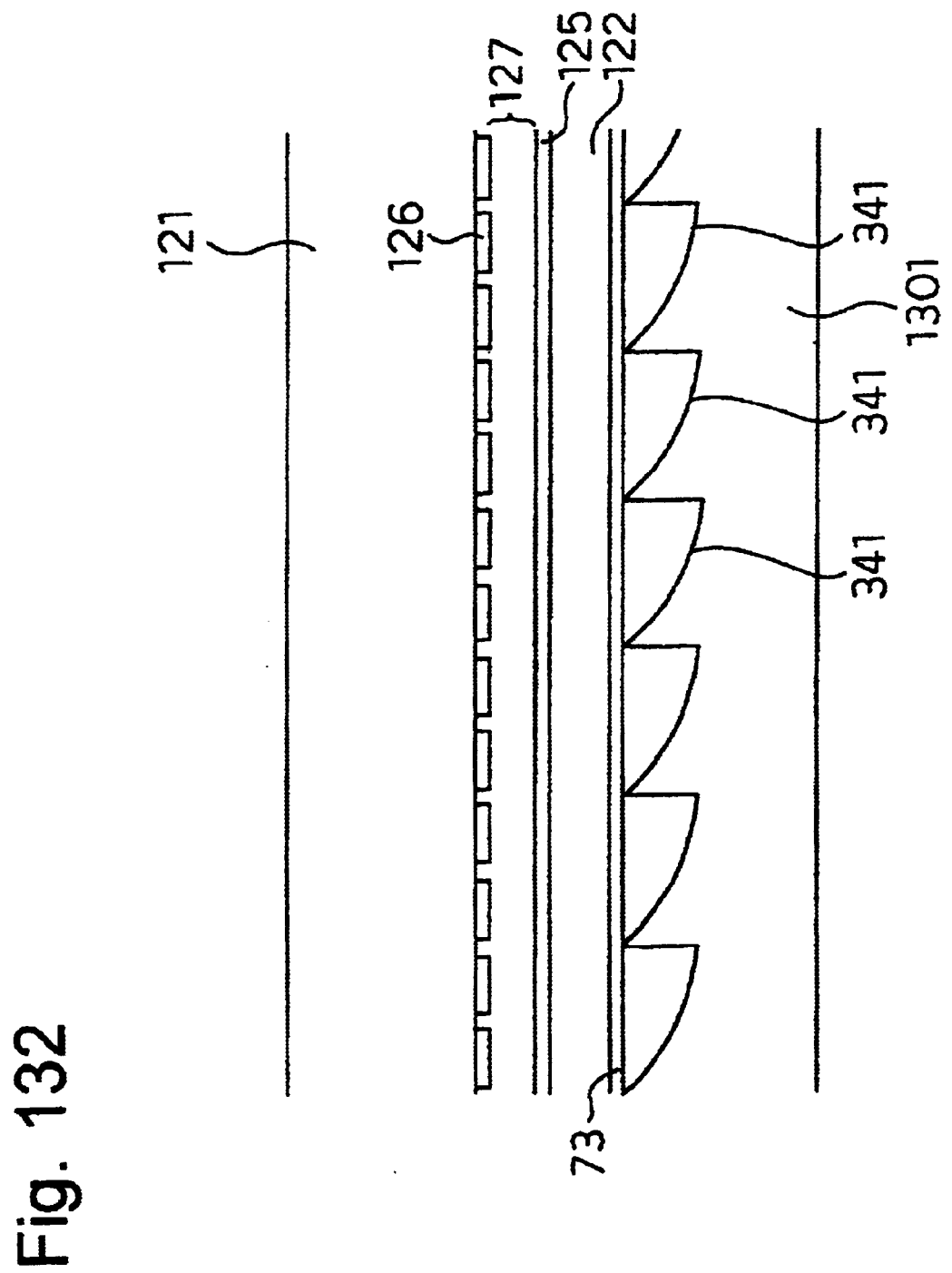

FIG. 132 is a diagram for explaining the display panel of the invention.

Figure 133:
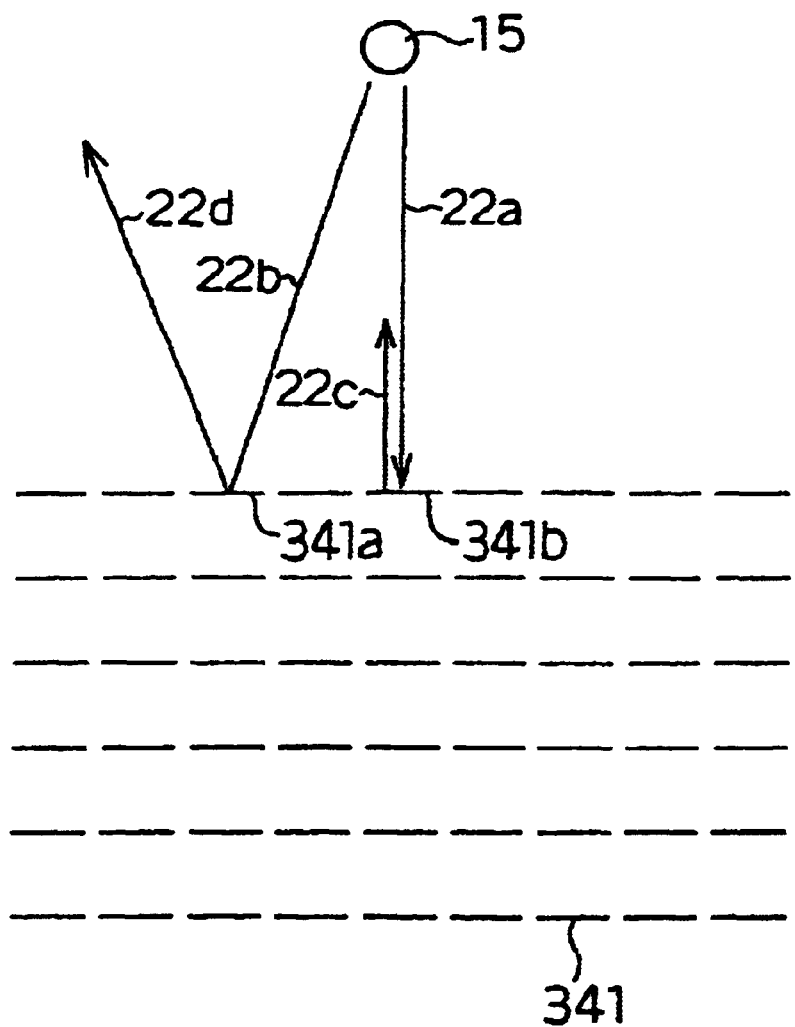

FIG. 133 is a diagram for explaining the display panel of the invention.

Figure 134:
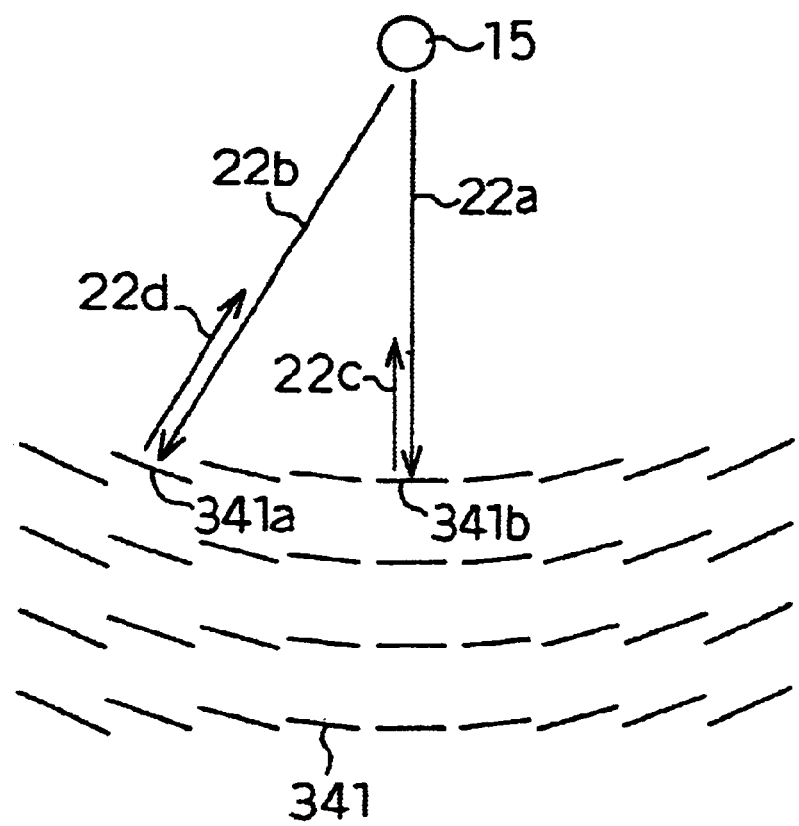

FIG. 134 is a diagram for explaining the display panel of the invention.

Figure 135:
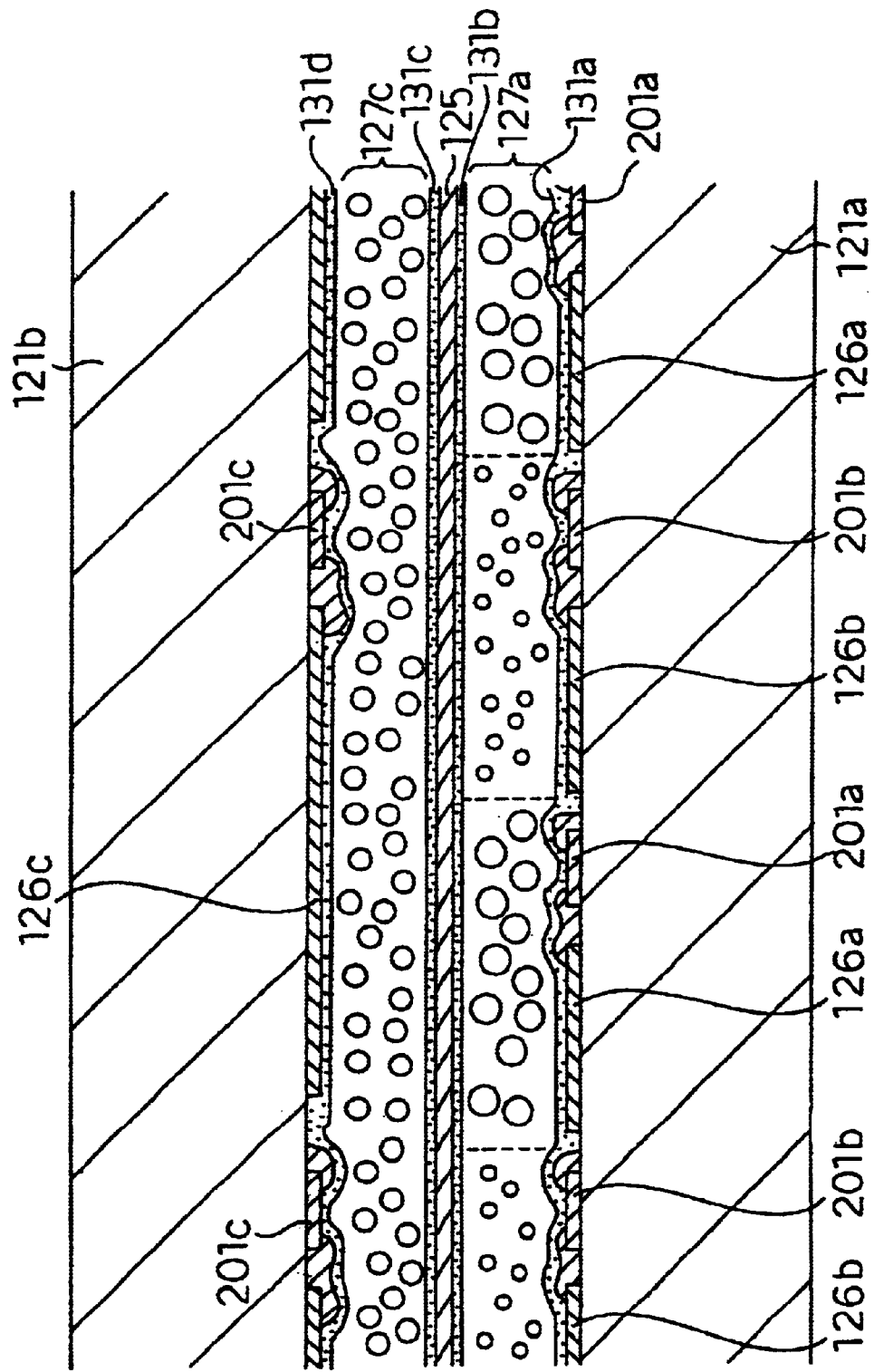

FIG. 135 is a diagram for explaining the display panel of the invention.

Figure 136:
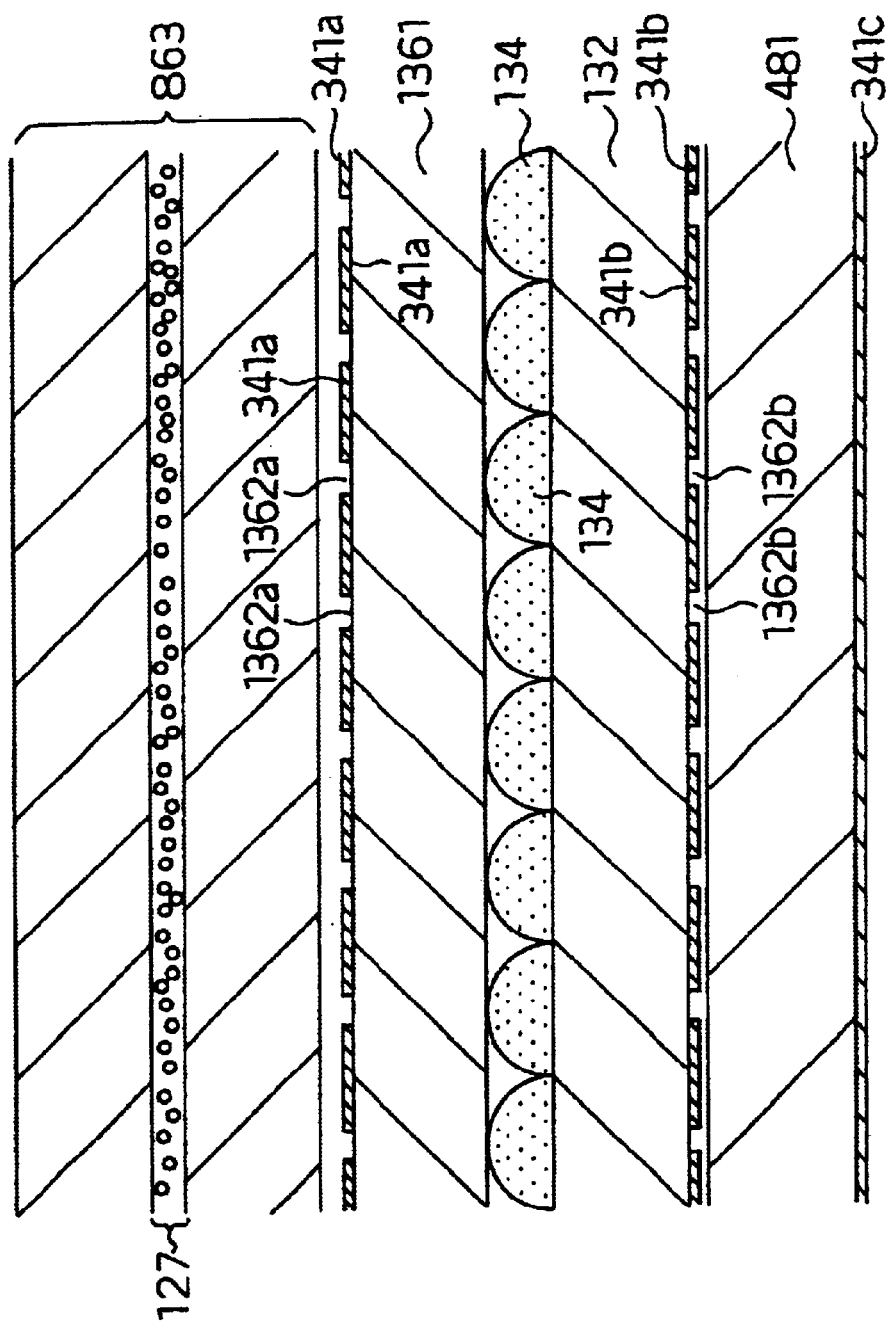

FIG. 136 is a diagram for explaining the video display apparatus of the invention.

Figure 137:
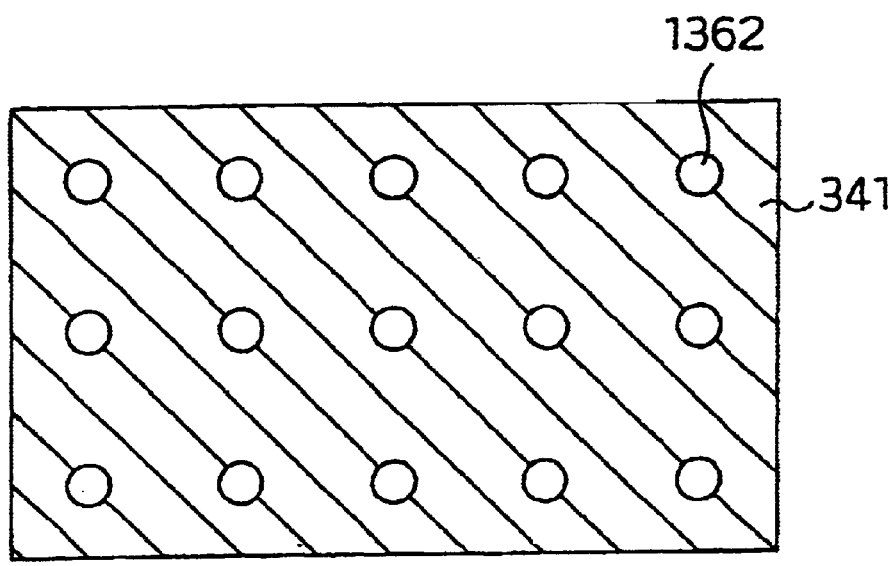

FIG. 137 is a diagram for explaining the video display apparatus of the invention.

Figure 138:
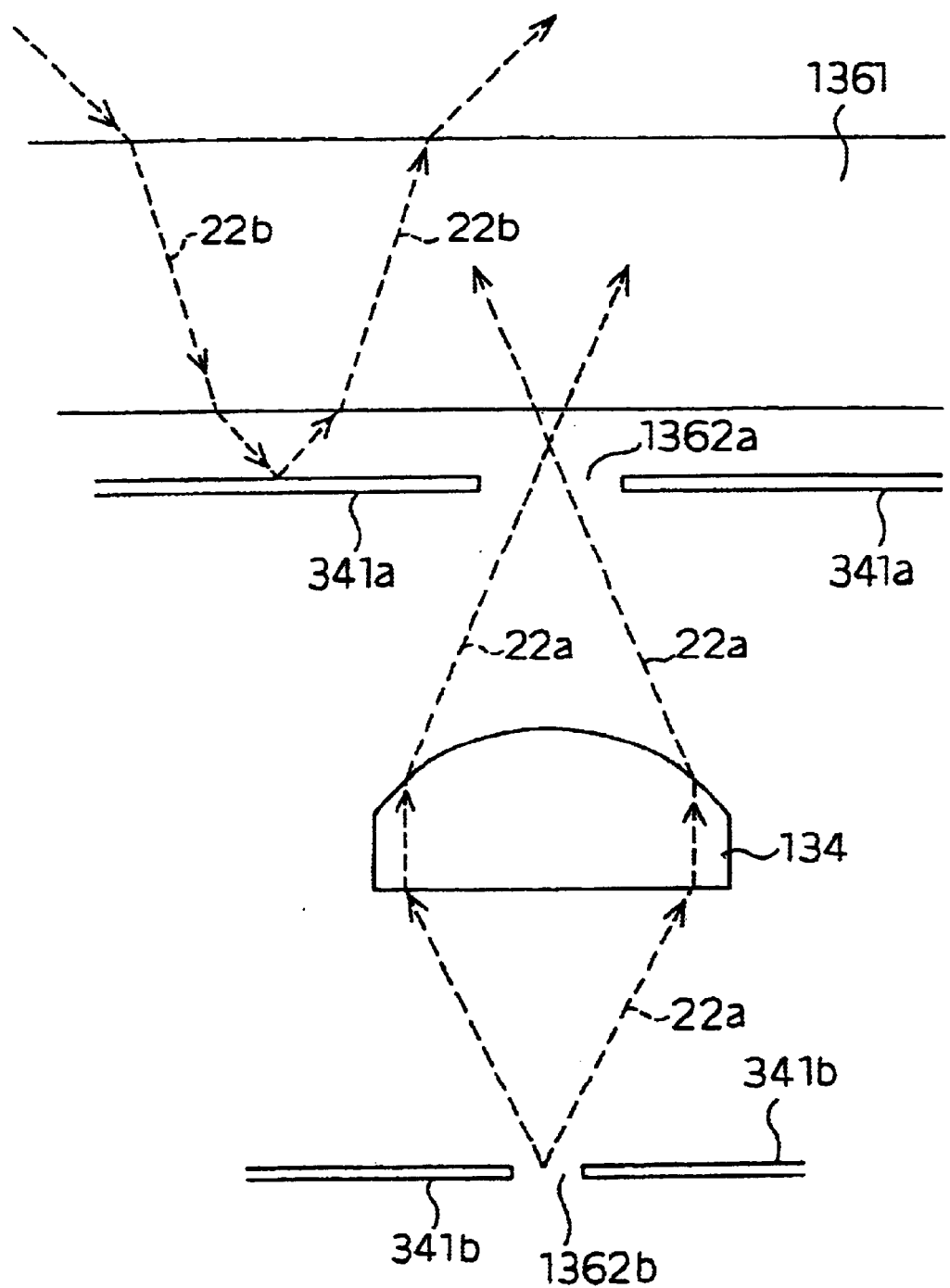

FIG. 138 is a diagram for explaining the video display apparatus of the invention.

Figure 139:
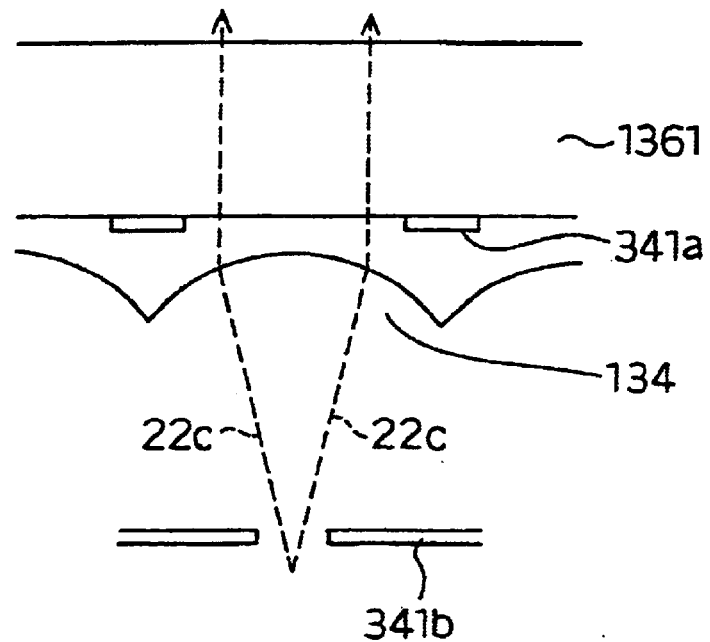

FIG. 139 is a diagram for explaining the video display apparatus of the invention.

Figure 140:
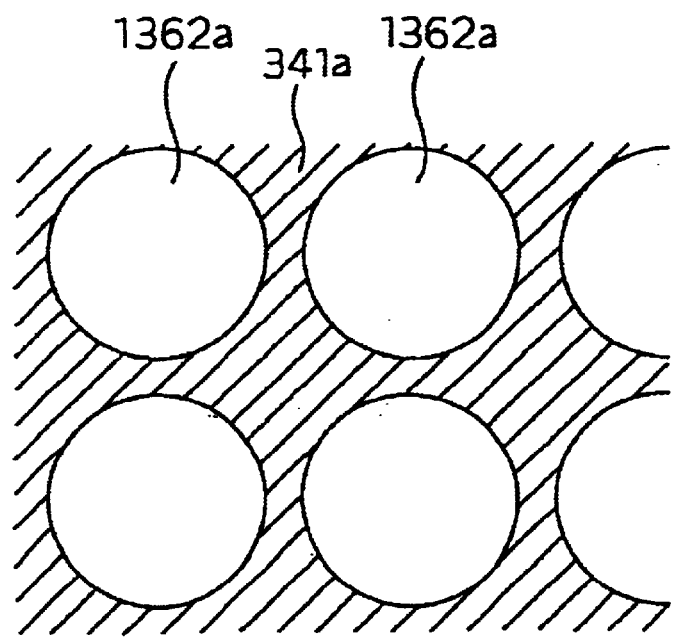

FIG. 140 is a diagram for explaining the video display apparatus of the invention.

Figure 141:
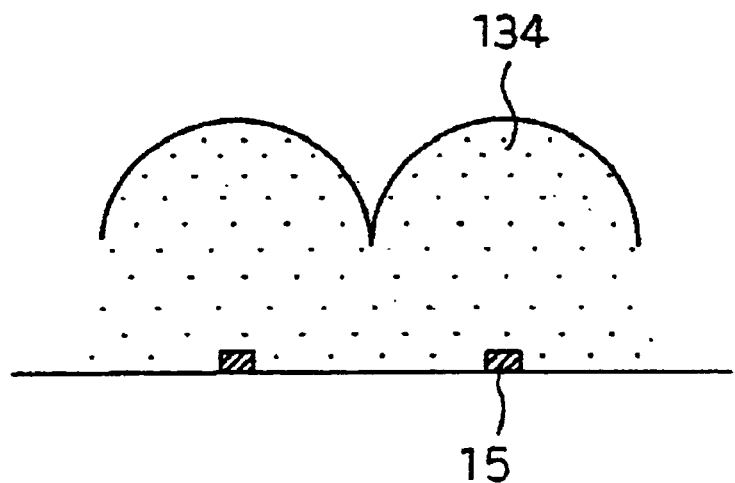

FIG. 141 is a diagram for explaining the video display apparatus of the invention.

Figure 142:
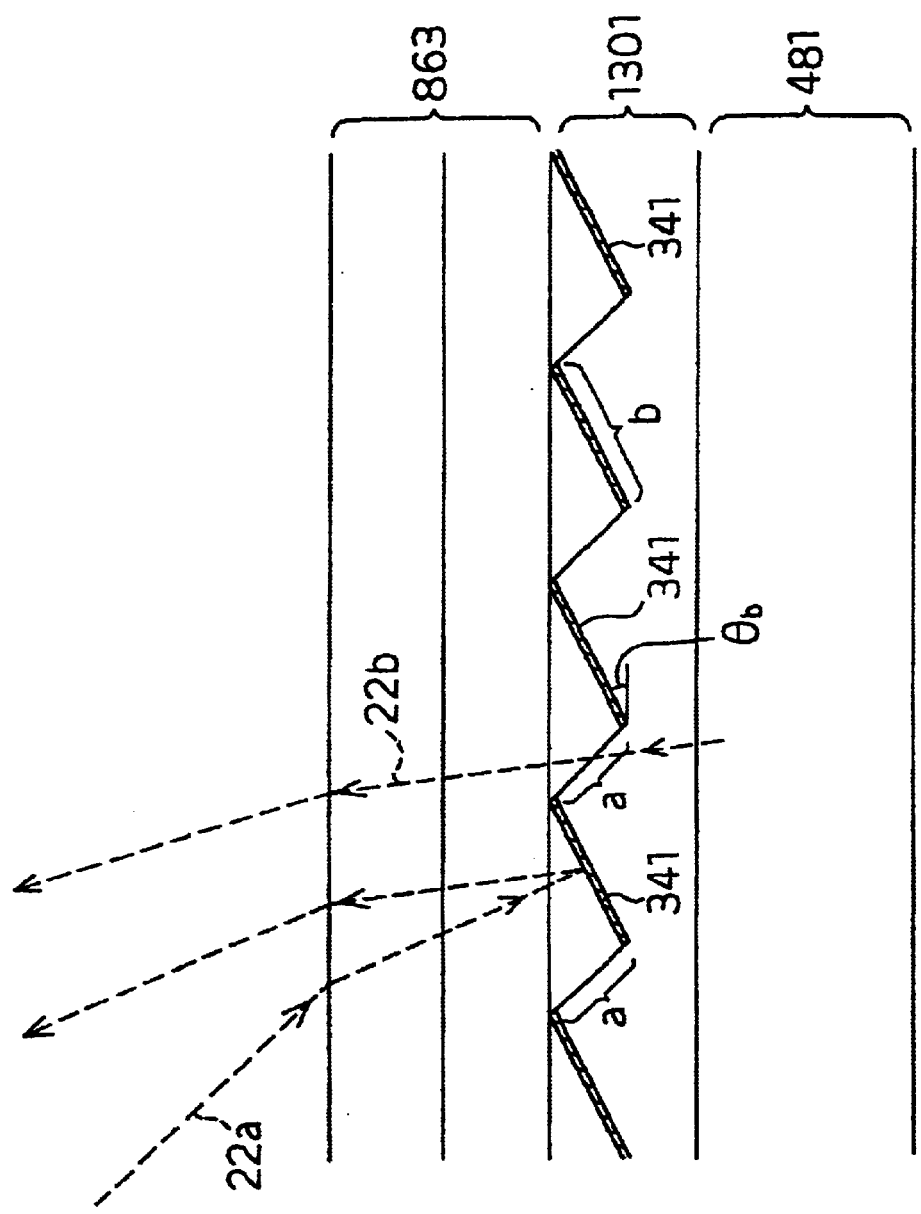

FIG. 142 is a diagram for explaining the video display apparatus of the invention.

Figure 143:
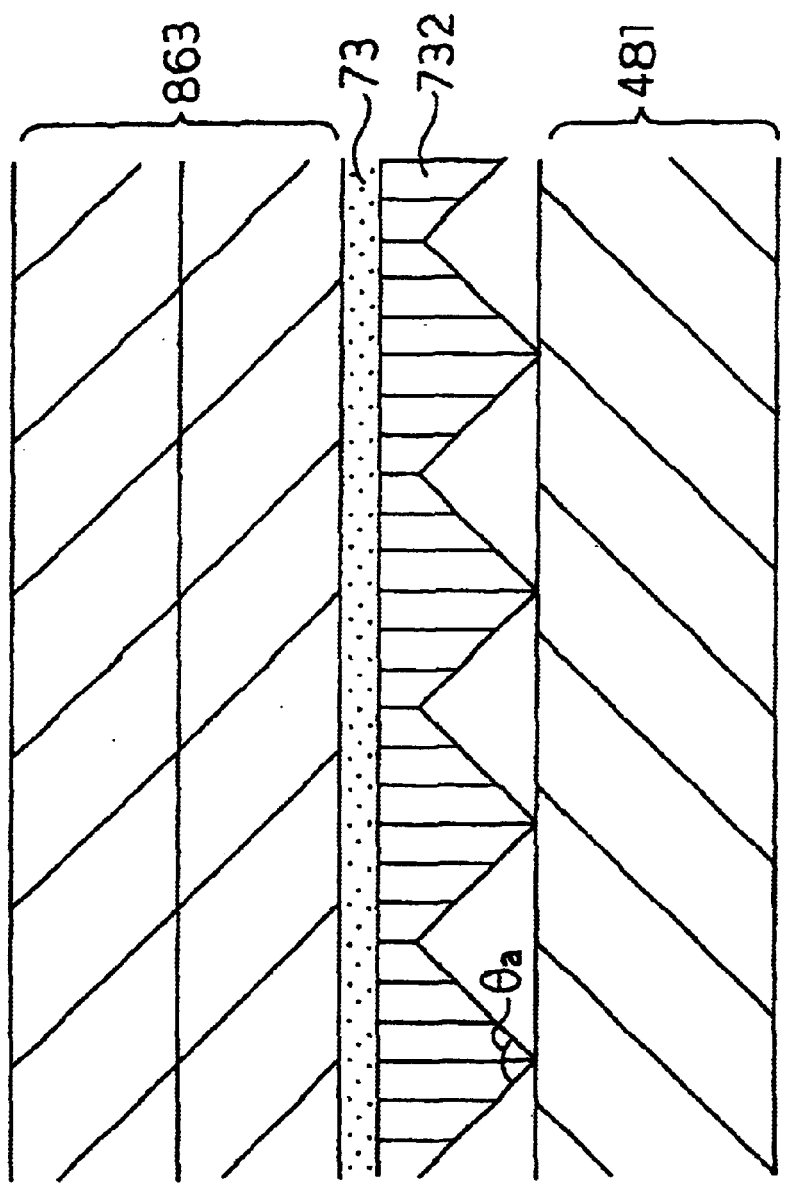

FIG. 143 is a diagram for explaining the video display apparatus of the invention.

FIGS. 144A and 144B are diagrams for explaining the video display apparatus of the invention.

Figure 145:
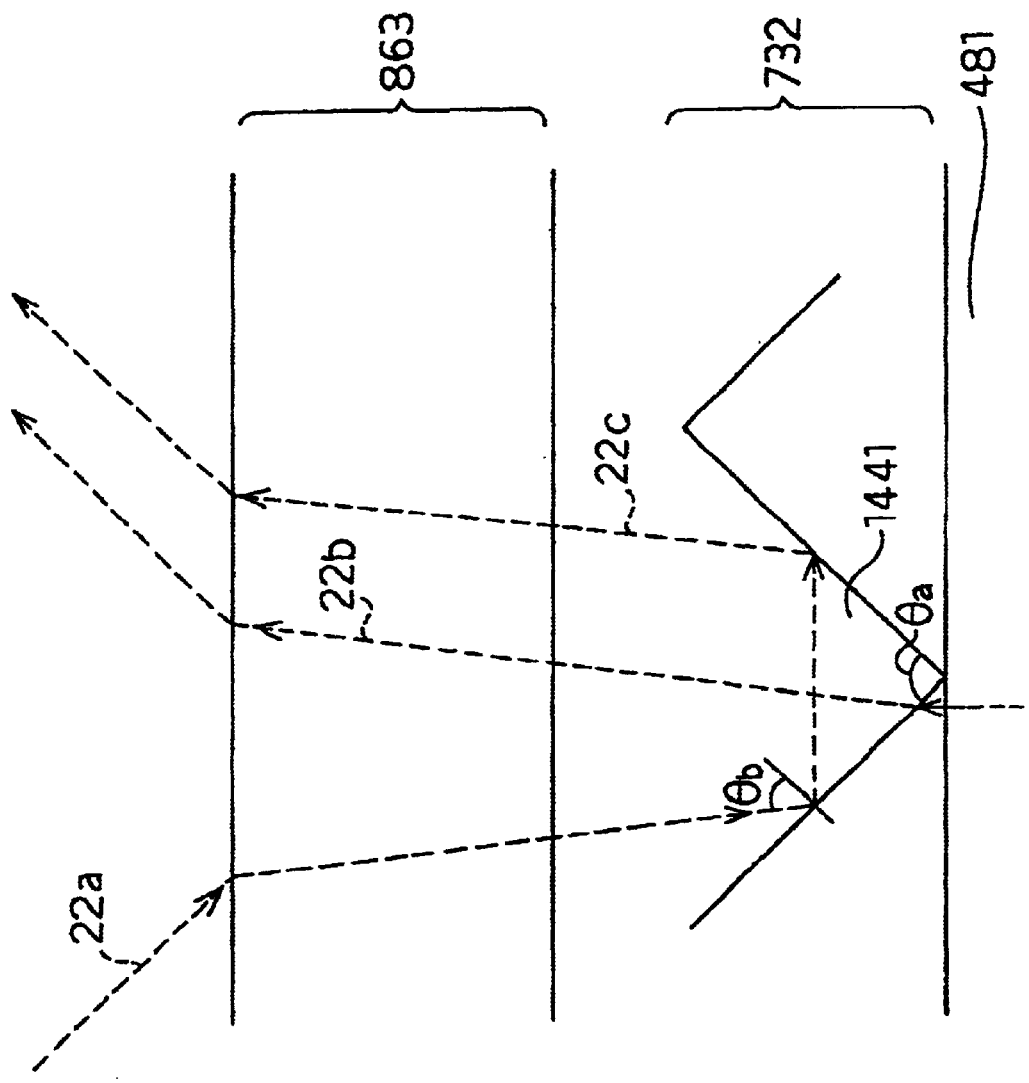

FIG. 145 is a diagram for explaining the video display apparatus of the invention.

Figure 146A:
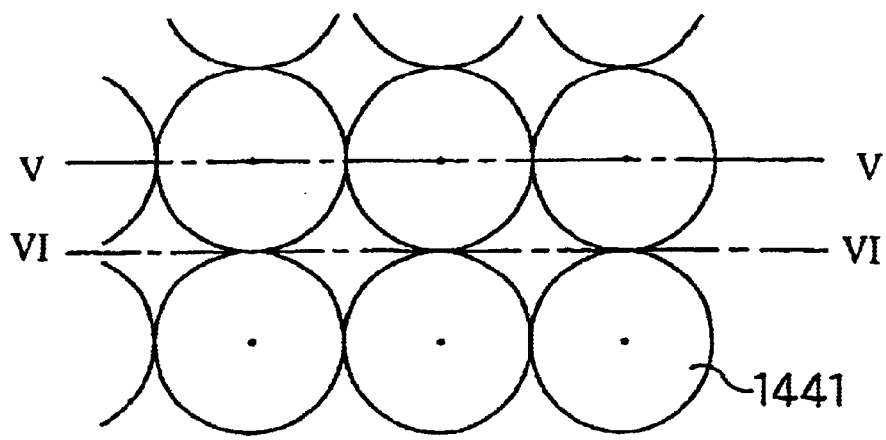
Figure 146B:
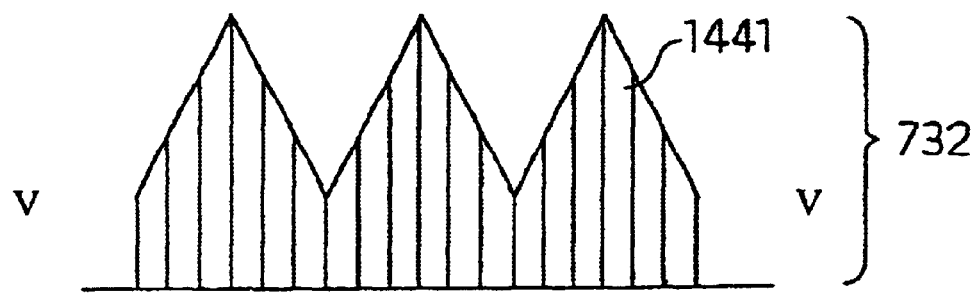
Figure 146C:
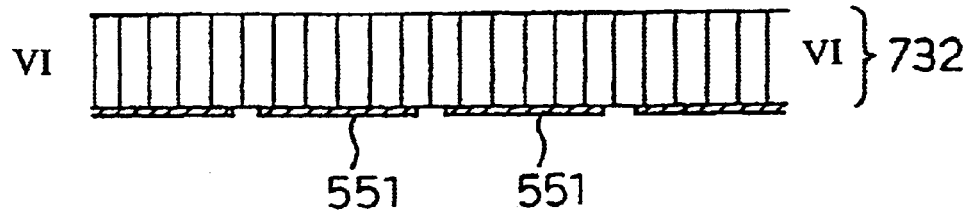

FIGS. 146A to 146C are diagrams for explaining the video display apparatus of the invention.

Figure 147:
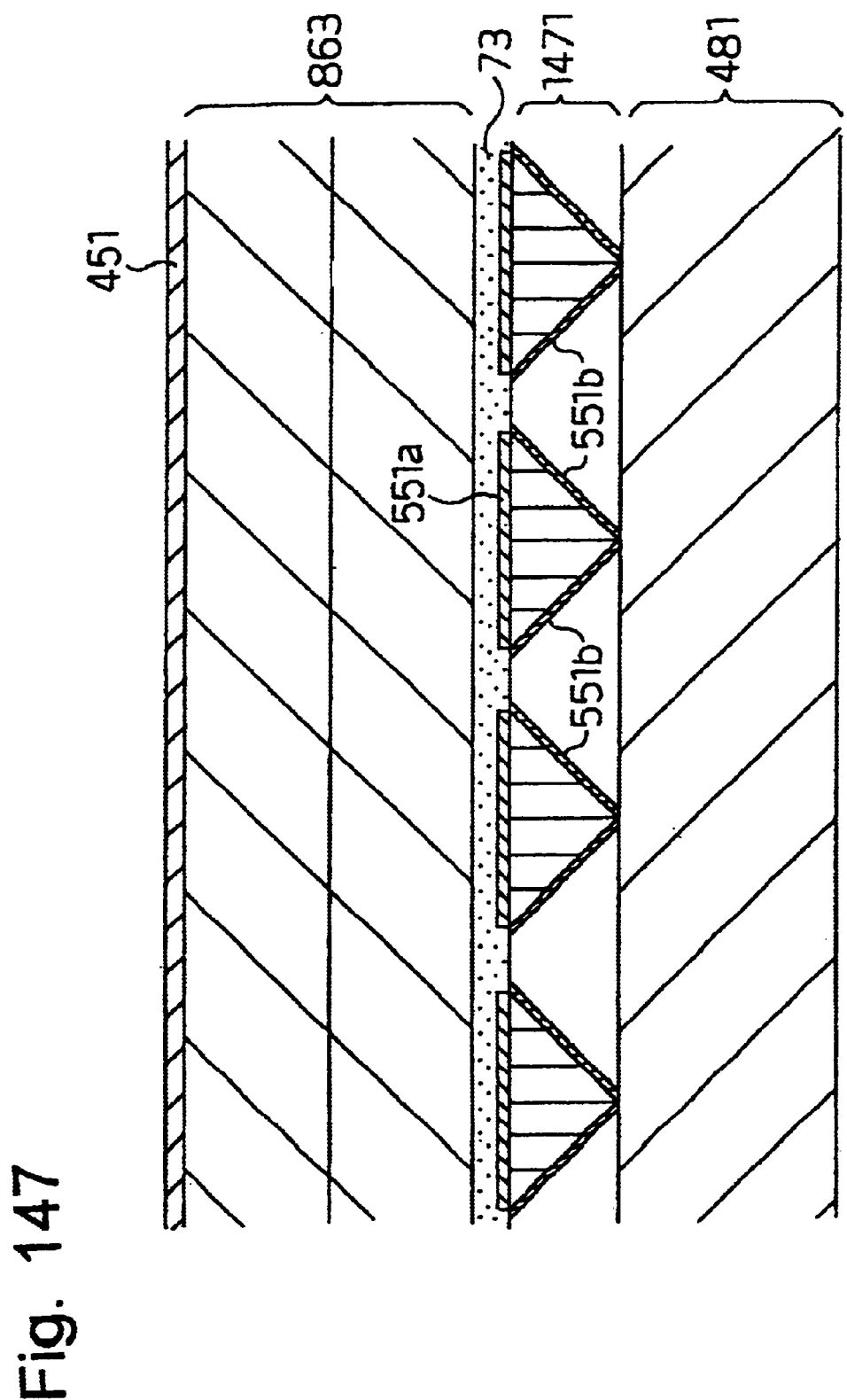

FIG. 147 is a diagram for explaining the video display apparatus of the invention.

Figure 148:
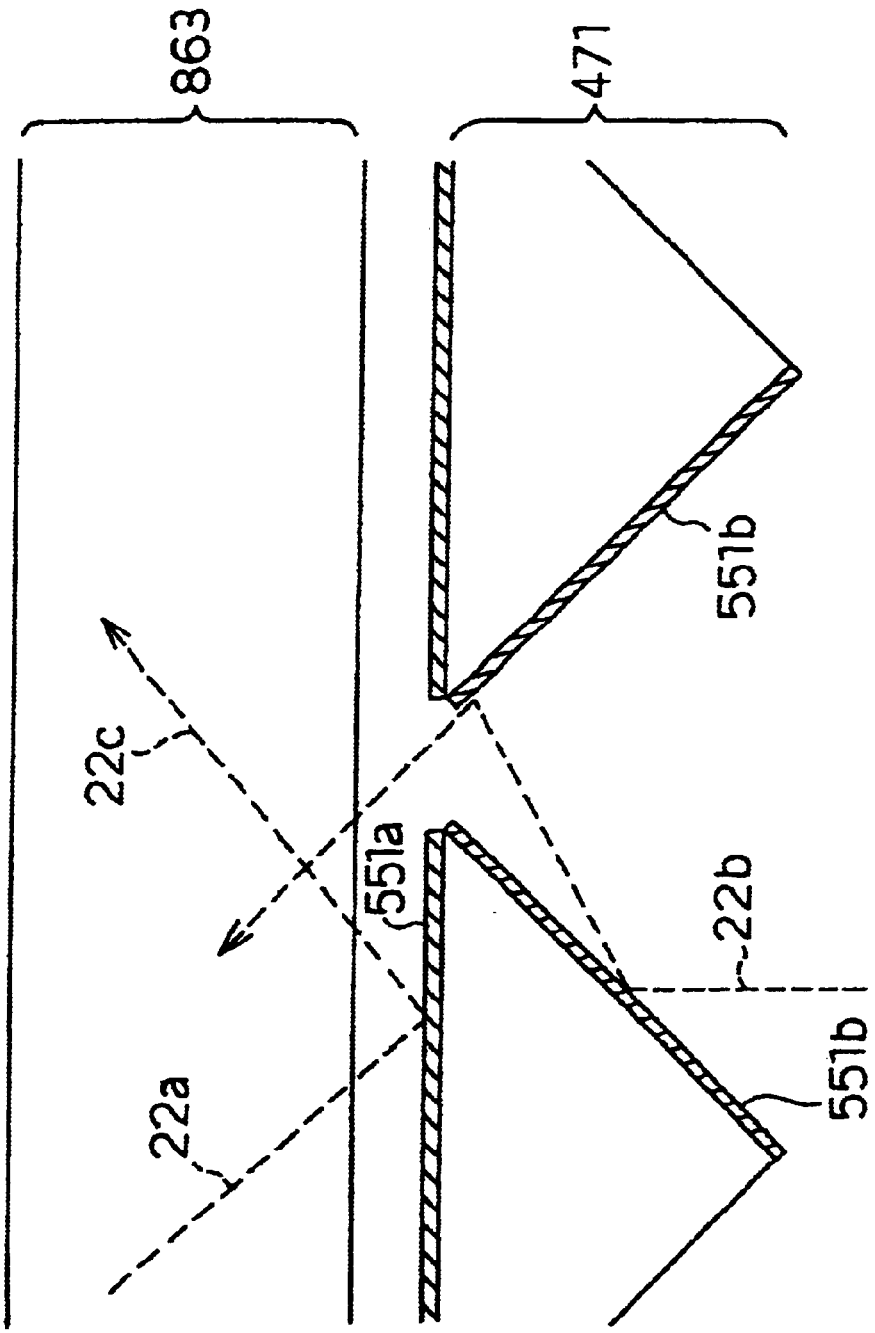

FIG. 148 is a diagram for explaining the video display apparatus of the invention.

Figure 149:
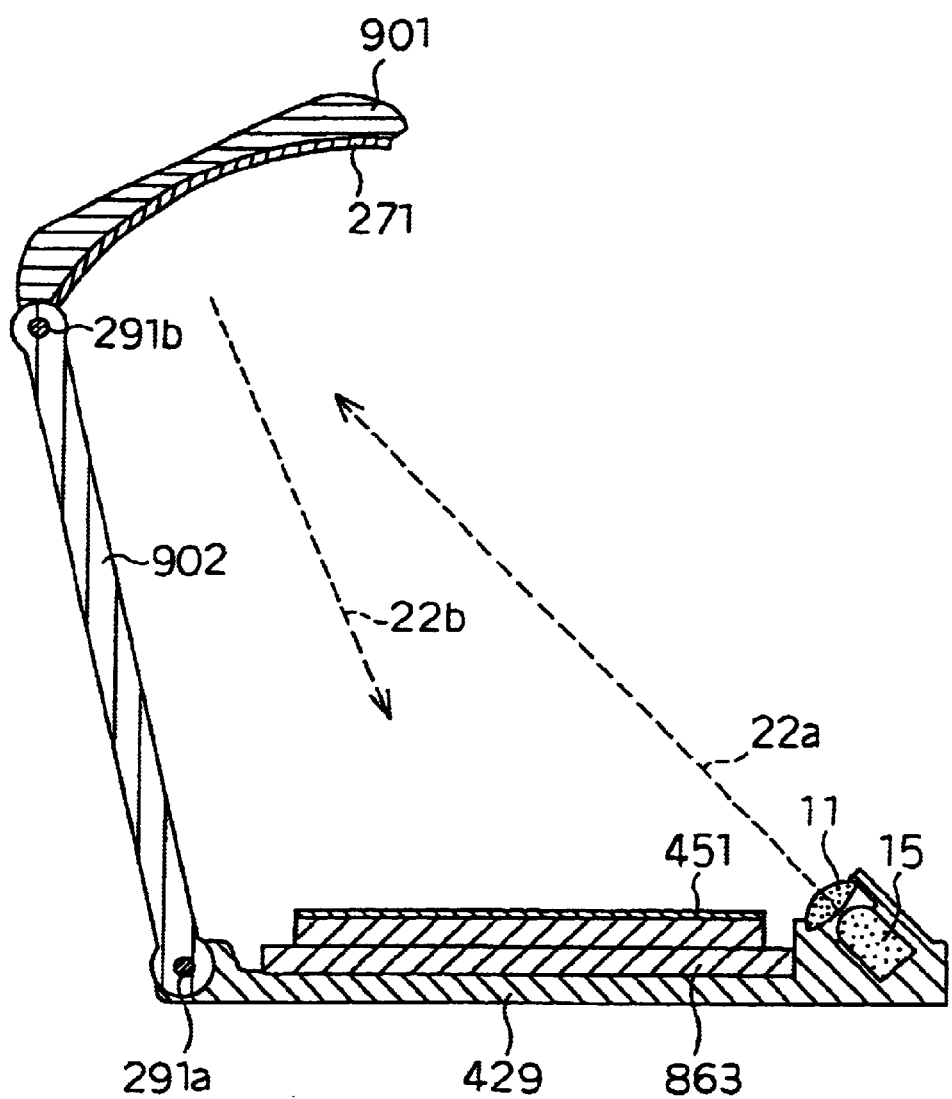

FIG. 149 is a diagram for explaining the video display apparatus of the invention.

Figure 150:
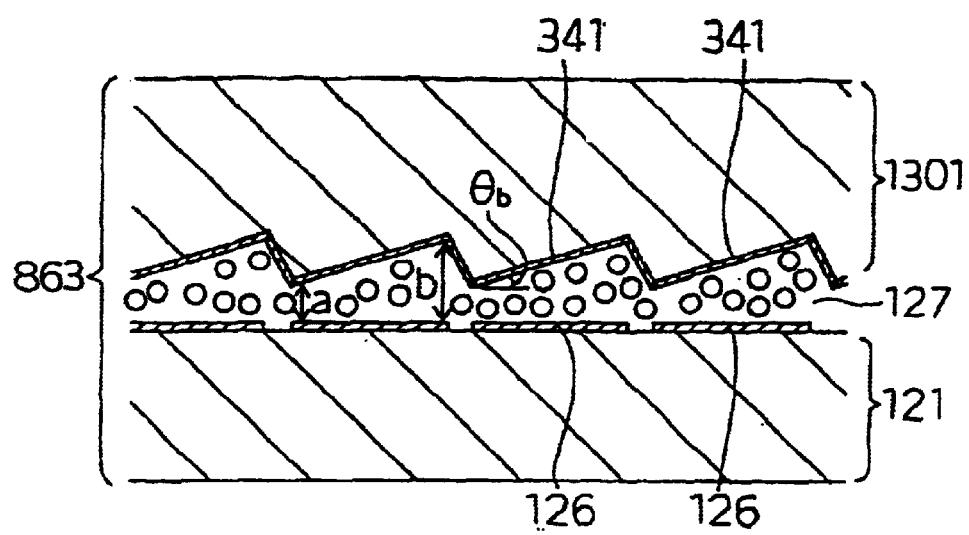
Figure 150:
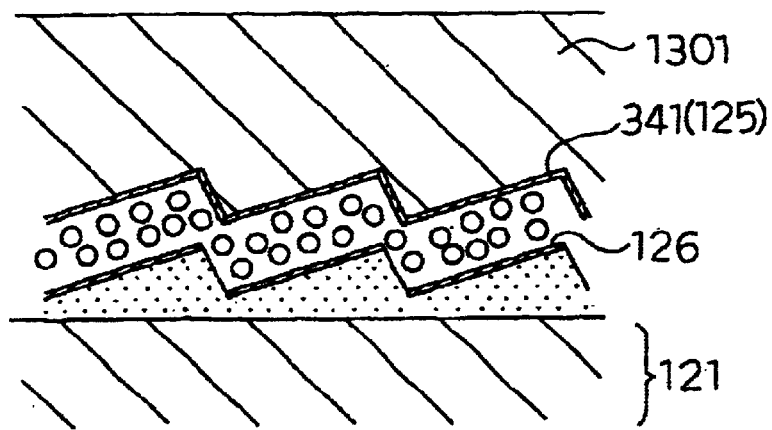

FIGS. 150A and 150B are diagrams for explaining the display panel of the invention.

Figure 151:
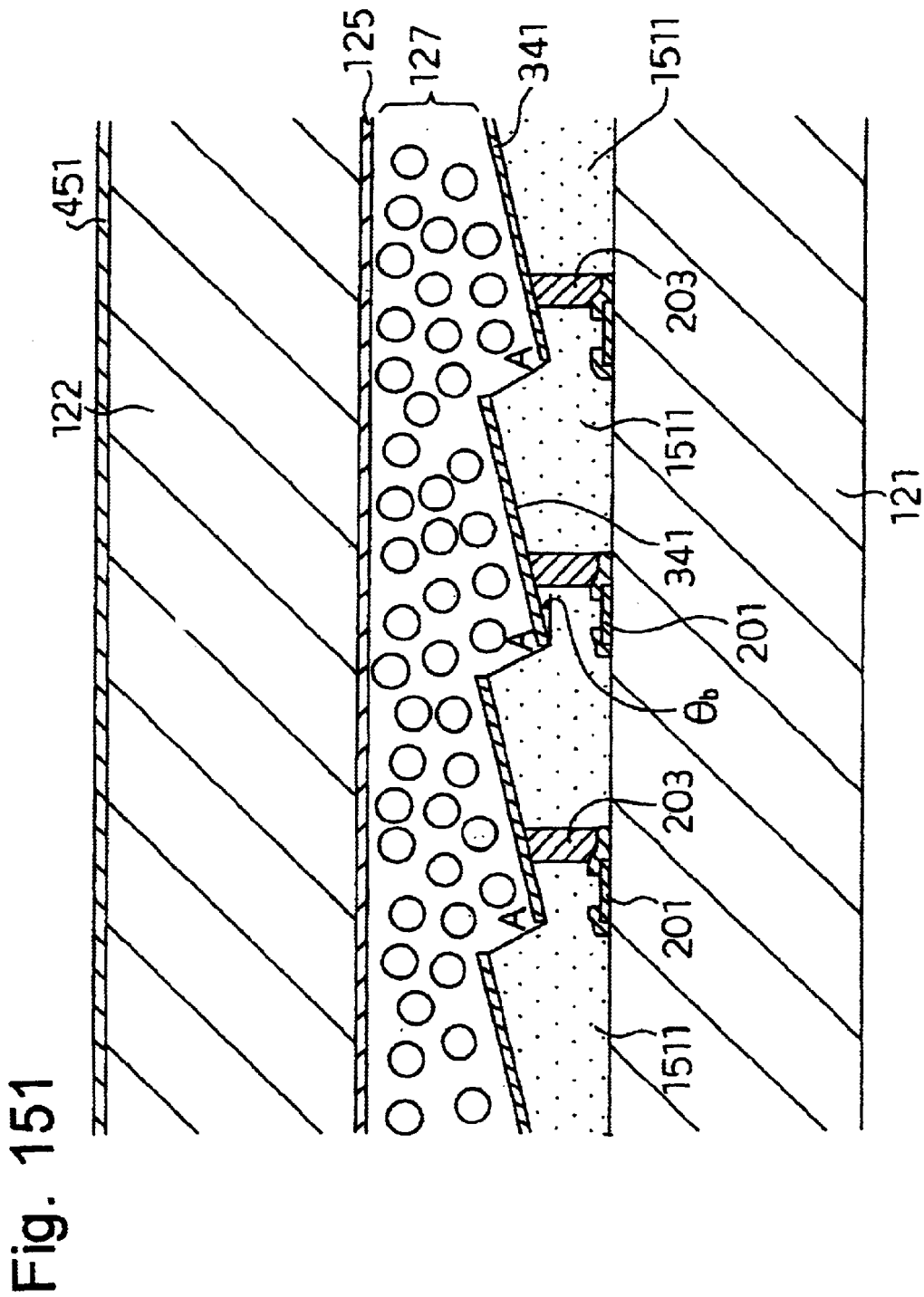

FIG. 151 is a diagram for explaining the display panel of the invention.

FIGS. 152A and 152B are diagrams for explaining the display panel of the invention.

Figure 153:
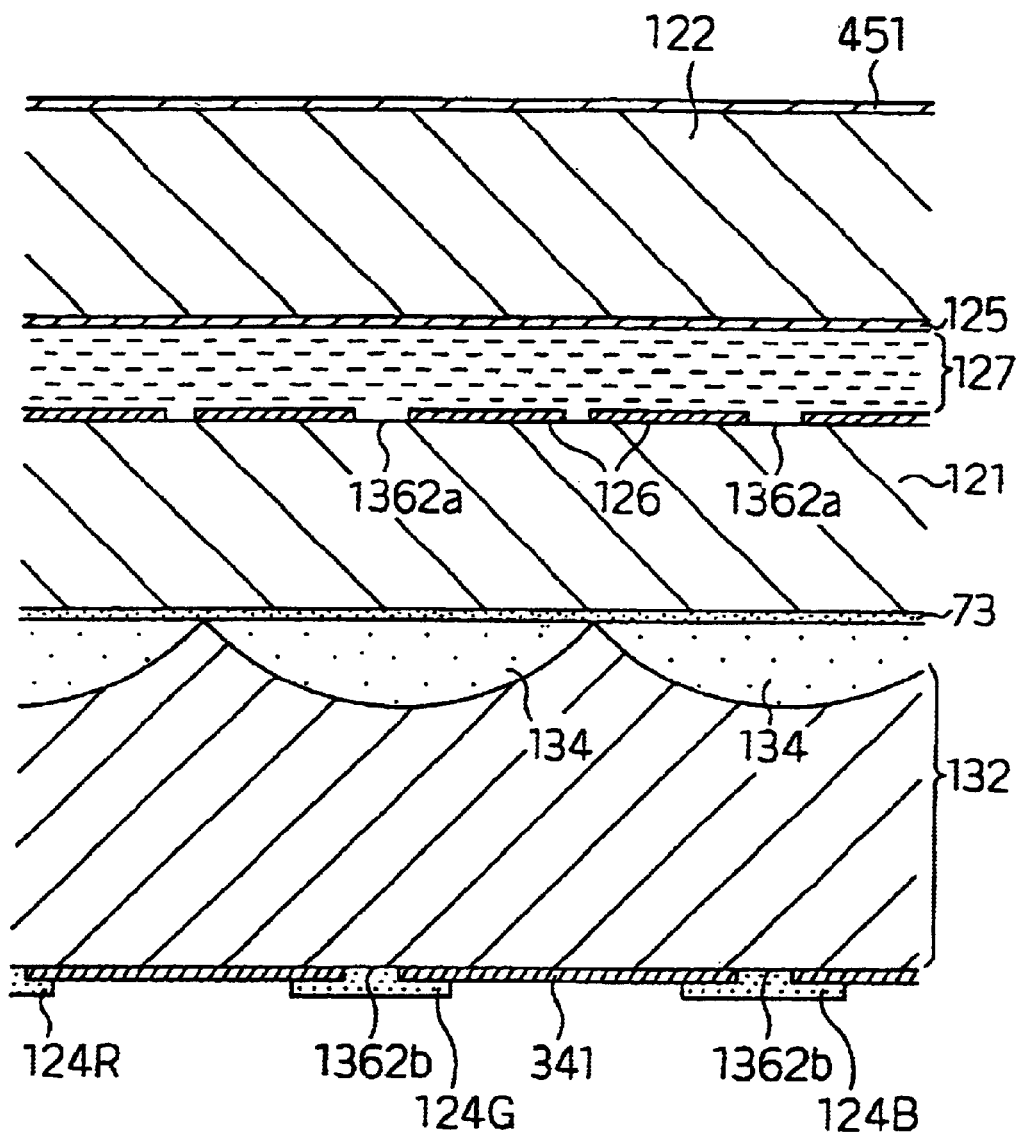

FIG. 153 is a diagram for explaining the display panel of the invention.

Figure 154:
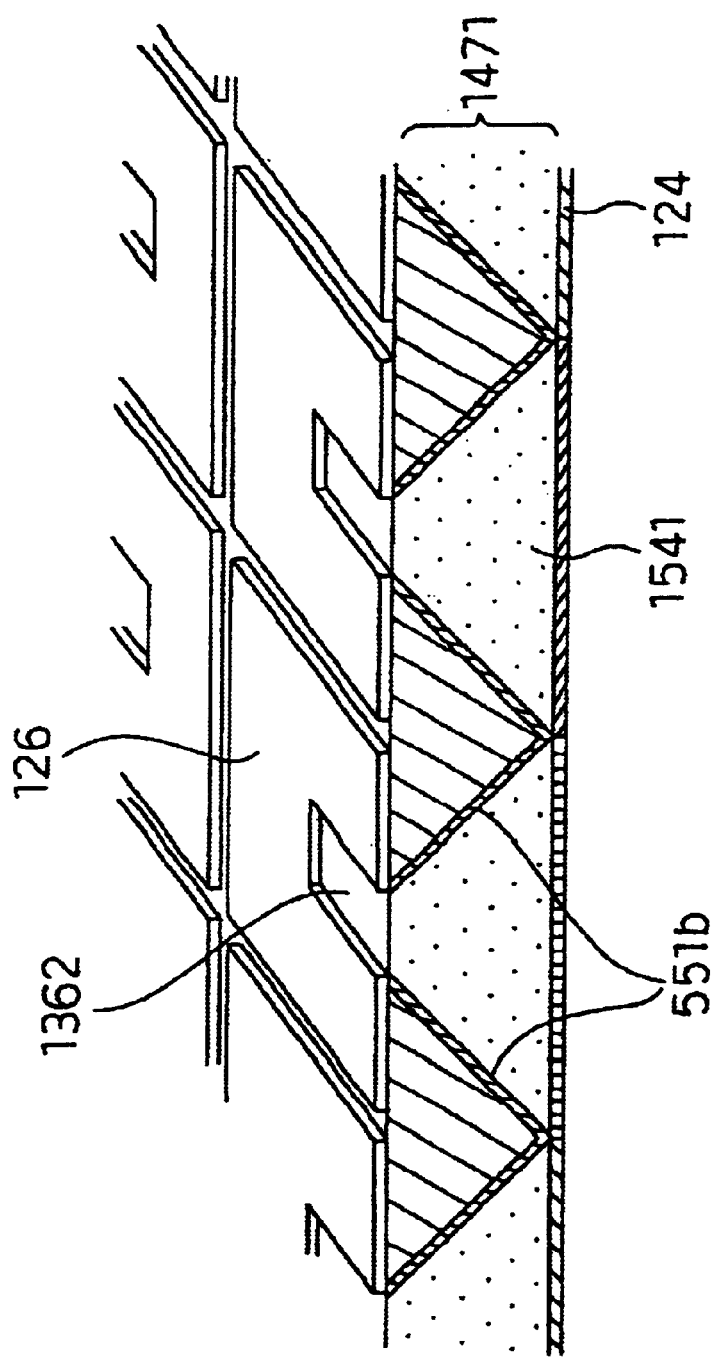

FIG. 154 is a perspective view and cross section of the display panel of the invention.

FIG. 155 is a diagram for explaining the display panel of the invention.

FIGS. 156A to 156F are diagrams for explaining the display panel of the invention.

Figure 157:
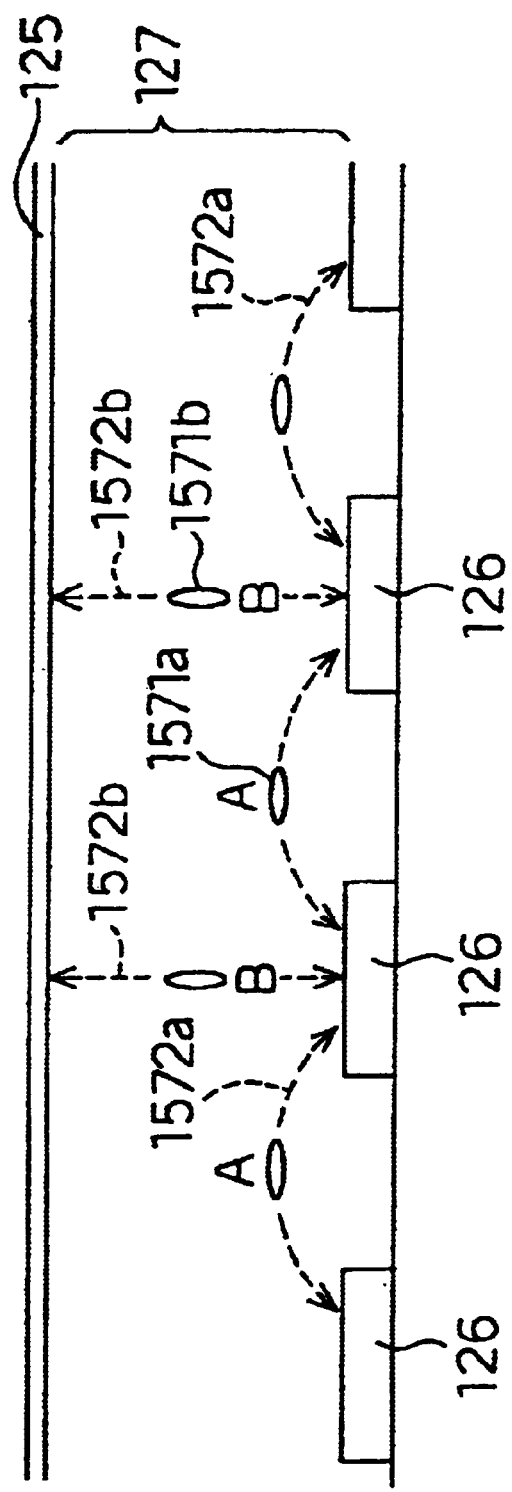

FIG. 157 is a diagram for explaining the display panel of the invention.

Figure 158:
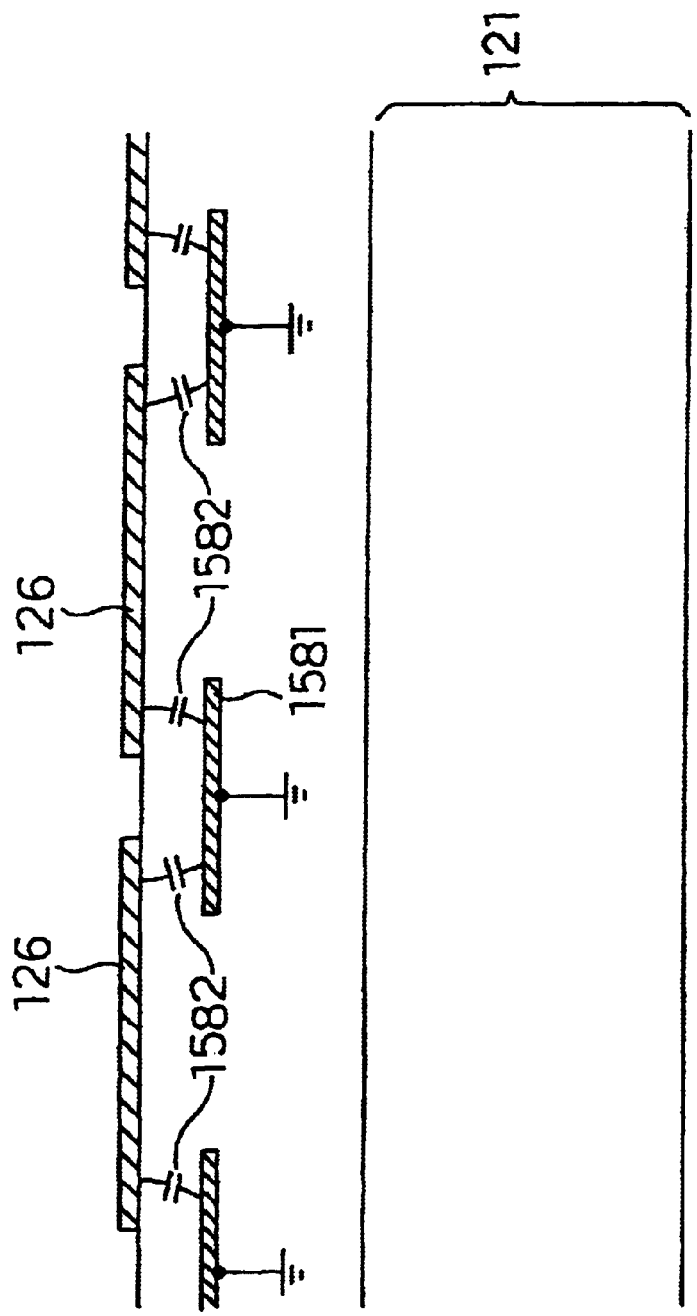

FIG. 158 is a diagram for explaining the display panel of the invention.

FIGS. 159A and 159B are diagrams for explaining a projection type display apparatus of the invention.

Figure 160:
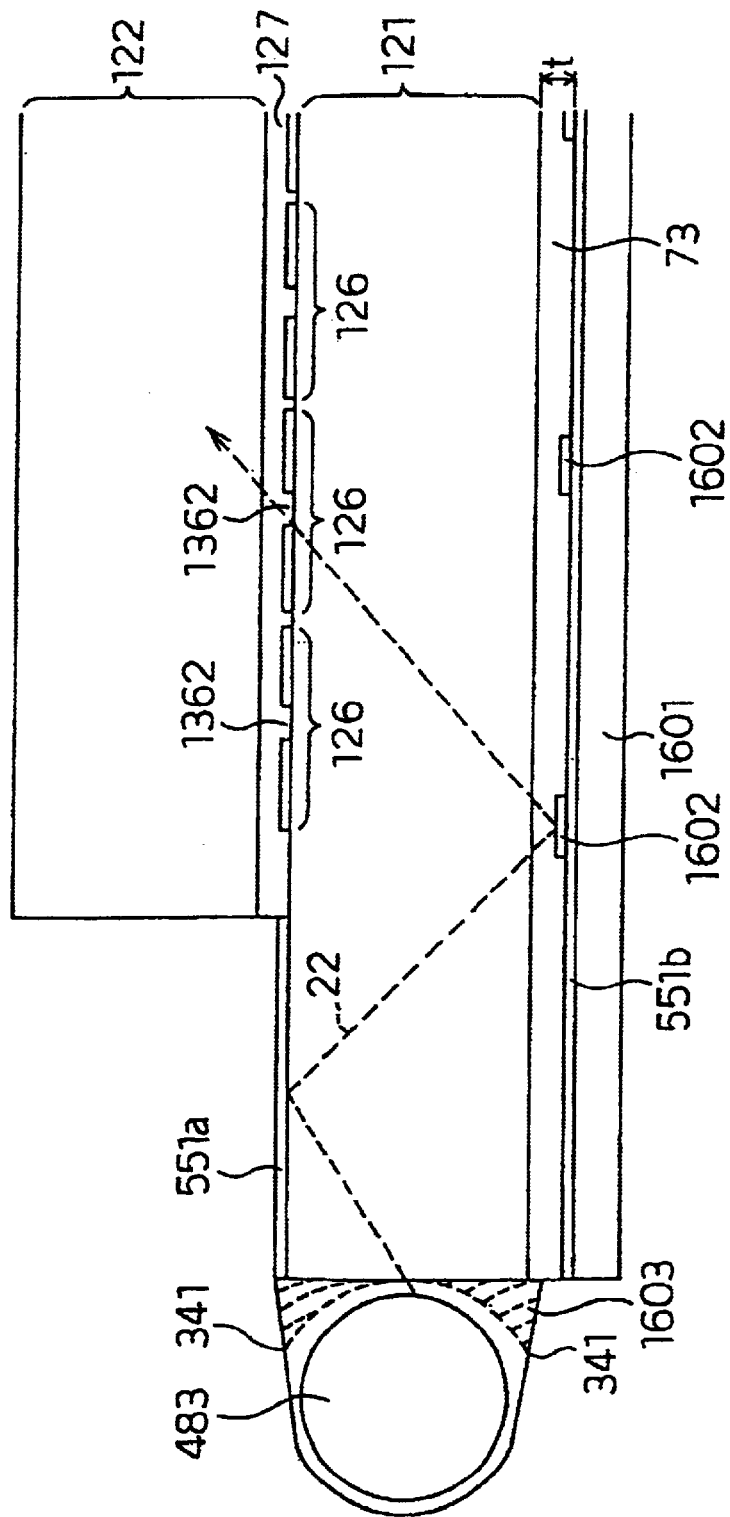

FIG. 160 is a diagram for explaining the video displaying apparatus of the invention.

Figure 161:
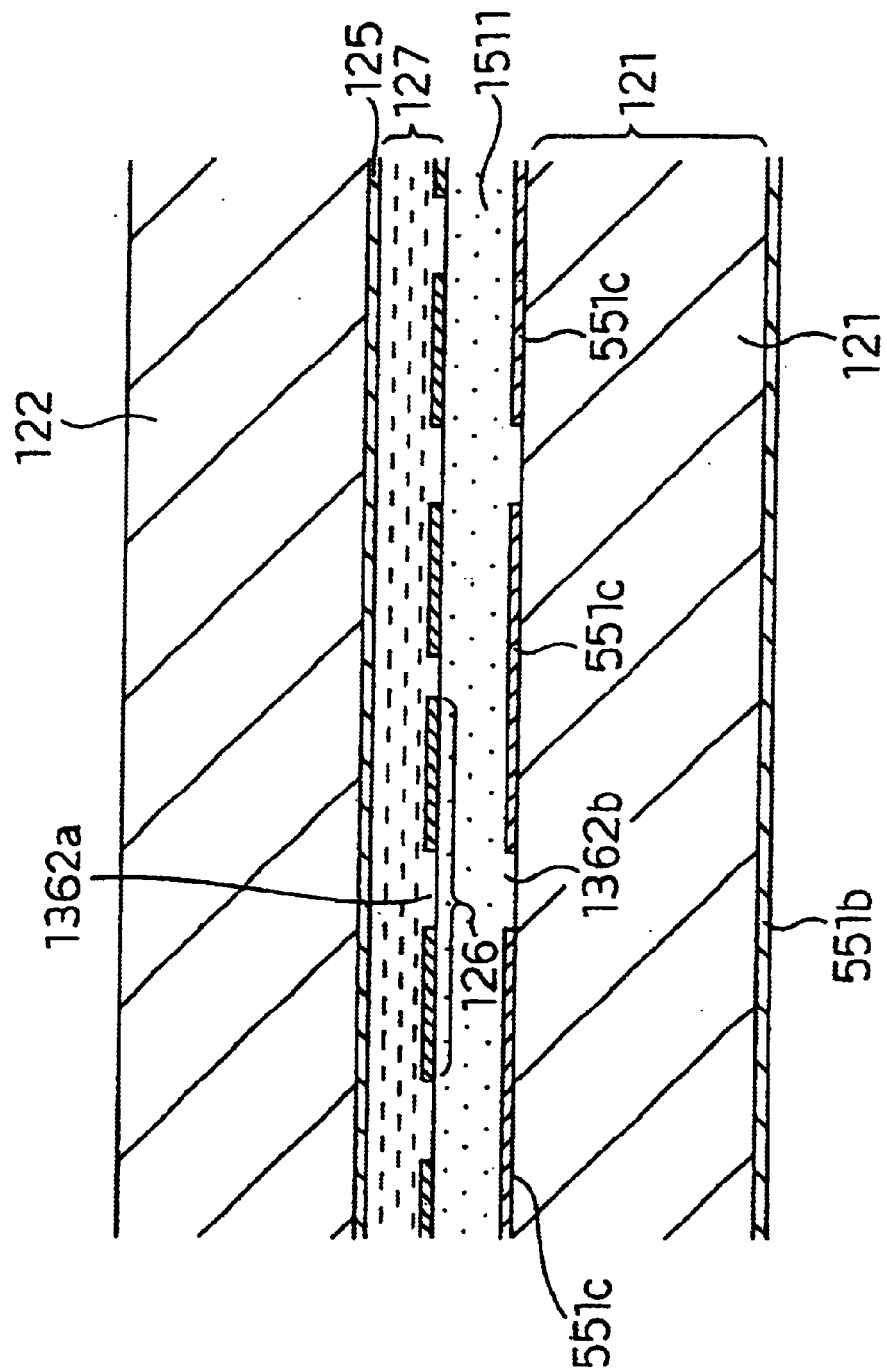

FIG. 161 is a diagram for explaining the display panel of the invention.

Figure 162:
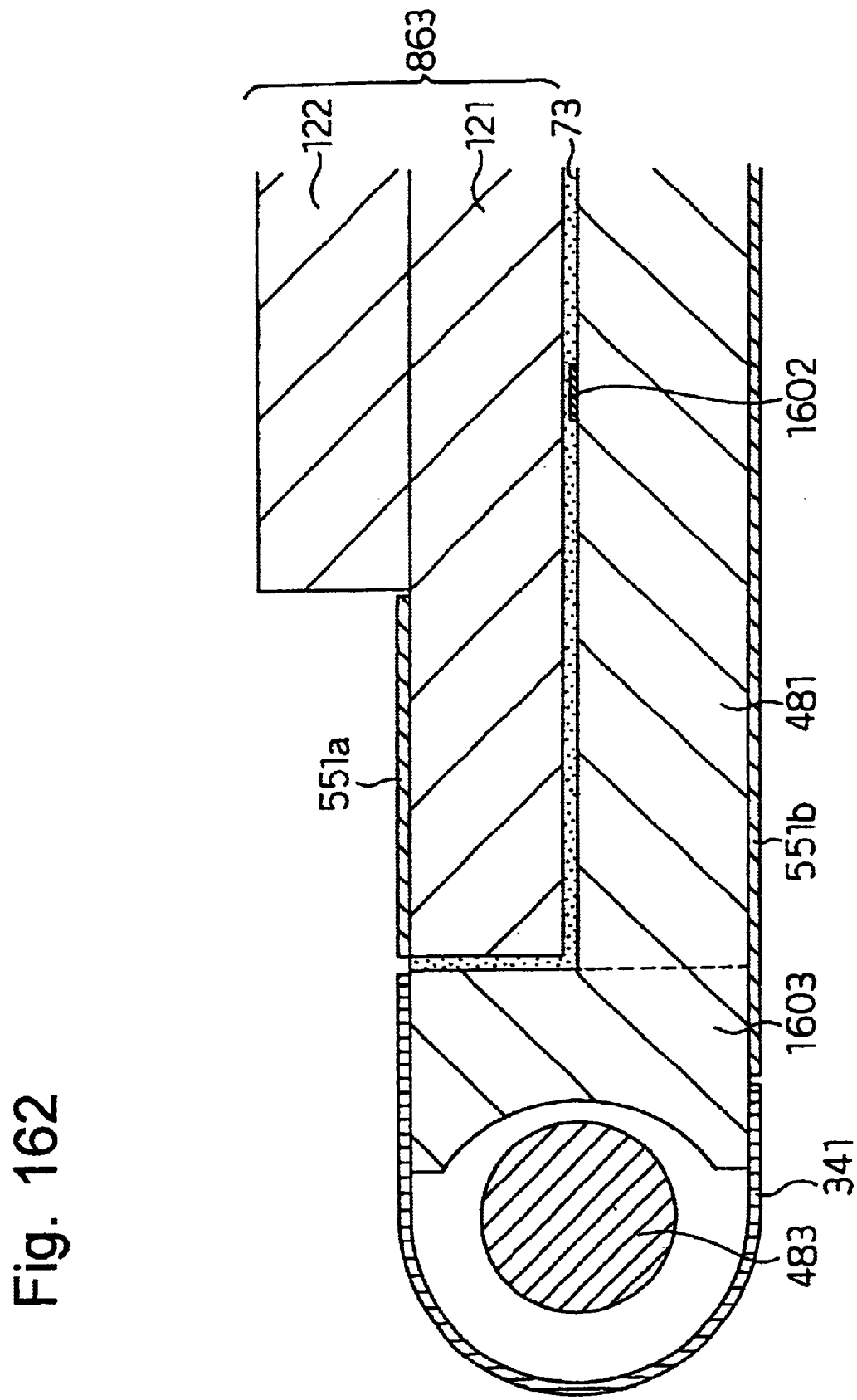

FIG. 162 is a diagram for explaining the video display apparatus of the invention.

Figure 163:
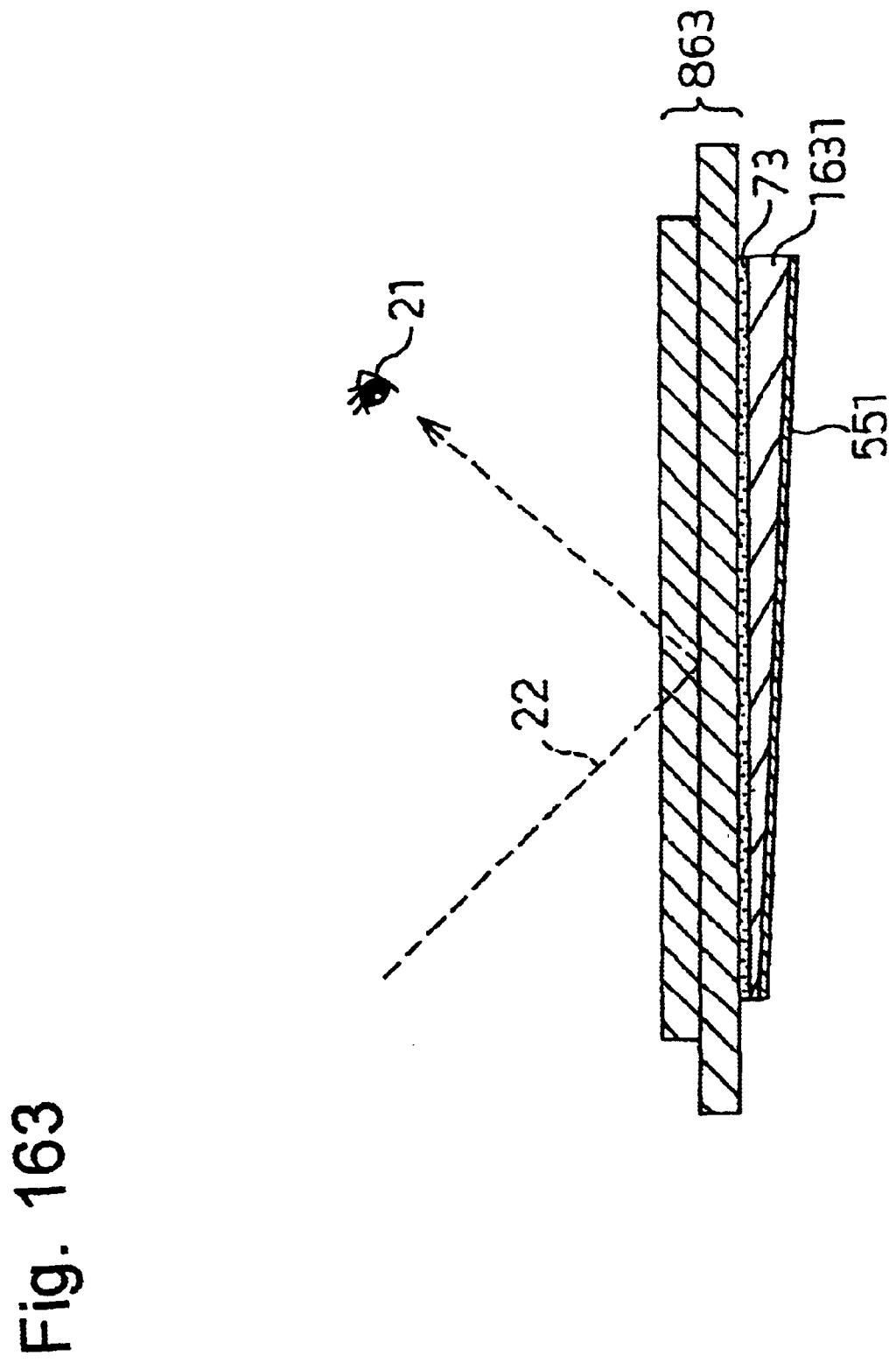

FIG. 163 is a diagram for explaining the display panel of the invention.

FIGS. 164A and 164B are perspective view and cross section of the display panel of the invention.

Figure 165:
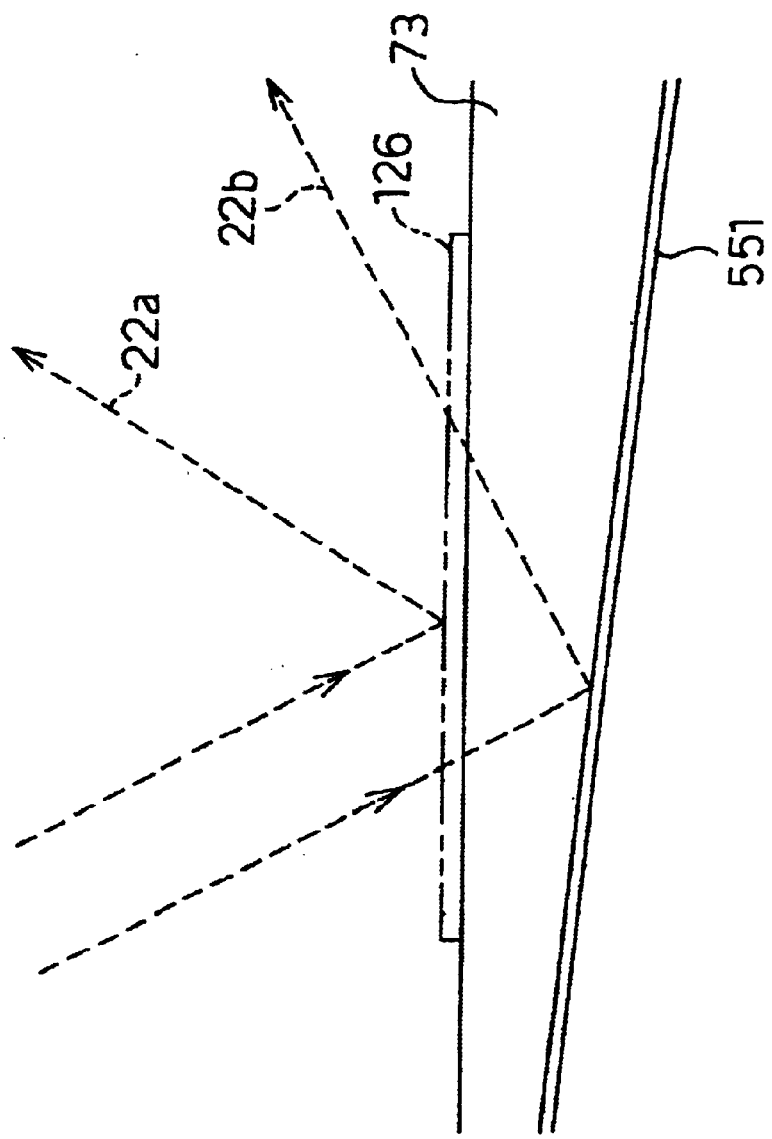

FIG. 165 is a diagram for explaining the display panel of the invention.

Figure 166:
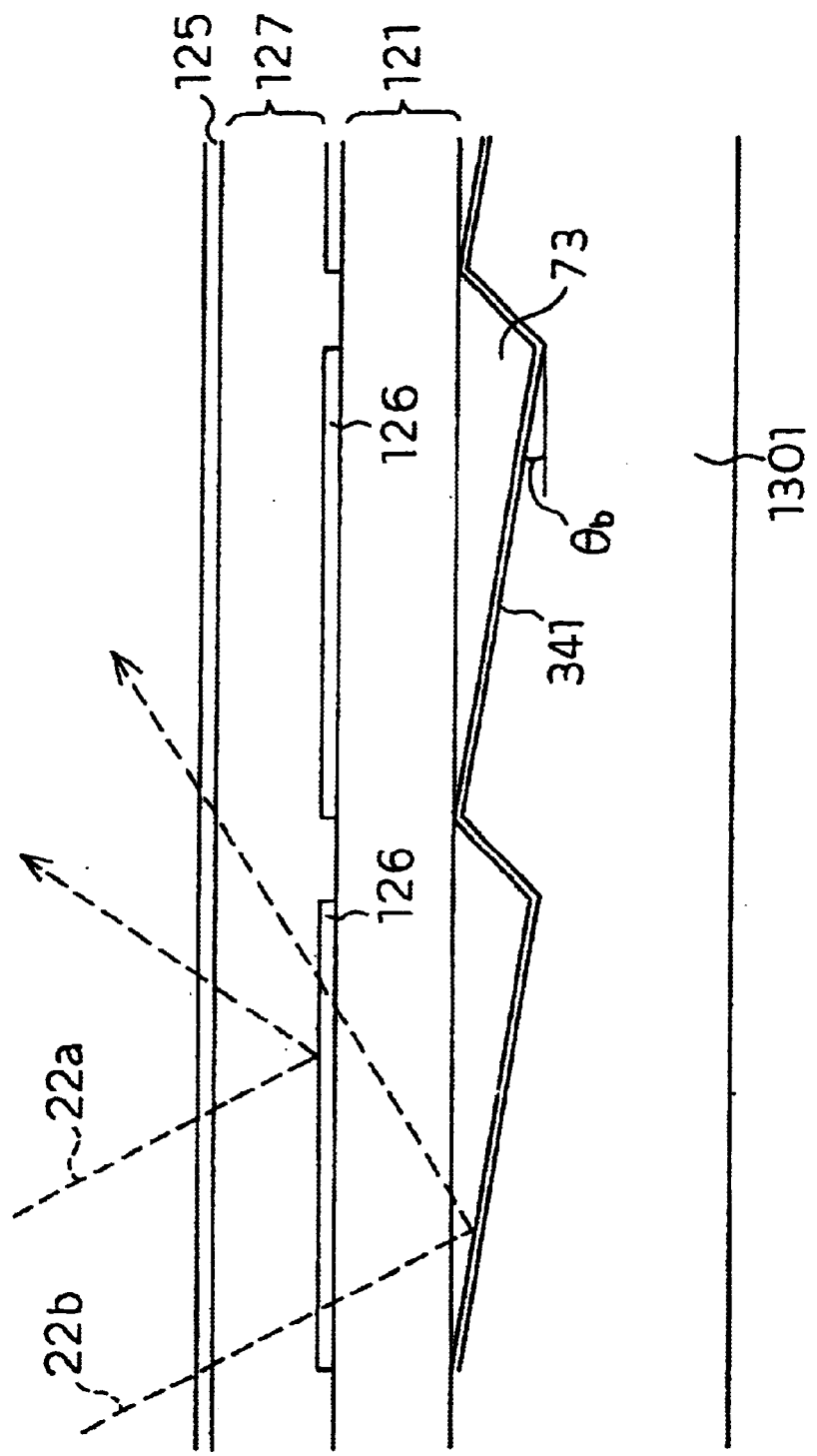

FIG. 166 is a diagram for explaining the display panel of the invention.

Figure 167A:
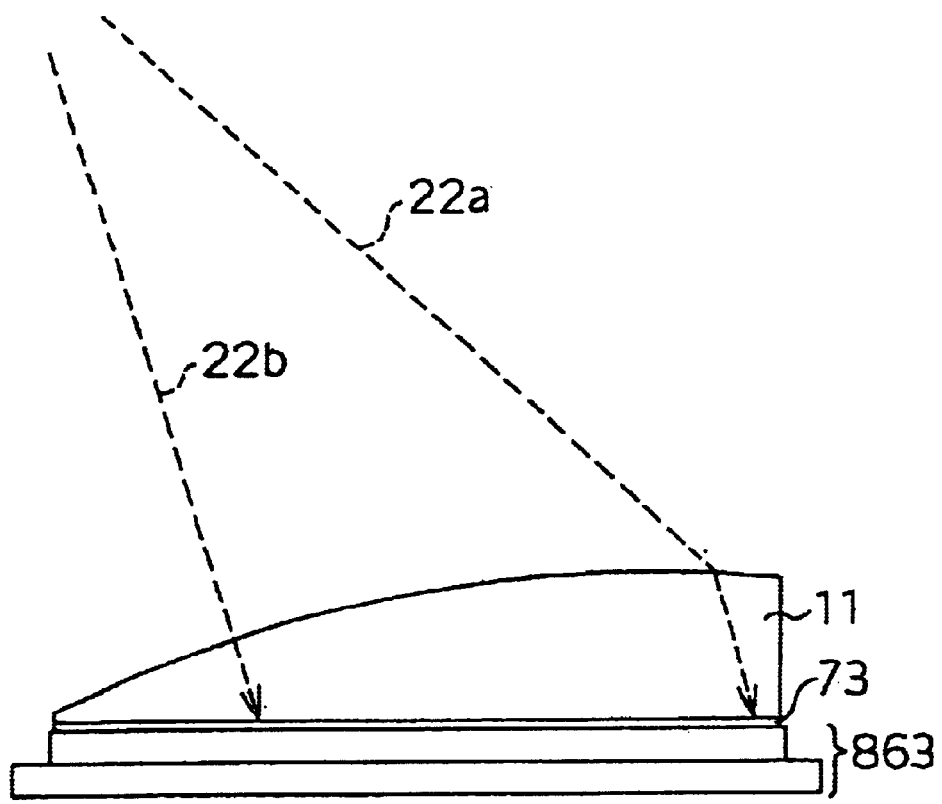
Figure 167B:
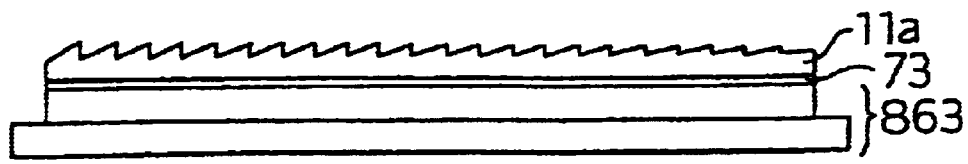
Figure 168A:
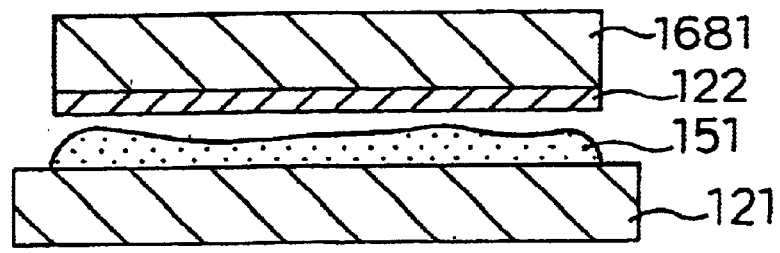
Figure 168B:
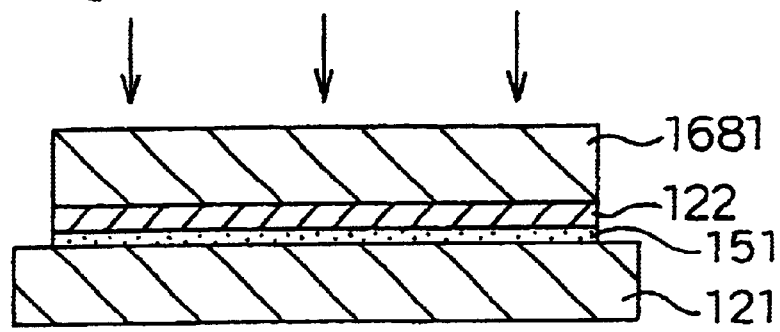
Figure 168C:
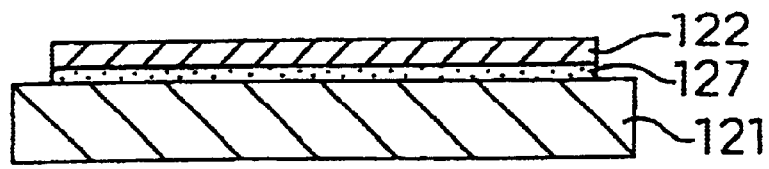
Figure 168D:
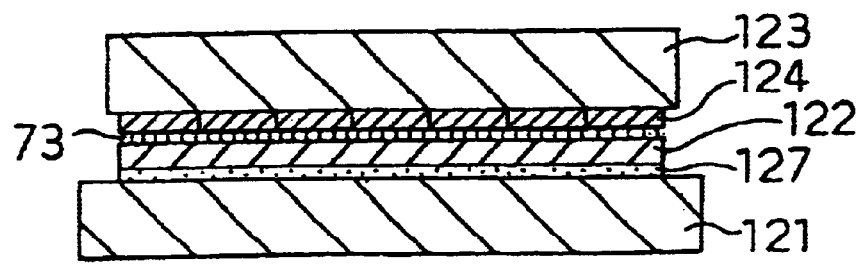

FIGS. 167A and 167B are diagrams for explaining the video display apparatus of the invention.

FIGS. 168A to 168D are diagrams for explaining the display panel of the invention.

FIGS. 169A and 169B are diagrams for explaining a method of manufacturing the display panel of the invention.

FIGS. 170A to 170E are diagrams for explaining a method of manufacturing the display panel of the invention.

Figure 171:
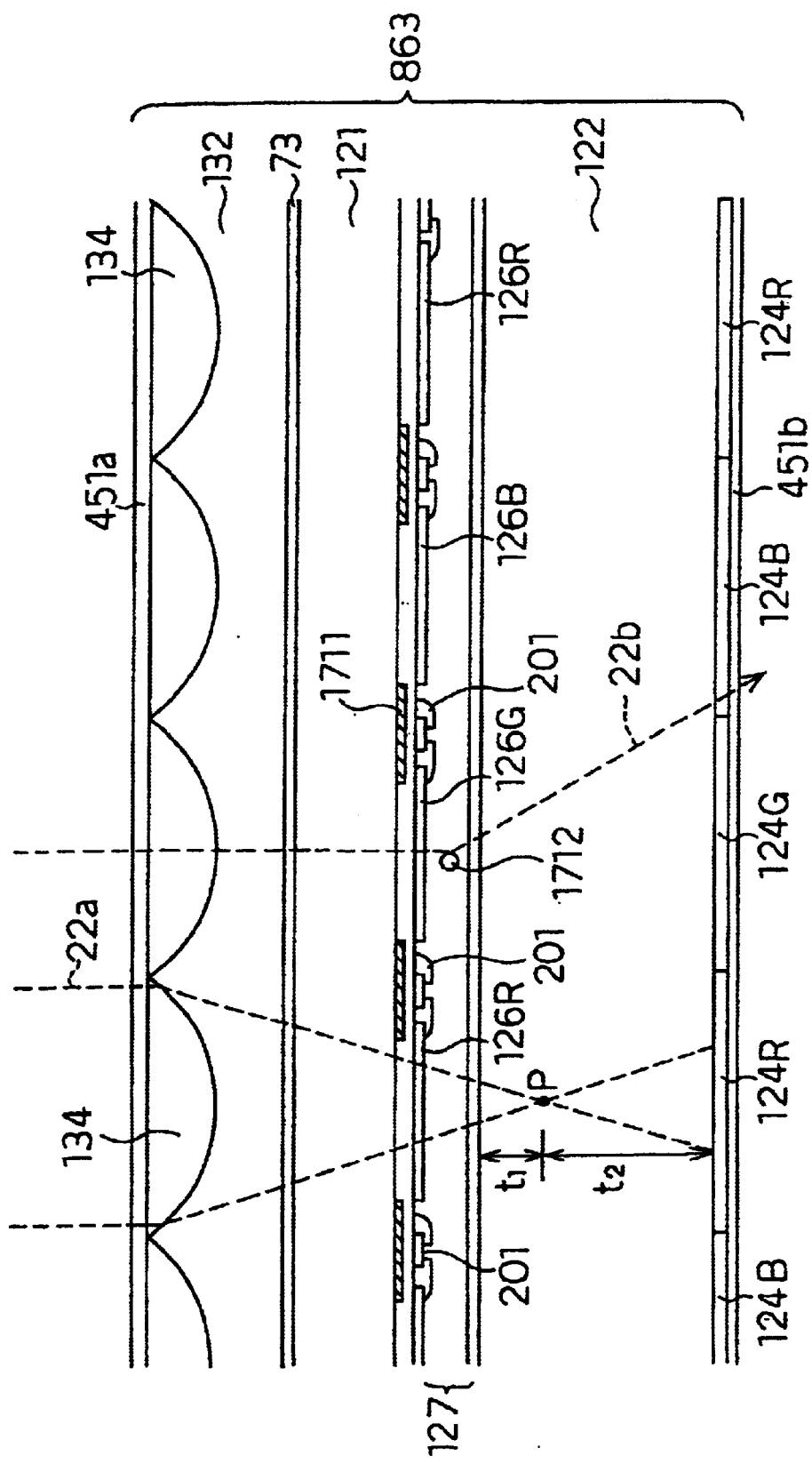

FIG. 171 is a diagram for explaining the display panel of the invention.

Figure 172:
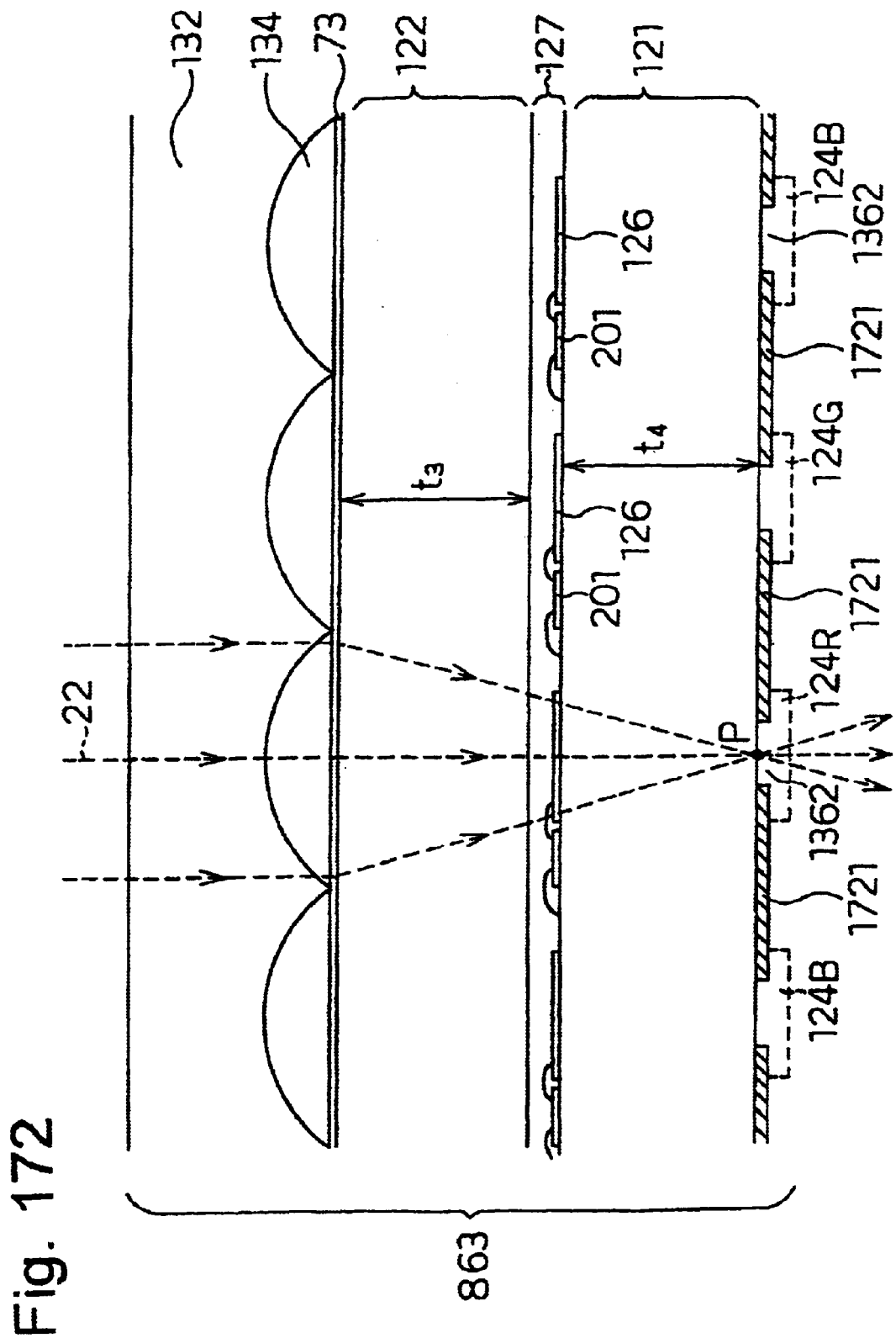

FIG. 172 is a diagram for explaining the display panel of the invention

Figure 173A:
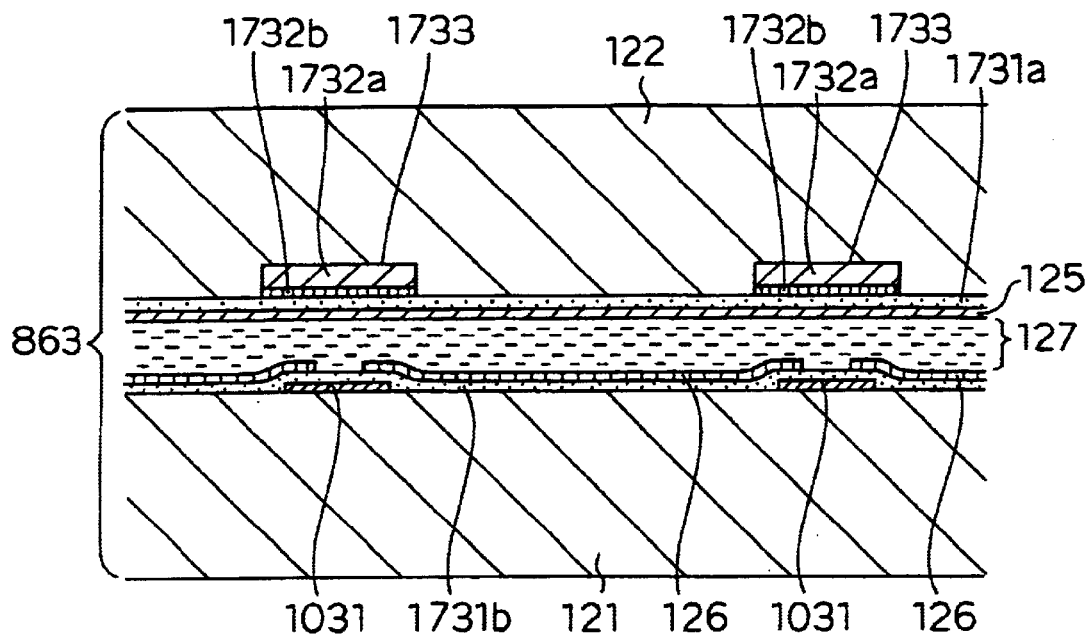
Figure 173B:
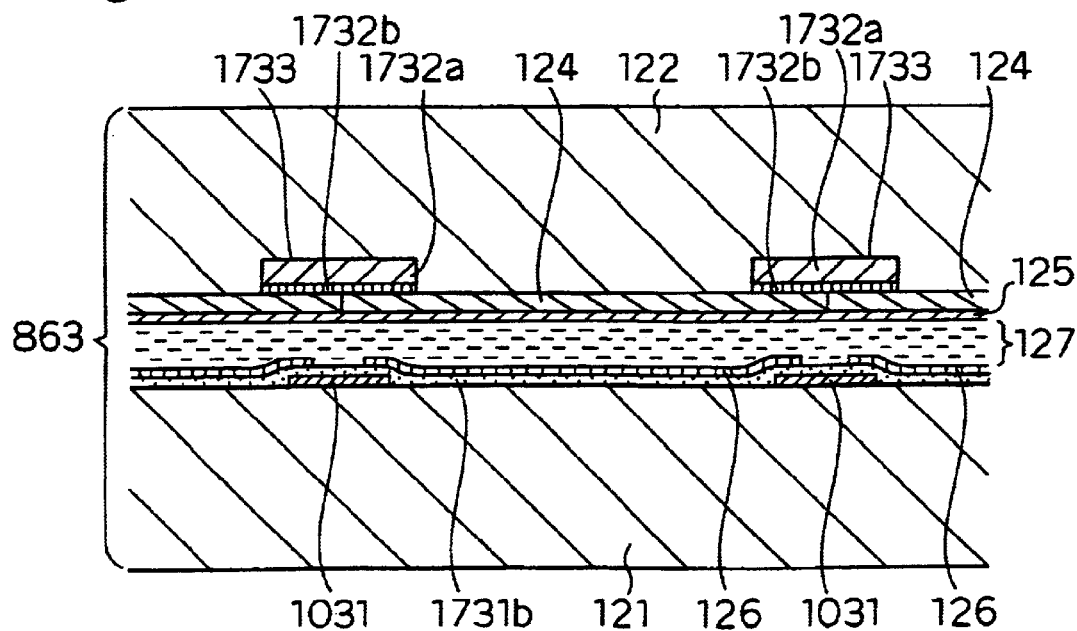

FIGS. 173A and 173B are diagrams for explaining the display panel of the invention.

Figure 174A:
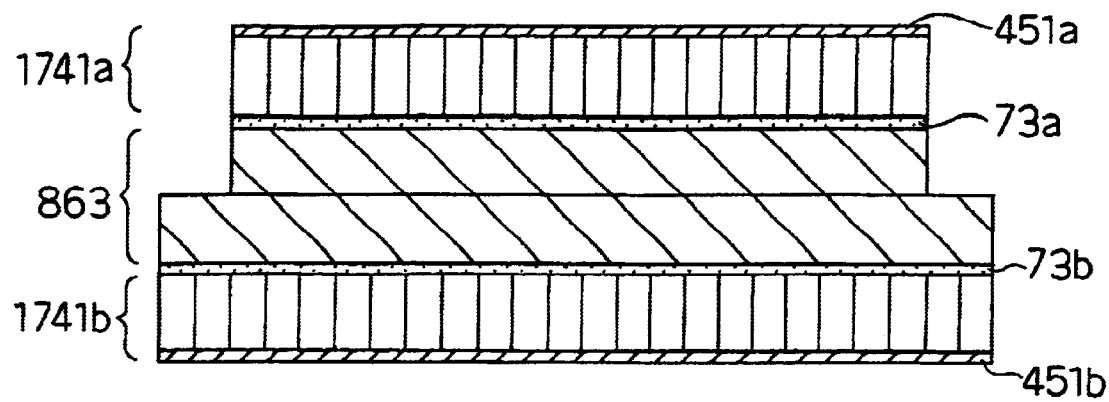
Figure 174B:
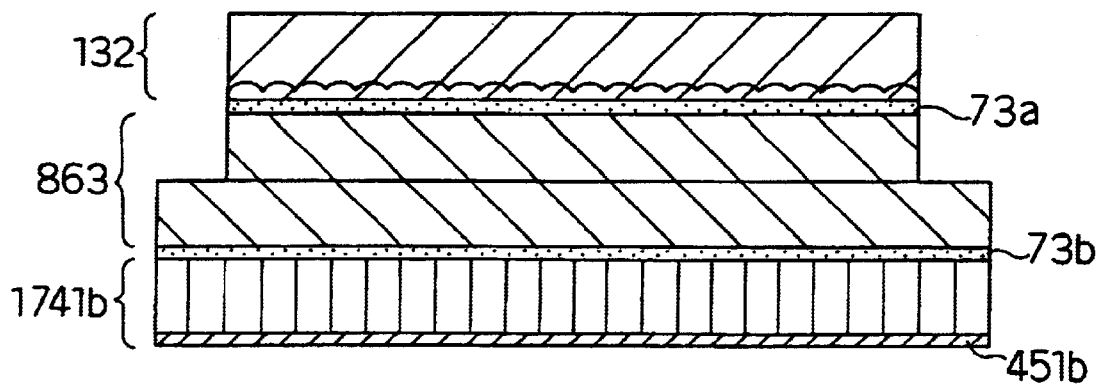
Figure 174C:
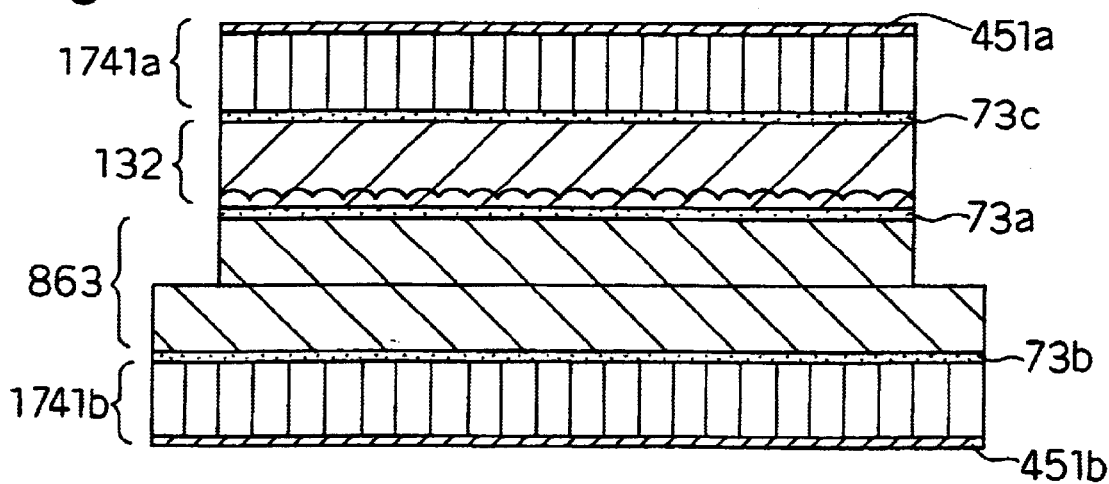

FIGS. 174A to 174C are diagrams for explaining the display panel of the invention.

Figure 175:
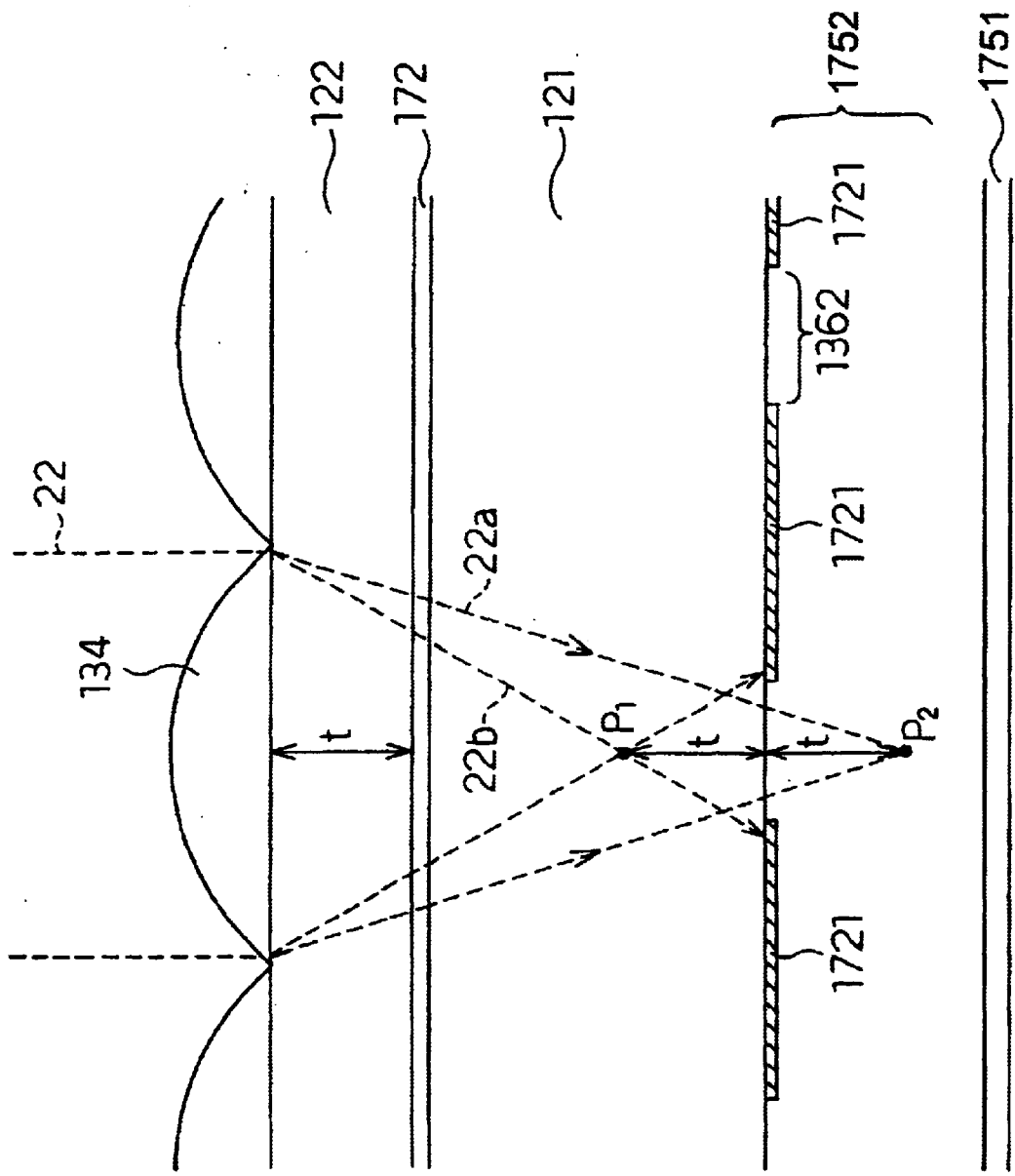

FIG. 175 is a diagram for explaining the display panel of the invention.

Figure 176:
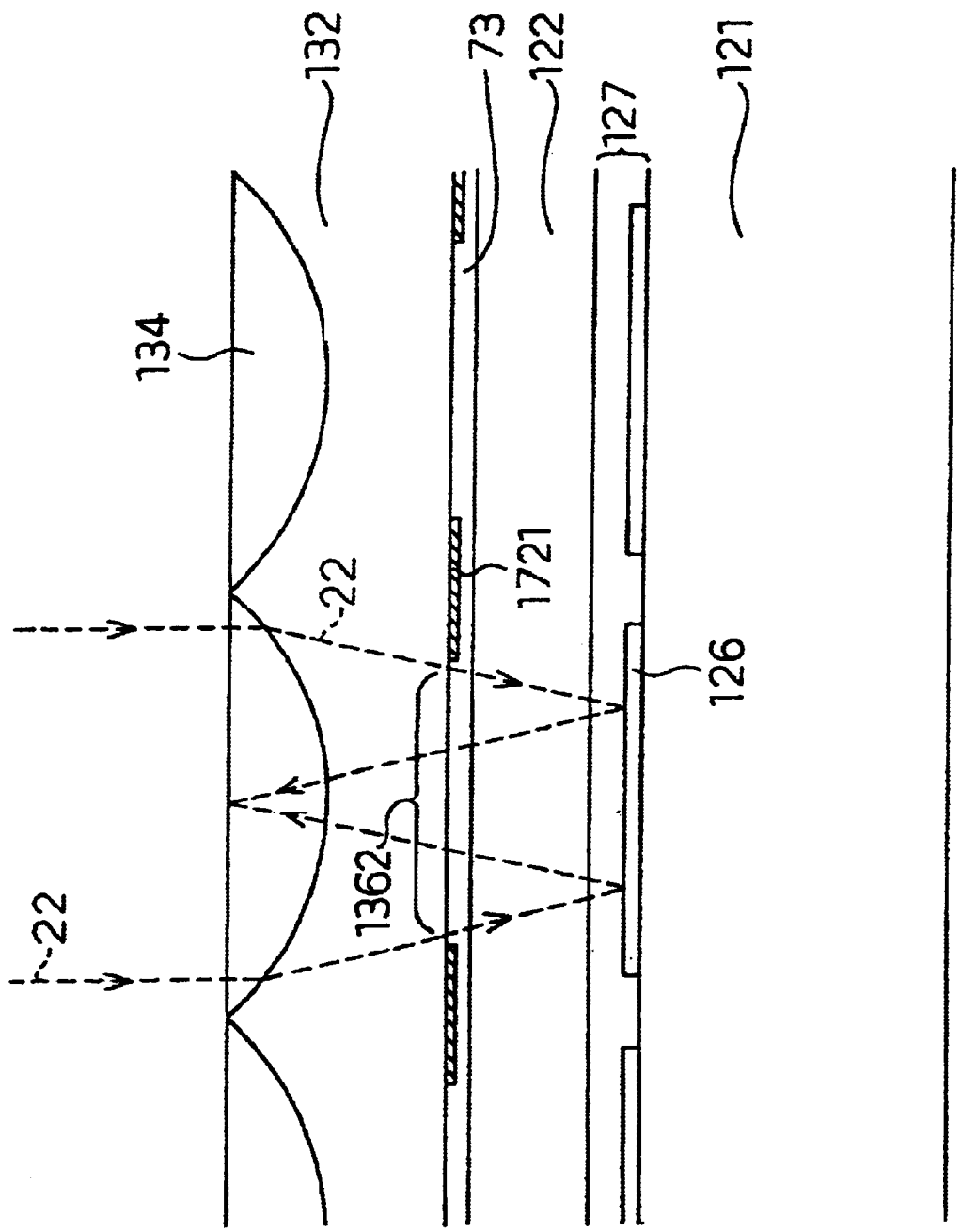

FIG. 176 is a diagram for explaining the display panel of the invention.

Figure 177:
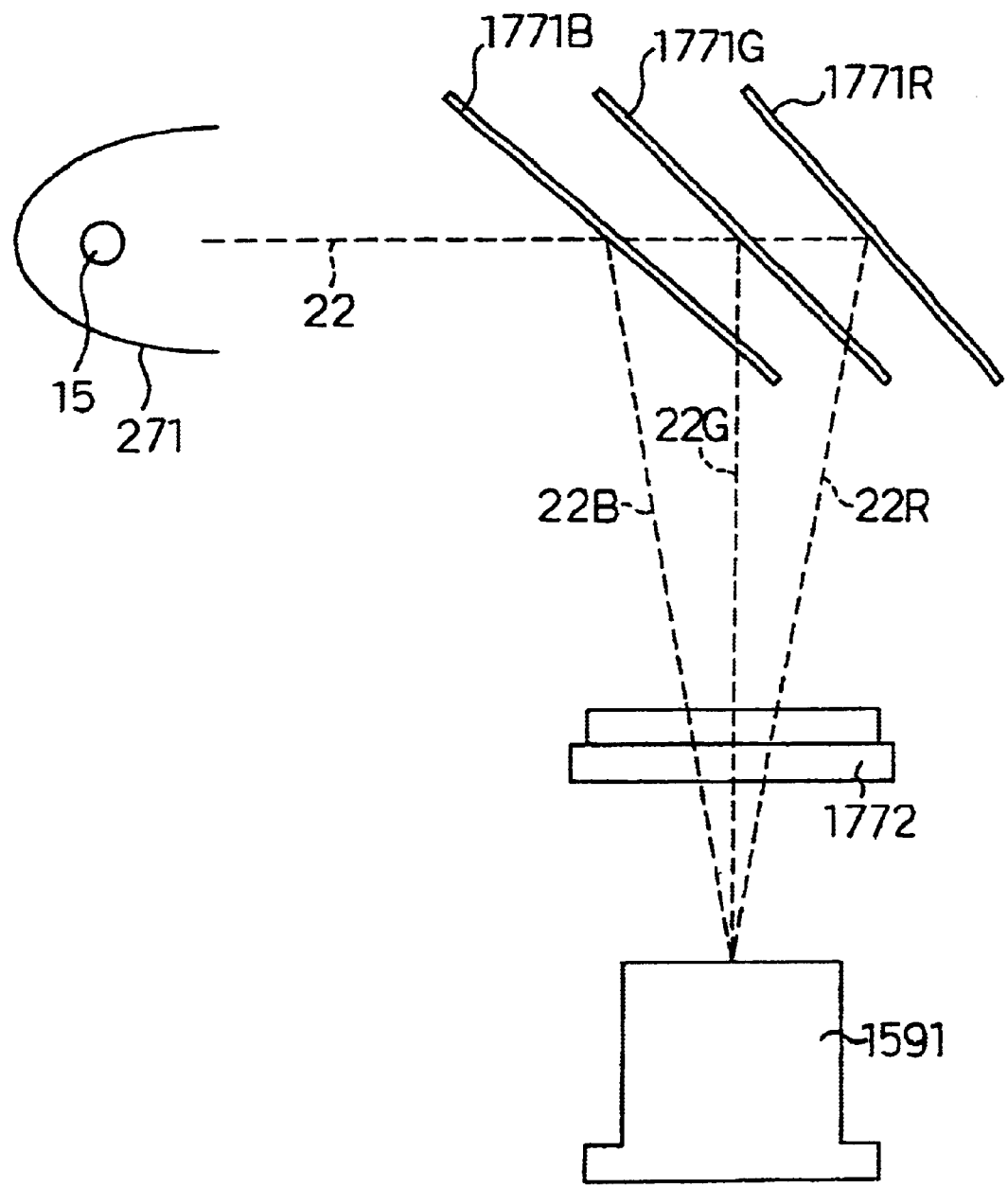

FIG. 177 is a diagram for explaining a projection type display apparatus of the invention.

Figure 178:
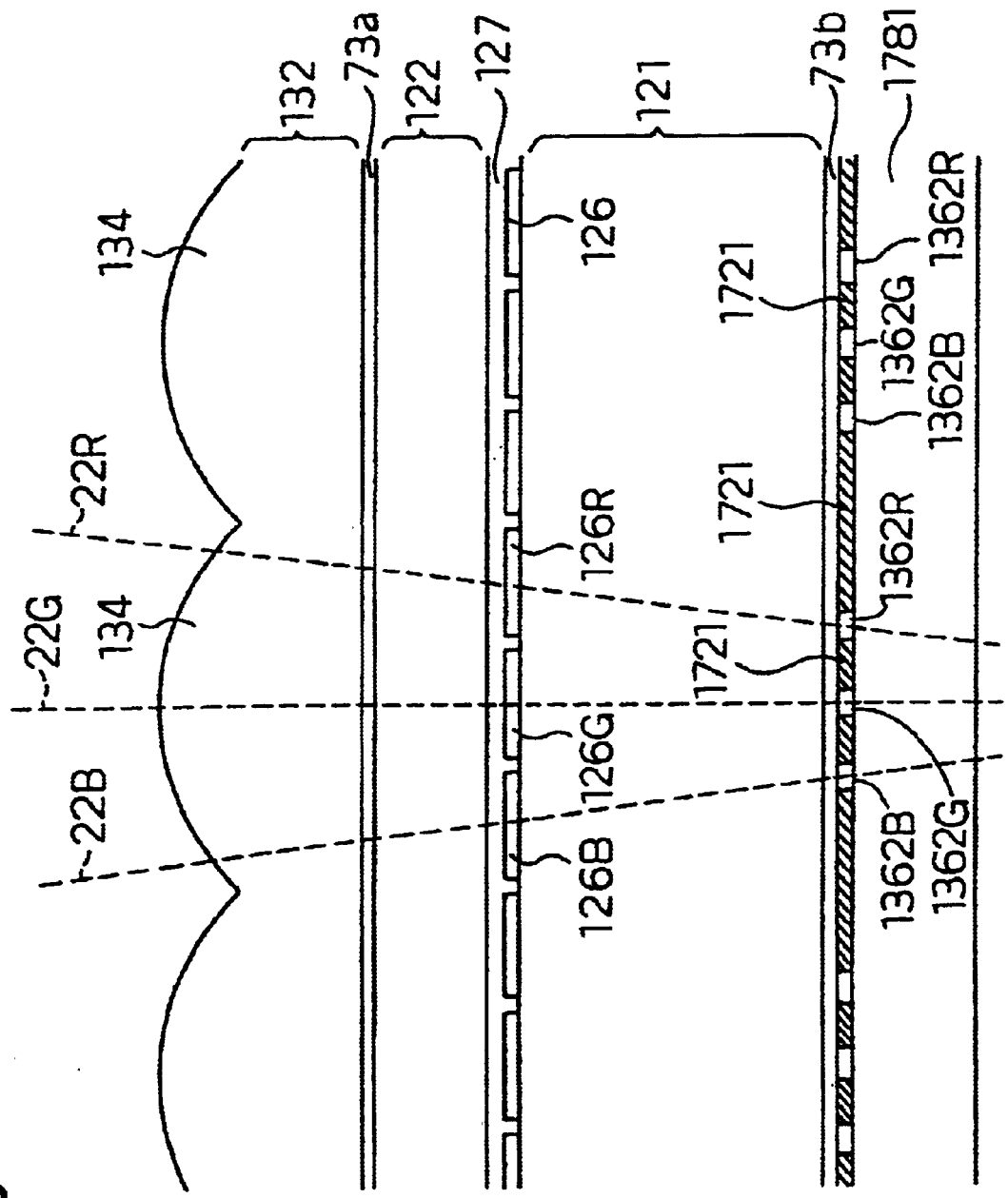

FIG. 178 is a diagram for explaining the display panel of the invention.

Figure 179A:
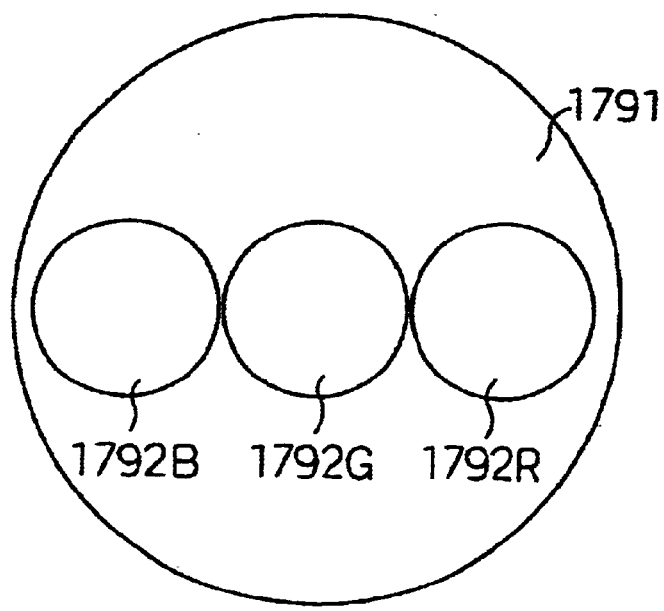
Figure 179B:
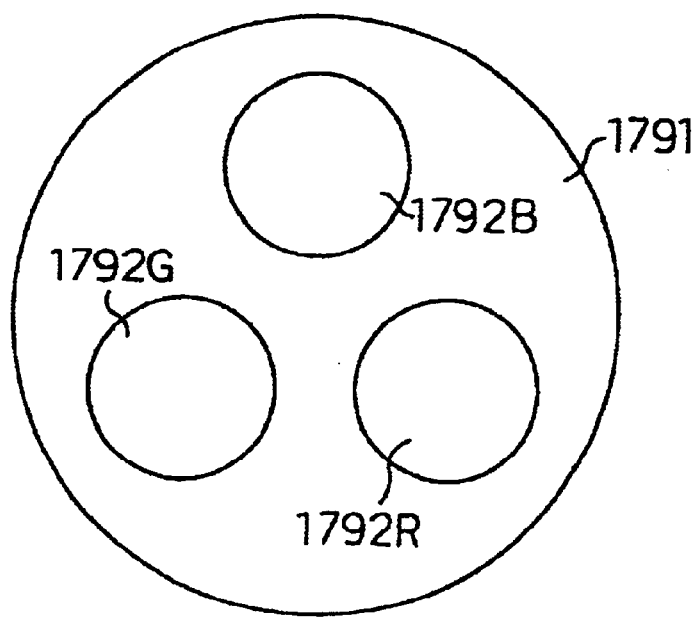

FIGS. 179A and 179B are diagrams for explaining the projection type display apparatus of the invention.

Figure 180:
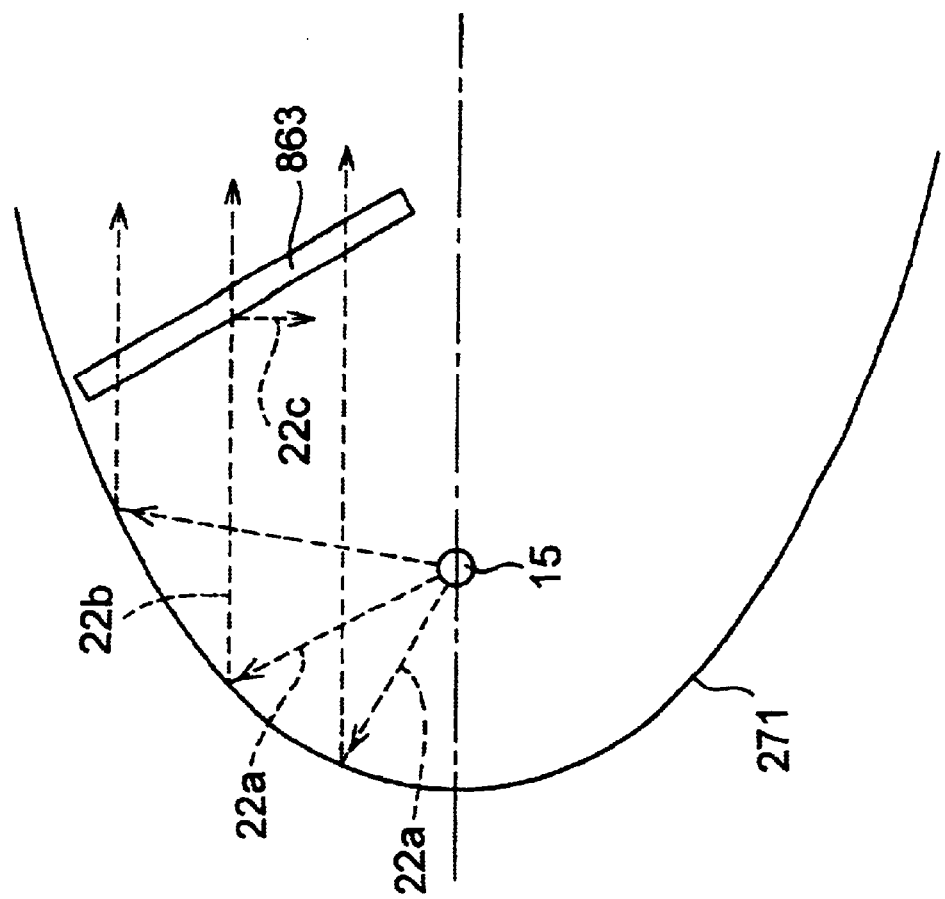

FIG. 180 is a diagram for explaining the video display apparatus of the invention.

Figure 181:
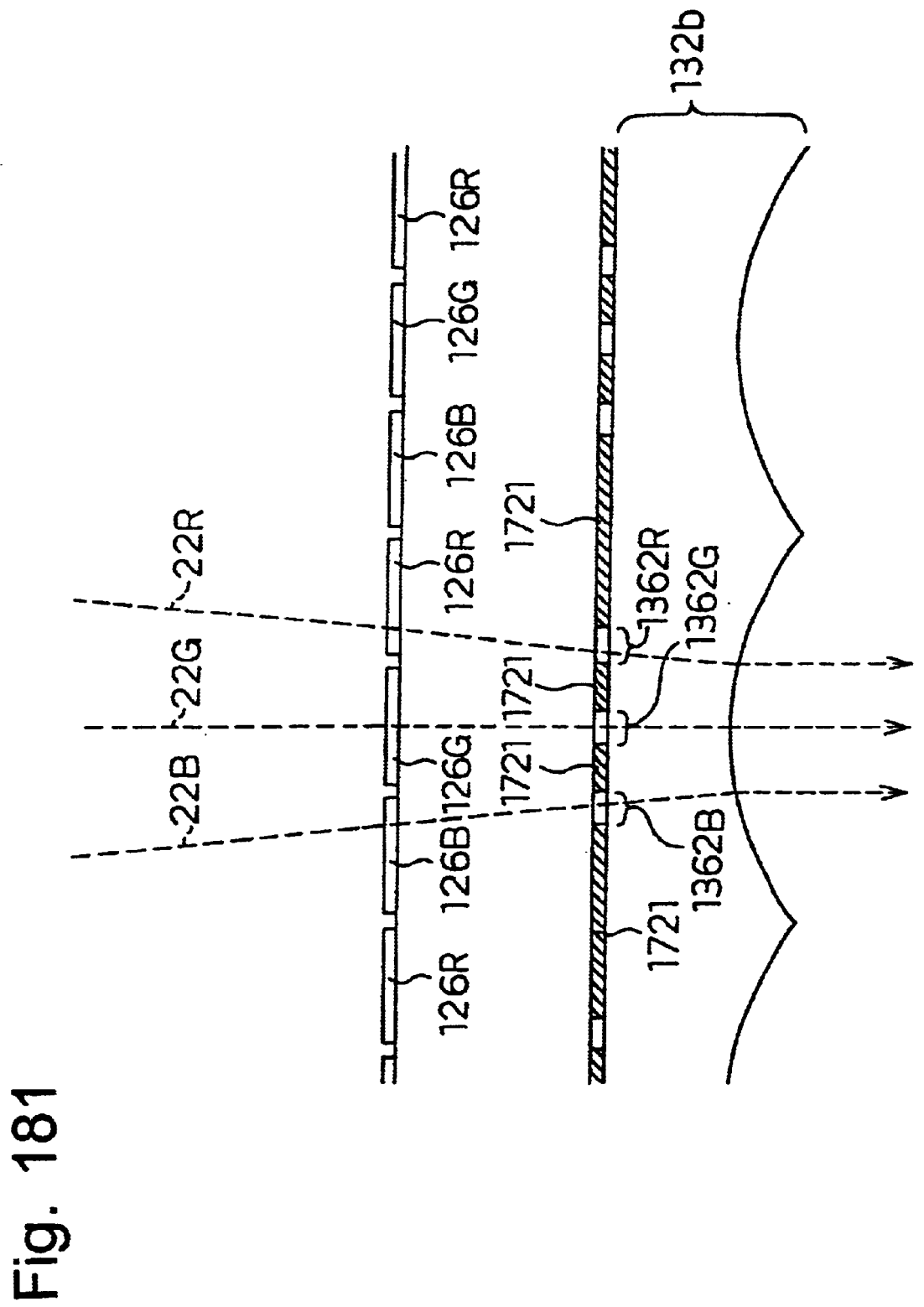

FIG. 181 is a diagram for explaining the display panel of the invention.

Figure 182:
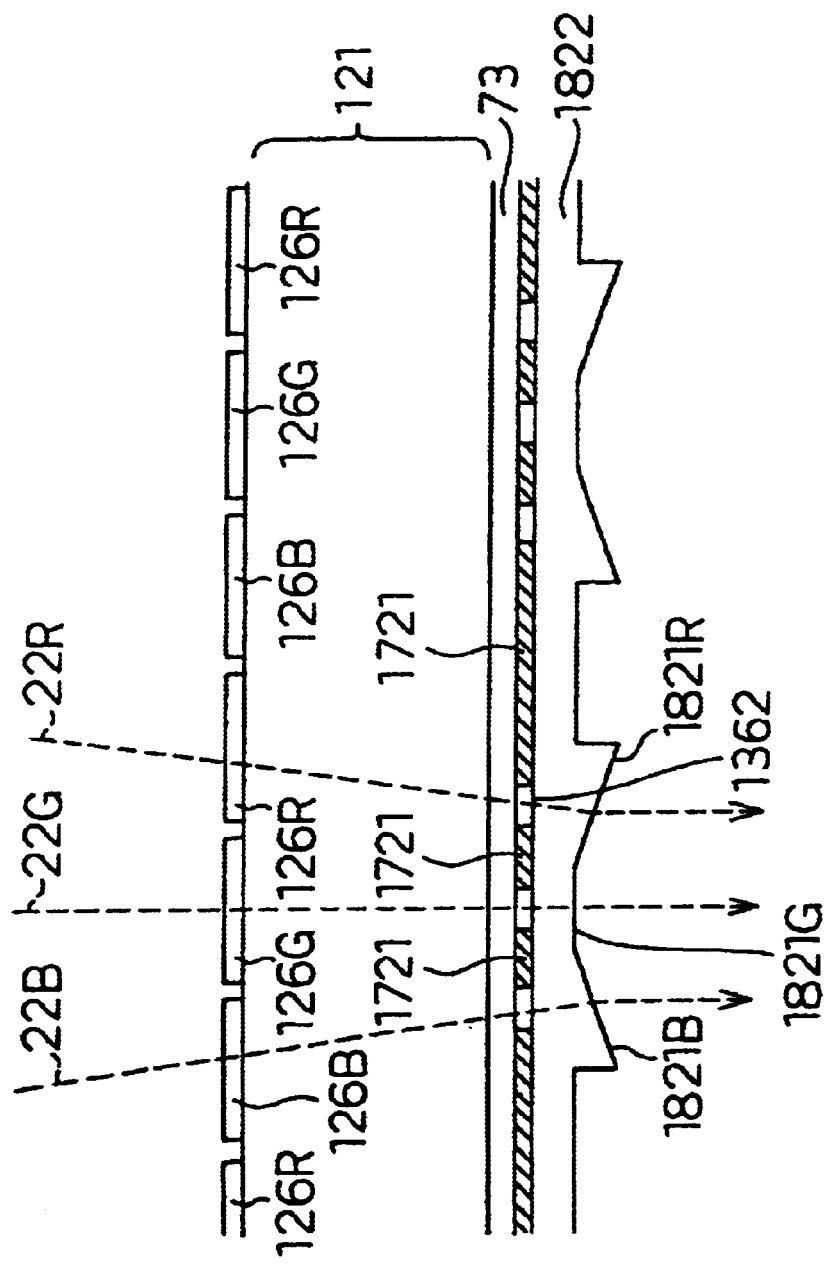

FIG. 182 is a diagram for explaining the display panel of the invention.

Figure 183:
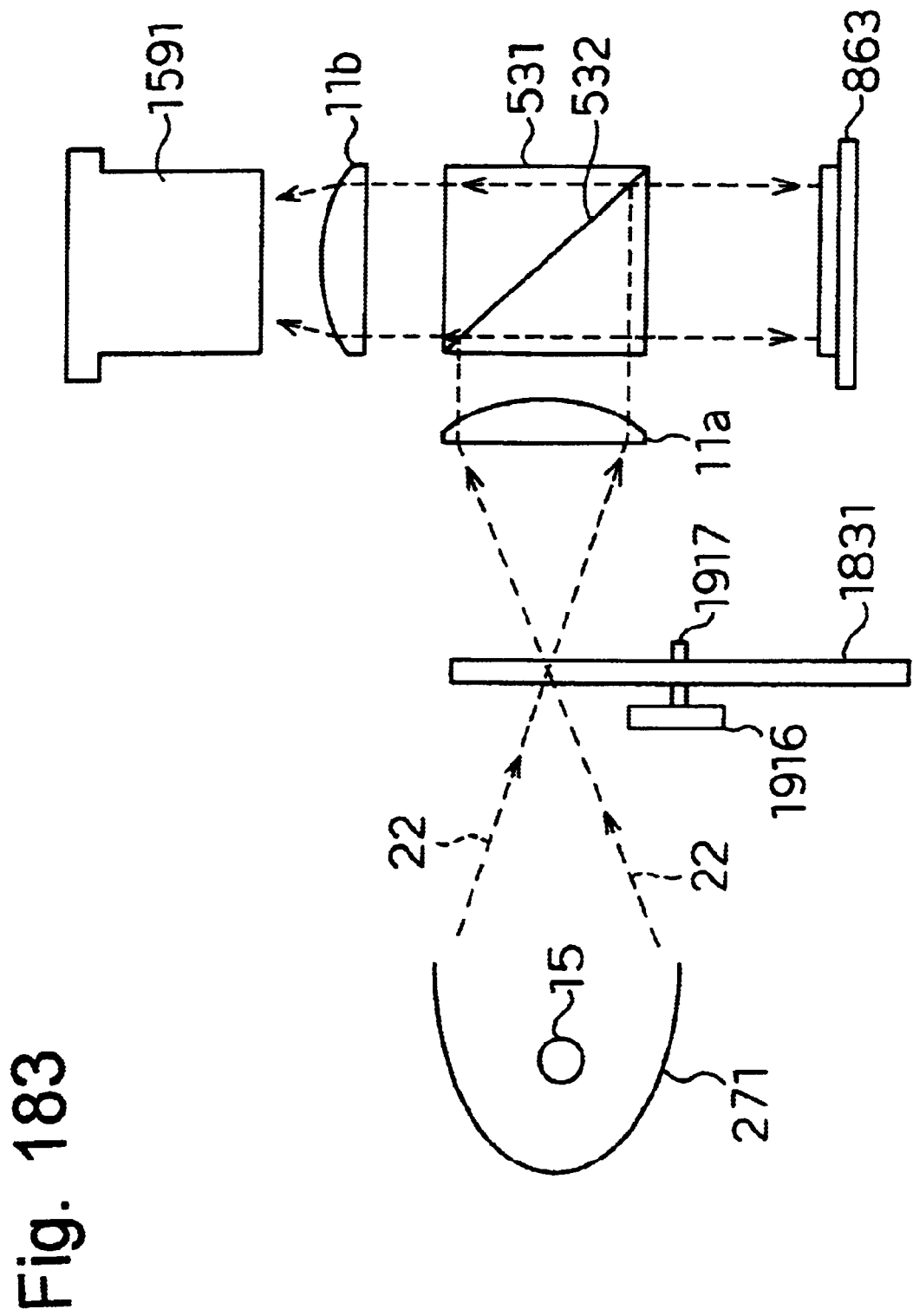

FIG. 183 shows the configuration of the projection type display apparatus of the invention.

Figure 184:
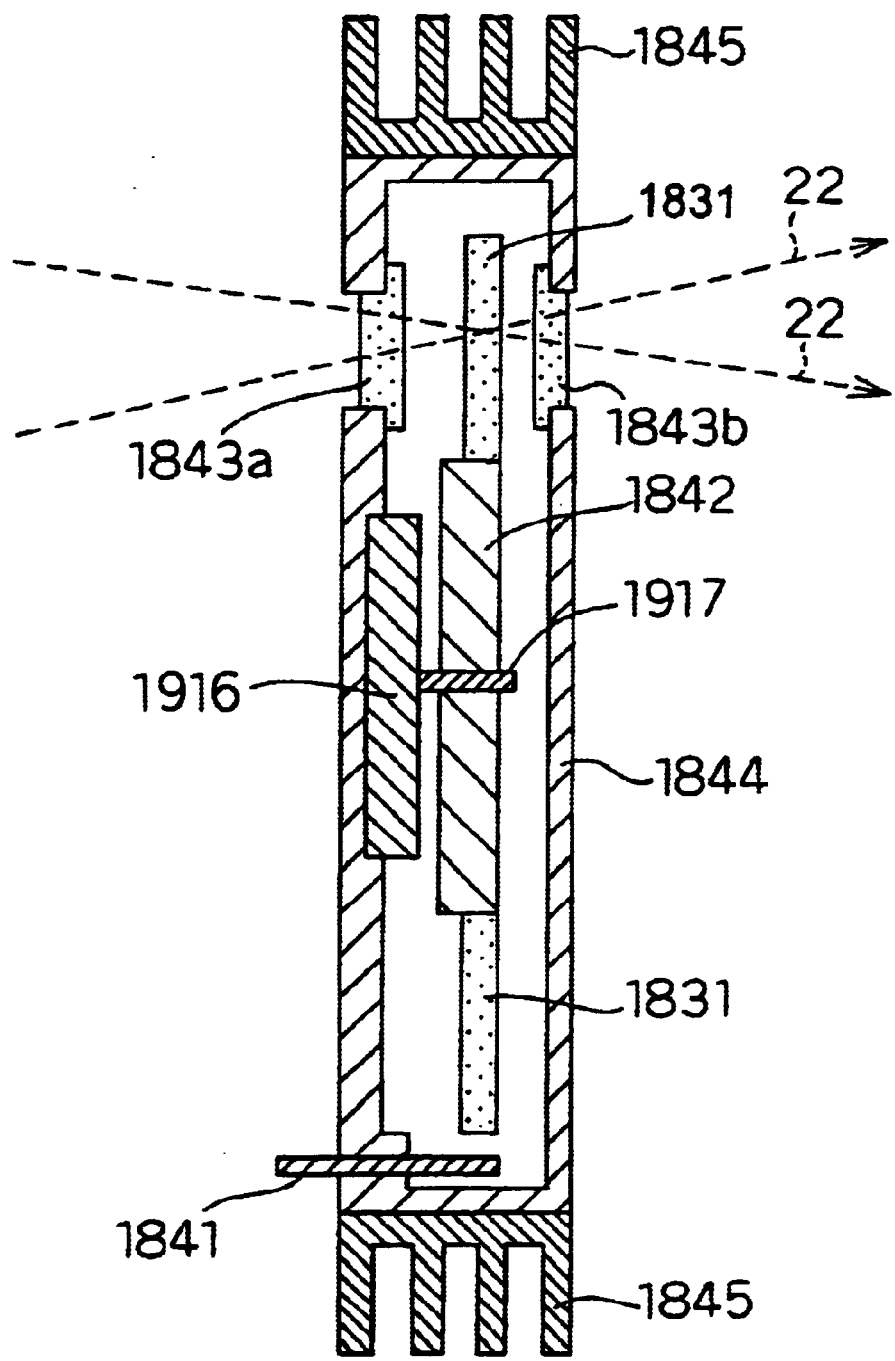

FIG. 184 is a diagram for explaining the projection type display apparatus of the invention.

Figure 185:
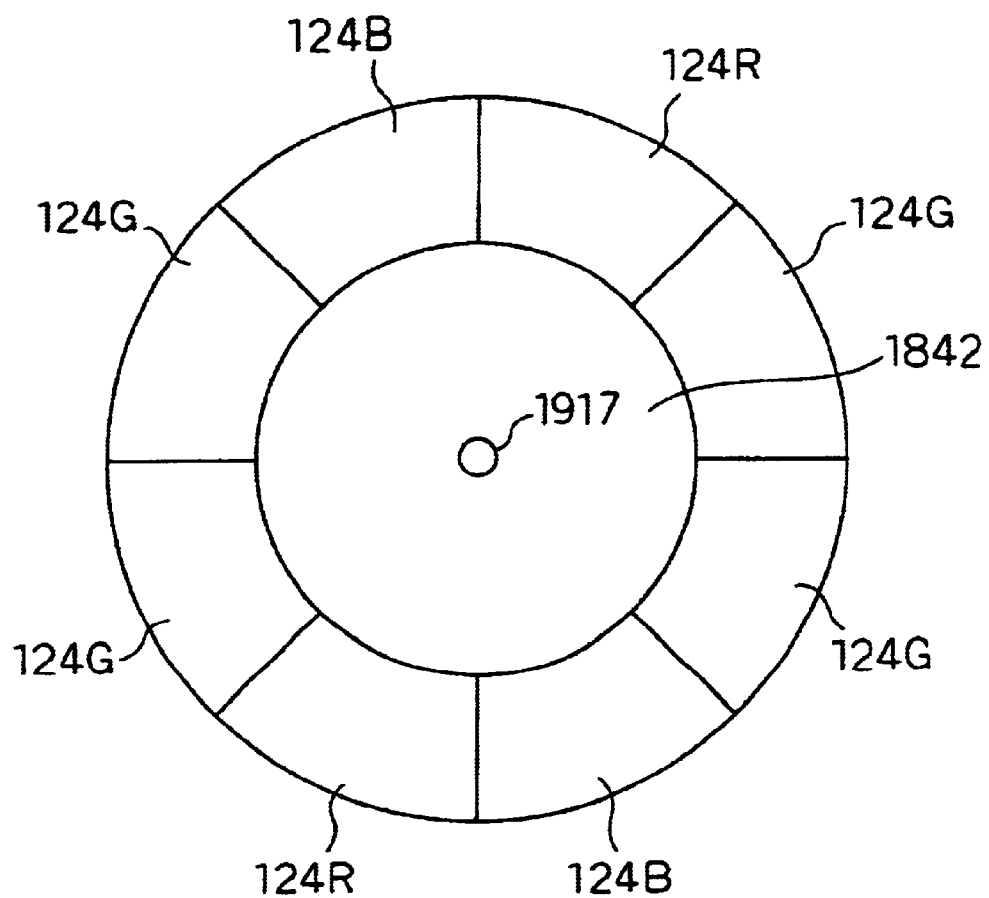

FIG. 185 is a diagram for explaining the projection type display apparatus of the invention.

Figure 186:
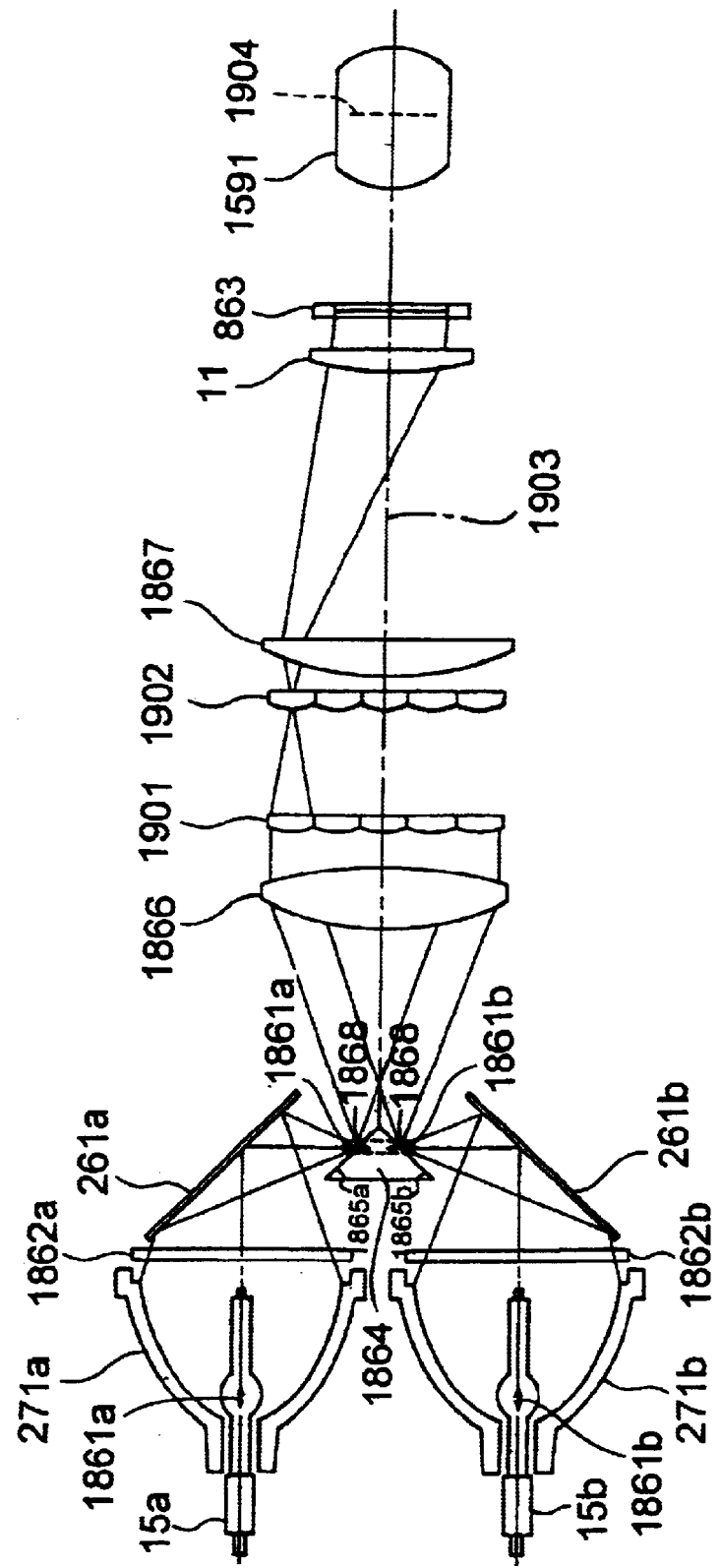

FIG. 186 shows the configuration of the projection type display apparatus of the invention.

Figure 187:
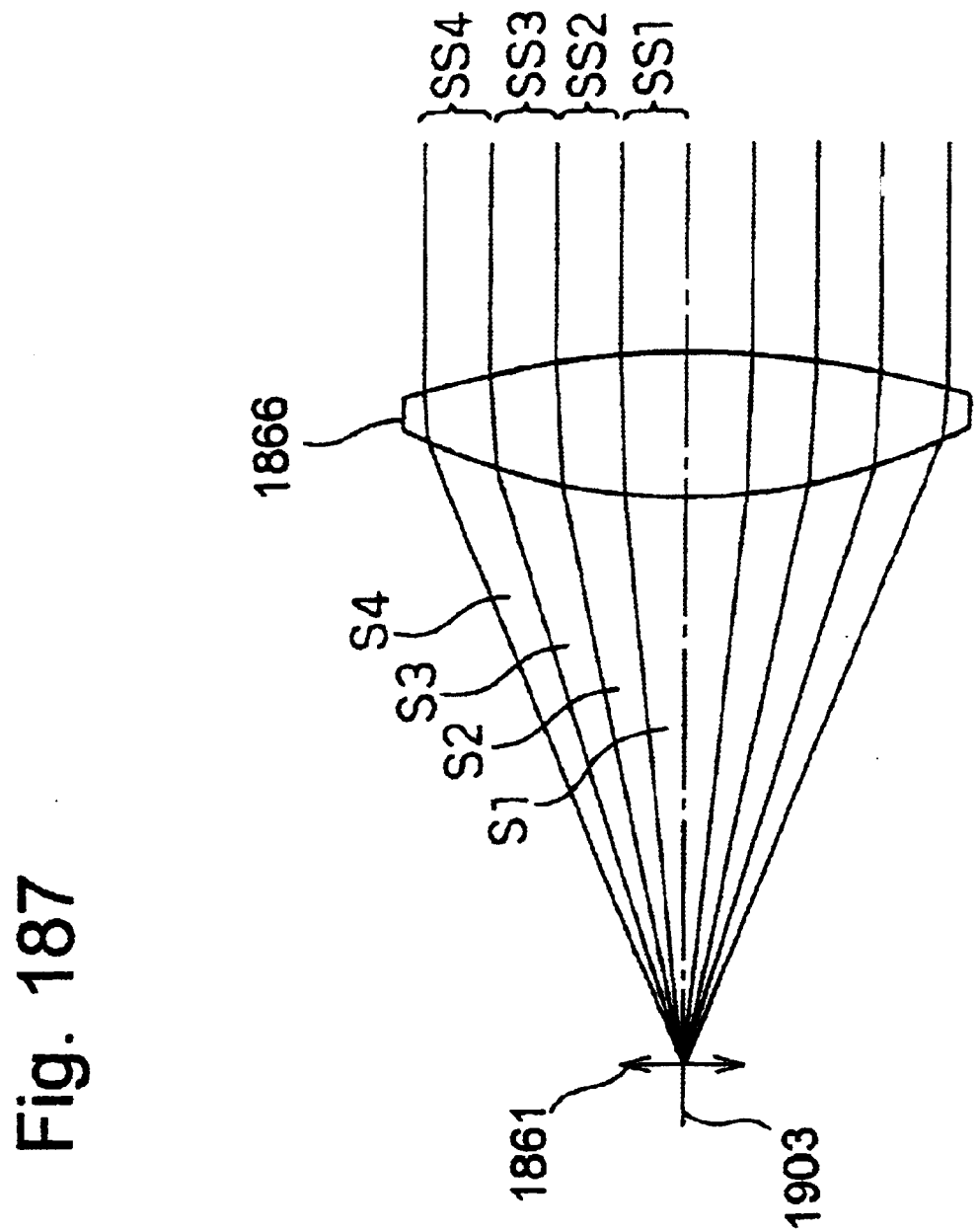

FIG. 187 is a diagram for explaining the projection type display apparatus of the invention.

FIGS. 188A to 188C are diagrams for explaining the projection type display apparatus of the invention.

Figure 189:
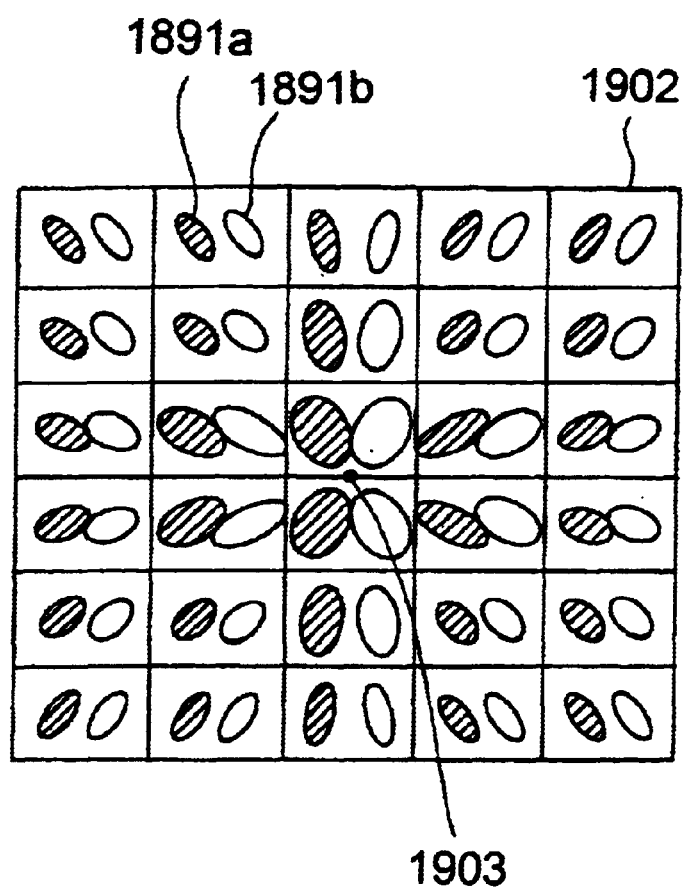

FIG. 189 is a diagram for explaining the projection type display apparatus of the invention.

Figure 190:
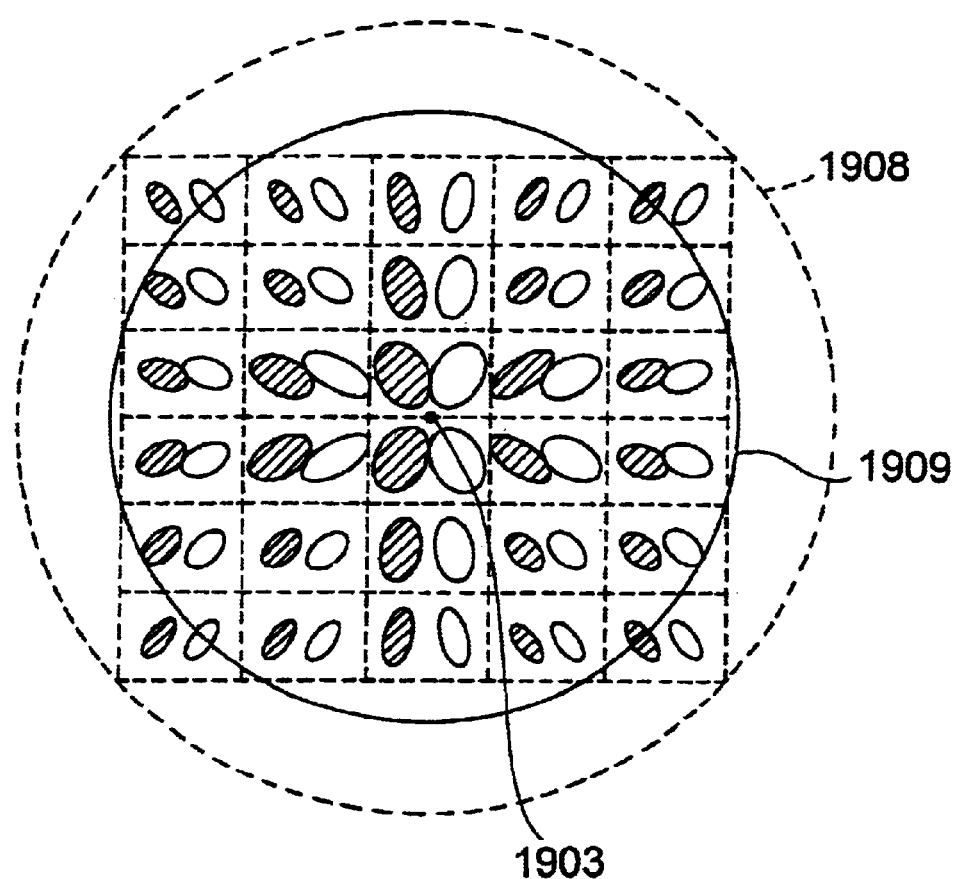

FIG. 190 is a diagram for explaining the projection type display apparatus of the invention.

Figure 191:
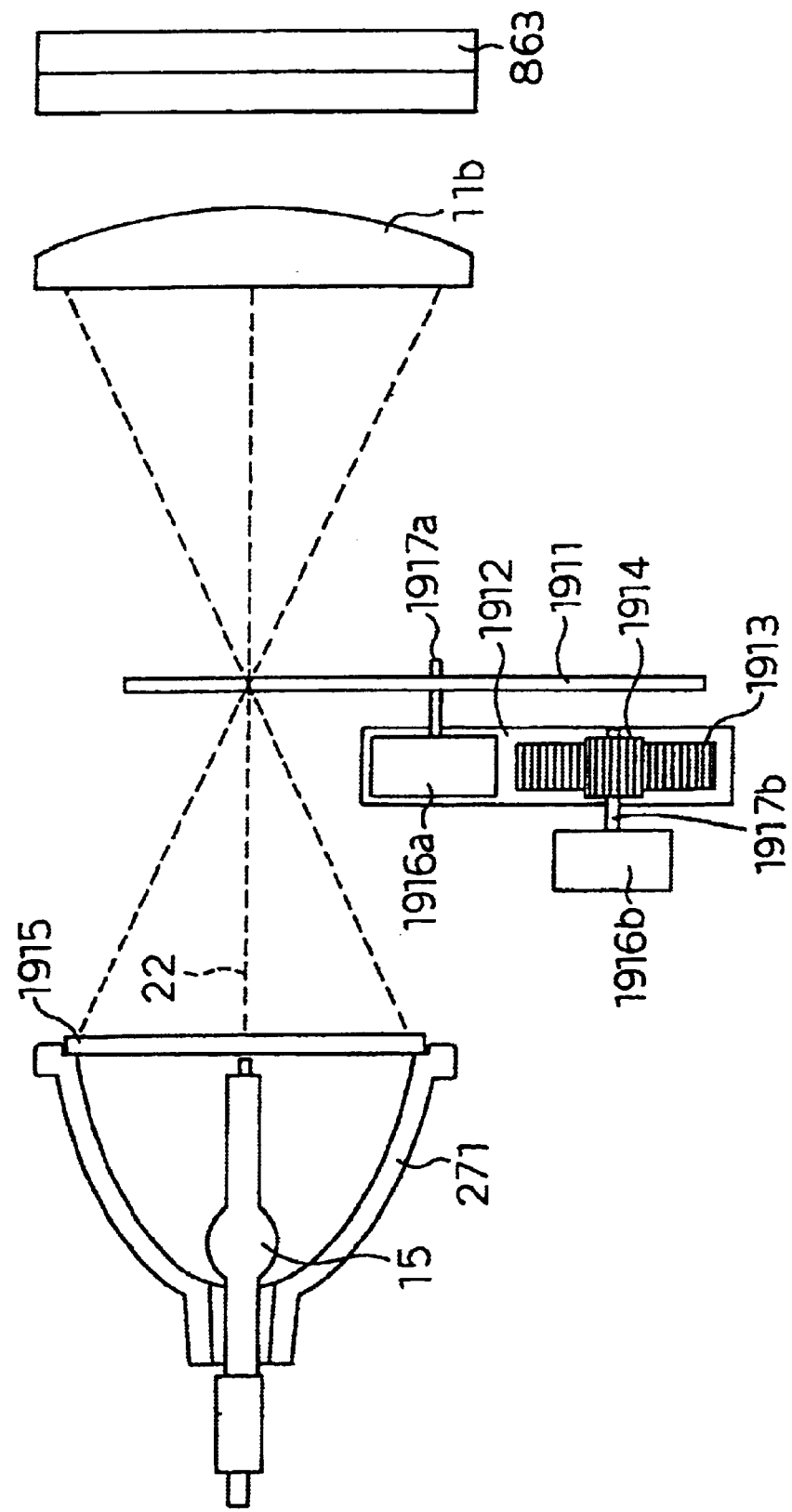

FIG. 191 is a diagram for explaining the projection type display apparatus of the invention.

Figure 192:
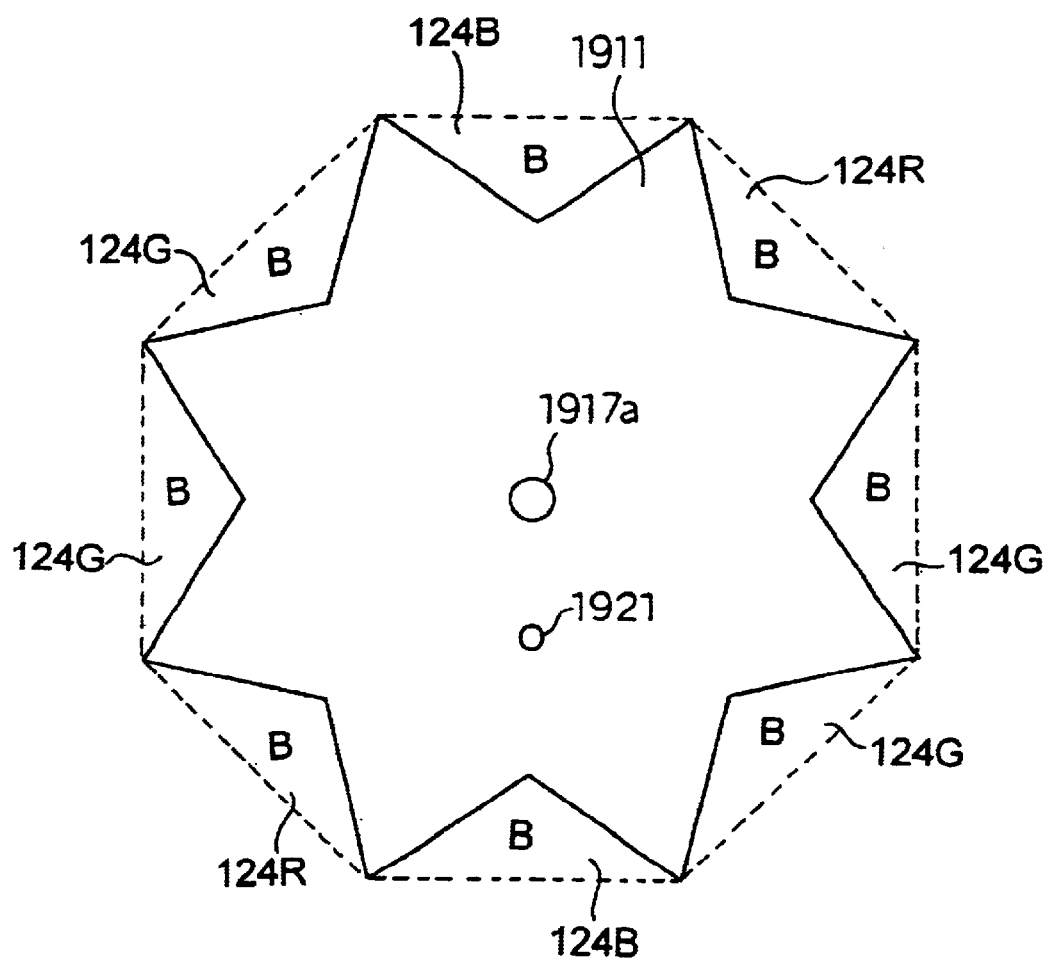

FIG. 192 is a diagram for explaining the projection type display apparatus of the invention.

Figure 193:
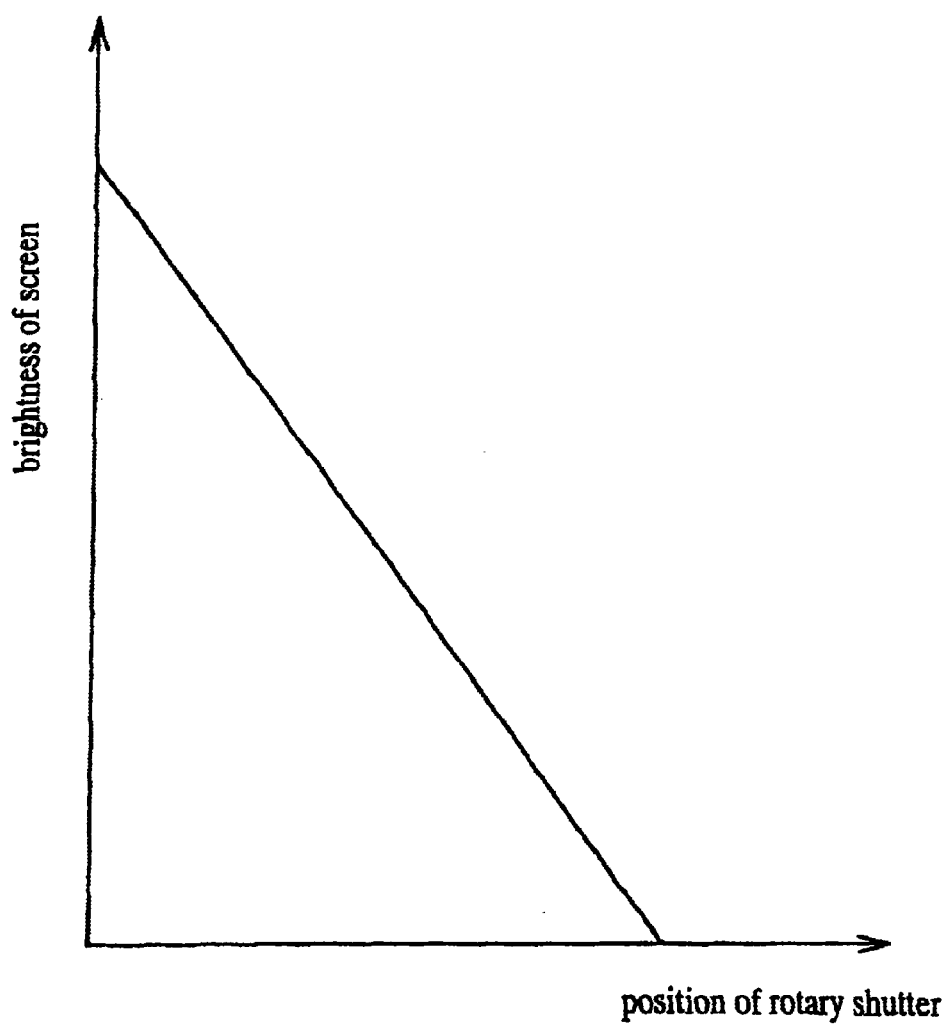

FIG. 193 is a diagram for explaining the projection type display apparatus of the invention.

Figure 194:
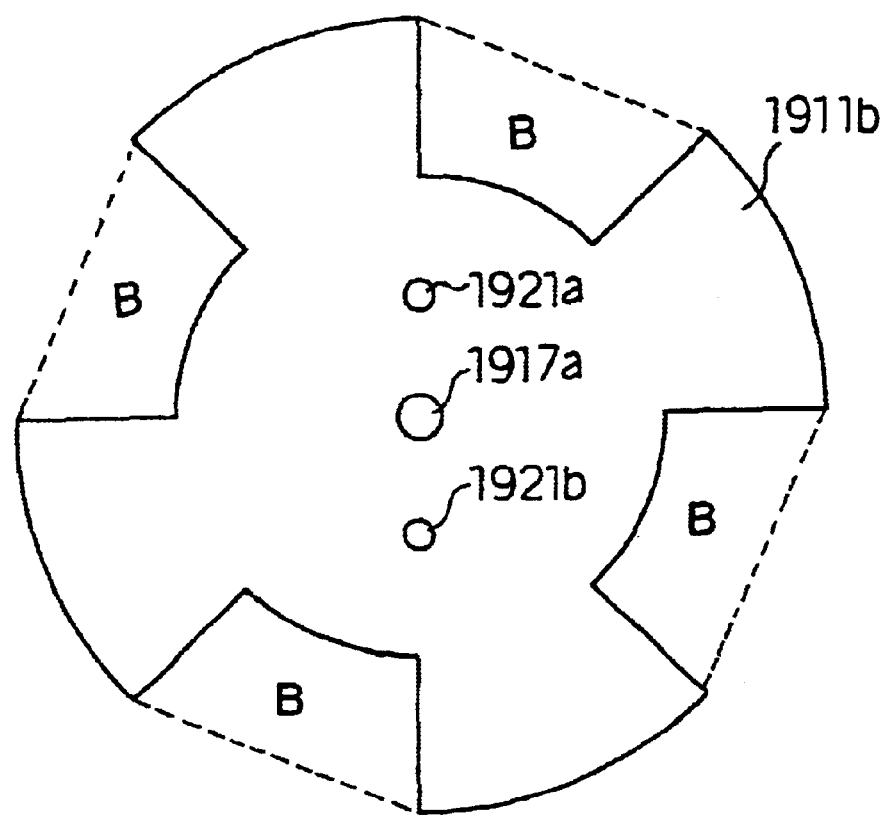

FIG. 194 is a diagram for explaining the projection type display apparatus of the invention.

Figure 195:
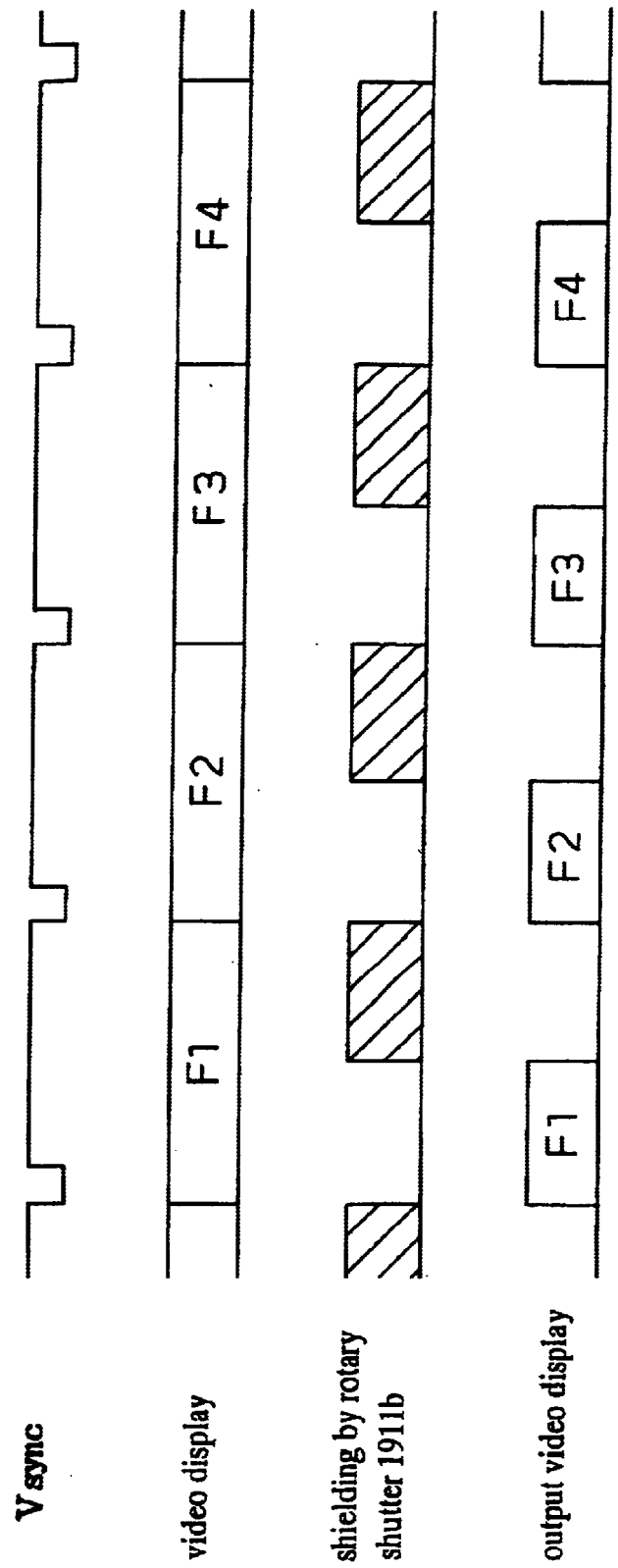

FIG. 195 is a diagram for explaining the projection type display apparatus of the invention.

Figure 196:
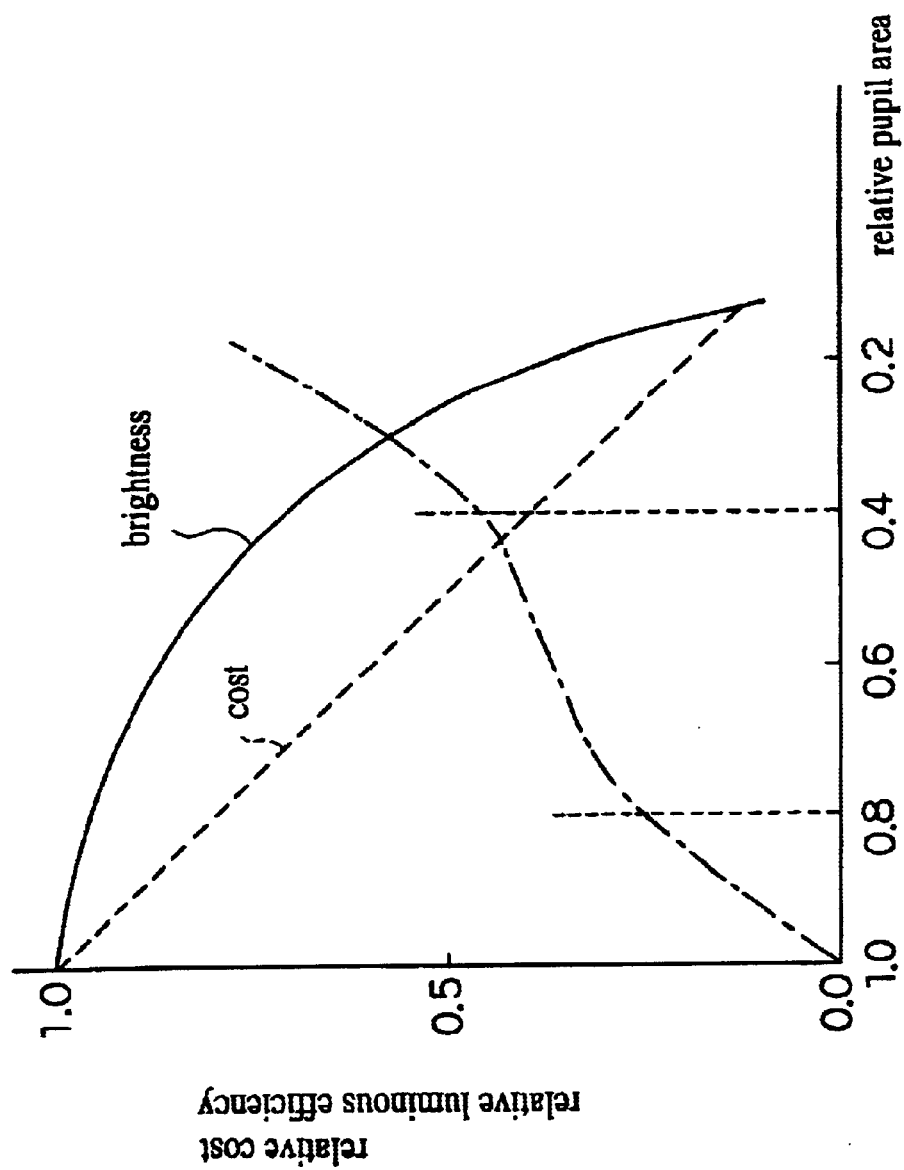

FIG. 196 is a diagram for explaining the projection type display apparatus of the invention.

Figure 197:
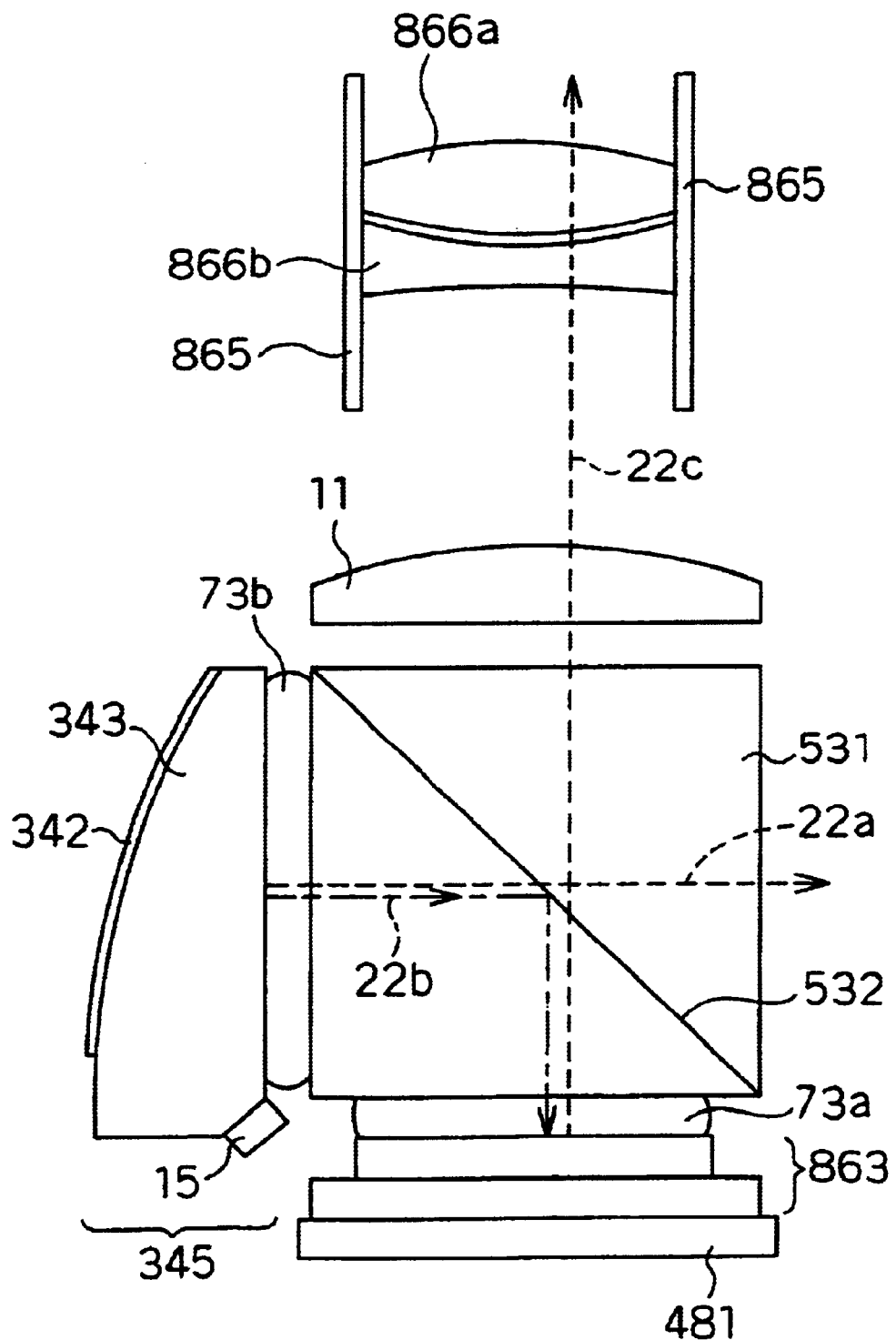

FIG. 197 illustrates the configuration of the view finder of the invention.

Figure 198A:
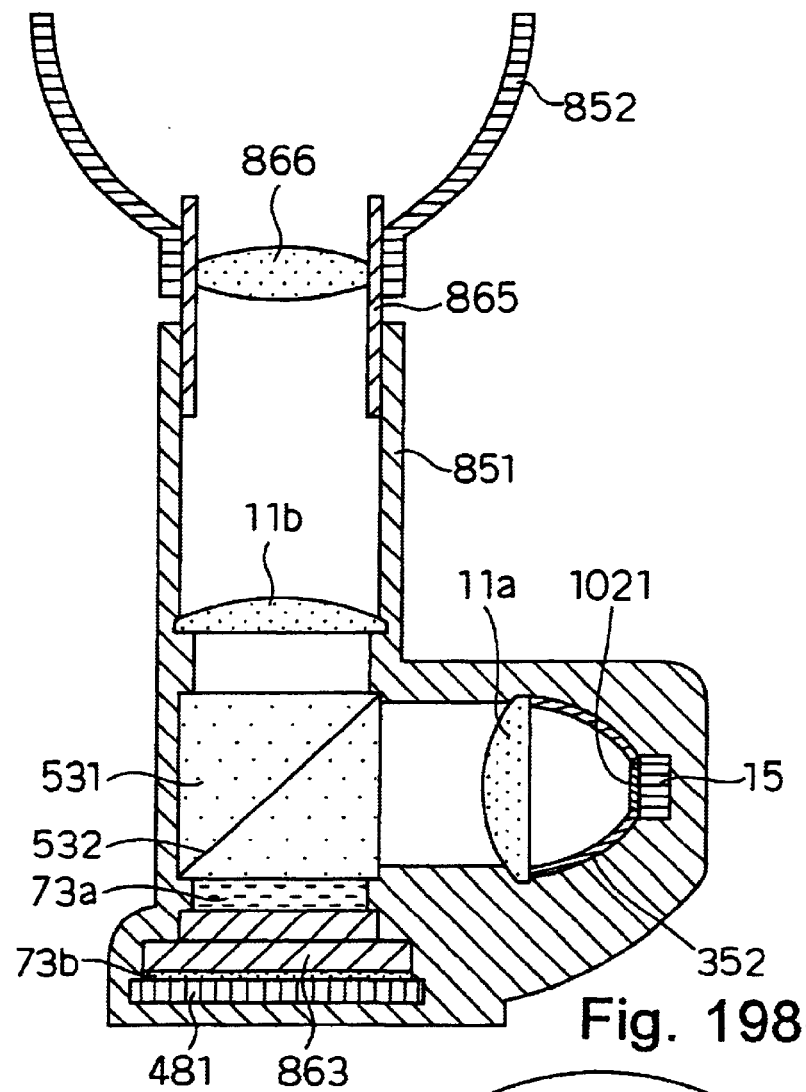
Figure 198B:
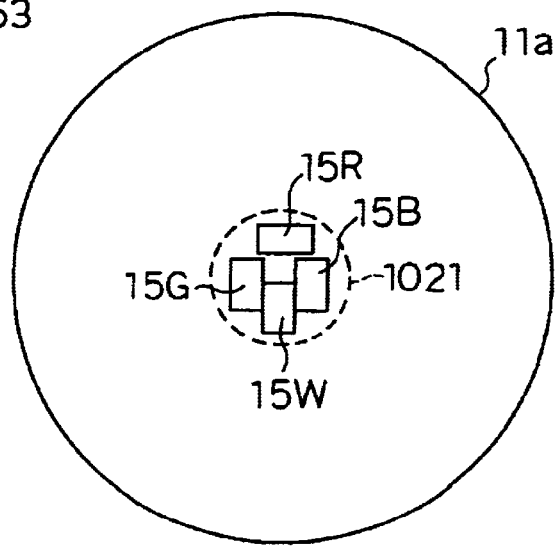

FIGS. 198A and 198B illustrate the configuration of the view finder of the invention.

DESCRIPTION OF THE REFERENCE NUMERALS 11 (condensing) lens
12 optical absorbing film
13 aperture
14 optical axis
15 light emitting device (white LED)
21a, 21b eyes of observer
22a, 22b rays
25 interface with air
31 scattered light
41 LED electrode
42 reflecting film
43 electrode terminal
44 solder
45 LED chip
46 fluorescent substance
47 insulating film
48 copper foil (heat discharging plate)
49 printed board
51 parabolic mirror
52 resin (or ceramics)
56 color filter
53 reflecting film (reflector)
54 convex lens
55 heat discharging plate
71 reflector (reflecting film)
72 anti-reflecting film
73 optical coupling layer
74 terminal
101 heater terminal
102 anode terminal
103 casing
104 heater
912 gamma change-over switch
121 array substrate
122 counter substrate
123 filter substrate
124 color filter
125 counter electrode
126 pixel electrode
127 polymer dispersed liquid crystal layer (light modulation layer)
131a, 131b insulating films
132 microlens substrate
133 conductive film
134 microlenses
141 black matrix (BM)
151 mixed solution
161 color meter (luminance meter)
162 filter
163 base
164 light source
171 signal line
181 reflecting film
211 contact
221 optical absorbing film
261 mirror
271 concave mirror
291 fulcrum
341 reflecting film
342 concave reflecting film
343 transparent block
344 light outgoing area
345 illuminating apparatus
351 parabolic surface forming area (using part)
352 parabolic mirror
371 display area
401 pin
402, 404 holes
403 projected part
411 sheet
451 anti-reflecting film
481 light guide plate
482 transparent film
483 fluorescent tube
491 casing
492 panel holder
501 transparent sheet
502 conductive film
503 finger
511 plane light source
512 booster coil
521 power switch
531 polarization beam splitter (PBS)
532 light separation face
541 shielding plate
551 reflecting film
552 condenser funnel
553 light reducing means
561 optical fiber (light transmitting member)
571 video camera body
572 photographing lens
581 spring
582 mirror part
583 retaining part
584 nail
631 (resilient) spring
632 attaching member
641 lid
661 transparent plate
681 prism plate 731 reflecting sheet
732 prism plate
751 light emitting area
761 button
762 moving part
763 clock
791 monitor electrode
801 monitor display part
811 screen
851 body
852 eyepiece cover
853 mounting fitting
861 fluorescent tube box (backlight)
862 diffuser (diffusion sheet)
863 liquid crystal display panel
864 polarizer
865 eyepiece ring
866 magnification lens
871 flexible substrate (printed board)
872 shielding body
881 transparent substrate
891 color filter resin
901 light source holder
902 arm
911 shielding plate
921 turbo switch
941 transparent plate
951 fiber plate
1011 lighting window
1012 arm
1021 diffusion sheet
1181 analog sheet
1182 variable resistance
1183 fixed resistance
1206 change-over switch
1301 mirror substrate
1361 aperture mirror
1362 hole (light transmitting part)
1441 microprism
1471 condenser plate
1511 insulating film
1541 resin
1561 gate signal line
1562 source signal line
1571 liquid crystal molecule
1572 line of electric force
1581 shielding film (common electrode)
1582 addition capacitor
1591 projection lens
1601 reflecting sheet
1602 light diffusion area
1603 light guiding member
1631 inclined plate
1641 reflecting part
1642 light transmitting part
151 mixed solution
1681 smooth substrate
1691 ordinary scattering layer
1701 sealing resin
1711 shielding film
1712 liquid crystal drop
1721 aperture absorbing film
1751 casing
1752 cooling water (hydrogen)
1771 dichroic mirror
1772 display panel
1781 aperture substrate
1791 shielding plate
1792 aperture
1821 interface
1822 prism plate
1831 rotary filter
1841 pressure/purity sensor
1842 disc
1844 transmission window
1844 casing
1845 heat discharging plate
1861 light emitter
1862 UV-IR cut filter
1864 reflection prism
1865 reflecting face
1866 condenser lens
1867 beam synthesizing lens
1868 secondary light source
1901 first lens array
1902 second lens array
1903 optical axis
1904 pupil face of projection lens
1891 light emitting image
1911 rotary shutter
1912 motor mounting base
1913 sliding gear
1914 rotary gear
1915 UV-IR cut filter
1916 motor
1917 shaft
1921 position detection bole.

DESCRIPTION OF THE PREFERRED EMBODIMENTS

Embodiments of the invention will be described hereinbelow with reference to the drawings.

For mainly simplicity of explanation, the drawings includes omitted parts, exaggerated parts, and enlarged or reduced parts or the like.

Component elements to which the same reference numerals are designated have the same or similar configuration otherwise than specifically described. Parts and configuration which does not need to be explained are therefore omitted here.

Since mirrors 342, 271, and 261 have the same or similar configuration and function, they can be replaced with each other. Similarly, pixels 341 and 181 can be also replaced with each other.

Figure 1:
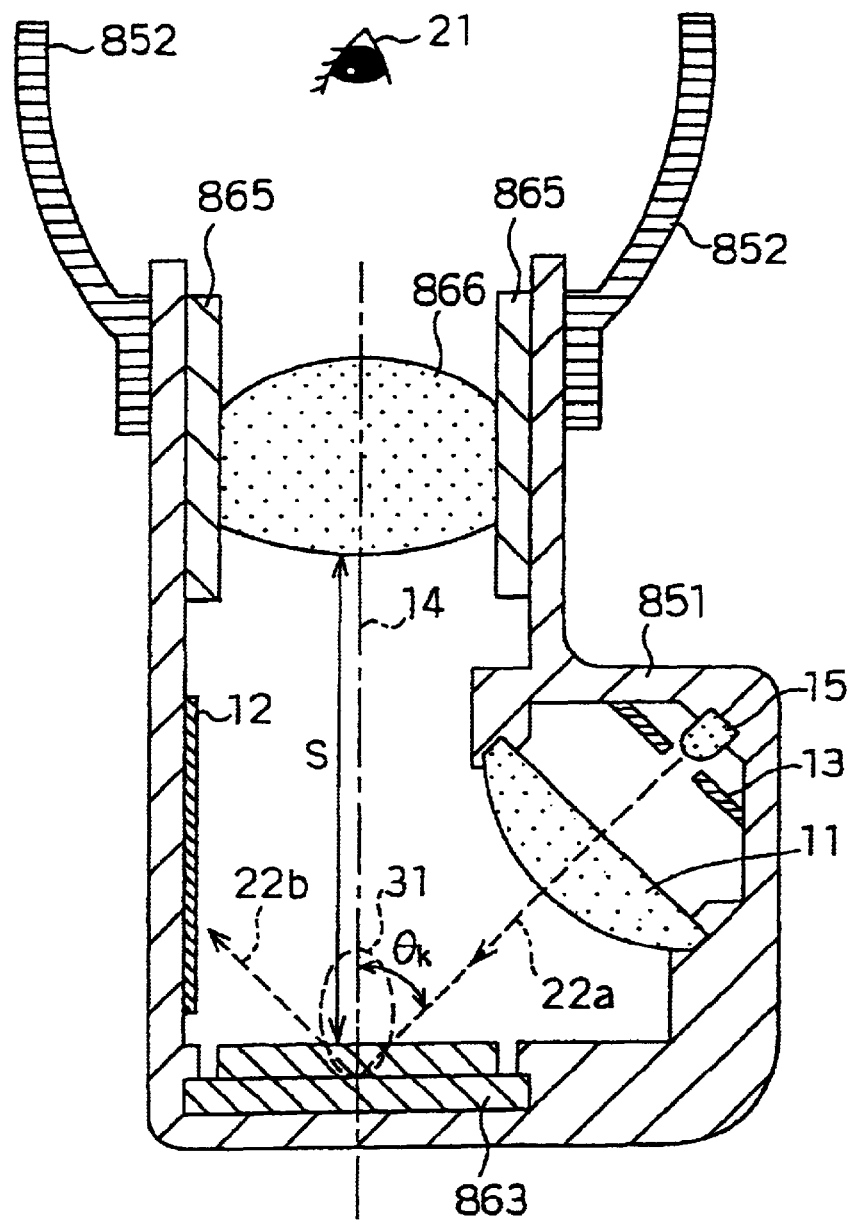
FIG. 1 is shows a configuration of a view finder of the invention.

FIG. 1 is a cross section of a view finder of the invention. A white LED 15 is disposed in the body 851. The LED can emit white light and is sold by Nichia Corporation. Obviously, an LED of a single color (green, red, blue, yellow, orange, or the like) may be used or LEDs of a plurality of colors may be combined and used. In the case of using LEDs of a plurality of colors, they are collectively disposed in one place.

In place of the white LED, another device for generating white light can be also used. For example, as devices for generating white light, there are light emitting lumps sold by Tohoku Denshi Co., Ltd. and Optonix, Ltd., a plane light emitting device sold by Ushio Inc., and a fluorescent light emitting device and a FED (Field Emission Device) or the like, sold by Futaba Corporation. Except for the above, outside light such as sun light is condensed or introduced and used as a light emitting source (light emitting device). They are called light emitting devices 15.

Light emitted from the light emitting device 15 is converted into almost parallel light by a condenser lens 11. The almost parallel light denotes light having high directivity and is not limited to parallel light. That is, unlike a plane light source in which the light has the same luminance when the light emitting surface is measured from any directions, when the luminance is measured from one direction, high luminance is obtained. The principal light of the parallel light may be therefore condensed or dispersed.

An aperture 13 is disposed on the light outgoing surface of the light emitting device 15. The aperture is obtained by, for example, opening a hole of circular shape or the like in the center of a light shielding plate or forming a light shielding film on a transparent substrate such as glass substrate except for the center part of the substrate. The diameter e (mm) of the aperture is determined so as to satisfy the following expression with respect to the diameter (or diagonal length) f (mm) of a light emitting area of the light emitting device 15.

$$\frac{f}{3} \le e \le f \qquad \text{(Expression 2)}$$

The condenser lens 11 is a convex lens made of a transparent resin such as zeonex, acrylic, or polycarbonate. A glass or the like may be also used. The convex lens 11 may have the structure of a Fresnel lens. The transparent composition body having the other structure can be also made of resin or glass.

The display panel 863 is a reflection type display panel. As the reflection type display panel, for example, a display panel in which a reflector such as a mirror is disposed or a reflecting film is formed on the rear surface of a transmission type display panel, a display panel in which a pixel electrode is made of a metal, a display panel in which a dielectric mirror is formed on a pixel, or a display panel in which the pixel electrode is a transparent electrode and the counter electrode is a reflective electrode can be used. A display panel in which a part of pixels is reflective as shown in FIG. 156 is also a reflection type display panel. FIG. 156 will be described hereinlater.

In the invention, as a display panel, a polymer dispersion liquid crystal display panel is used. As a display mode, a normally white (hereinlater, simply described as NW) mode for displaying white on the liquid crystal layer in a state where no voltage is applied is used for the following reason.

Figure 2:
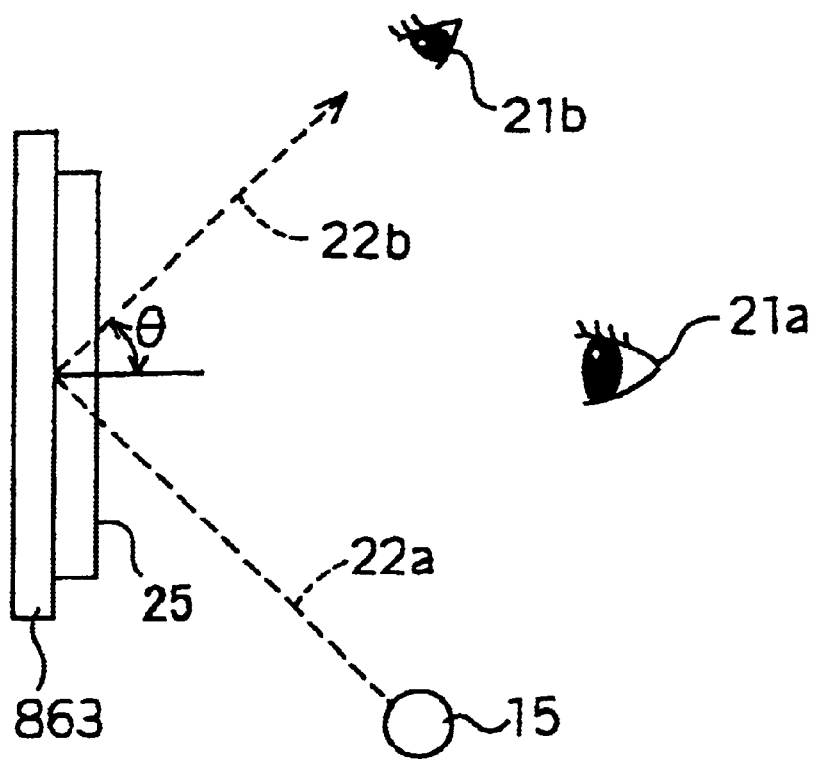
FIG. 2 is a diagram for explaining the view finder of the invention.

FIG. 2 is a diagram showing the case of using a polarizer as in a TN (twist nematic) liquid crystal display panel. Light 22a emitted from the light emitting device 15 is reflected by a reflecting electrode (not shown) of the display panel 863. Since the light entering the liquid crystal layer travels straight, the light reflected by the reflecting electrode becomes reflected light 22b. Even when the liquid crystal layer is modulated so that black and white are displayed on the display panel 863, light does not reach an eye 21a of the observer.

In order to watch a displayed imaged, an eye of the observer should be in the position 21b. The displayed image seen from the position 21b, however, has a trapezoidal shape. In order to allow the displayed image to be seen from the position 21a, the light emitting device 15 has to be disposed in the same position (or on the same optical axis) as the eye 21a of the observer. It is, however, difficult to dispose it coaxially from the viewpoint of optical design. In this case, light-(direct light) reflected by the surface of the display panel 863 (interface 25 with the air) also reaches the eye 21a, so that the contrast of the displayed image deteriorates. The deterioration in contrast due to the direct light also occurs in the position 21b as well. By arranging the optical system, the trapezoidal display image can be changed to a rectangular image.

In the case of using a ferroelectric liquid crystal display panel or TN liquid crystal display panel as the display panel 863, in order to allow the displayed image to be seen from the eye 21a of the observer, it is sufficient to form slight projections and recesses (or only projections) on the reflective electrode. By the rough surface, the incident light 22a is scattered (that is, the direction of the light is changed) and outgoing light reaches the eye 21a of the observer. In the view finder of the invention, the display panel in which slight projections and recesses are formed on the reflective electrode may be also adopted.

As a scattering system, for example, NCAP, PDLC, PNLC, or the like can be used for a polymer dispersed liquid crystal display panel. In addition, a display panel using a thick ferroelectric liquid crystal layer, a dynamic-scattering mode (DSM) display panel, and a PLZT display panel can be also used. In order to make the description simple, the polymer dispersed liquid crystal display panel (hereinlater, called a PD display panel) will be mainly taken as an example.

FIG. 3 is a diagram for explaining a light modulating method of the reflection type PD display panel.

Figure 3A:
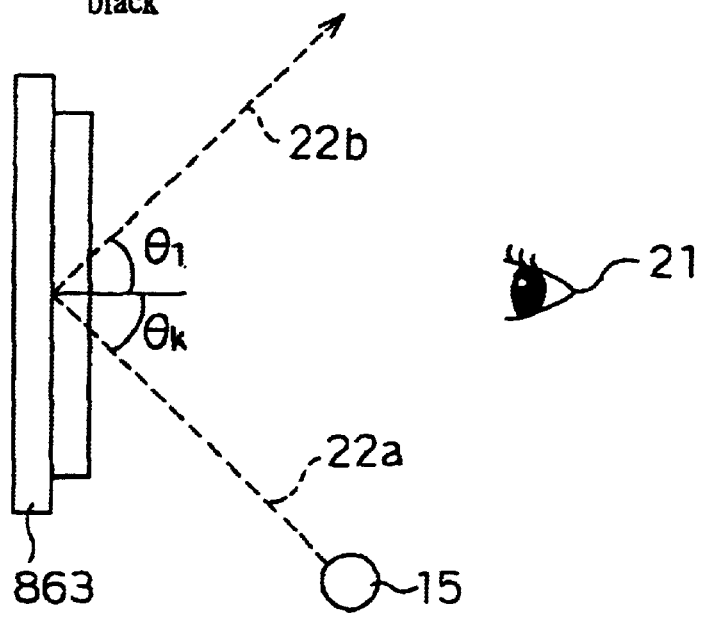
FIGS. 3A and 3B are diagrams for explaining the view finder of the invention.
Figure 3B:
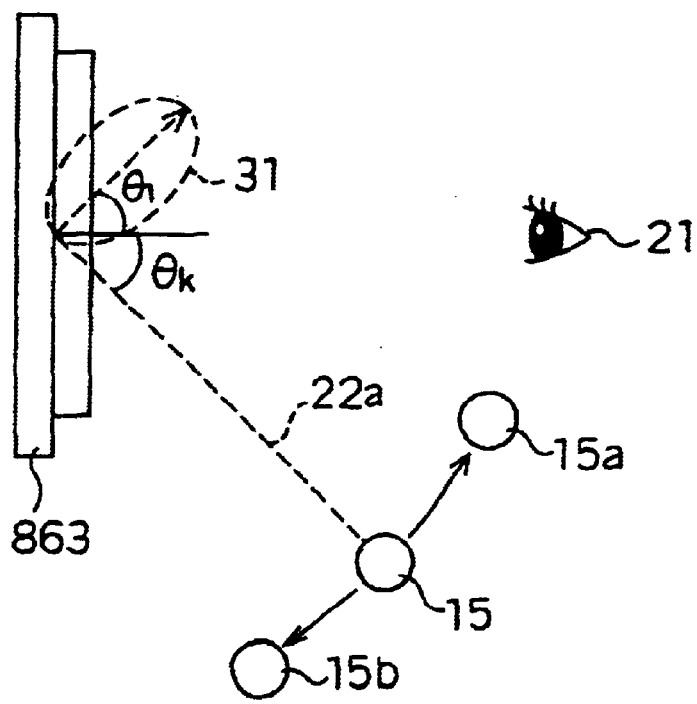

The PD display panel modulates light in the NW mode. When a voltage is applied to a liquid crystal layer 127, the PD display panel becomes transparent. Incident light therefore goes straight. In a state where a voltage is applied to the liquid crystal layer as shown in FIG. 3(a), the incident light is scattered. The light therefore becomes scattered light 31 as shown in FIG. 3(b). The scattered light 31 is incident on an eye 21 of the observer, thereby realizing white display. The invention is not limited to the normally white mode but can be also applied to a normally black (hereinlater, simply described as NB) mode.

Now, an angle θ is measured by setting the traveling direction (travel angle) of the outgoing light 22b as 0 degree. The angle of the optical axis on which the eye of the observer exists when the direction of 0 degree is used as a reference is set to $\theta_1$. In the case of black display, as shown by a broken line in FIG. 105, most light fluxes are at angles around 0 degree and there is hardly a light flux travelling in the direction of the angle $\theta_1$. Little light flux (light) therefore reaches the eye of the observer 21, so that the black is displayed as shown in FIG. 3(a).

Figure 105:
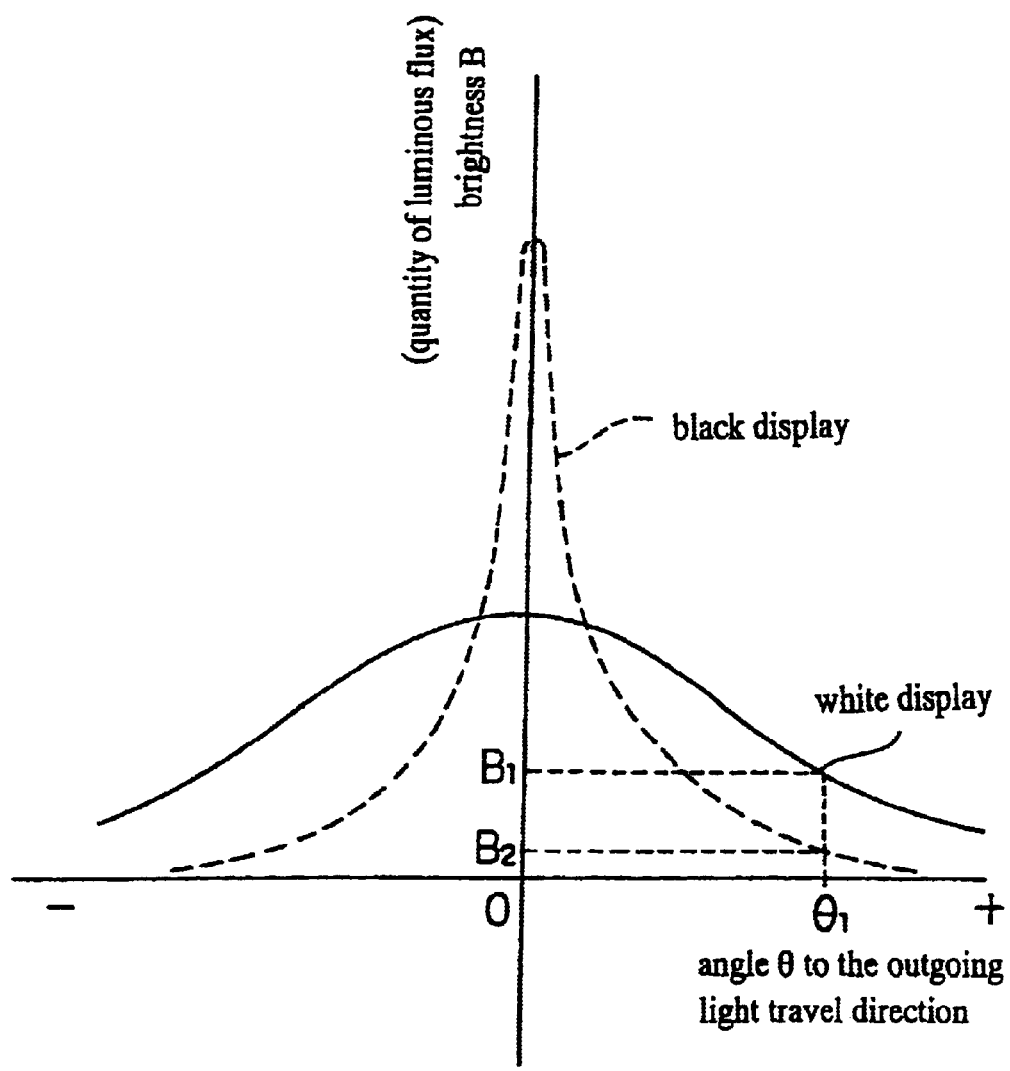
FIG. 105 is a diagram for explaining the display panel of the invention.

On the other hand, when the light is scattered by the liquid crystal layer 127, the number of light fluxes traveling in the direction of $\theta_1$ increases as shown by a solid line in FIG. 105. The contrast CR of the image seen by the observer is consequently $B_1/B_2$.

Also from the above, the angle at which the highest contrast can be obtained is unconditionally determined by a scattering gain G of the liquid crystal layer and the angle $\theta_k$ (refer to FIG. 3) formed by the travelling direction of the incident light (or outgoing light) and the optical axes on which the eye 21 of the observer exists. Especially in the view finder, the position of the eye 21 of the observer is fixed (fixed to use the view finder) since the observer watches the displayed image by fixing the positions of his/her eyes to the eyepiece rubber 852.

Although a direct-view display panel in a pocket TV or the like requires a wide viewing angle, it is sufficient for the view finder to preferably observe the displayed image at a very narrow viewing angle. By utilizing the characteristic of the view finder of the invention, the scattering gain G (scattering of the liquid crystal layer) and the angle of the incident light are determined so as to make the display contrast highest.

When it is assumed that the illuminance on the light incident surface of the display panel 863 is E [1x], the liquid crystal layer is in a transparent state, the luminance measured from the direction of travel of the outgoing light is B(nt) (an influence by light reflected by the surface of the display panel or the like is corrected (excluded), and the ratio of the circumference of a circle to its diameter is π, it is determined from experiments and examination that the scattering gain G satisfies the following expression. The relation is not limited to the view finder but can be also applied to a direct-view display panel.

$$1.0 \leq G \leq 4.0 \text{ where, } G = \frac{\pi B}{E}$$ (Expression 3A)

The scattering gain is determined also in consideration of a point that the voltage to drive the liquid crystal layer 127 has to be set to 7(V) or lower. Preferably, G lies within the range from 2.0 to 3.5. In the range, a wide viewing angle and a preferable display contract can be realized also in the configuration (such as direct-view panel) in which the display image on the display panel is directly observed. G is called a scattering gain.

In the case of measuring G, it is necessary to pay attention that G denotes scattering characteristics of the light modulating layer. G is therefore measured when there is no color filter and the aperture ratio is 100%. Consequently, a panel in which a PD liquid crystal glass substrate is sandwiched is produced. The PD liquid crystal glass substrate has the same characteristics as those of a substrate sandwiched by a display panel in which a thin film transistor (TFT) and the like is formed. The panel is used as a reference and G of the panel is measured. The measured G is used as G of the TFT substrate. In the case of the reflection type liquid crystal display panel, obviously, G has to be obtained by eliminating light reflected by somewhere except for the light modulating layer. It is preferable that the incident angle $\theta_k$ satisfied the following expression.

$$10(\text{DEG.}) < \theta_k \leq 60(\text{DEG.})$$ (Expression 3B)

When $\theta_k$ is equal to or smaller than 10 degrees, the position of the eye of the observer and the disposing position of the light emitting device 15 coincide with each other, so that it is difficult to arrange the optical system. When $\theta_k$ is equal to or larger than 60 degrees, the colors of the color filters are mixed and the color purity deteriorates easily.

The above can be also applied to a case where the display panel 863 is a ferroelectric liquid crystal display panel or a TN liquid crystal display panel. The liquid crystal display panels can be also used for the view finder of the invention. For example, the IN liquid crystal display panel or the ferroelectric liquid crystal display panel may be produced by directly forming the TFT and the reflective electrode on a silicon substrate.

The PD display panel, however, does not use a polarizer for light modulation. A bright display image can be therefore realized and the power consumption can be largely reduced. In the PD display panel, a polarizer can be disposed or formed on the light incident surface. By disposing the polarizer, the display contrast can be improved.

In the configuration where a wedge-shaped plate, prism plate (sheet), or the like is disposed on the incident surface of the display panel 863, the angle range is different from the expression 3B. Needless to say, since the range shows apparent angles and, when a prism plate or the like is disposed, correction has to be performed by taking the prism plate or the like, into account.

As shown in FIG. 3(*b*), by setting the position of the light emitting device 15 to 15*a* or 15*b*, the angle of the incident light 22*a* to the display panel 863 is changed so as to adjust the contrast to the highest. The contrast can be similarly adjusted by changing the position or angle of the display panel 863. As an adjusting mechanism, for example, a mechanism obtained by attaching a lever to the liquid crystal display panel is used.

Figure 12:
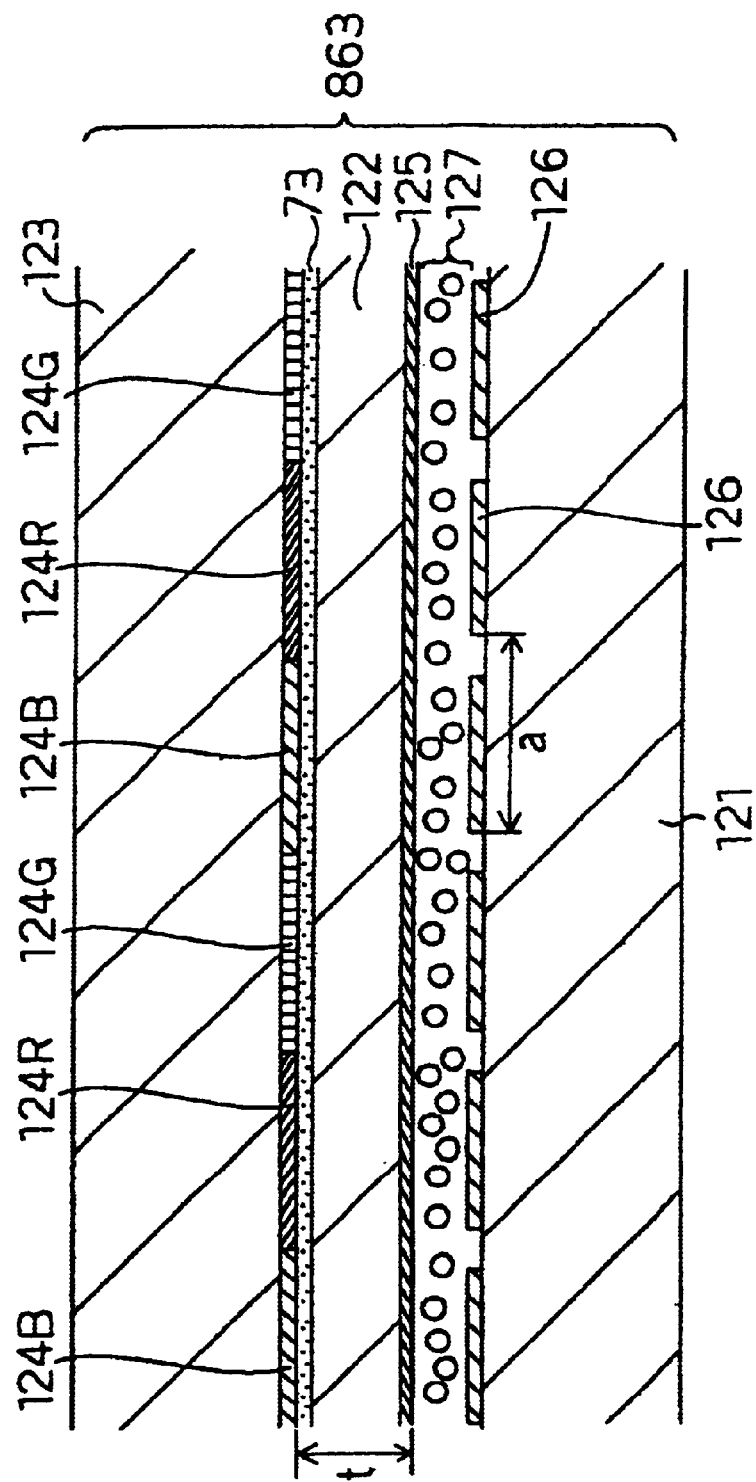
FIG. 12 is a diagram showing the configuration of a display panel of the invention.

FIG. 12 is a cross section of the display panel of the invention used for a view finder or the like of the invention.

A reflective electrode 126, a thin film transistor (not shown), and the like are formed or disposed on an array substrate 12[sic].

Reference numeral 126 is called a "pixel electrode" or simply "pixel" in the specification. This is because, strictly, a display panel which does not have a pixel electrode exists. For example, there are an optical write type display panel and a thermal write type display panel.

A counter electrode 125 and the like are formed or disposed on the counter substrate 122. A polymer dispersed liquid crystal (PD liquid crystal) is sandwiched between the counter electrode 125 and the pixel electrode 126. The peripheral part of the liquid crystal layer 127 is sealed by a sealing resin (not shown).

On a filter substrate 123, color filters 124R, 124G, and 124B of three primary colors of red (R), green (G), and blue (B) are formed. The filter substrate 123 and the counter substrate 122 (or array substrate 121) are connected by an optical coupling layer 73.

The optical coupling layer 73 is made of, for example, an adhesive, gel, or liquid of silicon resin, phenol resin, epoxy resin, acrylic ultraviolet curing resin, ethylene glycol, alcohol, water, methyl salicylate, or the like. As the material used for the optical coupling layer 73, a transparent material having the refractive index of 1.38 to 1.55 can be used.

According to the configuration, it is not always necessary to form the optical coupling layer. In this case, however, there is the possibility that incident light is reflected by the interface of the display panel and the like and the light transmittance of the display panel deteriorates. In this case, anti-reflection coating or AIR coating is applied.

A voltage is applied to the pixel electrode 126 by a switching device of a thin film transistor (TFT), thin film diode (TFD), or the like. Further, as a switching device, a plasma addressing liquid crystal TALC) for controlling the voltage applied to the liquid crystal layer by using plasma, an optical write device, and a thermal write device are also used. The PALC is a prototype manufactured by Sony, Sharp, etc. That is, as a structure having the switching device, a structure capable of applying (switching) a voltage, current, or charge to the pixel is shown.

As a material of the polymer dispersed (PD) liquid crystal used for the display panel 863 of the invention, the nematic liquid crystal, smectic liquid crystal, cholesteric liquid crystal, ferroelectric liquid crystal, and guest host liquid crystal are preferable. A mixture containing a liquid crystal compound of a single substance, liquid crystal compounds of two or more kinds or a substance except for a liquid crystal compound may be also used.

In the invention, the PD liquid crystal denotes a liquid crystal obtained by dispersing a liquid crystal in the form of water dropping into a resin, rubber, metallic particles, or ceramics (barium titanate or the like), a liquid crystal in which a sponge-state resin (polymer network) is filled with a liquid crystal, or the like. Except for the above, a PD liquid crystal in which a resin layer and a liquid crystal layer are stacked, a PD liquid crystal in which a liquid crystal component is enclosed in a capsular housing medium (NCAP) and a PD liquid crystal in which a dichroic or polychroic dye is contained in the liquid crystal, resin, or the like may be also used. A similar structure in which liquid crystal molecules are oriented along a resin wall is also a PD liquid crystal. There is also a PD liquid crystal in which liquid crystal molecules are oriented and resin particles, beads, fibers, or the like are contained in the liquid crystal 127. The liquid crystal molecules may be oriented parallel or vertical with respect to the substrate surface, along the resin wall surface, or spiral. A material in which a liquid crystal is oriented and a resin or the like is scattered in the oriented liquid crystal is also a PD liquid crystal. The liquid crystal layer is not limited to a single layer but can be a multilayer of two or more layers. The PD liquid crystal may become transparent either when a voltage is applied or, on the contrary, when no voltage is applied.

That is, the light modulating layer which is comprised of a liquid crystal component and the other material component is generally called a PD liquid crystal. An optical image is mainly formed by scattering and transmitting light in the light modulating method. The light modulating method using a change in the polarizing state, optical rotation state, or birefrigerence may be also used.

Although the PD liquid crystal is used for the liquid crystal layer 127, on this specification, depending on the structure, function, and use purpose of the display panel, the invention is not limited to the PD liquid crystal. A TN liquid crystal layer, guest host liquid crystal layer, homeotropic liquid crystal layer, ferroelectric liquid crystal layer, antiferroelectric liquid crystal layer, cholesteric liquid crystal layer, or the like can be also used.

It is effective to form insulating films 131*b* and 131*a* between the pixel electrode 126 and the liquid crystal layer 127, and between the liquid crystal layer 127 and the counter electrode 125, respectively as shown in FIG. 13. Each of the insulating films 131*a* and 131*b* is made of, for example, an orientation film made of polyimide or the like used for the TN liquid crystal display panel or the like, an organic substance such as polyvinyl alcohol (PVA), or an inorganic substance such as $SiO_2$, SiNx, or $Ta_2O_3$. An organic substance such as polyimide is preferable from the viewpoint of adhesion and the like. By forming the insulating film on the electrode, the retention of charges can be improved. Thus, high-luminance high-contrast image display can be realized. The insulating film 131*b* is also effective on preventing the liquid crystal layer 127 and the electrode 126 from being peeled off from each other since the insulating film 131*b* plays the role of an adhesive layer and buffer layer.

The color filters 124R, 124G, 124B (resin color filters) are obtained by, for example, dying a resin such as gelatin or acrylic. Each of the color filters can be formed by a dielectric mirror (called a dielectric color filter) having an optical effect which is formed by alternately stacking a dielectric thin film of a low refractive index and a dielectric thin film of a high refractive index. Since the purity of red in the present resin color filter is low, it is preferable to form the red color filter by the dielectric mirror. That is, it is sufficient to use dielectric multilayer(s) for one or two colors and use the resin color filter(s) for the other color(s).

Figure 103:
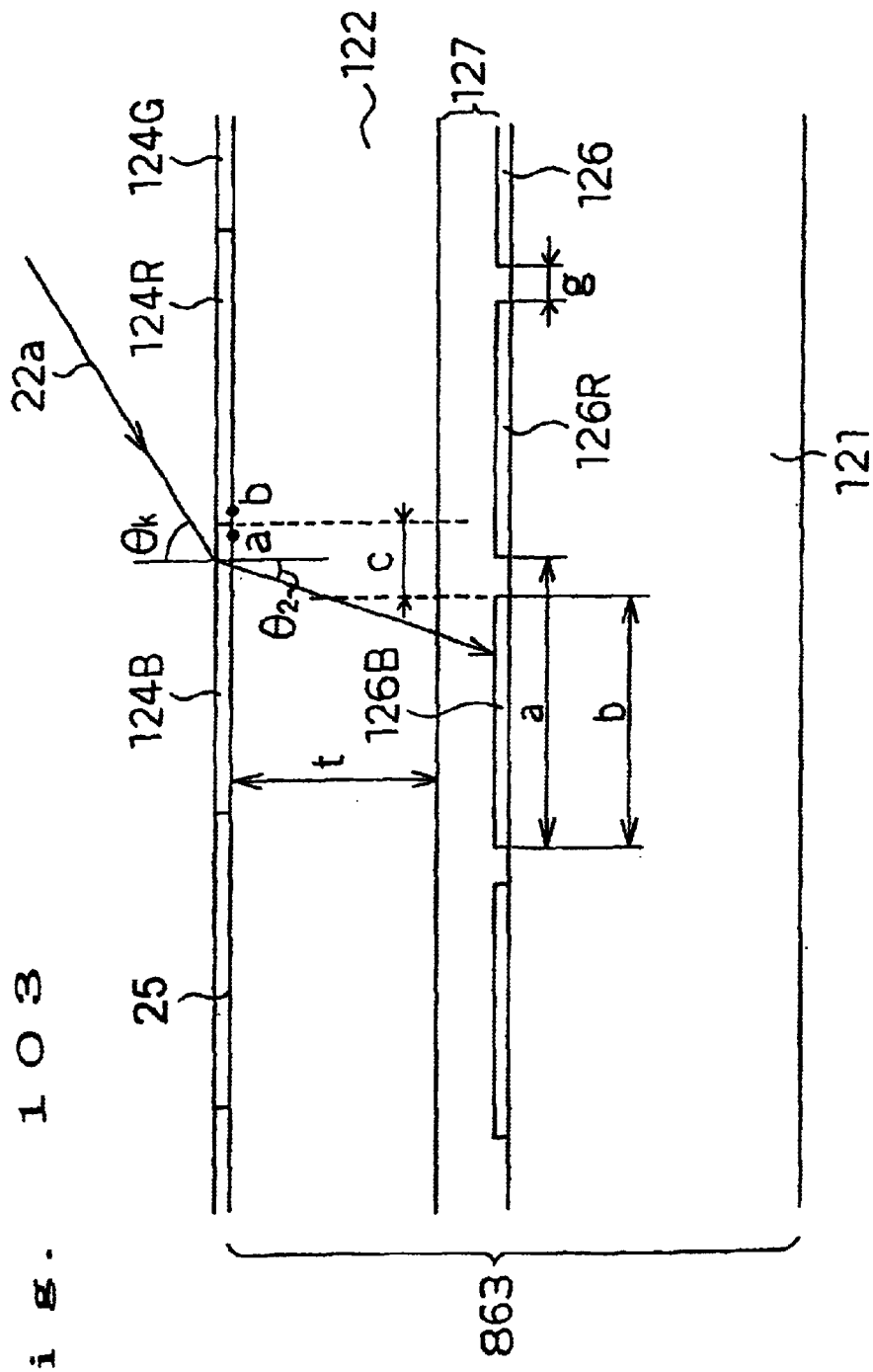
FIG. 103 is a diagram for explaining the display panel of the invention.

The color filters 124R, 124G, and 124B may be formed on the interface 25 with air as shown in FIG. 103. In this case, in order to prevent the color filters 124 from being mechanically destroyed, an ultraviolet (UV) curing resin or the like is applied to the surface of the color filters 124 and the resin functions as a protective layer.

As shown in FIG. 103, when the distance from the formation position of the color filter 124 to the liquid crystal layer 127 is set to t ($\mu$m), the pixel size is set to a ($\mu$m), the aperture ratio of pixels is P (<1.0), and the angle of light passing through the liquid crystal layer (light modulating layer) 127 is set to 92, t satisfies the following conditional expression.

In FIG. 103, different from FIG. 12, a source signal line 1031 is disposed between the pixel electrodes. In this case, in order to change it to a reflection type, it is sufficient to form the pixel electrode 126 by a metal thin film.

$$t \le \frac{4a(1 - \sqrt{P})}{\tan\theta_2} \qquad \text{(Expression 4)}$$

When the pixel is square, the pixel size (a) is a ($\mu$m). When the pixel is rectangular, the pixel size (a) is an average value obtained by adding the lateral size a1 and the vertical size a2 of the pixel and dividing the sum by 2. The aperture ratio P is obtained by subtracting the area through which light effective on light modulation is passed from the pixel area. The area through which effective light does not pass is a black matrix forming part and an area between microlenses.

The smaller the value of t ($\mu$m) is, the more it is preferable. In the case where the counter substrate is a glass substrate and (t) is equal to or smaller than 50 ($\mu$m), the glass substrate is easily broken. The manufacturing yield of the display panel therefore deteriorates largely. In the case of a film, (t) can be reduced to 10 $\mu$m (10 ($\mu$m)$\le$t). When the display panel is small, the glass substrate can be used when the thickness is 30 ($\mu$m) or more. In FIG. 103, the distance (g) between the pixel electrodes is obtained by the following expression.

$$g = a - b = a - (Pa^2)^{1/2} = a(1 - \sqrt{P}) \qquad \text{(Expression 5A)}$$

On the other hand, since the refractive index of the counter substrate is higher, light entering the counter substrate at $\theta_k$ has the angle of $\theta_2$ according to the Snell's law. The distance (g) is expressed by (t) and the angle $\theta_2$ as follows.

$$g = t \cdot \tan\theta_2 \qquad \text{(Expression 5B)}$$

When (t) does not satisfy the following expression, light passed through the color filter of the neighboring pixel enters the liquid crystal layer 127 and mixture of colors is caused.

$$t \le \frac{a(1 - \sqrt{P})}{\tan\theta_2} \qquad \text{(Expression 6)}$$

Figure 104:
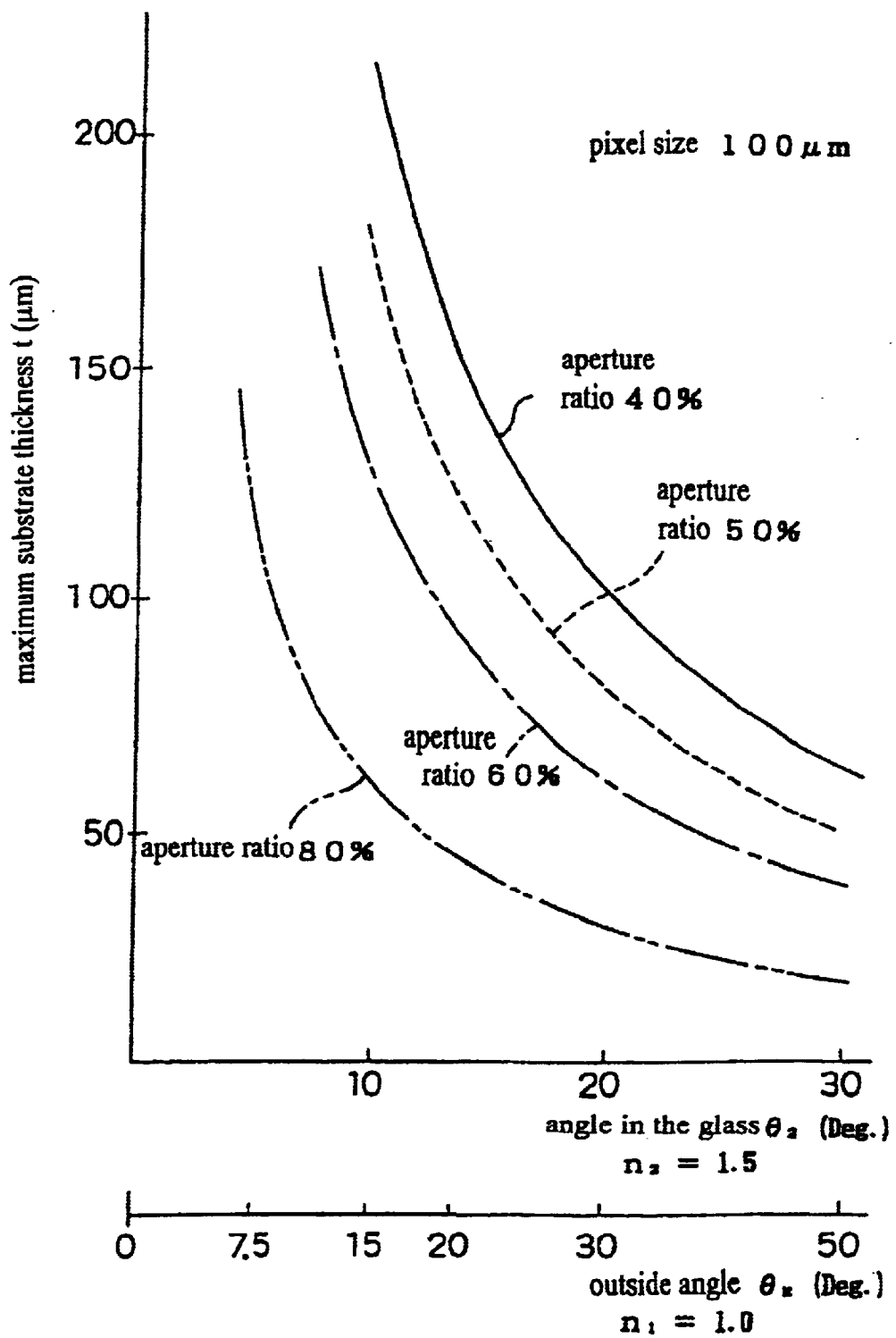
FIG. 104 is a diagram for explaining the display panel of the invention.

That is, it is predicted that the light passed through the red color filter 124R enters the pixel 126B which modulates blue and the color purity largely deteriorates. FIG. 104 is the plot of the above expression.

The pixel size is 100 $\mu$m the refractive index $n_2$ of the counter substrate 122 is 1.5, and the refractive index $n_1$, of air is 1.0. The angle $\theta_2$ of light in the counter substrate 122 is expressed as an angle in the glass, the angle in the air is expressed as an outside angle $\theta_k$ and is shown on the lateral axis, and the vertical axis shows the maximum substrate thickness t (μm). Experiments and examination were carried out and it was found that it is sufficient to satisfy the following expression.

$$t \le \frac{2a(1-\sqrt{P})}{\tan\theta_2} \quad \text{(Expression 7)}$$

It is presumed that this is because the peripheral area of the pixel electrode 126 hardly contributes to the light modulation of the incident light.

As a result of observing the area between the pixel electrodes 126 by a microscope or the like, the area between pixels and the periphery of the pixel electrode are in an almost scattered state. It is presumed that a line of electric force is generated between neighboring pixel electrodes and liquid crystal molecules are oriented along the line of electric force and are always scattered. Consequently, the periphery of the pixel electrode does not contribute to the light modulation of incident light. It can be therefore considered that the above expression is applicable.

In the invention, in order to prevent occurrence of color mixture even when the counter substrate 122 is made thicker, the color filter 124 forming position and the pixel electrode forming position are deviated from each other only by C as shown in FIG. 103. When the following expression is satisfied by deviating the positions in such a manner, the mixture of colors does not occur.

$$t \le \frac{4a(1-\sqrt{P})}{\tan\theta_2} \quad \text{(Expression 8)}$$

It is because the direction of light entering the display panel 863 is fixed in the view finder of the invention. That is, since incident light 22 always travels obliquely, the distance of the incident light 22 which obliquely travels to the liquid crystal layer 127 is deviated in advance. It is therefore sufficient to make light incident on the (a) point at the color border of the color filters 124B and 124R shown in FIG. 103 enter the pixel electrode 126B and prevent light incident on the (b) point from entering the pixel electrode 126B. According to the result of experiment and examination, even when the distance is not deviated, as long as the expression 8 is satisfied, colors are not mixed in reality. The angle of the expression 8 is therefore practically sufficient.

More simply, the maximum permissible thickness of (t) is expressed as follows.

$$t \le a \quad \text{(Expression 9)}$$

It is confirmed that no problem occurs in practice when the diagonal length of the pixel is 100 micron m or more since a very small angle $\theta_2$ is used in the panel in reality.

Figure 16:
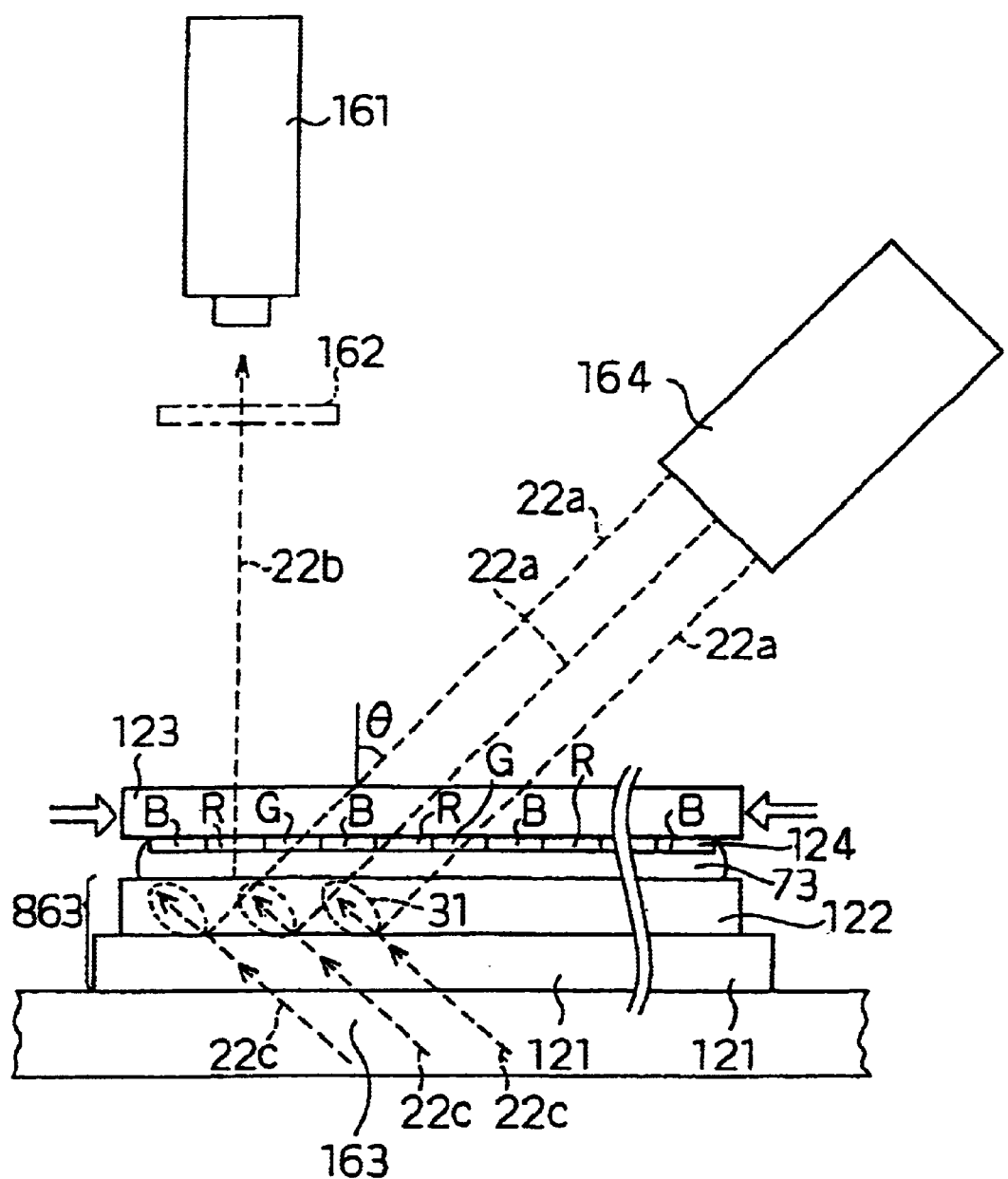
FIG. 16 is a diagram for explaining the method of manufacturing the display panel of the invention.

In order to preferably manufacture the display panel for a view finder or the like of the invention, it is preferable to use a manufacturing method shown in FIG. 16.

First, the display panel 863 is disposed on a base 163. Secondly, the transparent resin 73 is applied on the color filters 124 of the filter substrate 123 and is adhered to the counter substrate 122 and a temporary positioning is performed. Only one of R, G, and B is set to display white. It is sufficient to apply a voltage across the pixel electrodes of G and B and no voltage is applied to the pixel electrode of R.

Since the color filter 124 is externally attached, the voltage can be applied to the liquid crystal layer as mentioned above before the display panel is completed. The manufacturing method is therefore peculiar to the structure in which the color filter is externally attached as in the present invention.

In a state where the pixel electrode of R displays white, the light 22a is emitted from the light source 164. The same light emitting angle θ and light directivity are set as those of the case where the display panel 863 is actually illuminated in the view finder. The amount (preferably, luminance) of the light outgoing from the display panel 863 is measured by a color meter (or luminance meter) 161 from the position of an eye of the observer. As necessary, a color filter 162 is disposed on the light incident side of the color meter 161 to cut light unnecessary for the measurement. The measurement can be consequently performed with high accuracy.

The positional relation between the filter substrate 123 and the counter electrode 122 is adjusted in such a state. When the light amount measured by the color meter (luminance meter) 161 becomes maximum, it denotes that the positioning is completed.

As necessary, white is displayed only on the pixel electrode B or G, thereby improving accuracy of the positioning between the filter substrate 123 and the counter substrate 122. When the positioning is completed, the positions are fixed and the transparent resin is hardened. As a transparent resin, for example, a silicon adhesive, acrylic ultraviolet curing region, or thermosetting epoxy resin is used.

By positioning the filter substrate 123 and the counter substrate 122, a deviation amount C naturally occurs, the highest luminance is obtained, and color mixture can be prevented. Obviously, when a marker or the like is formed on the filter substrate 123 and the deviation amount C is known, positioning can be performed by the marker without using the method as shown in FIG. 16.

The technique of positioning the filter substrate 123 and a mirror substrate 1301 (which will be described hereinlater), a condenser lens substrate (which will be described hereinlater), and the display panel 863 is a technique of properly positioning the filter substrate 123 or the like to the display panel 863.

The substrates are not therefore always have to be fixed by an adhesive. For example, after the positioning, a filter substrate or the like and the display panel 863 may be mechanically fixed by using a screw or the like or only the periphery may be adhered by an adhesive. It is also sufficient to apply a liquid or gel between the substrates so that the substrates can be detached.

Obviously, the methods can be applied to adhesion of the color filters of the other liquid crystal display panels such as the ferroelectric liquid crystal display panel, TN liquid crystal display panel, and guest host liquid crystal display panel.

The above relates to a case where the pixels are reflective electrodes and the source signal line (not shown) or the like is not disposed between the pixel electrodes. As shown in FIG. 17, when a source signal line 171 is disposed between the pixel electrodes 126, it is necessary to consider the structure of the liquid crystal layer.

The further description will be given by using FIG. 17.

In FIG. 17, the scattering state in an area A on the pixel electrode 126 is changed by a voltage applied to the pixel electrode 126. Display in an area B on the source signal line 171 however is not related to the image display (that is, invalid display). It is therefore unpreferable that the light incident on the area B enters an eye of the observer. It only causes deterioration in contrast or noises on an image.

It is preferable that the light entering the pixel electrode 126 becomes scattered light 31a like incident light 22c when white display is performed, and it becomes reflected light 22*d* like the incident light 22*a* when the black display is realized (a preferable image is displayed). It is, however, unpreferable that the light 22*b* entering the source signal line 171 becomes scattered light 31*b* (because it makes the contrast deteriorate). It is preferable that the light entering the source signal line 171 becomes reflected light 22*e* and does not reach the eye of the observer 21.

In order to realize the above, it is sufficient to make the area B in the liquid crystal layer 127 always transparent since the incident light 22*b* does not become the scattered light 31*b*. In order to realize it, in the invention, the area B is made of a transparent resin and the transparent resin also functions as a spacer.

According to a method of realizing it, an acrylic ultraviolet curing resin containing beads is applied on the array substrate by, a printing technique or the like, such as roll quarter, spinner, or offset and the film thickness is made even (thickness of the liquid crystal layer 127). The applied resin is left as a pattern only in the area B by using a negative or positive photosensitive technique. By performing such a process, transparent projections are formed on the area B.

A mixed solution is applied on the array substrate 121 and is subjected to a degassing process in vacuum, and then the array substrate 121 and the counter substrate 122 are adhered to each other. Since beads are not contained in the mixture solution, a liquid crystal layer having a uniform thickness by the projections of the area B is formed. After that, the mixed solution is irradiated with ultraviolet rays to cause phase separation in the mixed solution, thereby forming the liquid crystal phase 127.

In the display panel for performing color display by using the color filters 124, it is preferable that the color filters 124 are formed on the interface with the air as shown in FIG. 13. By forming them on the interface with the air, heat generated by the light absorbed by the color filters 124 can be cooled more easily.

When air for cooling is sprayed to insulators such as the color filters 124, static electricity is generated by air friction. The static electricity makes dusts adhere onto the surface of the color filters.

In order to solve the problem, in the invention, as shown in FIG. 13, the surface is covered with a transparent insulating film (conductive film) 133 made of ITO or the like. Besides ITO, a metal such as gold may be deposited so as to have the light transmittance or a hydrophilic resin may be applied.

As shown in FIG. 13, when microlenses 134 are arranged on the light incident surface or the like, the pixel aperture ratio P is improved and the high luminance display can be performed. By directly forming the color filter 124 on the microlenses 134, it is unnecessary to separately produce the filter substrate, thereby the low cost can be expected. The microlenses 134 may be made of the material of the color filter. The microlenses 134 function as lenses and also color filters.

Figure 14A:
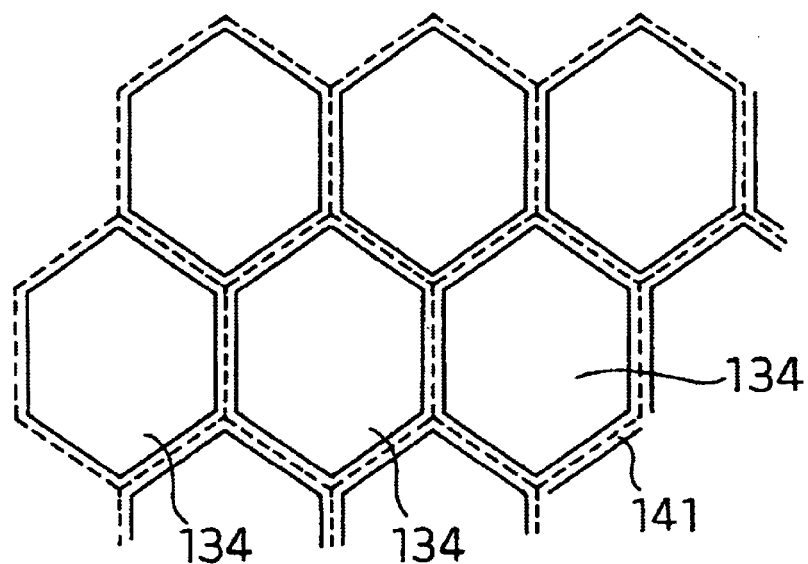
FIGS. 14A and 14B show the display panel of the invention.
Figure 14B:
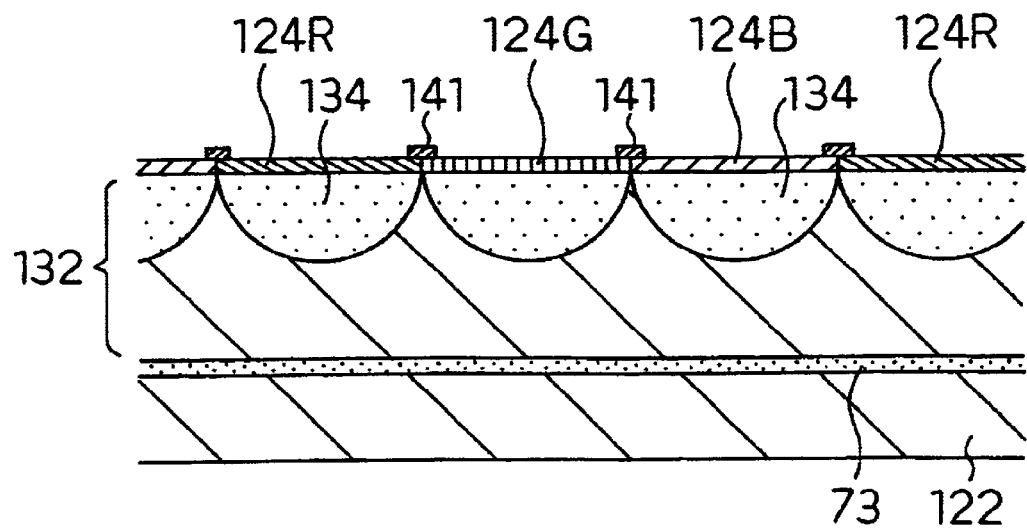

FIG. 14 shows an example in which a black matrix (BM) 141 is formed between the microlenses 134. The black matrix 141 is made of a metal material such as chrome (Cr) or aluminum (Al). The BM 141 is formed between the microlenses 134 of the microlense substrate 132 since the light incident on the part between the microlenses 134 becomes stray light which causes halation or deteriorates the color purity of the display panel. The problems can be suppressed by forming the BM 141.

There is an also advantage that, by making the BM 141 of a conductive material, the occurrence of the static electricity can be prevented, even if the conductive film 133 (as shown in FIG. 13) is not formed. In the case of the BM 141 as well, in a manner similar to the case of forming the conductive film 133, it is necessary to maintain the potential of the BM 141 or the like at the ground potential or a predetermined intrinsic potential. It is preferable to set the predetermined intrinsic potential to the potential of the counter electrode 125.

In FIGS. 13 and 14, preferably, the conductive film 131 and the black matrix 141 are fixed to the potential of the counter electrode 125. Also, an AIC signal is applied. By applying the A/C signal, dusts and the like are prevented from being adhered.

Figure 113:
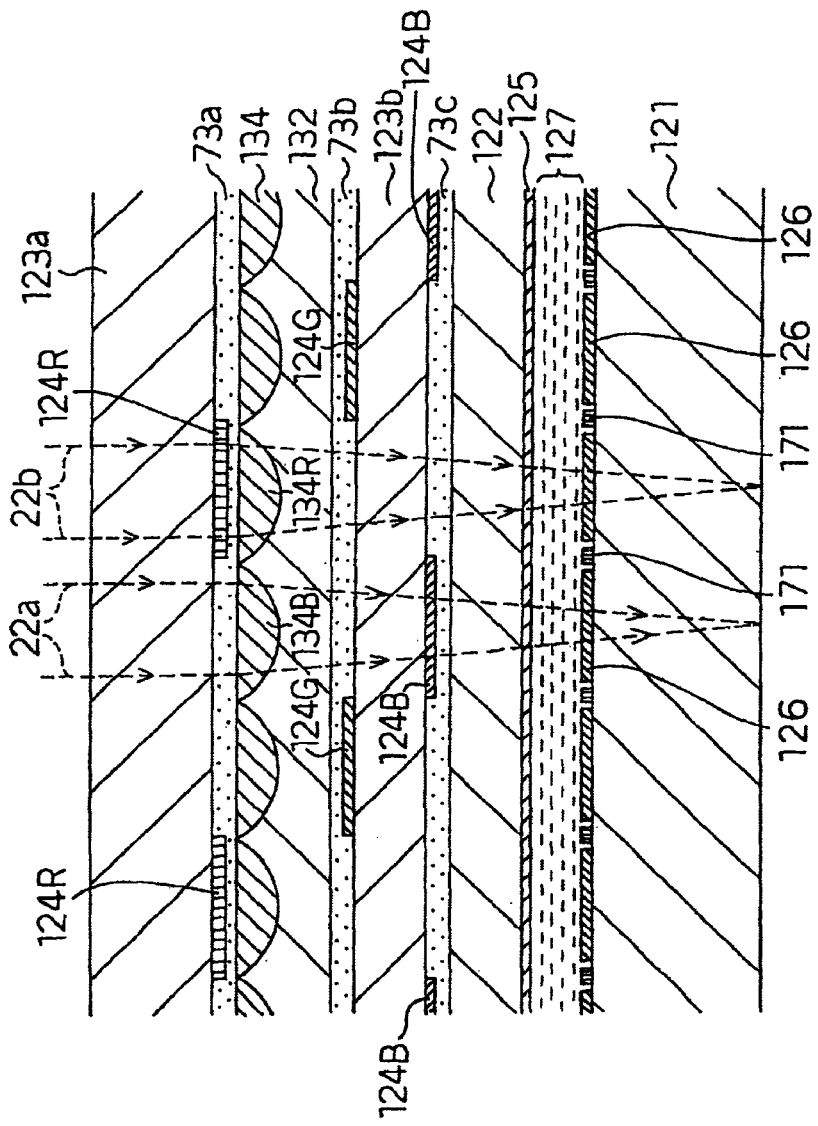
FIG. 113 is a diagram for explaining the display panel of the invention

As shown in FIG. 113, a plurality of filter substrates 123 may be used. In the embodiment of FIG. 113, the red color filter 124R is formed on the filter substrate 123*a* The color filter 124R is disposed so as to be in contact with the light incident surface of the microlenses 134. As necessary, the optical coupling is performed by an optical coupling agent 73*a*.

The color filter 124G of green (G) is formed on one surface of the filter substrate 123*b* and the color filter 124B of blue (B) is formed on the other surface. The color filters 124G and 124B are optically coupled to the microlens substrate 132 and the like.

The color filter 124 on the filter substrate 123 is a resin color filter or a color filter (dielectric color filter) which is made by a dielectric multilayer.

Especially, the color filters 124G and 124B are formed by dielectric color filters. Since the dielectric color filter does not absorb light, even when it is used as an inner layer of the panel, deterioration due to heat generation does not easily occur.

On the other hand, the color filter 124R is a resin color filter. Even when heat is generated, the color filter 124R is positioned near the outside of the panel and the heat can be easily discharged. Red R is selected for the color of the color filter since it generates heat most. In place of the color filter 124R, the color filter 124G can be used. The color filter 124G also discharges heat easily.

Since the resin color filter is easy to be produced, the cost can be reduced. As for the dielectric color filter, when a multilayer is deposited on one substrate 123*b* and the color filters 124G and 124B are formed by etching, the fabrication is easy and the cost can be low. As for a method of adhering the color filters, it is easy to use the method described with reference to FIG. 16.

As shown in FIG. 113, the color filters 124G and 124B are disposed in the optical paths of the light passing through the microlenses 134, in the position where the microlens 134 and the color filter 124R are in contact for the following reason.

The incident light 22*a* is condensed by the microlens, passes through the color filter 124B, and enters the pixel electrode 126. That is, all of light which passed through the microlens 134B enters the color filter 124B. Even when the microlens 134B and the color filter 124B are apart from each other by a predetermined distance, the color is not mixed with the other color.

All of the amount of the incident light 22*b* enters the microlens 134R in the position in contact with the light passed through the color filter 124R. In this case as well, the color is not mixed with the other color.

As mentioned above, by the combinations of the color filter and the microlens 134, the color filter 124 and the microlens 134 can be disposed so as to be apart from each other. Ditto for FIGS. 14, 13, 88, 172, and the like.

The reason of forming the color filter 124 on the filter substrate 123 and adhering it to the counter electrode 122 will be described.

The liquid crystal layer (light modulating layer) 127 of the invention is almost formed by the PD liquid crystal. The PD liquid crystal layer 127 is formed by sandwiching a mixed solution obtained by mixing an ultraviolet (UV) curing resin which is not yet cured with a liquid crystal between the array substrate 121 and the counter substrate 122, irradiating the mixed solution with ultraviolet rays, and preferably separating the mixed solution into the liquid crystal component and the resin component.

Since the color filter 124 absorbs the ultraviolet rays, the mixed solution cannot be phase separated from the surface on which the color filter is formed. Consequently, ultraviolet rays are emitted from the array substrate 121 side. At the time of irradiation of the ultraviolet rays when the color filter 124 is formed (disposed), the color filter 124 absorbs the ultraviolet rays, so that the phase separation by heating the mixed solution cannot be preferably performed. In the case where the pixel electrode 126 is of the reflection type, the ultraviolet rays are reflected by the reflecting electrode. It is therefore impossible to irradiate the mixed solution with light from the array substrate 121 side to perform the phase separation.

Figure 15A:
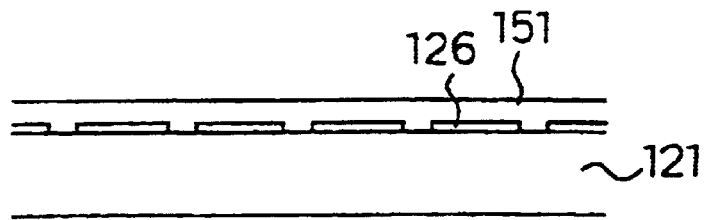
FIGS. 15A to 15C are diagrams for explaining a method of manufacturing the display panel of the invention.
Figure 15B:
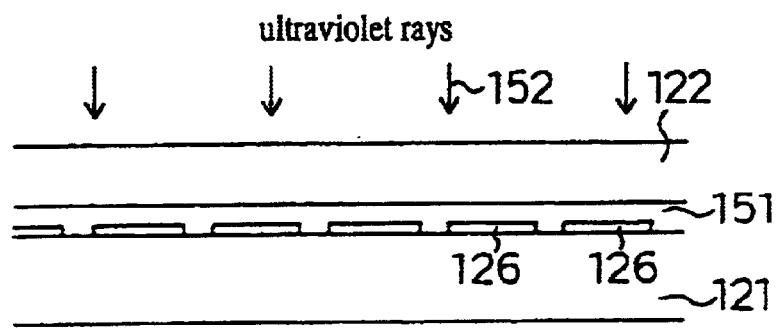
Figure 15C:
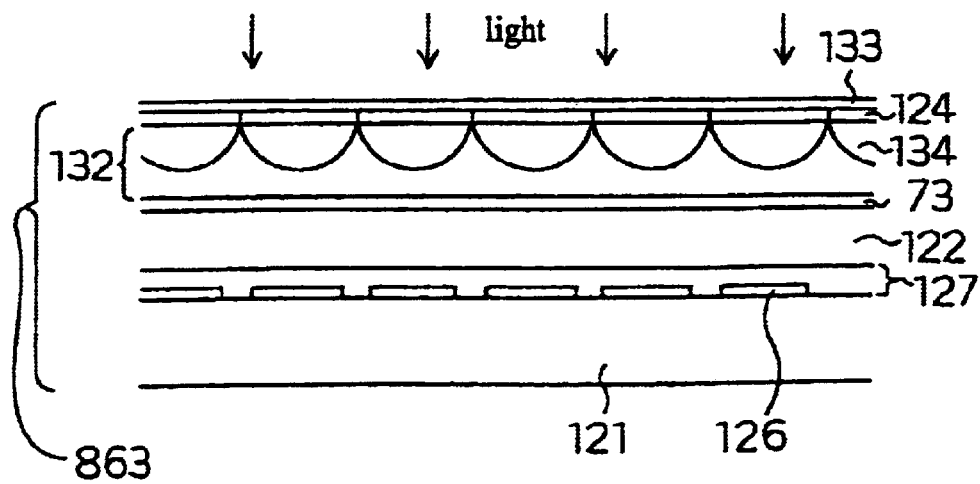

In the invention, as shown in FIG. 15, a mixed solution 151 is sandwiched by the array substrate 121 and the counter substrate 122 (FIG. 15(*a*)). Subsequently, the mixed solution is irradiated with ultraviolet rays from the counter substrate 122 side to thereby separating the phases of the mixture solution. After that, the filter substrate 123, the counter substrate 122, and the transparent resin 73 are adhered (FIG. 15(*c*)).

As the transparent resin 73, a thermosetting or two-fluid mixed adhesive is used. A photo-curing resin is not used since light for hardening is absorbed by the color filter 124 and the resin is not hardened. When the resin component of the mixed solution is of a visible-light curing type, it is not necessary to use a thermosetting or two-fluid mixed adhesive.

When the counter electrode 125 is a reflective electrode and the pixel electrode 126 is a transparent electrode made of ITO or the like, the filter substrate 123 is adhered to the array substrate 121 side.

The optical coupling layer 73 does not have to be provided. In this case, however, interface reflection occurs and about 8% of optical loss occurs. The optical coupling layer 73 can be made of a gel of ethylene glycol or the like, or a liquid of methyl salicylate, ethanol, pure water, or the like. In the case of the gel such as ethylene glycol whose refractive index lies within the range from 1.35 to 1.52 or liquid, the peripheral part of the filter substrate 123 is sealed by a sealing resin (not shown) so that the liquid is not leaked.

On the surface which is in contact with air of the display panel, an AIR coat 72 is applied. The AIR coat is the anti-reflecting film 72 for preventing light reflected by the interface with the air. The AIR coat has a three-layer or two-layer structure. The three-layer coat is used to prevent reflection in the wide range of the wavelength of visible light and is called a multi-coat. The two-layer coat is used to prevent the reflection in the wavelength band of specific visible light and is called a V coat. The multi-coat and V coat are properly used according to the use of the liquid crystal display panel. The anti-reflecting film 72 is used for a display apparatus of the invention.

The multi-coat is formed by stacking aluminium oxide ($Al_2O_3$) having an optical film thickness of $nd=\lambda/4$, zirconium ($ZrO_2$) of $nd_1=\lambda/2$, and magnesium fluoride ($MgF_2$) of $nd_1=\lambda/4$. Usually, $\lambda$ is set to 520 nm or a value close to 520 nm when a thin film is formed. The V coat is formed by stacking silicon monoxide (SiO) having an optical film thickness of $nd_1=\lambda/4$ and magnesium fluoride ($MgF_2$) of $nd_1=\lambda/4$ or yttrium oxide ($Y_2O_3$) and magnesium fluoride ($MgF_2$) of $nd_1=\lambda/4$. Usually, since SiO has an absorption band on blue side, in the case of modulating blue light, it is better to use $Y_2O_3$. From the viewpoint of stability of the substances, $Y_2O_3$ is preferable since it is more stable.

In the configuration of FIG. 13, the color filter 124 is disposed on the microlens 134. Obviously, the color filter 124 may be formed on the light outgoing side of the microlens 134 or the microlenses 124 of three primary colors of red (R), green (G), and blue (B) may be used.

Preferably, the microlens functions as a convex lens and the plane side of the lens is directed to the incident light side so as to satisfy the sine condition. A Fresnel lens may be used as the microlens. Further, the microlens can be replaced with a lens having any condensing function such as a diffracting grating or microprism substrate. The microlens is not limited to the convex lens but can be also applied to a cylindrical microlens.

A microlens which is colored so as to also function as a color filter is formed according to, for example, a method shown in FIG. 89.

As shown in FIG. 89(*a*), small recesses are formed in a microlens substrate 132 by using a stamper technique. As shown in FIG. 89(*b*), the recesses for red are filled with a color filter resin 891R of red by the offset printing method. The ink jet method or bubble jet method (method of forming an ink which will become a filter into drops and spraying the drops onto the substrate 132 by the power of static electricity) can be also used as a method of forming a color filter as shown in FIGS. 89(*a*) to 89(*e*). In the ink jet method or the like, when there are three nozzles of R, G, and B, the color filter can be formed at once. When the number of nozzle is one, it is sufficient to repeat the operation three times.

When the relation between the refractive index $n_1$ of the microlens substrate 132 and the refractive index $n_2$ of the color filter resin is $n_1 > n_2$, the recess has to be formed in a concave shape and the microlens has to be formed as a concave lens.

As illustrated in FIG. 89(*c*), by regularly filling the recesses with color filter resins of green (G) and blue (B), a microlens array is completed.

When the microlens array is produced by filling the recesses with the color filter resins as shown in FIGS. 89A to 89E, concave and convex lenses are formed in the A plane illustrated in FIG. 89(*c*). Since the roughness deflects incident light, the microlenses cannot preferably condense the incident light. As shown in FIG. 89(*d*), therefore, the transparent resin 73 is applied on a transparent substrate 881 made of glass or transparent film and the resultant substrate is adhered to the surface in which the microlenses are formed. After applying a sufficient pressure, ultraviolet rays are irradiated from the transparent substrate 881 side as shown in FIG. 89(*e*) to thereby hardening the substrate resin 73.

By adhering the transparent substrate 881, the roughness on the microlens forming face is buried with the transparent resin 73 and a smooth surface is obtained. The microlens can therefore preferably condense light. The surface of the microlens can be also smoothed by either chemically etching or mechanical polishing the surface in a state shown in FIG. 89(*c*).

Figure 88:
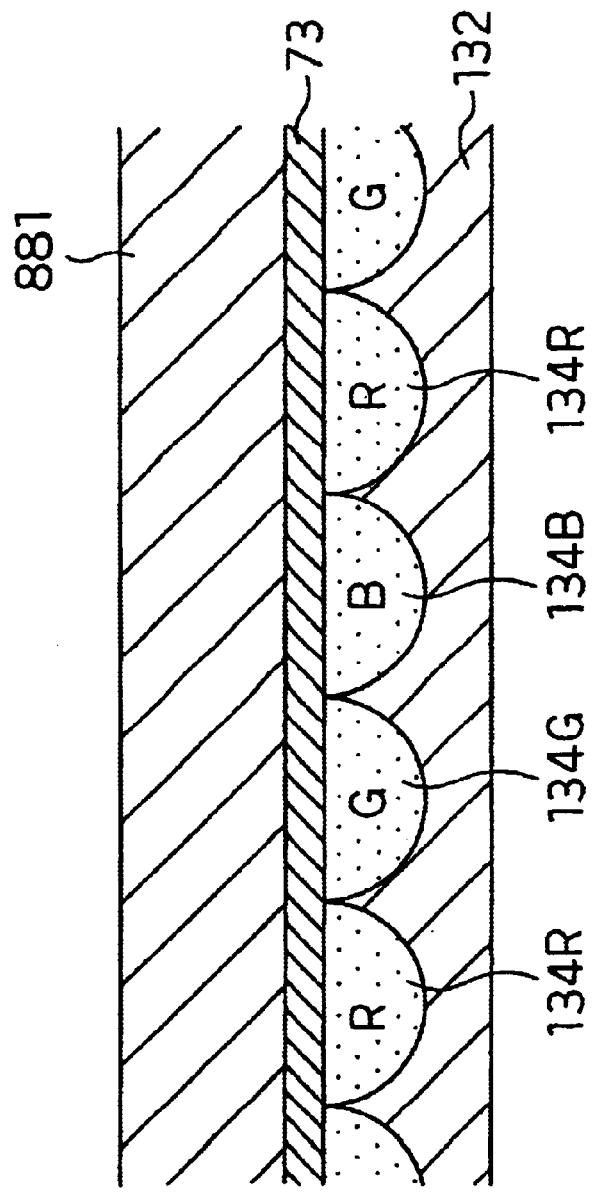
FIG. 88 is a diagram for explaining the display panel of the invention.
Figure 89A:
FIGS. 89A to 89E are diagrams for explaining a method of manufacturing the display panel of the invention.
Figure 89B:
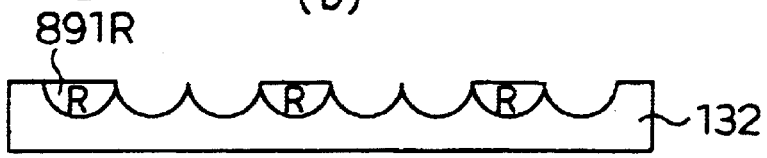
Figure 89C:
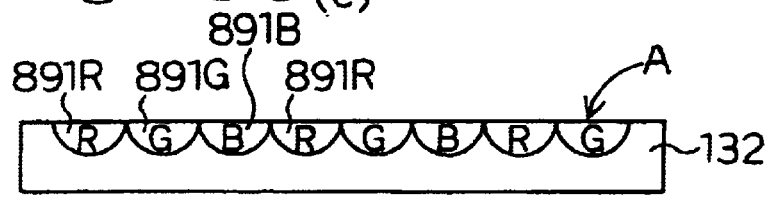
Figure 89D:
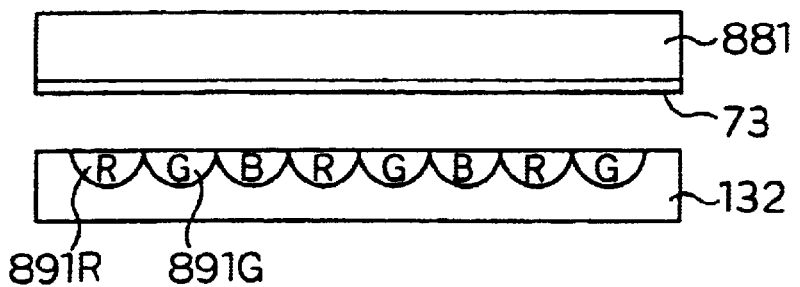
Figure 89E:
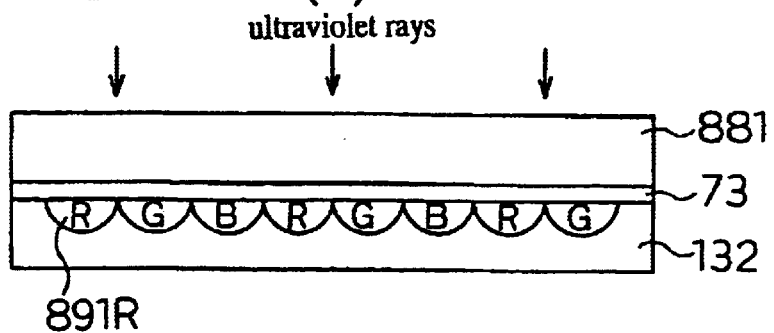

The completed microlens substrate is shown in FIG. 88. By applying the AIR coat on the surface of the transparent substrate (transparent film) 881, light reflected by the interface is prevented.

The three primary colors of cyan, yellow, and magenta can realize higher luminance display as compared with the three primary colors of R. G, and B. When cyan, yellow, and magenta are used, however, there is a tendency that red display is not satisfactory. Consequently, the transparent substrate 881 may be formed by using a dielectric multilayer (dielectric color filter) using an optical interference effect of one or two colors from cyan, yellow, and magenta. Then the color purity becomes proper and a high quality image can be displayed. Since the dielectric multilayer does not absorb light, the liquid crystal display panel does not deteriorate by heat generated by light absorption. The color of the color filter other than the color formed by the dielectric multilayer is formed by the filter made of a resin.

The structure and configuration of forming or disposing the color filters by using both of the dielectric multilayer color filter and the resin color filter can be applied not only to the liquid crystal display panel but also a PDP (Plasma Display Panel), EL display, CRT display, LED display, and the like.

A thin glass substrate (film) 182, the thin counter substrate 122, and the array substrate 121 can be easily adhered as shown in FIG. 12 or 13 by using a manufacturing method shown in FIG. 168.

First, a substrate 1681 (hereinlater, called a smooth substrate) made of a rigid transparent resin, glass, or the like whose surface is smooth is prepared. A thin substrate (film) to be adhered is also prepared. For simplicity of explanation, the thin substrate (film) to be adhered is described as the substrate (film) 122 on which a counter electrode is formed.

The insulating film 131 made of polyimide or the like is formed on the counter electrode 125 on the counter substrate 122. As the function of the insulating film 131 has been described with reference to FIG. 13, the description is omitted here.

The static electricity is generated between the smooth substrate 1681 and the counter substrate 122. It is sufficient to generate the static electricity by rubbing the substrates, rubbing the surface of the substrate by cloth, or spraying steam or dry air. The static electricity can be also generated electrically. The both substrates 1681 and 122 are attracted by each other by the generation of the static electricity (FIG. 168(*a*)). Another attracting method can be also realized by spraying a small amount of water between the substrates. It can be also realized by opening very small holes in the smooth substrate 1681 and attracting the counter substrate 122 from the holes.

As shown in FIG. 168(*b*), by applying a pressure to the smooth substrate 1681 and the array substrate 121, the mixed solution 151 is made uniform. After that, by irradiating the mixed solution 151 with ultraviolet rays or visible rays via the smooth substrate 1681, the resin component in the mixed solution 151 is hardened. When the resin is thermosetting, it is hardened by heating. By the above process, the light modulating layer 127 is completed.

Since the thin counter substrate 122 is uniformly and generally supported by the smooth substrate 1681, even when the substrate 122 has flexibility, the liquid crystal layer 127 can be smoothly manufactured. The thickness of the counter substrate 122 can be produced extremely thin.

The smooth substrate 1681 is detached from the counter substrate (film) 122. When the attraction is carried out by the static electricity, both of the substrates 1681 and 122 can be easily detached from each other by using an ion blower (which is an apparatus for spraying ionized air) (FIG. 168(*c*)).

In the case of attaching the filter substrate 123 to the counter electrode substrate 122, it is sufficient to carry filter substrate 123 out by using the method described with reference to FIG. 16 (FIG. 168(*d*)).

The liquid crystal layer 127 is not limited to one layer in the display panel of the invention but can be of two layers as shown in FIG. 135. In this case, two pixel electrodes are made correspond to one pixel electrode. For example, the pixels 126*a* and 126*b* each having an area which is the half of the area of the pixel 126*c* in the liquid crystal layer 127*c* are formed in the liquid crystal layer 127*a*.

To be specific, the pixel electrode 126*c* is disposed upper than the pixel electrodes 126*a* and 126*b*. In this case, for example, the pixel electrode 126*c* modulates the G light, the pixel electrode 126*a* modulates the R light, and the pixel electrode 126*b* modulates the B light, or the pixel electrode 126*c* modulates the cyan light, the pixel electrode 126*a* modulates the magenta light, and the pixel electrode 126*b* modulates the yellow light. Although the color reproducibility is lower as compared with the case of the three layers, it is sufficient in practice. Obviously, the liquid crystal layer can be of three or more layers.

In the case of forming a plurality of liquid crystal layers 127, it is preferable to use different compositions, structures, and materials of the liquid crystal layers 127 in accordance with the wavelength of light modulating each of the liquid crystal layer and a necessary contrast. For example, in the case of the NCAP, the liquid crystal material in a capsule is changed. In the case of the droplet-shaped liquid crystal, the size of the mean particle diameter, the size of the mean hole diameter, kind of the guest host material, presence or absence of a dye or coloring matter, the kind of a resin material, the thickness of the liquid crystal layer 127, and the like are changed.

Any of the thermosetting type, cold setting type, photocuring type, and two-liquid mixed setting type can be used for the resin component of the mixed solution of the PD liquid crystal layer in each embodiment. It is preferable to form the insulating film 131 on the surface which is in contact with the liquid crystal layer 127 as shown in FIG. 13. By forming or disposing an embossed sheet 6*r* recesses and projections directly on the surface of the array substrate 121, which is in contact with air, the amount of light which is reflected by the interface is reduced, so that a preferable image display can be realized.

Obviously, this can be applied to the display panel of FIG. 12. Each of the matters described in the specification can be also applied to each case even when there is no description.

The refractive index of ITO is preferably equal to or lower than 1.9 and equal to or higher than 1.8 since when the refractive index is high, the amount of light reflected by the interface increases.

In FIG. 1, reference numeral 15 denotes a light emitting device for generating white light. As a light emitting device for generating white light, there is a device of allowing thermoelectrons to collide with mercury molecules to generate ultraviolet rays and irradiating a fluorophor with the ultraviolet rays, thereby emitting light. For example, a fluorescent lamp can be used. Naturally, each of the light emitting devices can be also used as a light source.

Mainly, a white LED is used as a light emitting device in the view finder or the like of the invention. The white LED is allowed to emit white light by forming or disposing a phosphor on the light emitting surface of a blue LED and changing the blue light into visible light of another color. For example, an LED manufactured by Nichia Corporation can be used. A white LED manufactured by Sumitomo Electric Industries, Ltd. can be also adopted.

Figure 4A:
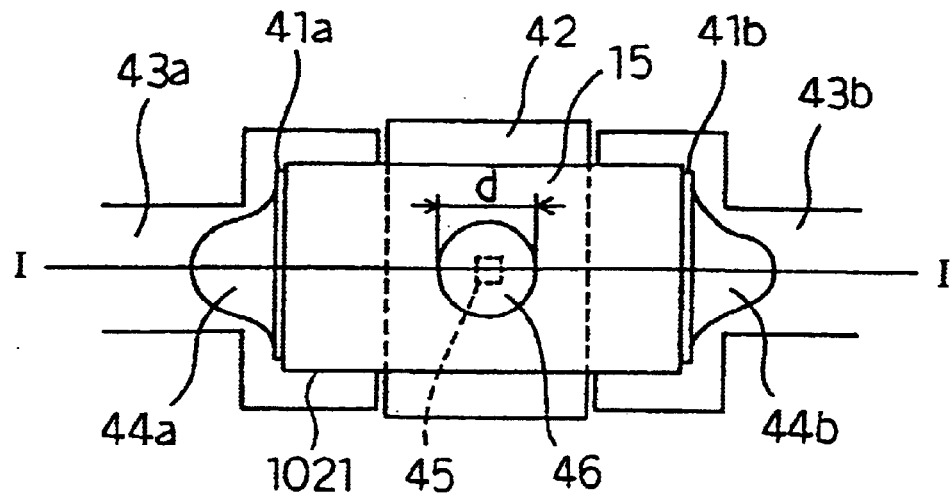
FIGS. 4A and 4B illustrate a light source of the view finder of the invention.
Figure 4B:
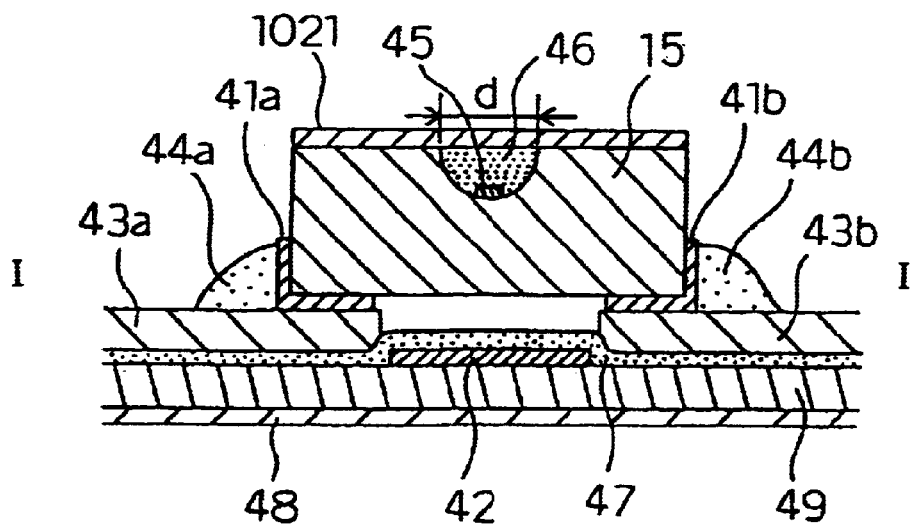

As shown in FIG. 4, an electrode terminal 43 on a printed board 49 and an electrode 41 of the LED 15 are attached via a solder 44. In the center part of the light emitting device 15, an LED chip 45 of blue is disposed and is surrounded by a fluorescent substance 46 of yellow.

One of the characteristics of the illuminating apparatus of the invention is that a reflecting film 42 made of aluminum (Al), silver (Ag), or the like is formed on the back surface of the LED chip 45. The light reflected from the LED chip 45 to the back surface is reflected by the reflecting film 42 to the front surface to thereby enhance the light output. An SiO$_2$ film 47 and the like for preventing the reflecting surface from being oxidized is formed on the reflecting film 42 and a pattern of the electrode terminal 43 and the like is formed on the insulating film 47. It is preferable to commonly use the reflecting film 42 as the electrode 43.

Copper foil 48 is formed on the whole rear surface of the substrate 14. The copper foil 48 functions as a heat discharging plate. Since the light emitting efficiency of the LED 15 is low, most of the supplied power becomes heat. The heat is transmitted to the copper foil and efficiently discharged to the air.

Since the copper foil 48 is used to discharge the heat, besides the copper foil, another metal, ceramics, or the like can be employed. Obviously, a heat discharging plate may be attached. The heat discharging plate 48 made of metal foil such as copper foil has a simple structure and the cost is the lowest. When through holes and the like are formed in the board 49 to connect the copper foil to the terminal of the LED 15 or the reflecting film 42, the heat can be more efficiently and easily discharged.

Since the color and luminance of the light outgoing from the LED 15 are irregular, as shown in FIG. 4, a diffusion sheet (diffuser) 1021 is disposed or formed on the light outgoing side. As the diffuser 1021, a frosted glass plate, resin film containing diffusion particles such as titanium, or opal glass is used. A diffusion sheet (light-up series) sold by Kimoto Co. may be also used. By the diffusion sheet 1021, the color irregularity is eliminated and the area of the diffusion sheet 1021 becomes a light emitting area, so that the light emitting area can be freely set.

The diffusion sheet 1021 may take the form of not only a plate but also an adhesive obtained by adding a dispersing agent into a resin. A thick stack of phosphors can be also used since the phosphor has an excellent light scattering performance. Especially, it is preferable to form the diffusion part in a hemispherical shape as shown in FIG. 5 since the directivity is increased and even the peripheral part of the display area can be uniformly illuminated.

It is important to dispose the diffuser (diffusion sheet) 1021 since color irregularity occurs without it. Preferably, the color temperature of the white LED is equal to or higher than 6,500 kelvin (K) and equal to or lower than 11,000 (K).

Figure 5:
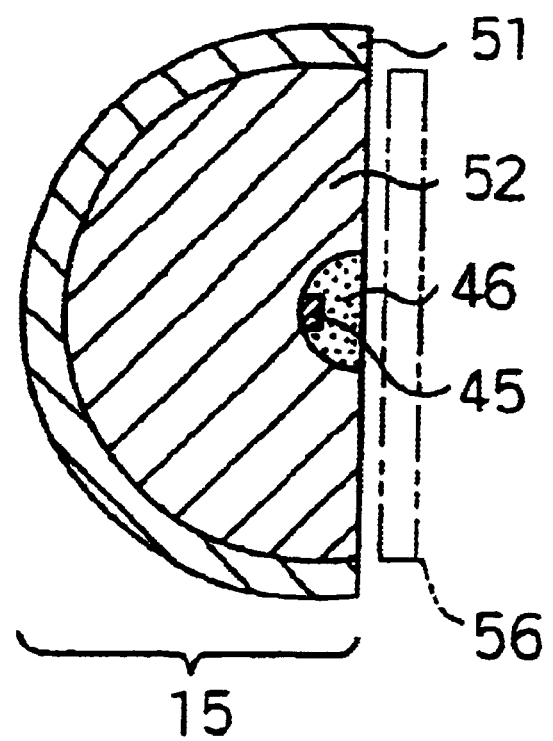
FIG. 5 shows the light source of the view finder of the invention.

Since the light emitted from the LED 15 is diffused light, in order to obtain excellent directionality or the condensing efficiency, as shown in FIG. 5, a concave mirror (preferably, parabolic mirror) 51 is disposed or formed. The concave mirror 51 condenses light emitted from the LED chip 45 and allows the light to travel forward.

As shown in FIG. 5, a device in which the LED chip 46 is molded by using a resin 52 and which is disposed near the focal point of the parabolic mirror 51 may be also used as a light emitting device 15. When a diffusing agent is contained in the resin 52, the color irregularity is reduced.

Figure 6:
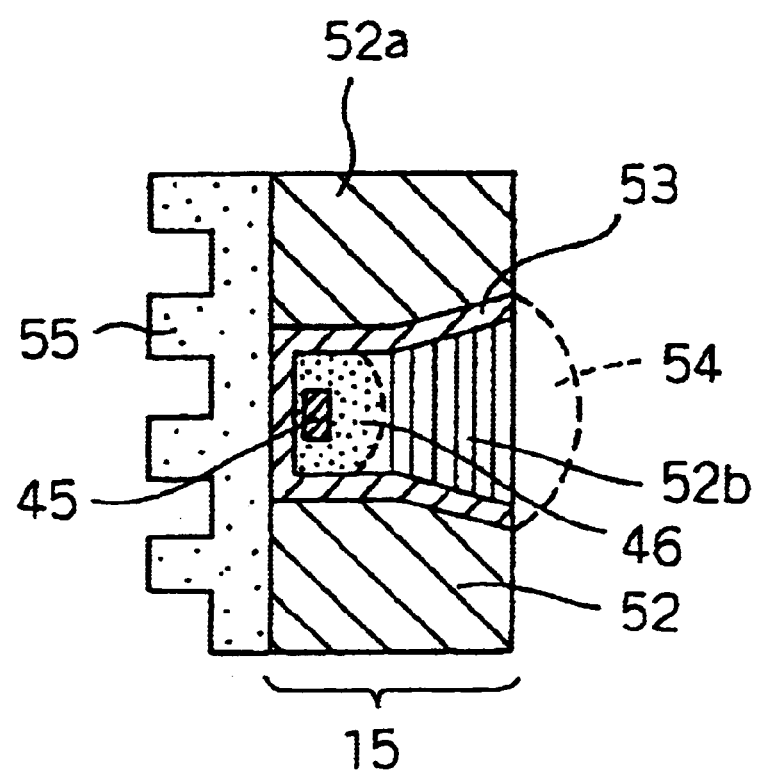
FIG. 6 shows the light source of the view finder of the invention.

As illustrated in FIG. 6, it is also possible to dispose the LED chip 45 on the bottom of a reflecting film 53 of a conical shape (the light outgoing side is wider) and seal the surrounding of the LED chip 45 by the fluorescent substance 46 of yellow. With such a structure, the fluorescent substance 46 serves as the light emitting area and light outgoing to the rear side of the LED is also reflected by the reflecting film 53 to the front. By the reflecting film 53 on the side faces, the light of excellent directionality is emitted. Thus, the efficiency for light utilization can be increased.

By disposing a convex lens 54 on the outgoing side of the reflecting film 53, preferable narrow directed light can be obtained. As shown in FIG. 6, by attaching a heat discharging plate 55 to the rear surface, beat generated from the LED 15 can be preferably discharged. Consequently, the temperature characteristics can be prevented from deterioration caused by the temperature which is too high.

The heat discharging plate 55 and the reflecting film 53 can be also combined. For example, a structure in which a conical hole is opened in the heat discharging plate 55 and the hole is used as the reflecting film 53 can be also used.

By disposing or forming a color filter 56 on the light outgoing side of the white LED 15, the color temperature of the emitted light can be improved. Especially, when the light emitting device 15 is the white LED, there is a band in which light has a strong peak in blue, so that LEDs vary largely.

Consequently, the color temperature of an image displayed on the display panel 863 varies largely. By disposing the color filter 56, the variation in color temperature of the displayed image can be reduced. Especially, when the white LED is used as the light emitting device 15, the ratio of the blue light is high. The chromaticity of filters of colors is therefore adjusted in accordance with the color of the color filter of the display panel 863.

Obviously, when a dye or the like to be added to the color filter 56 is added to the diffuser 1021, the color filter 56 becomes unnecessary. That is, it is sufficient to use the diffuser 1021 to which a dye or pigments is/are added. An interference filter comprised of the color filter 56 and a dielectric multilayer may be also used.

Figure 7:
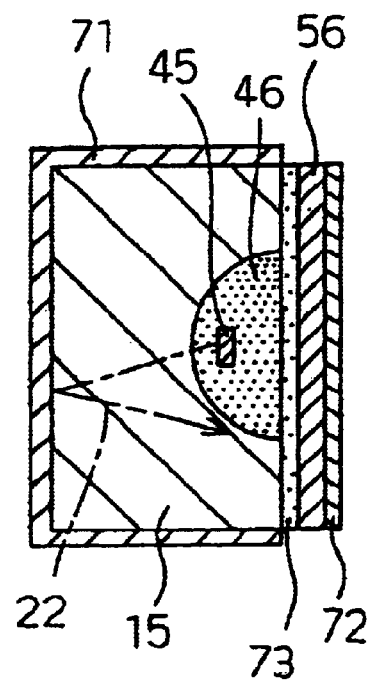
FIG. 7 shows the light source of the view finder of the invention.

As shown in FIG. 7, the light emitting device 15 is surrounded by a reflector 71 and the color filter 56 is disposed on the light outgoing surface on which the reflector 71 is not formed. The optical coupling layer 73 is formed between the color filter 56 and the light emitting device 15 so as to optically couple them, thereby suppressing the reflection light. The anti-reflecting film 72 is formed on the surface of the color filter 56.

Figure 8:
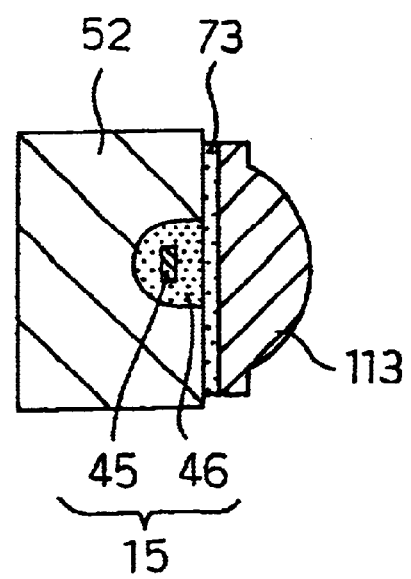
FIG. 8 shows the light source of the view finder of the invention.

As shown in FIG. 8, a convex lens 113 may be attached to the light outgoing surface of the light emitting device. By attaching the convex lens 113, the light emitting device 15 having excellent directionality can be obtained. As the convex lens 113, a resin lens or glass lens can be used. The shape of the convex lens is not limited to the convex shape. It also includes a plate shape such as a Fresnel lens. That is, a lens having the condenser function is called a convex lens. There is also a case that a concave lens is more suitable in consideration of the directivity of the LED.

Figure 9:
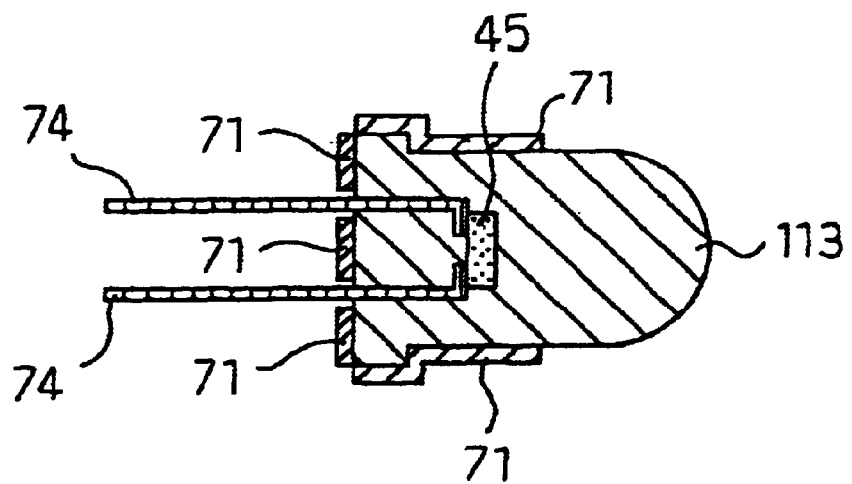
FIG. 9 shows the light source of the view finder of the invention.

FIGS. 4 to 8 show chip-typed LEDs. As shown in FIG. 9, the resin-molded LED may be also used as the light emitting device 15. In FIG. 9, the chip 45 is resin molded and the resin lens 113 is formed on the light outgoing side. The reflectors 71 are formed or disposed on the bottom and also on the side faces. Consequently, all of the light from the chip 45 is sent to the front and condensed by the resin lens 113.

Figure 10:
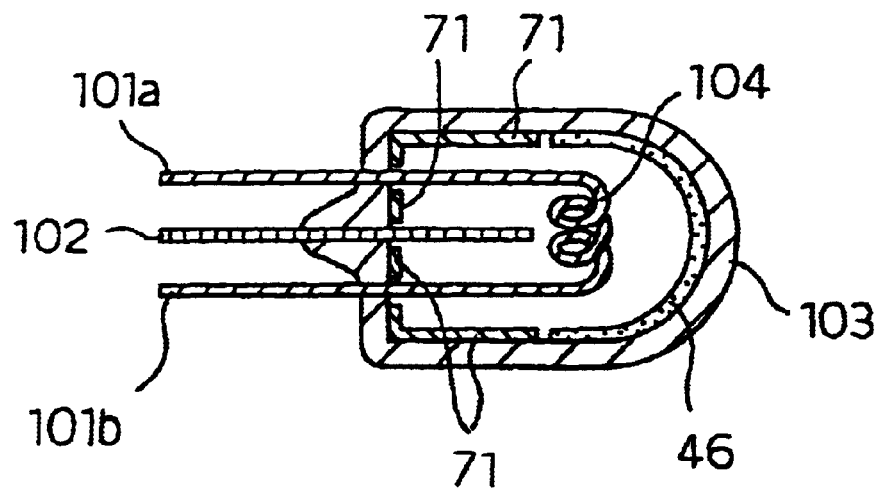
FIG. 10 shows the light source of the view finder of the invention.

Besides the above, a fluorescent light emitting lamp as shown in FIG. 10 can be also used as the light emitting device 15. A casing 103 of the lamp is filled with mercury molecules (not shown) and gas such as hydrogen, helium, or neon. On the back surface of the casing 103, the fluorescent substance 46 is applied.

As shown in FIG. 10, heater terminals 101a and 101b are connected to a heater 104. By applying a current to the heater terminals 101, the heater is heated and thermoelectrons are discharged. By applying a voltage to an anode terminal 102, the voltage is applied to the anode, the thermoelectrons are accelerated, and ultraviolet rays are generated in the casing 103. The generated ultraviolet rays are converted into visible light by the fluorescent substance 46. The reflectors 71 are formed or disposed on the inner face, bottom face, and side faces of the casing 103. The fluorescent substance 46 is irradiated with all of the ultraviolet rays generated in the casing 103. The luminance of the fluorescent substance 46 can be therefore increased.

When the white LED is used as the light emitting device 15, only the fluorescent substance 46 part is the light emitting area. When the LED is of a chip type, the diameter of the light emitting area is about 1 mm. When the parabolic surface is large, that is, when the diagonal length (m) of the valid display area of the display panel is long, there is a case that the diagonal length when the diameter is 1 mm is too small. That is, the light incident on the display panel 863 is directed too narrow. Although it depends on design of the angle of view of the magnification lens 866, in the case where the light emitting area of the light emitting device 15 is small, when the position of the eye is slightly moved from the eyepiece cover 852, the observer cannot see the displayed image. The diffuser 1021 is therefore disposed on the light outgoing side as shown in FIG. 4 to enlarge the light emitting area.

When the light emitting device 15 is a LED, a constant current driving is performed. By performing the constant current driving, a change in the luminance due to the temperature dependency is reduced. By the pulse driving, the power consumption of the LED 15 can be reduced while maintaining the luminance high. The duty of pulse is set to ½ to ¼ and the cycle is set to 50 Hz or higher. When the cycle is as low as, for example, 30 Hz, a flicker occurs.

Preferably, the diagonal length (or diameter) d (mm) of the light emitting area of the LED 15 satisfies the following relation when the diagonal length of the valid display area of the display panel 863 (diagonal length of an area valid to display an image watched by the observer) is set to m (mm).

$$\frac{m}{15}(mm) \leq d(mm) \leq \frac{m}{2}(mm) \qquad \text{(Expression 10A)}$$

More preferably, it satisfies the following relation.

$$\frac{m}{10}(mm) \leq d(mm) \leq \frac{m}{3}(mm) \qquad \text{(Expression 10B)}$$

When (d) is too small, the directivity of light illuminating the display panel 863 is too narrow and the display image watched by the observer is too dark. On the other hand, when (d) is too large, the directivity of light illuminating the display panel 863 is too wide and the contrast of the display image is lowered.

For example, when the diagonal length of the valid display area of the display panel 863 is 0.5 inch (=13 mm), the diagonal length or the diameter of the light emitting area of the LED of 2 to 3 mm is proper. The size of the light emitting area is easily adjusted according to the purpose by adhering or disposing the diffusion sheet 1021 on the light emitting surface of the LED chip.

As shown in FIG. 1, light emitted from the LED 15 is converted by the condenser lens 11 into almost parallel rays which illuminate the display panel 863. A Fresnel lens may be used as the condenser lens 11. Also in the case where the concave mirror is disposed in place of the condenser lens 11, the light can be condensed (refer to FIGS. 27, 34, and the like). The convex mirror can be therefore used as condensing means.

The almost parallel light denotes light having excellent directionality but does not means perfect parallel light. Light which is condensed to the optical axis or light which is dispersed may be used. That is, it denotes light which is not emitted from a diffusion light source such as plane light source.

In the view finder of the invention, the display panel 863 is illuminated from the direction of $\theta_k$ with respect to the normal line (optical axis 14) of the display panel 863. Even when the diameter of the condenser lens 11 is small, the wider display area of the display panel 863 can be illuminated.

The display panel of the invention illustrated in FIG. 12 and the like is used as the display panel 863. The display panel 863 is a PD display panel in the NW mode. When a pixel displays black, the liquid crystal layer 127 is transparent and the illumination light 22a is reflected by the reflecting electrode 126 and becomes the reflected light 22b. On the other hand, when a pixel displays white, the liquid crystal layer 127 is in the scattered state, the illumination light 22a entering the pixel becomes the scattered light 31, and a part of the light reaches the eye 21 of the observer via the magnification lens 866.

It is also advantageous that the PD display panel does not depend on the incident angle, which is the characteristic of the PD display panel. In a TN liquid crystal display panel, in the case of black display in the NW mode, when light is deviated from the optical axis (incident light 22a), the contrast largely deteriorates.

In the PD display panel 863, however, though the angle $\theta_k$ of the light is large (the angle becomes smaller according to the refractive index in a diagonal substrate), the contrast does not deteriorate. The optical axis of the incident light and the axis 14 of the observer's view can be deviated from each other, so that the optical system can be easily constructed.

Sufficient light reaches the eye 21 of the observer without slightly roughing the reflecting electrode. Since the polarizer is not used for light modulation, brightness is twice or more than that of the TN system. Light which does not contribute to the light modulation, for example, light reflected by the interface with air (surface of the panel) of the display panel 863 becomes the reflected light 22b and it is advantageous when the light does not reach the eye 21 of the observer. It is also advantageous since the contrast is largely improved.

The PD liquid crystal has, however, a problem that bias potentials applied to the pixels of R, G, and B are different from each other. It is presumed that the cause is the wavelength dependency of incident light. That is, it is necessary to adjust each of the potentials of video signals of the three primary colors with respect to the potential of the counter electrode. Especially, light of a long wavelength such as red has to be adjusted largely. Without adjusting each of the bias potentials, black cannot be preferably displayed.

It is therefore necessary to adjust the bias voltages by using one of video signals of the three primary colors as a reference. For example, a bias voltage V1 is applied for a video signal of R and a bias voltage V2 is applied for a video signal of B. The operation is similarly performed to the case where the three primary colors are cyan, yellow, and magenta. That is, the center value of the video signal is changed according to each of R, G, and B.

On the PD display panel, in order to obtain the maximum white display in the NW mode, a voltage applied to the liquid crystal layer 127 is set to be higher than a threshold voltage of the liquid crystal. The threshold voltage is a voltage by which the liquid crystal starts to transmit. In other words, an image is displayed when a voltage applied to the pixels is larger than the threshold voltage and equal to or smaller than the maximum application voltage. The maximum application voltage is a voltage by which the transmittance (except for the reflection light on the interface and the like) of the liquid crystal layer is 90%.

That is, in the NW mode, the liquid crystal layer is not used in a complete scattering state. A voltage to the pixel is set to be larger than the threshold voltage in order to properly reduce the scattering and use also the light reflected by the reflecting electrode, thereby enabling bright white display to be realized. Specifically, the state where the transmittance is equal to or higher than 3% and equal to or lower than 20%, more preferably, it is equal to or higher than 5% and equal to or lower than 15% is used as the maximum white display state. In the NB (Normally Black) mode, the above is opposite.

The white display is adjusted by measuring the luminance from the optimum angle of view (the direction of viewing the display panel by the observer), a voltage applied to the pixel is adjusted so that the luminance becomes the maximum, and a gamma is adjusted. A volume used by the observer, which does not vary the application voltage in the black display but can vary the application voltage in the white display in the NW mode is disposed. The volume as a user volume is attached to the body of a video camera or the like. The observer (user) can easily adjust the volume while watching the display image so as to obtain the brightest image.

According to experiments and the like, in the brightest state, the transmittance is equal to or higher than 3% and equal to or lower than 20%. This can be applied to a scattering type display panel and view finder which perform the other light modulations in the DSM mode and the like by changing the scattering/transmitting state. Obviously, it can be applied to a direct-view display panel. Especially, it is optimum to use it in a video display apparatus such as a portable personal computer.

It is preferable to form a plurality of (specifically, two) pixel electrodes per pixel. It is prepared so that a voltage can be applied separately to each of the plurality of pixels. For this purpose, switching devices for respective pixel electrodes are necessary. Alternately, the two pixel electrodes may be capacity coupled by using a capacitor. In this case, one switching device is sufficient for one pixel. When 5V is applied to a pixel electrode, 3.5V is applied to the other pixel electrode in the same pixel. A liquid crystal layer having a plurality of T-V (transmittance-voltage) characteristics for a pixel (one pixel electrode) is formed. For example, a PD liquid layer having an area where the maximum transmittance is obtained when 5V is applied and an area where the maximum transmittance is obtained when 3.5V is applied is formed by changing the NCAP of the liquid crystal layer, mean particle diameter of the droplet-shaped liquid crystals, or mean hole diameter. It is also sufficient to change the composition of the liquid crystal layer 127. By the configuration, the viewing angle is widened and an image display can be watched easier.

In the view finder of the invention or the like, the magnification lens 866, eyepiece ring 865, and the like can be omitted. Although the image displayed on the display panel 863 becomes smaller, it can be often applicable in practice.

The lens 11 is not limited to a convex lens. For example, when the light emitting device 15 is a stick-type fluorescent tube, a cylindrical lens may be used. When there are light emitting areas discretely, a plurality of lenses which are connected to each other or separated may be used.

The light reflected by the reflecting electrode 126 becomes reflected light, enters an optical absorption walls 12 and is absorbed. The optical absorption walls 12 are obtained by, for example, adding black coating to acrylic. When the body 851 is made of a black resin or the like, it is unnecessary to form the optical absorption walls 12 since the reflected light is absorbed by the body 851.

It is preferable to make the inside of the body black or a dark color from the viewpoint of suppression of balation. The optical absorption walls have to be therefore regarded as optical absorbing means. It is effective to apply black coating to the surface of the body 851 and an invalid area in the display panel 863 (area which does not transmit light valid to display an image).

Since the PD display panel performs light modulation by changing the light scattering state, by sufficiently absorbing invalid scattered light and the like, high contrast can be realized. Since the method of slightly roughing the reflecting electrode 126 also scatters the incident light, it is effective to form or dispose the optical absorbing means in the body.

A variable aperture such as a color aperture can be also used as the aperture 13. In this case, a lever (not shown) is arranged outside of the body 851. By moving the lever, the stop of the aperture is changed according to a color. The observer performs adjustment while watching the display image so that the contrast becomes high and the luminance becomes proper.

A predetermined interval S is necessary between the magnification lens 866 and the display panel 863 so that the observer can watch a virtual image of the image on the display panel 863. In the case of assembling the view finder to a video camera or the like, the shorter the interval S is, the better.

In order to solve the problem, in the view finder of the invention, therefore, as shown in FIG. 21, the body 851 is divided into parts 851a and 851b so as to be contractible. That is, the distance between the magnification lens 866 and the liquid crystal display panel 863 can be shortened. It is also desirable to be able to shorten the distance between the light emitting device 15 and the liquid crystal display panel 863.

Figure 21A:
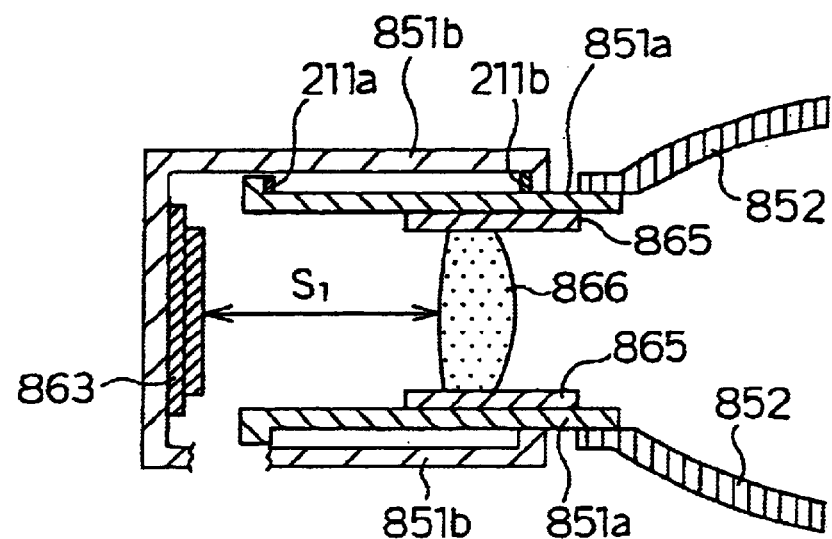
FIGS. 21A and 21B show the configuration of the view finder of the invention.
Figure 21B:
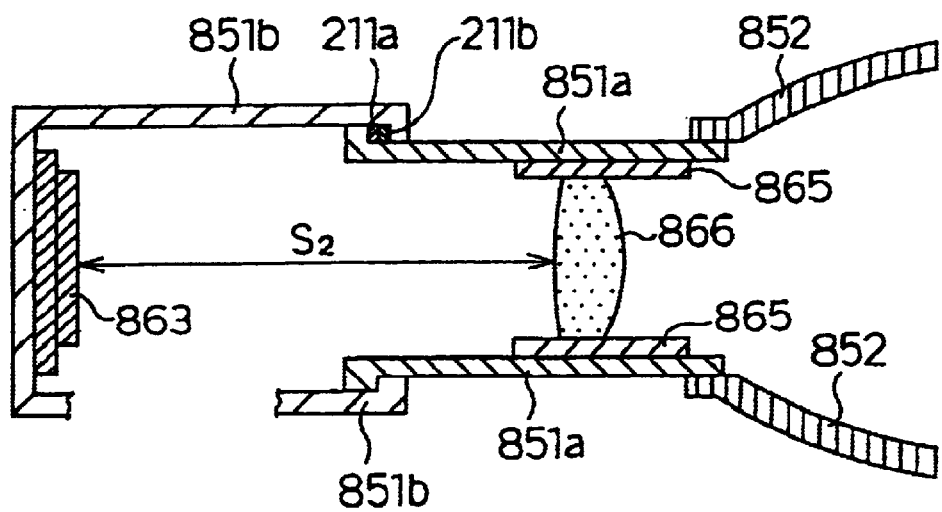

FIG. 21(a) shows a state where the body is contracted FIG. 21(b) shows a state where the body is extended so that the observer can use the view finder. The magnification lens 866 and the like are attached to or disposed in the body 851a The display panel 863 is attached to or disposed in the body 851b.

When the view finder is not used, the observer (user) pushes the body 851a into the body 851b. Reference numeral 211 denotes a contact as a switch to turn on the light emitting device 15. When contacts 211a and 211b come into contact with each other, the light emitting device 15 is turned on. When they are disconnected, the light emitting device 15 is turned off.

In the state of FIG. 21(a), the contact is opened and the light emitting device 15 is turned off. On the other hand, in order to use the view finder as shown in FIG. 21(b), when the user pulls the body 851a from the body 851b, the contacts 211a and 211b are closed and the light emitting device 15 is turned on. That is, the observer (user) can automatically turn on the light emitting device 15 at the time of using the view finder without turning on the turn-on switch of the light emitting device 15.

The view finder of another embodiment of the invention will be sequentially described with reference to the drawings.

Figure 22:
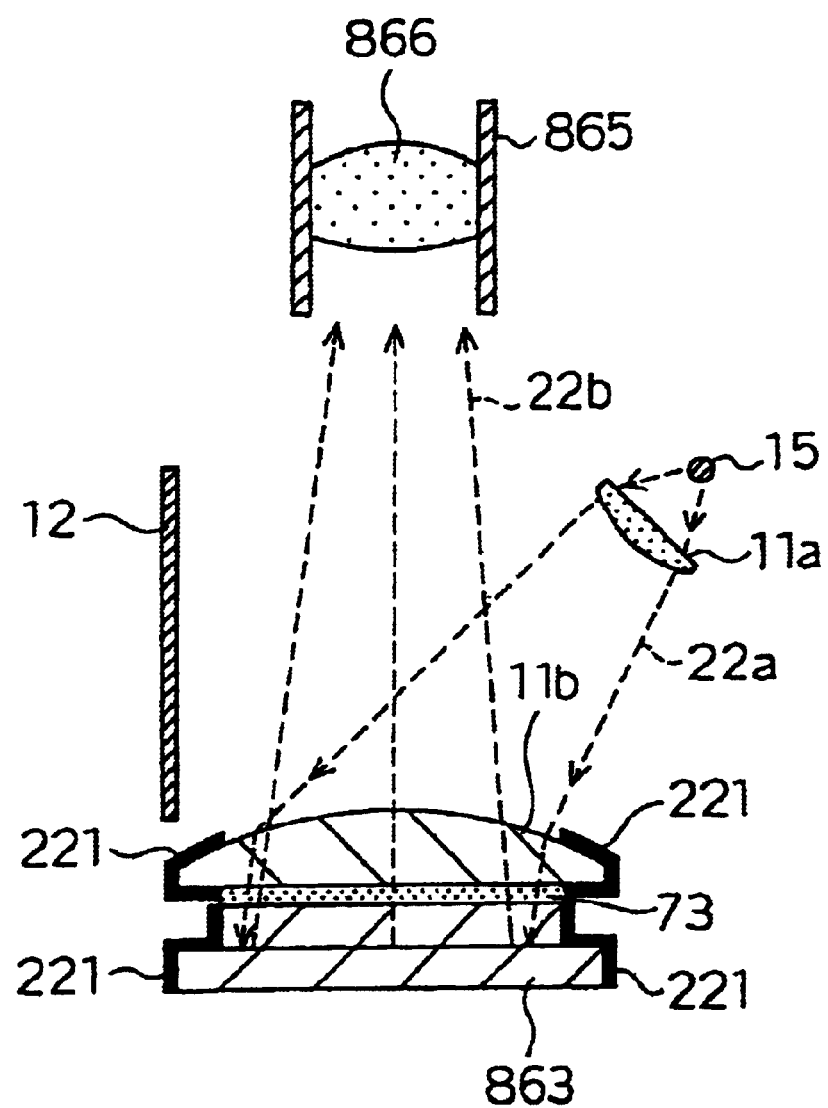
FIG. 22 illustrates the configuration of the view finder of the invention.

FIG. 22 shows a configuration in which the convex lens 11b is disposed on the light outgoing surface of the display panel 863.

In the diagram, the convex lens 11b is adhered to the display panel 863 via the optical coupling layer 73 in order to prevent occurrence of halation between the flat plane of the convex lens 11b and the display panel 863.

The light emitted from the LED 15 is subjected to a directionality control at the first stage by a small lens 11a and is converted by the lens 11b into almost parallel light. Obviously, when the almost parallel light can be obtained only by the lens 11b, the lens 11a is unnecessary.

The light modulated by the display panel 863 is condensed by the lens 11b, passes through the magnification lens 866, and arrives at the eye of the observer.

The reason of condensing the light by the lens 11b is to reduce the diameter of the magnification lens 866 and reduce the necessity of the magnification lens 866. There is also an advantage that the view finder can be miniaturized as a whole.

The reason why the convex lens 11b is disposed on the light outgoing side of the display panel 863 and condenses light will now be described with reference to FIG. 23.

Figure 23A:
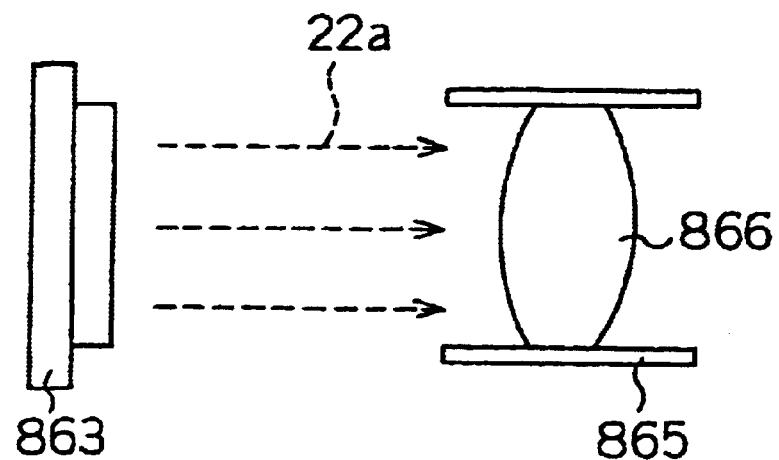
FIGS. 23A and 23B are diagrams for explaining the view finder of the invention.
Figure 23B:
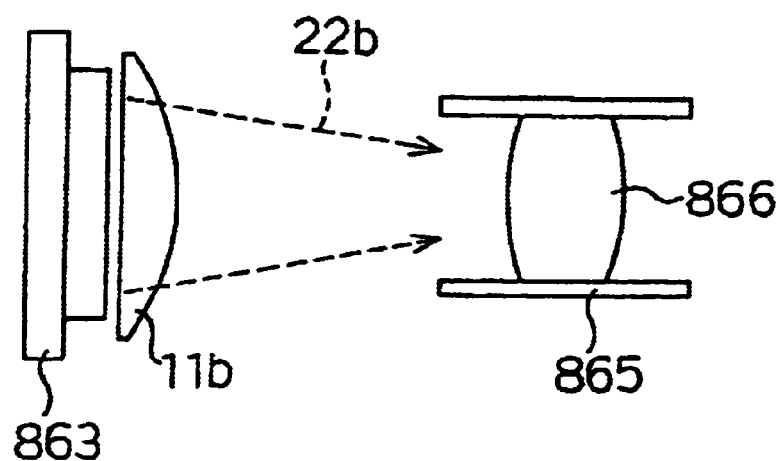

In FIG. 23(a), light (principal ray) emitted from the display panel 863 is parallel light. The diameter of the magnification lens 866 has to be the same as that of the diagonal length of the valid display area of the display panel 863. On the other hand, in the case of FIG. 23(b), since the lens 11b is disposed, the light (principal ray) emitted from the display panel 863 is condensed by the lens 11b. Consequently, there is an effect such that the diameter of the magnification lens 866 can be shorter than the diagonal length of the valid display area of the display panel 863.

In FIG. 22, the convex lens 11b has both of the functions of converting the light-emitted from the light emitting device 15 into parallel light and condensing the light so that a small diameter of the magnification lens 866 is sufficient. In order to eliminate difficulties in designing arose from using the two functions in optical designing, the lens 11a is disposed on the light outgoing surface of the light emitting device 15.

It is preferable to form or dispose the optical absorbing film 221 made of black coating or the like on the display panel 863 and/or the invalid area (area which does not transmit light valid to display an image) of the lens 11b in order to absorb unnecessary light scattered by the liquid crystal layer 127 and improve the contrast.

Figure 24:
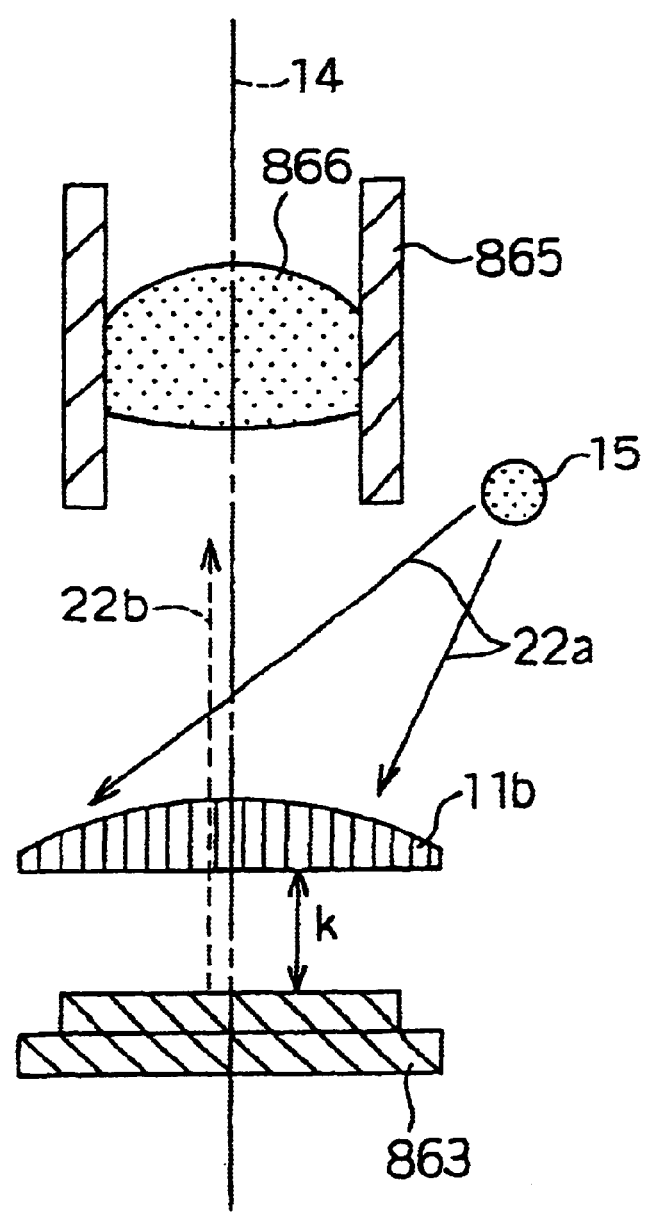
FIG. 24 shows the configuration of the view finder of the invention.

In FIG. 22, the lens 11b is adhered to the display panel 863, the invention is not limited to the configuration. As shown in FIG. 24, for example, the lens 11b and the display panel 863 may be set apart at a predetermined distance (k). The longer the distance is, the more the condenser lens 11 does not easily condense unnecessary light.

Generally, when the diagonal line of the display area of the display panel 863 is set to (m) mm, in the case where the display panel 863 is a PD display panel, it is sufficient that (k) satisfies the following expression.

$$\frac{1}{2}m \le k \le 2 \cdot m \qquad \text{(Expression 11)}$$

In the case where the display panel 863 is a display panel such as a TN display panel, which is not the PD liquid crystal display panel, it is sufficient that (k) satisfies the following expression.

$$\frac{1}{4}m \le k \le m \qquad \text{(Expression 12)}$$

The larger (k) becomes, the more unnecessary light is not condensed. Especially, it is preferable in the case of the PD display panel since unnecessary scattered light is not easily condensed. When it is, however, too long, the diameter of the lens 11b becomes large and the size of the view finder also becomes too large.

Figure 25:
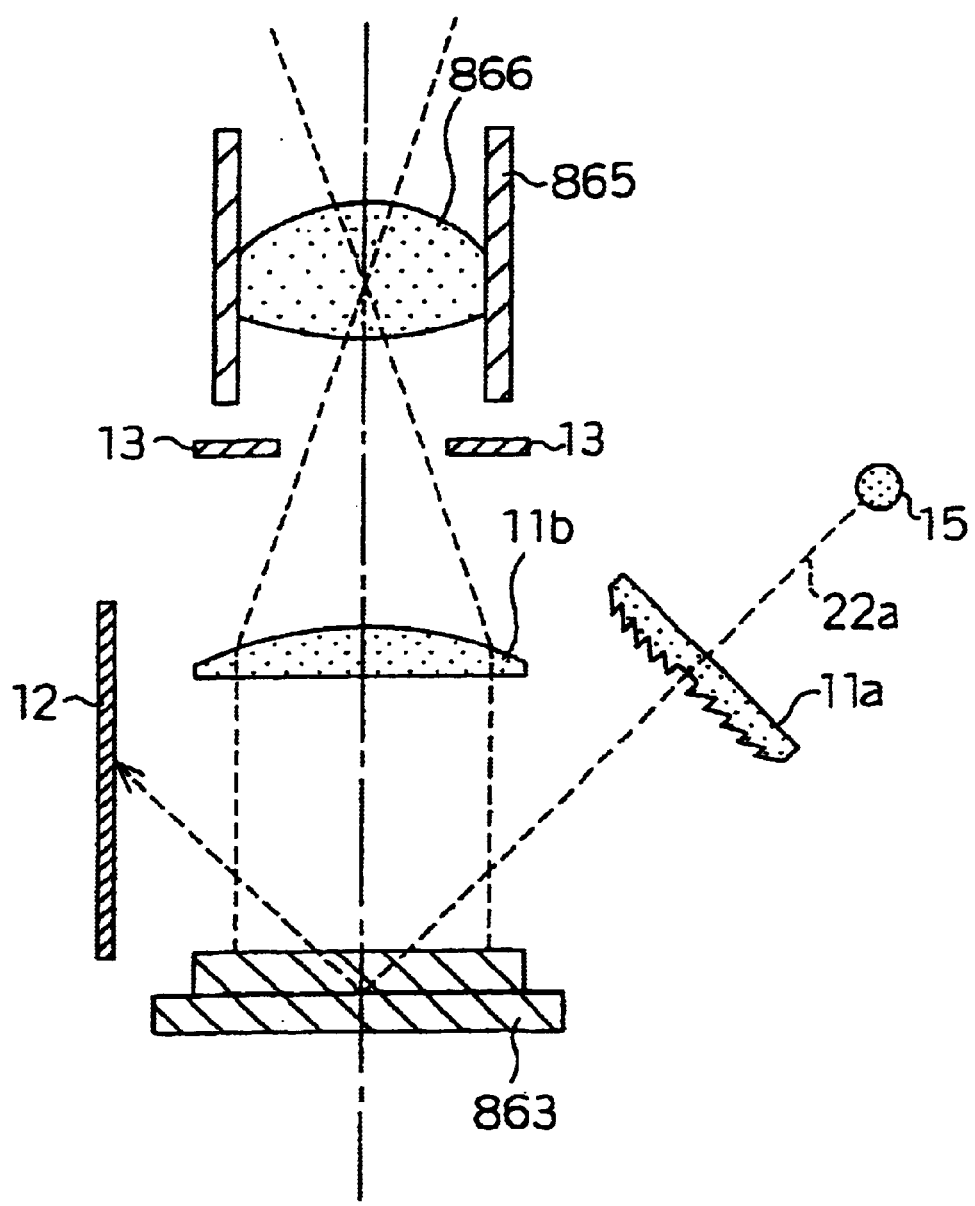
FIG. 25 shows the configuration of the view finder of the invention.

It is effective to dispose the aperture 13 between the display panel 863 and the magnification lens 866 as shown in FIG. 25 in order to prevent the unnecessary scattered light from entering the magnification lens 866. It is preferable to make the opening of the aperture 13 variable in a manner similar to FIG. 1 since the observer can freely make adjustment.

In FIGS. 22 and 24, the light emitting device 15 emits light via the lens 11b disposed on the light outgoing surface of the display panel 863. Obviously, it can directly illuminate the display panel 863 without passing through the lens 1b as shown in FIG. 25.

The view finder having the configuration of FIG. 25 largely condenses light by the lens 11b since the aperture 13 is disposed and allowed to function effectively.

Figure 26:
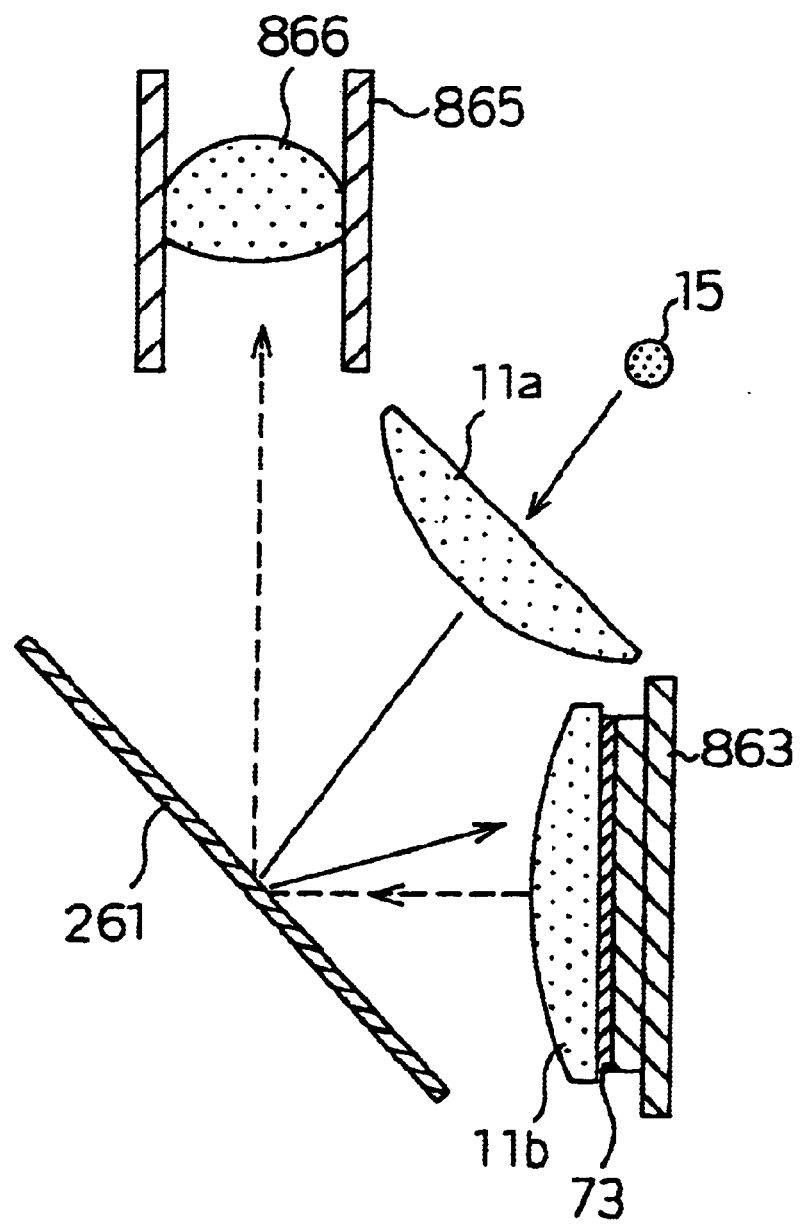
FIG. 26 shows the configuration of the view finder of the invention.

In order to make the distance (k) between the magnification lens 866 and the display panel 863 longer, the configuration as shown in FIG. 26 may be used. The light emitted from the light emitting device 15 is condensed by the lens 11a into almost parallel light, the almost parallel light is reflected by the mirror 261, and the reflected light illuminates the display panel 863. On the other hand, the light which goes out from the display panel 863 is reflected by the mirror 261 and enters the magnification lens 866.

Since the optical path can be bent by 90 degrees in the configuration of FIG. 26, the size of the view finder is reduced.

Figure 27:
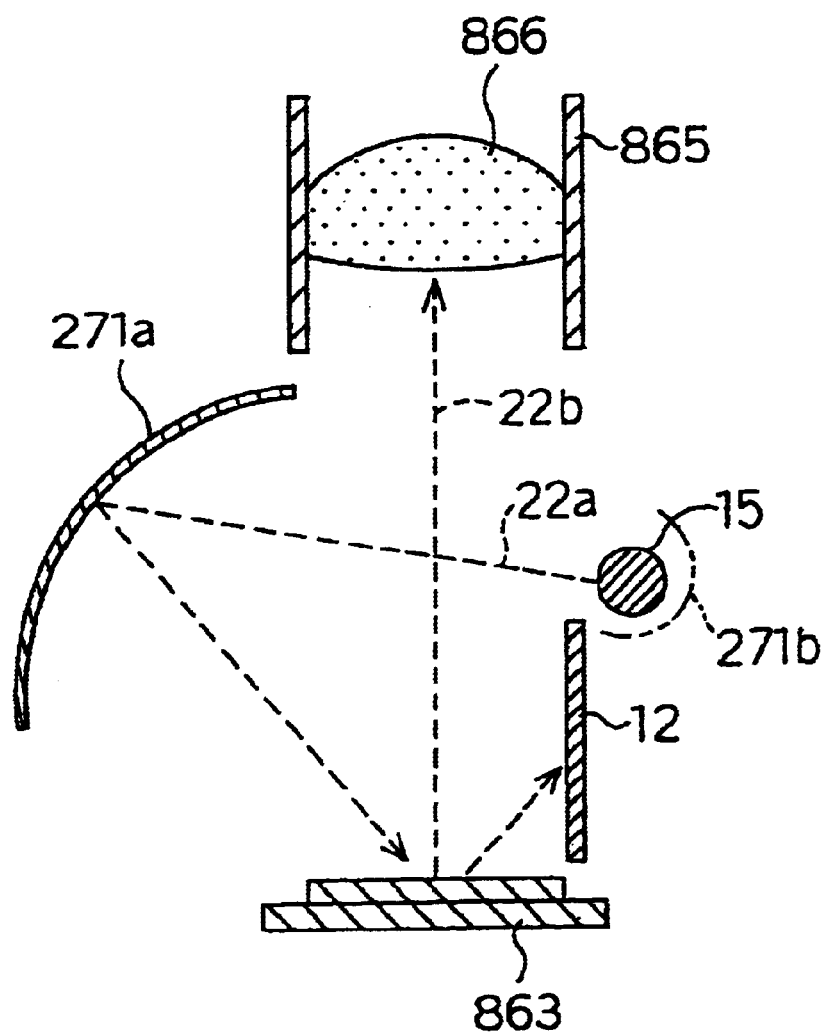
FIG. 27 shows the configuration of the view finder of the invention.

In FIG. 27, light of excellent directionality is formed by using a parabolic mirror 271 in place of the condenser lens 11. The light emitted from the light emitting device 15 is reflected by a concave mirror 271a such as a parabolic or ellipsoidal mirror and becomes parallel light. The parallel light illuminates the display panel 863.

In the configuration of FIG. 27, the distance from the light emitting device 15 to the display panel 863 can be made sufficiently longer and the size of the view finder can be reduced. By disposing a concave mirror 271b also on the back surface of the light emitting device 15, an image can be displayed with higher luminance.

Although the magnification lens 866 is disposed on the axis as the normal line of the display panel 863 in the foregoing embodiment, the invention is not limited to the arrangement. A configuration as shown in FIG. 28 in which an angle 74 is formed by the axis 14b of the magnification lens 2866[sic] and the normal line 14a of the display panel 863 and the display panel 863 is illuminated obliquely may be also used.

Specifically, in the view finder of the invention, a predetermined angle $\theta_k$ is formed by the principal ray of the display panel 863 and the axis of the magnification lens 866 and is fixed from the viewpoint of configuration, thereby realizing a very bright display with high contrast by a low electric consumption.

Figure 28:
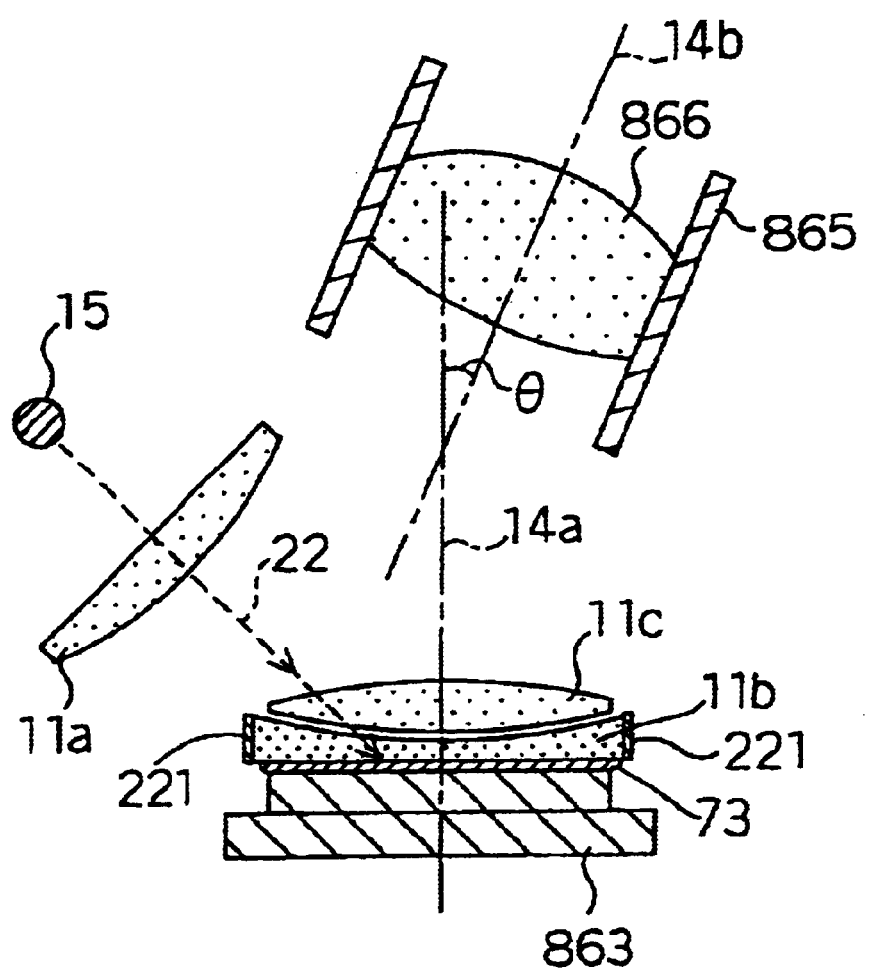
FIG. 28 shows the configuration of the view finder of the invention.

In FIG. 28, the concave lens 11b is adhered (optical coupled) to the light outgoing surface of the display panel 863 by the optical coupling agent 73. The optical absorbing film 221 is formed in the invalid area of the concave lens 11b to absorb unnecessary scattered light generated by the liquid crystal layer 127 and the like.

Especially, in the case of the concave lens 11b, the light reflected by the concave surface is absorbed effectively by the optical absorbing film 221 at the edge part of the lens 11b. Consequently, halation does not easily occur. A positive lens 11c is also disposed near the concave lens 11b with a slight air gap. By combining the positive lens 11c and the concave lens 11b as mentioned above, the function of the convex lens can be realized as a whole. The influence of the chromatic aberration can be also eliminated. When the magnification lens 866 and the lenses 11c and 11b are designed in a ray-tracing manner, the ratio of the light amount of the display panel to that of the peripheral part can be sufficiently increased. This is the matter which is difficult to be realized by a conventional plane light source method.

Figure 29:
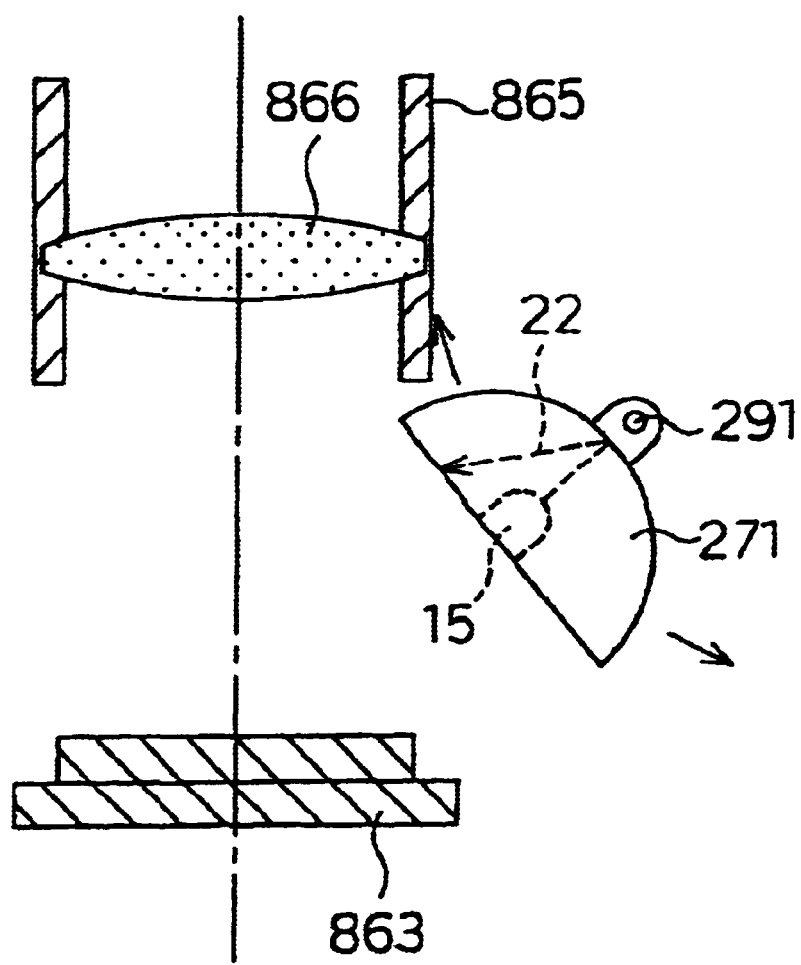
FIG. 29 shows the configuration of the view finder of the invention.

As described in the embodiment of FIG. 27, the convergence of excellent directionality can be obtained by using the concave mirror 271a instead of using the convex lens 11 or the like. FIG. 29 shows a configuration in which the light flux of excellent directionality is generated only by the concave mirror 271. The concave mirror 271 is made of a transparent resin such as acrylic or polycarbonate and is obtained by forming a reflecting film on the outer face of the transparent resin.

A hole is opened in the central part of the concave mirror and the light emitting device 15 is inserted in the hole. The light 22 emitted from the light emitting device 15 is reflected by the concave surface and emitted.

The concave mirror 271 is provided with a fulcrum 291 and the observer can move the concave mirror 271 around the fulcrum 291 as a center in the directions of the arrows in FIG. 29, so that the observer can adjust the illumination light to the position in which the display image cart be observed most preferable.

The above relates to the case where the display panel is of the reflection type. When the display panel is of a transmission type, it can be constructed as shown in FIG. 30.

In FIG. 30, the condensing lens 11a converts the light emitted from the light emitting device 15 to light having excellent directionality. The light emitting device obliquely illuminates the display panel 863. That is, the principal line 22a of the illumination light and the normal line of the display panel 863 form the angle of $\theta_k$.

When black is displayed on the pixel in the display panel 863, light becomes straight light 22b. When the liquid crystal layer 127 is in the scattered state (white display), the incident light 22a is scattered and a part of the light is incident on the magnification lens 866 and enters the eye 21 of the observer.

The matters regarding the angle $\theta_k$ and the like are the same irrespective of the type of the display panel 863, that is, whether the reflection type or the transmission type. When the position of the light emitting device 15 can be changed in the directions of the arrows in a manner similar to FIG. 29, the observer can freely adjust the light so as to obtain an optimum display image.

Figure 31:
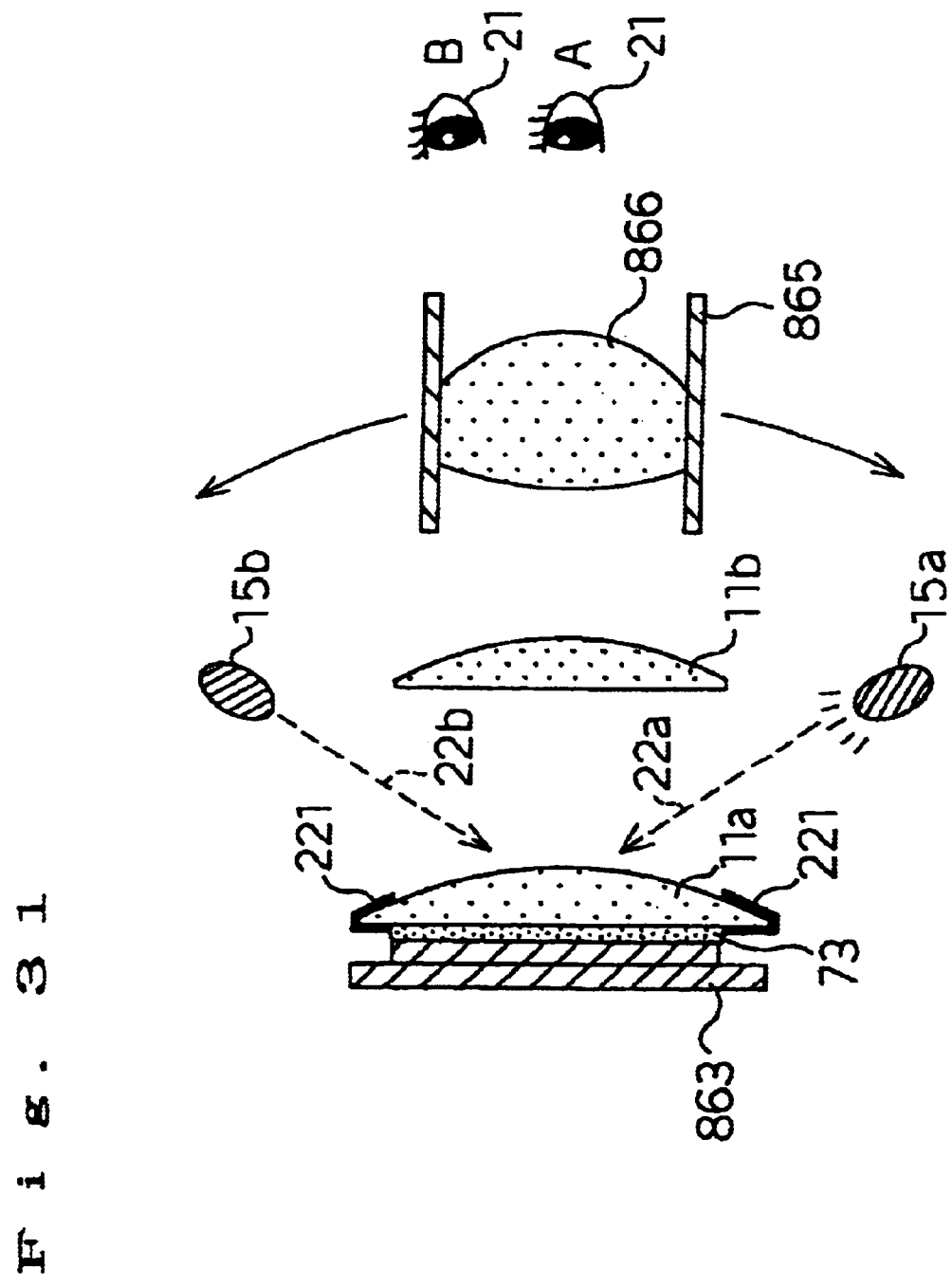
FIG. 31 shows the configuration of the view finder of the invention.

The foregoing embodiment relates to the case where the number of the light emitting device 15 is one. As shown in FIG. 31, two or more devices may be also used. In FIG. 31, the light emitting device 15a also illuminates the display panel 863. It is also possible to turn on one of the light emitting devices and turn off the other. That is, by turning on the two light emitting devices 15, the brighter display image can be obtained.

In the case of placing the priority on the low power consumption, it is sufficient to turn off one of the light emitting devices 15. Since the ease of observation of the display image varies whether the eye 21 of the observer is in the position A or B, there is another effect that one of the light emitting devices 15, by which the image is observed most preferably is turned on and the viewing angle becomes wider.

In the embodiment of FIG. 21, the angle of the principal ray illuminating the display panel 863 is changed. The invention is not limited to the embodiment. It is also possible to move the magnification lens 866 in the directions of the arrows as shown in FIG. 31. While watching the display image, the observer moves the magnification lens 866 and the like to positions in which the display image can be watched optimally.

In FIG. 31, the lens 11a disposed on the light outgoing surface of the display panel 863 is used to convert the light from the light emitting device 15 to parallel light and the lens 11b is used to convert light into converged light. The configuration as shown in FIG. 31 is realized more easily from the viewpoint of the optical design.

Figure 32:
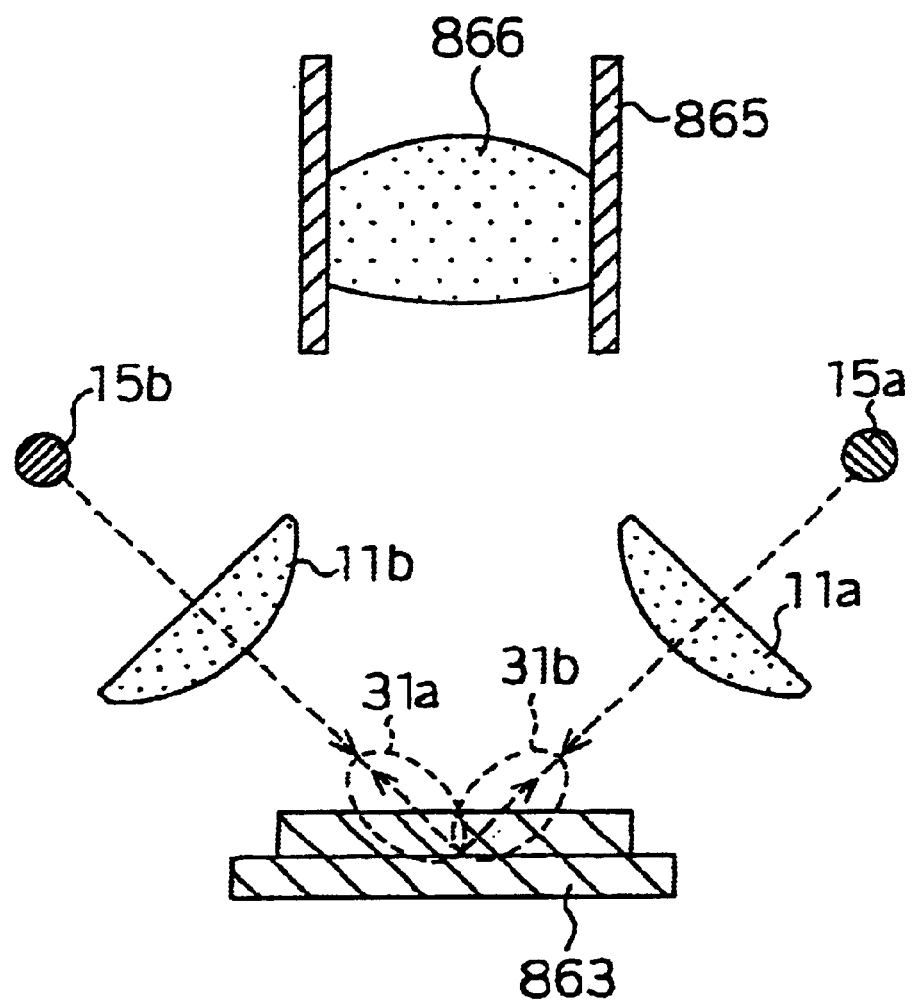
FIG. 32 shows the configuration of the view finder of the invention.

FIG. 32 illustrates a display panel comprising the convex lens 11a for a light-emitting device 15a and the convex lens 11b for a light emitting device 15b.

FIG. 31 shows the case of the reflection type display panel. In the case of the transmission type display panel, it is sufficient to use the configuration as shown in FIG. 33. In order to shorten the depth of the view finder, light emitted from the light emitting device 15 is reflected by a mirror 261 and the reflected light is incident on the lens 11.

Figure 34:
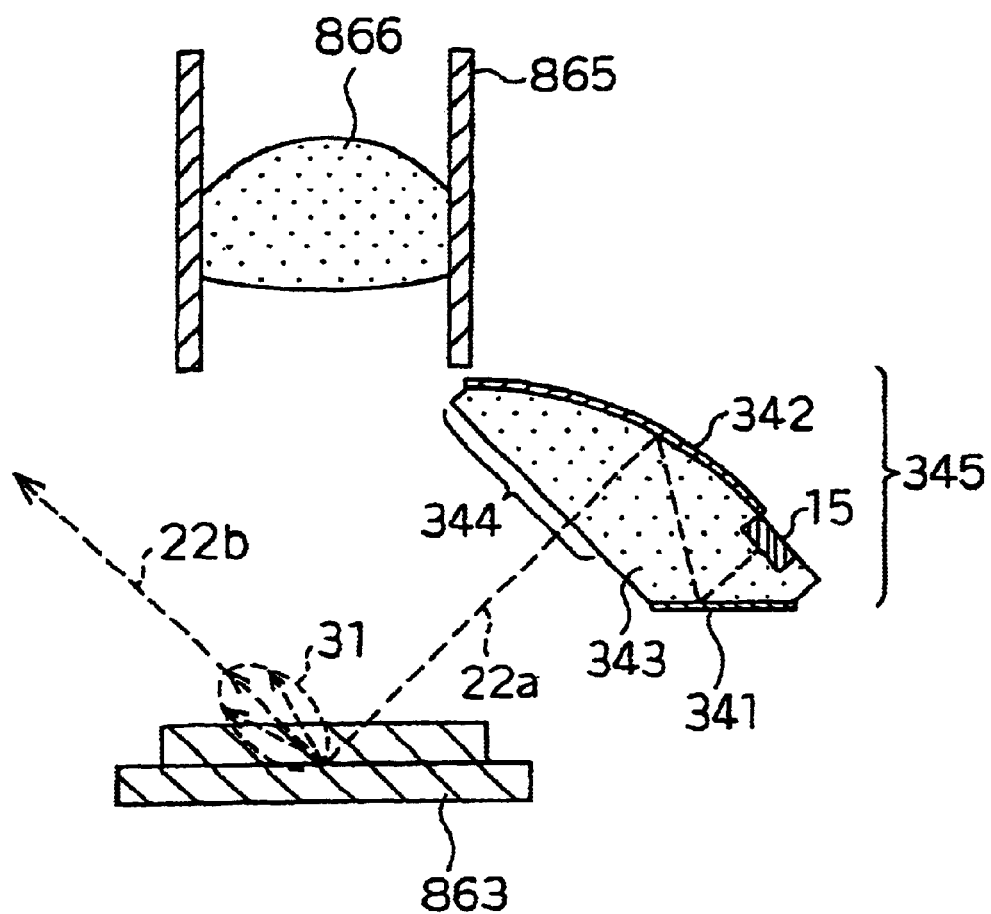
FIG. 34 shows the configuration of the view finder of the invention.

FIG. 34 shows an illuminating apparatus for forming illumination light having the excellent directionality for illuminating the display panel 863. The illuminating apparatus will be described first.

The bottom surface of a transparent block 343 is processed to have a parabolic surface. The invention is not limited to the perfect parabolic surface. An ellipsoidal surface or a similar shape can be also used (hereinlater, called a concave surface). It is preferable that the concave surface is a parabolic surface having the LED 15 as a focal point. The concave surface can have a Fresnel lens shape.

The parabolic surface has the property of converting the light emitted from the focal point to parallel light. The ellipsoidal surface has the property of condensing light emitted from a focal point to another focal point. By emitting light from the LED to the parabolic mirror, parallel light having excellent directionality can be easily obtained. By forming the parabolic mirror like an ellipsoidal mirror, parallel light having the high directionality which becomes converged light can be obtained.

Figure 35A:
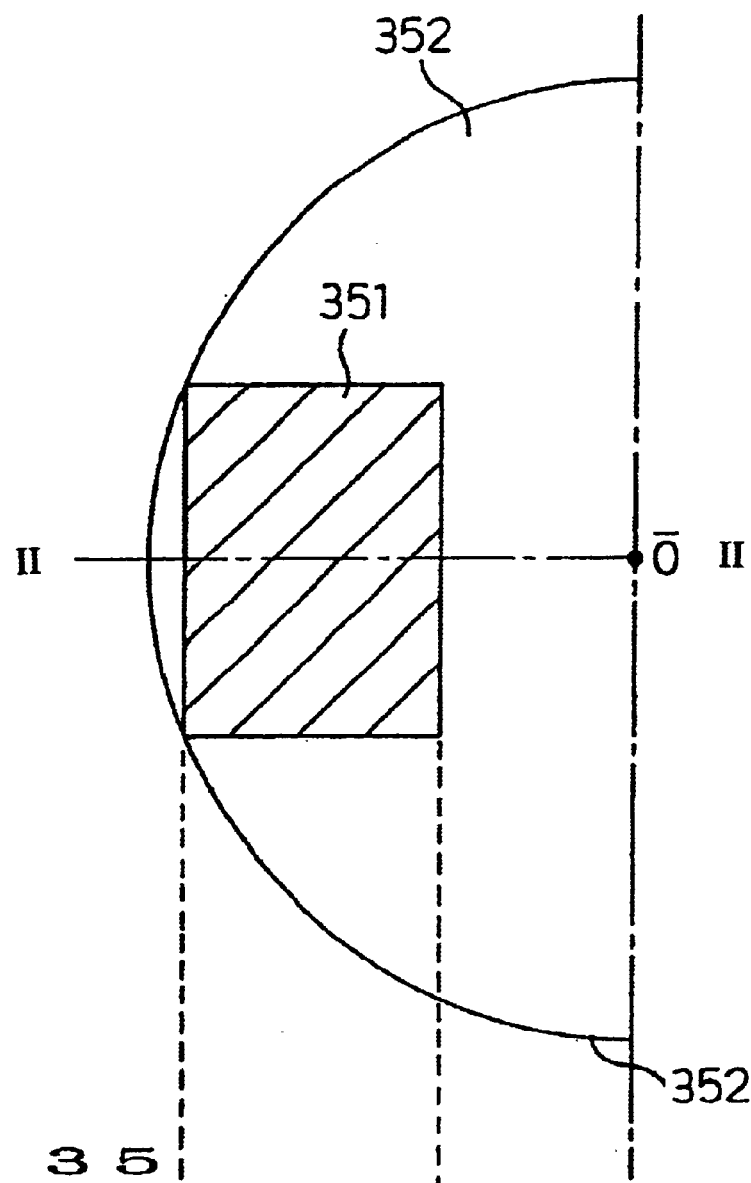
FIGS. 35A and 35B illustrate an illuminating apparatus of the invention.
Figure 35B:
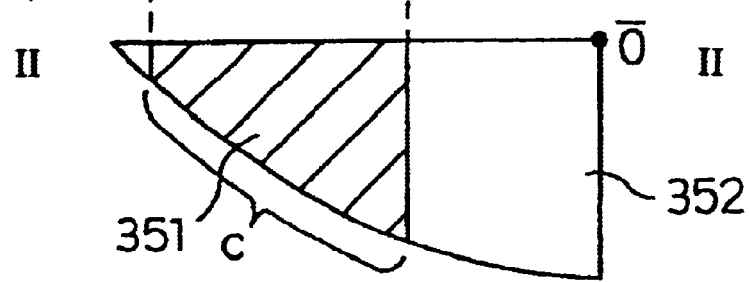

The bottom surface of the transparent block 343 is a parabolic surface which is the shape obtained by cutting a hatched part 351 from a parabolic mirror 352 having the focal point 0 as a center as shown in FIG. 35. FIG. 35(b) is a cross section taken along line II—II of FIG. 2(a).

As illustrated in FIG. 35(b), a reflecting film 341 is formed by depositing aluminium, silver, or the like in the part C on the parabolic bottom surface. It is desirable to form a thin film made of magnesium fluoride, silicon oxide, or the like on the reflecting film 341 in order to prevent the reflecting film 341 from being oxidized or the like.

Figure 36:
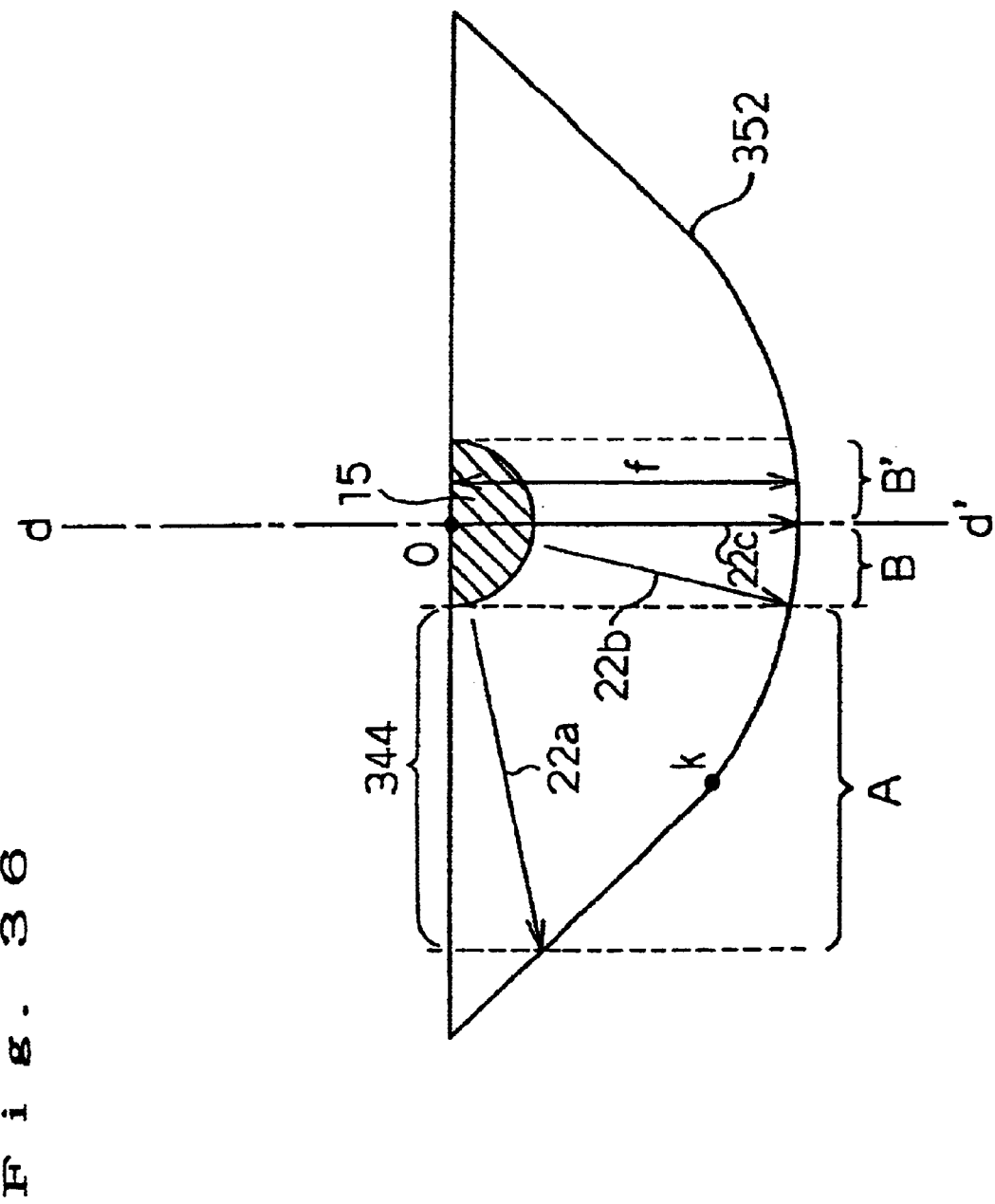
FIG. 36 is a diagram for explaining the illuminating apparatus of the invention.

An illuminating apparatus 345 of the invention is characterized in that the part less than half of the parabolic mirror is used. That is, the part just below the focal point is not used. As shown in FIG. 36, when the light emitting device 15 is disposed at the focal point 0 of the parabolic mirror, the hatched part shown in FIG. 35 is used on the left or right side of the center line dd'. By using the part, the distance between the light emitting device 15 disposed almost at the focal point and the reflecting film 341 can be increased, the size of the transparent block 343 can be reduced, and a thin transparent block is sufficient.

The reflecting film 341 can be obtained by using a metal thin film, adhering a reflection sheet or a metal sheet, or applying a paste or the like. It is also possible to form the reflecting film 341 to another transparent block or the like, and attach the reflecting film 341 to the transparent block 343. The reflecting film 341 can be also used as an optical interference film. The transparent block 343 is not limited to a block but can be formed in a cup shape. That is, a part of the concave mirror is used.

In the invention, as shown in FIG. 36, only the part A is illuminated by the light emitting device 15. The middle point (k) of the illumination part is illuminated as a center. The display panel 863 is illuminated by light emitted from a light outgoing surface 344.

The light emitting device having the directionality can be used since the illumination range A is narrow. Consequently, the efficiency for light utilization is good because light can be emitted to the narrow illumination area efficiently.

From the above, according to the illuminating apparatus of the invention, only the half from the center line of the parabolic mirror is used and areas B and B' below the light emitting device are not used as illumination light passing areas.

Figure 37:
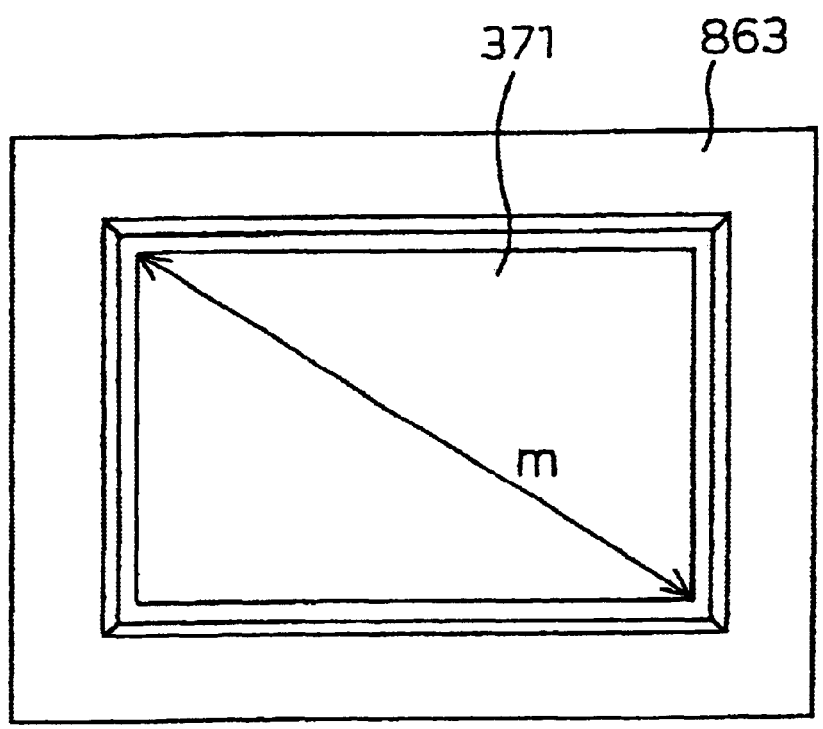
FIG. 37 is a diagram for explaining the view finder of the invention.

As shown in FIG. 37, when it is assumed that the diagonal length of a valid display area 371 of the display panel 863 is m (mm) (area in which pixels and the like are formed and in which an image is observed by the observer of the view finder), and the focal point of the parabolic mirror 352 is f (mm), the following relation is satisfied.

$$\frac{m}{2} \text{ (mm)} \leq f \text{ (mm)} \leq \frac{3m}{2} \text{ (mm)} \qquad \text{(Expression 13)}$$

When f (mm) is shorter than m/2 (mm), the curvature of the parabolic surface becomes small and the formation angle of the reflecting mirror 352 increases. It is not preferable since the depth of the illuminating apparatus 345 becomes longer. When the angle of the reflecting surface is sharp, a problem such that a difference easily occurs between the luminance in the upper part of the display area 371 of the display panel 863 and that in the lower part arises.

On the other hand, when f (mm) is longer than 3/2·m (mm), the curvature of the parabolic surface increases and the position in which the light emitting device 15 is disposed becomes higher. Consequently, in a manner similar to the above, the depth of the illuminating apparatus 345 becomes longer.

Figure 38A:
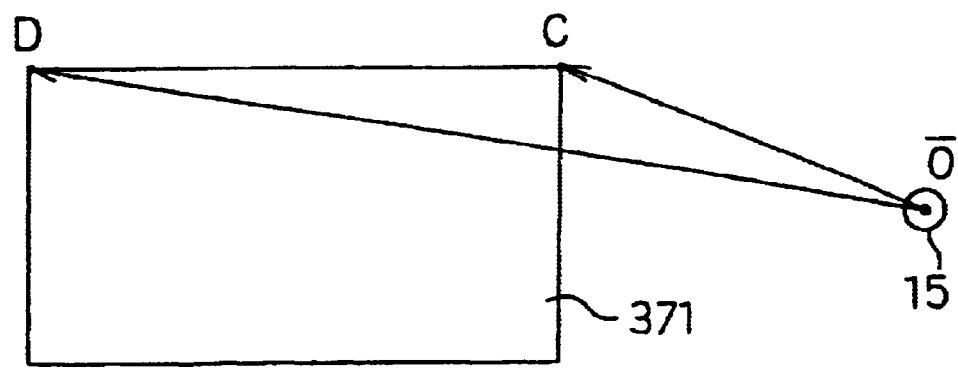
FIGS. 38A and 38B are diagrams for explaining the illuminating apparatus of the invention.
Figure 38B:
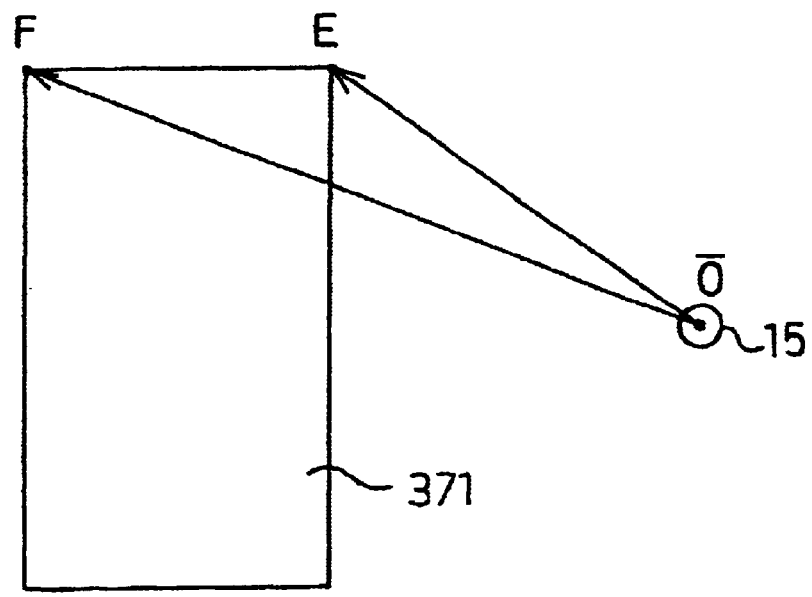

The forming direction of the reflecting surface 342 of the parabolic surface of FIG. 35 may be vertically long as shown in FIG. 35(*a*) (refer to FIG. 38(*b*)) or laterally long as shown in FIG. 38(*a*). In the case of the configuration that the forming direction is laterally long as shown in FIG. 38(*a*), the difference between a distance OD and a distance OC is long and a difference in luminance easily occurs between the point D and the point C.

On the other hand, when the direction which is vertically long is used as shown in FIG. 38(*b*), the difference between a distance OF and a distance OE is short and the luminance difference between points F and E does not easily occur.

Figure 39:
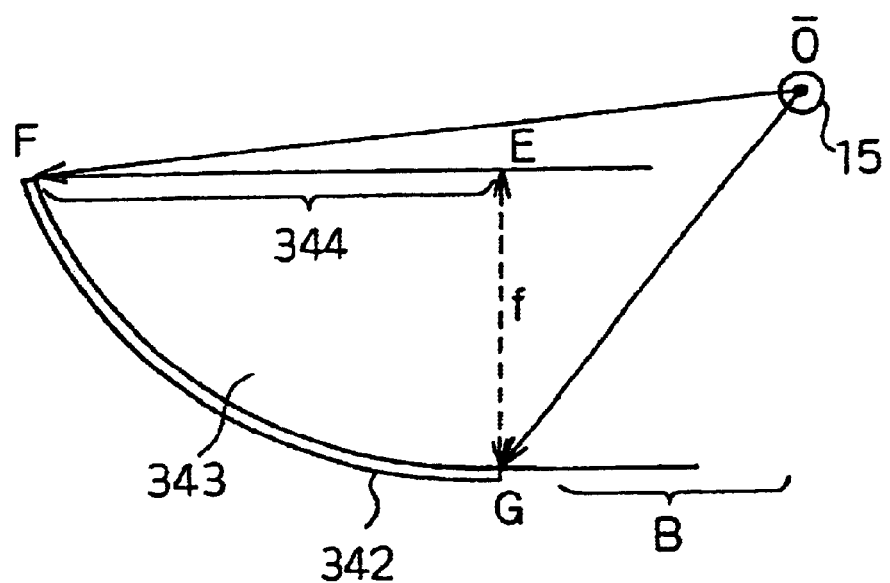
FIG. 39 is a diagram for explaining the illuminating apparatus of the invention.

As shown in FIG. 39, the distance OE is a distance OG to the reflecting surface 342 in practice. The difference between the distances OF and OG is therefore considerably short, so that the luminance difference becomes small.

When the distance between the position (the middle point 0 of the parabolic mirror) at which the light emitting device 15 is disposed and each of the points F and G is made long, it is effective on uniforming the luminance in the display area. In this sense, as shown in FIG. 39, it is desirable not to use the part B extending from the lower part of the light emitting device 15 to the end of the parabolic mirror.

In this sense as well, the illuminating apparatus having the configuration of the invention, for illuminating the reflecting surface 12 obliquely below the focal point 0 by using the light emitting device (small plane light emitting device) for generating light only in one direction like the LED can easily realize both of the lower power consumption and the higher luminance. Thus, the white LED is preferable to be used as the light emitting device 15.

When it is assumed that the diagonal length of the light emitting area of the light emitting device 15 (which is the diagonal line length in the case of a square, the diameter in the case of a circle, and a value obtained by adding a long side and a short side and dividing the sum by two in the case of an ellipse) is set to d (mm) and the diagonal length of the valid display area of the display panel is set to m (mm), it is preferable to satisfy the following relation.

$$\frac{m}{15} \text{ (mm)} \leq d \text{ (mm)} \leq \frac{m}{2} \text{ (mm)} \qquad \text{(Expression 14)}$$

When (d) becomes large, the angle of view of the view finder in which the illuminating apparatus of the invention is assembled is widened and the directionality is widened, and the range in which an image is watched preferably when the display panel is watched from any directions is widened, however, the displayed image deteriorates and also the efficiency for light utilization deteriorates. On the other hand, when (d) becomes small, although the efficiency for light utilization becomes better, the angle of view is narrowed and the directionality is worsened. According to examinations, it is necessary to satisfy the range of the expression 14. More preferably, it is necessary to satisfy the following conditions.

$$\frac{m}{10} \text{ (mm)} \leq d \text{ (mm)} \leq \frac{m}{3} \text{ (mm)} \qquad \text{(Expression 15)}$$

Figure 86:
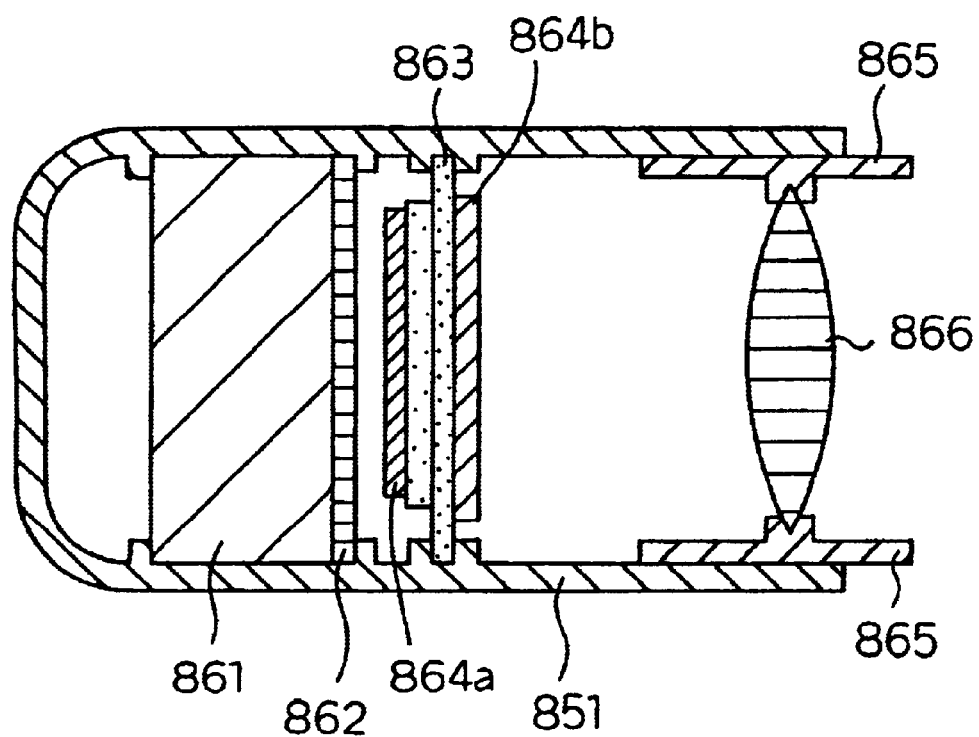
FIG. 86 illustrates a conventional view finder.

A diffusion sheet (diffuser) may be disposed or formed on the light outgoing surface 344. The diffusion sheet is not required to have the complete diffusion characteristic like the diffuser 862 in FIG. 86 but is used to correct color unevenness of the light emitting device 15 or uniform a subtle luminance distribution of the reflecting surface 342.

In the specification, for convenience, it is called the diffusion sheet. The sheet is however a transparent sheet which is slightly whitish. It is therefore fundamentally different from the conventional diffusion sheet which realizes the complete diffusion.

When it is assumed that the illuminance at the incident surface of the diffusion sheet is E [1x], the brightness measured on the light outgoing surface and from the normal line of the diffusion sheet is B (nt), and the ratio of the circumference of a circle to its diameter is set to π, the degree of diffusion G of the diffusion sheet satisfies the following expression.

$$5 \leq G \leq 100 \left(\text{where, } G = \frac{\pi B}{E}\right).$$ (Expression 16)

In this case, the smaller G is, the higher the degree of diffusion is. On the contrary, when G is large, it denotes that the sheet is almost transparent.

Although it has been described that the diffusion sheet is formed by depositing aluminum or the like on the reflecting surface 342, except for the method, it can be also formed by processing and adhering a metal plate or disposing the metal plate. A reflecting sheet such as Silver Lux (trade name) manufactured by 3M company may be also disposed or adhered.

The transparent block 343 is made of a transparent resin. As the transparent resin, acrylic, polycarbonate, zeonex, or the like is used. A resin obtained by adding a diffusing agent or coloring dye into a transparent resin can be used to improve the color purity by properly widening the directionality of light and regulating the wavelength band of the light.

The transparent block 343 can be also formed by producing a casing having a concave reflecting surface and filling the casing with a transparent resin, gel such as silicon gel, liquid such as ethylene glycol, or the like. The concave reflecting surface can be cut from a resin such as ABS, a reflecting film is formed on the reflecting surface, and the resultant may be used as it is.

The light emitted from the focal point 0 is reflected by the parabolic surface to be thereby converted into parallel light. The parallel light does not denote perfect parallel light but light having excellent directionality (that is, light which is not diffused). Preferably, the light is tele-centric.

The reflecting film 342 made of Al or Ag is formed on the concave surface (hereinlater, called a concave reflecting film). The concave reflecting film 342 is coated with a film of $SiO_2$ or the like (oxidation preventing means) so that the surface is not oxidized.

In FIG. 34, light emitted from the light emitting device 15 is reflected by the reflecting film 341, is incident on the concave reflecting film 342, and is converted into parallel light having excellent directionality. The parallel light goes out from the outgoing area of the transparent block 343 to illuminate the display panel 863.

In the embodiment of FIG. 34, since the illuminating apparatus 345 for forming illumination light is integrated, the illuminating apparatus 345 can be treated as a part so that it is unnecessary to adjust the optical axis or the like. The time (manufacturing time) required to assemble the view finder can be therefore largely reduced and the number of parts can be reduced. Thus, the cost can be reduced.

Figure 40A:
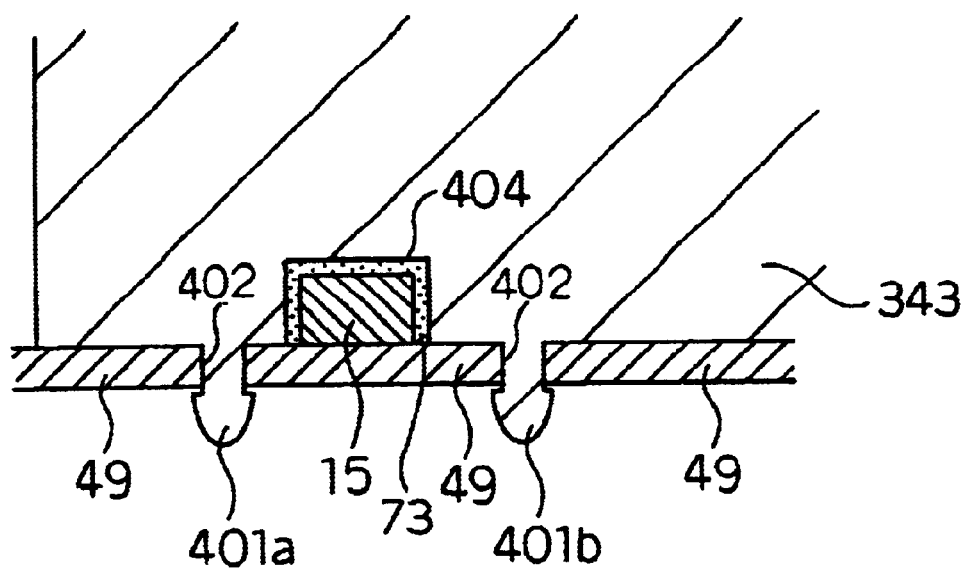
FIGS. 40A and 40B show the illuminating apparatus of the invention.

A hole 404 is opened in the transparent block 343 as shown in FIG. 40(a) and the white LED 15 is adhered into the hole 404 by the adhesive 73 containing the diffusing agent. The white LED 15 is also adhered to the printed board (or flexible board) 49. FIG. 40(a) is a cross section of the illuminating apparatus and FIG. 40(b) is a plan view.

Figure 40B:
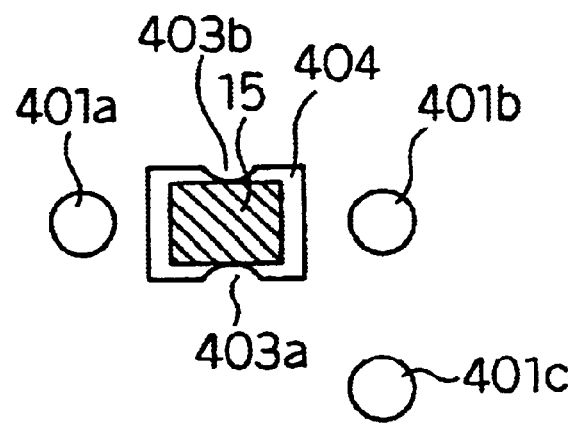

In the transparent block 343, three pins 401a, 401b, and 401c are formed as shown in FIG. 40(b). As illustrated in FIG. 40(a), each of the pins 401a, 401b, and 401c has the large tip and the narrow root. When it is inserted in the hole 402 of the printed board 49, it is not easily come off. As shown in FIG. 40(b), the three projected parts are arranged asymmetrically in order to prevent erroneous insertion.

A method of integrating the white LED 15 and the transparent block 343 is performed by filling the hole 404 in the transparent block with a silicon adhesive containing the diffusion agent and inserting the white LED attached to the printed board 49 into the hole 404.

The white LED 15 is attached by the adhesive containing the diffusion agent in order to produce an uniform light source without needing the diffusion sheet 1021 shown in FIG. 4. That is, by using the adhesive containing the diffusion agent, two functions of attaching and adhering the diffusion sheet 1021 are realized at once.

In the case of using an adhesive which does not contain the diffusion agent, therefore, the diffusion sheet 1021 is preliminarily adhered to the light outgoing surface of the white LED 15 or the diffusion sheet 1021 is adhered to or has to be disposed on the bottom of the hole 404. A gel or liquid containing the diffusion agent can be used in place of the adhesive agent.

As shown in FIG. 40(b), the white LED 15 is sandwiched by two projected parts 403. By pressing in the white LED 15, the tip of the projected part 403 is slightly bent. By the bending, the white LED 15 is fixed so as not to be come off and the light emission center of the white LED 15 is positioned just to the center part.

When the white LED 15 can be sufficiently fixed by the projected parts 403, it is unnecessary to use the adhesive for fixing the white LED 15. As necessary, a gap between the printed board 49 and the transparent block 343 is filled with the adhesive, thereby fixing the printed board 49 and the transparent block 343. When the LED 15 can be fixed by the projected parts 403, the adhesive for fixing the LED is not necessary.

Figure 41:
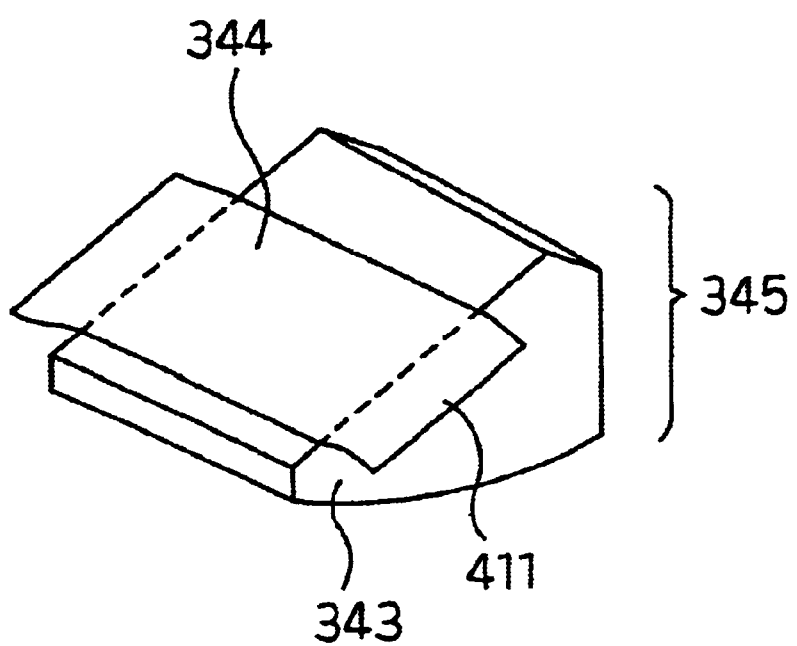
FIG. 41 is a diagram for explaining a method of manufacturing the illuminating apparatus of the invention.

In the illuminating apparatus 345, the concave reflecting film 342 and the reflecting film 341 have to be formed in the transparent block 343. It is easy to use the method of FIG. 41 as a method of forming the reflecting films.

First, a sheet 411 is adhered to the hole 404 through which the white LED 15 is attached to the transparent block 343 and the light outgoing area 344. In the state where the sheet 411 is adhered, the transparent block 343 is disposed on the evaporation 4 [sic] and an Al film is deposited on the outer surface of the transparent block 343. After the deposition, the sheet 411 is peeled off.

The view finder may be also formed as shown in FIG. 42 by using the illuminating apparatus 345. The light emitted from the white LED 15 is reflected by the reflecting film 341 to illuminate the display panel 863. The surface A of the illuminating apparatus 345 has the function of the condenser lens. A display image on the display panel 863 is consequently watched through the area A of the illuminating apparatus 345 from the magnification lens 866. That is, the illuminating apparatus 345 has the function of converting the illumination light into the almost parallel light, so that it can be regarded that the illuminating apparatus 345 also has the function of the condenser lens 11.

Figure 43A:
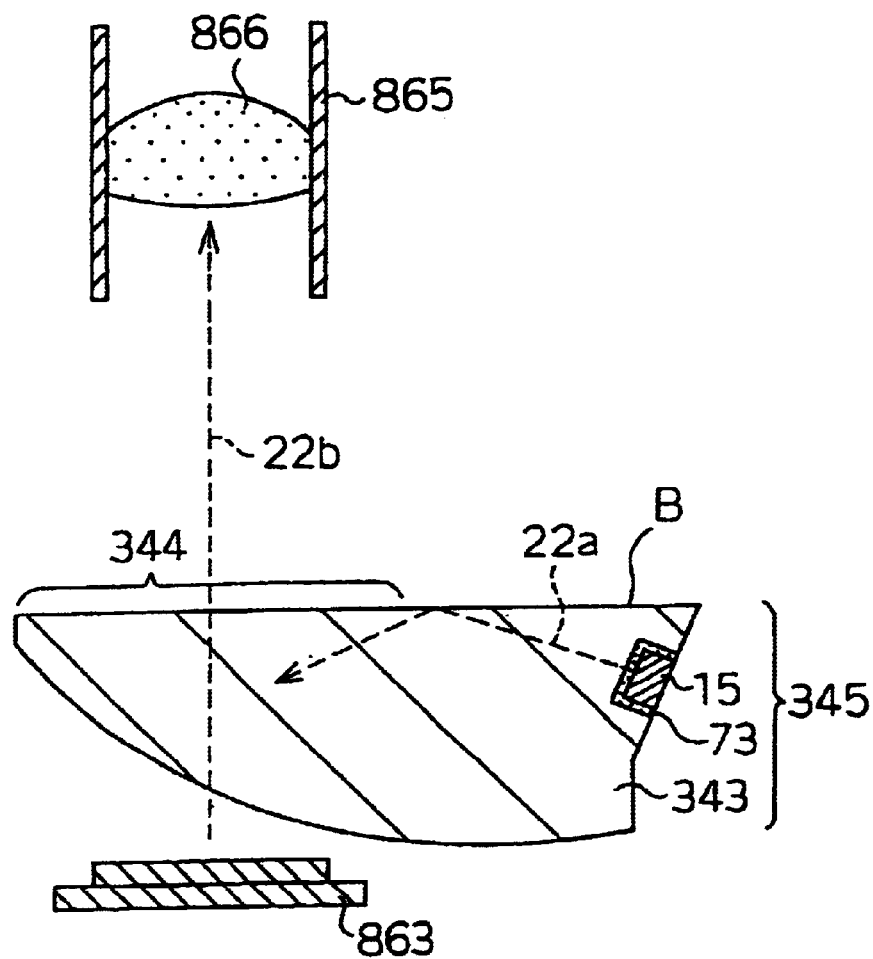
FIGS. 43A and 43B show the configuration of the view finder of the invention.

For example, as shown in FIG. 43(a), there is also a configuration of illuminating the display panel 863 without forming the reflecting film 341. Light emitted from the light emitting device 15 is total reflected by the plane B of the transparent block 343 and the total reflected light illuminates the display panel 863. When the refractive index (n) of the transparent block 343 is 1.5, the total reflection angle is about 40 degrees, so that the total reflection condition can be easily realized. The incident light is therefore total reflected without the reflecting film 341. Consequently, the efficiency for light utilization is increased and the low cost can be realized.

Figure 43B:
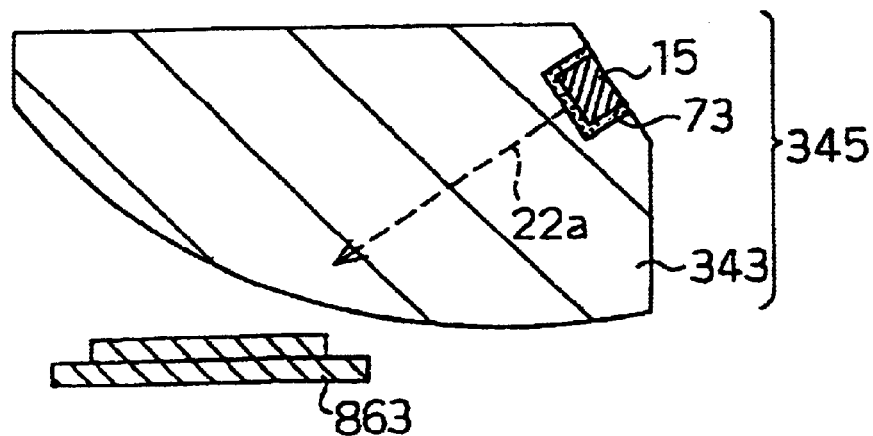

As shown in FIG. 43(b), without using the configuration of reflecting light by the reflecting film or the like, the light emitted from the LED 15 can also directly illuminate the display panel 863.

FIG. 34 relates to the display panel 863 of the reflection type. When the display panel 863 is of the transmission type, it is sufficient to construct it as shown in FIG. 44.

As shown in FIG. 44, the white LED 15 is disposed in the focal point of the parabolic surface 342. Light emitted from the white LED is converted by the parabolic surface 342 into light having the excellent directionality. Assuming that the angle formed by the light outgoing area 344 and the display panel 863 is ok, principal ray can be incident on the display panel 863 at the angle $\theta_k$.

Figure 87A:
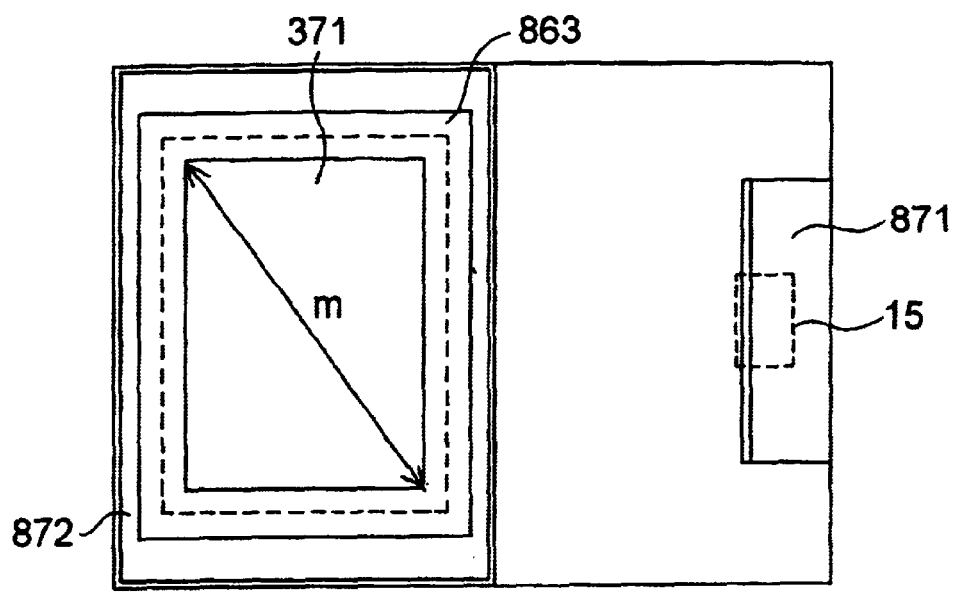
FIGS. 87A and 87B are diagrams for explaining a view finder of the invention.
Figure 87B:
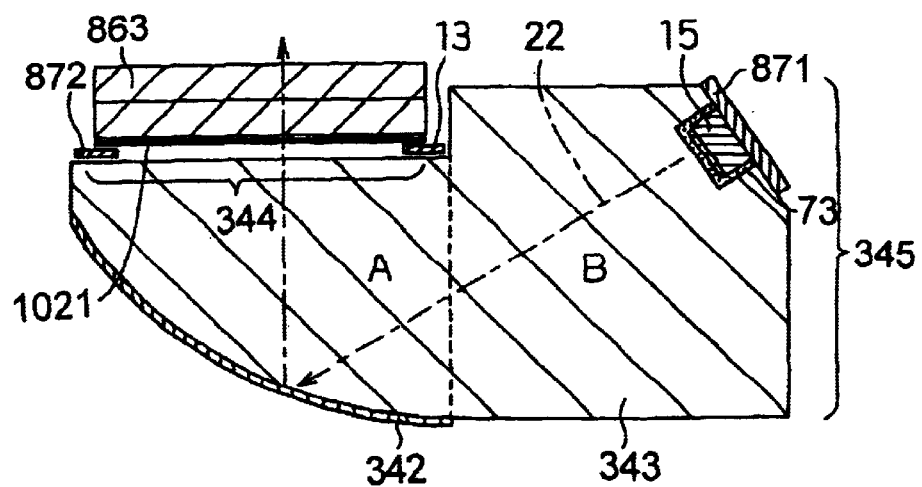

FIG. 87 shows an embodiment of a view finder formed by using the transmission type display panel 863 and the transparent block. The parts such as a magnification lens unnecessary to be described here are omitted. Ditto for the following drawings.

As shown in FIG. 87, the white LED 15 is attached to the transparent block 343 in an almost focal point of the reflecting film 342. Light 22 emitted from the white LED 15 is converted by the reflecting film 342 into parallel light which illuminates the display panel 863.

As illustrated in FIG. 87, when it is assumed that the diagonal length of the valid display area of the display panel 863 is m (mm) and the focal point of the parabolic mirror is f (mm), the relation of m/2 (mm)≦f (mm)≦3/2·m (mm) is satisfied. The valid display area is an area in which pixels and the like are formed and an image is watched by the observer of the view finder.

When f (mm) is shorter than m/2 (mm), the curvature of the parabolic surface becomes small and the angle at which the reflecting surface 342 is formed increases. The depth of the illuminating apparatus (of the backlight type) becomes accordingly long and it is unpreferable. When the angle of the reflecting surface is small, a problem such that a luminance difference between the upper and lower parts of the display area 18 of the display panel 823 easily occurs arises. On the other hand, when f (mm) is longer than 3/2·m (mm), the curvature of the parabolic surface becomes large and the disposing position of the light emitting device 15 becomes higher. The depth of the illuminating apparatus 345 accordingly becomes longer.

When it is assumed that the diagonal length of the light emitting area (substantial light emitting face) of the light emitting device 15 (the length of the diagonal line in the case of a square, the diameter in the case of a circle, and the length obtained by adding a long side and a short side of an ellipse and dividing the sum by two) is d (mm) and the diagonal length of the valid display area of the display panel is m (mm), it is preferable that the relation of m/15 (mm)≦d(mm)≦m/2 (mm) is satisfied.

When (d) increases, the angle of view of the view finder in which the illuminating apparatus of the invention is assembled is widened, the directionality becomes better, and the range in which the image can be watched preferably when the display panel is viewed from any directions is widened. However, the display image and the light utilizing rate deteriorate. On the other hand, when (d) becomes small, although the light utilizing rate becomes higher, the angle of view is narrowed and the directionality is worsened. It is more preferable to satisfy the condition of m/10 (mm)≦d (mm)≦m/3 (mm).

The diffusion sheet (diffuser) 1021 is disposed or formed on the light outgoing surface 344. As described before, the diffusion sheet 1021 is not required to have the complete diffusion characteristic as of the diffuser but is used to uniform the color unevenness of the light emitting device 15 or a fine luminance distribution of the reflecting surface 342. Although it is called the diffusion sheet 16 in the description for convenience, it is a transparent sheet which is slightly whitish. It is, therefore, fundamentally different from the conventional diffusion sheet which realizes the complete diffusion. A color filter can be used as the diffusion sheet 1021 or the diffusion sheet 1021 may be colored and used as a color filter. By disposing the color filter, the color temperature of the illumination light of the panel 863 can be optimized. As this has been already described, the description is omitted here.

A shielding body 872 is a sheet made of a substance which does not transmit light such as a metal or plastic. The shape of the shielding body is, for example, a frame or doughnut shape. The shielding body 872 is used to prevent light from the peripheral part of the light outgoing area 344 from being directly watched by the observer or the like. A flexible substrate 871 is disposed on the back surface of the LED 15 and the power is supplied to the LED 15. The above can be also applied to a reflection type view finder and the like of the invention.

The observer (user) of the view finder substantially observes the surface of the light emitting device 15 through the magnification lens 866 and the display panel 863 because the light emitting device 15 is disposed in an almost focal point of the reflecting surface 342. When the light emitting device 15 is a white LED, the brightness is 10,000 (nt) or higher. Consequently, the observer can observe a very bright display image on the display panel 863 and the power supplied to the light emitting device 15 can be largely reduced. The phenomenon can be realized by effectively utilizing the brightness retention low of optics. The position of the light emitting device 15 may be moved from the focal point position. In this case, only substantial brightness is lowered. By deviating the position of the light emitting device 15 from the focal point, there is also an advantage that the luminance unevenness is eliminated.

On the contrary, the angle of view at which the display panel 863 can be viewed preferably is narrowed. When the view finder is used, however, since the observer fixes the position of the eye to the eyepiece cover 852, there will be no problem. The view finder and the like of the invention effectively utilizes the brightness retention law and the characteristic at the time of use that the position of the eye of the observer is fixed.

Figure 108:
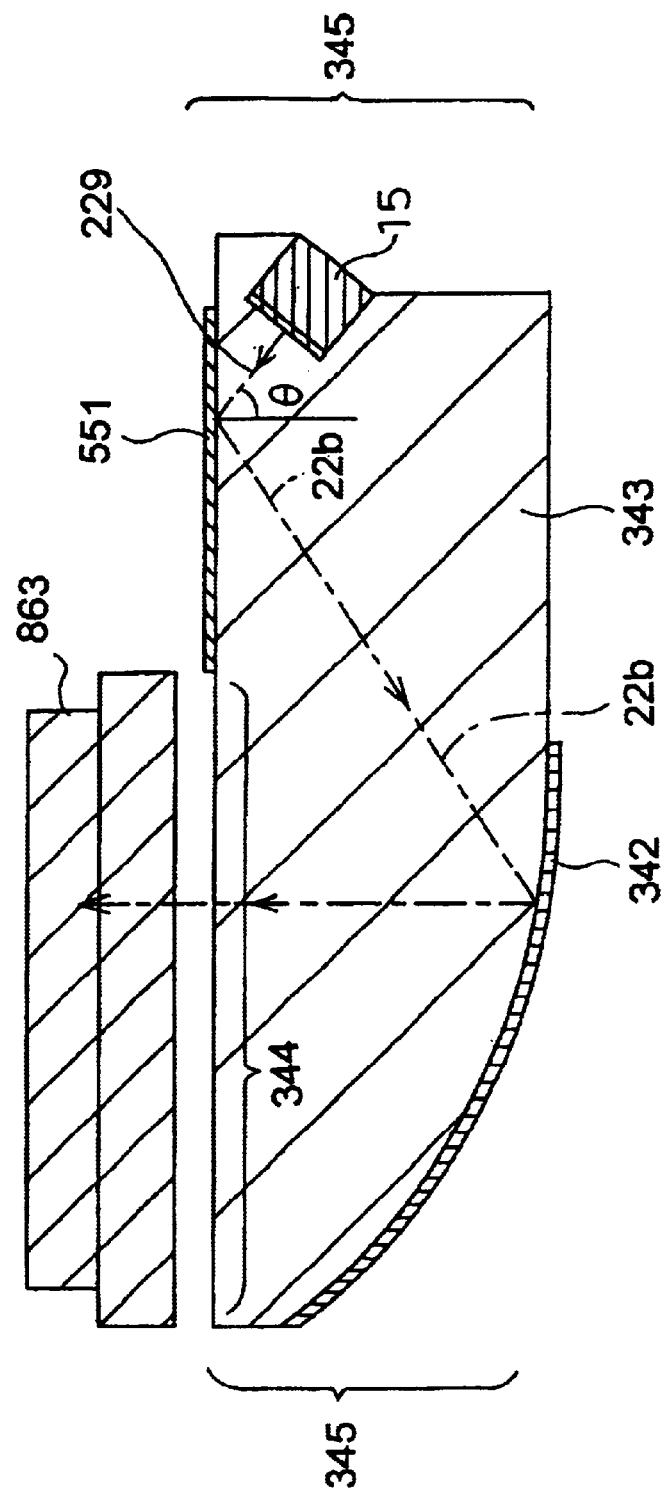
FIG. 108 is a diagram for explaining the view finder of the invention.

As shown in FIG. 108, the light emitted from the light emitting device 15 is reflected by a reflecting film (reflector) 551 and then reflected by the concave reflecting surface 342, thereby enabling the depth of the illuminating apparatus 345 to be shortened. When θ is set to the critical angle (45 degrees) or larger, the light 22a is total reflected. The reflecting film 551 is therefore made unnecessary.

Figure 109:
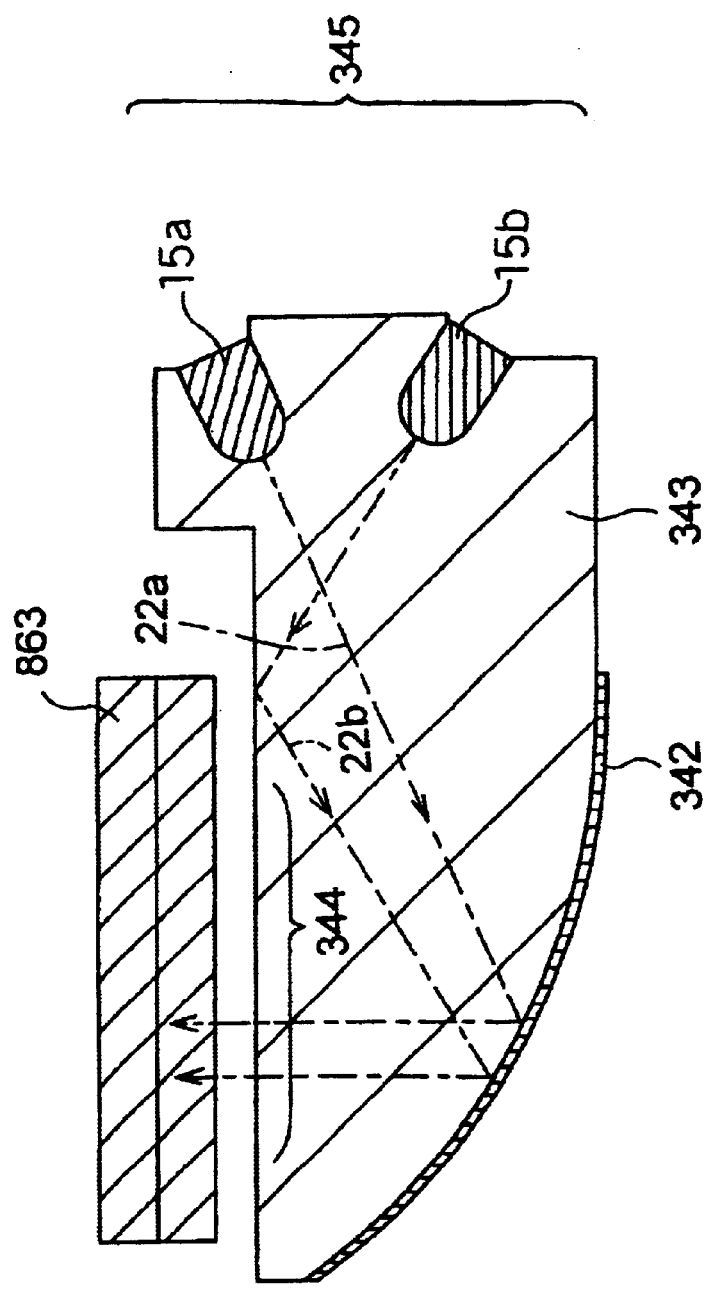
FIG. 109 is a diagram for explaining the view finder of the invention.

The number of the light emitting device 15 is not limited to one. As shown in FIG. 109, the illuminating apparatus 345 can be constructed by using a plurality of the light emitting devices 15a and 15b. Ditto for the other embodiments.

In FIG. 109, the light 22a from the light emitting device 15a is directly incident on the concave reflecting surface 342 and converted into parallel light. The light 22b from the light emitting device 15b is total reflected by the plane part of the light outgoing region 344, reflected by the concave reflecting surface 342, and converted into parallel light. Although the power consumption becomes twice as much as that of the case where one light emitting device 15 is used, the range in which the observer can observe the display image is widened.

Figure 110A:
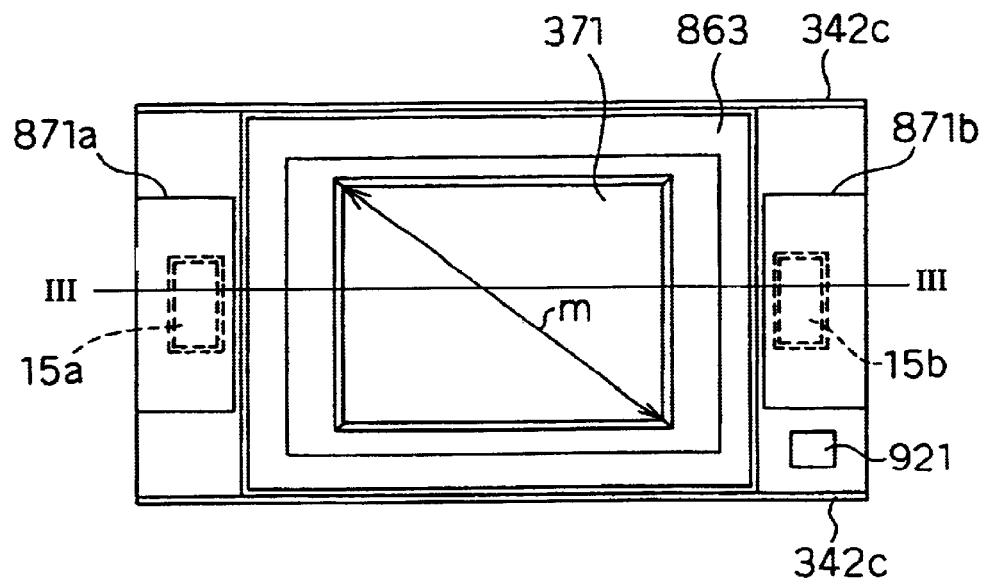
FIGS. 110A and 110B are diagrams for explaining the view finder of the invention.
Figure 110B:
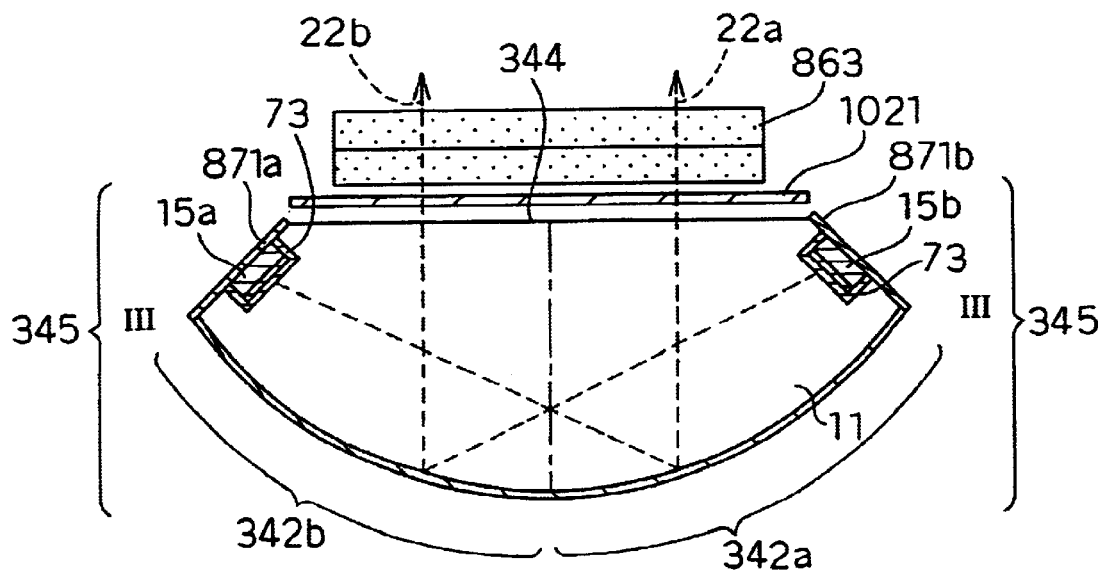

Referring to FIG. 110, parabolic surfaces 342a and 342b are combined with respect to an alternate long and short dash line as a center. The light 22a emitted from the light emitting device 15a is converted by the reflecting surface 342a into almost parallel light and the light 22b emitted from the light emitting device 15b is converted by the reflecting surface 342b into almost parallel light. The parallel light illuminates the display panel 863.

Figure 83:
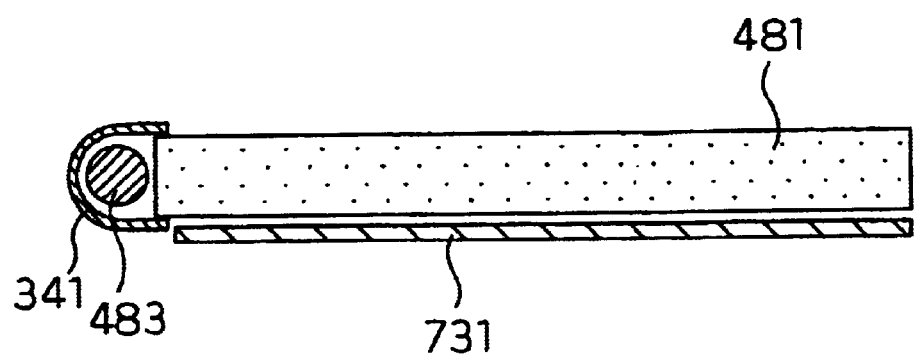
FIG. 83 is a diagram for explaining the video display apparatus of the invention.
Figure 106:
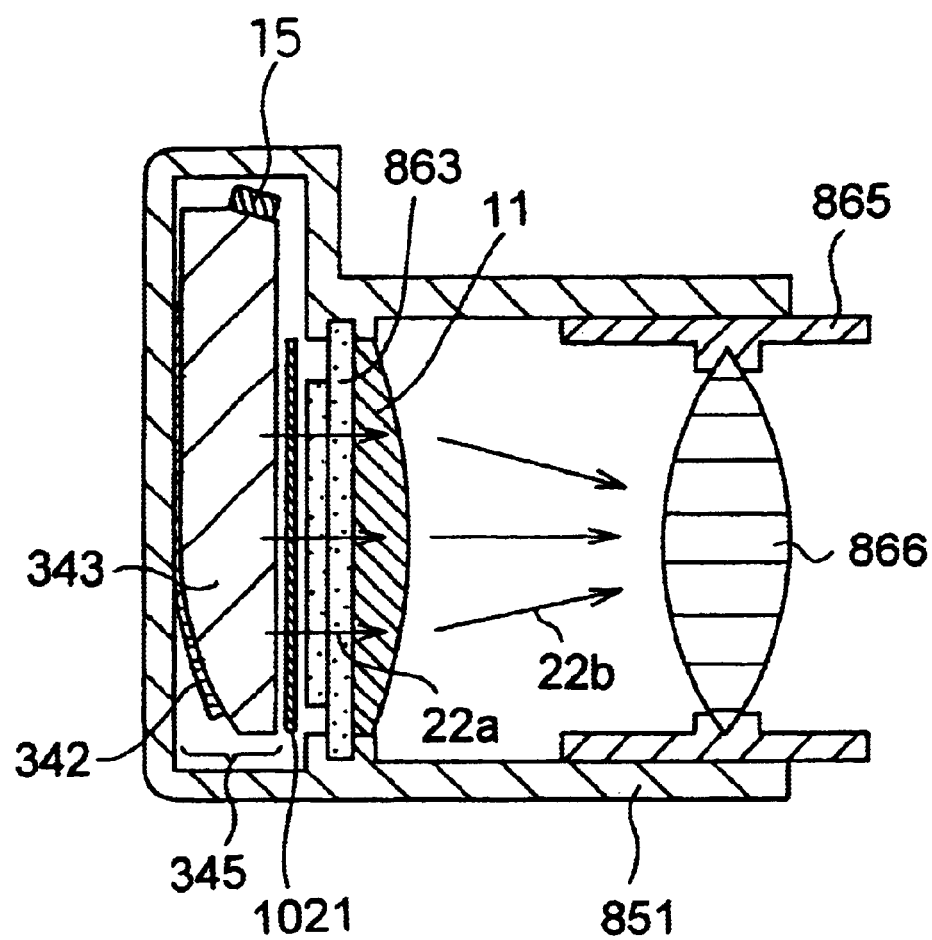
FIG. 106 is a diagram for explaining the view finder of the invention.
Figure 107:
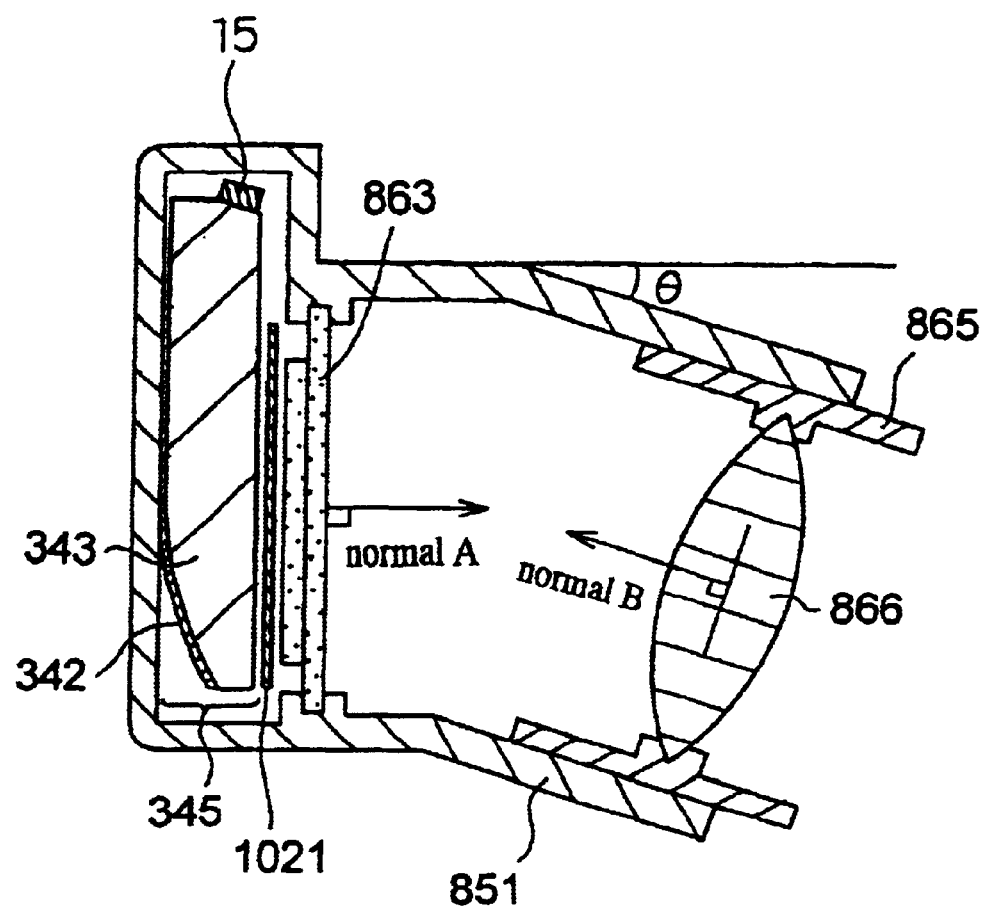
FIG. 107 is a diagram for explaining the view finder of the invention.

Obviously, the light emitting device 15 and its related matters, the display panel and its related matters, and the related expressions or the like, which have been described or will be described in many embodiments of FIGS. 1, 49, 53, 57, 58, and the like can be also applied to the view finder in which the display panel 863 is of the transmission type as shown in FIGS. 83, 106, 107, and the like.

Although one magnification lens 866 is used, two or more lenses can be also used. As necessary, an auxiliary lens 11 may be also disposed on the outgoing side of the display panel as shown in FIG. 106. It is preferable to adhere (optical couple) the auxiliary lens 11 to the display panel 863 in order to prevent optical loss due to the reflection at the interface.

By using the auxiliary lens 11 as shown in FIG. 106, the outgoing light can be condensed as the light 22b in FIG. 106. The size of the magnification lens 866 can be therefore reduced and the light 22a passing through the liquid crystal display panel 863 can be made parallel light, so that the contrast of the display panel can be made high. A Fresnel lens or the like can be used as each of the auxiliary lens 11, magnification lens 866, and the like.

FIG. 107 shows a case where the normal line A of the display panel 863 and the normal line B of the magnification lens 866 form the angle θ.

The observer views the display image of the display panel 863 obliquely. When the polymer dispersed liquid crystal panel is used as the display panel 863, with the configuration of FIG. 40, the display contrast becomes higher. The angle θ is set in a range from 5 to 30 degrees.

Figure 45:
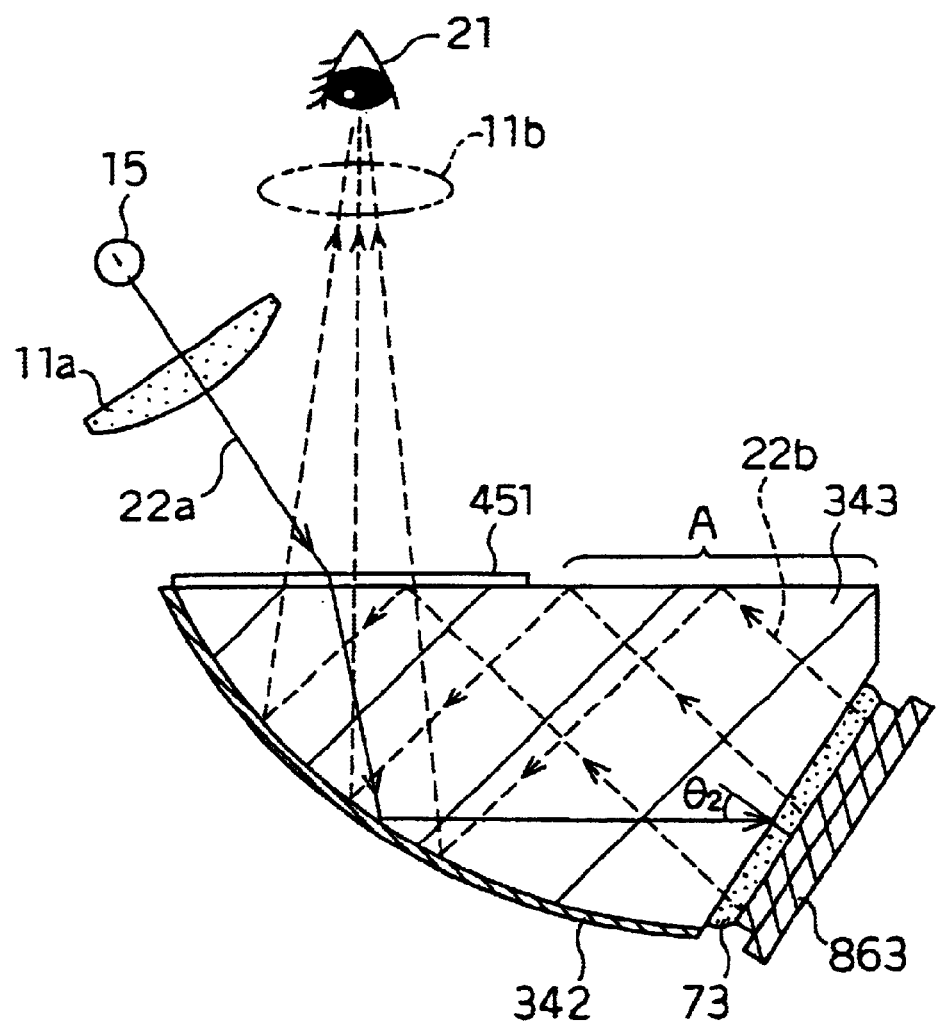
FIG. 45 illustrates the configuration of the view finder of the invention.

According to the embodiment of FIG. 45, light illuminating the display panel is generated in the transparent block 343 and the display image of the display panel 863 is arranged so as to be watched by the observer.

The display panel 863 of the reflection type is optically coupled to one surface of the transparent block 343. The reflecting film 342 is formed in the concave surface of the transparent block 343. An anti-reflecting film 451 (AIR coat 72) is formed on the light outgoing surface of the transparent block 343.

The light emitted from the light emitting device 15 is converted by the lens 16a and the reflecting surface 342 into almost parallel light and is incident on the display panel 863 at the angle of $θ_2$. When the light modulating layer 127 of the display panel 863 is transparent, the parallel light is reflected by the reflecting electrode 126 and goes out from the area of the transparent block 343A. The light therefore does not reach the eye 21 of the observer.

The light scattered by the light modulating layer 127 is total reflected by the area. A in accordance with the degree of scattering, then total reflected by the reflecting film 342, goes out from the area where the anti-reflecting film 451 is formed, and reaches the eye 21 of the observer. With the configuration, it is also possible to allow the light scattered by the light modulating layer 127 to go out from the area A, allow the light when the light modulating layer 127 is in the light transmitting state to be reflected by the reflecting film 342, and allow the reflected light to reach the eye 21 of the observer.

In the configuration of FIG. 45, since the light modulated by the display panel 863 is total reflected by one surface of the transparent block 343, the optical path length can be made longer. The optical design is therefore easy and the view finder can be made more compact. The depth of the view finder can be also shortened. Since the display panel 863 is attached to the transparent block 343 and the reflecting film 342 is also formed in the transparent block 343, there are advantages that the number of parts is small and the number of places to be adjusted is also small.

As necessary, a configuration such that the magnification lens 11b or the like is disposed in front of the eye 21 of the observer to adjust the focus is employed.

Figure 46A:
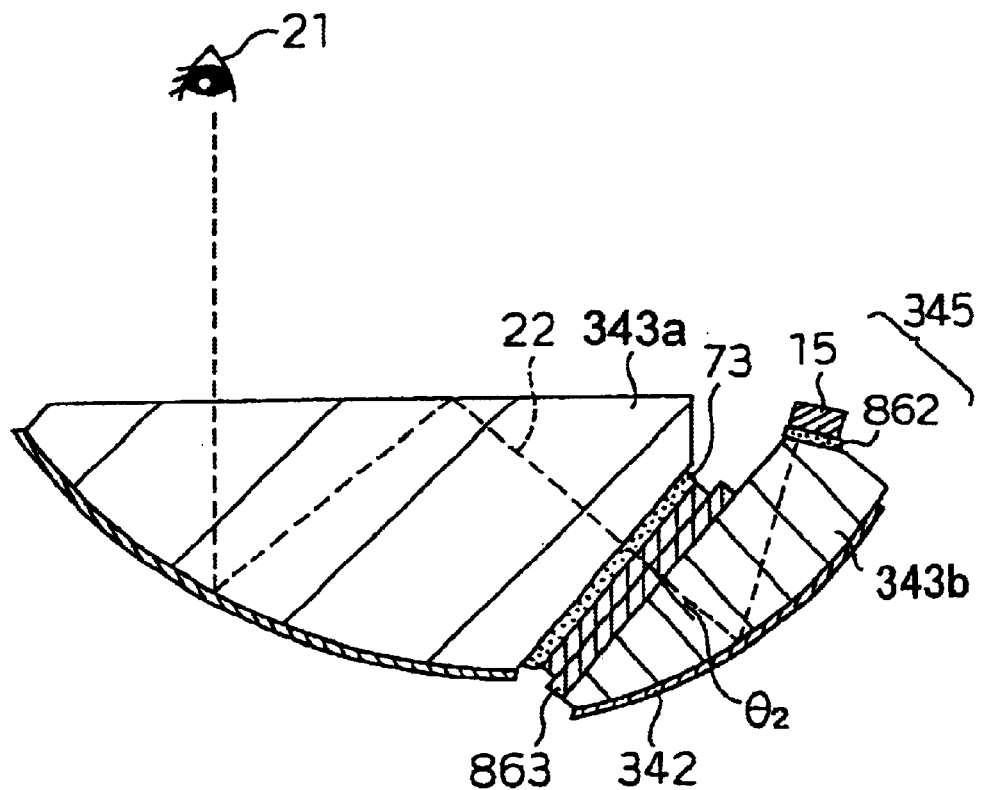
FIGS. 46A and 46B show the configuration of the view finder of the invention.

The configuration of FIG. 45 relates to the case where the display panel 863 is of the reflection type. When the display panel 863 is of the transmission type, it is sufficient to use the configuration as shown in FIG. 46. That is, it is sufficient to illuminate the display panel 863 from the rear surface by using the illuminating apparatus 345.

Figure 46B:
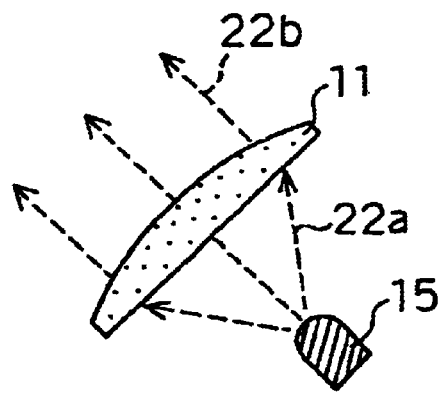

It is also possible to form the parallel light by the white LED 15 and the lens 11 as shown in FIG. 46(b) without using the illuminating apparatus 345.

Figure 47:
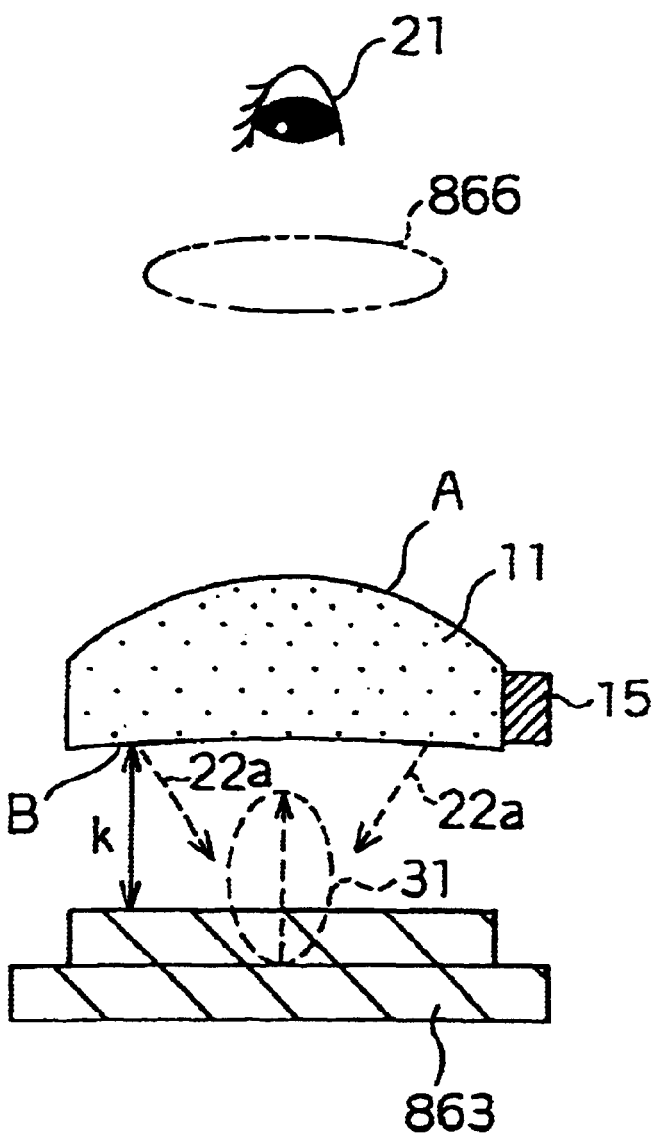
FIG. 47 shows the configuration of the view finder of the invention.

FIG. 47 shows a configuration in which the white LED 15 is attached to the edge thickness part of the concave lens 11. The diffusion sheet 1021 is attached to the light outgoing surface of the white LED 15 attached to the edge thickness part by, for example, an adhesive containing a diffusion agent made of titanium (Ti) or the like. The white LED consequently serves as a diffusion light source.

Consequently, the light emitted from the white LED is irregularly reflected in the convex lens 11. It is designed so that the surface A of the lens 11 is a convex surface and the surface B is either a concave surface, plane surface, or slightly convex surface, and the convex lens 11 as a whole functions as a condensing lens (having the positive power).

The convex lens 11 and the display panel 863 are disposed apart from each other by the distance of k so that the observer can watch an enlarged display image on the display panel 863. Obviously, it is also possible to dispose the magnification lens 866 between the eye 21 of the observer and the display panel 863 without providing the distance of k.

A part of the light irregularly reflected in the convex lens 11 goes out from the surface B and illuminates the display panel 863. Light is emitted also from the surface A of the convex lens 11. The plane A is, however, formed in a convex shape and the distance between the eye of the observer and the convex lens 11 is relatively long. The light emitted from the surface A therefore hardly reaches the eye 21 of the observer.

The light emitted from the surface B of the convex lens 11 is bent by the concave surface as shown by 22a in FIG. 47 and illuminates the display panel 863 obliquely. The display panel 863 scatters or reflects the incident light on the basis of a video signal which is supplied to the pixel electrode 126, thereby obtaining the scattered light 31. A part of the scattered light 31 reaches the eye 21 of the observer.

When the convex lens 11 is a piano-convex lens or convex lens whose one surface has a weak positive power, the intensity of the illumination light 22a tends to be slightly reduced. There is, however, no problem in practice.

Figure 48:
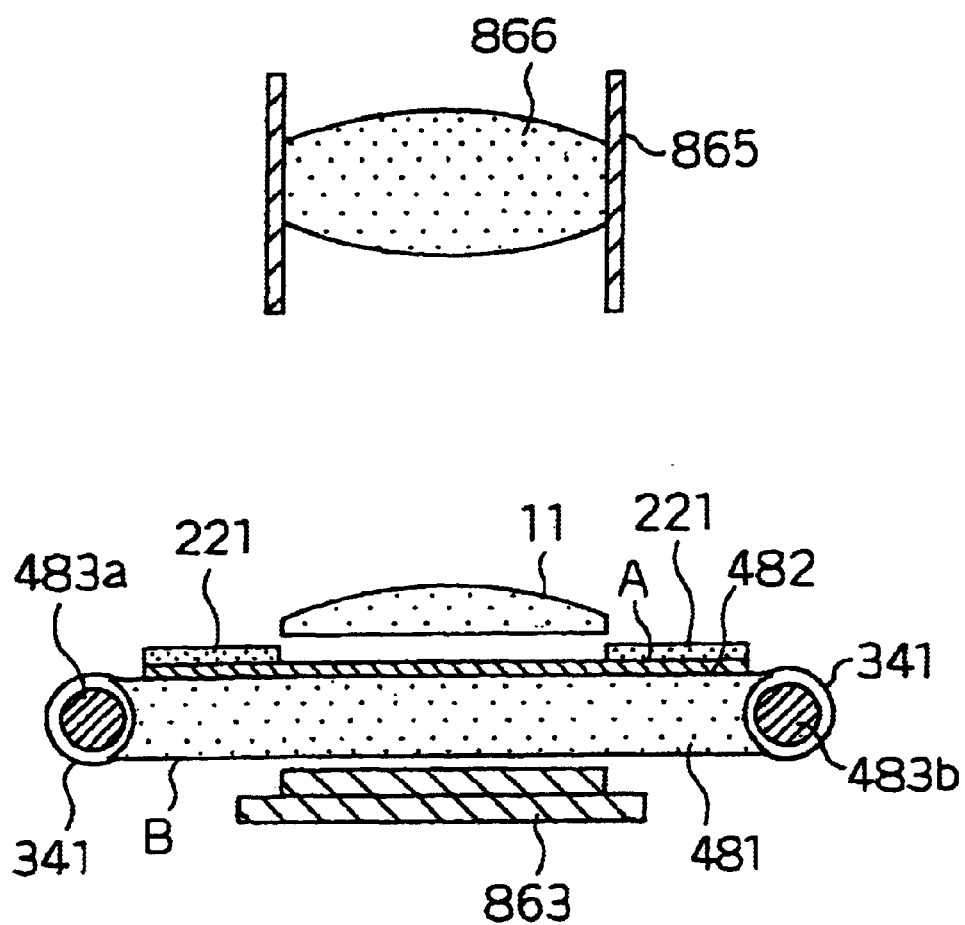
FIG. 48 shows the configuration of the view finder of the invention.

FIG. 48 shows a state where the display panel 863 is illuminated by a light guide plate 481 from the front side. A bar-shaped fluorescent tube 483 of a cold cathode type is attached to the edge of the light guide plate 481. The reflecting sheet 341 or reflecting film obtained by depositing silver (Ag) is formed around the fluorescent tube 483.

The diameter (d) of the fluorescent tube 483 and the thickness (t) of the light guide plate 481 are set so as to satisfy the following relation. By satisfying the relation, the light emitted from the fluorescent tube 483 can be efficiently introduced to the light guide plate 481.

$$\frac{1}{2}d \le t \le \frac{2}{3}d \qquad \text{(Expression 17)}$$

The edge part of the light guide plate 481, which is in contact with the fluorescent tube 483 is processed in a circular shape.

A thin film 482 having the refractive index (n) of 1.8 or higher is formed on one surface of the light guide plate 481. The thin film 482 is made of, for example, $Y_2O_2$, ITO, or the like. The thin film 482 is used to reduce the light which is irregularly reflected by the light guide plate and emitted from the surface A and to allow a larger amount of light to be emitted from the surface B. In the invalid areas on the surfaces A and B (areas through which light valid for the image display does not pass), the optical absorbing film 221 is formed.

The light guided from the fluorescent tube 483 to the light guide plate 481 is transmitted through the light guide plate 481 and goes out from the surface B. The emitted light illuminates the display panel 863. The light modulated by the display panel 863 passes through the light guide plate 481, is condensed by the lens 11, and is incident on the magnification lens 866.

FIG. 49 shows an embodiment in which the view finder in FIGS. 47 and 48 is used for video equipment such as a video camera, electronic camera, or the like.

As illustrated in FIG. 49, the display panel 863 is attached to a panel holder 492. The panel holder 492 is attached to a casing 491 of a video camera or the like. As necessary, the panel holder 492, light guide plate 481, lens 11, and the like can be stored (folded and housed) on a side face of the video camera or the like.

Figure 49A:
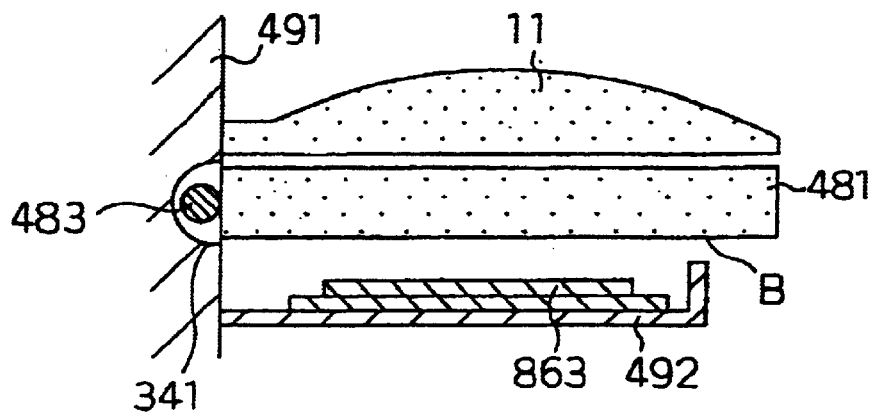
FIGS. 49A to 49C show the configuration of a video display apparatus of the invention.

In FIG. 49(a), light emitted from the fluorescent tube 483 disposed on a side of the casing 491 is incident on the light guide plate 481. The light emitting device is not limited to the fluorescent tube but a white LED or the like can be used. Light from the light guide plate 481 goes out from the surface B and illuminates the display panel 863.

Figure 49B:
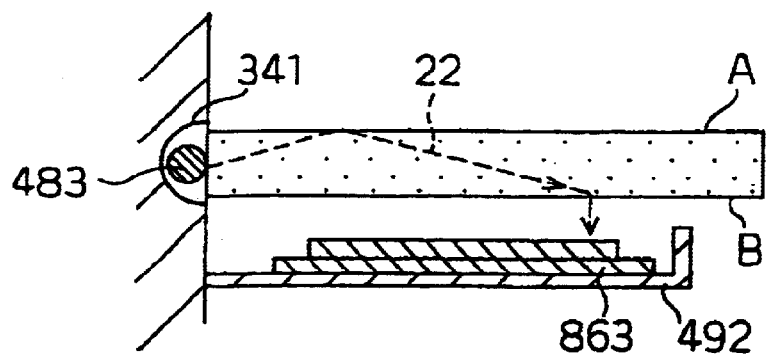
Figure 49C:
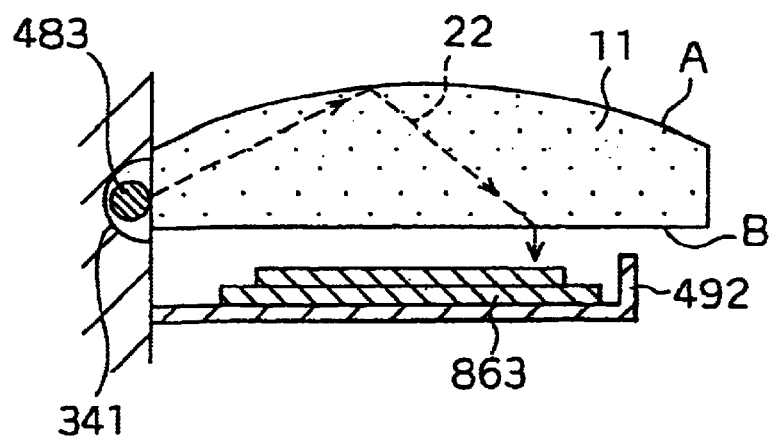

FIG. 49(a) shows a configuration having the light guide plate 481 and the condensing lens 11 and FIG. 49(b) shows the configuration of FIG. 48. FIG. 49(c) shows an example of the configuration developed from the configuration of FIG. 47.

Figure 50:
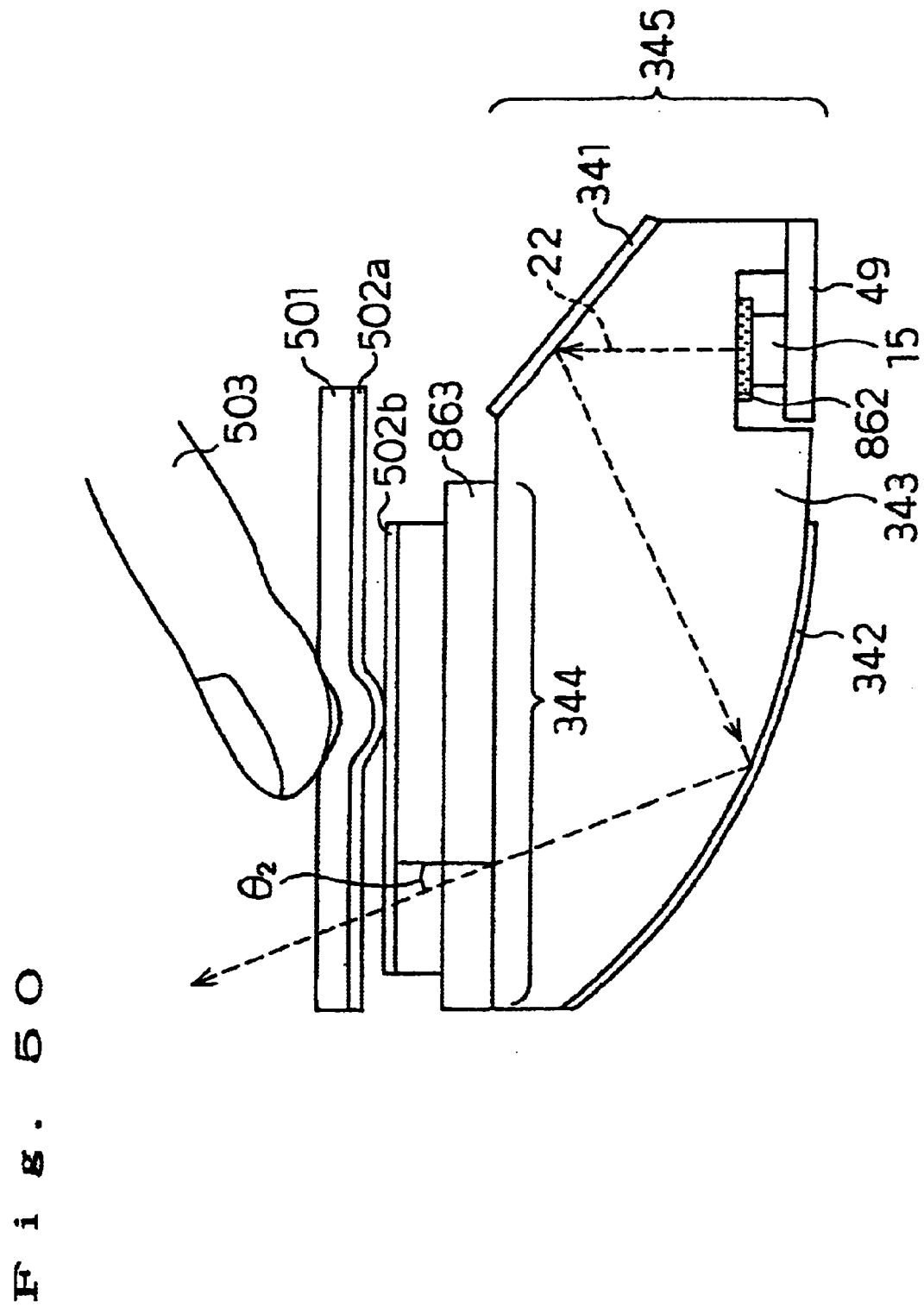
FIG. 50 shows the configuration of the video display apparatus of the invention.

The PD display panel is characterized in that the liquid crystal layer is not a liquid as the TN liquid crystal or the like but a solid. It is accordingly easily developed to a touch panel as shown in FIG. 50 since the liquid crystal layer is not distorted even when the pressure is applied to the liquid crystal layer.

The PD display panel 863 in the NW mode is disposed in the light outgoing area 344 of the illuminating apparatus 345 of the invention. A conductive film 502b is formed on the surface of the PD display panel 863. On the other hand, a conductive film 502a is formed on a transparent sheet 501.

When the observer touches the surface of the transparent sheet 501 with his/her finger 503, the conductive films 502a and 502b come into contact with each other and the position pressed by the finder can be determined. The position is determined by using a value of resistance or a current value.

When the finger 503 presses the surface, the counter substrate 122 on the display panel 863 is pressed. In the case where the liquid crystal layer 127 is made of a liquid and the pressure is applied, the light modulating state is changed. In the configuration of a conventional display apparatus, consequently, the conductive film 502b is formed on a thick substrate so that even when the transparent sheet 501 is pressed, the counter substrate 122 is not pressed.

When the conductive film 502b is formed on the thick substrate, however, the diopter varies. There is also a problem that the amount of the reflection light at the interface of the display panel increases and the display contrast deteriorates. There is also a problem such that the diopter varies, that is, the position pressed by the finger and the position on the screen of the display panel 863 are deviated from each other.

In FIG. 50, since the conductive film 502b is formed directly on the display panel 863, the diopter does not vary. The conductive film 502b may be formed on a thin film. In this case as well, when the observer presses the panel with his/her finger 503, the film is curved and the display panel 863 is pressed. Since the PD display panel is used, however, the light modulating layer is solid. No distortion therefore occurs in the light modulating layer due to the press and the light modulating state is not changed.

FIG. 50 shows the configuration of an apparatus which allows the observer to watch a preferable image by making light enter the display panel 863 at an angle of $\theta_k$ by using the illuminating apparatus 345 of the invention. A touch panel having excellent operability is provided.

Figure 51:
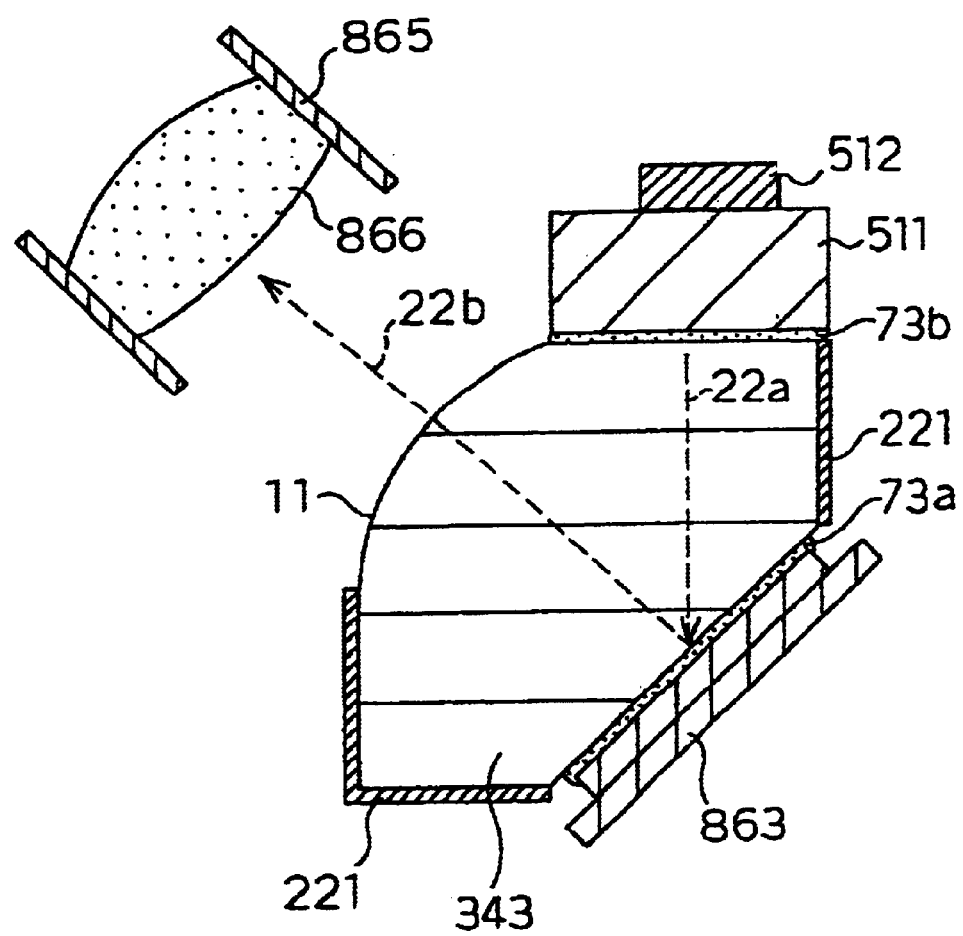
FIG. 51 shows the configuration of the view finder of the invention.

In the view finder of FIG. 1, at the time of assembling the view finder, there is a case such that the angle $\theta_k$, the optical axis 14, and the like have to be adjusted. Long time and skill is necessary for the operation. FIG. 51 shows a view finder in which parts or the like, are attached to the transparent block 343, thereby largely simplifying the adjusting process.

The display panel 863 is optically coupled to one surface of the transparent block 343. By the optical coupling, the display panel 863 and the transparent block 343 are integrated and, further, the optical loss which occurs at the interface of the display panel 863 is prevented. A plane light source 511 which emits light from the plane is attached to the other side of the transparent block 343.

Reference numeral 512 is a booster coil for the plane light source 511. An example of the plane light source 511 is UFU07F852 or the like, manufactured and sold by Ushio Inc. The plane light source 511 is integrally, optically coupled to the transparent block 343 by an adhesive 73b or the like. Obviously, a white LED or the like can be used instead of the plane light source 511.

The lens 11 is formed on the light outgoing surface of the transparent block 343. An optical absorbing film (optical absorbing means) 221 is formed or disposed in the invalid area of the transparent block 343. The optical absorbing film 221 has the function of absorbing light irregularly reflected in the transparent block 343 to thereby improve the display contrast.

When the transparent block 343 is formed by using a die, it can be produced more accurately. When the display panel 863 or the like is attached to each surface of the transparent block, the optical axes and the like coincide with each other easily and accurately.

FIG. 98 shows a configuration in which the lens 11a for converting the light emitted from the white LED 15 into almost parallel light and the lens 11b for converting light going out from the display panel 863 to the magnification lens 866 into a light flux are integrally formed in the transparent block 343, and the optical absorbing film 12 for absorbing reflection light when the display panel 863 is in the black display mode is formed on one surface of the transparent block 343.

Figure 99:
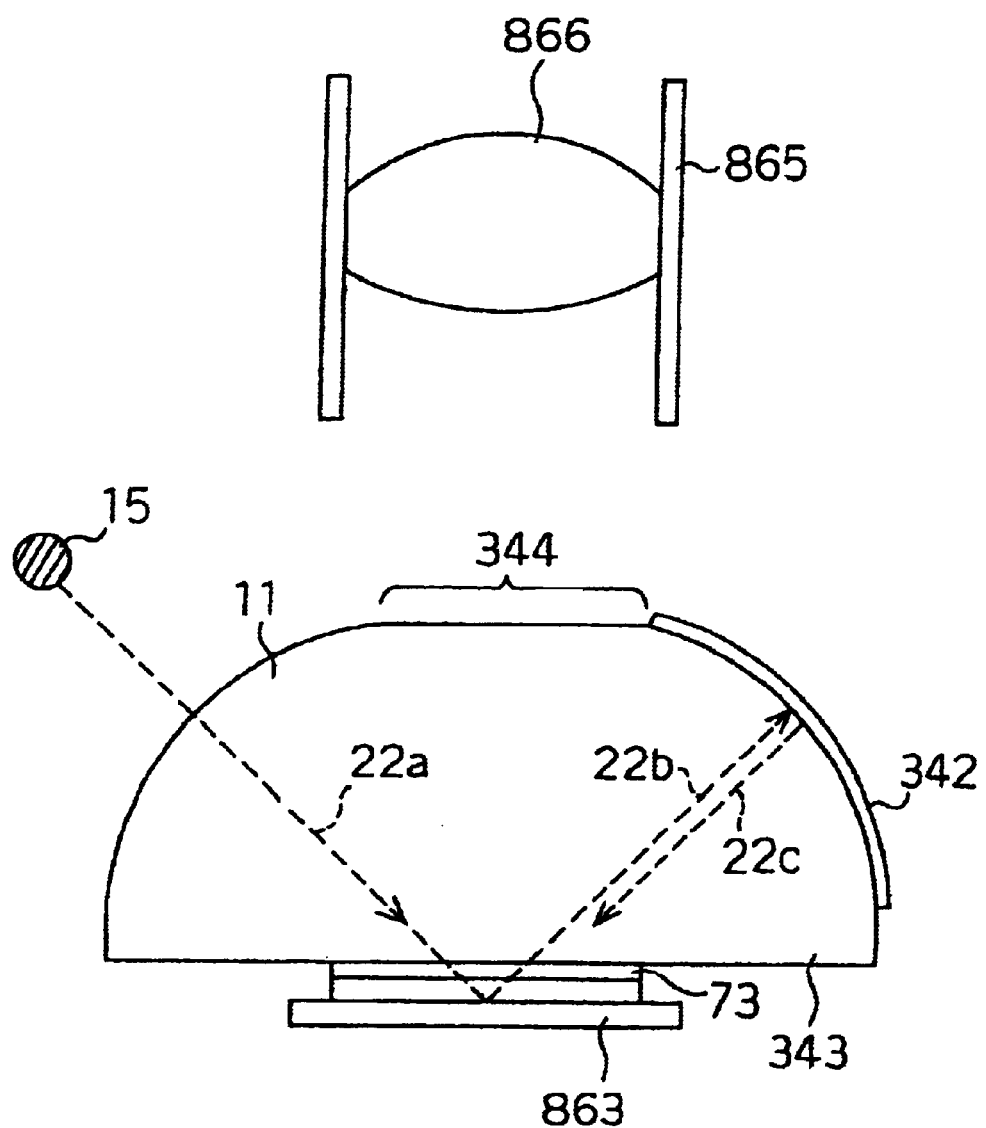
FIG. 99 shows the configuration of the view finder of the invention.

FIG. 99 shows a configuration in which the concave mirror 342 is formed on one surface of the transparent block 343. The light emitted from the light emitting device 15 is reflected by the concave mirror 342 and becomes reflected light 22b. The reflected light is condensed and again made the illumination light 22c. By constructing the optical system as mentioned above, effects similar to those when two light emitting devices 15a and 15b are provided as shown in FIG. 32 are obtained. The high luminance display can be realized and the light utilizing rate can be increased.

Figure 100:
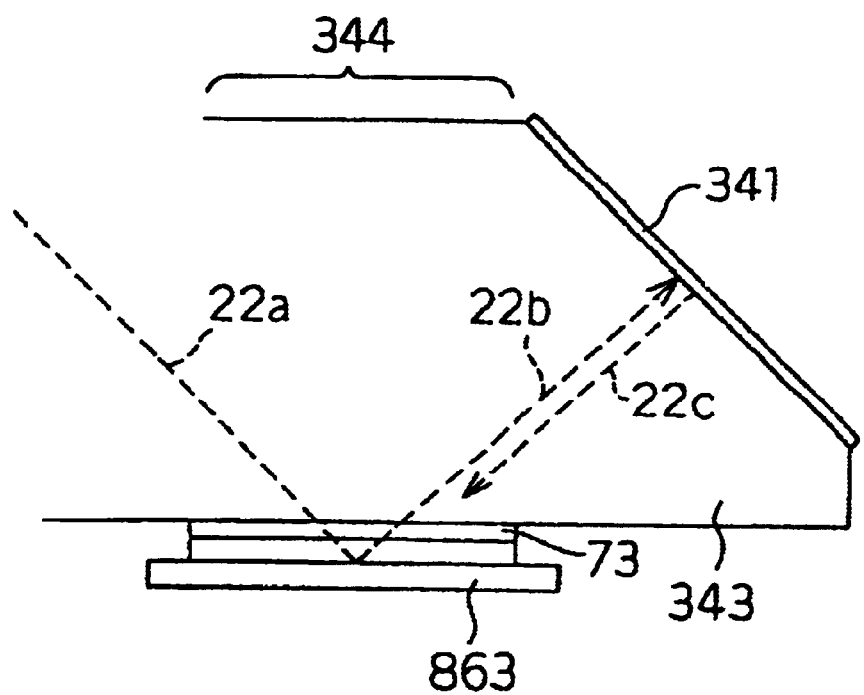
FIG. 100 shows the configuration of the view finder of the invention.

FIG. 100 shows a configuration in which the reflecting mirror 341 is formed in place of the concave mirror of FIG. 99. Although the condensing efficiency deteriorates slightly, it is sufficient in practice.

Figure 53:
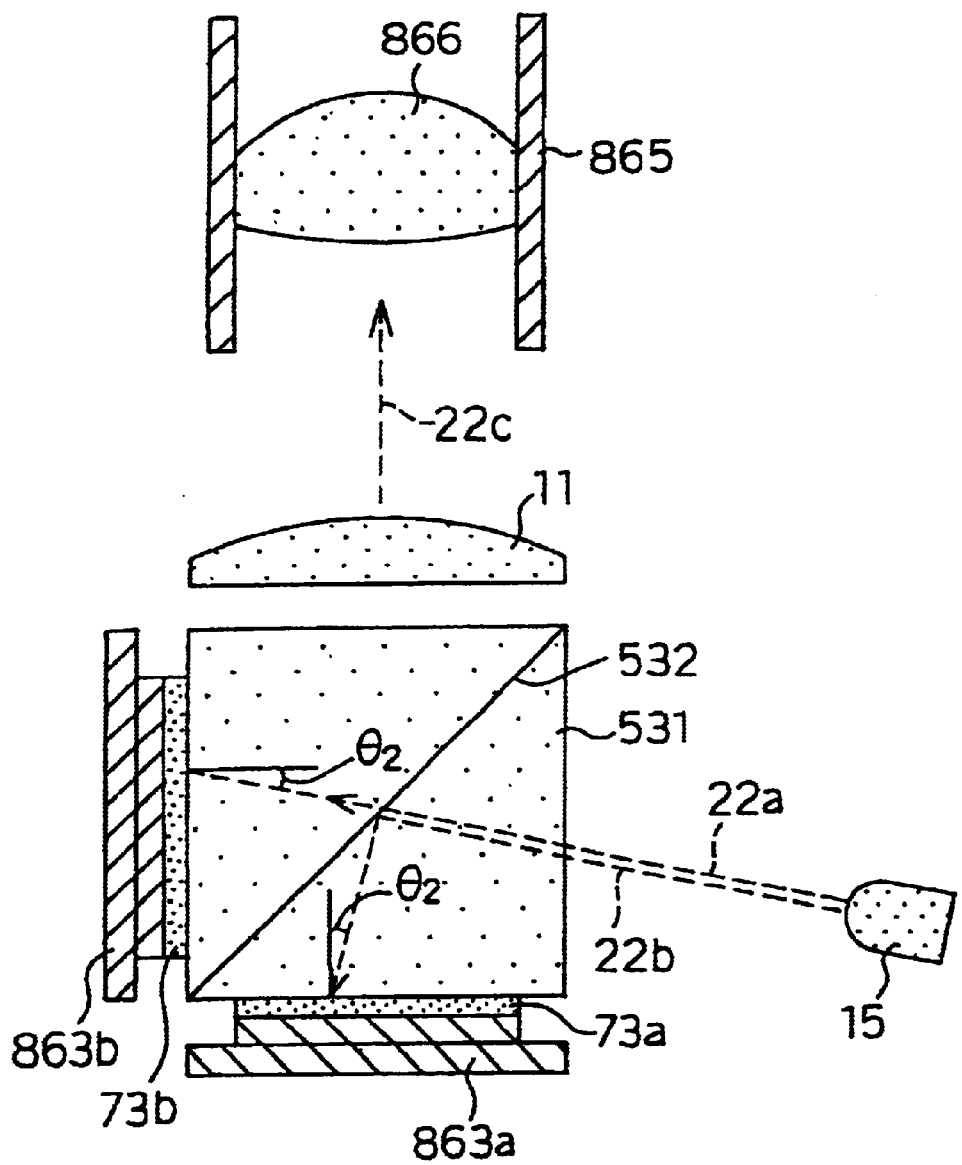
FIG. 53 illustrates the configuration of the view finder of the invention.

FIG. 53 shows a configuration of a view finder using a polarization beam splitter 531 (called PBS hereinlater) instead of the transparent block.

As illustrated in the diagram, display panels 863a and 863b are attached to the PBS. Light emitted from the light emitting device 15 is split into P-polarized light 22a and S-polarized light 22b by a light splitting face 532 of the PBS. The separated polarized light is incident on each of the display panels 863a and 863b. The light is incident on the display panel 863 at the angle of $\theta_2$.

It is described that light is incident on the display panel at the angle of $\theta_2$. That is, as described also in FIG. 1, in the view finder of the invention, the axis of the eye of the observer and the principal ray of the illumination light form a predetermined angle. In FIG. 53 as well, it is also possible to use the configuration in which the axis of the principal ray of the illumination light which enters the display panel 863 and the normal line of the display panel coincide with each other and, instead, the axis of the magnification lens 866 may be inclined.

The light splitting face 532 is constructed so as to preferably split the inclined beam 22. Although the light splitting face splits the beam into the P-polarized light and the S-polarized light, the invention is not limited to the arrangement. For example, a light splitting face which splits the light into blue light and green light may be used. In this case, reference numeral 531 is not the PBS but a simple beam splitter.

For example, in the case of an apparatus in which the light splitting face 532 splits the beam into red light 22a and blue and green light 22b, the display panel 863b modulates the red light 22a and the display panel 863a modulates the blue and green light 22b.

In the display panel 863a, therefore, it is necessary to form the color filters 124 of blue and green in order to separate the light into the blue and green light. The color filter made of a resin or dielectric multilayer is used. Although it is unnecessary to form a color filter of red in the display panel 863b, it is preferable to form the color filter of red in order to improve the color purity.

When the reference numeral 531 is a PBS, the display panel 863b is used for modulating the brightness (Y). Further, by forming the color filters 124 of red (R), green (G), and blue (B) in the display panel 863a, it may be used as a display panel for modulating the chromaticity (C).

In this case, it is unnecessary to form the color filters 124 in the display panel 863b but a monochroic filter is sufficient. In order to adjust the color temperature of the light emitting device 15, however, it is preferable to form a filter (color filter) for band control. The color filter may be disposed on either the light incident surface or light outgoing surface of the display panel 863b. The above matters can be naturally applied to the other embodiments.

As the PBS 531, a PBS of a film type sold by 3M Company or the like can be used. It is also possible to dispose a lens between the light emitting device 15 and the display panel 863, adhere a film-type PBS to the lens, and process the film-type PBS in a circular shape so as to have the function as a lens. Ditto for the following embodiments.

The reason of disposing a light reducing filter is that, for example, when the light emitting device 15 is a white LED, blue light is strong and the display image on the display panel becomes bluish. In order to prevent the luminance component from becoming too large, it is preferable to form or dispose the light reducing filter on the incident face of the display panel 863b.

The light modulated by the display panels 863a and 863b is again synthesized by the light splitting face 532 and converged by the lens 11, and the converged light is incident on the magnification lens 866. In the embodiment of FIG. 53, since the display image on the display panel 863a and that on the display panel 863b are overlapped with each other, it is equivalent that the apparent resolution increases twice. Consequently, a display of high resolution can be realized by using a display panel of low resolution.

In FIG. 53, the display panel 863 is directly illuminated by the light emitting device 15, but the invention is not limited to the configuration. For example, as shown in FIG. 197, the display panel 863 may be also illuminated by using the illuminating apparatus 345 of the invention. That is, in the case of the configuration of FIG. 197, the excellent parallel light 22 is emitted from the illuminating apparatus 345, so that the display panel 863 can be uniformly illuminated.

As shown in FIG. 198(*a*), it may be constructed so that the light from the light emitting device 15 is converted by the lens 11a into almost parallel light and then the display panel 863 is illuminated by the parallel light.

As shown in FIG. 198(*b*), in the light emitting device 15 of the view finder, an LED 15R of red light, an LED 15G of green light, an LED 15B of blue light, and an LED 15W of white (W) light may be arranged densely. The diffusion sheet 1021 or the like is disposed on the light outgoing face of the light emitting device 15 so that rays from the LEDs 15 of respective colors are preferably mixed.

By allowing the LED 15W to emit light and allowing one or a plurality of the LEDs 15R, 15G, and 15B to emit light, the color temperature of the light illuminating the display panel 863 can be adjusted freely.

In the case of field-sequentially displaying an image, the LED 15R may be turned on when an image of red is displayed on the display panel 863, the LED 15G may be turned on when an image of green is displayed, and the LED 15B may be turned on when an image of blue is displayed. That is, even when the color filter 124 is not formed for the display panel 863, the LEDs 15R, 15G, and 15B are sequentially turned on synchronously with the images on the display panel 863 field-sequentially, thereby enabling a full-color display to be realized.

At this time, in order to prevent occurrence of a flicker, the driving method of the invention described with reference to FIGS. 122 to 125 and so on, may be used.

Figure 55:
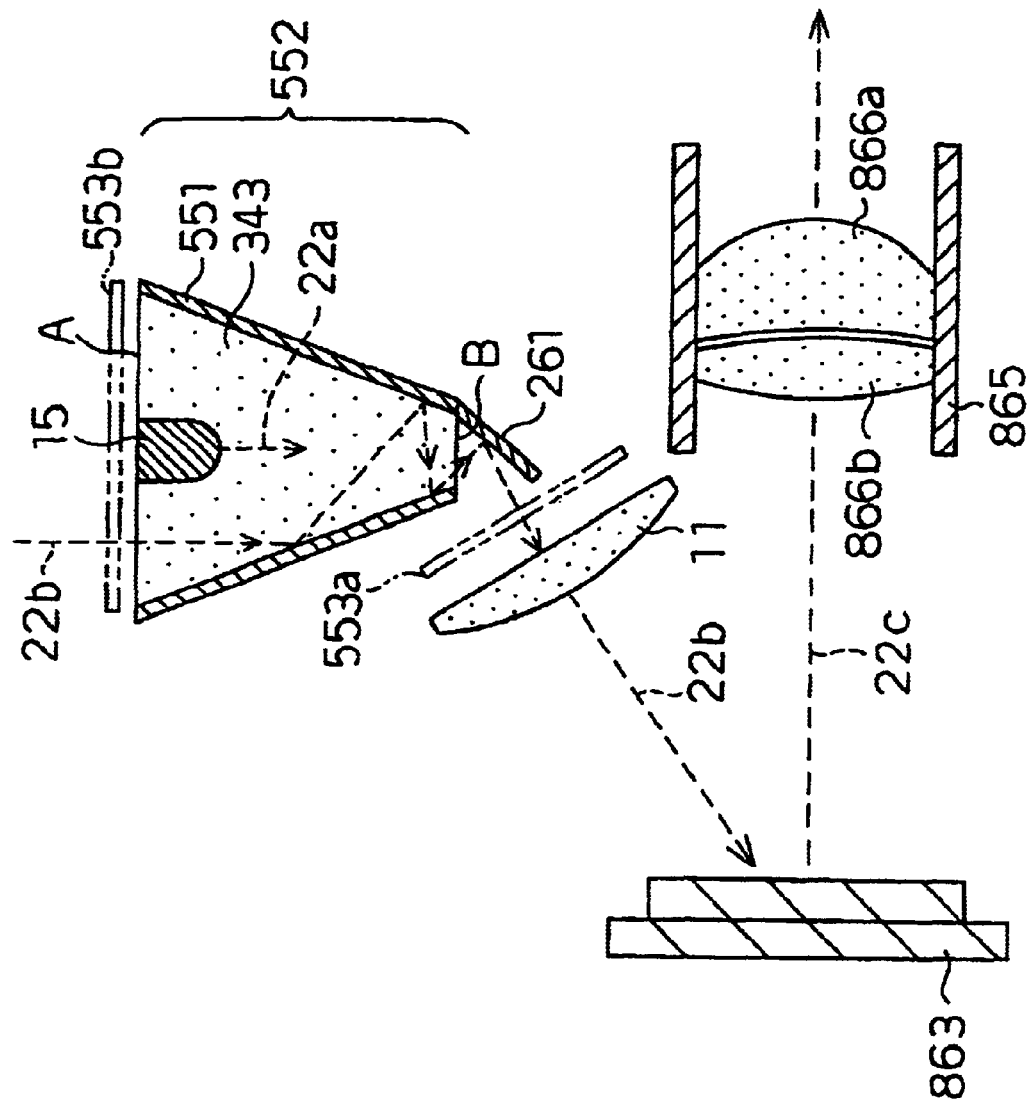
FIG. 55 illustrates the configuration of the view finder of the invention.

As shown in FIG. 55, the light emitting device 15 may be replaced by external light 22b. Alternately, the light emitting device 15 and/or the external light 22b may be used.

As illustrated in FIGS. 197 and 198, in the case of using a display panel of a semipermeable specification described with reference to FIGS. 18, 19, 20, 164, 177, and the like, a backlight comprised of the fluorescent tube 483 and the light guide plate 481 can be disposed on the back face of the display panel 863 as shown in FIG. 48.

Besides the backlight comprising the light guide plate 481 shown in FIG. 197, the display panel 863 can be illuminated from the back face by either using the light emitting device 15 as shown in FIGS. 30 and 33, using the backlight 345 of FIG. 50, or guiding the outside light to the back face of the display panel 863 as shown in FIG. 55.

By using the configuration having the first illuminating apparatus for illuminating the display panel 863 from the front face and the second illuminating apparatus for illuminating the display panel 863 from the back face, the image can be displayed more brightly with higher quality.

The configuration of using the display panel 863 of the semipermeable specification and illuminating the display panel 863 from the back face by using the backlight is not limited to the view finder. Needless to say, it can be adopted by other video display apparatuses such as the head-mounted display of FIG. 54, the video camera of FIGS. 57 and 64, the portable information terminal of FIG. 91 or the like, the personal computers of FIGS. 94 and 111, and the projection type display apparatuses or the like of FIGS. 159, 183, and 186.

The optical absorbing film or the like made of black coating or the like is formed on an invalid face (face which does not transmit light valid for image display) in the PBS 531 to thereby absorb halation light generated in the PBS 531. The display panel 863, the light guide plate 481, and the like may be optically coupled by using the optical coupling agent 73*b*.

Figure 54:
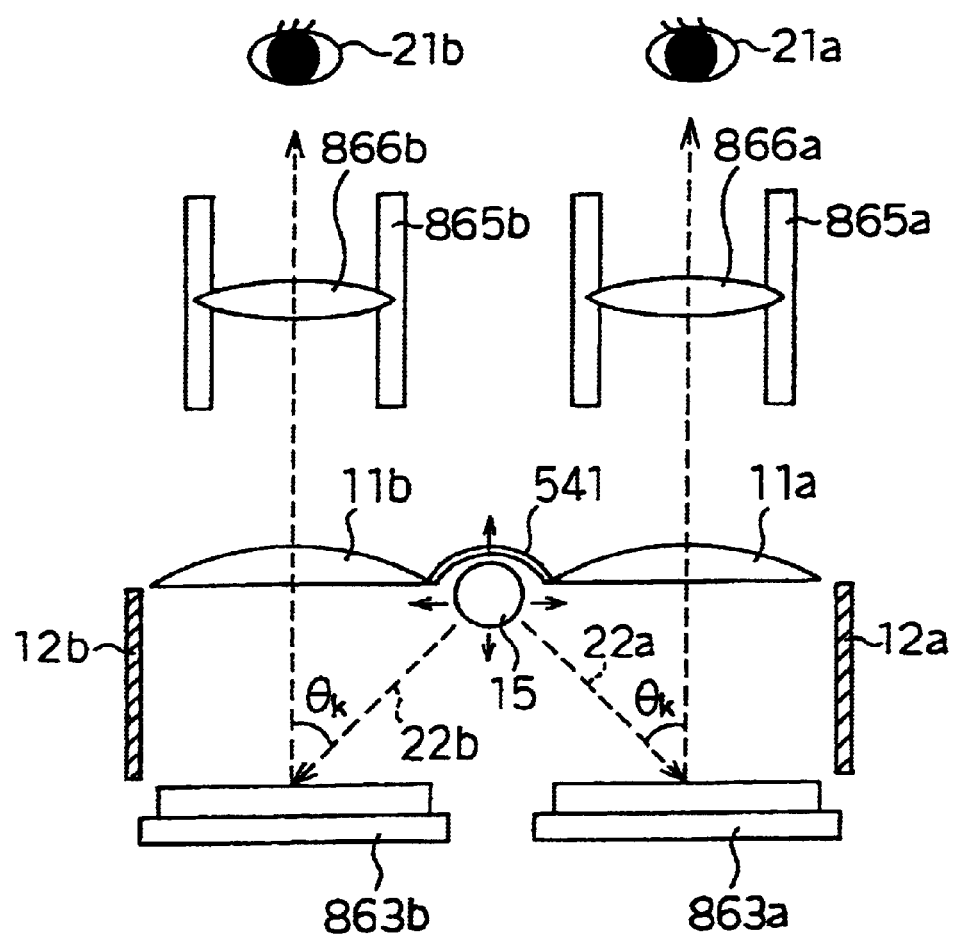
FIG. 54 illustrates the configuration of the view finder of the invention.

The view finder of FIG. 54 has two magnification lenses 866, two display panels 863, and one light emitting device 15.

A shielding plate 511 [sic] is disposed on the rear face side of the light emitting device 15. The shielding plate 511 [sic] prevents occurrence of invalid light. The light 22*a* and 22*b* emitted from the light emitting device illuminates the display panels 863*a* and 863*b* obliquely, that is, at the angle Of $\theta_k$.

Since the two display panels 863 can be illuminated by one light emitting device 15, the light utilizing rate is high. Optical absorbing films 12*a* and 12*b* for absorbing unnecessary reflected light are also provided.

The position of the light emitting device 15 may be moved back/force and right/left as shown by the arrows in FIG. 54. The position of the light emitting device 15 is moved so that the intensity of light illuminating the display panel 863*a* and that of light illuminating the display panel 863*b* are almost equal to each other.

The light modulated by the display panel 863*b* enters the magnification lens 866*b* and then the right eye 21*b* of the observer. On the other hand, the light modulated by the display panel 863*a* is incident on the magnification lens 866*a* and then on the left eye 21*a* of the observer. An image seen by the right eye 21*a* of the observer and an image seen by the left eye 21*b* which are different from each other can be displayed. Thus, a stereoscopic display (3D) can be realized.

Figure 52:
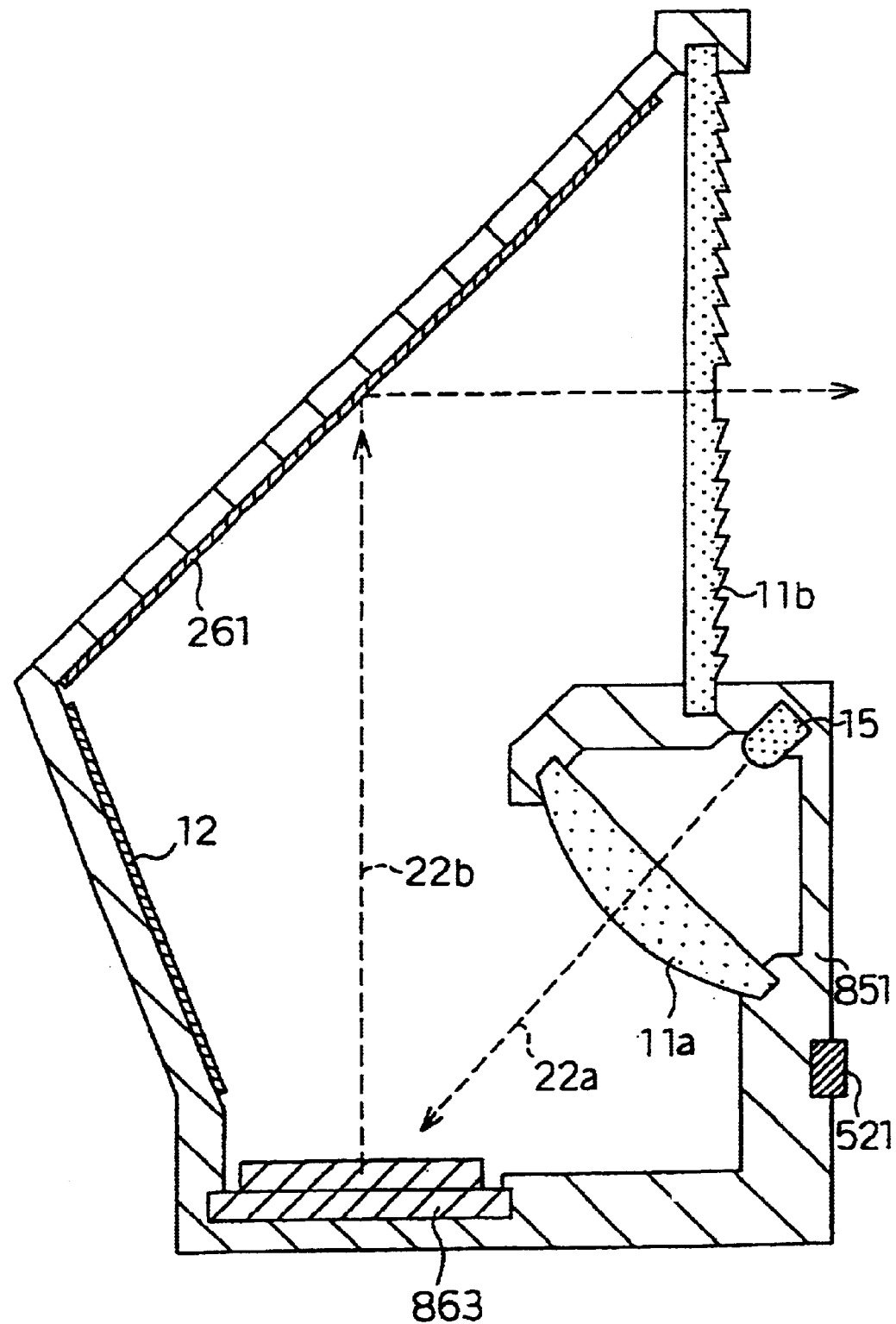
FIG. 52 shows the configuration of the video display apparatus of the invention.

Although the foregoing embodiments relate to the view finder or the video display apparatus of a similar form, a large-sized video display apparatus as shown in FIG. 52 can be also realized by the same technical idea.

Specifically, as illustrated in FIG. 52, light emitted from the light emitting device 15 (light emitting lamp) illuminates the display panel 863. The travel direction of the light modulated by the display panel 863 is changed by the mirror 261 and the light is incident on the Fresnel lens 11*b*. The observer can therefore observe an enlarged display image on the display panel 863 via the Fresnel lens 11*b*. Reference numeral 521 denotes a switch for on/off controlling the light emitting lamp 15.

Figure 56:
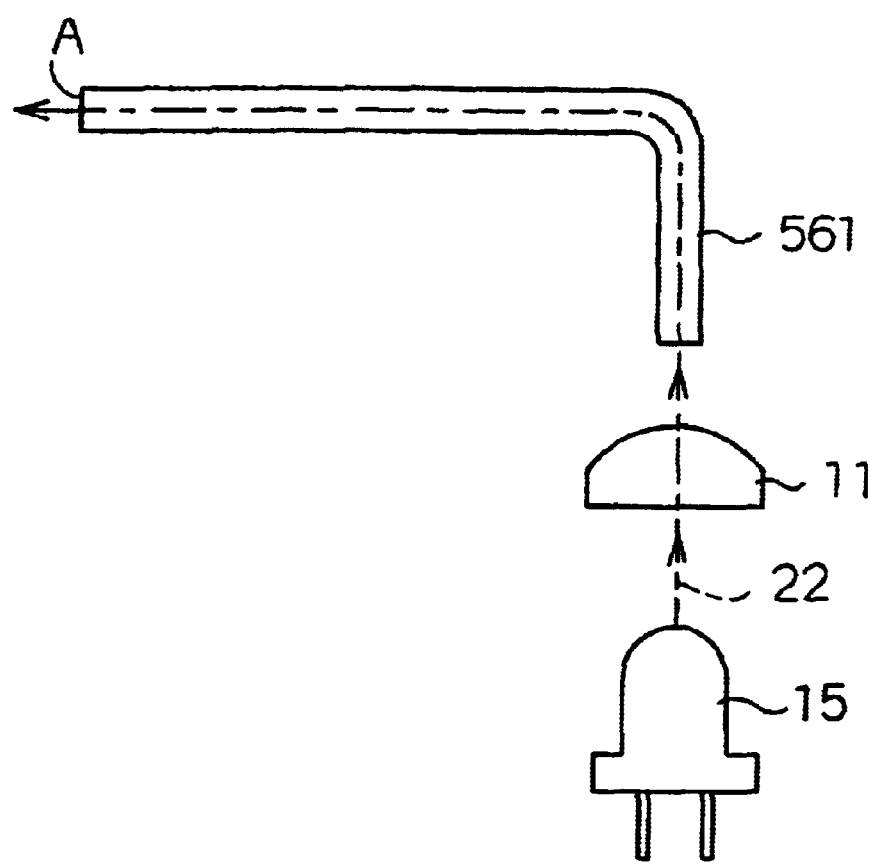
FIG. 56 is a diagram for explaining a light emitting device.

As the light emitting device 15, for example, a fluorescent tube, white LED, EL, or the like can be used or a device of condensing light emitted from the light emitting device 15 by the lens 15 [sic] as shown in FIG. 56 and guiding the light via an optical fiber 561 (light transmitting member) may used. That is, in this case, A in the optical fiber 561 is the position of the light emitting device.

Each of the above devices has the configuration that the light emitted from the light emitting device 15 is used as light for illuminating the display panel 863. As long as the light emitting device 15 is used, however, the power is consumed. FIG. 55 shows a configuration in which the display panel 863 is illuminated without using the light emitting device 15.

In FIG. 55, reference numeral 551 denotes a reflecting film of a conical shape, pyramid shape, or the like. The reflecting film 551 is formed around the transparent resin 343. Such a shape is called a condenser funnel 552. The condenser funnel 552 has a wide opening for receiving light and a narrow opening for emitting light. The shape of the condenser funnel is not limited to the conical and pyramid shapes. The invention is not limited to whether the transparent resin is filled inside or not. The condenser funnel 552 can be formed only by the reflecting film 551. That is, the condenser funnel 552 is a funnel of light.

In order to condense the light while maintaining the directionality, a lens is needed. When the excellent directionality is unnecessary, however, the light can be condensed efficiently by using the condenser funnel 552.

The reflecting surface of the condenser funnel 552 is made of Al or Ag. As shown in FIG. 55, when the reflecting film 551 is formed on the resin block 343, the surface is not easily corroded. Ditto for the reflecting film 342 of the illuminating apparatus 345 of the invention. When there is no resin block 343 and the condenser funnel 552 is made by an Al or Ag plate, it is preferable to deposit magnesium fluoride, $SiO_2$, or the like on the surface to prevent the metal film from being corroded. A method of laminating the surface by using a PET film, silicon resin, or the like is also effective.

The sun light (outside light) 22*b* entered from the face A is reflected by the reflecting film 551 and condensed and the resultant light goes out from the face B. According to experiments, about 80% of luminous fluxes incident on the face A is condensed and goes out from the face B. The face B can therefore generate an emitter having a very high brightness, so that the face B can be regarded as the light emitting device 15.

The direction of the light from the face B is changed by the mirror 261 and converted by the condenser lens 11 into almost parallel light, and the resultant light illuminates the display panel 863.

The advantage of the condenser funnel 552 is that, unlike a lens, the image is not moved according to the direction of the incident light. In the case of mounting the view finder of the invention in the video camera, even if the position of the video camera is moved, the face B is maintained with preferable luminance. The light from the face A is condensed and the emitter is formed on the face B. The configuration of the invention which can generate the luminous flux having excellent directionality by using the face B as a light emitting device is very advantageous.

Light diffusing means such as the diffusion sheet 1021 (not shown) is disposed on the face B as necessary so as to eliminate unevenness in the luminance on the surface plane B.

A light emitting device such as the white LED 15 is disposed in the resin block 343. When the white LED 15 is turned on, the emitted light is also condensed by the condenser funnel 552 to the face B. The light emitting device such as the white LED 15 is turned on when there is no outside light. Alternately, it is turned on auxiliary when the outside light is weak.

It is controlled so that the light amount emitted from the plane B is always equal to a predetermined value by adding the light flux incident on the plane A and the light flux incident on the plane B. In order to realize it, a photosensor for measuring the light flux amount is disposed on the face B. The photosensor changes the light flux amount to a voltage or current value and outputs the obtained value. On the basis of the output of the photosensor, a current passed to the light emitting device 15 is changed to thereby adjust the amount of light incident on the display panel.

When the outside light is very strong, the amount of light incident on the display panel is too large. In order to deal with the problem, a light reducing filter or light reducing means 553a and 553b which are apertures is/are disposed in the optical path. Generally, as 553b, an aperture capable of varying the aperture diameter is disposed. As the means 553a, a light reducing filter such as a liquid crystal display panel capable of varying the outgoing light amount is disposed.

Although one magnification lens 866 is shown in the foregoing embodiments, the invention is not limited to the number. A plurality of lenses e.g. the magnification lenses 866a and 866b as shown in FIG. 55 can be also used. When a plurality of lenses are used, chromatic aberration is smaller and the light amount in the peripheral area can be increased.

As a method of illuminating the display panel 863 with outside light, for example, the configuration of FIG. 101 can be used. The display panel 863 of FIG. 101 is of the transmission type.

The outside light enters from a lighting window 1011 opened in a part of the body 851. A plate or lens made of a resin having a small degree of diffusion is fit in the lighting window 1011. The diffusion degree G of the plate satisfies the following conditions when it is assumed that the illuminance at the incident plane is E (1×), the brightness measured at the light outgoing face is B [nt], and the ratio of the circumference of a circle to its diameter is π.

$$3 \leq G \leq 20 \text{ where, } G = \frac{\pi B}{E} \qquad \text{(Expression 18)}$$

On the other hand, a reflection mirror 341 is disposed or formed on the surface of an arm 1012. The arm 1012 is constructed so that the tilt can be changed by the fulcrum 291. The observer adjusts the tilt of the mirror 341 so that the display image is observed most preferably. It is also possible to automatically detect the direction of the light entering from the lighting window 1011 and perform adjustment so as to change the tilt of the mirror 341 around the fulcrum 291 as a center.

With the configuration, the display panel 863 can be illuminated by using the outside light.

When there is no outside light or the outside light is extremely weak, it is necessary to use the light emitting device.

In FIG. 101, the plane light source 511 is used. A prism sheet 732 is disposed on the light outgoing face of the plane light source 511. The prism sheet 732 has a sawtooth shaped. For example, prism sheets (PR712, PR723, PR727, PR729) sold by Koyo Corporation and the like can be used. A Fresnel beam splitter such as PR703 can be also employed according to the configuration. The prism sheet 732 changes the travel direction of light emitted from the plane light source 511 to an oblique direction, thereby allowing the light 22b to illuminate the display panel 863.

Although the display panel 863 is of the transmission type, the PD panel whose front and back faces are illuminated can be used. In the case where the incident light is 22a, forward scattering is used. In the case where the incident light is 22b, back scattering is used. Such an optical system can be realized since the position of the eye 21 of the observer is fixed in the view finder, the light modulating system of the PD display panel is of the scattering system, and the image is displayed in the NW mode.

Figures 101A, 101B:
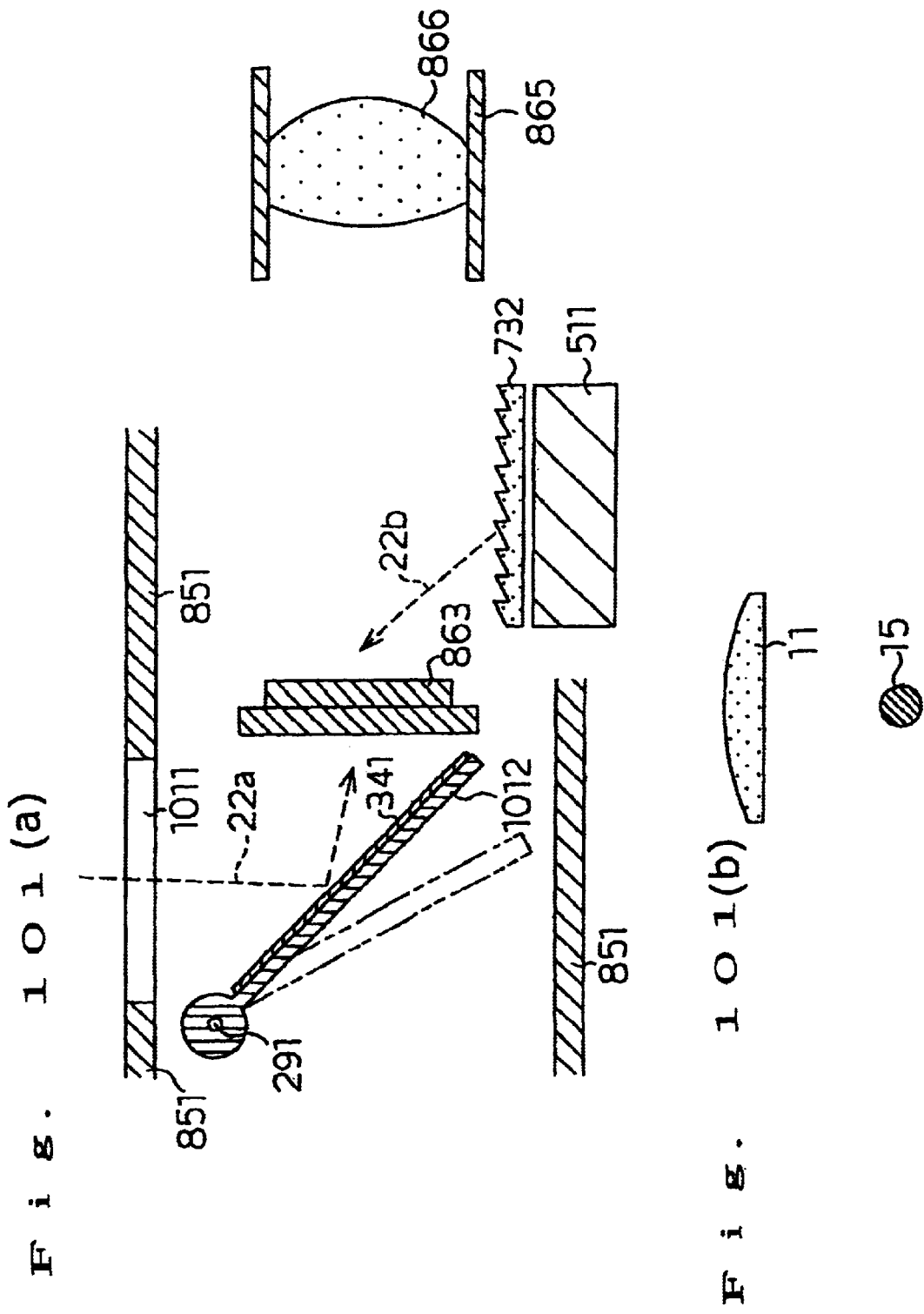
FIGS. 101A and 101B illustrate the configuration of the view finder of the invention.

As shown in FIG. 101(b), the plane light source can be also realized by a combination of the light emitting device 15 and the lens 11. Obviously, the outside light is not used for the illumination from the back surface but may be obtained by arranging a plane light source or the like. The observer uses both of the illumination from the back side and the illumination from the front face. Alternately, the display panel is illuminated by using only one of illumination light and the display image is adjusted so as to be observed optimally.

Figure 102B:
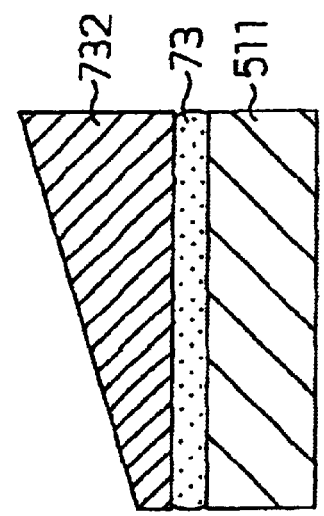
FIGS. 102A and 102B illustrate the configuration of the view finder of the invention.
Figure 102A:
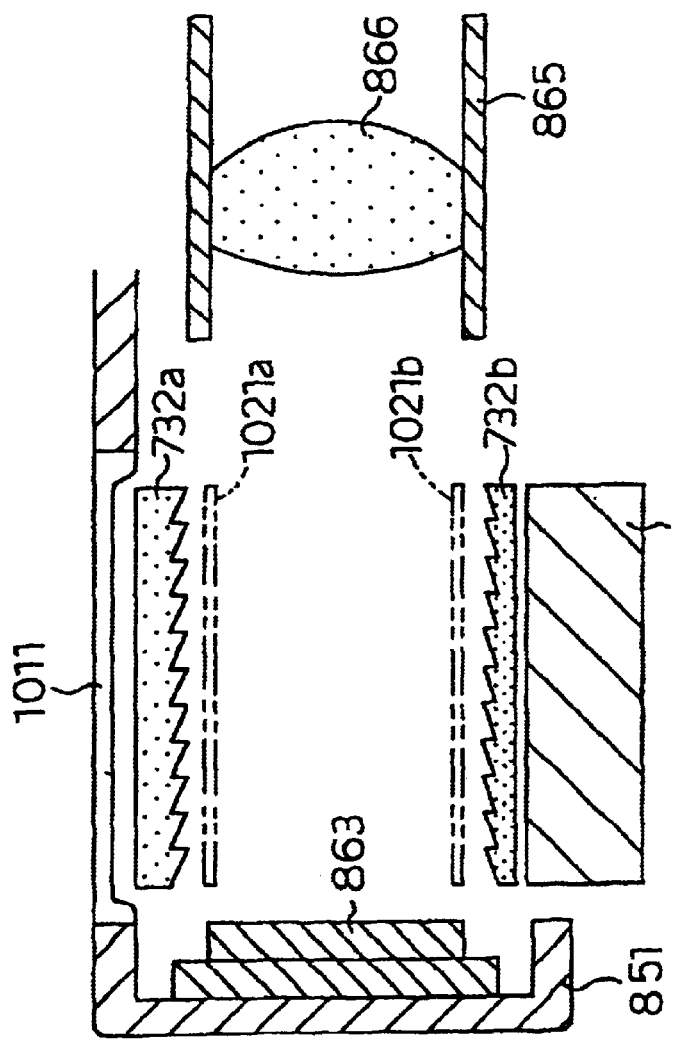

When the display panel 863 is of the reflection type having the reflecting electrode 126, the configuration as shown in FIG. 102 is used. The outside light is condensed from the lighting window 1011. The travel direction of the condensed outside light is changed by a prism sheet (prism plate) 732a The travel direction of the light from the plane light source 511 is also changed by a prism sheet 732b. The diffusion sheet 1021 is disposed on the light outgoing surface of the prism plate 732. It is constructed in order to prevent interference between the prism plate 732 and the pixel pitch of the display panel 863 and to prevent occurrence of moire. The substantially same degree G of diffusion as that of the lighting window 1011 is used for the diffusion sheet 1021.

As shown in FIG. 102(b), each of the prism sheets 732a and 732b can be also realized by a wedge shaped prism 732. The prism 732 is optically coupled to the light emitting device 511 by the optical coupling agent 73. That is, any prism sheet 732 can be used as long as it bends light. For example, a fiber plate or the like is used.

The video display apparatus of the invention, mainly the view finder, has been described above. The technical idea of the invention can be also applied to a direct-view type display apparatus as shown in FIG. 57 or the like.

Figure 57:
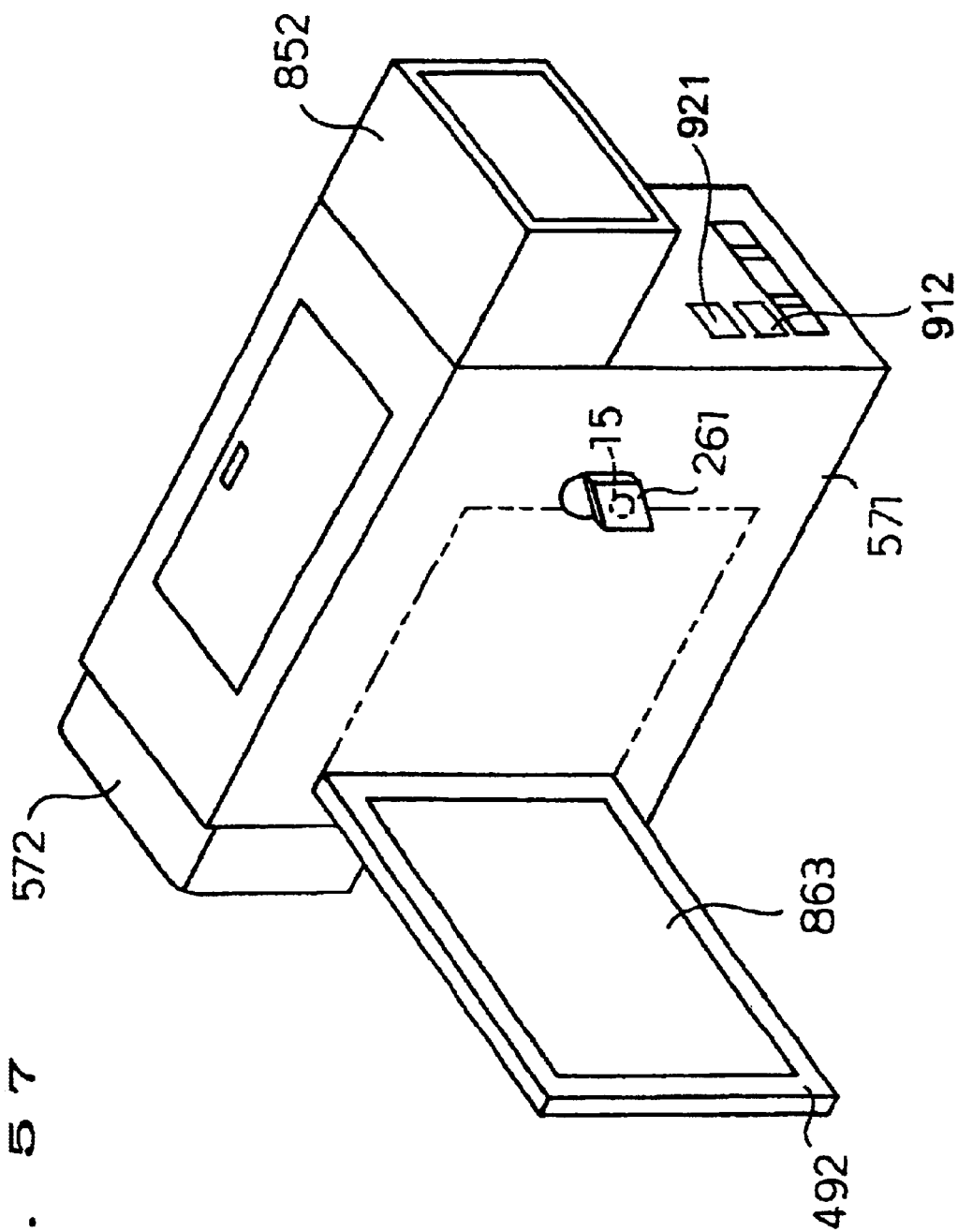
FIG. 57 is a perspective view of a video camera of the invention.
Figure 58:
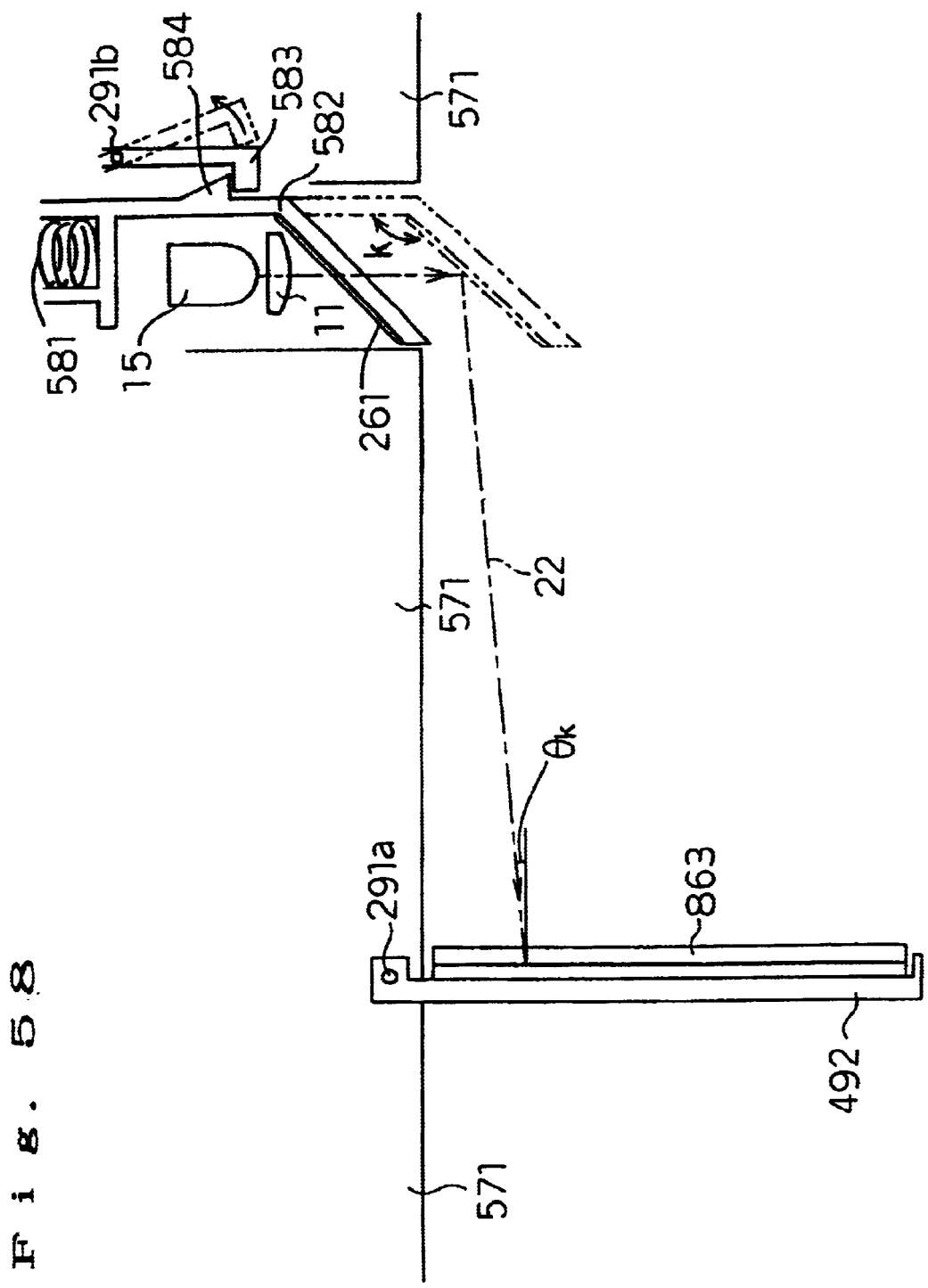
FIG. 58 is a diagram for explaining a video display apparatus of the invention.

FIGS. 57 and 58 are configuration diagrams in which the video display apparatus of the invention is used for the video camera body 571. In FIG. 58, the display panel 863 is a reflection type PD display panel and is attached to the display panel holder 492. The panel holder 492 is constructed so as to be movable around the fulcrum 291a as a center and can be housed on a side face of the video camera body 571. By turning the panel holer 492 around the fulcrum 291a, the observer can adjust the display image to a position in which the image can be watched most preferably.

The light source 15 is housed in the video camera body 571. The light 22 emitted from the light source 15 is reflected by the reflecting mirror 261 (mirror part), the travel direction of light is bent, and the resultant light is incident on the display panel 863. The convex lens 11 is disposed on the light outgoing side of the light source 15 to narrow the light emitted from the light source 15.

The reflecting mirror 261 is a dielectric mirror or a mirror obtained by vapor depositing aluminum or the like. In the optical path 22, a color filter (not shown) and the like are disposed in order to adjust the color temperature of the light or the like.

The reflecting mirror 261 is attached to the mirror part 582. By pressing a button (not shown) of the mirror part 582, a retaining part 583 is moved around a fulcrum 291b as a center. A nail 584 is then come off and the mirror part 582 is jumped out from the video camera body 571 by the function of a spring 581. In place of the spring 581, a shrinking member such as sponge or resilient plastic may be used.

The mirror part 582 is housed in the body 571 when the observer pushes it to the video camera body 571. At this time, the retaining part 583 is retained by the nail 584 and held until the button is pressed again.

Although not illustrated, upon disengagement of the nail 584, it is controlled so that a current is started to be applied to the light source 15. That is, when the button is pressed, the light source 15 is turned on. When the mirror part 582 is pushed in, the light source 15 is turned off.

Figure 59:
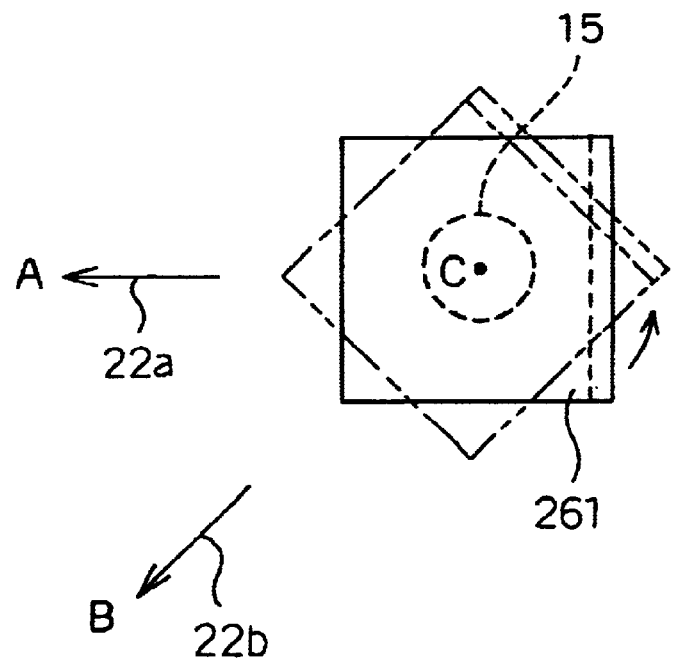
FIG. 59 is a diagram for explaining the video display apparatus of the invention.

The mirror part 582 is constructed to be turnable around the point C as a center as shown in FIG. 59. Consequently, the light outgoing direction of light from the light source 15 can be freely adjusted in the directions A and B or the like, and the display panel 863 can be illuminated so that the observer can observe the image easiest. As shown in FIG. 58, the angle (k) can be adjusted.

FIG. 57 is a perspective view of the video camera of the invention to which the view finder of FIG. 58 is attached. When the display panel 863 is in use, the light source of the display panel seen from the eyepiece cover 852 is turned off.

The display panel 863 is illuminated at the angle 91, of the principal ray. It is preferable that the illumination light is almost parallel light. When the display screen of the display panel 863 becomes large, however, the size of the convex lens used to convert the light into almost parallel light increases. It is consequently not easily used for the direct-view display panel as shown in FIG. 57.

It is necessary to properly set the distance between the light emitting device 15 and the display panel 863 so that the observer can easily watch the display image.

Figure 60:
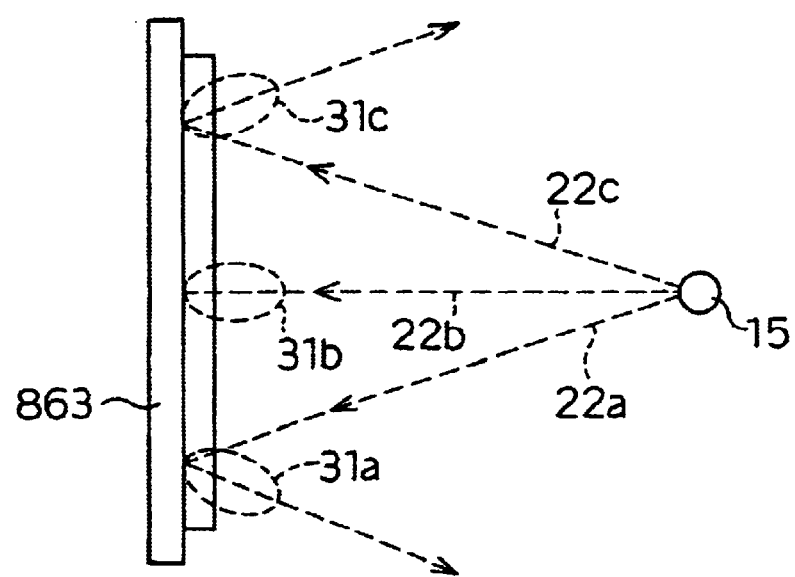
FIG. 60 is a diagram for explaining the video display apparatus of the invention.

As shown in FIG. 60, a point-shaped light emitting device 15 emits light from the center part of the panel. In such a state, when the position of the eye of the observer is not in the position in which the light emitting device 15 is disposed, the whole display image cannot be observed with an excellent display contrast.

Figure 61:
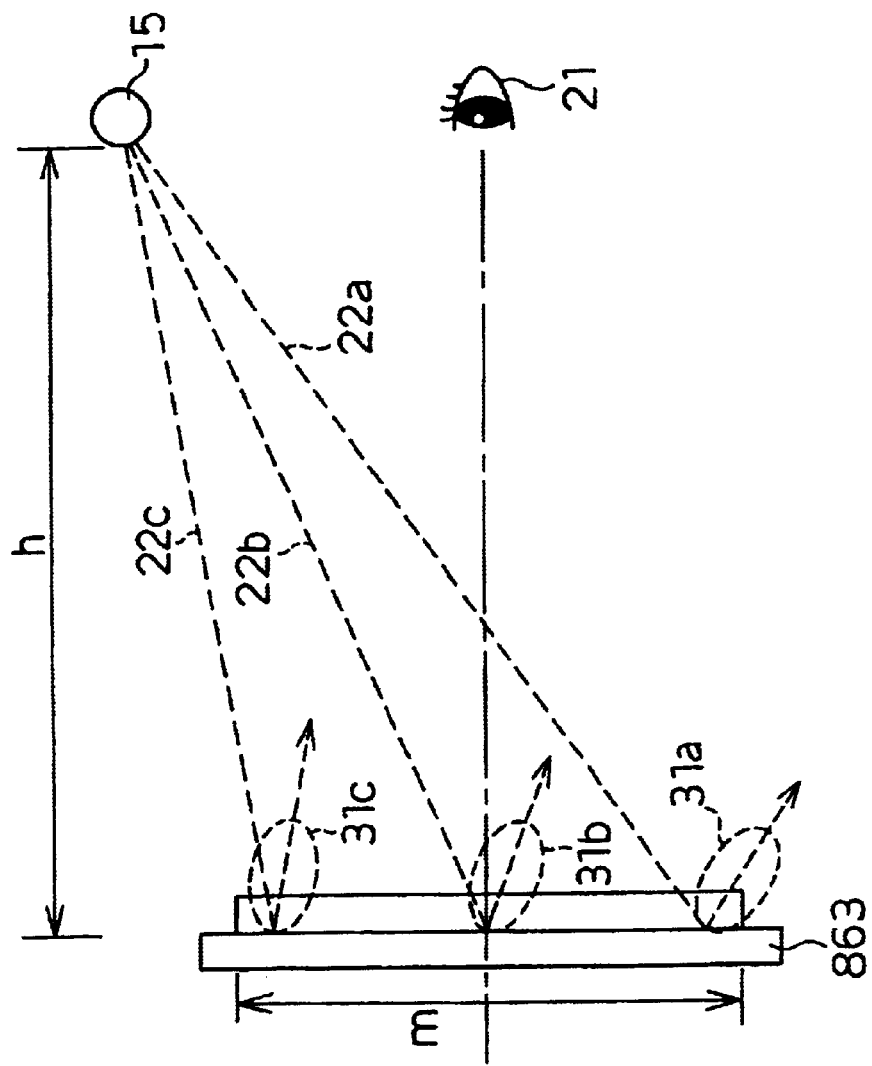
FIG. 61 is a diagram for explaining the video display apparatus of the invention.

From the viewpoint of the optical configuration, however, it is difficult to place the light emitting device 15 in the position of the eye 21 of the observer. As shown in FIG. 61, it is therefore necessary to place the light emitting device 15 in an obliquely upper part. In such a state, the distance between the light emitting device and the display panel 863 is set to h (mm) and the valid diagonal length of the display screen of the display panel is set to m (mm).

Figure 112:
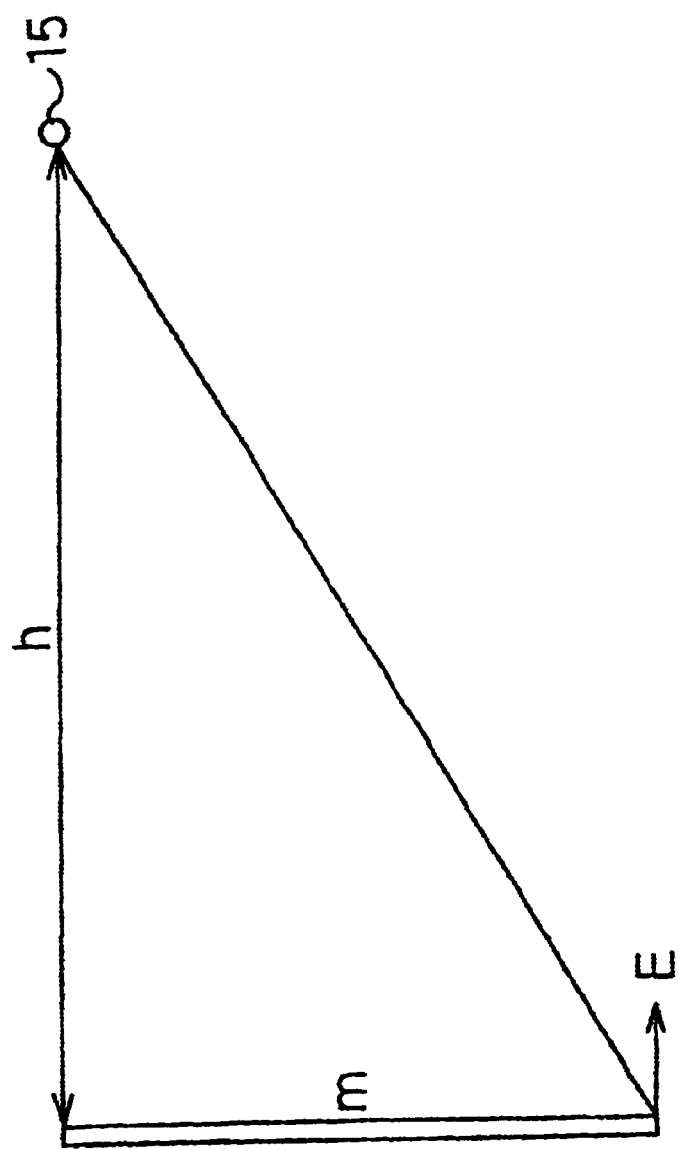
FIG. 112 shows the configuration of the video display apparatus of the invention.

For simplicity of explanation, it is assumed that the light emitting device 15 is disposed at the edge of the effective diagonal length as shown in FIG. 112. A point source is used as the light emitting device 15 and the luminous intensity is set to I. The illuminance E at the other edge of the valid diagonal length is expressed by the following expression.

$$E = \frac{Ih}{(h^2 + m^2)^{3/2}} \quad \text{(Expression 19)}$$

The relation by which E becomes the maximum is obtained from the above expression and is expressed as follows.

$$h = \frac{m}{\sqrt{2}} \quad \text{(Expression 20)}$$

In the range of the following expression, a change in E is large with respect to h.

$$\frac{m}{\sqrt{2}} > h \quad \text{(Expression 21)}$$

In the range of the above expression, therefore, a change in illuminance is large between the right and left parts or the upper and lower parts of the screen. On the other hand, out of the range of the above expression, although the change in illuminance between the right and left parts or upper and lower parts of the screen is small, the illuminance of the screen is lowered in proportional to the square of h. It is therefore necessary that the relation between m and h has to satisfy the relation of the following expression.

$$\frac{m}{\sqrt{2}} \leq h \leq 4m \quad \text{(Expression 22)}$$

More preferably, it is necessary to satisfy the relation of the following expression.

$$m \leq h \leq 3m \quad \text{(Expression 23)}$$

Figure 62A:
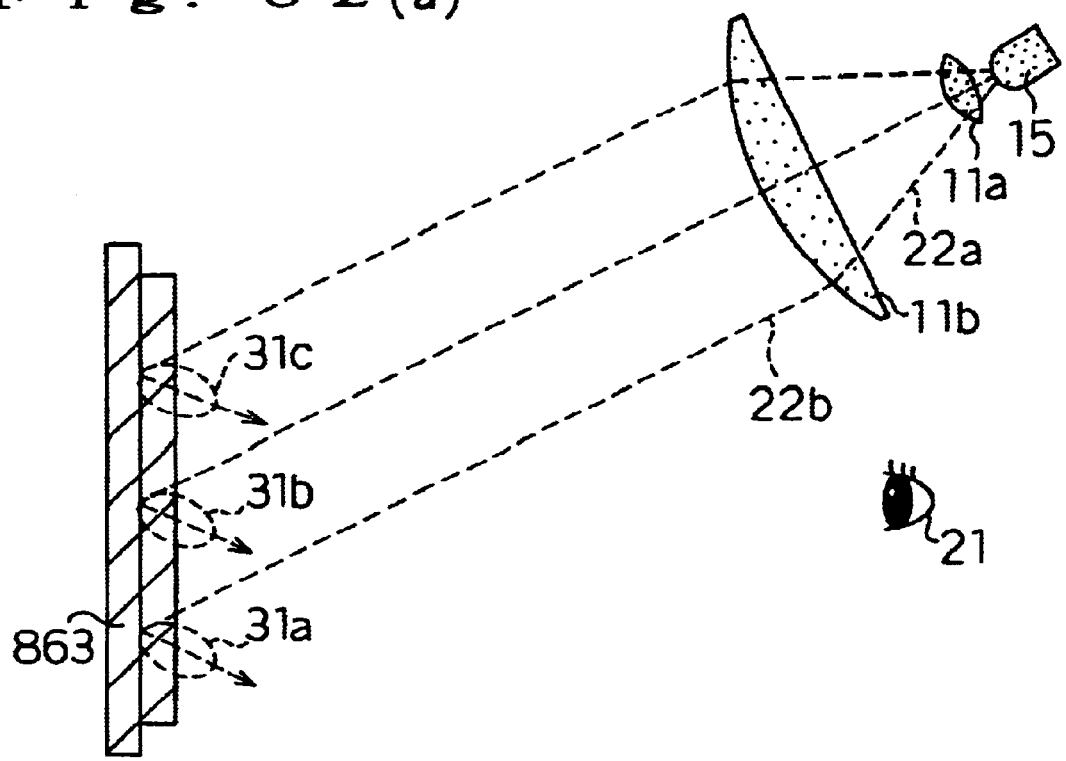
FIGS. 62A to 62C are diagrams for explaining the video display apparatus of the invention.
Figure 62B:
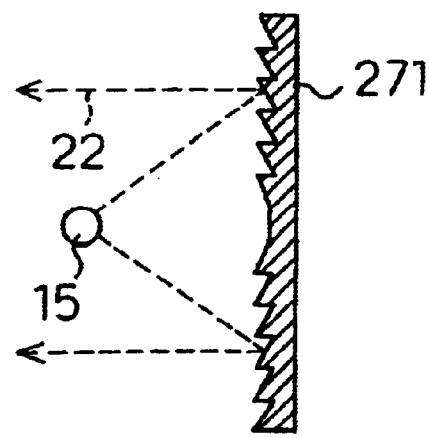
Figure 62C:
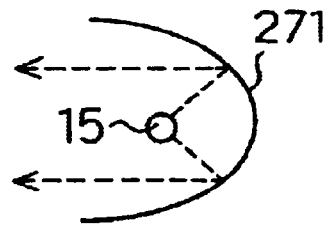

When the light emitting area of the light emitting device 15 is increased, (h) can be shortened. In reality, however, when the light emitting area of the light emitting device 15 is increased, the power consumption increases and it is not preferable. Most preferably, as shown in FIG. 62(a), the parallel light 22b is formed by the condenser lens 1. For example, the parallel light may be formed by the reflection type Fresnel lens 271 as shown in FIG. 62(b). As an example, a method of obtaining the parallel light by the parabolic mirror (concave mirror) 271 is shown in FIG. 62(c). A Fresnel lens type mirror, that is, a plate-shaped mirror may be used as the concave mirror 271. The relation between (h) and (m) relates to the case where the light emitting device is a point source or similar to a point source.

A case where the width of the valid display area of the panel 863 is set to (b) and the length is set to (a) and a linear light source emitter is used will be examined. When the longitudinal direction of the linear light source is disposed in the width direction (b) of the panel the symbol (m) can be regarded as the length (a). When the longitudinal direction of the linear light source is disposed in the length direction (a), the symbol (m) can be regards as the width (b). In the case where the light emitting device 15 is the plane light source, (m) can be regarded as the length (a).

Figure 63A:
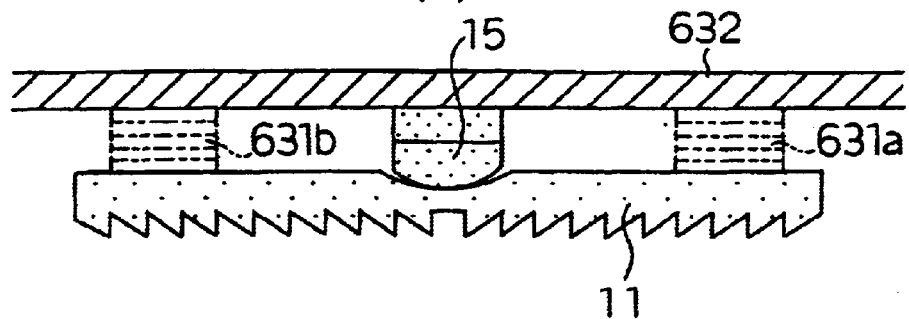
FIGS. 63A and 63B are diagrams for explaining the video display apparatus of the invention.
Figure 63B:
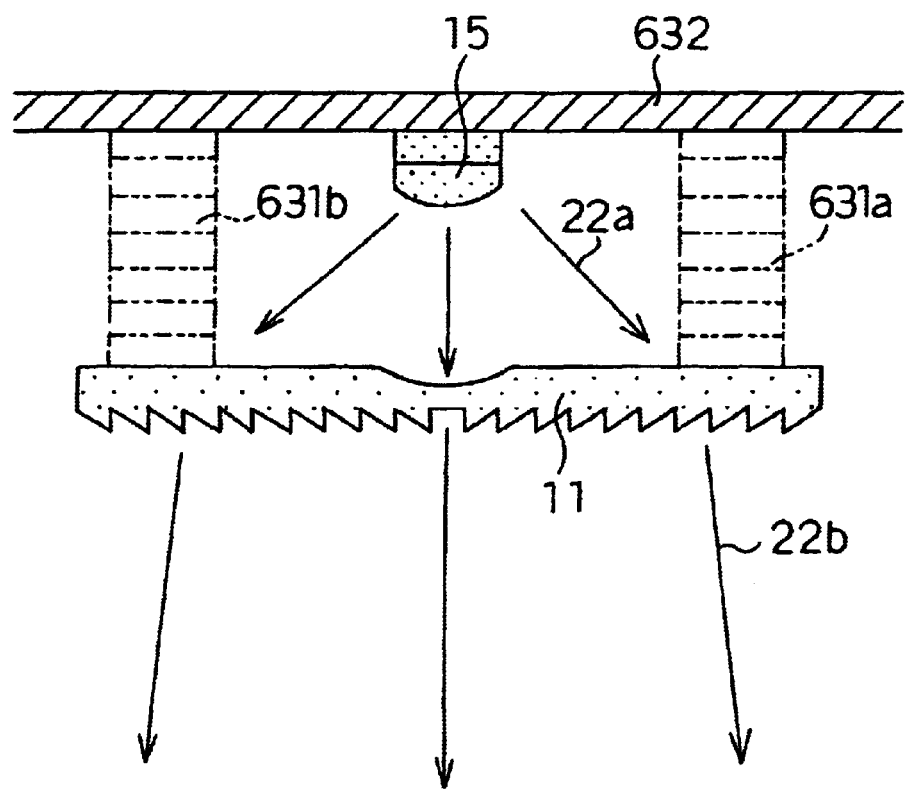

In the case of using the condenser lens as shown in FIG. 62, a Fresnel lens is used as the condenser lens as illustrated in FIG. 63 and a resilient body 631 such as spring or sponge is disposed on the back face of the lens. FIG. 63(a) shows a configuration in an un-used state. FIG. 63(b) illustrates a configuration in a use state.

The light emitting device 15 such as a white LED is disposed in the focal point of the Fresnel lens 11. The resilient body 631 is designed so that when it is extended, a focal point is obtained A recess is formed in the center part of the Fresnel lens 11. As understood also from FIG. 63(a), it is designed so that the light emitting device 15 is housed in the center part. The resilient body 631 is attached to an attaching member 632.

The user uses the video camera by illuminating the PD reflection type display panel 863 with the outside light. The user therefore varies the direction of the screen of the display panel 863 around the fulcrum 291a as a center to the best position.

When there is no outside light, the display panel 863 is illuminated by the light emitting device 15. At this time, as shown in FIG. 58, it is illuminated at the angle of $\theta_k$ from diagonally front. Since the matters with respect to the angle of $\theta_k$ are similar to those described for the view finder of FIG. 1, its description is omitted here. Only the difference is whether the image on the display panel 863 is viewed via the magnification lens or directly.

Figure 64:
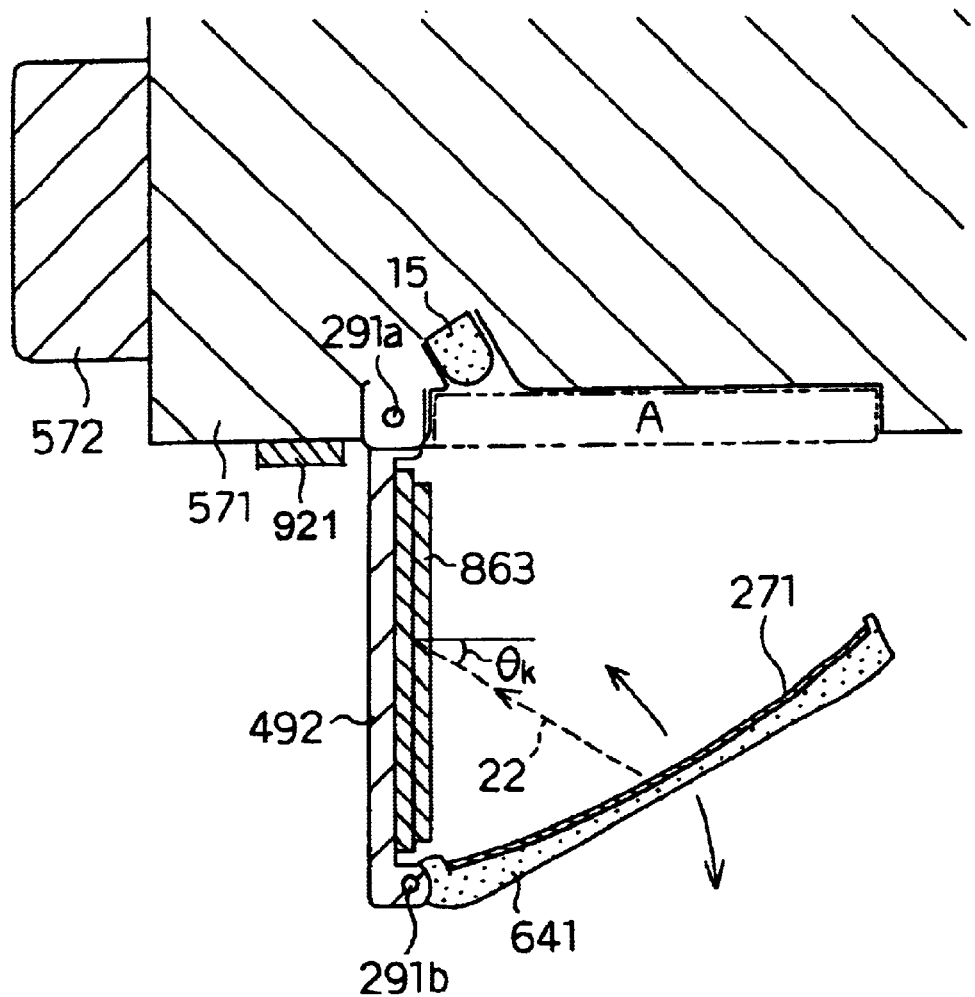
FIG. 64 shows the configuration of the video display apparatus of the invention.

With the configuration of FIG. 64, the parallel light can be easily formed and the display panel 863 can be illuminated with the parallel light. The concave mirror 271 is formed or disposed on the back face of a cover. The light emitted from the white LED 15 is converted by the concave mirror into almost parallel light (which does not denote only perfect parallel light). By using the parallel light converted, the display panel 863 is illuminated obliquely.

Figure 65:
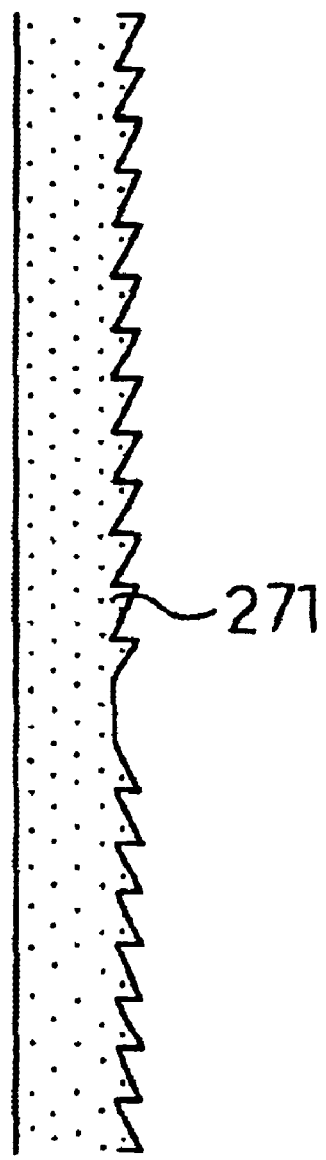
FIG. 65 is a diagram for explaining the video display apparatus of the invention.

In order to shorten the depth, as shown in FIG. 65, the concave mirror 271 has the Fresnel lens shape. In order to prevent occurrence of moire by the Fresnel lens, as required, a diffusion sheet is disposed in the optical path.

It is preferable to set the positional relation between the display panel 863 and the reflecting Fresnel lens (parabolic mirror) as shown in FIG. 180. The reflection Fresnel lens is obtained by forming the parabolic lens or the like in a Fresnel lens shape. The Fresnel lens is obtained by making the concave surface 271 in FIG. 180 flat.

The light emitting device 15 is disposed in the focal point P of the parabolic mirror. The Fresnel lens may be three-dimensional or two-dimensional. When the light emitting device 15 is a point source, a device of a three-dimensional shape (concentric shape) is used. When the light emitting device 15 is of a stick shape like a fluorescent tube, a device in which projections and recesses are formed two-dimensionally is used. The light 22a emitted from the light emitting device 15 is converted into the parallel light 22b by the parabolic mirror 271. The converted light 22b enters the display panel 863 at the angle of θ. The angle θ is determined from the viewpoint of design so that the reflection light 22c can be observed by the observer most easily (or the light 22c does not reach the eye of the observer as less as possible). The relations are similar to those of FIG. 35 and can be (or should be) also applied to the other embodiments as shown in, for example, FIGS. 69, 71, 119, 149, and the like.

The observer moves the cover around the fulcrum 291b and moves the display panel around the fulcrum 291a to adjust a position so that the display image can be observed most easily. Since two fulcrums 291a and 291b are provided in the embodiment of FIG. 64, the direction of the illumination light and the like can be easily adjusted.

When the display panel 863 is not used, a cover 641 is closed so as to cover the front face of the display panel 863 and the display panel 863 is housed in the range of a broken line A shown in FIG. 64 around the fulcrum 291a as a center, thereby realizing compactness. When a sufficient distance can be assured between the light emitting device 15 and the mirror, a plane mirror can be practically used as the concave mirror 271. The concave mirror can be therefore replaced with an ordinary mirror. By disposing or forming the color filter or the like on the concave mirror or an ordinary mirror, the color temperature of the illumination light of the display panel can be set to an optimum temperature by the concave mirror or an ordinary mirror.

The number of white LED 15 is not limited to one. A plurality of white LEDs can be also used. A PD display panel is used as the display panel 863. Preferably, the PD display panel whose scattering gain G satisfies the conditions of (Expression 4) is preferable. Further, it is preferable to use the scattering gain G as follows.

$$1.5 \leq G \leq 2.5 \qquad \text{(Expression 24)}$$

In the range, it can be realized that a voltage applied to the liquid crystal layer 127 is within 5.0 to 6.0 (V), the display contrast is 10 or higher and is excellent, and a very bright image can be displayed. As the display panel 863, a display panel of another reflection type such as a TN liquid crystal display panel can be used.

The construction of FIG. 64 uses the concave mirror 271. The concave mirror 271 naturally does not transmit light. For the user who observes the display image, however, the concave mirror is an obstacle. An embodiment of FIG. 66 is considered in order to solve the problem.

Figure 66:
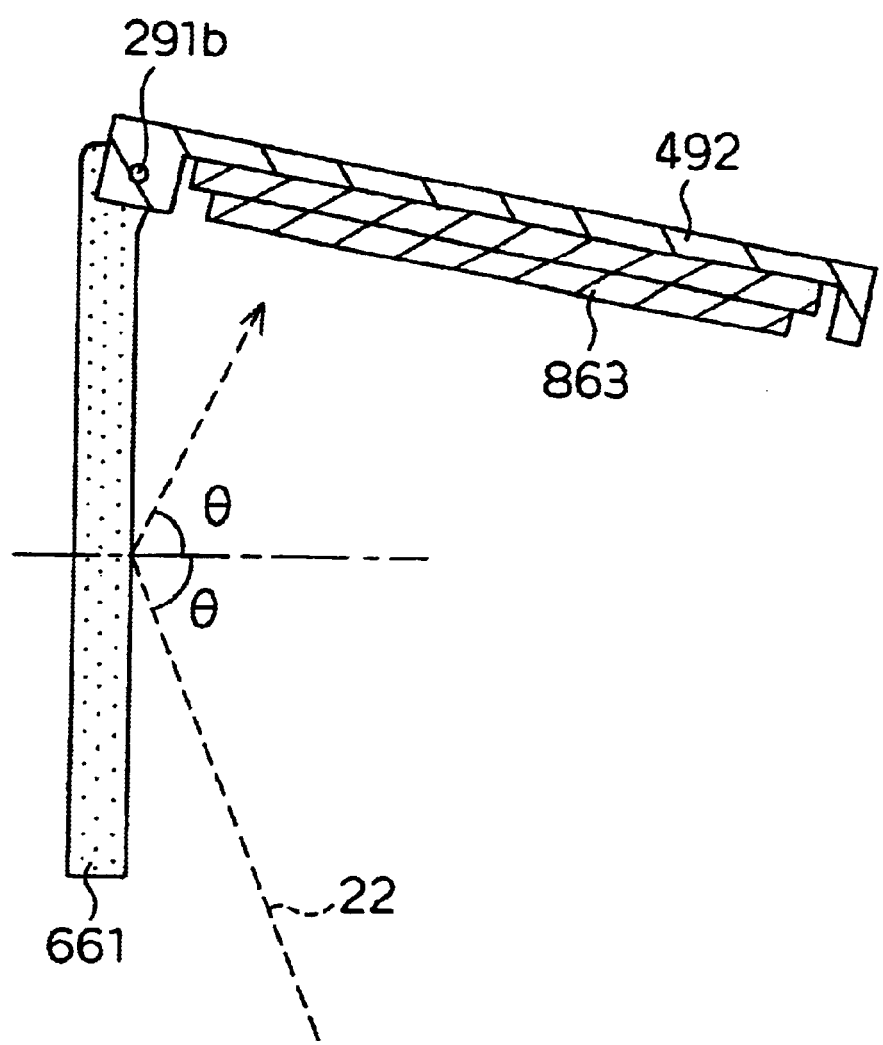
FIG. 66 is a diagram for explaining the video display apparatus of the invention.

In FIG. 66, a transparent plate 661 is used as reflecting means. The transparent plate 661 is made of, for example, an acrylic resin, polycarbonate resin, glass, or the like. The higher the refractive index of the transparent plate 661 is, the more it is preferable. As a resin having a higher refractive index, zeonex resin-can be mentioned.

Reference numeral 22 denotes the principal light. Since the transparent plate 661 is transparent, the display image on the display panel 863 can be observed through the transparent plate 661. The transparent plate 661 is not an obstacle when the image is observed. In order to reflect the light 22 and illuminate the display panel 863, it is necessary to set the incident angle θ to a proper value.

Figure 67:
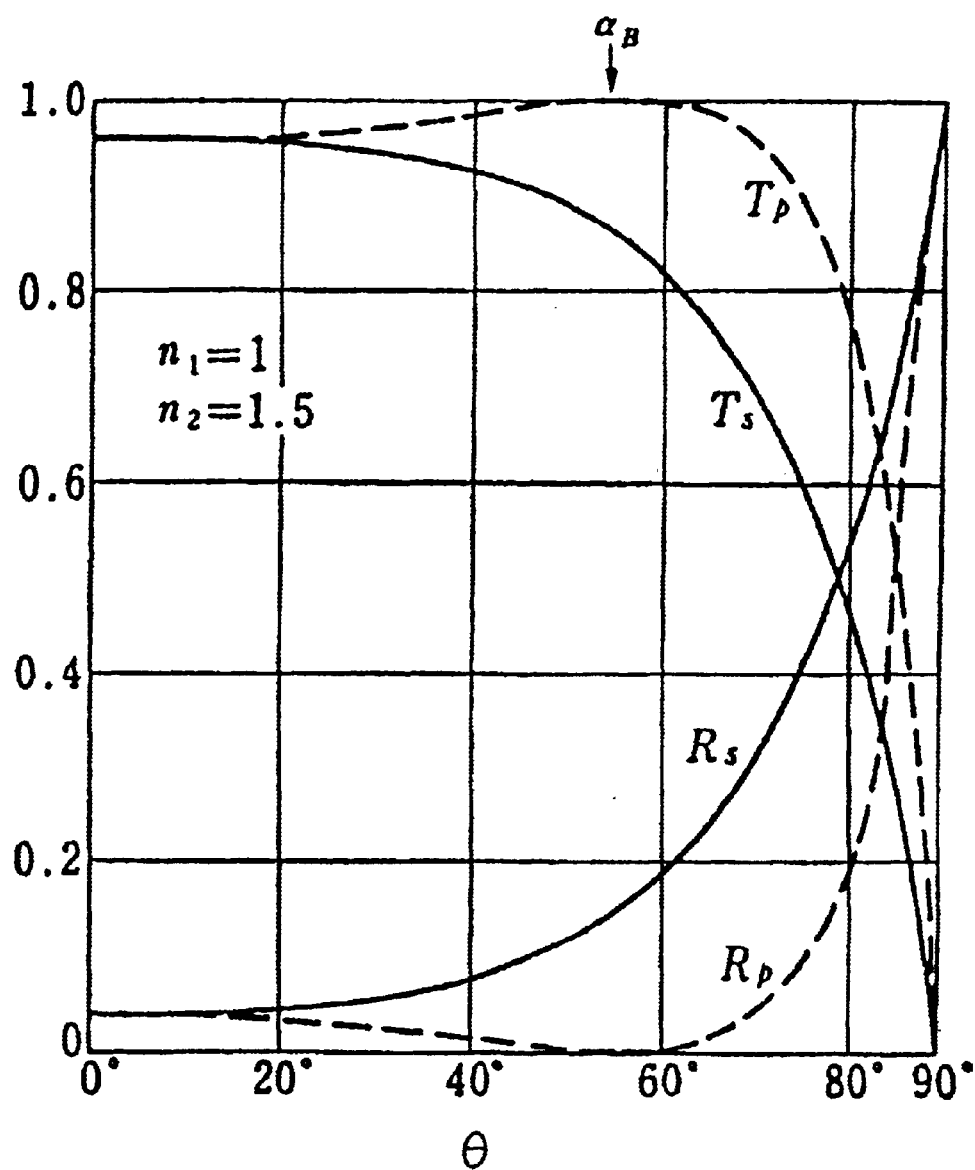
FIG. 67 is a diagram for explaining the video display apparatus of the invention.

FIG. 67 shows the relation between the transmittance T and the reflectance R of light incident on the transparent plate 661. A suffix S denotes an S-polarized component and P denotes a P-polarized component. It is assumed that the refractive index $n_1$ of air is equal to 1.0 and the refractive index $n_2$ of the transparent plate 661 is equal to 1.5. As understood from FIG. 67, the reflectance rapidly increases when the angle θ is 50 degrees or wider.

When the angle θ is 85 degrees or wider, the reflectance of 70% or higher can be attained. It is, however, difficult to set the angle θ to 85 degrees or wider since the light irradiation direction of the light source and the disposing direction of the transparent plate 661 become parallel to each other. The angle θ therefore has to satisfy the conditions of the following expression.

$$50(\text{DEG.}) \leq \theta(\text{DEG.}) \leq 85(\text{DEG.}) \qquad \text{(Expression 25)}$$

Preferably, the optical design has to be performed to satisfy the conditions of the following expression from the viewpoint of the reflectance.

$$60(\text{DEG.}) \leq \theta(\text{DEG.}) \leq 80(\text{DEG.}) \qquad \text{(Expression 26)}$$

The angle θ is for the system in which the display panel 863 does not use a polarizer in a manner similar to the PD display panel. The angle θ to be used is different in the TN panel using the polarizer. As will be understood from the table of FIG. 67, since the P-polarized light has a Brewster angle, the reflectance is lowered around 55 degrees. As for the P-polarized light, the reflectance is low when the angle is about 40 to 70 degrees.

The display panel using the polarized light uses only the P-polarized light or the S-polarized light. Therefore if the display panel which modulates the S-polarized light is illuminated with the P-polarized light, it does not mean anything and it causes deterioration in the display contrast.

In the case of using the display panel 863 of the polarized light method with the configuration of FIG. 66, a polarizer or PBS is disposed so as to modulate the S-polarized light. The display panel 863 is illuminated with the S-polarized light. It is therefore preferable that the angle θ satisfies the following expression.

$$30(\text{DEG.}) \leq \theta(\text{DEG.}) \leq 80(\text{DEG.}) \qquad \text{(Expression 27)}$$

More preferably, the following expression is satisfied.

$$40(\text{DEG.}) \leq \theta(\text{DEG.}) \leq 70(\text{DEG.}) \qquad \text{(Expression 28)}$$

The transparent plate 661 is moved around the fulcrum 291b as a center and folded so as to be in contact with the whole surface of the display panel 863, thereby serving as a protective plate of the display panel 863. Since the transparent plate 661 is transparent, the display image on the display panel 863 can be observed while the transparent plate 661 is folded. The device becomes compact and is easy to carry.

When the conductive film 502 or the like is formed or disposed on the transparent plate 661 as shown in FIG. 50, the display panel can be used as a touch panel. A half mirror can be also used as the transparent plate 661. The amount of light for illuminating the display panel increases. A filter substrate or dichroic mirror can be used as the transparent plate. The display panel can be illuminated with specific color light. The transparent plate 661 may have a concave lens shape or a convex lens shape.

Figure 68:
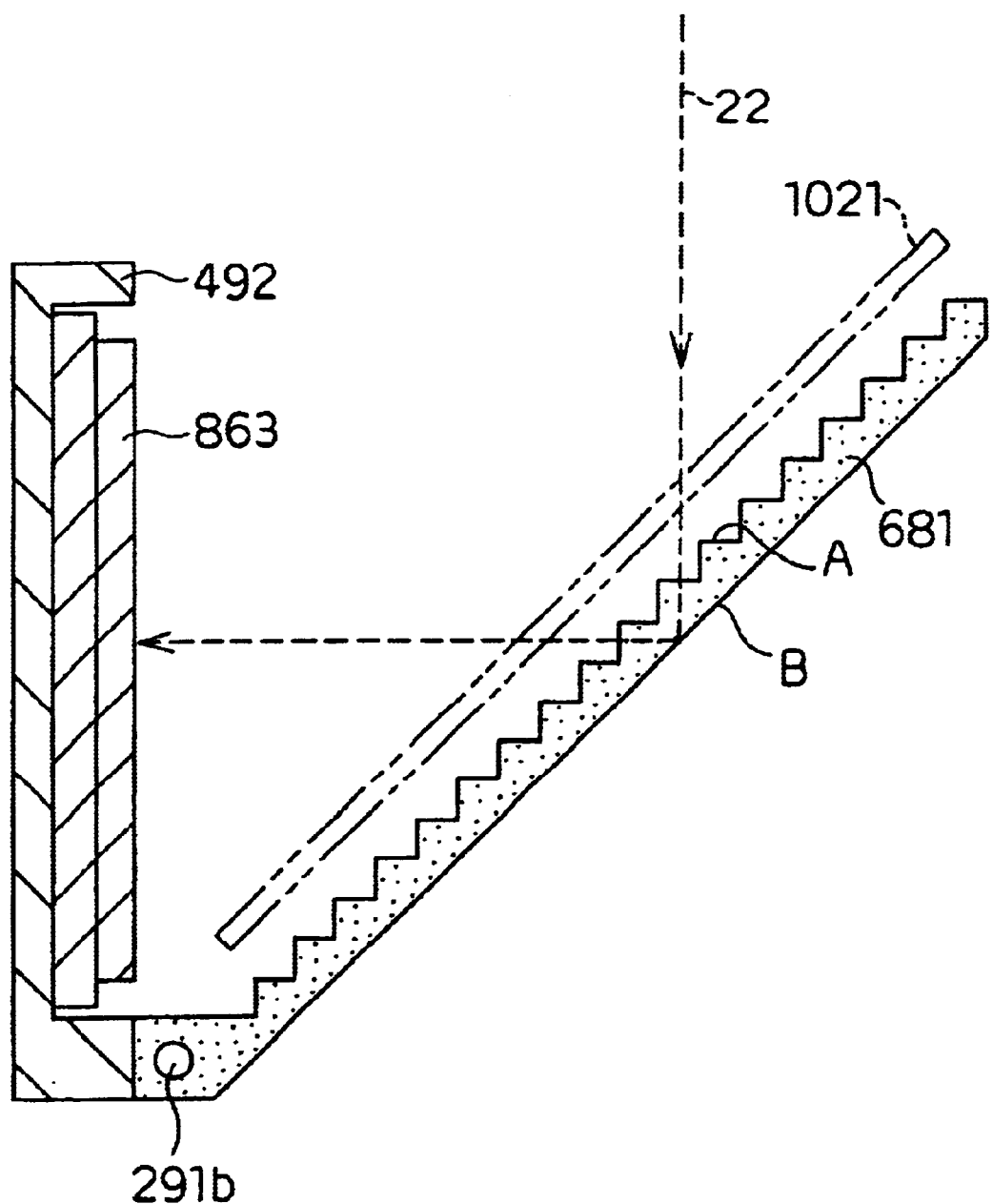
FIG. 68 is a diagram for explaining the video display apparatus of the invention.

FIG. 68 shows a configuration in which the incident light 22 is bent by the prism plate 681 to illuminate the display panel. The incident light enters from the plane A of the prism 681 and is total reflected by the plane B at an angle of almost 45 degrees, and the reflected light illuminates the display panel 863. The reflectance is therefore high. Since the prism plate is made of a transparent resin or the like, the angle of view of the user who observes the display screen is not disturbed.

In FIG. 68, in a manner similar to the embodiments which have been described above, the diffusion sheet 1021 of a low degree of diffusion is disposed on the light outgoing surface. The prism plate 681 is movable around the fulcrum 291b as a center so that the best illuminating state can be realized.

In FIG. 66 and the like, the light 22 is described as light emitted from the light emitting device 15 but the outside light can be also used. The outside light is guided by the transparent plate 661, prism plate 681, and concave mirror 271 and illuminates the display panel 863.

Figure 69:
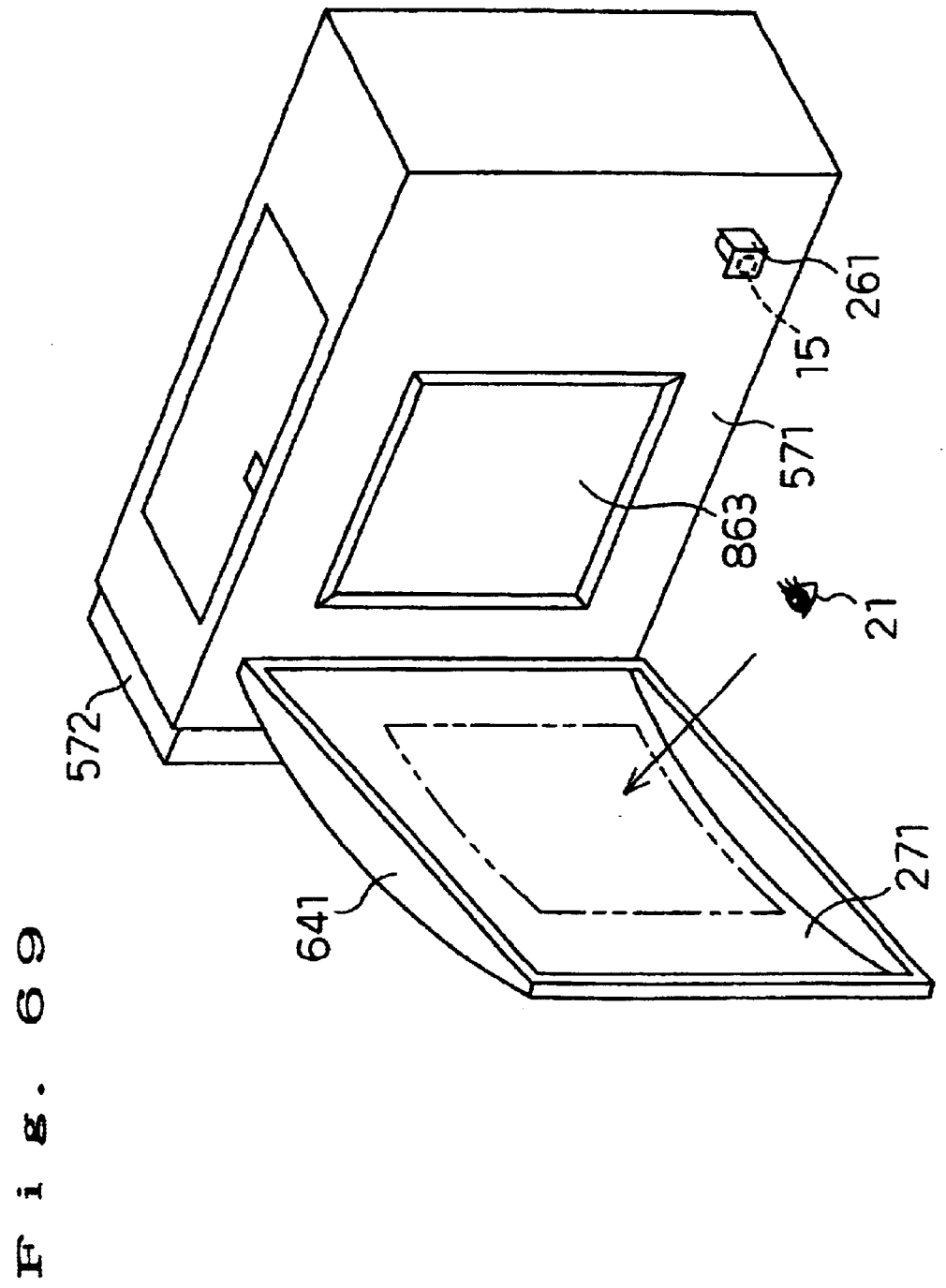
FIG. 69 is a perspective view of a video camera of the invention.

FIG. 69 shows an embodiment of the video display apparatus for displaying an image by the illuminating apparatus of the front light type. A photographing lens 572 and the display panel 863 are attached to the video camera body 571. The display panel 863 is a reflection type PD display panel. As an illuminating apparatus of the front light type for illuminating the display panel 863, for example, the illuminating apparatus 345 of the invention as shown in FIG. 34, the plane light source 511 as shown in FIG. 51, a combination of the light emitting device 15 and the lens 11 as illustrated in FIG. 1, or the like can be used. The PD display panel 863 is in the NW mode. The display image on the PD display panel ~863 is transferred to the concave mirror 271 disposed on the back face of the cover 641 and the observer observes the display image from the direction of the arrow. The concave mirror 271 may be a plane mirror. The display panel 863 is not limited to the PD liquid crystal display panel but a panel of a polarized light modulating type such as a TN liquid crystal display panel can be used.

The purpose of transferring the display image on the PD display panel 863 to the reflecting surface 271 and observing the image is not only to change the angle of viewing the display image but also to improve the display contrast.

The PD display panel displays an image by changing the scattering/transmitting states. It is therefore necessary to narrow the directionality of the incident light and to select the modulated outgoing light. The selection of outgoing light denotes to select only light emitted in one direction.

When the display image on the PD display panel is directly observed, an image having a wide directionality and high display contrast is not obtained. When the image is reflected by the reflecting surface 271 once, the distance between the display panel 863 and the eye of the observer becomes longer. By adjusting the angle of the mirror 271, the observer can adjust an image so as to be observed at the highest display contrast (the directionality is selected). The above configuration and method cannot be easily reached when the conventional transmission type TN panel or an apparatus using the panel are used.

That is, in the PD liquid crystal panel, by making only light having a narrow directionality reach the eye of the observer, the display contrast can be made high. With the configuration of FIG. 69, the directionality can be increased. Since the TN liquid crystal display panel uses the polarizer for light modulation, it is unnecessary to increase the directionality.

In FIG. 69 as well, the angle of the cover 641 can be easily adjusted around the fulcrum (not shown) as a center. When the display image is not observed, the cover 641 is folded to the front face of the display panel 863. In the case of directly viewing the display image on the display panel 863, the cover 641 completely folds to cover the photographing lens 572.

Figure 70:
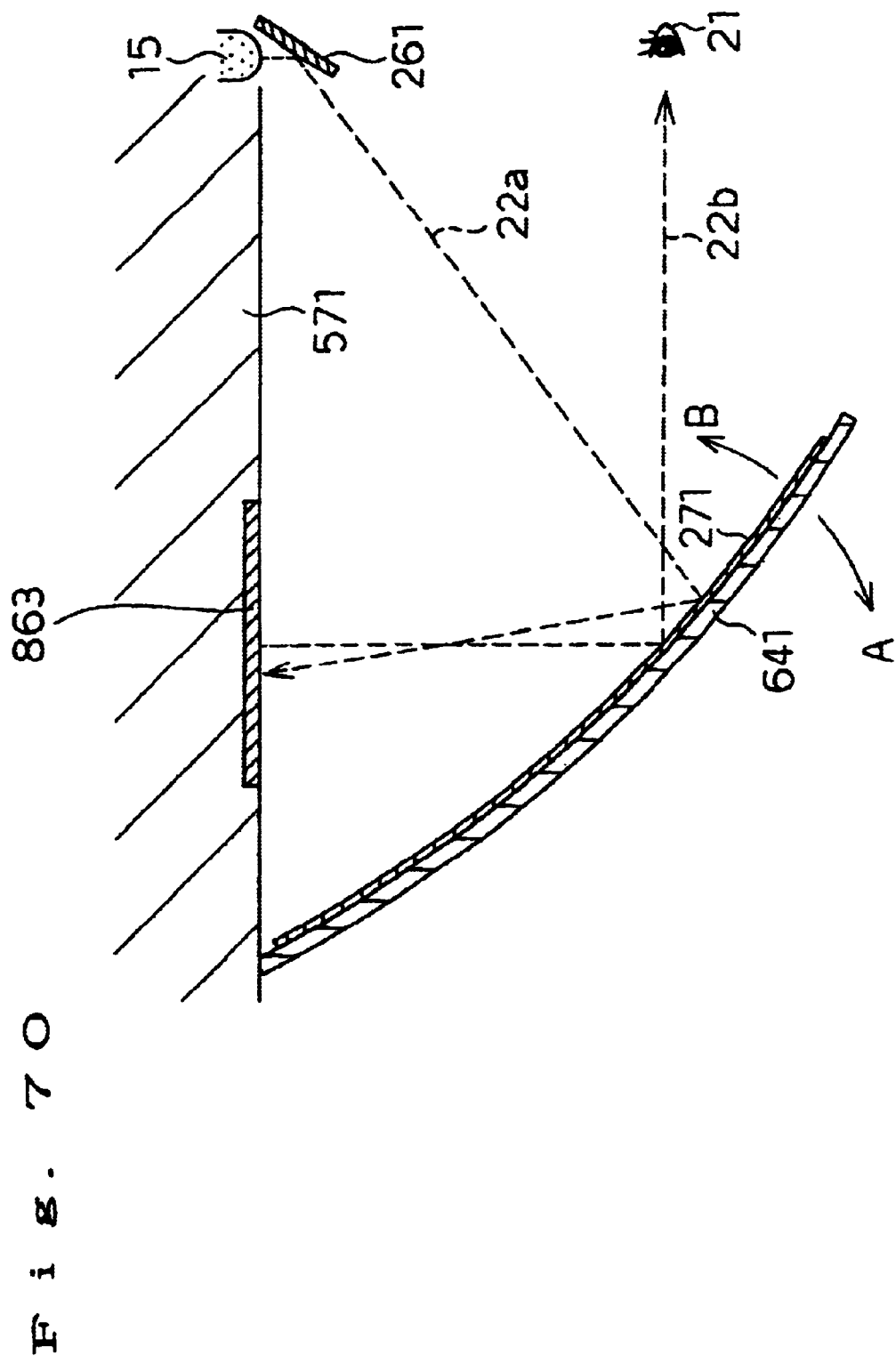
FIG. 70 is a diagram for explaining the video display apparatus of the invention.

When no backlight is used or when the display panel 863 is of the reflection type, the display panel 863 is illuminated by the light emitting device 15 attached to a side face of the video camera. As shown in FIG. 70, the light 22a emitted from the light emitting device 15 is reflected by the mirror part 261, reflected by the concave mirror 271, and enters the display panel 863.

The light 22b modulated by the display panel 863 is reflected by the concave mirror or mirror 271. The observer can observe the image from the direction of the arrow. The angle or the like of the illumination light is adjusted by turning the cover 641 in the direction of A or B or turning the cover.

Figure 71:
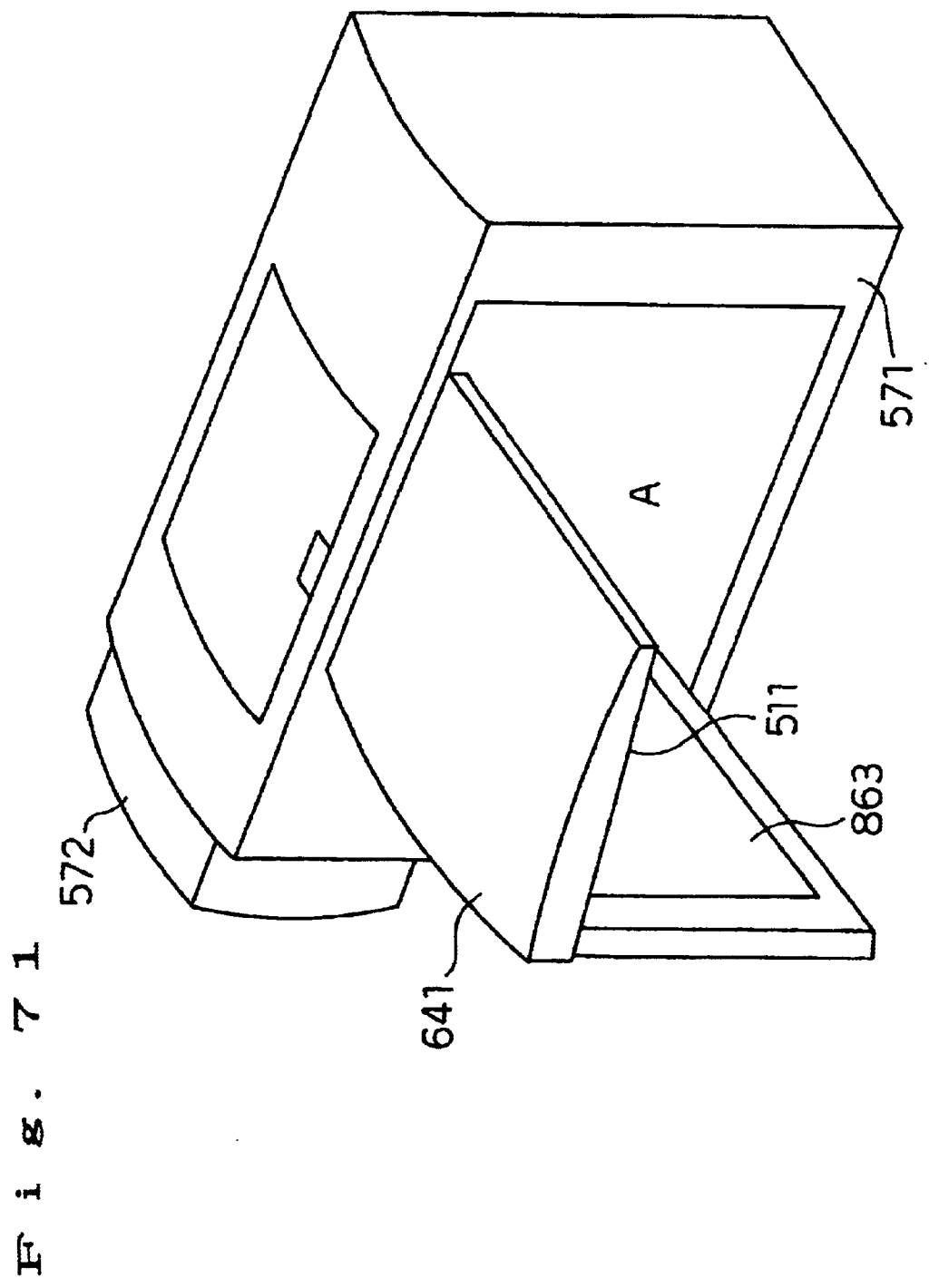
FIG. 71 is a perspective view of the video camera of the invention.

The above relates to the configuration in which the display panel is illuminated by a point light source or the like. FIG. 71 shows a configuration of illuminating the display panel 863 by a plane light source.

The plane light source which consists of a light guide plate is disposed in the cover 641 and the angle of the cover is adjusted, thereby adjusting the illuminating state of the display panel 863. The cover 641 can fold on the front face of the display panel 863. The cover 641 and the display panel 863 can be housed in the side face A of the video camera body 571.

Figure 72A:
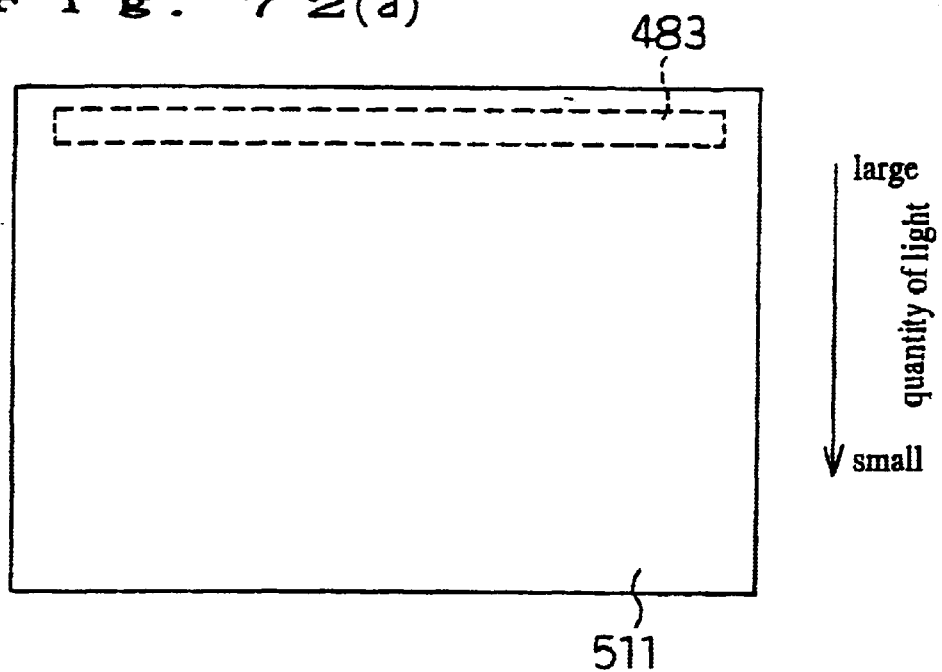
FIGS. 72A and 72B are diagrams for explaining the video display apparatus of the invention.

As shown in FIG. 72, in the plane light source 511, the fluorescent tube 483 is disposed at one of the edges of the light guide plate. The amount of light emitted from the light guide plate in the upper part is larger and that in the lower part is smaller. Such light amount adjustment can be realized by designing the thickness and tilt of the diffusion paint, prism sheet, or light guide plate formed on the surface of the light guide plate.

Figure 72B:
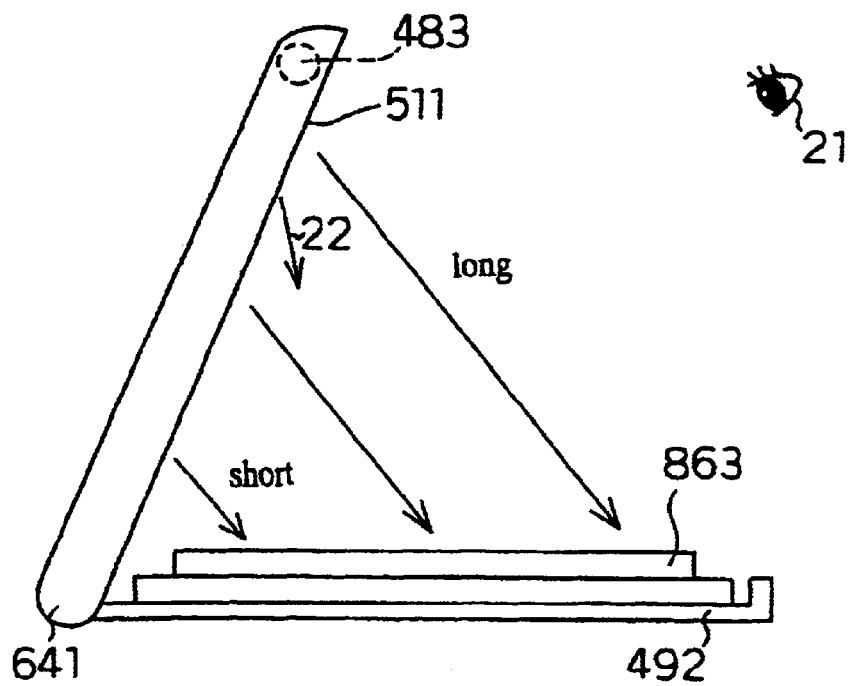

The reason why the light amount in the upper-half surface is set to be large and that in the lower-half surface is set to be small is shown in FIG. 72(b). As obviously understood from FIG. 72(b), the distance from the plane light source 511 to the upper surface of the display panel 863 is long and the distance from the plane light source 511 to the lower surface of the display panel 863 is short. The luminance of the plane light source is inclined, thereby enabling the display panel to be uniformly illuminated.

Figure 73:
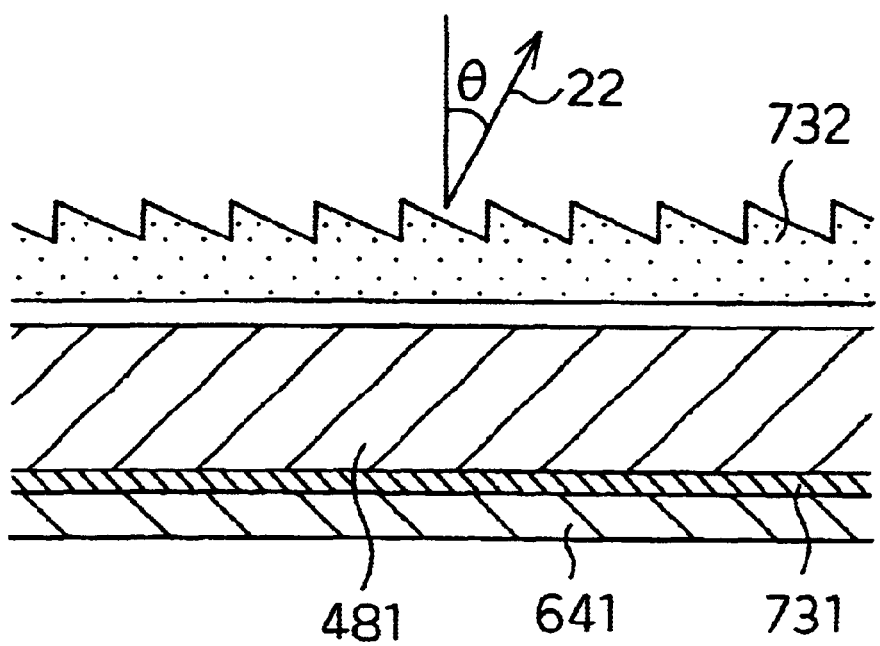
FIG. 73 is a diagram for explaining the video display apparatus of the invention.

As shown in FIG. 73, the plane light source 511 is obtained by disposing a reflecting sheet 731 (silver lux) sold by 3M Company on the back face of the light guide plate 481. The prism sheet 732 is disposed on the surface. By disposing the prism sheet 732, as shown in FIGS. 72 and 73, the light is emitted at the angle of θ and the display panel 863 is illuminated with the emitted light. The display panel 863 can be therefore uniformly illuminated in a state where the cover 641 is wide open.

Figure 74:
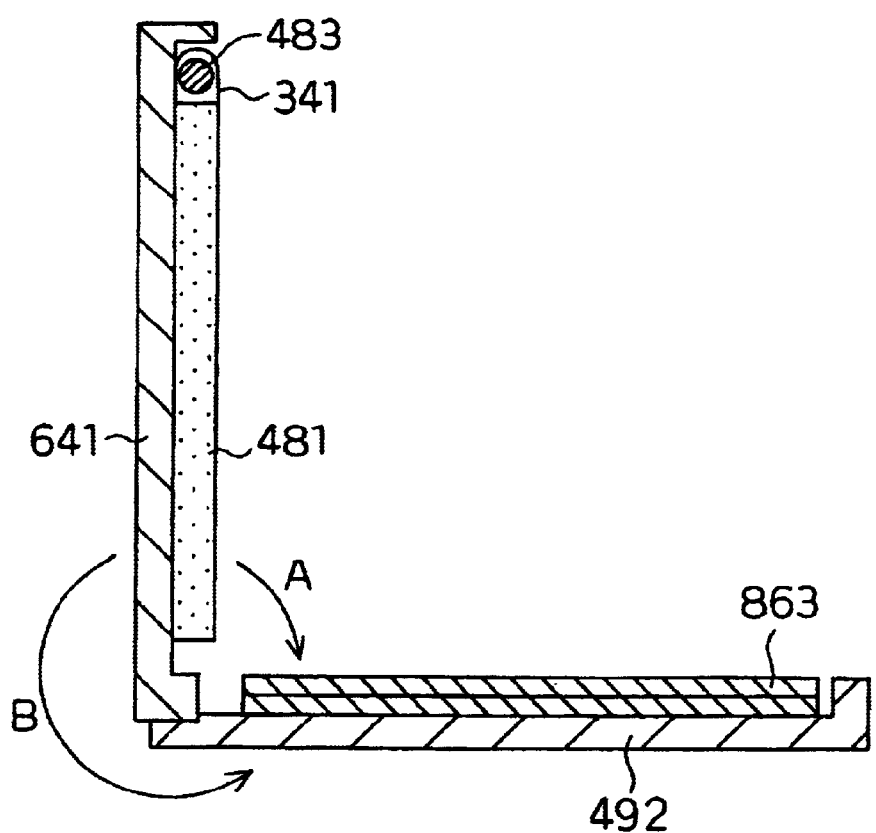
FIG. 74 is a diagram for explaining the video display apparatus of the invention.

As illustrated in FIG. 74, the cover 641 can be freely turned in the direction A or B. When the display panel 863 is of the transmission type, a hole is opened in the panel holder 492 in the position corresponding to the display area. The face of the light guide plate 481 is arranged to illuminate the display panel 863 via the hole.

Figure 75:
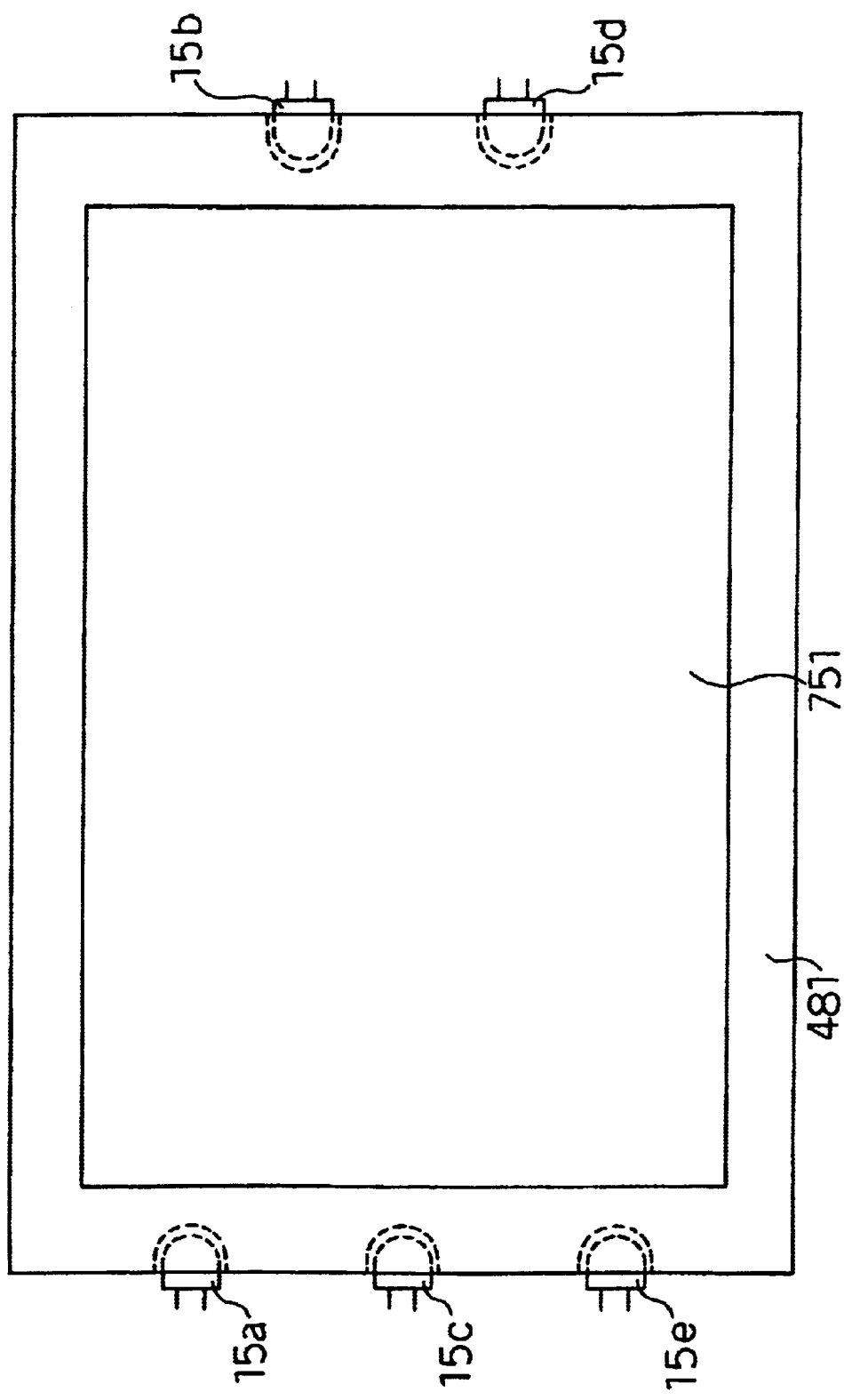
FIG. 75 is a diagram for explaining the illuminating apparatus of the invention.

The plane light source can be constructed not only by using the fluorescent tube 483 but also by using the white LED 15 as shown in FIG. 75. The white LEDs 15a to 15c are attached to the edges of the light guide plate 481. Reference numeral 751 denotes a light emitting area (plane light source). Two or more white LEDs are used. Except for the LEDs, a fluorescent lamp as shown in FIG. 10 may be used. That is, any light emitting device may be used as a device 15.

The white LEDs 15a to 15e are sequentially turned on in accordance with the order from 15a, 15b, 15c, 15d, 15e, 15a, . . . By sequentially turning on the white LEDs, the light emitting area 751 becomes an apparent plane light source. By controlling the flashing cycle and flashing time, the brightness of the plane light source can be freely adjusted. As required, two or three or more LEDs can be simultaneously turned on and scanned.

The cold cathode type fluorescent tube has a problem such that the brightness (plane light luminance) cannot be freely adjusted. When the adjustment is made, the circuit scale becomes large or the efficiency largely deteriorates.

The brightness can be easily adjusted in the plane light source shown in FIG. 75 and the efficiency does not deteriorate. One cycle of turning on the LEDs 15a to 15e is set to 30 Hz or higher. When one cycle is lower than 30 Hz, flicker occurs. The lighting order is 15a, 15d, 15e, 15d, 15c, . . . That is, by turning on the LEDs in accordance with the order from an LED far from the lighted LED, flicker hardly occurs.

By adjusting each of amounts of currents or the like passed to the LEDs or by setting the lighting time of each of the LEDs, the inclination in the light amount can be freely adjusted as shown in FIG. 72. In FIG. 72(b), consequently, there is an advantage such that the observer can adjust the luminance inclination (light amount inclination) of the plane light source so that the whole screen can be observed uniformly or most preferably while watching an image displayed on the display panel 863.

The number of the light emitting elements 15 (specifically, white LEDs) to be used is determined almost according to the size of the plane light source. As necessary, LEDs may be also arranged on the upper and lower sides. Obviously, the plane light source of the invention can be used as a light source of each of FIGS. 101, 92, and the like.

In the view finder of the invention as shown in FIGS. 32, 33, and 48, and the like, also in the case of using two or more light emitting elements 15, by turning on one or both of them, the brightness can be adjusted. The configuration is preferable since the ease-of-use is improved.

It is also preferable to alternately turn on the two or more light emitting devices 15 or one of them, thereby enabling the brightness to be adjusted. The flashing cycle is set to 30 Hz or higher. Preferably, it is set to 60 Hz or higher. In the case where one of the light emitting devices is not turned on, it is preferable that the lighting states of both of the lamps can be displayed on a monitor screen or the like.

Figure 76:
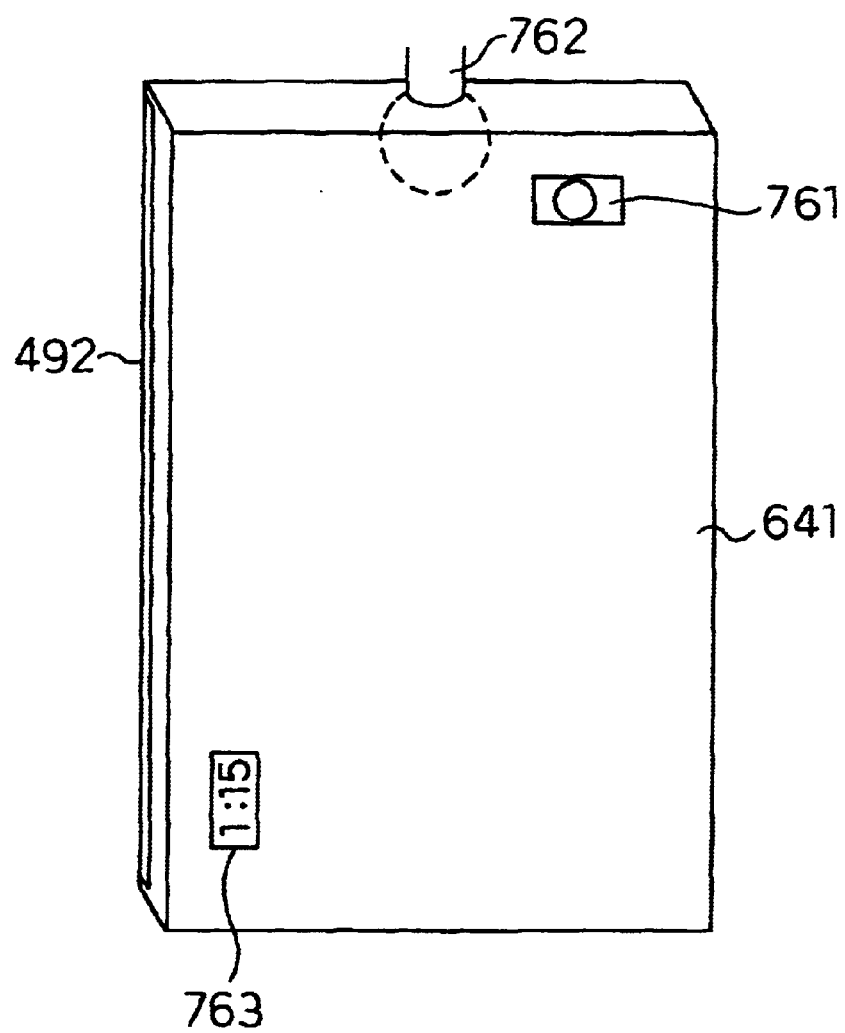
FIG. 76 is a diagram for explaining the video display apparatus of the invention.

The cover 641 shown in FIG. 71 is provided with a clock 763 or the like as illustrated in FIG. 76 so that it can be effectively used even when the display image on the display panel 863 is not observed. The cover 641 is opened when the user touches a button 761 so that the display panel 863 can be observed. The holder 492 of the display panel 863 is provided with a moving part 762 so that the holder can be freely inclined or turned.

Figure 77:
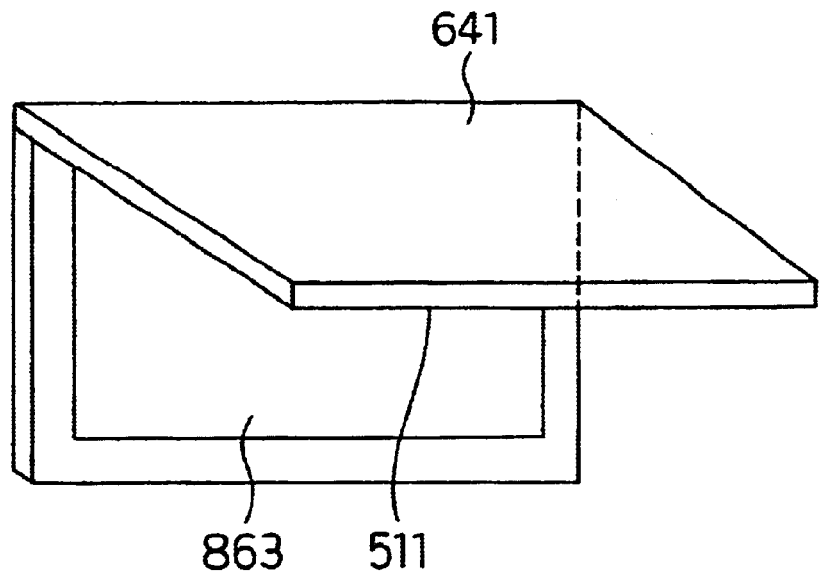
FIG. 77 is a diagram for explaining the video display apparatus of the invention.
Figure 78:
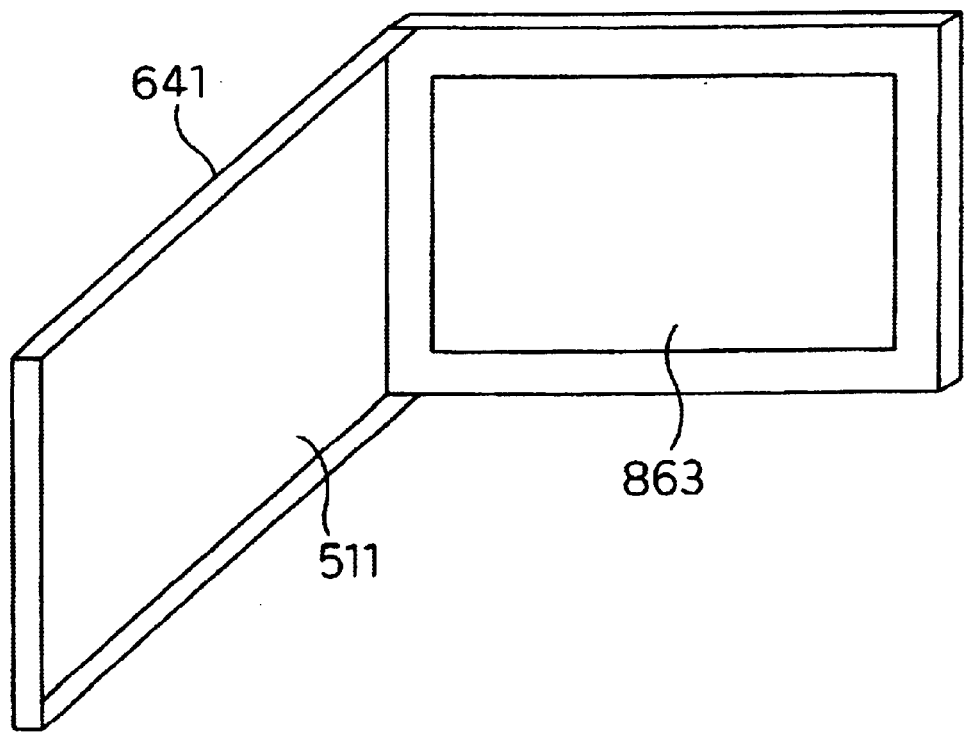
FIG. 78 is a diagram for explaining the video display apparatus of the invention.

In the configuration shown in FIG. 71, the plane light source 511 is attached to a long side of the display panel 863 as illustrated in FIG. 77. As a matter of course, the plane light source 511 can be attached to a short side of the display panel 863 as shown in FIG. 78. When the configurations are used for a video camera, the configuration of FIG. 77 is preferable since the cover 641 functions as a shielding plate which prevents sun light from directly entering the display panel 863.

In the case where the display panel 863 is of the transmission type and the display panel is the PD display panel, when it is illuminated by either the backlight or the front light, a displayed image can be preferably observed. When the observer can examine the state of the peripheral outside light and select the type (backlight type or front light type) by which an image can be observed preferably, the ease-of-use will be improved largely.

Figure 84:
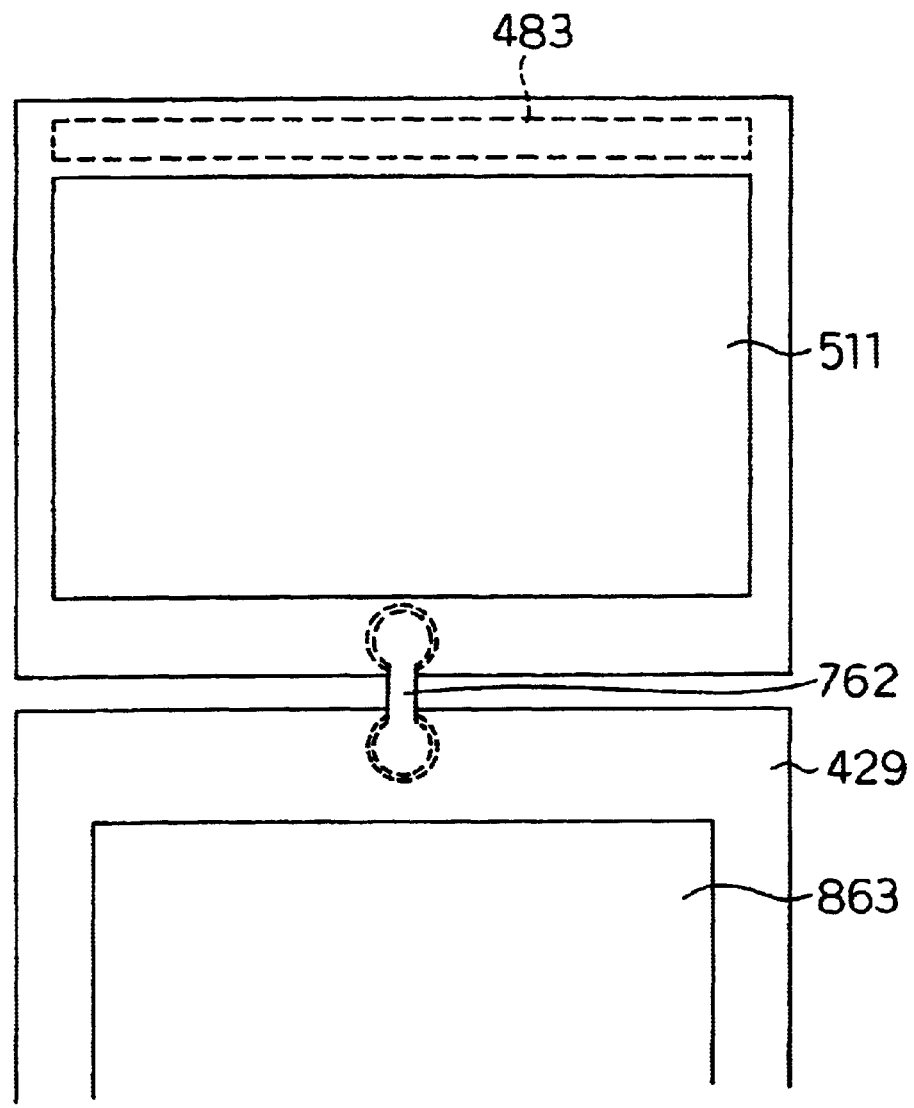
FIG. 84 is a diagram for explaining the video display apparatus of the invention.
Figure 85:
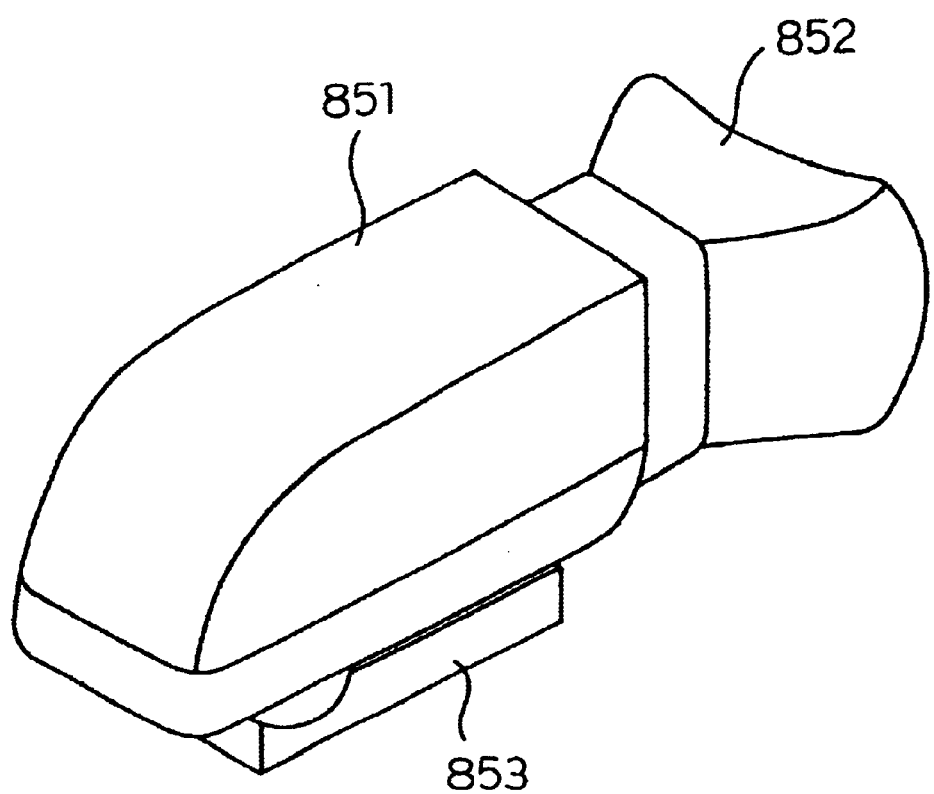
FIG. 85 is a perspective view of the view finder.

In order to realize it, the reflecting sheet 731 is disposed on one side of the light guide plate as shown in FIG. 83 and a part of the plane light source 511 and the panel holder 429 are connected by a point of the moving part 762 as shown in FIG. 84. Consequently, the plane light source 511 can be turned up.

Figure 82:
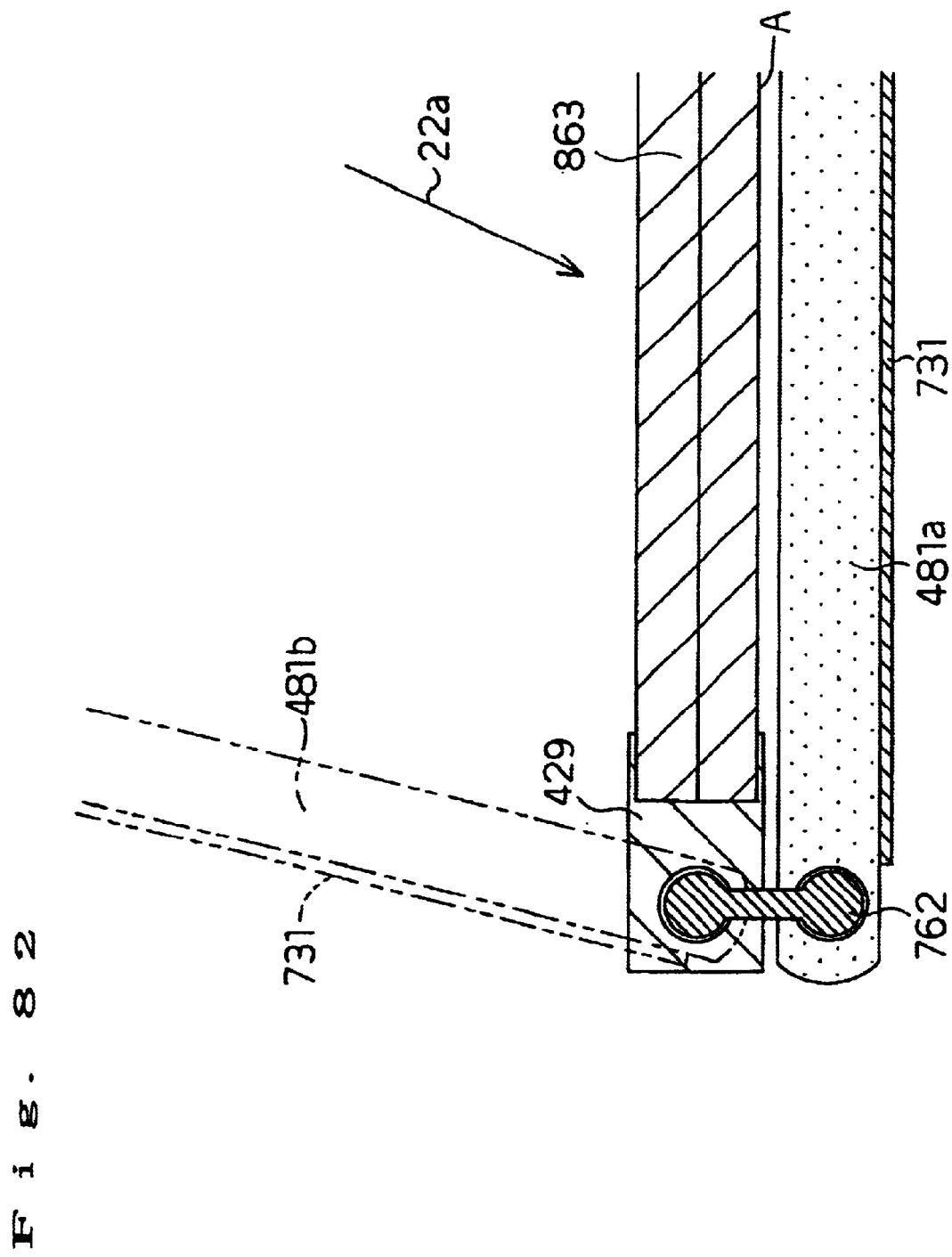
FIG. 82 is a diagram for explaining the video display apparatus of the invention.

When the display panel 863 is used in the transmission type as shown in FIG. 82, the light guide plate 481a is disposed so that the light outgoing face faces the plane A of the display panel 863 and the display panel 863 is illuminated by the light 22a In the case of using the display panel 863 in the reflection type, the display panel 863 is turned upside down around the moving part 762 as a center as shown by alternate long and two short dashes lines so that the reflecting sheet 731 faces the plane A of the display panel. Obviously, there is no meaning to turn on the fluorescent tube 483.

A microlens sheet, prism sheet, or the like is disposed on the light outgoing face of the light guide plate 481 so that the light having more narrower directionality can be emitted.

It is not easy to adjust the contrast of the display image on the display panel so as to be highest since the angle at which the image can be observed preferably differs in a state where the display image 371 is displayed. For example, in the case of a blackish scene, the angle of the display panel 863 is adjusted by centering black. In the case of a whitish scene, the angle of the display panel 863 is adjusted by centering white. When the video image is a moving picture, since scenes change quickly, it is difficult to perform proper adjustment.

Figure 80:
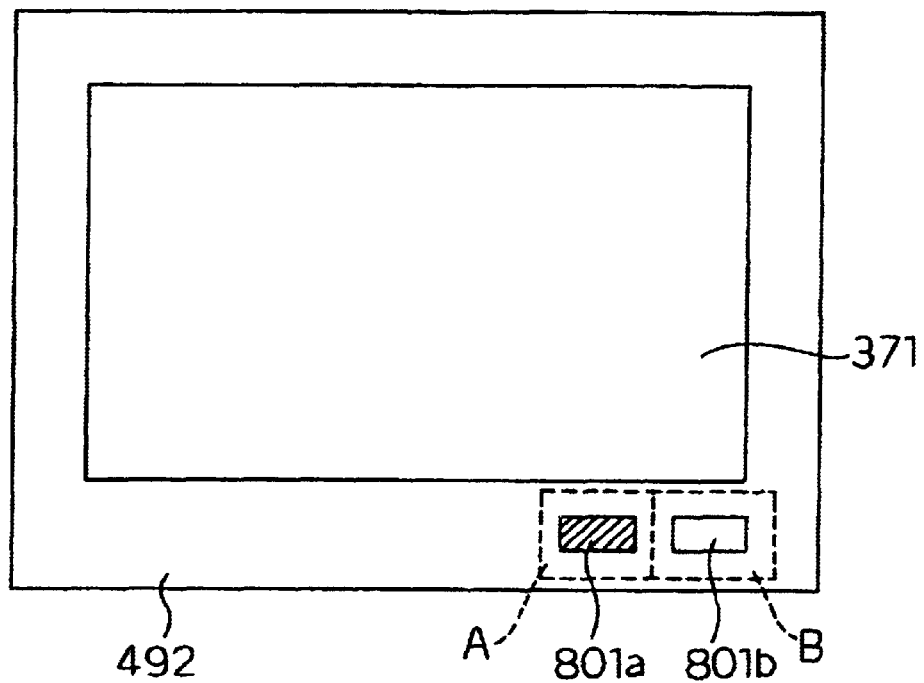
FIG. 80 is a diagram for explaining the video display apparatus of the invention.

According to the invention, in order to solve the problem, a monitor display unit is provided. FIG. 80 shows an embodiment having a monitor display part 801*a* for black display and a monitor display part 801*b* for white display. Both of the monitor display parts 801*a* and 801*b* are not always necessary. As necessary, one of them is sufficient.

The monitor display part 801*a* displays black in a video image. The monitor display part 801*b* displays white in the video image. As shown in FIG. 81, the observer adjusts the angle of viewing the display screen 371 by adjusting a screen 811 and the like so that the black display and white display of the monitor display part 801 become the best.

Since the direction of illumination light entering the display screen 371 is generally fixed in a room, it is sufficient to adjust the angle of one end of the display screen.

Figure 79:
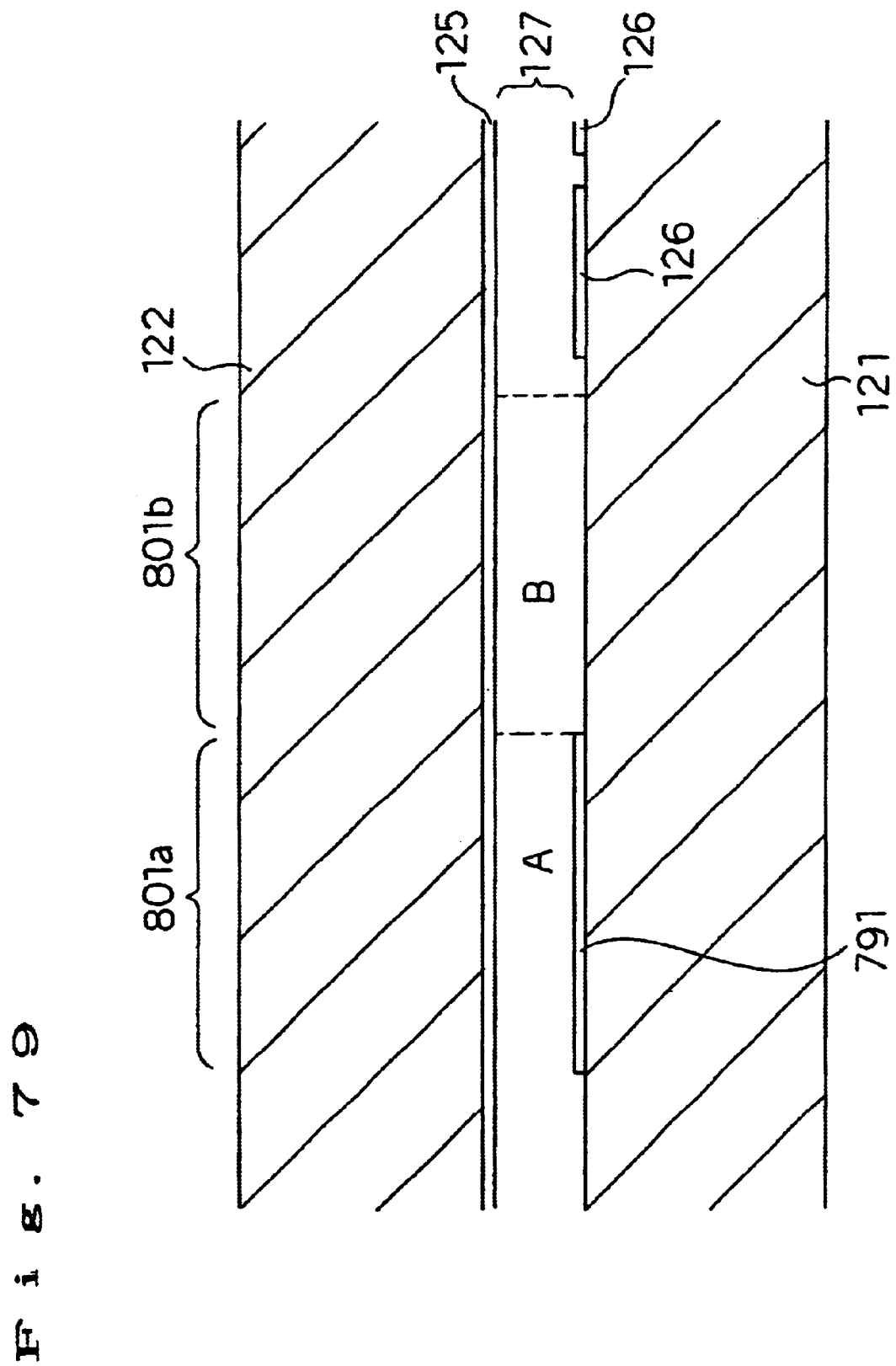
FIG. 79 is a diagram for explaining a display panel of the invention.

As shown in FIG. 79, the motor display part 801 displays the light modulating state of the liquid crystal layer 127. That is, the monitor display part 801 is formed in the peripheral part of the display part 863 and a place which is filled with liquid crystals.

A monitor electrode 791 is formed in the monitor display part 801*a* for black display. An alternate current voltage is always applied to the liquid crystal layer A between the counter electrode 125 and the monitor electrode 791. The AC voltage is a voltage which displays black in an image. No electrode is formed in the part B in the liquid crystal layer 127 and the part B is always in a scattered state (white display). It is preferable to form a monitor electrode also in the part B so as to be able to apply the AC voltage to perform white display in the image.

With the configuration, black is always displayed in the part A and white is always displayed in the part B. The observer adjusts the angle of the display screen 371 while watching the part A (monitor display part 801*a*) and the part B (monitor display part 801*b*) (while adjusting so that the white display and the black display become the best). Consequently, the angle can be adjusted easily and most preferably so as to obtain an excellent display contrast of the display image without watching the display screen.

Although the monitor display part 801 is realized by using the liquid crystal layer 127 in FIG. 80, the invention is not limited to the arrangement. For example, the monitor 801*a* can be obtained by forming or disposing a reflecting film (reflector or the like) on the back surface of a transparent substrate. That is, the transparent liquid crystal layer 127 is falsely produced. The resultant shows black.

The monitor 801*b* may be obtained by forming or disposing a reflecting film (reflector or the like) on the back surface of a diffuser (diffusion sheet). The scattering characteristic of the diffuser is equivalent to that of the liquid crystal layer 127. This displays white. The monitor 801*b* can be simply replaced by a reflector or diffuser (sheet).

By forming or disposing the pseudo liquid crystal layer 127, the monitor display unit can be constructed.

As the monitor display part 801, a panel dedicated to the monitor display part may be manufactured separately from the display unit. At least one of the black display part 801*a* and the white display part 801*b* is formed on the panel dedicated to the monitor display unit. The dedicated panel is assembled in or attached to the video display apparatus.

When the display panel 863 is of the transmission type, obviously, the liquid crystal layer of the display panel, the pseudo panel, or the like can be used. The monitor display part 801 is not limited to dots or a small area. For example, it is also possible to form the monitor display part 801 in a frame shape and dispose it so as to surround the display area.

Although the case where the display panel 863 of the monitor display part 801 is the PD display panel as shown in FIG. 80 has been mainly described, the invention can be also applied to other display panels (STN liquid crystal display panel, ECB display panel, DAP display panel, TN liquid crystal display panel, ferroelectric liquid crystal panel, DSM (dynamic-scattering mode) panel, vertical alignment (VA) mode display panel, IPS mode display panel, guest host display panel, and the like). The matters can be also applied to the EL display panel, LED display panel, plasma addressing display panel, FED display panel, and PDP display panel.

For instance, in the TN liquid crystal display panel, the monitor display part 801 of at least one of white display and black display is either obtained by actually forming a liquid crystal layer for monitoring or forming a pseudo monitor display part 801. Ditto for the case where the reflecting electrode has a mirror face and the case where small recesses and projections are formed.

The technical idea of disposing the monitor display part 801 is not limited to a video display apparatus using the reflection type display panel 863 but can be also applied to a video display apparatus using the transmission type display panel since the concept of monitoring the black and white display states is not influenced by the type (reflection type or transmission type) of the display panel.

Obviously, the technical idea of the monitor display part 801 can be applied not only to the display apparatus whose display image on the display panel is directly observed but also to the view finder, projection type display apparatus (projector), monitor of a portable telephone, a portable information terminal, a video display apparatus such as a head mounted display, image display apparatus, character display apparatus, and segment display apparatus.

As shown in FIG. 80, the peripheral part A of the black display monitor 801*a* is colored as black or a dark color similar to black and the peripheral part B of the white display monitor 801*b* is colored as white or a light color similar to white. When the angle between the outside light and the eye 21 of the observer 21 is properly adjusted, the display monitor 801*a* displays black.

Since the color of the peripheral part A and that of the display monitor part 801*a* coincide with each other, it is visually expressed that the angle is properly adjusted. When the colors do not coincide with each other, the display monitor part 801*a* lights white in the black display of the peripheral part A and it is clearly known that the colors do not coincide with each other. The colors are opposite to the above in the white display monitor 801*b*.

That is, when the angle between the outside light and the eye 21 of the observer is properly adjusted, the display monitor 801*b* displays white. Therefore, since the color of the peripheral part B and the color of the display monitor part 801*b* coincide with each other, it is visually expressed that the angle is properly adjusted.

Figure 90:
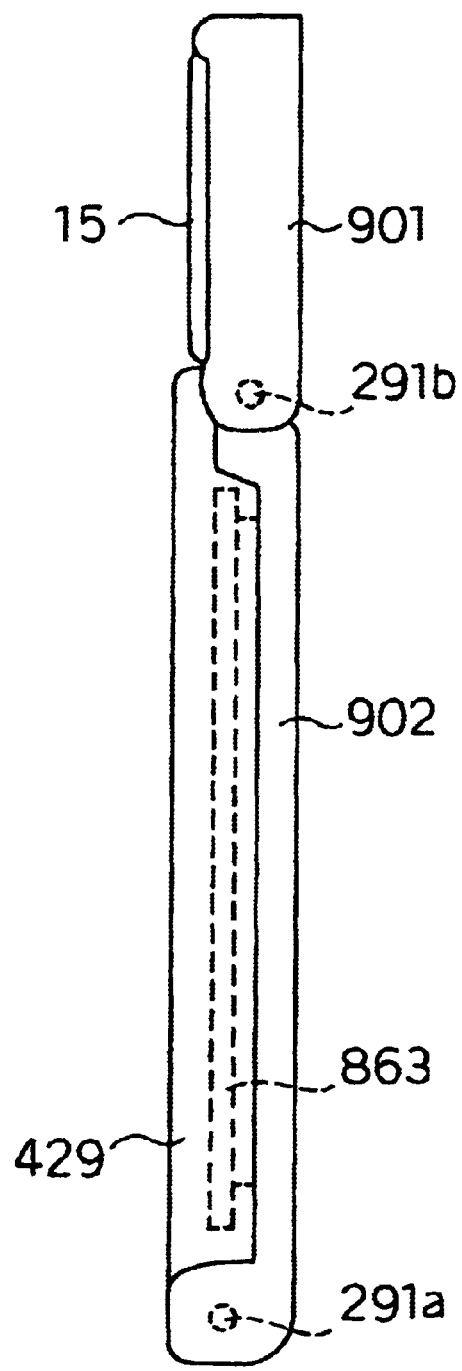
FIG. 90 is a diagram for explaining the video display apparatus of the invention.
Figure 91:
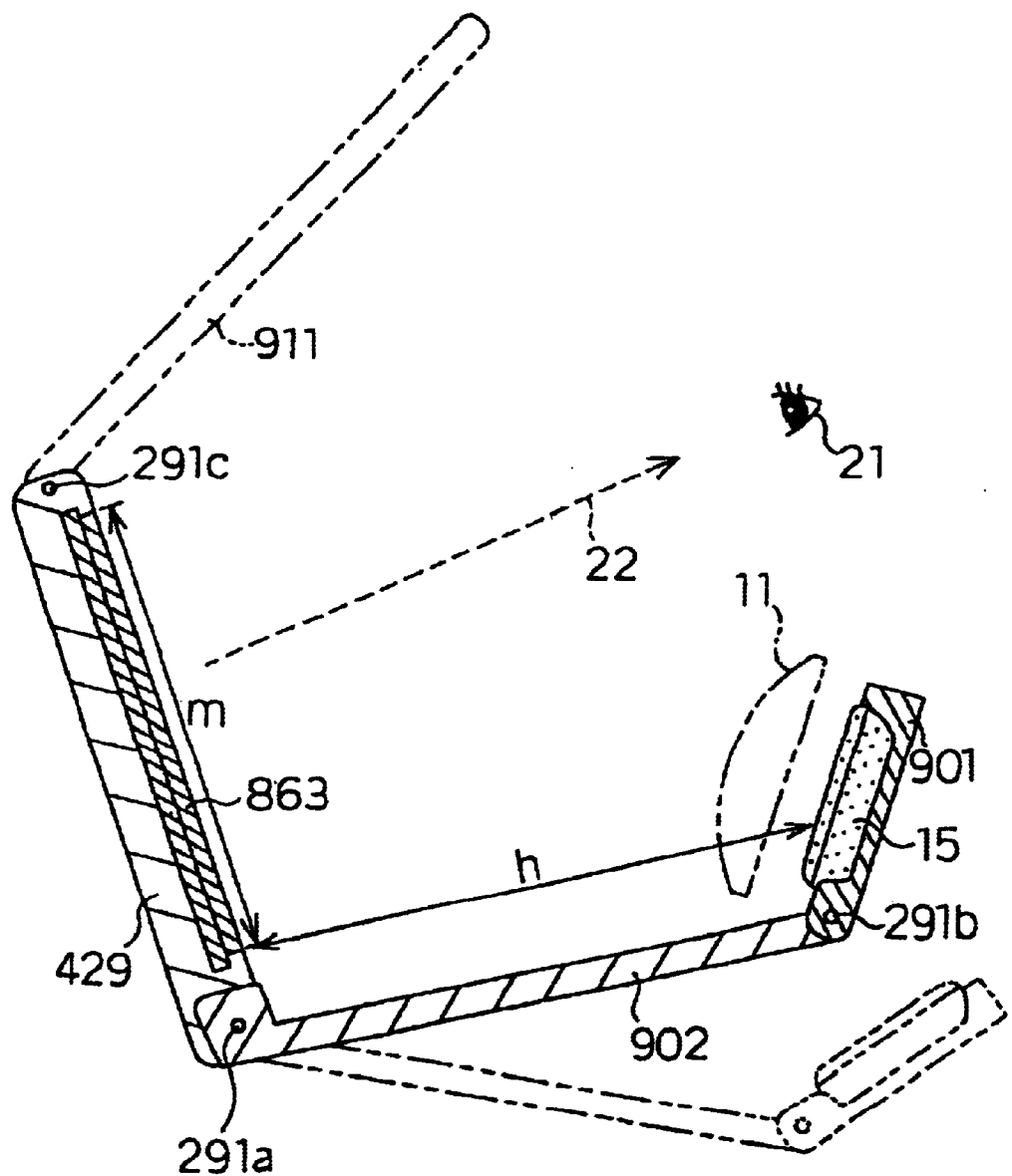
FIG. 91 is a diagram for explaining the video display apparatus of the invention.
Figure 92:
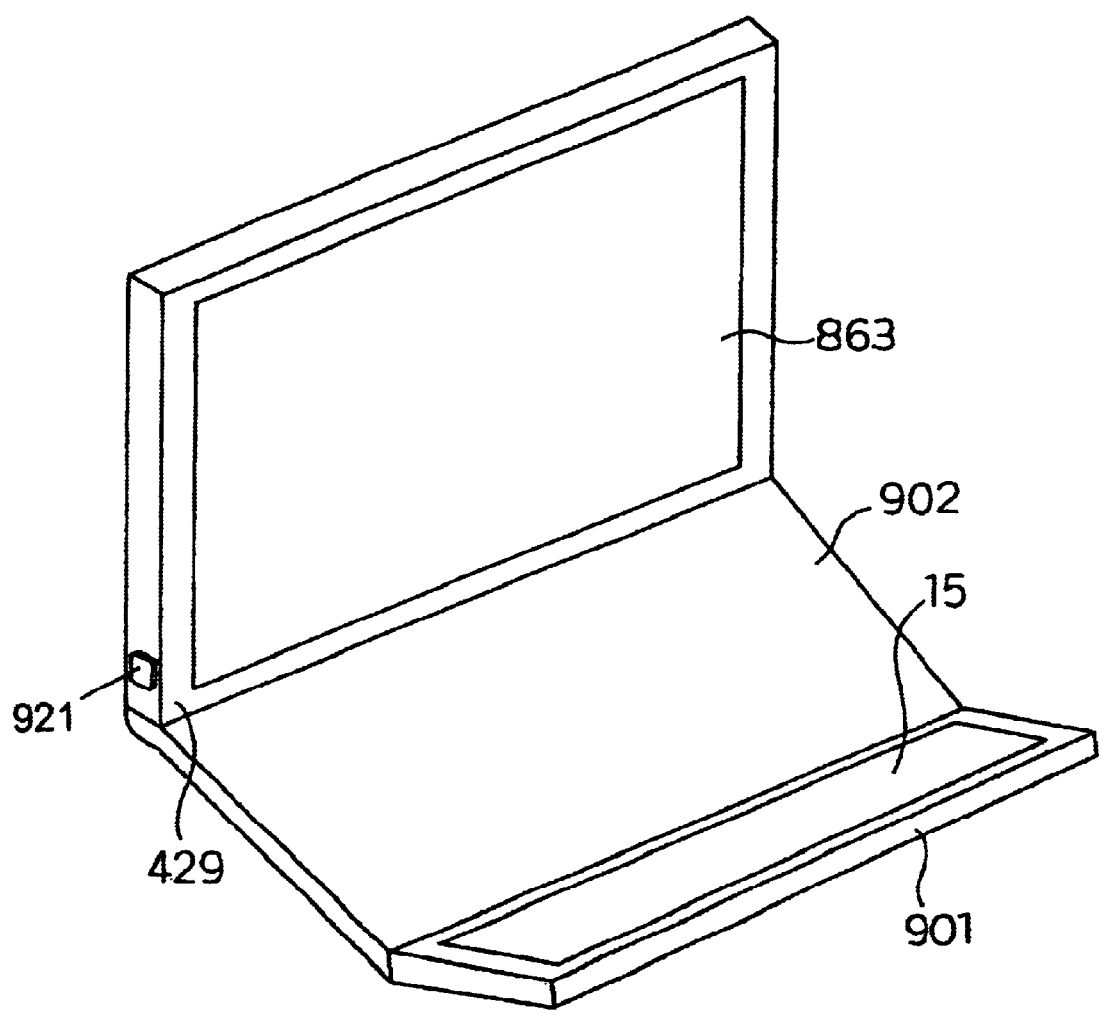
FIG. 92 is a diagram for explaining the video display apparatus of the invention.
Figure 93A:
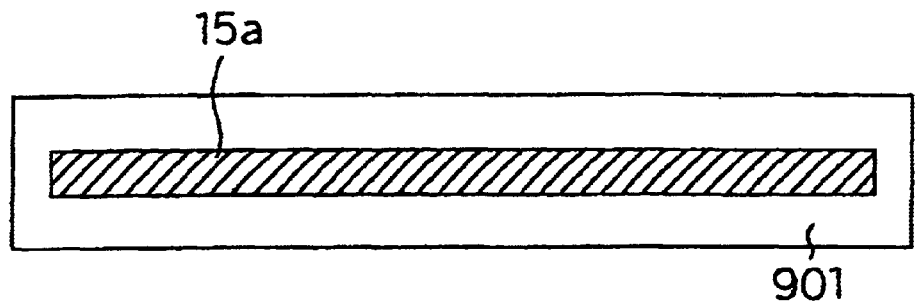
FIGS. 93A to 93D are diagrams for explaining the video display apparatus of the invention.
Figure 93B:
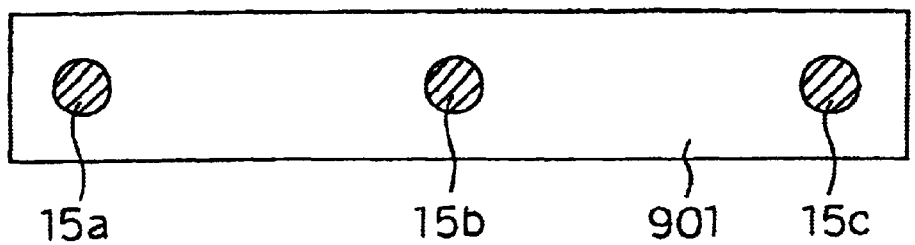
Figure 93C:
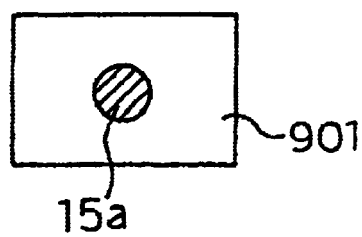
Figure 93D:
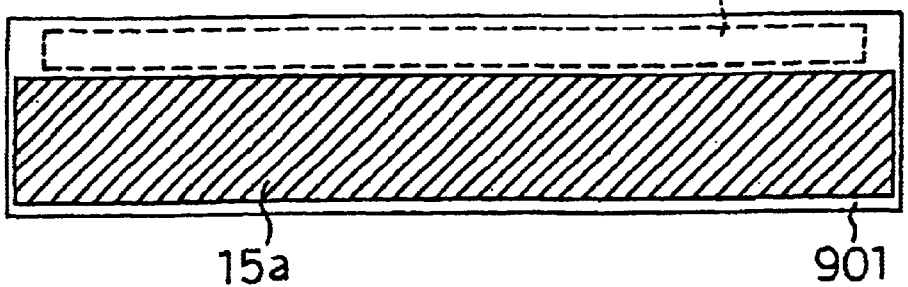

The above relates to the case where the display panel is in the normally white mode. The colors are opposite to the above in the case of the normally black mode. Especially, the relation between the black display monitor part 801*a* and the peripheral part A is very important. The observer will adjust mainly the positional relation between the position of the display panel 863 and the outside light while using the display monitor part 801*a* FIG. 91 is a diagram showing a video display apparatus according to another embodiment. FIG. 92 is a perspective view and FIG. 90 shows a state where the video display apparatus is folded.

The embodiment will be described hereinbelow with reference to FIGS. 91, 92, and the like.

As shown in FIG. 92, the plane light emitting device 15 is attached to the display panel 863 via an arm 902. FIG. 91 is a cross section of the device of FIG. 92. The arm 902 and the panel holder 429 are coupled to each other via the fulcrum 291b and the arm 902 and a light source holder 901 are coupled to each other via the fulcrum 291b. Since the fulcrum 291 is movable, the direction of the principal light illuminating the display panel 863 as shown by a broken line in FIG. 91 can be freely adjusted.

The observer can adjust the angle of the arm while watching the display image on the display panel 863 so that the displayed image can be observed most preferably. It is preferable that the relation between the length (h) of the arm 902 and the diagonal length of the display image (in this case, the screen height) preferably satisfies the relation of FIG. 112. The symbol (m) denotes the height of the screen since the light source 15 is a linear (or plane) light source.

In the configuration of FIG. 91, since the display panel 863 has the arm 902, a sufficient distance (h) can be obtained. The display screen can be therefore uniformly illuminated. Since the arm 901 is at the bottom part, the arm 902 does not hinder the angle of view of the observer.

It is preferable to use the reflection type PD display panel as the display panel 863. As necessary, the lens 11 as shown in FIG. 63 is disposed on the light outgoing face of the plane light source 15, thereby enabling display contrast to be further improved. In order to prevent the deterioration in the display contrast of the display panel 863 caused by outside light, preferably, a shielding plate 911 as shown by an alternate long and two short dashes line in FIG. 91 is disposed. The shielding plate 911 is constructed so as to be folded around the fulcrum 291c as a center, and the angle adjustment is performed so as to display the preferable shielding effect.

FIG. 90 is an appearance view when the video display apparatus of FIG. 91 is folded. The light source holder 901 is positioned on the display panel holder 429 and the arm 902 serves as a cover for protecting the top face of the display panel 863. Since the apparatus has a flat shape, it is very compact and portable. By making the arm 902 of a transparent resin, the display image can be viewed in the state of FIG. 90. By using the arm as a touch panel (as shown in FIG. 50), the operabilty is improved.

In FIG. 91 and the like, the light source 15 is disposed in the arm 902. Consequently, the light source 15 can stably illuminate the display panel 863 from a position apart by a predetermined distance. The positional relation is determined so that the arm is automatically lowered from the state of FIG. 90 by pressing a button 921 disposed in a casing of the video display apparatus and the distance between the light source position and the panel is fixed. At this time, it is preferable to adjust or construct so that the arm 902 and the light source 15 can be returned to the original positions at original angles of the arm 902 and the light source 15.

With the configuration, when the observer presses the button 921 once, the apparatus can be set (adjusted) so that the image can be observed most preferably. It is also preferable to construct the apparatus so that when the observer presses the button 921, the power switch is simultaneously turned on. It is also preferable that when the light source 15 is housed as shown in FIG. 90, the power is turned off.

Various shapes can be used for the light emitting device 15 as shown in FIG. 93. FIG. 93(a) shows a liner shape. FIG. 93(b) shows a shape such that a plurality of white LEDs are discretely arranged. FIG. 93(c) shows a point light source. FIG. 93(d) is a shape using a larger plane light source. Besides, a configuration using a plane light source whose size is similar to the size of the display screen of the display panel 863 as shown in FIG. 72, and a plane light source having the configuration as shown in FIG. 75 can be used.

Although the display panel 863 is illuminated with light from the light source 15 in FIG. 91 and the like, the configuration as shown in FIG. 149 may be also used in a manner similar to FIG. 64. In FIG. 149, the white LED 15 as a light source is disposed or formed at one end of the display panel 863. The end is a position far from the arm 902 as shown in the diagram. The white light 22a emitted from the white LED 15 is converted by the concave mirror 271 into light which is reflected and narrowly directed (or condensed) and the light is incident on the display area of the display panel 863.

The illuminating state of the display panel 863 is adjusted by turning the fulcrum 291 of the arm 902. The illuminating state can be also adjusted by changing the angle of the light source 15 and the tilt of the condenser lens 11. A plane mirror can be used as the concave mirror 271. The concave mirror 271 can be also replaced by a condenser lens.

In the configuration of FIG. 149, since the length of the optical path from the light source 15 to the display panel 863 can be made long, the display area of the display panel can be uniformly illuminated. The length (h) of the optical path is obtained by adding the optical path of the light 22a and the optical path of the light 22b. According to the optical design, the optical path of the light 22b is (h). When the apparatus is folded as shown in FIG. 90, it is compact.

Figure 111:
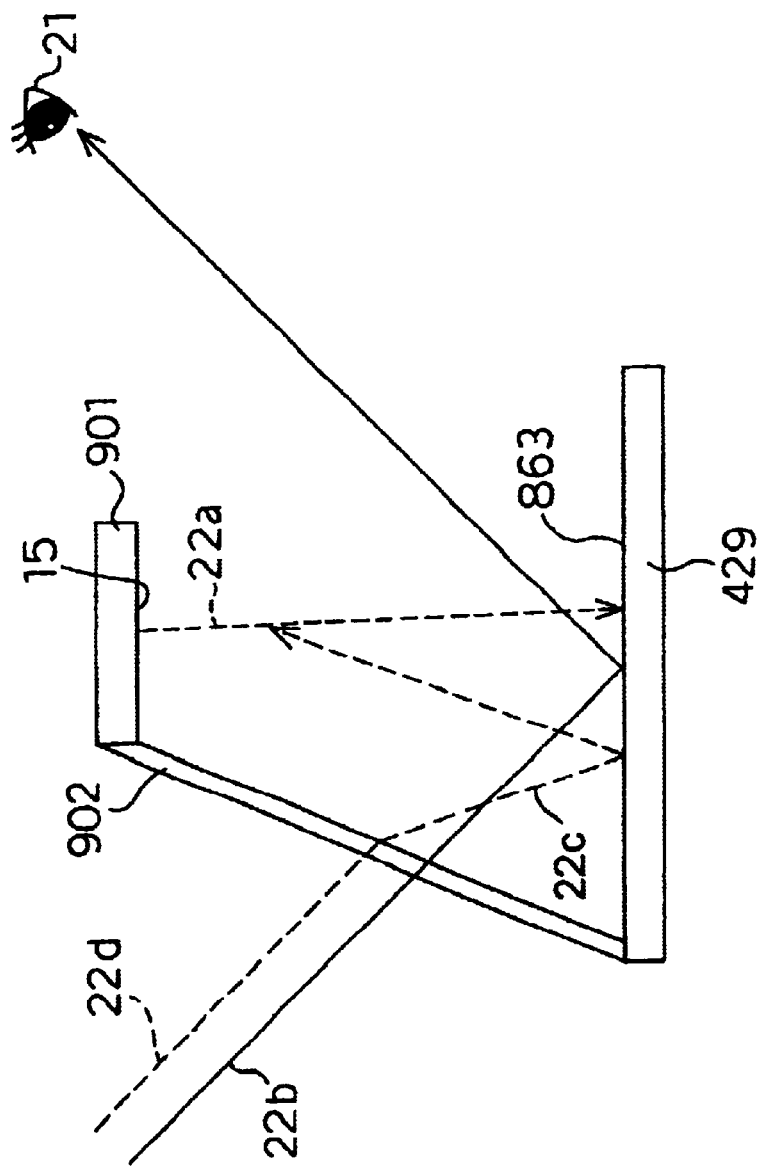
FIG. 111 shows the configuration of the video display apparatus of the invention.

In the configuration of FIG. 91, the display screen 371 is illuminated from the below by using the light emitting device 15. As shown in FIG. 111, the display panel 863 may be disposed to face upward and illuminated from the above by using the light emitting element 15, and so on.

In the configuration, the outside light 22b may transmit the arm 902 and reach the eye 21 of the observer. In order to overcome the problem, a part or the whole arm is provided with the light diffusing property.

By providing a part or the whole arm 902 with the light diffusing property, it can be used as light illuminating the display panel 863. It is sufficient to set the degree G of light diffusion of the arm similarly to that in FIG. 68. By using a prism plate as the arm 902, the light is bent as shown by 22d and the outside light is used as the light illuminating the display panel 863.

Figure 94:
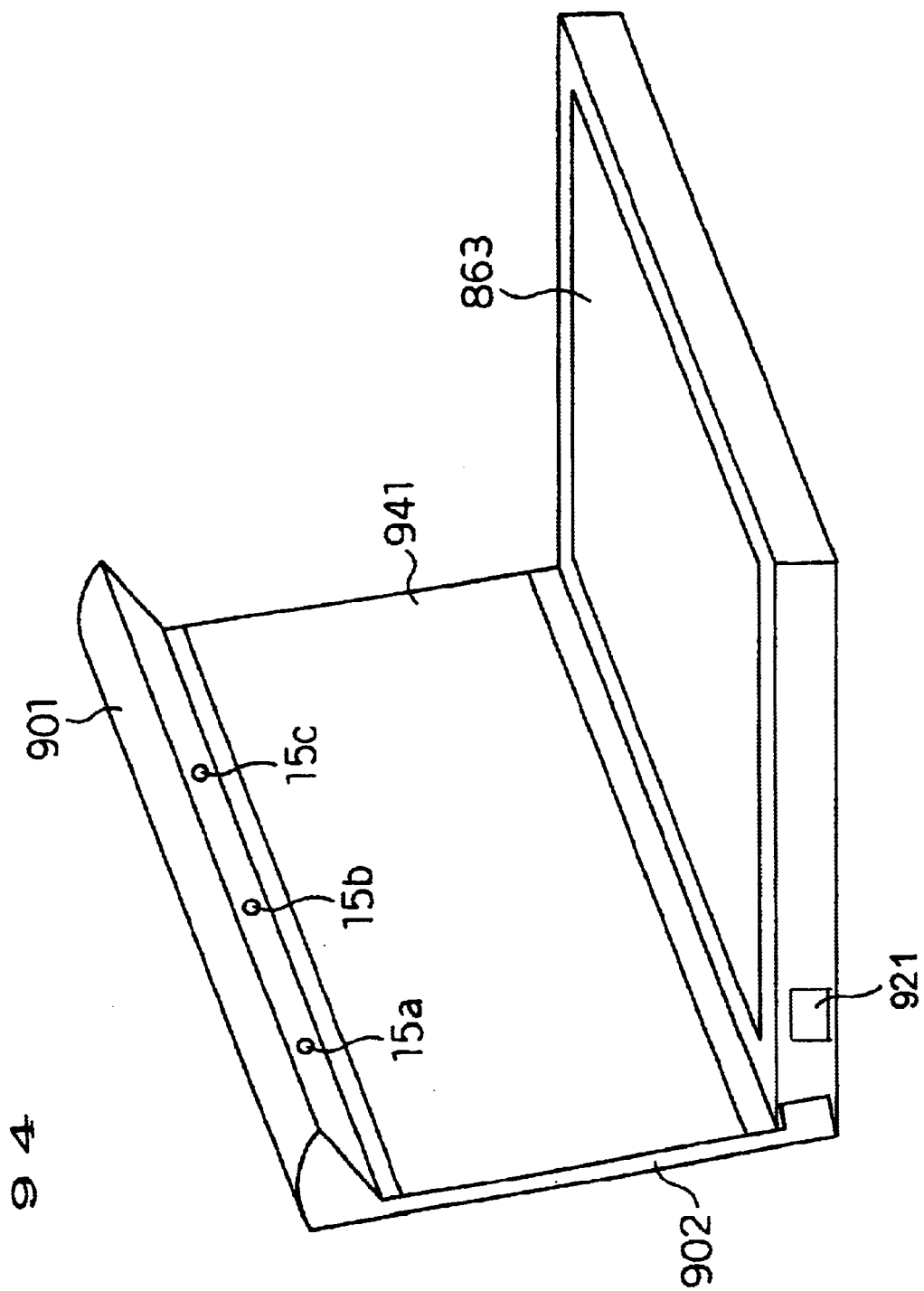
FIG. 94 illustrates the video display apparatus of the invention.
Figure 95A:
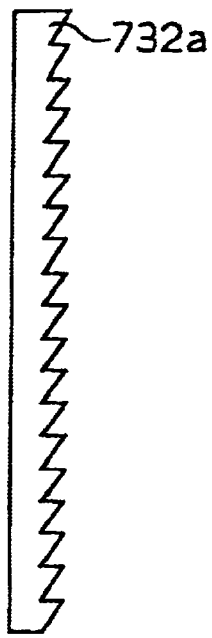
FIGS. 95A to 95D are diagrams for explaining the video display apparatus of the invention.
Figure 95B:
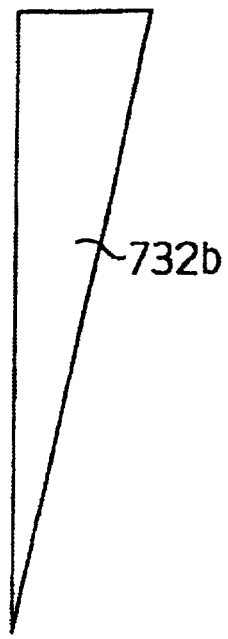
Figure 95C:
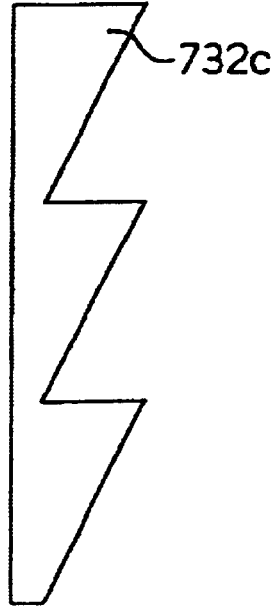

Specifically, the configuration of FIG. 94 is employed. A plate which slightly diffuses light or prism plate is used as the transparent plate 941. As the prism plate, for example, the shapes and configurations shown in FIG. 95(a), 95B, and 95C are used. A fiber plate 951 shown in FIG. 95(d) may be used as the transparent plate 941. The outside light 22a can be changed in the direction of 22c by the fiber plate 951 and used as illumination light.

Various light sources as shown in FIG. 96 as well as FIGS. 92 and 93 can be used as the light sources 15. For example, a wide plane light source as shown in FIG. 96(a), a configuration in which point light sources are dispersed as shown in FIG. 96(d), a small plane light source as shown in FIG. 96(e) a configuration in which the light source 15 is added to the tip of the arm 902 as illustrated in FIG. 96(f), and a configuration as shown in FIG. 97 in which the stick-shaped fluorescent tube 483 is used to emit light to the front by the linear parabolic mirror 271 can be used.

Figure 116:
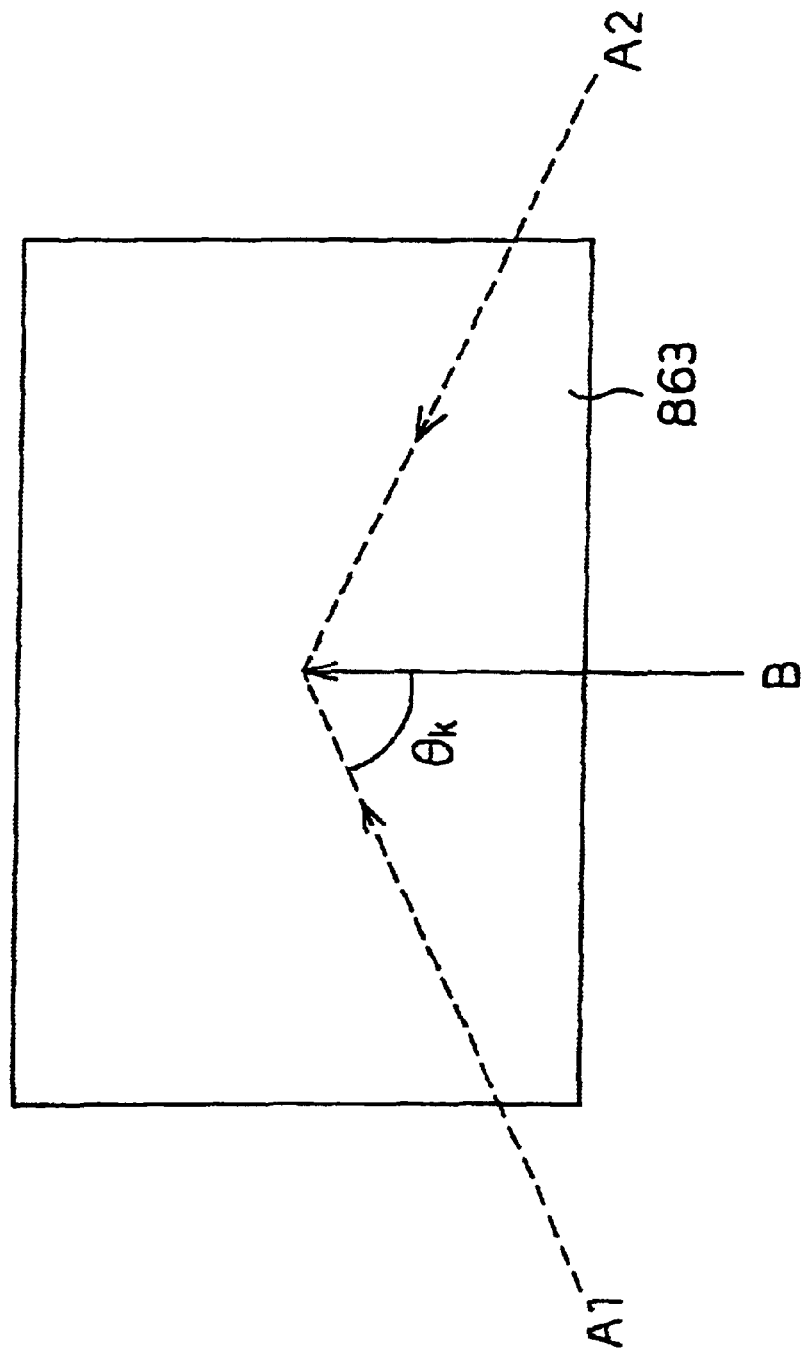
FIG. 116 is a diagram for explaining the video display apparatus of the invention.

In FIG. 1 and the like, the angle formed by the principal ray of the illumination light and the magnification lense 866 or the angle of view of the observer is $\theta_k$. $\theta_k$ may be also obtained by the principal ray and light A1 or A2 illuminating the display panel 863 from a side as shown in FIG. 116.

That is, $\theta_k$ is not limited to the angle formed by the principal ray and the angle of view of the observer (direction B of disposing the magnification lens 866). The illumination light can be emitted from the sides as shown in FIG. 116. Especially, when the display panel is of a scattering system such as the PD display panel, it can be also constructed so that the contrast becomes high when light is emitted from sides. As described above, the invention is not limited to the direction of the principal ray of the illumination light.

Figure 114:
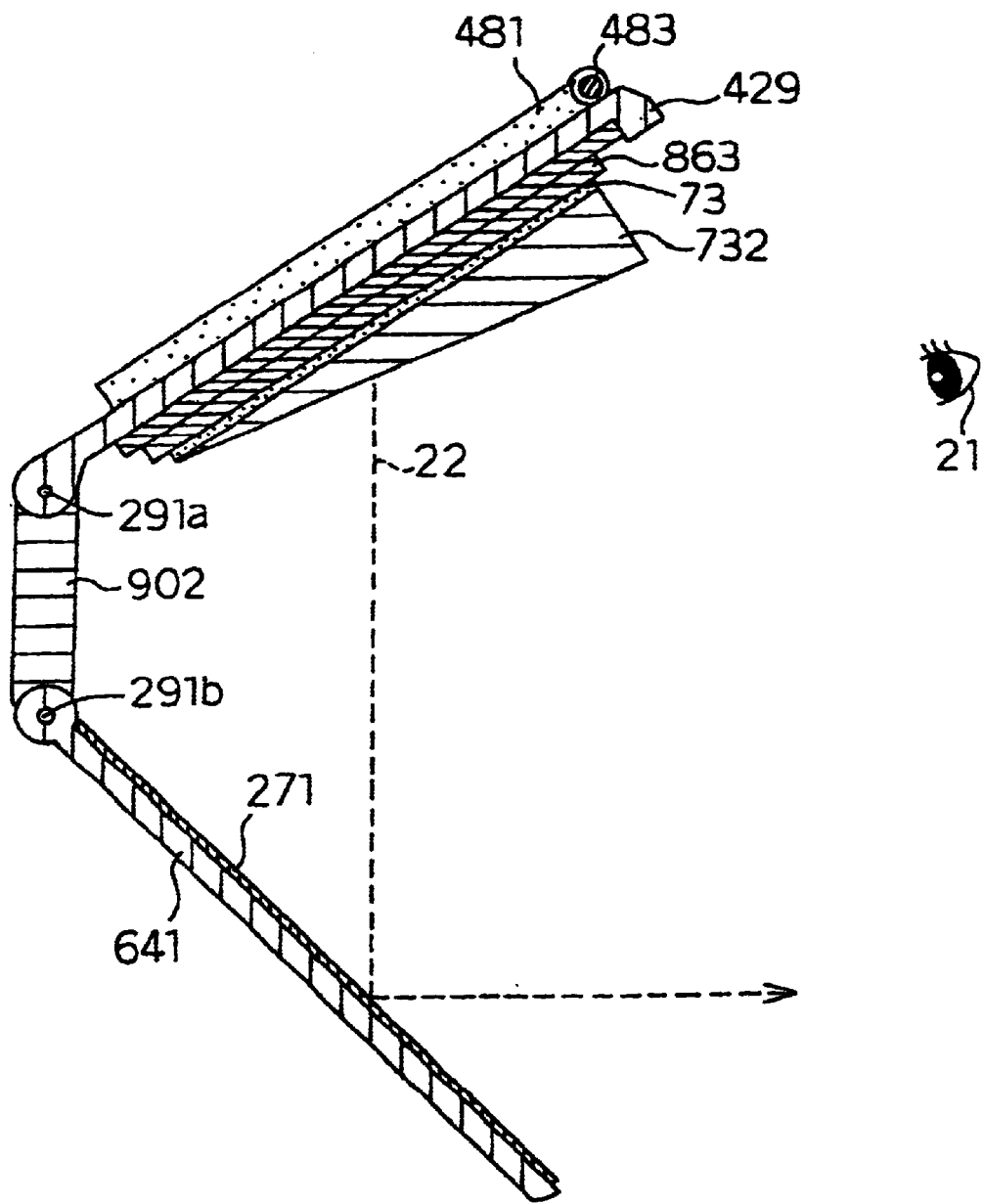
FIG. 114 shows the configuration of the video display apparatus of the invention.

FIG. 91 shows the video display apparatus using the reflection type display panel 863 (it can be of the transmission type depending on a case). When the display panel 863 is of the transmission type, the configuration as shown in FIG. 114 is employed.

The transmission type display panel 863 is attached to the panel holder 429. Light is emitted to the back face of the display panel 863 by the light guide plate 481 and the like. The emitted light is incident on the display panel 863, becomes ray 22 and is reflected by the mirror 271. The eye 21 of the observer recognizes the light scattered by the display panel 863 as "white" display.

The observer observes the displayed image transferred on the mirror 271. The cover 641 to which the mirror 271 is attached is connected to the display panel holder 429 via the arm 902.

Since the arm has at least two fulcrums 291a and 291b, the display panel 863 can be adjusted to the position in which the observer can observe an image most preferably while freely changing the angle of the display panel 863 and the angle of the mirror 271. The fulcrum 291 can be also constructed as shown in FIG. 82.

As necessary, light bending means such as the prism 732 is disposed or formed on the light outgoing surface of the display panel 863 or the mirror 271 surface. By disposing the prism 732 or the like, the angle of the light 22 can be widened so that the observer can observe the display image more easily.

Figure 95D:
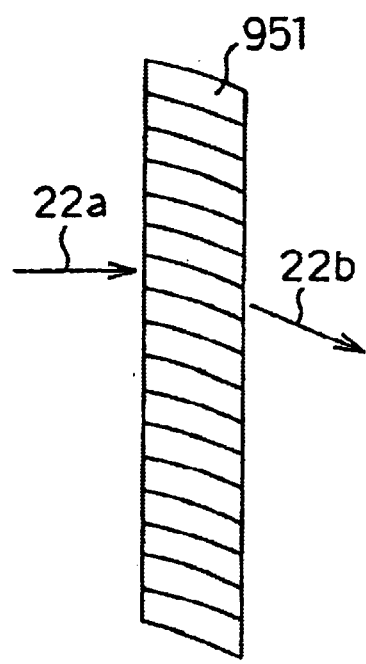

The prism 732 can have any of the shapes of FIGS. 95A, 95B, and 95C. The fiber plate 951 as shown in FIG. 95(d) can be also used. By optically coupling the prism 732 and the like by the optical coupling agent 73, the light loss at the interface is decreased and the light utilization rate is improved. By the configuration that the apparatus is folded around the fulcrum 291 of the arm 902, the apparatus can be made compact and the portability is improved.

Figure 115:
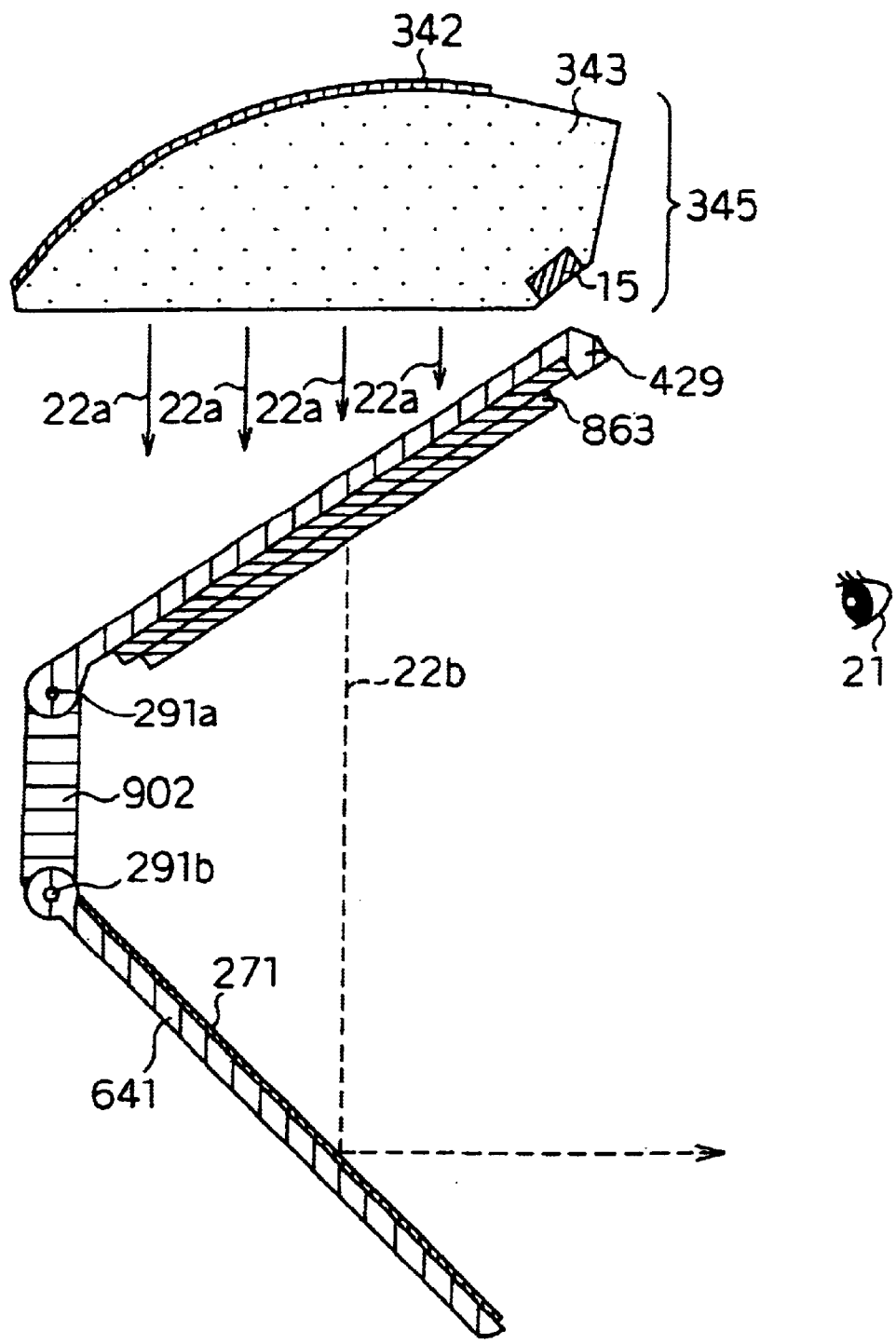
FIG. 115 shows the configuration of the video display apparatus of the invention.

In FIG. 114, the display panel 863 is illuminated by using the light guide plate 481 and the like. As shown in FIG. 115, the display panel 863 may be also illuminated by using the illuminating apparatus 345 of the backlight type of the invention constructed by using the transparent block 343.

The light emitted from the white LED 15 is converted by the reflecting film 342 into almost parallel light (light 22a). The light is therefore incident on the display panel 863 at a predetermined angle $\theta_k$. With the configuration, effects similar to those of the configuration using the prism plate 732 in FIG. 114 are produced.

In the case of using the outside light, no illuminating apparatus (backlight) 345, light guide plate 481 and the like are necessary. The sun light and light emitted from a fluorescent tube on the ceiling is almost parallel light when it reaches the display panel 863. The light having a narrow directionality is therefore incident on the display panel 863 and it is convenient for the PD display panel 863. In this case as well, the display apparatus of the invention of FIG. 114 and the like has an advantage that the incident angle of the illumination light and the angle of the mirror 271 adjusted by the observer can be simultaneously and separately adjusted.

In order to prevent light except for the light for illuminating the display panel 863 from entering the mirror 271 and the like, a bellows shielding plate is disposed on a plane formed between the end of the display panel 863 and the end of the mirror 271. The light can be prevented from entering the mirror 271 from the sides by the shielding plate. The configuration can be also applied to FIGS. 77, 78, 91, 94, and 111. That is, a screen (shielding plate: light shielding means) is disposed on a side face of the display panel 863. By using the bellows shape, when the cover 641 is opened, the bellows is opened simultaneously and serves as the shielding plate (shielding film).

By disposing a color filter on the mirror 271 surface, the surface of the display panel 863, or the like, the color of the display image can be adjusted. An embossed sheet is adhered to the mirror 271. By directly embossing the mirror 271, the angle of viewing the display image can be widened. The configuration can be applied to a view finder, a video display apparatus, or the like in each of which a mirror is disposed in the optical path in other embodiments of the invention.

The invention is also characterized in that the light guide plate and the like are detachable in FIGS. 114 and 115. In the case of illuminating the display panel 863 by using the outside light, the light guide plate and the like are detached. At night or the like when artificial illumination is necessary, the light guide plate and the like are attached. An attaching/detaching mechanism is realized by providing an end or the like of the light guide plate with a nail and fitting the light guide plate into the panel holder by using the nail.

Figure 11:
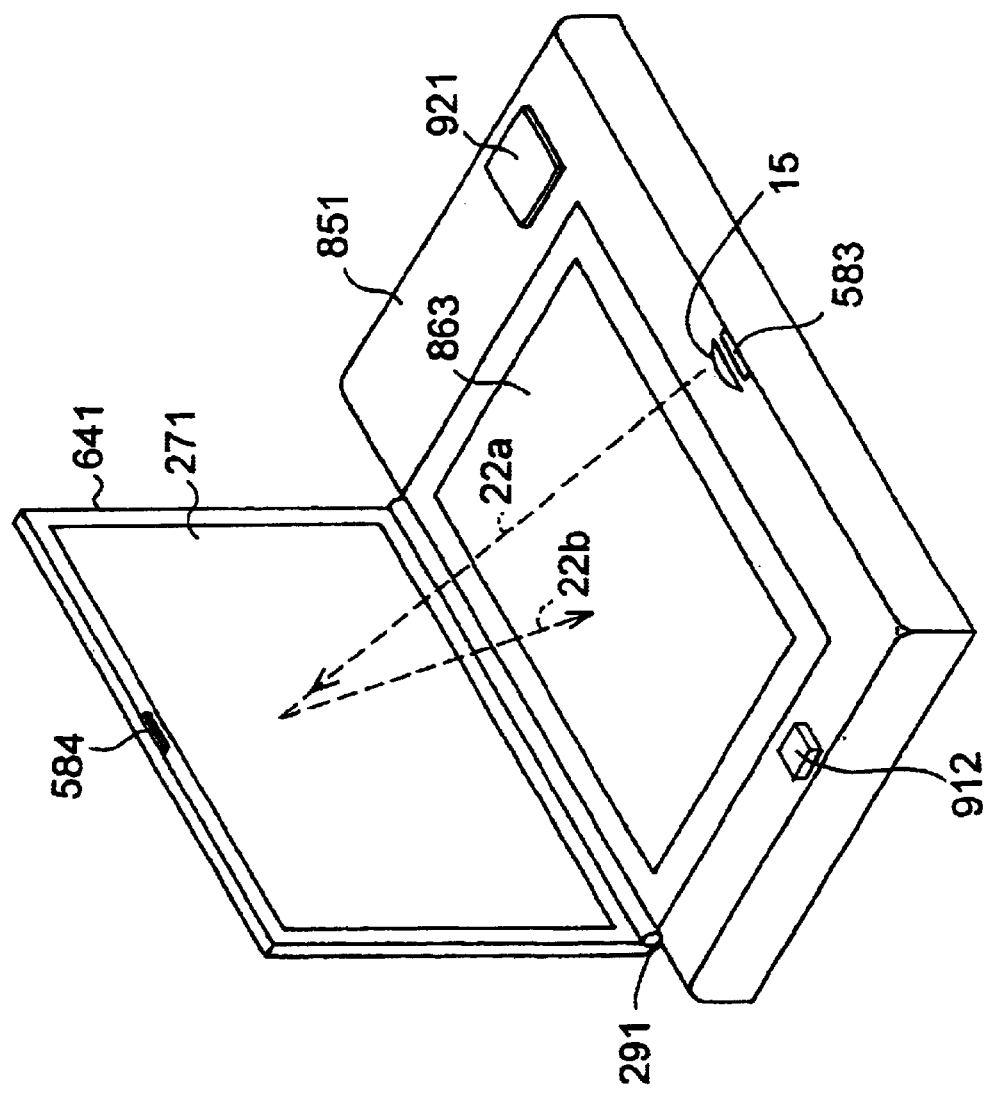
FIG. 11 is a perspective view of a video display apparatus of the invention.

The technical idea of the invention can be also applied to display apparatuses such as a direct view display panel, portable information terminal, personal computer, monitor of an electronic camera, monitor of a video camera, and projection type display apparatus. FIG. 11 is a perspective view of the embodiment. As shown in FIG. 11, the light 22a emitted from the light emitting device 15 is incident on the reflecting Fresnel lens 271. The incident light is converted into parallel light by the reflecting Fresnel lens 271 and the display panel 11 is illuminated with the parallel light.

The display panel 863 is a display panel having reflecting or translucent pixels. The reflection Fresnel lens 271 is obtained by forming a reflection mirror in a Fresnel lens shape. For example, a metal plate which is cut or a metal thin film deposited on a pressed resin plate made of acrylic or the like can be used. Obviously, not only the Fresnel lens but also a parabolic mirror can be used. It is not limited to the parabolic mirror but, for example, an ellipsoidal mirror can be also used. The positional relation between the display panel 863 and the reflection Fresnel lens (parabolic mirror) is as shown in FIG. 180.

The reflection Fresnel lens 271 is attached to the cover 641 and the display panel 863 is attached to the body (casing) 851. The inclination of the cover 641 can be freely adjusted by the fulcrum 291. By folding the cover 641, the projection 584 is connected with the retaining part 583 and the cover 641 protects the display panel 863 and the reflection Fresnel lens 271. A switch is formed at the retaining part 584[sic]. When the cover 641 is opened, the light emitting device 15 is automatically turned on and the display panel 863 operates.

The change-over switch (turbo switch) 921 is attached to the body 851. The turbo switch 921 switches the display between the normally black mode display (NB display) and the normally white mode display (NW display). It is especially effective when a reflection type polymer dispersed liquid crystal display panel is used as the display panel.

In the case of the outside light of ordinary brightness, an image is displayed in the NW mode. The NW mode can realizes a display of the wide angle of view. The mode is used when the outside light is very weak. When the liquid crystal layer is in a transparent state, the observer directly observes light reflected by a pixel electrode, so that a very bright display image can be observed. The angle of view is extremely narrow. However, even when the outside light is weak, the display image can be preferably watched. Therefore, if it is for personal use and used for short time, there is no problem in practice. Generally, the NB mode display is not often used, the NW display is usually set, and the NB mode display is set only when the turbo switch 921 is continuously pressed.

The display apparatus of FIG. 11 is characterized by comprising a gamma change-over switch 912. The gamma change-over switch 912 is a toggle switch by which a gamma curve can be changed by one touch. Under the illumination of an incandescent lamp, the color temperature of light incident on the display panel is about 4800K and the color becomes reddish white. Under a daylight fluorescent lamp, the color temperature is about 7000K and the color becomes bluish white. On the outside, the color temperature is about 6500K and the color becomes white.

The color of the display image on the display panel varies according to the place where the display apparatus of FIG. 11 is used. Especially, the observer feels that the color is strange when the display panel is moved from under the fluorescent lamp to the incandescent lamp. By selecting the gamma change-over switch 912 at this time, a display image can be observed normally.

The gamma change-over switch 912 changes the gamma curve of red so as to display preferable white under the incandescent lamp and reduce the transmittance (modulation rate) of the liquid crystal. When the gamma change-over switch 912 is pressed once, the transmittance (modulation rate) of blue is reduced so as to be applied to the daylight fluorescent lamp. When it is pressed once more, daylight display which is most preferable under the sun light is performed. The user selects the gamma change-over switch 912, thereby enabling a preferable display image to be observed under any illumination light.

A driving method and the configuration of a driving circuit peculiar to a display panel using a liquid crystal or the like for performing light modulation by controlling a scattering/transmitting state as a light modulating layer will be described hereinbelow.

Usually, the liquid crystal layer 127 is sandwiched between the color filter 124 and the pixel electrode 126. The color filter 124 is formed on or below the counter electrode 125. A predetermined DC voltage is applied to the counter electrode 125. An AC video signal having the potential of the counter electrode as a center is applied to the pixel electrode 126. Due to an influence by a punch-through voltage of a thin film transistor or the like, however, to be accurate, the potential of the counter electrode 125 is lower than the central value of the video signal by 0.5V to 1V.

The central values of the video signals of red (R), green (G), and blue (B) are, however, the same potential. In the case of subtractive color mixture, cyan, yellow, and magenta are used in place of R, G, and B. In this case as well, the central values of the video signals are the same potential. That is, the bias potentials of the video signals of the three primary colors are equal to each other. Such a state is shown by solid lines of FIG. 117.

Figure 117:
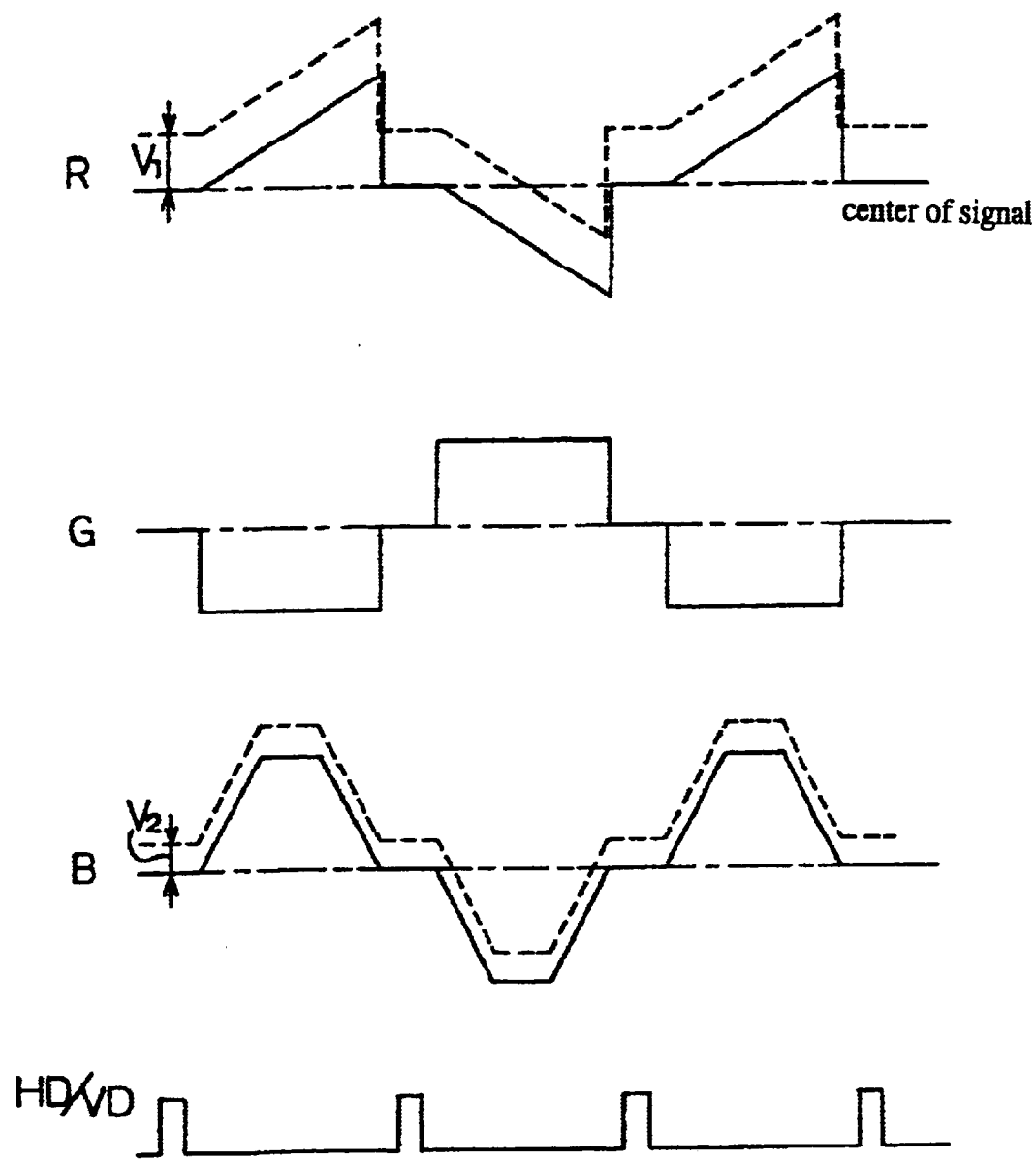
FIG. 117 is a diagram for explaining a method of driving the display panel of the invention.

The solid lines of FIG. 117 show that the polarity of a video signal applied to the liquid crystal display panel 863 is inverted every one horizontal scanning (HD) period or one vertical scanning (VD) period by using the signal center as a center (bias potential is 0V).

In the case of using a polymer dispersed liquid crystal as the liquid crystal layer 127, a polarizer is unnecessary for light modulation. Consequently, a high luminance display can be realized. In the case of the polymer dispersed liquid crystal, however, the bias potential varies. The cause is presumed to be wavelength dependency of the incident light. There is a case that the phenomenon also occurs in the guest host liquid crystal. That is, it is necessary to adjust each of the potentials of the video signals of three primary colors with respect to the potential of the counter electrode 125. Especially, the degree of variation is high for light having a long wavelength such as red. If the bias adjustment is not performed to each of the colors, black cannot be displayed preferably. The phenomenon does not occur in the TN liquid crystal which is often used conventionally. Even if it occurs, it is minor.

It is therefore necessary to adjust the bias voltage by using one of the video signals of three primary colors as a reference as shown by broken lines of FIG. 117. In FIG. 117, a bias voltage V1 is applied for the video signal of R and a bias voltage V2 is applied to the video signal of B. Ditto for the case where the three primary colors are cyan, yellow, and magenta. That is, the bias voltage is adjusted according to the wavelength of light to be modulated.

Figure 118:
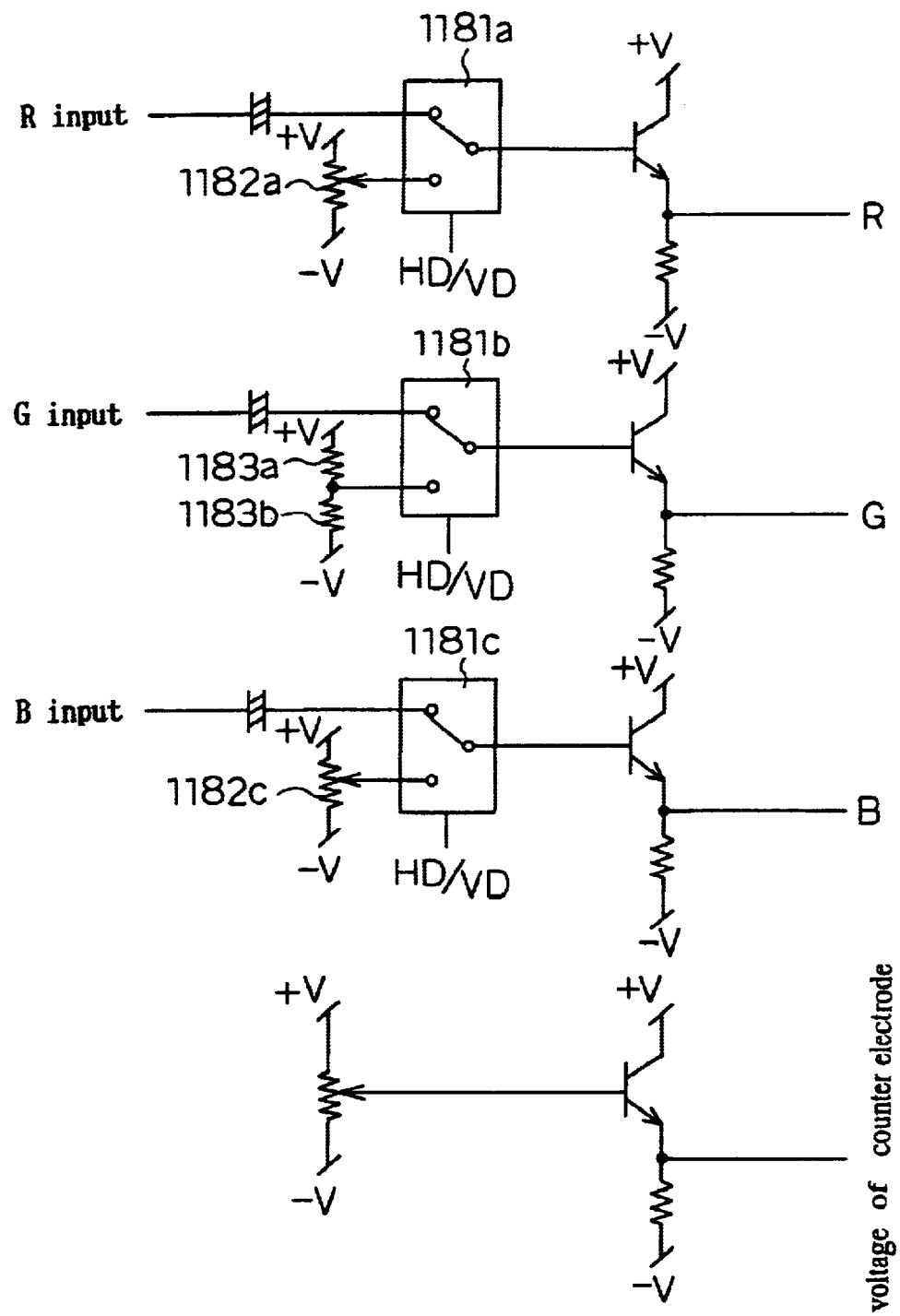
FIG. 118 shows a driving circuit of the display panel of the invention.

The central value of the video signals of the three primary colors is changed by a driving circuit of FIG. 118. Each of the video signals is supplied to each of analog switches 1181. In the analog switch 1181, a clamp potential is generated by a variable resistance 1182 or fixed resistance 1183.

The analog switch 1181 is switched by the HD and VD signals. That is, the clamp potential is applied to the video signal and clamped during a blanking period. Since the video signal of G is a fixed value, the clamp potential is produced by the fixed resistance 1183. Since it is necessary to vary the central value of the video signals of R and B with respect to the counter electrode potential, the variable resistance 1182 is used. As a matter of course, the clamp potential can be generated by a D/A converter (not shown). There are various methods of varying the central value. When the video signal is digitally processed, the central value can be changed only by adding or subtracting digital data.

By using the driving circuit of FIG. 118, the central value of the video signals of three primary colors can be separately easily changed. Thus, preferable black display can be realized in the polymer dispersed liquid crystal display panel.

The display modes of the polymer dispersed liquid crystal display panel are the normally white (NW) mode and normally black (NB) mode. In the NW mode, when no voltage is applied to the liquid crystal layer, white is displayed. In the NB mode, when no voltage is applied to the liquid crystal layer, black is displayed.

In the case of using the polymer dispersed liquid crystal display panel for a direct-view view finder, the NW mode is mainly used. In the case of using the polymer dispersed liquid crystal display panel as a light valve of a projection type display apparatus (projector), the NB mode is used.

When it is assumed that the illuminance at the light incident face of the polymer dispersed liquid crystal display panel is E [1x], the brightness measured at the light outgoing face and in the normal line direction of the polymer dispersed liquid crystal display panel is B (nt), and the ratio of the circumference of a circle to its diameter is π, the scattering gain G is set so as to satisfy $0.7 \leq G \leq 1.5$ in the NB mode. When G is equal to or smaller than 0.7 and the driving voltage 6f the polymer dispersed liquid crystal display panel increases, the polymer dispersed liquid crystal display panel generates heat and the characteristics deteriorate. When G is 1.5 or larger, necessary contrast cannot be attained. As described above, G is a characteristic value of the light modulation layer itself.

In the NW mode, the scattering gain G is set so as to satisfy $1.5 \leq G \leq 3.0$. When G is 1.5 or smaller, although the angle of view is widened, necessary brightness cannot be attained. When G is 3.0 or larger, the angle of view is narrow, so that it is difficult to use the panel for a portable information terminal or a view finder.

When the pixel is the reflecting electrode, the brightness B at the reflecting surface is measured as B(nt). In this case, it is necessary to obtain the scattering gain G by measuring and considering direct reflected light reflected by the glass surface of the display panel or the like.

In order to obtain the maximum white display in the NW mode, the voltage applied to the liquid crystal layer is set to be higher than the threshold voltage of the liquid crystal. The threshold voltage denotes a voltage by which the liquid crystal starts to transmit. In other words, the image is displayed when the voltage applied to the pixel is higher than the threshold voltage and equal to or lower than the maximum application voltage. That is, in the NW mode, the liquid crystal layer is not used in the complete scattered state. The voltage is set to be higher than the threshold voltage to properly reduce the scattering and to display white by using also light reflected by the reflecting electrode, thereby enabling the bright white display to be realized.

The white display is adjusted by measuring the brightness from the optimum viewing angle (an ordinary direction of the observer of viewing the display panel), adjusting a voltage applied to a pixel so that the brightness becomes maximum, and adjusting the gamma. In the case of the NW mode, it is preferable to provide the video camera body with a volume used by the observer, which does not to vary an application voltage in the black display but varies an application voltage in the white display. The observer adjusts the volume while watching the display image so as to obtain the brightest image.

It is preferable to form a plurality of (specifically, two) pixel electrodes per pixel. The plurality of pixels change the absolute value of a voltage applied to the liquid crystal layer in one frame. The light transmitting state on one pixel-electrode changes the light transmitting state on the other pixel electrode. With the configuration, the viewing angle can be widened apparently.

The driving method, driving circuit, and the like can be applied to a polarized light modulating method TN liquid crystal display panel and the like.

In the case of using the reflection type PD display panel as a display apparatus, there is a case that the display is changed between the NB display and the NW display in accordance with the direction of viewing the display image.

Usually, the direct-view type PD display panel is driven in the NW mode. For example, in FIG. 119, the incident light 22a is incident on the display panel 863. When the liquid crystal layer 127 is in the transparent state, the reflected light 22b is obtained. When the liquid crystal layer 127 is whitish, the scattered light 31 is obtained. Since the display panel 863 is driven in the NW mode, the observer recognizes the scattered light 31 as white display.

When an eye of the observer is in the position 21b, the reflected light 22b is recognized as white display. Although the display is in the NW mode, the observer therefore recognizes the image in the NB mode. That is, the NW and NB modes are inverted (black image is turned white and vice versa).

As mentioned above, the problem of the inverse video occurs according to the position of the eye 21 of the observer (direction of viewing the image).

Figure 119:
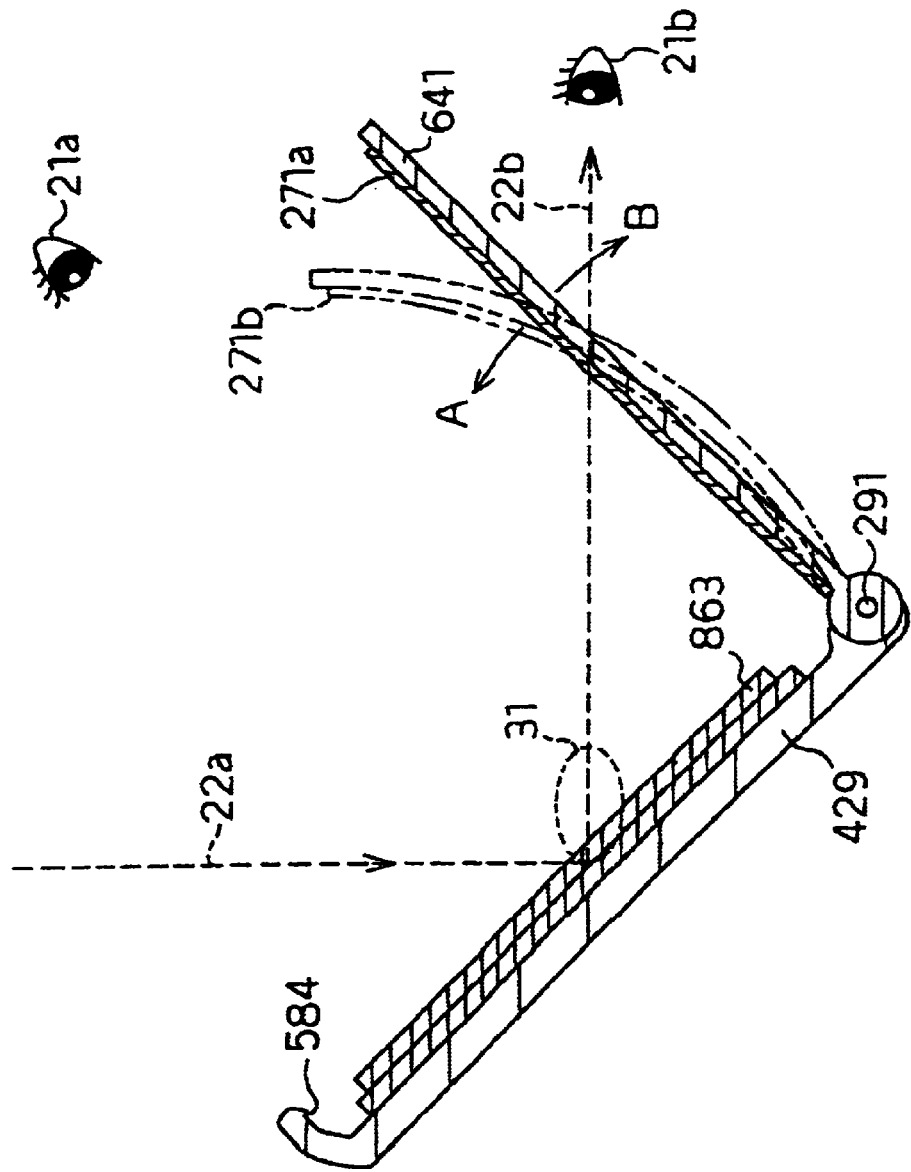
FIG. 119 shows the configuration of the video display apparatus of the invention.

In order to solve the problem, in FIG. 119, the cover 641 is provided as shielding means. The cover 641 shields the reflection light 22b so that the observer does not watch a displayed image from the position 21b. Consequently, the image in the inverse video is not observed.

The angle of the cover 641 can be freely changed around the fulcrum 291. By retaining with the nail 584, the cover 641 can be folded.

It is effective to form or dispose the mirror 271a in the cover 641 since the reflection light 22b is reflected by the mirror 271a and the display panel 863 can be illuminated again by the reflected light. Consequently, the displayed image can be made brighter. It is preferable to form the mirror 271b in the shape of a concave surface or the like, reflect the reflection light 22b by the concave mirror 271b, and make the reflection light 22b almost coincide with the optical path 22a of the incident light, thereby making the display image further brighter.

Although the mirror 271b has the concave surface, the invention is not limited to the concave surface. For example, a convex lens or the like can be also used. The observer uses the mirror 271 by turning in the directions A and B so that the image can be observed most preferably.

In order to solve the reverse video display which occurs according to the direction of viewing the image of the observer, there is a method of changing the mode between NW and NB in accordance with the video signal fed to the display panel 863. That is, in FIG. 119, when the eye of the observer is in the position 21a, the image is displayed in the NW mode. When the eye of the observer is in the position 21b, the image is displayed in the NB mode. The NW and NB modes are switched by using a user switch. Especially, in the case of the NB mode, the viewing angle is narrow but the display is very bright. The NB mode is therefore effectively used for a portable terminal, information device, and the like which require security.

Figure 120:
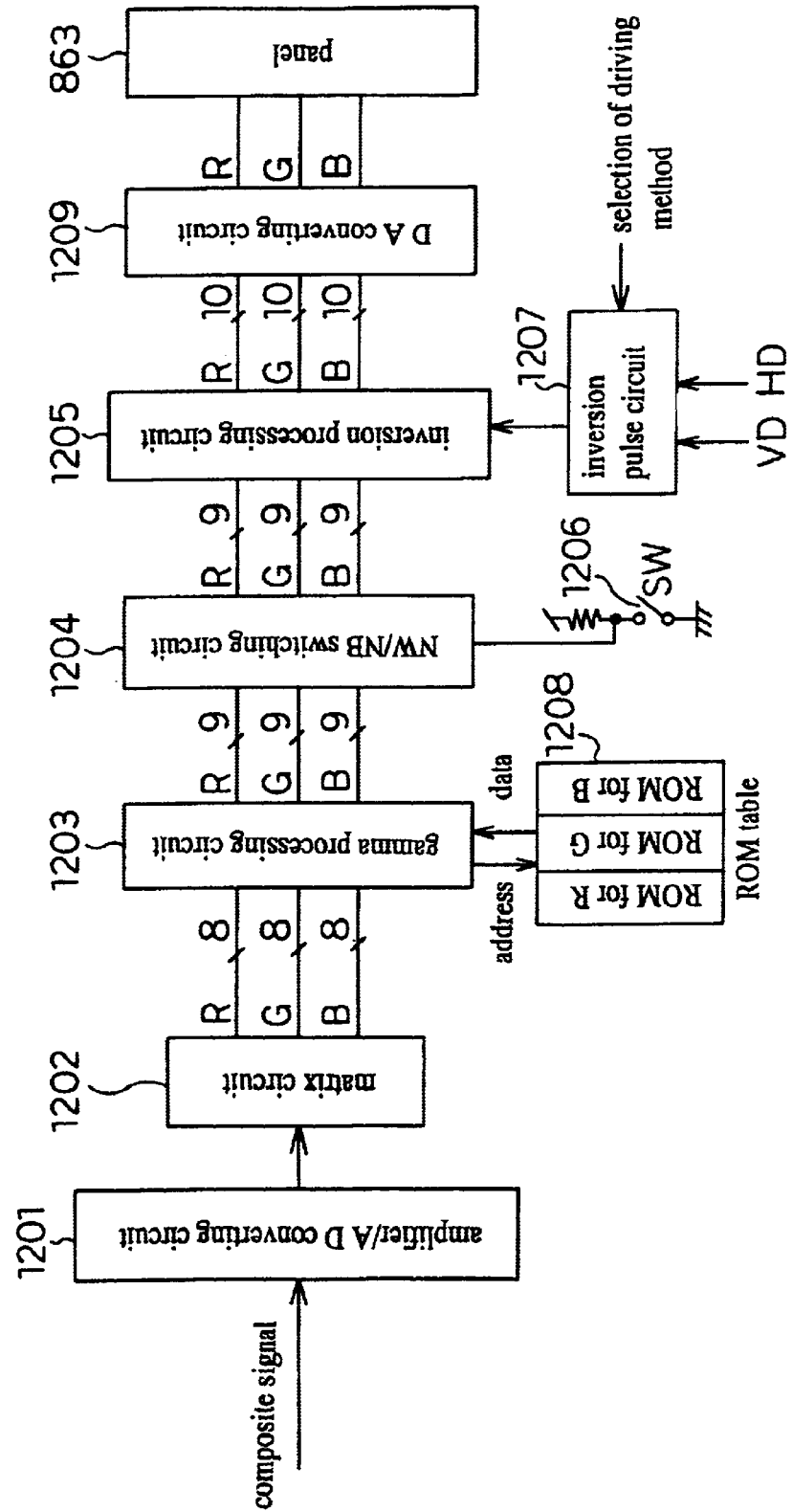

The switching between the NW mode and the NB mode can be easily realized when the video signal is digitally processed for the following reason. When the bits of image data in the NW mode are inverted, the image data in the NB mode is obtained. The circuit will be described with reference to FIG. 120.

A composite signal is subjected to gain adjustment by an amplifier/AD converting circuit 1202 and also AD converted, thereby obtaining a digital signal. The converted digital signal is decomposed into video data of eight bits each of red (R), green (G), and blue (B) by a matrix circuit 1202.

The 8-bit video data is supplied to a gamma processing circuit 1203, converted by a ROM table 1208, and gamma processed so as to adapt to the electric-optical characteristics of the liquid crystal.

By the gamma process, each video data becomes 9-bit data. Whether the video data is processed to be video data in the NW or NB mode is determined by an NW/NB switching circuit 1204. The switching is made by a change-over switch 1206 which can be freely set by the observer. For example, when the video data in the NB mode is "1FF", the video data in the NW mode is "000" obtained by inverting the bits. At this time, as shown in FIG. 117, the signal process is performed also in consideration of offset voltages $V_1$ and $V_2$.

The video data outputted from the NW/NB change-over circuit is fed to an inversion processing circuit 1205 and becomes video data which is inverted every one frame (1F) or one horizontal scanning period (1H). When the video data is inverted, MSB (Most Significant Bit) is processed as "0". When the video data is not inverted, the MSB is processed as "1" and the resultant data is outputted as 10-bit data.

An inversion timing signal is sent by VD and HD pulses. The driving methods are a 1F inversion for inverting the polarity of a video signal applied to a pixel every field, 1H inversion for inverting the polarity of the video signal every 1 horizontal scanning period, 1 column (C) inversion for inverting the polarity of the video signal every dot in the horizontal direction, and 1-dot (1D) inversion for inverting the polarity of the video signal applied to the pixel every dot in the lateral and vertical directions. In the invention, in order to prevent occurrence of flicker and inclination in the brightness, the 1D inversion is employed.

The video data outputted from the inversion processing circuit 1205 is DA converted by a D/A converter 1209 into analog data. The analog data is applied to the display panel 863.

An important point in this case is that the observer can freely switch the NB and NW modes. The NB and NW modes are switched so that the display image can be optimally observed according to the light incident state to the display panel 863 and the direction of observing the display panel 863. The mode is switched by a switch such as a user button. In a period during which the user presses the button, or a predetermined period after the button is depressed, the image is displayed in the NB mode. The predetermined period can be varied by a program. According to the configuration, the NW mode can be set by pressing the button. In a device of the scattering modulation system such as the PD liquid crystal, an image can be displayed by weak outside light although the viewing angle is narrowed in the NB mode. It is therefore preferable to employ the mode for a portable terminal or the like.

As a matter of course, the position of the eye 21 of the observer and the direction 22 of the incident light are automatically detected by a photosensor or the like and the mode can be automatically switched between the NW and NB modes. It is also possible to automatically detect the intensity of the outside light and switch the MW [sic] and NB modes. It is also possible to display a mode switching message on the display screen of the display panel to preferably realize the man-interface with the user.

The above can be applied irrespective of the type of the display panel (reflection type or transmission type). It can be applied not only to the PD display panel but also a display panel or display apparatus which is not of a self lighting type such as TN display panel.

Figure 121:
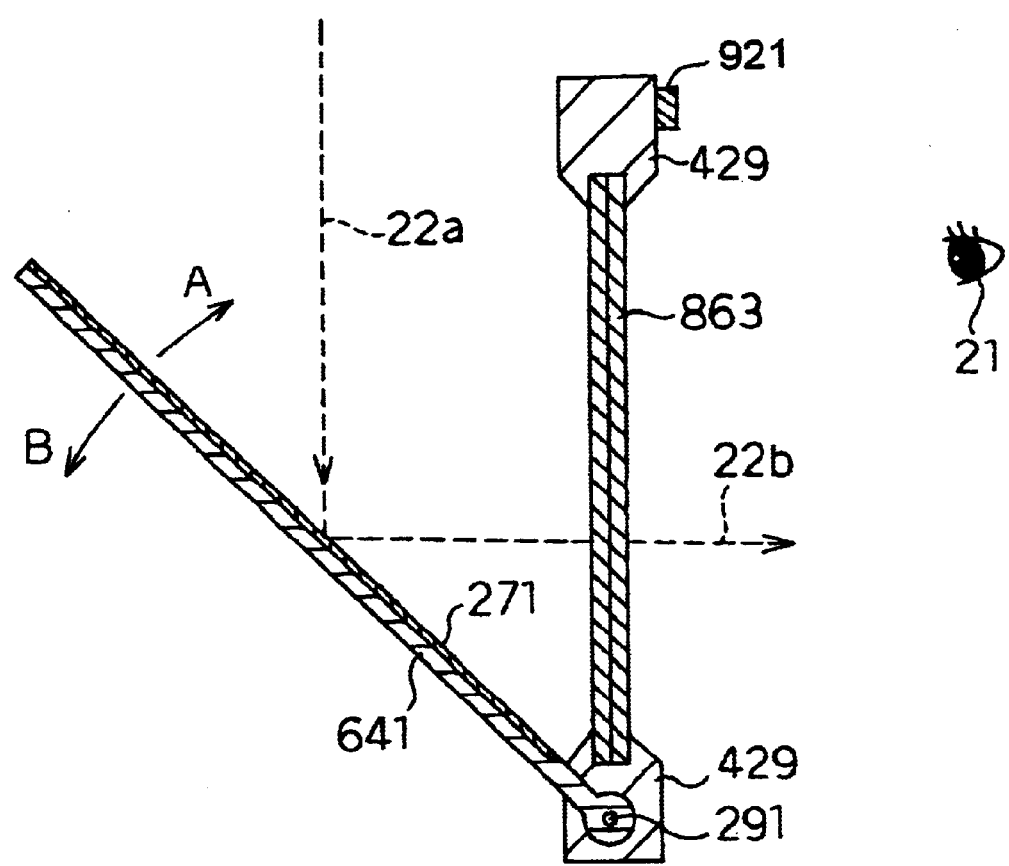

When the display panel 863 is of the transmission type, as shown in FIG. 121, by changing the angle of the mirror 271, the angle of the light 22*b* incident on the display panel 863 can be freely changed. The observer changes the mirror 271 in the directions A and B while watching the display image, thereby adjusting the mirror 271 to the position in which the display image on the PD display panel 863 can be observed most preferably. The configuration and method of adjusting the angle of the mirror 271 to change the display state are characteristics of the invention, which are not realized by the conventional display apparatus.

On the display panel 863, the color filter 124 of the three primary colors of R, G, and B (or cyan, yellow, and magenta) are formed. The states of the video signals applied to the pixels 124 at this time are shown in FIG. 122. For simplicity of explanation, the voltage higher than the signal center value shown in FIG. 117 is indicated by "+" and the voltage lower than the signal center value is indicated by "−". In FIG. 122, it is assumed that the lateral direction is a row direction and the vertical direction is a column direction. The video signals are sequentially applied on the row unit basis.

In FIG. 122(*a*), in an arbitrary pixel row, the video signal of "+" is applied to the pixels 126 of R and B and the video signal of "−" is applied to the pixel 126 of G. Therefore, in an arbitrary pixel row, video signals of "+−++−++−+++−++ . . ." are applied. FIG. 122(*b*) shows the state where video signals are applied to pixels after one frame. In FIG. 122(*b*), the video signal of "−" is applied to the pixels 126 of R and B and the video signal of "+" is applied to the pixel 126 of G. In an arbitrary pixel row, video signals of "−+− −+−−+−−+−− . . ." are applied. That is, the polarity of FIG. 122(*a*) and that of FIG. 122(*b*) are opposite to each other. The polarity of the video signal applied to the pixel 126 in FIG. 122(*a*) and that in FIG. 122(*b*) are opposite to each other. Since the AC signal is applied to the liquid crystal layer 127, the liquid crystal does not deteriorate.

Hitherto, it is most preferable that the polarities of the video signals applied to an arbitrary pixel row are "+−+−+−+ . . . ". In order to realize it, however, when the pixel 126 of R in the first row and first column in FIG. 122(*a*) is "+", it is necessary to apply the voltage of "−" to the pixel 126 of R in the first row of the fifth column.

In the case of realizing the driving method, the clock for sampling the pixel becomes very fast. In a source driver circuit connected to a source signal line, it is necessary to invert the polarity of the video signal at high speed. Since the source signal line has a large capacity, it is difficult to increase the speed. It is also necessary to increase the mobility of the source driver circuit or increase the size of the driver circuit. When the drive circuit is produced by a high-temperature or low-temperature polysilicon technique, the operating frequency of the drive circuit becomes higher, so there are many problems. Since parts for realizing high speed are requested, the video signal processing circuit also becomes expensive.

Figures 122A, 122B:
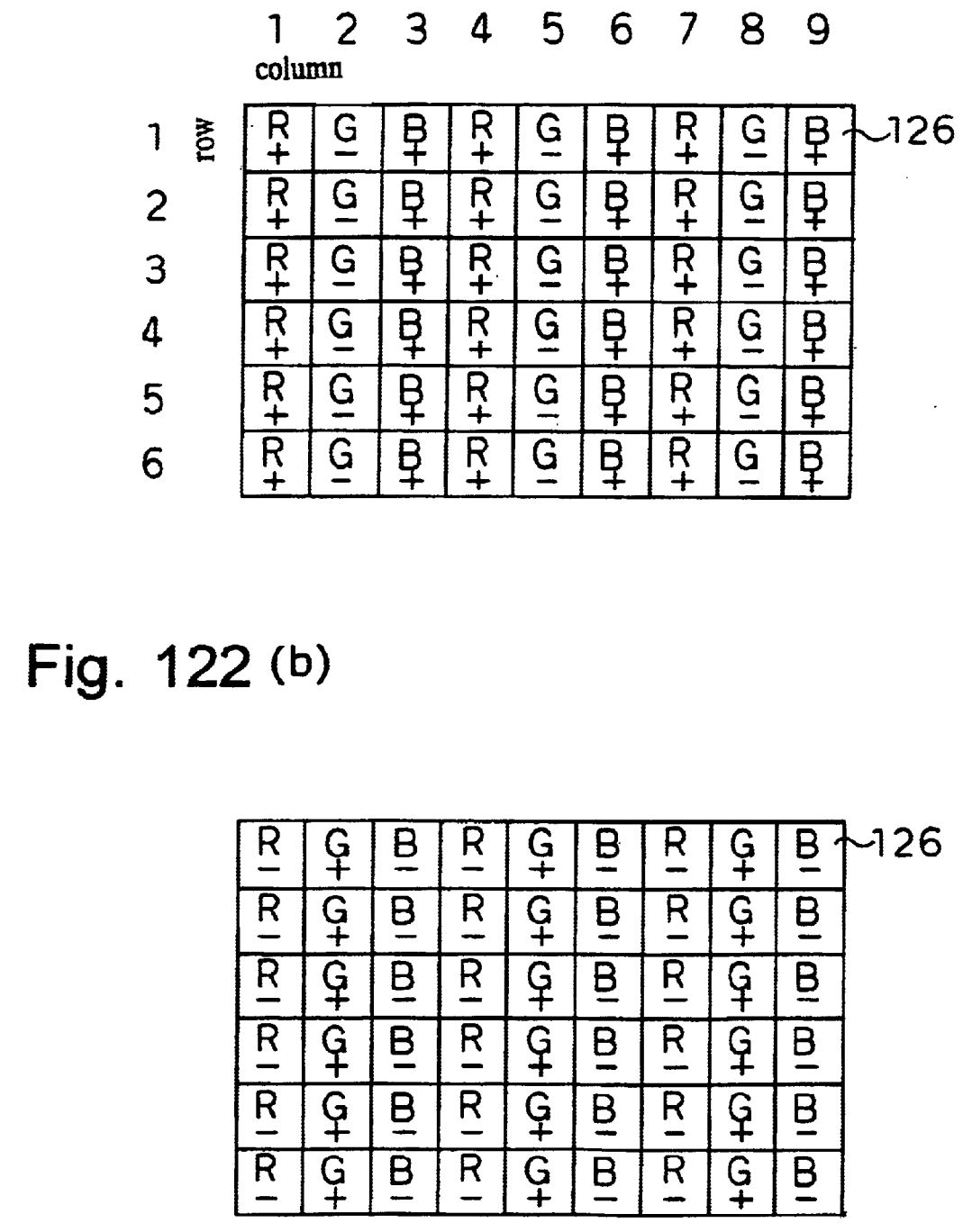

In the driving method of FIG. 122, the polarity of the video signal of each of R, G, and B does not change in one horizontal scan period (1H, that is, 1 row). For example, the pixel of R in the first row in FIG. 122(*a*) has the "+" polarity for the period of 1H. It can be therefore easily realized by the low-temperature polysilicon or the like. Since the polarities of video signals of neighboring pixels are the same like "++−++−++−++− . . . " in one pixel row, flicker easily occurs. When the polarity of the video signal applied to the pixel 126 is inverted every frame as shown in FIGS. 122A and 122B, flicker hardly occurs.

The driving method can be similarly executed when pixels of the same color are arranged obliquely as shown in FIG. 123. Also in a configuration that pixels are deviated half dot by half dot as shown in FIG. 125, the driving method can be similarly executed or realized.

Further, as shown in FIG. 124(*a*) when the polarities of video signals applied in the first row are set to "+−++−++− . . . ", the driving method of applying the signals having polarities "−+−−+−−+ . . . " which are opposite to those in the first row can obtain a preferable result. Occurrence of the flicker can be suppressed further more than FIG. 122 or the like.

That is, the polarity of the video signal applied to the pixel is inverted every frame and also every row. The driving method is called an extended 1D inversion in the display panel, display apparatus, and the like of the invention (refer to FIGS. 122A and 122B).

The display panel 863 described with reference to FIG. 12 and the like has a single color filter layer. In the case where the light modulating layer 127 is the PD liquid crystal layer, as illustrated in FIG. 126, when two color filter layers are formed, an effect such that the contrast becomes higher is produced.

In FIG. 126, color filters 124Rb, 124Gb, and 124Bb are formed on or below the pixel electrodes 126. The other configuration is similar to that of FIG. 12 and the like. FIG. 127 is a model of the configuration of FIG. 126. For simplicity of explanation, the incident light 22 is incident on the color filter 124Bb. When it is assumed that the color filter 124 to which the suffix R is added is a color filter of R color, the color filter 124 to which the suffix G is added is a color filter of G color, and the color filter 124 to which the suffix B is added is the color filter 124 of B color.

Light incident on the color filter 124Bb is scattered by the liquid crystal layer 127 so that the forward scattering light 31$a$ and the backward scattering light 31$b$ occur. A part of the forward scattering light 31$a$ becomes light 22$a$. When the angle θ between the light 22$a$ and the interface of the counter substrate 122 with the air becomes the critical angle $θ_r$ or wider, the light 22$a$ is reflected and becomes reflected light 22$c$.

The reflected light 22$c$ is incident on the color filter 124Ga. Since the color filter 124Ga is a color filter of G color, the reflected light 22$c$ is absorbed. When the reflected light is incident on the color filter 124Ba of B color, it is scattered again by the liquid crystal layer 127. As mentioned above, in the case of the forward scattering, ⅔ of the reflected light 22$c$ is absorbed. Halation by the forward scattering does not therefore easily occur and the decrease in the contrast is small.

On the other hand, a case where no color filters 124Rb, 124Gb, and 124Bb are used will be examined. The incident light 22 is scattered by the liquid crystal layer 127 and a part of it becomes the backward scattering light 31$b$. A part of the backward scattering light becomes reflected light 22$b$. When the angle formed by the reflected light 22$b$ and the interface is equal to or wider than the critical angle $θ_r$, the light becomes the reflected light 22$d$ which is again incident on the liquid crystal layer 127. The scattered light 31$c$ is consequently generated, so that the display contrast deteriorates.

When the color filters 124Rb, 124Gb, and 124Bb are formed, the reflected light 22$d$ is absorbed by the color filter 124Rb and no scattered light 31$c$ occurs. The display contrast can be therefore improved. That is, ⅔ of the reflected light 22$d$ is absorbed by the color filter. By allowing the light to pass through the two color filters 124, an effect such that the color impurity is improved is produced.

The embodiment of FIG. 126 can be also applied to the transmission type display panel. For example, a construction in which the color-filter is formed in the pixel electrode and a color filter 124Xa is formed as an intermediate layer of the substrate as shown in FIG. 126 is shown. Alternately, the color filter may be formed or disposed on the surface of the array substrate 121 or counter substrate 123 (refer to FIGS. 12, 13, and 103). When the display panel is of the reflection type, the color filter is made thinner than the transmission type display panel since light is incident on the color filter twice.

The case where the pixel electrode 126 of the display panel 863 is of the reflection type or the case where the mirror 343$a$ is disposed on the back face of the display panel 863 as shown in FIG. 128 will be examined. In FIG. 128, the incident light 22$a$ is reflected by the mirror 343$a$ and becomes the reflected light 22$c$. The reflected light 22$c$ reaches the eye 21 of the observer.

In the case where the display panel 863 is in the NW mode, when the reflected light 22$c$ reaches the eye 21 of the observer, black and white in the display image are inverted. In order to solve the problem, it is sufficient to allow the reflected light 22$b$ of the incident light 22$a$ to be reflected in the direction of the incident light 22$a$ as much as possible.

As shown in FIG. 128, the configuration similar to that of the illuminating apparatus 345 of the backlight type as shown in FIG. 44 is used. The transparent block 343 is optically coupled to the display panel 863 by the optical coupling layer 73 in order to utilize the phenomenon such that incident angle $θ_3$ of the incident light 22$a$ becomes an incident angle $θ_4$ by the Snell's law and the incident angle $θ_4$ is decreased. There is also an effect on reducing a loss at the interface. The reason why the incident angle $θ_4$ is decreased is because the refractive index (n) of each of the counter electrode 122 and the transparent block 343 of the display panel is as large as 1.5 (the refractive index of air is 1.0).

When the incident angle 04 is decreased, even if the tilt angle of the mirror 342$b$ is small, the angle of outgoing light 22$b$ can be widened. That is, a small tilt angle of the mirror 342$a$ with respect to the incident light 22$a$ is sufficient and the angle of the reflected light 22$b$ can be largely changed.

In the configuration of FIG. 128, the incident light 22$a$ is reflected by the mirror 342$b$ as reflected light 22$b$ in the direction of the incident light. Consequently, the reflected light 22$c$ in the NB mode does not reach the eye 21 of the observer. The viewing angle at which an image can be observed preferably in the NW mode is widened.

It is sufficient to use the configuration as shown in FIG. 129 so that the observer can freely adjust the direction of the reflected light. By moving the concave mirror 342 in the direction B, the reflected light 22$b$ can be obtained. By moving the concave mirror 342 in the direction A, the reflected light 22$a$ can be obtained. The observer adjusts the angle of the mirror 342 to the position in which the display image can be observed most preferably while watching the display image on the display panel 863. The reflection surface 342 may be either two-dimensional or three-dimensional.

FIG. 130 shows the configuration of using micromirrors each of which is obtained by reducing the size of the mirror 342 in FIGS. 128 and 129. The mirrors 342 are formed on the mirror substrate 1301. Hereinlater, the mirror is called a micromirror 342.

The micromirrors 342 are obtained by forming recesses by pressing the mirror substrate 1301 and vapor depositing aluminum (Al) or silver (Ag) on the recesses. The micromirror 342 is formed in a concave shape or flat shape. The mirror substrate 342 is optically coupled to the array substrate 121 by the optical coupling agent 73$b$. The pixel electrode 126 is a transparent electrode made of ITO. The optical coupling is performed for the reason which has been described with reference to FIGS. 128 and 129.

When the pixel electrode 126 is a reflecting electrode, the incident light 22$a$ is reflected by the reflecting electrode 126 and becomes reflected light 22$c$ which is incident on the observer's eye 21. Consequently, the image is displayed in the reverse video.

In the case where the pixel electrode 126 is a transparent electrode and has micromirrors 342, the incident light 22$a$ is reflected by the micromirrors 342 and becomes reflected light 22b. The light does not therefore reach the eye 21 of the observer. That is, the image is not displayed in the reverse video. The micromirrors 342 can convert the incident light 22a to almost parallel light.

The micromirrors 342 may be convex microlenses as shown in FIG. 131. For example, the microlenses are formed by a stamper technique (73b are replaced by microlenses in FIG. 131(a)) and the reflecting film 342 is formed on the surface of the microlenses.

Figure 131A:
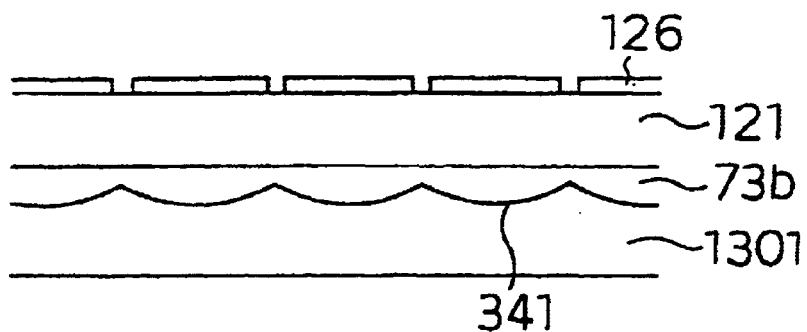
Figure 131B:
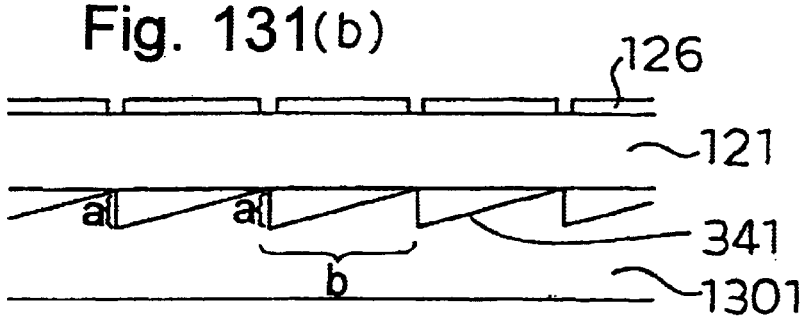
Figure 131C:
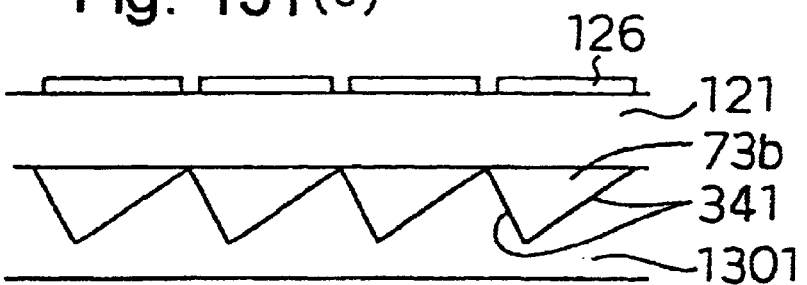
Figure 131D:
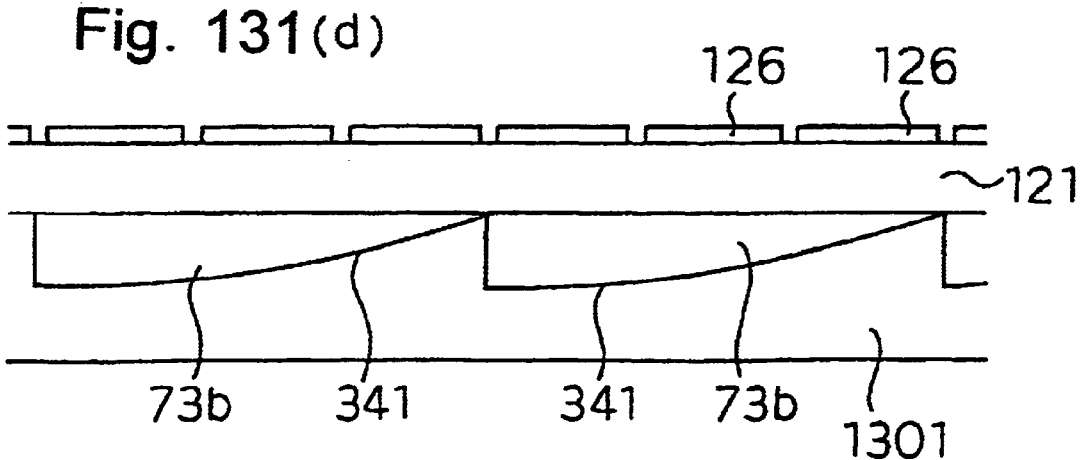

As shown in FIGS. 131B and 131C, a sawtooth shape may be also used. As shown in FIG. 131(d), one micromirror 342 can be formed or disposed every plurality of areas or every predetermined divided area. The mirror substrate 1301 and the like may be optically coupled (or disposed) to the counter substrate 122 side as shown in FIG. 132. Although not shown, the array substrate 121 or the counter substrate 122 may be used as a mirror substrate 1301.

The micromirrors 342 may be aligned in the same direction as shown in FIG. 133 or aligned to the light source 15 side as illustrated in FIG. 134. In the case of FIG. 133, the light 22a incident on the micromirror 342b is reflected to the light source 15 side (reflected light 22c). The light 22b incident on the micromirror 342a becomes the reflected light 22d and does not return to the light source 15. It is therefore characterized in that, although the display brightness slightly deteriorates, formation (production) of the mirror substrate 1301 is easy.

On the other hand, FIG. 134 is an advantage such that, since both of the incident light 22a and 22b becomes reflected light 22c and 22d and is returned to the light source 15, halation is suppressed and the display contrast is improved.

The mirror substrate 1301 and the display panel 863 are adhered to each other by applying the method of FIG. 16. The mirror substrate 1301 is formed on the base 163, the optical coupling material 73 is applied on the surface of the display panel 863, and the display panel 863 and the mirror substrate 1301 are pressed via the optical coupling material 73 to thereby uniform the thickness of the optical coupling material 73.

The position of the mirror substrate 1301 is adjusted, in a manner similar to the adhesion of the color filter substrate 123 shown in FIG. 16, by irradiating the display panel with light 22 from the light source 15. The position between the display panel 863 and the mirror substrate 1301 is adjusted relatively while measuring the chromaticity by the color meter 161. Since the other matters, contents, and method are similar to those of FIG. 16, their description is omitted here.

The shape of the mirror 341 is not limited to the rectangular shape but a stripe shape, circular shape, a triangle shape, or the like may be also used. Further, a hemispherical shape, spherical shape, conical shape, pyramid shape, column shape, or prism shape on which the reflecting film of the microlens is deposited may be also used.

Although the mirror substrate 1301 is used in the configuration of FIG. 130, the invention is not limited to the mirror substrate 1301. For example, as shown in FIG. 150(a), the mirror substrate 1301 may be used as a counter substrate. The recesses are formed on the mirror substrate 1301 by cutting and pressing a glass substrate or resin substrate. The stamper technique may be also used to form the recesses. On the rough surface, an insulating film made of SiNx, SiOx, or the like is formed in order to prevent metal ions and the like from coming out from the substrate. On the insulating film, the mirror 341 made by the metal thin film or the dielectric mirror made by the dielectric multilayer film is formed.

Liquid crystals (PD liquid crystals) are sandwiched between the mirror substrate 1301 formed as mentioned above and the pixel electrode. In the configuration of FIG. 150(a), in the liquid crystal layer 127, the thickness of the part (a) and that of (b) are different from each other. In the case of the PD liquid crystals, unlike the TN liquid crystals, light modulation is not performed by using the phase difference (polarization). Even when the thickness of the liquid crystal layer 127 varies, there is no problem. The liquid crystal layer 127 enters a transmitting state in the part (a) with a relatively low voltage and enters a transparent state in the part (b) with a relatively high voltage. The configuration in which the light transmitting state varies in the liquid crystal layer 127 is preferable in order to widen the viewing angle of the display panel (the reverse video does not easily occur according to the direction of viewing the display screen).

In order to uniformly apply the electric field to the liquid crystal layer 127, it is sufficient to form both of the counter electrode 125 (341) and the pixel electrode 126 so as to have a saw-toothed shape and to be parallel to each other. As shown in FIG. 151, for example, a configuration in which the micromirrors 341 are used as the reflecting electrodes is shown. The micromirrors 341 are formed as follows.

A TFT 201 or the like is formed on the array substrate 121 and the recesses are formed on the TFT 201 by using the stamper technique. The part formed by the stamper becomes an insulating film 1511 for insulating the TFT 201 and the micromirror 341. A metal thin film is formed on the rough part and is etched, thereby obtaining the pixel electrode. Alternately, a dielectric mirror is formed on the pixel electrode obtained by etching the conductive electrode made of ITO, a metal, or the like. The pixel electrode and the drain terminal of the TFT 201 can be easily connected to each other in lower parts of the recesses and projections.

The micromirror 341 can have other shapes. For example, a roof shape as shown in FIG. 152(a), a circular shape such as a concave face as shown in FIG. 152(b), a triangle cone shape, a circular cone shape, and the like can be also used. Those shapes can be easily formed by using the stamper technique.

Although it has been described that light is reflected by the micromirror 341 to the light source 15 side, the direction is not limited to the above direction. The light may be reflected in the opposite direction since the purpose can be achieved by reflecting light to a direction which is not the direction of the eye of the observer. Ditto for FIG. 134 and the like.

The configuration of FIG. 151 has a problem such that the electric field is not easily applied to the part A in FIG. 151 and, even when a voltage is applied to the reflecting electrode 341 (181), the (PD) liquid crystal layer 127 remains whitish. The light reflectance therefore deteriorates.

Figure 19:
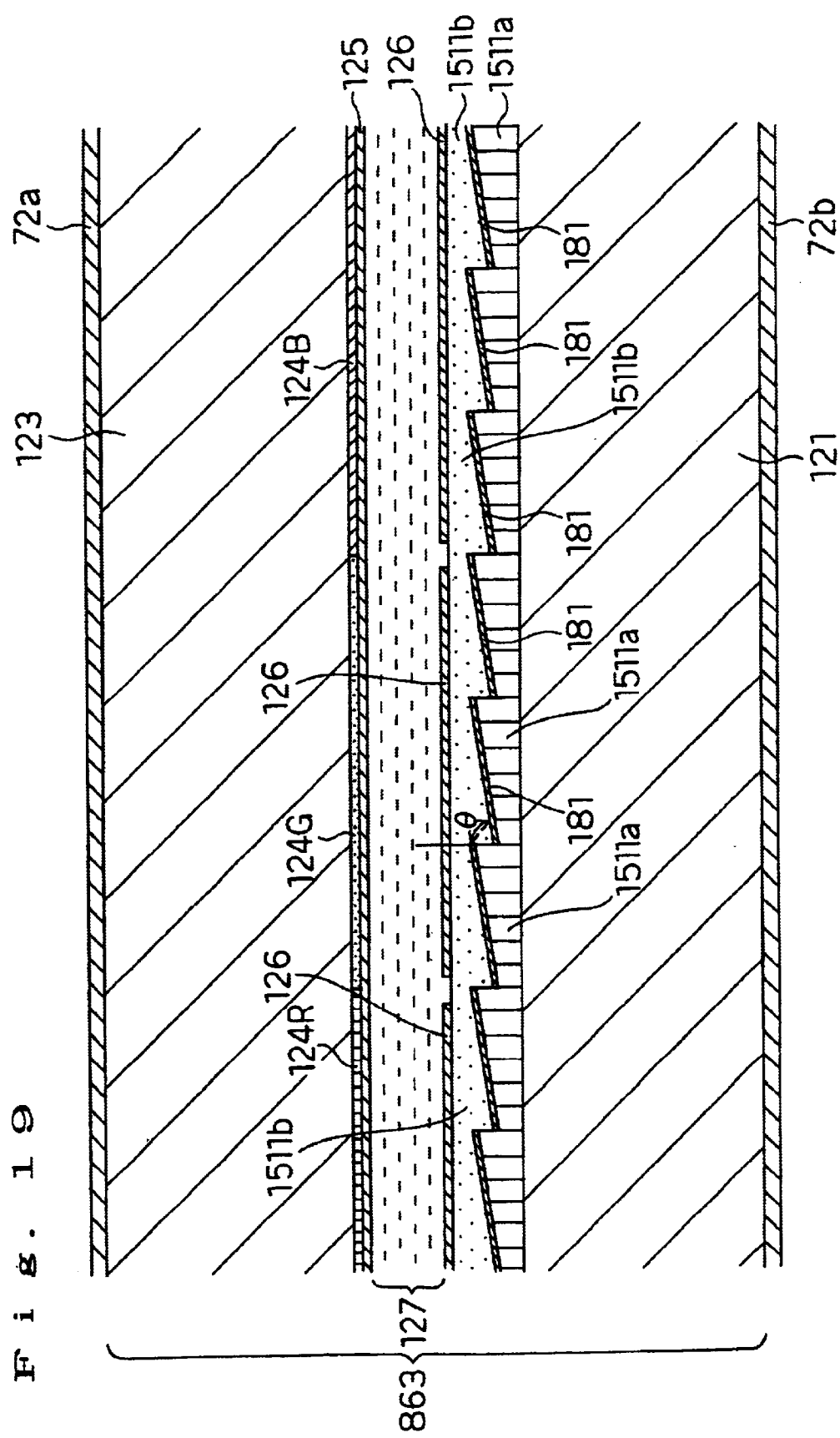
FIG. 19 is a diagram for explaining the display panel of the invention.

The configuration of FIG. 19 is used to solve the problem A planarized film 1511b made of transparent material such as acrylic resin is formed on a reflecting film 181 and the transparent pixel electrode 126 made of ITO is formed on the planarized film 1511b. One transparent pixel electrode 126 may be disposed for a plurality of reflecting films 181 or a projected part of one reflecting film 181.

By the formation as shown in FIG. 19, no part to which the voltage is not easily applied as shown by A in FIG. 151 exists, so that preferable light modulation can be carried out. Since the planarized film 1511b is formed, the pixel electrode 126 is planarized and no gap variation occurs in the liquid crystal layer 127.

As shown in FIG. 151, it is preferable that the angle θ (deg.) formed by the normal lines of the reflecting film 181 and the substrate 121 satisfies the condition of 60≦θ≦85. More preferably, θ (deg.) satisfies the condition of 70≦θ≦85.

The configuration shown in FIG. 20 can be used for the arrangement of the reflecting film 181 and the pixel electrode 126. As illustrated in FIG. 20, by forming an opening 1362 in a part of the reflecting film 181, a semi-permeable display panel can be easily obtained. The semi-permeable display panel and the like will be described hereinlater with reference to FIG. 156 and the like.

Figure 20A:
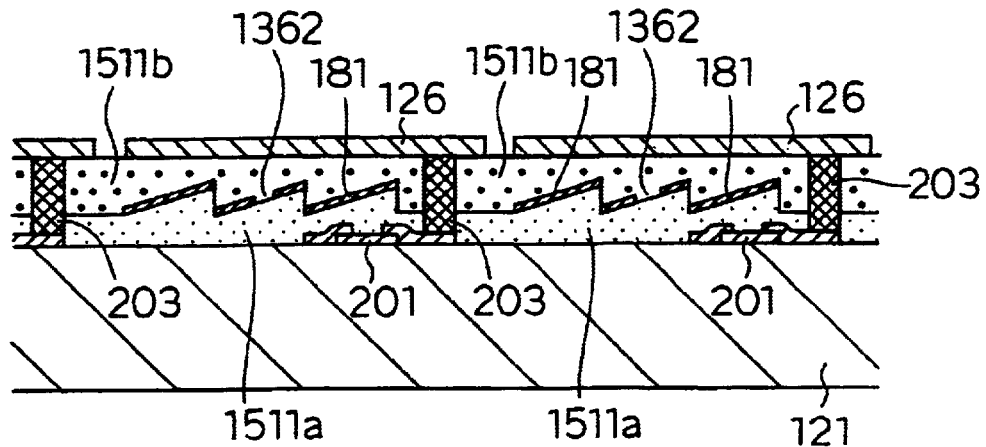
FIGS. 20A to 20C are diagrams for explaining the display panel of the invention.

FIG. 20(a) shows a configuration in which the drain terminal of the TFT as a switching element 201 and the pixel electrode 126 are connected to each other directly via a connecting part 203. The reflecting film 181 is not connected to any electrodes and is in a floating state.

Figure 20B:
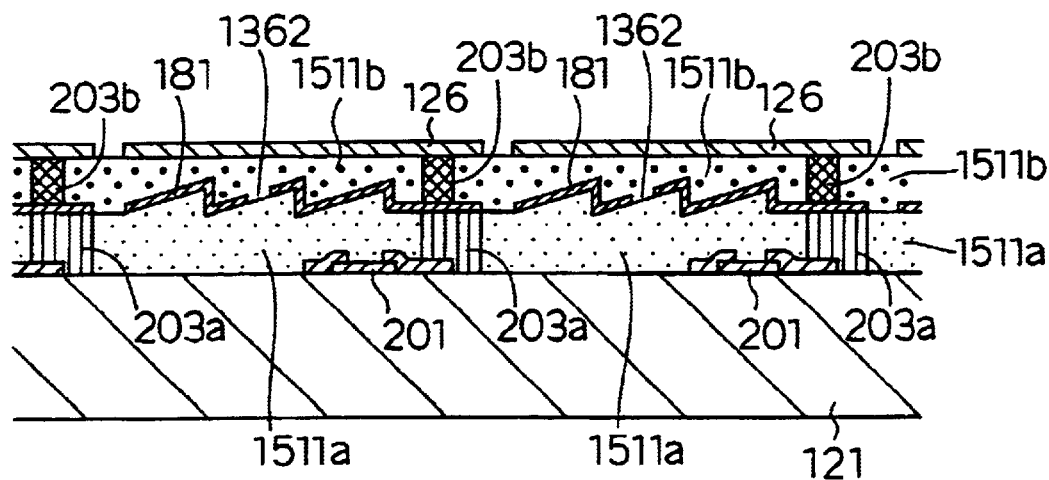

FIG. 20(b) shows a configuration in which the drain terminal of the TFT and the reflecting film 181 are connected via a connecting part 203a and, further, the reflecting film 181 and the pixel electrode 126 are connected via a connecting part 203b. When the reflecting film 181 is made of Al, however, since ITO cell-reacts with Al, they are electrically connected via conductive material such as Cr, Ti, or carbon.

Figure 20C:
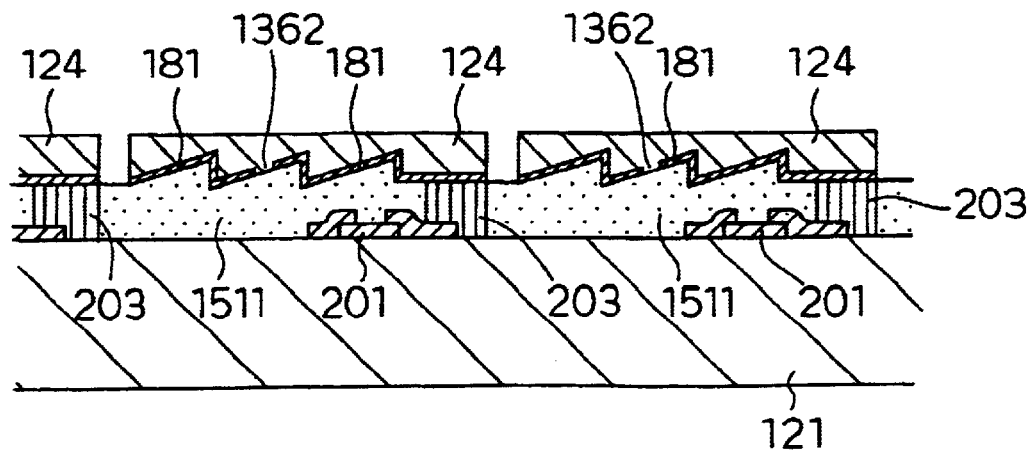

FIG. 20(c) shows a modification in which the transparent material 124 made of ITO or the like is directly stacked on the reflecting film 181 and the surface of the reflecting film 181 is planarized by the transparent material 124. A color filter may be used as the transparent material 124.

Although it has been described that the reflecting film 181 is made of the conductive material, the invention is not limited to the film. For example, a dielectric mirror made by a dielectric multilayer film may be used.

In the case of using the display panel 863 as a reflecting and transmitting panel, it is constructed as shown in FIG. 136. This is called a semi-permeable specification. According to the semi-permeable specification, outside light is used and a reflecting type display panel is used to display an image. When there is no outside light, the display panel is used in a transmitting state by using a backlight or the like. The outside light denotes light except for the backlight. In this case, illumination light from the light source 15 as shown in FIG. 94 is also included in the outside light.

The display panel 863 shown in FIG. 136 is of the transmitting type. On the microlens substrate 132, the microlenses 134 are formed by the stamper technique. The microlens 134 does not always have to correspond to the pixel 126 in a one-to-one manner. The microlens 134 can also correspond to a plurality of pixels.

The microlens 134 to which the principle of diffraction is applied may be also used. A prism sheet may be also used. That is, in a broad sense, photorefractive means is used. The microlens 134 may be formed by an ion exchange technique or an etching technique. It is also possible to make light from the backlight or the like transmit and enter the liquid crystal layer 127 without using the microlens 134 or the like.

In an almost focal point position of the microlens 134, an opening 1362b opened in the reflecting film 341b made of aluminium (Al) is formed or disposed. A similar opening 1362a formed or disposed in a reflecting film 341a is disposed on the outgoing face of the lens 134.

The opening 1362 denotes the light transmitting part. A reflecting electrode may not be completely formed or a transparent electrode may cover the opening.

Light enters the light guide plate 481 by an edge light, is irregularly reflected between the reflecting films 341b and 341c, and transmitted to the light guide plate 481. The light goes out from the opening 1352b and enters the lens substrate 132.

The display panel 863, aperture mirror substrate 1361, microlens 134, and light guide plate 481 can be optically coupled by the optical coupling material 73 (not shown).

In the surface of each of the mirrors 341a and 341b, as shown in FIG. 137, the openings 1362 are formed in correspondence with the lenses 134. That is, the hatched part of FIG. 137 corresponds to a part in which the mirror 341 is formed. As the mirror 341, a metal mirror, dielectric mirror, or half mirror may be used. That is, any device having a predetermined reflecting function may be used. For example, a prism sheet or a quadrangular pyramid prism of a total reflection type (sold by Koyo Corporation) may be used. In some cases, a light diffuser can be used. In this case, a light diffusing part is set as 341.

It is preferable to form a dielectric film on the surface of the reflecting film 341 to thereby obtain an enhanced reflecting film. The lens substrate 134 and the aperture mirror substrate 1361 can be integrated or the mirror 341a may be formed directly on the lens substrate 132. The lens substrate 132 can be used as a light guide plate. The microlenses 134 may be colored in three primary colors of R, G, and B (or cyan, magenta, and yellow). In this case, no color filter 124 is needed.

FIG. 138 is a diagram for explaining the operation. First, the case where a transmitting type panel (there is no outside light and a backlight is used) is employed as the display panel 863 will be described. In the case of using the transmitting type panel, a backlight (edge light) is turned on. Light from the backlight passes through the light guide plate 481 (refer to FIG. 136) and a part of the light goes out from the opening (aperture) 1362b of the reflecting film 341b. The light 22a passed through the opening 1362b is condensed by the lens 134, passes through the opening 1362a of the reflecting film 341a, and illuminates the display panel 863. That is, the display panel is illuminated by the backlight.

The case of using the reflecting type panel as the display panel 863 (the case where no backlight is used but outside light is used) will now be described. In the case of using the reflecting type panel, the outside light 22b transmitting through the display panel 863, is reflected by the reflecting film 341a and illuminates the display panel 863. Especially, when the liquid crystal layer 127 is made of polymer dispersed liquid crystals, both of the backward scattering and forward scattering can be used and no polarizer is used for light modulation. Consequently, it is preferable since both of the high brightness and high contrast display can be realized.

As illustrated in FIG. 137, since the surface is the reflecting film 341, most light can be used as the reflected light 22b and the light from the backlight is condensed by the lens 134 and efficiently supplied from the opening 1362. Preferable semi-permeable specification can be thus realized.

Although the light is condensed by the lens 134 and passed through the opening 1362a in FIG. 138, the invention is not limited to the arrangement. As illustrated in FIG. 139, light going out from the lens 134 can become parallel light (which is not brought to a focus) or a diffused light flux. In this case as well, as shown in FIG. 140, a sufficient mirror 341a forming area can be assured between the lenses 134 and the reflected light 22b can be assured by the mirror 341a.

Without forming the light guide plate 481 and the mirror 341b, as shown in FIG. 141, the point light source 15 such as a white LED may be disposed or formed near the focal point of the lens 134 since light emitted from the light source 15 is efficiently condensed by the lens 134. The light source 15 is disposed every lens 134 or every plurality of lenses.

In order to realize the semi-permeable specification, the mirror substrate 1301 as shown in FIGS. 131B and 142 can be used.

That is, as shown in FIG. 142, the outside light 22a is reflected by the part (b) of the mirror 341 and illuminates the display panel 863. On the other hand, light from the self light emitting source such as the light guide plate 481 goes out from the part (a) between the two mirrors 341 and illuminates the display panel 863. Since the mirror 341 faces to the outside light incident direction, the incident light 22a can be therefore efficiently reflected.

The part (a) is a part which is a shadow of the mirror 341. By utilizing the shadow part, light from the backlight 481 is allowed to emit to illuminate the display panel. The above configuration can be replaced by a configuration as shown in FIG. 131(b).

Figure 144:
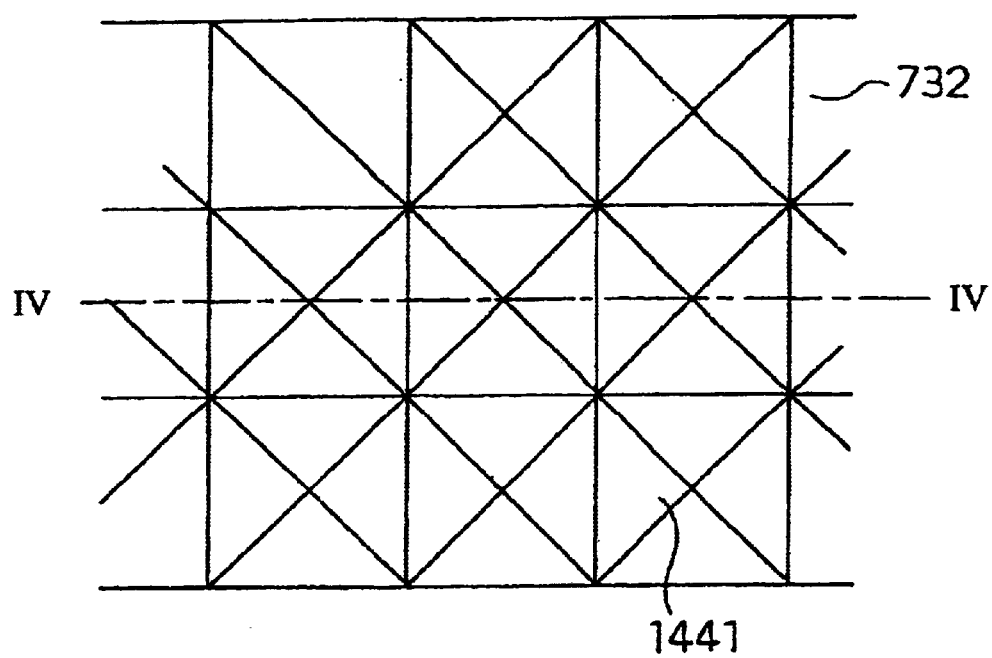
Figure 144:
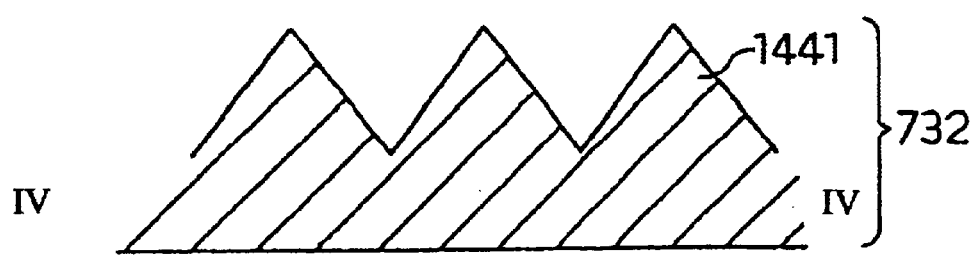

As illustrated in FIGS. 143 and 144, the prism plate 732 in which microprisms 1441 are formed or disposed may be used. The prism plate 732 has a quadrangular pyramid shape as shown in the cross section of FIG. 144B. A polygonal pyramid shape, cone shape, trigonal pyramid shape, roof shape, or saw-tooth shape can be also used. FIG. 144B is a cross section taken along line IV—IV of FIG. 144A.

As shown in FIG. 143, the convex face of the quadrangular pyramid prism (hereinbelow, called a microprism) is oriented toward the plane light source such as the light guide plate 481. The plane part is oriented toward the display panel 863 side. In order to prevent a loss at the interface or the like, the display panel is optically coupled to the plane part of the prism plate 732 by the optical coupling material 73.

As shown in FIG. 145, the outside light 22a is total reflected by the interface with the air of the microprism 1441 and becomes reflected light 22c. The angle θa of the vertex of the microprism 1441 is set to be equal to or smaller than 100 degrees and equal to or larger than 50 degrees. When it is smaller than 45 degrees, the microprism 1441 becomes a needle state. The process is difficult and the prism plate 732 becomes too thick. On the other hand, when the angle exceeds 100 degrees, the reflectance largely deteriorates.

As obviously understood from the explanatory diagram of FIG. 145, although the prism plate 732 is transparent, the outside light 22a is efficiently reflected by the microprism 1441. On the other hand, illumination light from the light guide plate 481 and the like transmits the prism plate 732 and can illuminate the display panel 863. The principle effectively utilizes the principle of light total reflection. In the case where light goes out from a substance having high refractive index (in this case, the refractive index of the prism plate 732 is about 1.5) to a substance having low refractive index (in this case, the refractive index of the air is 1.0), light is total reflected when θb is larger than 40 to 45 degrees. On the contrary, light easily comes from a substance having low refractive index.

The microprism 1441 may have a conical shape as shown in FIG. 146. FIG. 146(b) is a cross section taken along V—V of FIG. 146(a). FIG. 146(c) is a cross section taken along VI—VI of FIG. 146(a).

In the embodiment of FIG. 146, as shown in FIG. 146(c), since the reflecting film 551 is formed, the outside light 22a is efficiently reflected by the conical prism 1441. A part of the outside light is reflected by the reflecting film 551 and illuminates the display panel 863. Even in the case of the pyramid prism of FIG. 144, by forming the reflecting film 551 in the area which does not efficiently reflect light by the microprism 1441, the reflectance of the prism plate can be improved.

As another configuration, as shown in FIG. 147, it is effective to use a condenser plate 1471 in which conical or pyramid-shaped holes are formed in a matrix. In the condenser plate 1471, holes each having a larger diameter on the light guide plate 481 side and a smaller diameter on the display panel 863 side are opened. The reflecting film 551b is formed or disposed in the hole. Besides, a configuration or shape such that the hole is filled with a transparent resin can be also used. For example, a configuration similar to that of the condenser funnel 552 in FIG. 55. The reflecting film 551a is formed or disposed on the surface of the condenser plate 1471. The reflecting film 551a and the display panel 863 are optically coupled to each other.

FIG. 148 is a diagram for explaining the operation of the configuration of FIG. 147. The outside light 22a is reflected by the reflecting film 551a and becomes the reflected light 22c to illuminate the display panel 863. On the other hand, light from the light guide plate 481 is condensed by the mirror 551b in the hole and the condensed light illuminates the display panel 863.

The microprisms 1441 of the prism plate 732 may be in a linear state (stripe state). The shape of the opening of the condenser plate 1471 in FIG. 147 may be also a stripe shape, cylindrical lens shape, or Fresnel lens shape. In many cases, although the reflecting or condensing efficiency deteriorates, there is no problem in practice. There is an advantage such that occurrence of moire with the pixels of the display panel 863 is reduced. The shape of the condenser funnel 552 of FIG. 55 or the like may be of a strip shape.

Although the aperture mirror substrate 1361 is used in FIG. 136, by forming the opening 1362a in the reflecting electrode 126 as shown in FIG. 153, the aperture mirror substrate 1361 can be omitted.

As illustrated in FIG. 153, the incident light from the opening 1362b is condensed by the microlens 134 and goes out from the hole of the reflecting electrode 1362a (when the backlight is used). When the liquid crystal layer 127 is made of PD liquid crystals, incident light is scattered. Consequently, the light passes through the liquid crystal layer 127. Even when the opening 1362a is small, the whole liquid crystal layer 127 can be illuminated.

When the liquid crystal display panel 863 is used in the reflecting mode, the incident light is reflected by the reflecting electrode 126 and the reflected light goes out.

Similarly, also in the case of FIG. 147, as shown in the perspective view and cross section of FIG. 154, it is sufficient to use the condenser plate 1471 as an array substrate and form the TFT 201 (not shown) and the reflecting electrode 126 on the condenser plate 1471. In the case of using the condenser plate 1471 as an array substrate, an opening surrounded by a reflecting film 551b is filled with a resin 1541 or the like.

The configuration and method of forming the opening 1362 in the reflecting electrode 126 and using the display panel 863 as a semi-permeable panel can be realized by a configuration which does not use the condenser plate 1471 or the like.

For example, the configuration of FIG. 155 is shown. Light from the backlight 481 illuminates the PD liquid crystal layer 127 through the hole of the reflecting electrode 126. The reflecting electrode 126 reflects the outside light. The area Z of the opening 1362 to the area S of the reflecting electrode is set as ($\frac{1}{3}$)Z≦S≦Z. As examples, shapes of the opening 1362 are shown in FIGS. 156(a) to 156(f). In each of the diagrams, the hatched part denotes the position in which the hole 1362 is formed or disposed. Especially, when the liquid crystal layer 127 is made of PD liquid crystals, even if there is an opening 1362, alignment is not disturbed, so that no problem arises.

Figure 156A:
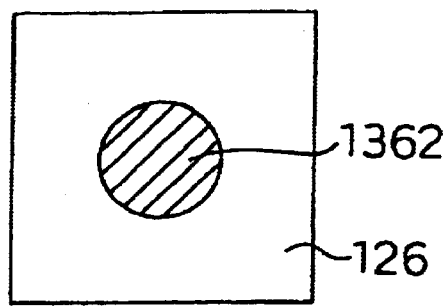
Figure 156D:
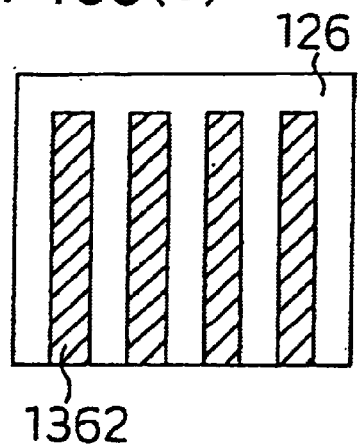
Figure 156B:
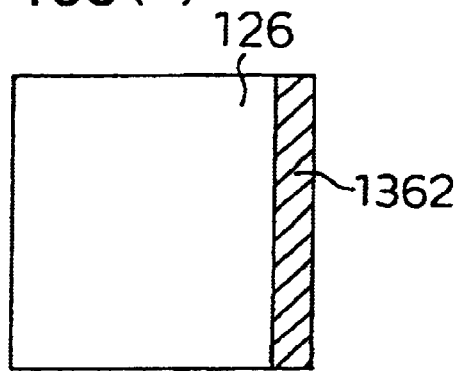
Figure 156E:
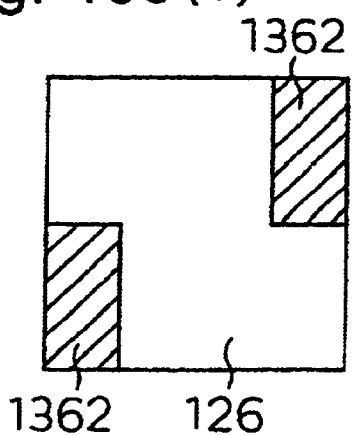
Figure 156C:
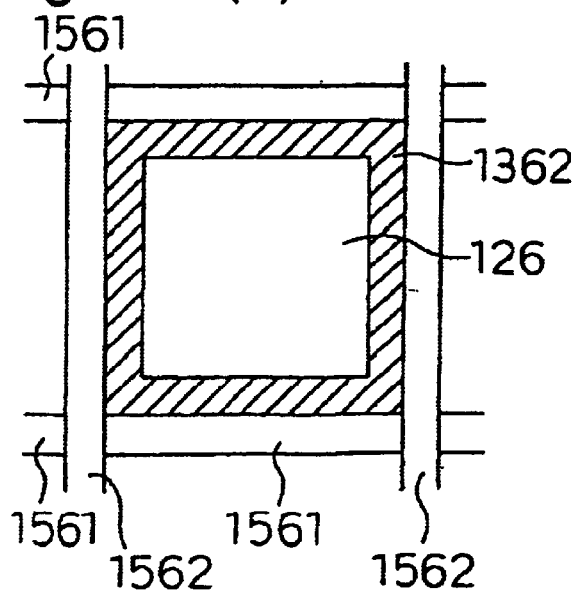
Figure 156F:
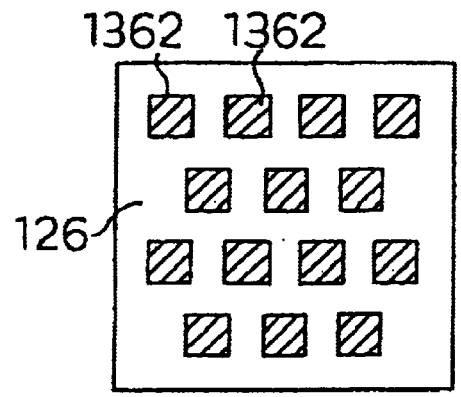

As examples, there are the shape in which the opening is formed in the center part of the reflecting electrode 126 as shown in FIG. 156(a), the shape in which the opening is disposed at one end of the reflecting electrode 126 as shown in FIG. 156(b), the configuration in which light from the backlight 481 passes through a hole (gap) between a gate signal line 1561 and a source signal line 1562 and the reflecting electrode 126 as shown in FIG. 156(c), the configuration in which the opening 1362 is formed in a comb or stripe shape as shown in FIG. 156(d), the configuration in which a plurality of openings 1362 are formed in the reflecting electrode 126 as shown in FIG. 156(e), and the configuration in which the openings 1362 are formed in dots as illustrated in FIG. 156(f). Microlenses, cylindrical lenses, or the like may be also formed or disposed in the parts of the openings 1362.

Among the above shapes and configurations, the configuration having the part in which the reflecting electrode 126 is formed and the part in which the reflecting electrode 126 is not formed as shown in each of FIGS. 156A, 156D, and 156F is preferable for the following reason which will be described with reference to FIG. 157.

As illustrated in FIG. 157, when the reflecting electrodes 126 are discretely formed, a line 1572a of electric force occurs between the reflecting electrodes 126. A line 1572b of electric force occurs between the reflecting electrode 126 and the counter electrode 125. Liquid crystal molecules 1571 are aligned along the lines 1572 of electric force. Then, when the liquid crystal layer 127 is made of PD liquid crystals, the liquid crystals are strongly scattered in the part A and the part B becomes more transparent. In the parts A and B, therefore, transparent and opaque parts are created. The viewing angle of the display panel is accordingly widened. The scattering characteristic is improved by the diffracting action. Also in the reflecting mode, an effect such that the luminance unevenness of the illumination light is eliminated is produced.

It is also possible to form very small projections and recesses in the reflecting electrodes 126 of the display panel of the invention. By forming the projections and recesses, the viewing angle is widened. In the case of the TN liquid crystal display panel, the height between the projection and recess is set within a range from 0.3 $\mu$m to 1.5 $\mu$m. When the height is out of the range, the polarizing characteristic deteriorates. The shape of the projection and recess may be formed smoothly. For example, a circular shape or a sine curve shape is used.

The small projection and recess will be formed by the following method. A small projection is formed by a metal thin film or insulating film in an area which will become a pixel. By etching the film, a small recess is formed. A metal thin film which will become a reflecting electrode is vapor deposited on the recess or projection, thereby obtaining the reflecting electrode. Alternately, one or a plurality of insulating films are formed on the projection and recess and then the reflecting electrode is formed. By forming the metal thin film on the projection or recess as mentioned above, the step between the projection or recess becomes moderately inclined, so that the projection and recess which smoothly change can be formed.

Even when the pixel electrode 126 is of the transmission type, it is effective to form a step by stacking ITO films since the incident light is diffracted by the step and the display contrast or viewing angle is improved.

In the configuration of forming the opening 1362 in the reflecting electrode 126, the opening 1362 does not mean only the perfect hole but a hole of light having a light transmitting property. The hole of light denotes a hole having the light transmitting property. For example, it is a hole opened in ITO having the light transmitting property. A metal thin film is formed on the ITO electrode and etched, thereby forming an opening 1362. From the opening 1362 of the ITO electrode, light from the backlight goes cut. The metal thin film reflects the outside light. The ITO and metal thin film optically modulates the liquid crystal layer 127 by a voltage applied.

The metal thin film has a three-layered structure of titanium, chrome, and aluminium in accordance with the order from the ITO side. When the ITO electrode is in direct contact with aluminium, a battery is formed and electric corrosion occurs. Aluminium is applied on the surface which is in contact with the liquid crystal layer 127 in order to increase the reflectance. That is, in order to prevent direct contact between ITO and aluminium, another metal or substance is disposed or formed between the aluminium on the surface and ITO, or the reflecting electrode is formed by two or more conductive thin films. On the surface of aluminium, an inorganic insulating thin film made of SiNx, SiO$_2$, or the like, alignment film, polyimide film, or PVA (polyvinyl alcohol) film is formed.

An insulating film is formed on the aluminum thin film and an ITO thin film may be formed on the insulating film. The films may be formed or disposed in the opposite order. The ITO electrode and reflecting electrode may be used as capacitor electrodes, thereby enabling a storage capacitance of pixels to be constructed. A dielectric mirror can be used as the reflecting electrode.

In the configuration of FIG. 156, it is sufficient to regard the hatched part as an 110 thin film forming area. Since a pixel is formed by stacking the transparent electrode and the reflecting electrode, the reflecting area and the light transmitting area can be completely discretely formed. For example, the reflecting area of the pixel may be formed concentrically or in stripes.

By forming the area in the shape of small stripes (refer to FIG. 156(d)) or dots (refer to FIG. 156(f)), the diffracting effect can be produced, the incident light can be scattered better, and the display contrast can be improved.

In the embodiments, a part of the reflecting electrode 126 is formed to have the light transmitting property. The technical idea is that the pixel electrode 126 has both of the light transmitting property and the light reflecting property. A half mirror may be therefore used as the reflecting electrode 126.

For example, the reflecting electrode 126 is formed by a thin metal film. The thin metal film is made of, for instance, Al, Ag, or Cr. Among them, Al is preferable since it has excellent reflectance, transmittance, and conductivity. Obviously, the thin metal film and the transparent electrode having the light transmitting property may be stacked. In a part of the transparent electrode, the thin metal film may be formed in dots, stripes, or concentrically. An organic thin film or inorganic thin film is formed on the metal thin film, thereby preventing the thin metal film from being oxidized.

When Al is used as material of the pixel electrode, the film thickness is set in a range from 300 angstrom to 1500 angstrom. When the film thickness is equal to or smaller than 300 angstrom, a value of resistance of the pixel electrode is too high and it is difficult to connect the pixel electrode and the drain terminal of the TFT 201. When the film thickness is equal to or larger than 1500 angstrom, the transmittance of the pixel electrode is too low. More preferably, the film thickness is within a range from 500 angstrom to 1000 angstrom. Such a pixel electrode will be called a semi-permeable pixel electrode hereinlater. Since Al has characteristics of high conductance, a low sheet resistance value, relatively thick film thickness though the reflectance is high, and the light transmitting property, it is preferable as the material of the semi-permeable pixel electrode. Obviously, it is also possible to stack an ITO film and a metal thin film having the light transmitting property.

As shown in FIG. 18, when the reflecting film 181 is made by a metal thin film and is used as a common electrode, it is effective since the resistance of the common electrode can be reduced and the potential can be stabilized. The insulating film 1511 made of $SiO_2$, SiNx, or the like is formed on the surface of the reflecting film 181 so as to have the thickness of 0.1 µm to 1 µm. On the insulating film 1511, the pixel electrode 126 made of ITO is formed. The pixel electrode 126 is connected to the drain terminal of the TFT 201 as a switching element.

The reflecting film 181 functions as a common electrode. The reflecting film 181 therefore is electrically connected in the peripheral part of the display panel so as to be the potential of the common electrode. The potential of the common electrode is usually a potential of the counter electrode 125 or an OFF-state voltage of the gate signal line.

The reflecting film 181 is flat except for the opening 1362. That is, it is a flat electrode which is commonly opposite to (faces) the pixel electrodes 126. The reflecting film 181 is not limited to the flat electrode but can be patterned so as to correspond to the pixels except for a part of the connecting part (to make the potential a common electrode potential).

With the configuration, by using the pixel electrode 126 and the reflecting film 181 as an electrode, a storage capacitor 1582 is constructed. Thus, the reflecting film 181 has both of the function of mating the pixel reflective and the function as the storage capacitor (accumulating capacitor).

Figure 18A:
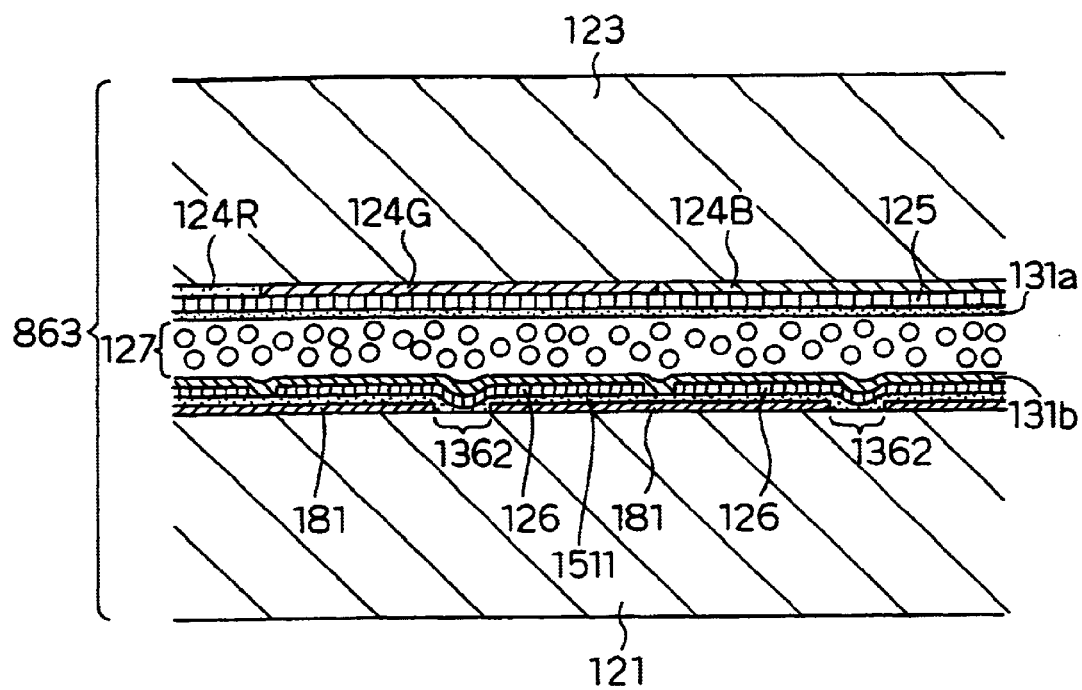
FIGS. 18A and 18B show the display panel of the invention.
Figure 18B:
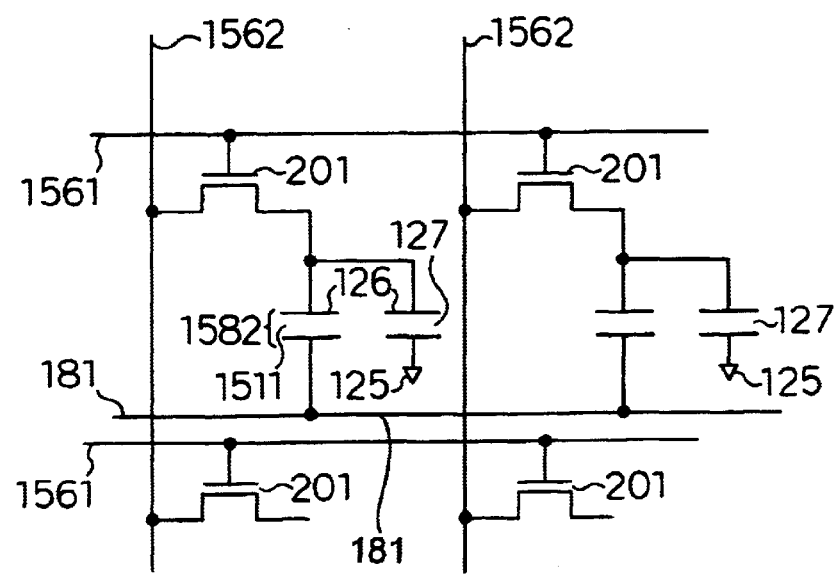

FIG. 18(b) is an equivalent circuit diagram of FIG. 18(a). A capacitor is formed by sandwiching the liquid crystals 127 between the pixel electrode 126 and the counter electrode 125, and the storage capacitor is formed by the pixel electrode 126 and the reflecting film 181.

A part (for example, 50%) of light incident on the semi-permeable pixel electrode 126 is reflected and the other part transmits. This is equivalent to the case where a hole through which light can pass is opened in the reflecting electrode 126. Similarly, it is also possible to form the counter electrode 125 by a light-transmitting metal thin film. In this case, the pixel electrode is made transparent. The semi-permeable pixel electrode 126 will be described as an equivalent of the reflecting electrode having an opening hereinbelow.

The ratio of the light reflected by the pixel electrode 126 to the transmitting light is set in a range from 1:9 to 9:1. Preferably, it is in a range from 3:7 to 7:3.

The active matrix type display panel in which switching devices such as TFTs are disposed or formed as pixels has been mainly described above. The technical idea of the pixel configuration in the semi-permeable specification of the invention can be also applied to a simple matrix type display panel since an intersection point can be regarded as a pixel (electrode) in the simple matrix type. In the case of the TFD as well, it is sufficient to make the pixel electrode in the semi-permeable specification or make a counter scan signal line in the semi-permeable specification.

In the case of the semi-permeable specification, reflected light is incident on a switching element such as the TFI 201 and a photoconductor (optical excitation) phenomenon may occur. In order to prevent it, a light shielding film is formed on the top face or under face of a semiconductor layer of the switching element. Obviously, the light shielding films may be formed on both of the top and under faces. The light shielding film is made of polysilicon, Cr, or the like. The switching device may be molded by using a black resin or the like. Since the MIM or TFD has a structure in which a semiconductor layer is basically sandwiched between metal films, a light shielding film is unnecessary. It is therefore preferable to use the MIM and TFD for a semi-permeable specification display panel.

The configuration of the semi-permeable specification and the configuration of FIGS. 136, 138, 139 or the like may be combined. The light condensed by the microlens 134 is allowed to go out from the light transmitting part such as the pixel electrode. It is accordingly expected that the light utilizing rate is largely improved.

In the display panel of the invention having the reflecting electrode 126, as shown in FIG. 158, it is preferable to form the shielding layer 1581 as a lower layer of the reflecting electrode 126. The shielding layer 1581 is formed by a thin metal film. The shielding layer 1581 shields light entering from the liquid crystal layer 127 to a layer under the reflecting layer 126. By overlapping the shielding layer 1581 and the reflecting electrode 126, the accumulating capacitor (storage capacitor) 1582 is formed. With the configuration, the shielding layer 1581 displays both of the light shielding function and the function of the common electrode.

As illustrated in FIG. 156, the array substrate in which the light transmitting area is formed or disposed in a part of the reflecting electrode 126 can be used as a light guide plate as shown in FIG. 160. The reflecting film 551a is formed in the area from which the light valid for displaying an image on the array substrate 121 does not go out.

As shown in FIG. 160, the fluorescent tube 483 as a light source is disposed or formed on one end or both ends of the array substrate 121 or in the substrate peripheral part. Light from the fluorescent tube 483 is led by the reflecting sheet 341 into the array substrate 121. The led light 22 is irregularly reflected in the array substrate by the reflecting film 551a formed on the surface of the array substrate 121 or disposed near the surface, the reflecting electrode 126 formed on a reflecting sheet 1601, a signal line, and the reflecting film 551b disposed or directly formed on the back face of the array substrate 121. The fluorescent tube 483 which guides the light therefore functions as a light guide plate.

As necessary, a dot-shaped or stripe-shaped light diffusing area 1602 having the light diffusing function is formed or disposed on either the surface of the reflecting sheet 1601 or the back face of the array substrate 121. The light diffusing area 1602 is distributedly formed or disposed so that the whole liquid crystal layer 127 can be uniformly illuminated according to the light distribution in the array substrate 121. The reflecting film 551b and the array substrate 121 are optically coupled by the optical coupling material 73.

As shown by a broken oblique line, a light guiding member 1603 made of transparent material in a circular shape corresponding to the circular shape of the fluorescent tube 483 or a similar shape is adhered to an end of the array substrate 121. By the light guiding member 1603, light from the fluorescent tube 483 can be efficiently guided to the array substrate 121. The thickness of the array substrate is usually 0.7 mm or 1.1 mm and the diameter of the fluorescent tube 481 is about 2 to 3 mm. By using the light guiding member 1603, the light can be efficiently guided to the array substrate 121.

The light irregularly reflected (total reflected) in the array substrate 121 goes out from the opening 1362 in the reflecting electrode 126 and illuminates the liquid crystal layer 127. On the back face of the reflecting electrode 126, a reflecting film having a high reflectance made of aluminium or the like is formed so as to preferably reflect light. When the film is thin, aluminum has a property that the light transmittance increases. Therefore, the film is set to have 0.5 µm thick or more or the light reflecting surface is made of aluminium. Further, a thin metal film made of chrome or the like is formed on the aluminium film, thereby realizing a multilayered structure of thin metal films.

The reflecting electrode 126 may not be formed by the reflecting film. As shown in FIG. 161, the reflecting film 551*c* is formed on the array substrate 121, the insulating film 1511 is formed on the reflecting film 551*c*, and the TFT 201, the reflecting electrode 126, and the like may be formed. In the reflecting film 551*c*, the opening 1362*b* corresponding to the opening 1362*a* in the reflecting electrode 126 is also formed.

Although the array substrate 121 is allowed to function as a light guide plate in the foregoing embodiments, the invention is not limited to the arrangement. The counter substrate 122 may be used as a light guide plate. The counter substrate 122 and the array substrate 121 can be simultaneously illuminated with the fluorescent tube 483. That is, both of the substrates can be used as light guide plates.

A transparent plate or sheet of about 1 mm is adhered to the array substrate so that the array substrate is made thicker and used as a light guide plate. A reflecting film is formed on the back face of a transparent plate. To be specific, (t) in FIG. 160 denotes a transparent substrate, transparent sheet or transparent layer of about 1 mm. That is, the reflecting electrode 126 on the array substrate 121 or the like and the transparent plate (sheet) on which the reflecting film 551*b* is formed function integrally or mutually and as a whole functions as a light guide plate to thereby guide light from the fluorescent tube 483.

More specifically, the configuration as shown in FIG. 162 is employed. The light guiding member 1603 and the light guide plate (light guiding sheet) are formed as one body. The light guiding member 1603 and the light guide plate (light guiding sheet) 481 or the like are adhered, or they are formed or disposed close to each other. The light guide plate 481 and the array substrate 121 or, in some cases, the counter substrate 122 are adhered to each other by the optical coupling material 73. Alternately, the light guide plate 481 and the array substrate 121 and the like are disposed so as to be close to each other. With the configuration, the video display apparatus can be made thinner as compared with the conventional configuration in which the guide light plate 481 is disposed on the back face of the array substrate 121.

As necessary, the light diffusing area 1602 is formed or disposed between the array substrate 121 and the light guide plate 481 or on the back face of the light guide plate 481. The light diffusing area may be also formed by adding a diffusing agent to the optical coupling agent 73 uniformly or distributedly. The reflecting film 551*b* may be also formed in a separate sheet or the like and is disposed on the back face of the light guide plate. A transparent resin may be filled between the fluorescent tube 483 and the reflecting film 341. Another light emitting device such as a white LED may be used as the fluorescent tube 483. A light diffusing sheet may be attached or light diffusing agent may be applied on the back face of the light guide plate or the like. A diffraction sheet may be used as the light guide plate. With such a configuration, the incident light is properly diffused (the direction is bent) and the viewing angle is widened. Both of the array substrate 121 and the light guide plate may be formed by resin sheets and a substrate or the like which is curved may be used.

In the case of applying the optical coupling material 73 in a liquid or gel state on the thin metal film such as the reflecting film, it is preferable to use the alkaline optical coupling material 75 [sic] having PH of 10 to 13. Preferably, PH is set to 10.5 to 12.5. More preferably, it is set in a range from 11 to 12. By setting PH within the range, the thin metal film can be prevented from being oxidized. It is realized by adding sodium hydroxide or sodium carbonate to a liquid or gel.

When the light transmitting part (such as hole, ITO electrode, or the like) is formed at the reflecting electrode 126 in the liquid crystal display panel 863, for example, a configuration of widening the viewing angle without using the backlight is also used. FIG. 163 is a diagram for explaining the configuration. An inclined plate 163 is adhered to or disposed on the array substrate 121 or counter substrate 122 by the optical coupling agent 73. On one face of the inclined plate 1631, the reflecting film 551 is formed. An important point is that the angle formed by the liquid crystal layer 126[sic] and the reflecting film 551 is inclined.

In some cases, however, the films are formed in parallel. Even in the cases, as described above, the viewing angle can be often improved since the transmitted light and reflected light have different scattering states in the liquid crystal layer. As the configurations having the inclination, the display panel is inclined in one direction, the display panel has a roof shape, a circular shape, a sine curve shape, a saw-tooth shape, a shape of a plurality of smooth waves, a shape in which a plurality of circular cones are combined, and a shape in which a plurality of trigonal or polygonal pyramids are combined are used. Among them, an image is most uniformly and naturally displayed by the configuration in which the display panel is inclined in one direction as shown in FIG. 163.

When the PD liquid crystal layer 126[sic] is in the transmitting state, the light 22 is directly incident on the eye 21 of the observer as illustrated in FIG. 163. In this state, the image is displayed in reverse video. Since this deteriorates the image display quality, it is necessary to reduce the light as much as possible.

Figure 164:
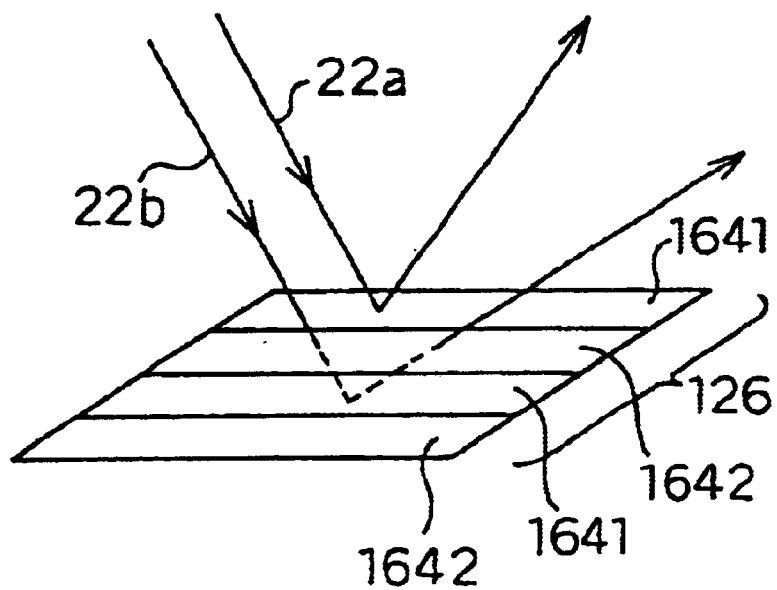
Figure 164:
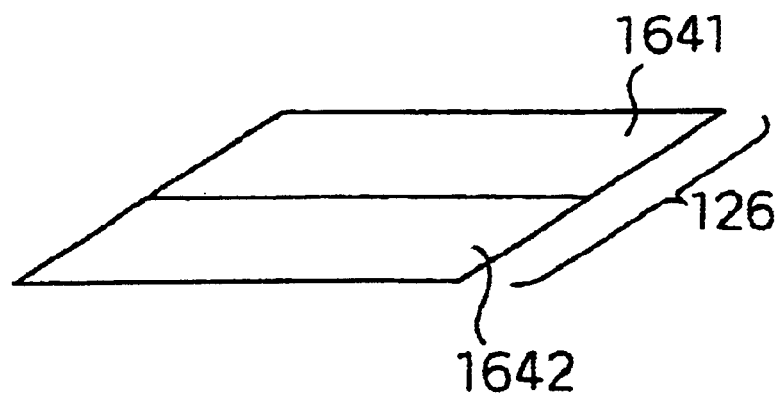

As shown in FIG. 164, in the display panel of the invention, the pixel 126 is formed by reflecting parts 1641 and light transmitting parts 1642 made by thin metal films. The incident light 22*a* is reflected by the reflecting part 1641. The incident light 22*b* passes through the light transmitting part 1642, is reflected by the reflecting face 551, enters again the light transmitting part 1642, and goes out. Since the reflecting face 551 is inclined with respect to the liquid crystal layer 127, the angle of the light is changed and the light emits (refer to FIG. 165). The light incident on the eye 21 of the observer is obtained by synthesizing light coming from two directions. Consequently, the area in which the image is displayed completely in reverse video is narrowed.

As shown in FIG. 164(*a*), it is preferable to form the pixel in a stripe shape in correspondence with the incident light. As shown in FIG. 164(*b*), it is also preferable to divide the pixel 126 into two rectangular shapes. Preferably, the width of the stripe is set equal to or narrower than 6 µm and is equal to or wider than 1 µm to display the diffracting effect.

The mirror substrate 1301 shown in FIG. 130 may be disposed or used as the inclined plate 1631. Such a configuration is shown in FIG. 166. The reflecting part 1641 of the pixel 126 reflects the incident light 22*a* and the light 22*b* which has passed through the light transmitting part 1642 is reflected by a micromirror or the reflecting face 341, and goes out from the pixel 126. The micromirror 341 may be disposed per pixel 126 or a plurality of pixels 126. The micromirror 341 may be also disposed for one of the plurality of pixels 126.

Dielectric mirrors may be used as the micromirror 341, the reflecting film 551, and the like. Fine projections and recesses may be formed or disposed on the surface. The surface can be subjected to the light diffusing process A light diffusing agent such as titanium particles, coloring agent, dye, color, or the like may be added to the transparent plate, inclined plate, optical coupling material 73, and the like. A polarizer (polarizing sheet) or the like may be disposed or formed on the surface.

The color filter 124 may be directly formed on the surface of the pixel electrode 126. A light diffusing resin may be applied or formed on the surface of the pixel electrode 126. By applying the light diffusing resin, the viewing angle or the like is improved. Similarly, it is effective to add the light diffusing agent into the color filter 124 which forms the counter electrode 125. Two layers of the light diffusing layer and the color filter 124 may be constructed or formed. Further, the light diffusing layer may be formed between pixel electrodes since it functions as a black matrix.

In the video display apparatus in the semi-permeable specification, it is effective to vary a voltage applied to the liquid crystal layer 127 between the case where the display panel is used in the reflecting mode and the case where the display panel is used in the transmitting mode (to vary the voltage (V) to drive the liquid crystal layer—liquid crystal layer transmitting (t) characteristic). Since the directionality of the incident light differs and the display state changes between the transmitting mode and the reflecting mode of the liquid crystal display panel.

When the transmitting mode is for use, generally, it is necessary to improve the scattering state of the liquid crystal layer to use mainly the forward scattering. Consequently, a voltage applied to the liquid crystal layer in the maximum white display in the normally white mode is lowered (to a rising voltage or lower). For example, when the rising voltage is 2V, the voltage is set to 1.8V or the like. On the contrary, when the voltage is equal to or higher than the threshold voltage, 2.5V or the like is set, and by using the state where the scattering property of the liquid crystal layer deteriorates slightly as a maximum white display, the V-t characteristic (gamma curve) is set.

Since both of the backward scattering and forward scattering are used in the reflecting mode, the voltage applied to the liquid crystal layer in the maximum white display is set to be higher than that in the transmitting mode (equal to or higher than the threshold voltage of the liquid crystal layer). The switching operation is performed interlockingly with the ON/OFF switch of the power of the backlight 481. According to the kind or mode of the liquid crystal display panel, the application voltage in the maximum white display or maximum black display vanes. The setting in the normally white display and that in the normally black display are opposite (or make them opposite).

In any case, the technical idea disclosed in the specification is to change the V (application voltage)—T (transmittance) characteristic between the transmitting mode in which the display panel in the semi-penneable specification is used in the transmitting state and the reflecting mode in which the display panel is used in the reflecting state.

The V-T characteristic is switched by preparing a ROM for the transmitting state and a ROM for the reflecting state and converting a necessary voltage value by using the ROM tables (the ROM address is switched), thereby enabling the switching to be easily realized. Obviously, the switching of the ROM address may be performed interlockingly with the power ON/OFF switch of the backlight. There is also a case of using the display panel 863 in the reflecting mode while auxiliary turning on the backlight. In this case, another ROM may be prepared (assembled). It is preferable to change the V-T characteristic (gamma curve) in accordance with the intensity of the backlight and the intensity of the outside light.

The gamma curve is easily changed by detecting the intensity of the outside light or the like by a photosensor and processing the detected data by an arithmetic processing means such as a CPU or microcomputer or a ROM table. The configuration or method of changing the gamma curve interlockingly with the brightness volume of the backlight which can be changed by the observer can be also considered.

It is also possible to change the gamma curve by detecting the position of the observer or the position of the eye by a camera or an infrared sensor so as to obtain the optimum contrast and brightness for display. The gamma curve may be also switched (changed) dynamically or statically on the basis of a result of detection of the display state of the monitor display part 801 as shown in FIG. 80.

The configurations can be easily realized by detecting the amount of light entering the display monitor part 801 or the reflected light from the display monitor part by a photosensor. As illustrated in FIG. 122, it is also preferable to change the gamma curve in accordance with the kind of the driving method (1H inversion driving, 1-dot inversion driving, 1-field inversion driving, or the like). It can be easily realized interlockingly with the driving method change-over switch. Naturally, the gamma curve may be changed between the normally white display and the normally black display.

It is effective to display the intensity of the outside light or the like on the display part of the display panel. Whether the backlight should be used or not is determined according to the intensity of the outside light and the result is shown to the observer.

Preferably, when the backlight is on, the on-state is displayed on the display panel or an indicator lamp is turned on (and displayed), so that the observer is aware of it.

By forming a scattering layer in the vicinity of the light modulating layer 127 made of PD liquid crystals or the like, the viewing angle of the display panel can be widened and the display contrast can be made higher. A configuration in which an ordinary scattered layer 1691 is formed is shown in FIG. 169.

Figure 169:
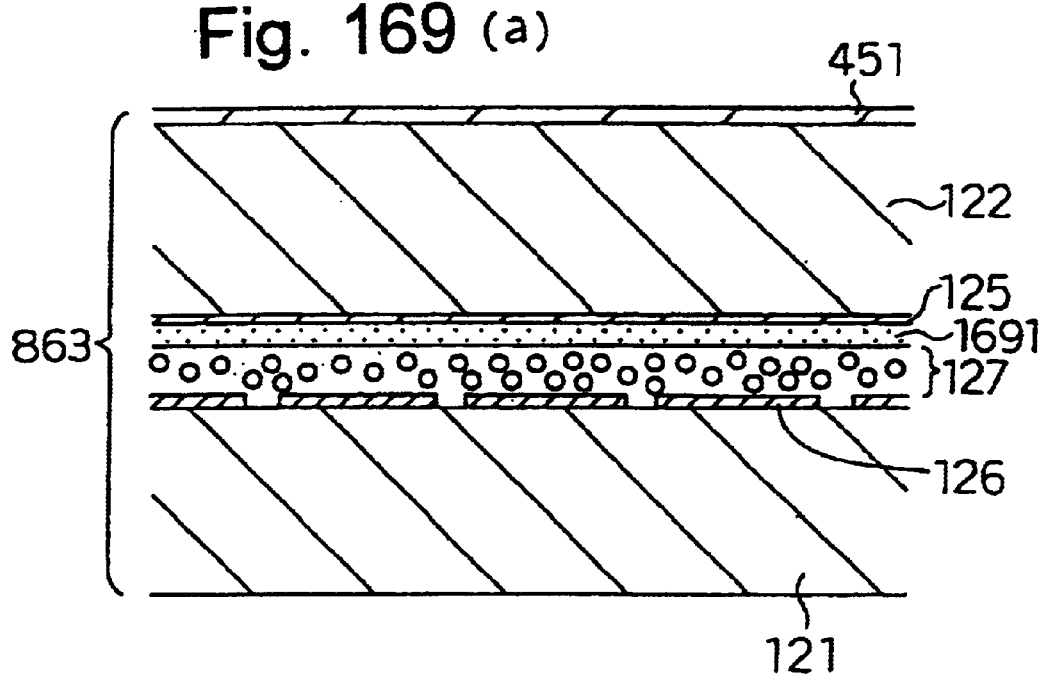
Figure 169:
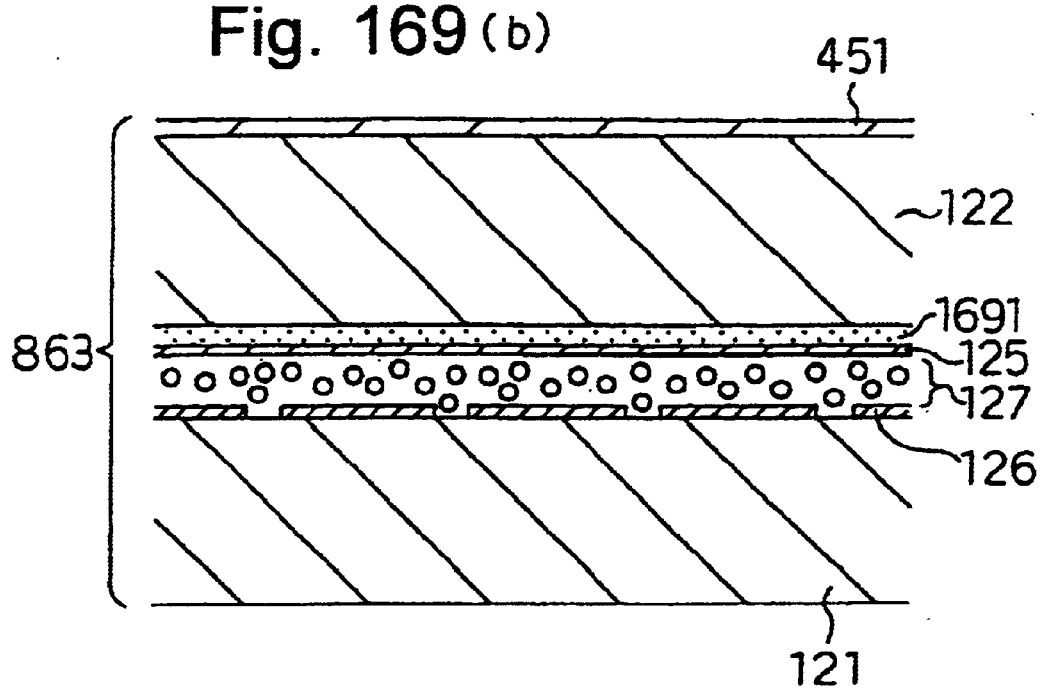

FIG. 169(*a*) shows a configuration in which the ordinary scattered layer 1691 is formed on the surface that is in contact with the light modulation layer 127. The ordinary scattered layer 1691 is made by, for example, adding titanium particles into the acrylic resin used for the liquid crystal layer 127. For example, a material obtained by adding scattering particles into an epoxy resin, and a material obtained by adding the scattering particles to a gelatin resin or urethane resin are used. Materials having different refractive indices can be mixed and used. When the materials having different refractive indices are mixed, it becomes whitish.

The ordinary scattered layer 1691 is not limited to a solid but a gel or liquid may be used. Three or more materials may be mixed. The ordinary scattered layer 1691 can be scattered not only by a resin itself but also, for example, by containing liquid crystals. The liquid crystals are preferable since the dielectric constant is high and the voltage drop does not easily occur. It is sufficient to select a material having the dielectric constant of 5 to 10. The ordinary scattered layer 1691 can be also made of opal glass or the like.

The ordinary scattering layer 1691 is disposed or formed so as to be in contact with the PD liquid crystal layer 127 or the like. When it is assumed that the illuminance at the light incident face to the ordinary scattering layer 1691 is E [1x], the luminance measured at the light outgoing surface and from the normal line direction of the ordinary scattering layer 1691 is B(nt), and the ratio of the circumference of a circle to its diameter is $\pi$, the scattering gain (G) of the ordinary scattering layer 1691 is set to satisfy $1.5 \leq G \leq 10$ where $G = \pi B/E$.

As described above, the pixel aperture ratio is calculated on a percentage base (100%) and is calculated also in consideration of an influence of the surface reflection and the like. Preferably, the scattering gain is set to satisfy $2 \leq G \leq 5$. When G is small, although the viewing angle becomes wider, the luminance deteriorates. On the contrary, when G is large, although the luminance is improved, the viewing angle is narrowed.

The thickness of the ordinary scattering layer 1691 is set in a range from 1 $\mu$m to 4 $\mu$L When the layer is thin, scattering unevenness occurs. When the layer is thick, a voltage drop occurs. The scattering state of the ordinary scattering layer 1691 is not changed due to the application voltage to the liquid crystal layer 127 or even when it is changed, an influence on display is minor. Even when the application voltage to the liquid crystal layer 127 is the maximum, the scattering characteristic remains.

In configuration, the ordinary scattering layer 1691 can be formed either uniformly on the whole display area, only on the pixel electrode 126, in a stripe shape, or in a particular pattern. The ordinary scattering layer may be colored and used as a color filter. Besides it, by adding scattering particles to the color filter 124 and the like, the ordinary scattering layer 1691 and color filter 124 can be commonly used. The scattering gain (G) in this case has to be measured or obtained in consideration of the absorption in the color filter 124.

Although the ordinary scattering layer 1691 is formed on the counter electrode 125 side in FIG. 169(*a*), it can be formed or disposed on the pixel electrode 126 side or can be formed as an intermediate layer in the liquid crystal layer 127. The ordinary scattering layer 1691 may not be formed independently and particles of titanium or the like or materials having different refractive indices may be directly contained in the liquid crystal layer 127. The scattering gain (G) in this case is obtained by measuring the scattering characteristics when the liquid crystal layer 127 is in the transmitting state. That is, when a voltage is applied to the pixel electrode 126 and the liquid crystal layer 127 is allowed to enter the light transmitting state, assuming now that the illuminance at the light incident face of the liquid crystal layer 127 is E [1x], the luminance measured at the light outgoing face and from the normal line direction of the liquid crystal layer 127 is B (nt), and the ratio of the circumference of a circle to its diameter is $\pi$, the scattering gain (G) is set to satisfy $1.5 \leq G \leq 10$. More preferably, it is set to satisfy $2 \leq G \leq 5$.

As shown in FIG. 169(*b*), the ordinary scattering layer 1691 may be formed or disposed between the counter electrode 125 and a counter electrode substrate 122. In the configuration of FIG. 169(*b*), it is prevented that no voltage is applied to the liquid crystal layer 127 or a voltage is lost by an influence of the ordinary scattering layer 1691. Besides the configuration and method of forming the ordinary scattering layer as described with reference to FIG. 169(*a*), for example, a method of forming the counter electrode 125 or pixel electrode 126 on the surface of a substrate having a light scattering face such as an opal glass is employed. The surface of the glass substrate is polished or chemically processed, thereby forming the ordinary scattering layer 1691. For example, a glass substrate to which a scattering sheet is adhered is used.

In the case where the display panel is of the reflecting type, it is preferable to form or dispose the anti-reflecting film 451 by using a sheet whose light incident face is embossed or a multilayer film made by dielectric thin films, or obtained by applying a resin having the refractive index of 1.5 or less.

Figure 170:
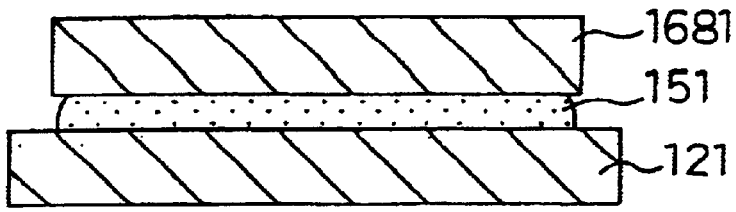
Figure 170:
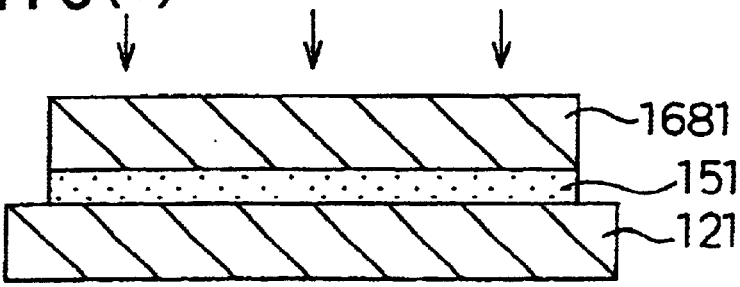
Figure 170:
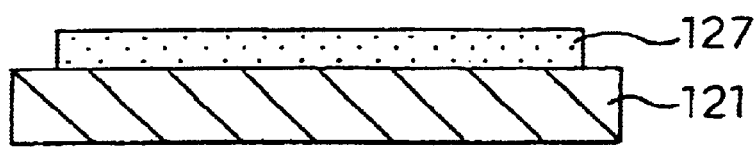
Figure 170:
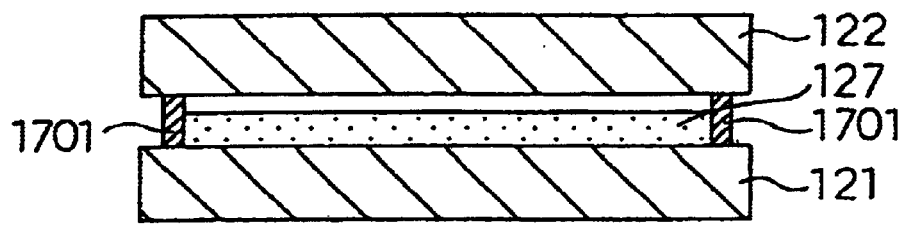
Figure 170:
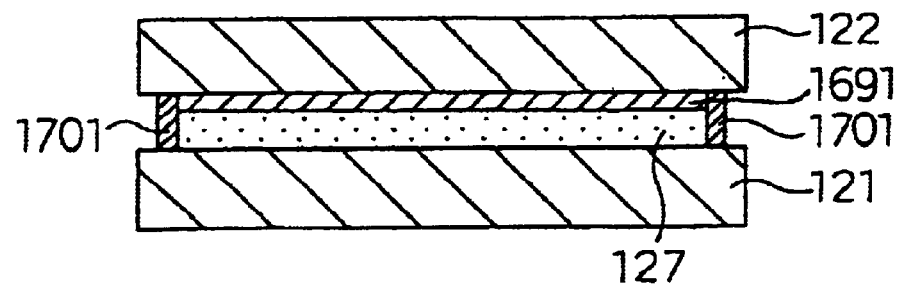

FIG. 170 is a diagram for explaining a method of manufacturing, mainly, the display panel of FIG. 169(*a*). The smoothing substrate 1681 having a film made of an olefin resin (aromatic resin), urethane resin, or the like peelable from an acrylic resin on the back face is prepared. The mixed solution 151 is sandwiched between the smoothing substrate 1681 and the array substrate 121 (FIG. 170(*a*)). As shown in FIG. 170(*b*), the mixed solution 151 is irradiated with ultraviolet rays to harden the resin in the mixed solution 151, thereby forming the light modulation layer 127. After that, as shown in FIG. 170(*c*), the smoothing substrate 1681 is peeled from the light modulation layer 127. Then, the peripheral part of the counter electrode substrate 122 and the array substrate 121 is sealed by a sealing resin 1701 (FIG. 170(*d*)). In this case, a predetermined gap is formed between the counter electrode 125 and the light modulation layer 127. The gap is formed by using beads or the like (not shown). A liquid which becomes an ordinary scattering layer is charged into the gap. After the charging, the liquid is heated or irradiated with ultraviolet rays, thereby hardening the resin component in the liquid and forming the ordinary scattering layer 1691. Obviously, when the ordinary scattering layer 1691 is a liquid, it is unnecessary to harden it.

A transparent thin film, thick film, or sheet (which will be called a high refractive film hereinlater) having a reflective index higher than that of the array substrate 121 is formed or disposed between the light guide plate 481 or backlight and the array substrate 121. The higher refractive index denotes specifically 1.8 or higher. Material such as $TiO_2$, ZnS, $CeO_2$, $ZrTiO_4$, $HfO_2$, $Ta_2O_5$, $ZrO_2$ or ITO is used.

The high refractive film is formed on the back face of the array substrate 121 and the surface of the light guide plate 481. Beads or the like are scattered or small projections are formed between the array substrate 121 and the light guide plate 481 or backlight, thereby disposing an air gap.

Thus, by forming the air gap and the high refractive film on the light incident face of the liquid crystal display panel 863, the linearity of light incident on the liquid crystal display panel 863 is improved. The improvement in the linearity denotes that the amount of the vertical components in the principal ray of the light incident on the liquid crystal layer 127 increases. When the vertical components increase, the contrast becomes better in the case of the PD liquid crystal display panel. It is also effective in the case of the TN liquid crystal display panel.

In the illuminating apparatus, view finder, and video display apparatus of the invention shown in FIGS. 64, 91, 149, and the like, it is effective to dispose the condenser lens 11 on the light incident surface of the display panel 863. FIG. 167 shows such an example.

It is preferable to optically couple the plano-convex lens 11 to the display panel. The plano-convex lens 11 largely bends the angle of the incident light 22*a* but allows the incident light 22b almost as it is to be incident on the display panel. That is, the lens 11 converts the incident light into almost parallel light. By allowing the parallel light to enter the display panel, the viewing angle on the display panel is widened. A Fresnel lens may be used as the lens 11 as shown in FIG. 167(b). A semi-cylinder-shaped cylindrical lens or lenticular lens may be also used as the plano-convex lens 11.

Figure 96A:
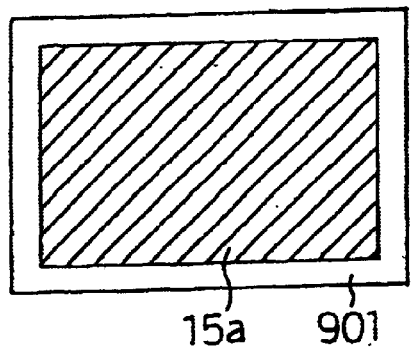
FIGS. 96A to 96G are diagrams for explaining the video display apparatus of the invention.
Figure 96B:
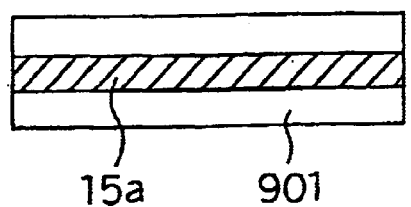
Figure 96C:
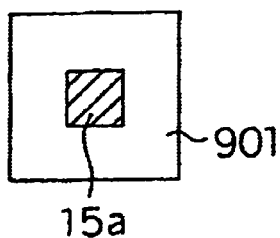
Figure 96D:
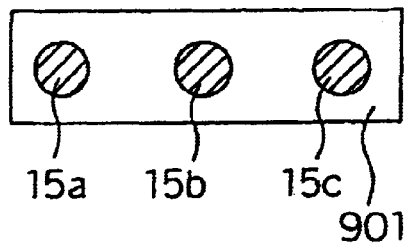
Figure 96E:
Figure 96F:
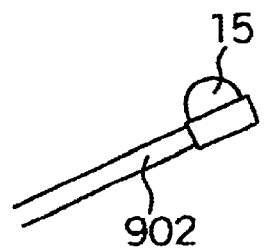
Figure 96G:
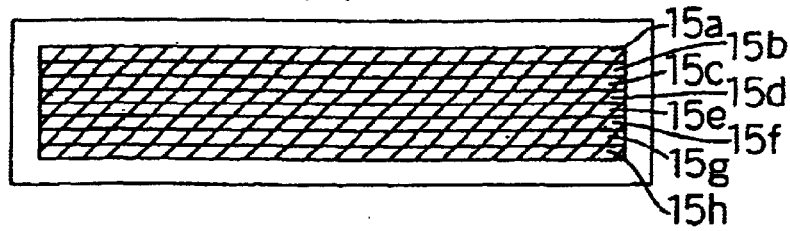
Figure 97:
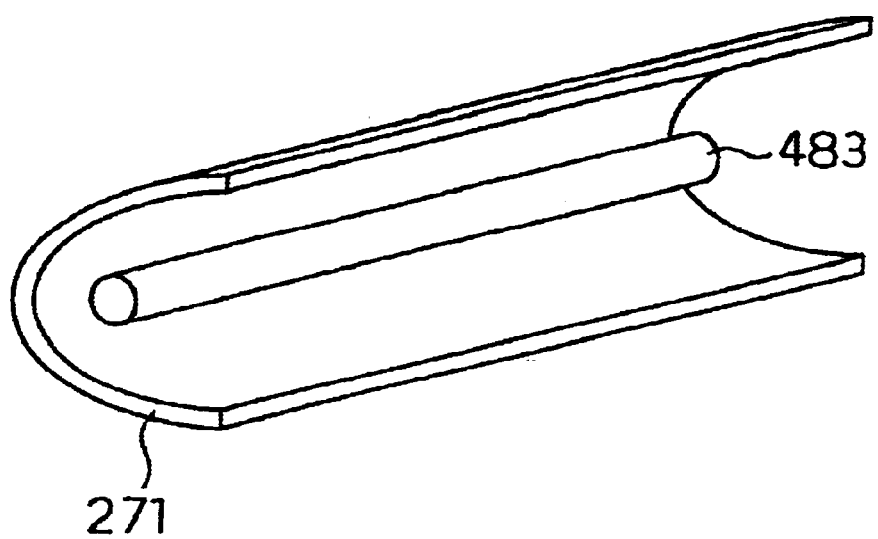
FIG. 97 is a diagram for explaining the video display apparatus of the invention.

In the illuminating apparatus, view finder, and video display apparatus of the invention of FIGS. 91, 149 and the like, it is effective to construct in a manner such that the light source 15 is divided into a plurality of areas as shown in FIG. 96(g), and the observer turns on/off one or a plurality of light sources in accordance with the necessity (illuminance adjustment, contrast adjustment, and the like). The angle of the principal ray of light incident on the display panel from the light source 15a and that from the light source 15h are different, and the display contrast and the like can be changed.

By simultaneously turning on the plurality of light sources 15 such as 15a and 15c, the brightness can be adjusted. It is also possible to illuminate the display panel by sequentially scanning to turn on the light sources 15a to 15h. The intensity of the light luminance from the light sources 15a to 15h may be varied and the variation is properly adjusted, thereby enabling the face of the display panel 863 to be uniformly illuminated.

In the case of the video display apparatus in the semi-permeable specification, the light amount of the backlight is adjusted at least at two stages. The first stage relates to a first light amount when the backlight and the outside light are used and the second stage relates to a second light amount when the light from the backlight is mainly used.

The first and second light amounts are realized, for example, by switching the current applied to the white LED of the backlight. The light amount is changed either automatically or by switching the user switch by the observer. In the case of using only the outside light, the backlight is turned off.

In the case of forming the display panel by using the microlens array as shown in FIG. 13, where each pixel has a square lattice (square) and the three dots of R, G, and B are formed within the square lattice, the shape of the microlens is preferably cylindrical. It is also preferable to form a light absorbing film (absorbing type black matrix) in the area (ineffective area) through which the effective light for displaying an image does not pass in the position of the optical coupling layer 73. By forming the light absorbing film, the light scattered by the liquid crystal layer 127 and irregularly reflected between the substrates 122 and 121 can be absorbed. The display contrast is therefore improved.

In a manner similar to the embodiments of FIGS. 142, 150, 151, 166, and the like, when the recesses are formed in a saw-tooth shape and are filled with a resin or disposed by a material such as liquid crystals having a refractive index higher than that of the air, θb is set within a range from 10 to 35 degrees. More preferably, θb is set within a range from 15 to 30 degrees since the angle of light incident on the display panel when the display panel is being used is often 60 to 15 degrees. When the incident light enters the display panel, the angle to the normal line is decreased only by the refractive index. The angle by which the incident light is preferably reflected and the light is diffracted so as not to easily and directly arrive an eye of the observer lies within the above-described range.

Although the color filter 124 is formed on the microlens 134 side in FIG. 13, not being limited to this, it may be formed or disposed on the other face as illustrated in FIG. 171.

The display panel having the configuration in FIG. 171 is especially effective when it is used as a write valve of the projection type display apparatus. The microlens array 132 is disposed on the array substrate 121 side. On the array substrate 121, a shielding film 1711 as BM is formed. On the shielding film 1711, the TFT 201 is formed. The shielding film 1711 prevents the incident light from entering the TFT 201 and also prevents light leakage between the pixel electrode 126 and the signal line.

The color filter 124 is directly formed on the counter electrode substrate 122 by an ink jet technique or formed in a filter substrate to be adhered to the counter electrode substrate 122. By forming the color filter 124 on the surface of the counter electrode substrate 122, it is easily cooled by air.

The light 22b scattered by liquid crystal drops 1712 of the liquid crystal layer 127 is incident on the neighboring color filter and absorbed. Consequently, no halation occurs in the counter electrode substrate 122 and the display contrast becomes good. That is, light scattered on the pixel electrode 126R is absorbed by the color filters 124G and 124B, Light scattered on the pixel electrode 126G is absorbed by the color filters 124R and 124B, and light scattered on the pixel electrode 126B is absorbed by the color filters 124G and 124R.

The focal point P of the microlens 134 is set to be within the counter electrode substrate 122 and is positioned so that t1:t2=1:3 to 3:1. By using such a relation, the light 22a incident on the microlens 134 certainly enters each corresponding color filter formed on the surface of the counter electrode substrate 122. That is, when the liquid crystal layer 127 is in a transmitting state, the light incident on the pixel electrode 126R passes through the color filter 124R, the light incident on the pixel electrode 126G passes through the color filter 124G, and the light incident on the pixel electrode 126B certainly passes through the color filter 124B.

Even though the pixel aperture ratio is low, it becomes substantially high by the condensing action of the microlens 134. By the condensing action of the microlens 134, even when the color filter 124 is formed on the substrate surface, the color purity of the display image does not deteriorate.

The color filter 124 may be formed on the array substrate 121 side. The microlens 134 may be formed on the counter electrode substrate 122 side. The color filter 124 may be formed on the pixel electrode 126 or the counter electrode 125.

The focal point P of the microlens 134 can be achieved to form an image on the opposite face of the display panel 863. This configuration is shown in FIG. 172.

The focal point P is not limited to the surface of the substrate but can be in the vicinity. In some cases, the focal point can be achieved within the substrate as shown in FIG. 171. The microlens 134 having the focal point distance, whose focal point P is achieved out of the substrate may be also used. That is, by making the opening of the hole 1362 which will be described hereinbelow as small as possible, the display contrast can be directly improved.

The microlens substrate 132 is adhered to the counter electrode substrate 122 by the optical coupling layer 73, the microlens 134 is disposed or formed in the counter electrode substrate 122, or the microlens 134 is adhered to the array substrate 121 or is formed or disposed in the array substrate 121.

For simplicity of explanation, an example of adhering the microlens array 132 formed by the ion exchange method, which is manufactured by Nippon Sheet Glass Co., Ltd, to the counter electrode substrate 122 will be described.

Alternately, the microlens array formed by the stamper technique developed by Richo Co., Ltd. and Omron Corporation may be used. A cylindrical lens, Fresnel lens, or lens which bends light or changes the travel direction by the diffracting effect may be used.

In the case where the liquid crystal layer 127 is made of PD liquid crystals (light modulating layer of scattering type), the focal distance t($\mu$m) of the microlens 134 is set to $5d \leq t \leq 20d$ when the maximum diameter of the lens is d ($\mu$m). More preferably, it is set to $10d \leq t \leq 18d$. Within the range, the display luminance is the highest and the display contrast improving effect is high.

The F number of a projection lens is set to F and the relation between the angle $\theta 1$ ($\sin \theta_1 = 1/(2F)$) obtained from F and $\theta_2$ of the microlens ($\tan \theta_2 = d/(2t)$) sets to satisfy the relation of $\theta_1/3 \leq \theta_2 \leq \theta_1$. Within the range, both of the high luminance display and the high contrast display can be achieved.

On the array substrate 121, black coating is applied, or a thin metal film made of chrome, or a film, sheet, or plate formed by a dielectric mirror is disposed. The opening 1362 is formed or disposed in the focal point P position of the microlens 134. That is, the opening 1362 is formed in a position corresponding to the focal point of the microlens 134.

The absorbing film or sheet is called an aperture absorbing film 1721 of simply called an absorbing film 1721. In a broad sense, the absorbing film 1721 is a shielding film. The absorbing film 1721 may be formed by overlapping color filters made of gelatine. A substrate (not shown) on which the absorbing film 1721 is formed may be disposed or attached to the surface or the like of the array substrate 121. As an absorbing film 1721, a polarizer, polarizing sheet, or the like can be used. A diffracting grating or the like may be formed. That is, since the function of the absorbing film 1721 is to prevent the scattered light from entering the projection lens, the function can be realized even by the diffracting grating. The part corresponding to the absorbing film in the array substrate 121 may be polished so as to be whitish or roughed.

The absorbing film 1721 may be formed by coloring a dielectric film A material obtained by dispersing a dye or pigment of black into a resin may be also used. In a manner similar to the color filter 124, gelatine or casein may be dyed by using an acid dye of black. As an example of a black dye, fluorene dye which colors black only by itself or a green dye and a red dye which are mixed to come out as black can be used.

Although all of the above materials are of black, the materials are not limited to the above when the liquid crystal display panel of the invention is used as a light valve of a projection type display apparatus. It is sufficient for the absorbing film 1721 of the liquid crystal display panel which modulates the R light to absorb the R light.

A material which dyes a natural resin by using a dye and a material obtained by dispersing a dye in a synthetic resin can be therefore used. For example, a proper one of azo dye, anthraquinone dye, phthalocyanine dye, triphenylmethane dye, and the like is used or two or more of them may be combined. Especially, it is preferable to use the dye whose color is a complementary color. For example, when the incident light is blue, the absorbing film 1721 is colored yellow.

Needless to say, it is preferable that the light absorption ratio of the light absorbing film 1721 is close to 100%. When the absorption ratio is 50% or higher, preferable effects can be largely displayed. By forming or disposing the absorbing film 1721 on the surface which comes into contact with the air, the cooling is facilitated.

The absorbing film 1721 may be directly cooled by pure water or the like besides the air. It is also effective to cool the absorbing film 1721 by hydrogen at 1 or higher atmospheric pressure, preferably, 3 or higher atmospheric pressure. It is necessary to have a sealing structure in order to cool the film with water or hydrogen. The sealing structure can be obtained by surrounding the panel or, as shown in FIG. 175, the light outgoing face by a casing 1751. The gap between the casing 1751 and the display panel is filled with cooling water such as hydrogen, water, or ethylene glycol. The part through which light effective to display an image passes is made transparent.

Especially, as shown in FIG. 175, in the configuration of the projection display apparatus for modulating light of the three primary colors of R, G, and B by a single display panel, an amount of heat generated in the display panel is large. The configuration of cooling the surface of the display panel with hydrogen or liquid is therefore preferable since it can prevent the display panel from deterioration. By disposing a liquid on the surface of the display panel, light reflected by the surface of the display panel can be suppressed. The light utilizing rate can be therefore improved and the halation can be prevented.

Preferably, the above is applied to the projection display apparatus shown in FIGS. 159, 183, 186, 191, and the like and the other display apparatuses shown in FIGS. 1, 106, and the like. FIG. 186 will be described hereinlater.

When the color filter 124 is formed or disposed in a opening 1362, as shown by a dotted line, color display can be realized by one display panel.

The thickness of each of the counter electrode substrate 122 and the array substrate 121 is determined by the pixel opening aperture ratio and the focal distance. As shown in FIG. 172, when the thickness of the array substrate 121 and that of the counter electrode substrate 122 are equal (t3=t4), ideally, light from the microlens 134 illuminates the area of ¼ of the pixel size in the pixel position, that is, it corresponds to 25% of the pixel aperture ratio. When the pixel aperture ratio is ¼ or higher, the thickness of the counter electrode substrate 122 is set to be reduced. In the opposite case, it is designed to increase the thickness of the optical coupling layer 73 or the like.

As illustrated in FIG. 175, it is preferable to set the positional relation between the distance (t) from the microlens 134 to the liquid crystal layer 127 and the focal point P as follows. The focal point P1 is in the position apart from the absorbing film 1721 forming position by the distance (t). The focal point P2 is in the position apart from the absorbing film 1721 only by the distance (t). The focal point P of the microlens 134 is set within the range from P1 to P2. This relates to the pixel aperture ratio. In the range, the area of the opening 1362 is smaller than the opening area and light can preferably pass through the pixel opening part.

When the PD liquid crystal layer 127 is in a transparent state, the incident light 22 is not scattered and all of the incident light 22 reaches the focal point P. Consequently, the light emits efficiently and reaches the projection lens. When the liquid crystal layer 127 is in the scattered state, the scattered light is absorbed or shielded by the absorbing film 1721. Consequently, the light does not go out from the array substrate 121. The ratio of outgoing scattered light is determined by the diameter of the opening 1362. The smaller the area of the opening 1362 is, the more the amount of light going out from the opening 1362 is reduced. The ratio of outgoing light from the opening 1362 changes according to a voltage applied to the liquid crystal layer 127 or the scattering state.

In the configuration of FIG. 172, when the liquid crystal layer 127 is in a transmitting state, light goes out efficiently from the opening 1362. When the liquid crystal layer 127 is in a scattered state, most light is absorbed by the absorbing film 1721. The display contrast of the PD liquid crystal display panel can be therefore largely improved. It is an effect peculiar to the liquid crystal in the scattered mode and a phenomenon is peculiar to an apparatus such as projection display apparatus for emitting light having pencil light incident on the display panel. Ideally, when the area of the opening 1362 is set to ½ of the pixel area, the display contrast becomes twice. When the area of the opening 1362 is set to 113, the display contrast becomes three times.

When the display panel 863 is of the reflecting type, a configuration as shown in FIG. 176 is used. The microlens array 132 is connected to the counter electrode substrate 122 of the reflecting type display panel 863 by using the optical coupling layer 73. The absorbing film 1721 is disposed or formed between the counter electrode substrate 122 and the array 132.

When the liquid crystal layer 127 is in a transparent state, the incident light 22 passes through the opening 1362, is reflected by the reflecting electrode 126, again passes through the opening 1362, and goes out. When the liquid crystal layer 127 is in a scattered state, most of the incident light 22 is absorbed by the absorbing film 1721.

The configuration of the projection type display apparatus using the display panel as a light valve is shown in FIG. 177. Light of blue (B) is split by a dichroic mirror 1771B from light emitted from the light source 15, light of green (G) is split by the dichroic mirror 1771G, and light of red (R) is split by the mirror or dichroic mirror 1771R, thereby obtaining the blue light 22B, green light 22G, and red light 22R. The light 22 is incident on the liquid crystal display panel 863 perpendicularly or obliquely. A half mirror, color filer, or dichroic prism can be used as the dichroic mirror 1771.

As illustrated in FIG. 175, the microlens 134 condenses incident light and leads it to the opening 1362. The operation is performed to each of the light 22B, 22G, and 22R. When the liquid crystal layer 127 is in the transparent state, as shown in FIG. 178, the incident light 22b passes through the pixel electrode 126B by the microlens 134 and goes out from the opening 1362B. When the liquid crystal layer 127 is in a scattered state, most of the light is absorbed by the absorbing fil 1721. The absorbing film 172i is formed or disposed on a transparent aperture substrate 1781 and is adhered to the counter electrode substrate 122 or array substrate 121 by the optical coupling layer 73b.

In the light valve as shown in FIG. 178, images of R, G, and B are formed respectively at the pupil position of the projection lens. On the other hand, scattered light is spread in the whole pupil position of the projection lens. In the invention, in order to improve the display contrast by allowing only the transmission light to reach the screen and absorbing the scattered light, the configuration as shown in FIG. 179 is used.

FIG. 179 shows a shielding plate 1791 disposed or formed in the projection lens. Apertures 1792 colored in R, G, and B or separated from each other are opened in the shielding plate 1791. Preferably, R, G, and B absorbing type color filters or interference filters are fit in the apertures 1792.

The blue light 22B transmitted the liquid crystal layer 127 passes through the aperture 1792B. The green light 22G transmitted the liquid crystal layer 127 passes through the aperture 1792G. The red light 22R transmitted the liquid crystal layer 127 passes through the aperture 1792R. The light scattered by the liquid crystal layer 127 spreads in the whole shielding plate 1791 and is absorbed by the shielding plate 1791. The shielding plate 1791 is painted black. Although any of the arrangement of the apertures 1792 in FIGS. 179(a) and 179(b) can be used, FIG. 179(b) in which the pupil's area is narrower is preferable.

By disposing or forming the color filters 124 made of a resin or interference films in the opening 1362 of the absorbing film 1791, the colors of R, G, and B are not mixed and the excellent color purity can be reproduced. Specifically, a color filter of blue is disposed in the opening 1362B, a color filter of green is disposed in the opening 1362G, and a color filter of red is disposed in the opening 1362R.

As understood from FIGS. 177 and 178, the principal rays of optical paths of at least two of R, G, and B obliquely enter the liquid crystal display panel 863. The diameter of the projection lens 1591 becomes accordingly large or the F number cannot be high from the viewpoint of designing.

In order to solve the problem, as shown in FIG. 181, a concave microlens array 132b is disposed on the outgoing side of the opening 1362. The concave microlens emits the light 22G as it is, bends the light 22B and 22R and then emits.

All of the principal rays emitted from the concave microlens array 132b therefore become parallel light. The size of a projection lens 1591 can be accordingly reduced. The F number of the projection lens 1591 can be made high. In the projection display apparatus using the PD liquid crystal display panel the higher the F number is, the higher the display contrast is.

Similar functions can be also realized by disposing or forming a prism plate 1822 as shown in FIG. 182. Interfaces 1821B and 1821R are formed so as to be inclined with respect to the principal rays 22B and 22R, respectively. The principal rays 22B and 22R are therefore bent and become parallel to the normal line of the display panel 863. Since an interface 1821G is perpendicular to the principal ray 22G, the principal ray 22G goes out as it is.

The technique of cooling by using hydrogen can be also applied to the projection display apparatus shown in FIG. 183. As the panel 862, a reflecting type display panel, a semi-permeable type display panel, a transmitting type display panel of the invention, a DMD panel sold by TI Company, a TMA developed by Daeu Company of Korea, a silicon-chipped liquid crystal panel, or the like is used.

Reference numeral 1831 in FIG. 183 denotes a rotary filter. The rotary filter 1831 rotates around the rotary shaft 1917 by a brushless DC motor 1916. The rotary filter 1831 has a shape in which a plurality of fan-shaped dichroic filters are combined.

As shown in FIG. 185, the dichroic filters (color filters) 124 are arranged around a disc 1842. The rotary filter 124R transmits the R light. The dichroic filter 124G transmits the G light and the dichroic filter 124B transmits the B light.

By rotating the rotary filter 1831, white light as the incident light 22 is time-divisionally converted into R, G, and B rays. The converted R, G, and B rays are converted by a field lens 11a into parallel light which is incident on the PBS 531. The incident light is polarized and split by a light splitting face 532. The display panel 863 modulates the incident light. The modulated light is incident on the projection lens 1591 and enlargedly projected onto a screen (not shown).

As illustrated in FIG. 184, the rotary filter 1831 is disposed in a casing 1844. The casing 1844 is made of a metal material or an engineering plastic material. The motor 1916 is also disposed in the casing 1844. A transmission window 1843 through which the incident light 22 enters/goes out is formed in a light incident part in the casing 1844. In the transmission window 1843, an AIR coating film (anti-reflection film) for preventing the incident light from reflecting is formed. As necessary, a UV cut film for cutting ultraviolet rays and an IR cut film for cutting infrared rays are formed. A heat discharging plate 1845 for discharging the heat in the casing is attached to a part of the casing 1844.

The casing 1844 is filled with hydrogen of 1 atmospheric pressure to 3 atmospheric pressure. Since the specific gravity of hydrogen is low, windage loss occurring when the rotary filter 1831 rotates can be reduced. The heat can be effectively discharged. There is, however, the danger of explosion when hydrogen is mixed with oxygen. Therefore, a sensor 1841 for sensing the pressure of hydrogen and luminance is attached to a part of the casing 1844.

The sensor 1841 measures the pressure of hydrogen in the casing and/or purity and generates a signal when the concentration or the like of hydrogen becomes a predetermined value or smaller. By the signal, an indicator lamp indicative of "necessity of check of the hydrogen concentration" is turned on and the turn-on of the lamp 15 is stopped.

By surrounding the rotary filter 1831 perfectly or by surrounding by the casing 1844 as much as possible, noises can be prevented. When the casing 1844 has an opening, the hydrogen cooling method cannot be adopted. The effects on preventing noises such that wind noise of the rotary filter 1831 and electromagnetic sound of the motor 1916 can be suppressed excellently can be sufficiently displayed. It is also possible to directly cool the casing 664 surrounded by a liquid or the like.

The above can be applied to the embodiments of FIG. 175 and the like. Although FIG. 65 shows a case where the light valve is of the reflecting type, the projection display apparatus can be constructed only by detaching the PBS 531 and changing the arrangement of the projection lens 1591 when the light value is transmitting type.

Obviously, the matters regarding the hydrogen cooling are applied to FIG. 186. For example, the display panel 863 is surrounded by the casing 1751 and the casing 1751 is filled with hydrogen gas. When the projection display apparatus comprises the three liquid crystal display panels of the display panel 863R for modulating red light, the display panel 863G for modulating green light, and the display panel 863B for modulating blue light, and a dichroic prism or PBS 531 for synthesizing light modulated by the display panels 863, the display panels 863R, 863G, and 863B, the dichroic prisms and the like are surrounded by a single casing 1751 and the casing 1751 is filled with hydrogen gas.

A scirocco fan is disposed in the casing 1751 and the heat discharging plate 1845 is disposed on the outside of the casing 1751. The scirocco fan is disposed just below the display panel 863B for modulating blue light since the incident side polarizer of the display panel for modulating blue light especially easily deteriorates by heat. The display panel 863B is therefore concentratedly cooled. The space is formed between the polarizers on the light incident side and light outgoing side and the display panel 863 so that the hydrogen gas can flow between the polarizer and the display panel 863. As a transparent plate made of glass or the like to be adhered to the polarizer, it is preferable to use sapphire glass or a transparent plate on which a diamond thin film is formed on the surface from the viewpoint of thermal conductivity. The polarizer on the outgoing side may be adhered to the dichroic prism. It is preferable to form the anti-reflecting film by using the dielectric multilayered film made of an inorganic material on the surface of the polarizer.

The air from the scirocco fan cools the display panel 863 and is sprayed to the heat discharging plate 1845. Preferably, a circulation fan for circulating the inside air in the casing 1751 is disposed, the heat discharging plate 1845 is connected to a radiator disposed outside of the casing 1751, and a cooling fan which cools the radiator is disposed. A hydrogen concentration sensor 1841 for detecting hydrogen leakage is attached to the casing 1751. Preferably, the casing 1751 has the explosion-proof structure.

It is preferable to set the hydrogen gas filled in a range from 1 atmospheric pressure to 5 atmospheric pressure. Since the ratio of density of hydrogen to that of air is $\frac{1}{14}$, wind loss by a fan or the like can be decreased. The specific heat is high and the cooling effect is around ten times higher. Since the hydrogen gas is inactive, deterioration in the liquid crystal display panel 863 and the like does not easily occur.

Although the casing 1751 is filled with the hydrogen gas in the foregoing embodiment, the invention is not limited to the arrangement. Although the cooling performance or the like is lowered, other gas such as nitrogen or helium can perform cooling more effectively than air. Even the ordinary air is effective on preventing adhesion of dusts to the liquid crystal display panel 863 by sealing the casing 1751. Obviously, the matters regarding the cooling by the hydrogen gas, the casing 1751 and the like can be also applied to FIGS. 175, 183, and 177. As the display panel 863, the display panel of the invention shown in FIGS. 173, 174, 181, 151, or the like may be used.

Although the case where the display panel of the invention is used as a light valve of the projection display apparatus has been described above in the embodiment, the invention is not limited to the above but obviously can be applied and developed to a display panel in a view finder, head mounted display, monitor shown in FIG. 52, and the like.

One of the problems of the liquid crystal projection display apparatus relates to the display contrast, that is, black floating. Even when the brightness is adjusted, although white display luminance can be adjusted, it is the problem that black display luminance cannot be adjusted.

The configuration for solving the problem is shown in FIG. 191. An ellipsoidal mirror is used as the concave mirror 271 and a rotary shutter 1911 shown in FIG. 192 is disposed at the second focal point position or in the vicinity. Light from the lamp 15 transmits an UVIR [sic] cut filter 1915 and is incident on the rotary shutter 1911.

The whole incident light transmits all of devices where there is no rotary shutter 1911, enters the lens 11b, and illuminates the display panel 863 as a light valve. Light incident on the light shielding part of the rotary shutter 1911 is shielded in accordance with the ratio of the shielding.

The rotary shutter 1911 is connected to a motor 1916a and a shaft 1917a and rotates. The position of rotation is detected by a photosensor in a position detecting hole 1921. A PLL circuit (not shown) obtains synchronization with the frame period of video signals.

The motor 1916a is mounted on a motor mounting base 1912. A slide gear 1913 is attached on the motor mounting base 1912 and the position of the motor 1916a is moved by the rotary gear 1914 attached to the shaft 1917b of the motor 1916b.

By the movement of the motor 1916a, the position of the rotary shutter 1911 moves. The ratio of shielding the ray 22 is accordingly varied. The motor 1916b rotates either independently or interlocking with the brightness volume or contrast volume to adjust the brightness of the display image. That is, as shown in FIG. 193, the screen luminance can be linearly or non-linearly changed according to the position of the rotary shutter 1911.

By the adjustment, both of white display and black display in the displayed image are simultaneously changed. Even when the display image is darkened, therefore, "black floating" is not conspicuous. The position of the rotary shutter 1911 or the rotary speed of the rotary shutter 1911 may be adjusted by automatically rotating the motor 1916b interlockingly with a video signal displayed on the liquid crystal display panel 863 or adjusted by rotating the moter 1916b by the switching of the user switch. Especially, as shown in FIG. 191, since the rotary shutter 1911 is disposed in a position where light from the lamp 15 is condensed, the size of the rotary shutter 1911 can be small and the rotation seed can be easily raised.

By forming (or constructing) the color filters 124 as shown in FIG. 185 in a part where there is no rotary shutter 1911 (Part B) in FIG. 192, full color display and the contrast adjustment can be simultaneously realized. This can be also applied to the filter of FIG. 194.

The liquid crystal projection display apparatus has a problem such that a blur occurs in a moving picture. The configuration and method of solving the problem are shown in FIGS. 194 and 195. In order to improve the blur in a moving picture, as shown in FIG. 195, it is sufficient to shield a part of it by the rotary shutter every field (or frame) Fx (x is an integer) and allows the light transmitted the rotary shutter 1911b to reach the screen or the like within time which is a part of the field as shown by an output video display of FIG. 195.

For that purpose, in place of the rotary shutter 1911 in FIG. 191, a rotary shutter 1911b as shown in FIG. 194 is disposed and rotated. With the configuration, image display→black display→image display→black display is performed. In a manner similar to the CRT, images are displayed in pulses, so that moving picture display is improved. This is effective also to video display apparatuses of other kinds such as a view finder.

Adhesion of the anti-reflection sheet on the interface with air of the display panel 863 is effective on improving the light transmittance. The anti-reflecting sheet 1231 is obtained by applying a resin having refractive index which is lower than 1.5 onto a sheet. By adhering the anti-reflecting sheet 1231, the reflection at the interface with air is prevented and the transmittance of the display panel 863 is improved.

Although one lamp 15 is used in the above projection display apparatus, not being limited to this, as shown in FIG. 186, a plurality of lamps 15 may be used.

Shown in FIG. 186 of the projection display apparatus are the discharge lamp 15, an ellipsoidal mirror 271, a UV-IR cut filter 1862, a plane mirror 261, a reflecting prism 1864, a secondary light source 1868, a condenser lens 1866, a first lens array 1901, a second lens array 1902, a beam synthesizing lens 1867, a field lens 11, a display panel 862 as a light valve, a projection lens 1591, and a pupil face 1904 of the projection lens.

As the discharge lamp 15, a metal halide lamp (MH lamp), extra-high pressure mercury lump (UHP lamp), xenon lamp, or the like can be used and an emitter 1861 is formed by an arc discharge. Each light emitted from the emitter 1861 is condense by the corresponding ellipsoidal mirror 271, and after ultraviolet rays and infrared light components are cut by the UV-IR cut filter 1862 its optical path is bent by the plane mirror 261.

The first focal point of the ellipsoidal mirror 271 is disposed near the center of gravity of the emitter 1861 and the second focal point is disposed near the reflecting surface 1865 of the reflecting prism 1864. The secondary light source 1868 by an image of the emitter 1861 can be formed near the reflecting face 1865a of the reflecting prism 1864. Consequently, in the following optical system, light emitted from the emitter 1861 in a position which is inherently far can be dealt as light emitted from the secondary light source 1868. On the reflecting face of the reflecting prism 1864, an aluminium film or dielectric multilayer film is deposited so that visible light is efficiently reflected. Light emitted from the secondary light source 1868 is divergent light which is incident on the condenser lens 1866.

The action of the condenser lens 1866 will be described hereinbelow with reference to FIG. 187. As the condenser lens 1866, for example, an aspherical biconvex lens is used. Obviously, a plane-convex lens may be used.

The condenser lens 1866 converts the incident light into almost parallel light. In this stage, the cross section of the outgoing luminous flux is divided into four areas. When the luminous flux densities in the areas of the incident luminous flux are: S1, S2, S3, and S4 and the luminous flux densities in the areas of the outgoing luminous flux are SS1, SS2, SS3, and SS4, the condenser lens 1866 emits light by controlling the travel direction of the incident luminous flux so that $S1<SS1$, $S2<SS2$, $S3=SS3$, $S4>SS4$ and $SS1>SS2>SS3>SS4$, for example. Consequently, parallel luminous flux whose luminous flux density decreases as the light goes apart from the optical axis 1903 goes out from the condenser lens 1866.

The parallel luminous flux from the condenser lens 1866 is incident on the first lens array 1901 constructed by a plurality of lenses and is divided into a number of micro luminous fluxes. FIG. 188 shows an example of the configuration of the first lens array 1901. A plurality of rectangular lenses are constructed to be two-dimensionally arranged and the shape of each rectangular lens is similar to that of the display panel 863 as an area to be illuminated.

A number of micro luminous fluxes are converged on a corresponding lens in the second lens array 1902 comprising a plurality of lenses. On the second lens array 1902, a number of images are formed by the emitter 1861a. For example, the second lens array 1902 may have the same shape as that of the first lens array 1901.

FIG. 189 schematically shows the state of the image formed by the emitter on the second lens array 1902. On each of the rectangular lenses, two emitter images 1891a and 1891b corresponding to the emitters 1861a and 1861b are formed. By the action of the condenser lens 1866, the farther the distance is from the optical axis 1903, the lower the density of the incident luminous flux on the first lens array 1901 becomes, and the farther the distance is from the optical axis 1903, the smaller the sizes of the emitter images 1891a and 1891b become.

Each of the rectangular lenses of the second lens array 1902 enlarges the micro luminous flux incident on the face of the corresponding rectangular lens of the first lens array 1901 and the face of the display panel 863 is illuminated. The beam synthesizing lens 1867 is used to overlap the beams emitted from the rectangular lenses of the second lens array 1902 on the display panel 863.

Since the incident luminous flux on the first lens array 1901 is divided into a number of micro luminous flux to be enlarged and overlapped on the display panel 863, the display panel 863 can be uniformly illuminated.

Further, the emitter 1861 is disposed in a plane almost in parallel to a plane including the major axis of the display panel 863 and the optical axis 1903 and an image of the emitter 1862 is formed in the major axis direction of each of the rectangular lenses of the second lens array 1902, thereby enabling the emitter images to be efficiently arranged on each of the rectangular lenses. Even when a plurality of lamps are used, very efficient illumination can be realized.

The field lens 11 is used to condense light illuminating the display panel 863 onto the pupil face 1904 of the projection lens 1591. The projection lens 1591 projects an optical image to be formed on the display panel 863 onto a screen (not shown).

The pupil face 1904 of the projection lens 1591 and the second lens array 1902 are in an almost conjugate relation. FIG. 190 schematically shows a state of the pupil face 1904 of the projection lens 1591. A broken line 1908 is a virtual line showing the outer shape of the second lens array 1902. At least the pupil face having the size corresponding to a circle 1908 is inherently necessary for the projection lens 1591 to project illumination light without any loss. In order to realize a small projection lens 1591 at low costs, however, the smaller the pupil face is, the more it is preferable.

The condenser lens 1866 forms a larger image 1861 in the central part of the pupil face 1904 and a smaller image 1861 in the peripheral part. Even if the image in the peripheral part is not fetched, it is not a huge loss. Thus, when it is assumed that the pupil face 1904 is a circle 1909 shown by a solid line, the small projection lens can be realized at low costs while minimizing the loss.

FIG. 196 shows the relation between the cost of the projection lens and the like for the size of the pupil area and the light utilizing efficiency. The lateral axis denotes a relative pupil area, that is, the ratio of the solid circle 1901 to the circle 1908 shown by a broken line. That is, the area ratio of the imaginary line showing the outer shape of the second lens array 1902 to the area of the pupil face 1904 is shown.

In FIG. 196, the broken line shows the cost required for the lens and the like. It shows that the price of the lens is proportional to the lens area and that the smaller the lens is, the lower the cost is. The solid line denotes the amount of luminous flux reaching the screen (that is, light utilizing efficiency (brightness)). When the light amount becomes smaller for a necessary pupil area, the light utilizing efficiency is lowered. The broken line and the solid line are standardized by using the broken line in FIG. 190 as 1.0 That is, the case of no loss is shown.

An alternate long and short dash line shows the ratio between the solid line and the broken line. The points of inflection in the relative pupil area exist at points of 0.8 and 0.4 shown by the curve of the alternate long and short dash line. The inclination of the curve is gentle within the range from 0.8 to 0.4. That is, it shows that the cost reduction rate is excellent and the brightness reduction ratio is low in the range. It is therefore desirable that the relative pupil area satisfies the relation of 0.4≦relative pupil area≦0.8. More preferably, it is desirable that the relation of 0.5≦relative pupil area≦0.7 is satisfied.

As mentioned above, the illuminating apparatus in which emitter images formed on the projection lens pupil face are substantially symmetrical with respect to the optical axis even when a plurality of lamps are used, the uniformity of the illuminance of illumination light and the uniformity of the color are excellent, and the light utilizing efficiency is high can be realized. Since the condenser lens for controlling the luminous flux density of the illumination light is disposed and an emitter image which becomes larger toward the optical axis is formed on the pupil face of the projection lens, when the projection display apparatus of FIG. 186 is used, the projection lens having a relatively large F number can be used, so that a small, inexpensive projecting display apparatus can be constructed.

Obviously, when the PBS 531 or the like is disposed as shown in FIG. 183 between the beam synthesizing lens 1867 and the display panel 863 and the reflecting type display panel is used as the light valve in FIG. 186, the reflecting type projection display apparatus can be constructed. When the display panel 863 is a display panel for modulating random light such as DMD of TI Company or TMA of Daeu of Korea, it is sufficient to construct the reflecting type projection optical system by using optical path changing means such as a mirror or lens in place of the PBS. As a matter of course, when dichroic prisms or dichroic mirrors are used for the optical path to split the white light into optical paths of three primary colors of R, G, and B and the display panel is disposed in the split optical path, a full color display can be realized. As shown in FIG. 183, the rotary filter 1831 may be also used.

Although the number of the lamps 15 is two in FIG. 186, not being limited to two, three or more lamps can be used. For example, when four lamps 15 are used, optical paths are synthesized by a set of two reflecting prisms (not shown) and, after that, the synthesized optical path is further synthesized by the reflecting prism 1864 shown in FIG. 186. The synthesis of optical paths can be performed not only by the reflecting prism 1864 but also by a half mirror, PBS, or the like.

The display panel of the invention will be described hereinbelow with reference to FIGS. 173(a) to 174(c).

In order to prevent light leakage between pixels in the display panel 863, a black matrix (BM) is formed on the counter substrate 122. As material forming the BM, chrome (Cr) is used from the viewpoint of the light shielding characteristic. Strong light is incident on the display panel 863 serving as a light valve used for the projection display apparatus as shown in FIGS. 183, 186, 191, and the like. Since 40% of the light incident on the BM is absorbed by the BM, the display panel 863 is heated and deteriorates.

In the display panel of the invention, aluminium (Al) is used as material of the BM 1732a. Since Al reflects 90% of light, the problem that the display panel 863 is heated and deteriorates can be eliminated. It is, however, necessary to form a thick film since the light shielding characteristic of Al is poor as compared with Cr. As an example, the film thickness of Al is 1 $\mu$m in order to obtain the light shielding characteristic of Cr having the film thickness of 0.1 $\mu$m. That is, it is necessary to form a film ten times as thick as that of Cr.

On the other hand, since it is necessary to align liquid crystal molecules in the TN liquid crystal display panel or the like, a rubbing process has to be performed. In the case of performing the rubbing process, when there are projection and recess, the rubbing process cannot be performed properly. When BM is formed on the counter substrate 122 by using Al, projection and recess occur on the substrate 122 and the preferable rubbing process cannot be performed.

In order to deal with the problem, according to the display panel 863 of the invention, a recess 1733 is first formed in the position in which the BM is to be formed and the BM is formed so as to bury the recess 1733. The recess 1733 can be easily formed by applying a resist on the substrate 122, performing patterning, and etching the resist by using a fluorine solution. The depth of the recess is within the range from 0.6 $\mu$m to 1.6 $\mu$m, more preferably, within the range from 0.8 $\mu$m to 1.2 $\mu$m. The depth of the recess 1733 can be easily adjusted by adjusting the etching time.

Since the surface of the formed recess 1733 is rough, after the recess 1733 is formed, an inorganic material such as $SiO_2$ or SiNx is deposited on the substrate 122 so as to have the thickness of 0.05 µm to 0.2 µm.

An Al thin film is deposited on the recess 1733 formed as mentioned above, thereby forming the BM 1732a A projected part due to the formation of BM is not therefore created on the surface of the counter substrate 122. Consequently, excellent rubbing can be performed.

As necessary, in order to improve the light shielding performance, a thin metal film 1732b made of Cr, titanium (Ti), or the like is stacked on the Al thin film 1732a The thin metal film 1732b also functions to prevent the Al thin film 1732a from being directly come into contact with ITO in the counter electrode 125. When the Al thin film 1732a is in contact with the ITO thin film, corrosion occurs due to the battery action.

The number of stacked thin films is not limited to two but three or more layers can be stacked.

The thin film 1732b to be stacked is not limited to a metal thin film but a thin film made of an acrylic resin in which carbon is added or an organic material such as carbon can be used. For example, the light absorbing film 1721 can be used. The thickness of the single BM film which is the Al film 1732a or the thickness of BM obtained by stacking the Al film 1732a, the metal film 1732b and the like is set to 0.4 µm to 1.4 µm or, more preferably, 0.6 µm to 1.0 µm. Although the BM 1732 is constructed by the BMs 1732a and 1732b in FIGS. 173(a) and 173(b), the invention is not limited to the configuration. The BM 1732 can be also constructed by a single Al film or a multilayer of different materials. When both of the single layer or stacked layers can be used, it will be simply called "BM 1732" hereinlater.

On the BM 1732 filled in the recess 1733, a smoothing film 1731a is formed. As the forming material of the smoothing film 1731, for example, an organic material such as acrylic resin, gelatine resin, polyimide resin, epoxy resin, or polyvinyl alcohol resin (PVA), an inorganic material such as silicon oxide ($SiO_2$) or silicon nitride (SiNx) or the like can be used. Especially, it is preferable to use an ultraviolet curing type resin. Since the inorganic material such as $SiO_2$ is heat resistant and has good transmittance in a wide wavelength band, it is preferable when the inorganic material such as $SiO_2$ is used for a light valve of the projection display apparatus.

It is preferable that the thickness of the smoothing film 1731a is 0.2 µm to 1.4 µm. More preferably, it is 0.5 µm to 1.0 µm. ITO is formed as the counter electrode 125 on the smoothing film 1732a FIG. 174(b) shows a configuration in which the color filter 124 is used as a smoothing film without using the smoothing film 1732a.

When the smoothing films 1731a and 1731b are made of an inorganic material such as $SiO_2$, after the smoothing film 1731 is formed, the surface is polished to be smoothed. The polishing process is mechanically or chemically performed. Since $SiO_2$ is relatively soft, it is easily polished. After performing the polishing process, the counter electrode 125 is formed. Obviously, in the case where the smoothing films 1731a and 1731b are made of an organic material, by performing the polishing process, the excellent smoothing films 1731a and 1731b can be formed.

As another example, the BM 1732 is formed in the recess 1733 so as to be thicker than the depth of the recess 1733 and, after that, the surface is polished to be smoothed. By the operation, the recess 1733 is filled with the BM 1732. After the smoothing operation, ITO as the counter electrode 125 is formed on the surface. It is therefore unnecessary to form the smoothing film 1731a Obviously, after polishing BM 1732, in order to prevent elusion of impurities from the substrate 122 rather than the smoothing function, the smoothing film (insulating film) 1731 is thinly formed and, after that, the counter electrode 125 is formed. In this case of the configuration, the film functions as a protection film rather than the smoothing film. When the liquid crystal display panel has the PS structure, no counter electrode is necessary. In this case, therefore, no counter electrode 125 is formed but it is sufficient to form an alignment film on the smoothing film 1731a.

Although the BM 1732 is made of Al or a metal multilayer film including Al in FIGS. 173(a) and 173(b), the invention is not limited to the configuration. It is also possible to form the BM 1732 by a dielectric multilayer film (interference film) in which a dielectric film having a low refractive index and a dielectric film having a high refractive index are stacked.

The dielectric multilayer film reflects light having a predetermined wavelength by the optical interference action and, in the event of reflection, does not absorb light at all. Thus, the BM 1732 which does not absorb incident light at all can be obtained.

Instead of Al, silver (Ag) may be used. The preferable BM 1732 with high reflectance can be obtained by Ag.

When the interference film is used as the BM 1732, the thickness of the thin film forming the BM 1732 is set within the range from 1.0 µm to 1.8 µm, more preferably, from 1.2 µm to 1.6 µm.

The depth of the recess 1733 is set within the range from 1.2 µm to 2.2 µm, more preferably, from. 1.4 µm to 1.8 µm.

In the configurations of FIGS. 173(a) and 173(b), the recess 1733 is formed in the counter substrate 122 and the BM 1732 is formed in the recess 1733. The invention is not limited to the configurations. Without forming the recess 1733 in the counter substrate 122, the BM 1732 made of Al or Ag, or made by a multilayered thin metal film, or an interference film is formed and the smoothing film 1731 is formed on the BM 1732. At this time, the thickness of the smoothing film 1731a is within the range from 1.0 µm to 3.0 µm more preferably, 1.4 µm to 2.4 µm. After the formation of the smoothing film 1731a, the surface may be polished. By the polishing, the roughness of the BM 1732 is eliminated and the surface of the counter substrate 122 is smoothed.

Although the recess 1733 is formed in the counter substrate 122 and the BM 1732 is formed in the recess 1733 in FIGS. 173(a) and 173(b), the invention is not limited to the configuration. It is also possible to form the recess 1733 in the array substrate 121 and the BM 1732 as well. In this case, on the BM 1732, the source signal line 1031, TFT 201, or the like is formed on the BM 1732. In such a manner, by forming the recess 1733 in the array substrate 121 and forming the TFT 201 or the like in the recess 1733, the surface of the array substrate 121 is smoothed and an excellent rubbing operation can be performed.

It is preferable that the BM 1732 and the counter electrode 125 are electrically connected in the periphery of the display area or in the display area. Since the counter electrode 125 is made of ITO, the sheet resistance is high. Consequently, by connecting ITO of the counter electrode 125 and the BM 1732 made of metal material, the sheet resistance is lowered. In the case of connecting them in the display area, the smoothing film 1731a in the parts where the BM 1732b and the counter electrode 125 come into contact with each other is removed by etching or the like, so that the BM 1732b and the counter electrode 125 are in direct contact. In this case of the configuration, material other than Al is selected for the BM 1732*b* in order to prevent corrosion by a battery.

On the other hand, on the array substrate 121 side, the smoothing film 1732 is formed on the source signal line 1031 so that the pixel electrode 126 is neighboring on the source signal line 1031. With the configuration, no light is leaked from the peripheral part of the pixel electrode 126.

In this case, however, the parasitic capacitance between the source signal line 1031 and the pixel electrode increases. In order to avoid an adverse influence on the image display by the parasitic capacitance, the driving method of the invention described with reference to FIG. 122 and the like may be used. Components such as TFT 201 unnecessary to explain are omitted in FIG. 173. The TFT 201 can have an LDD (low doping drain) structure.

After forming the TFT 201 and the like on the array substrate 121, in the case where the smoothing film 1731*b* made of inorganic material is formed by inorganic material such as SiO$_2$, the smoothing film 1731*b* is formed and the surface is polished to be smooth. The polishing process is mechanically or chemically performed in a manner similar to the smoothing film 1731*a*. Especially, when the smoothing film 1731*b* is made of SiO$_2$, since SiO$_2$ is relatively soft, it is easily mechanically polished. After performing the polishing process, a contact hole for connecting the TFT 201 and the pixel electrode 126 is opened in the smoothing film 1731*b* and the pixel electrode 126 is formed on the smoothing film 1731*b*. Obviously, also in the case of making the smoothing film 1731 of organic material such as polyimide, by performing the polishing process, the excellent smoothing film 1731*b* can be formed. On the TFT 201, a light shielding film is made of metal of the source signal line to shield light so that no light enters the TFT 201.

In order to make the liquid crystal layer 127 have a predetermined thickness, a column made of a dielectric material is formed on the BM 1732 or the array 121 facing the BM 1732. The height of the column is regarded as the thickness of the liquid crystal layer 127.

As shown in FIG. 174(*a*), in the display panel 863, it is preferable to optically couple the anti-reflecting substrate 1741*a* (1741*b*) in which the anti-reflecting film 451 is formed to the optical coupling material 73*a* (73*b*).

With the configuration, light reflected by the interface between the display panel 863 and air is suppressed and the light utilizing efficiency is improved.

There is also an advantage that, even if dusts are adhered on the surface of the display panel 863, an image is not formed on the screen. FIG. 174(*b*) shows a configuration in which the microlens substrate 132 is attached to the display panel 863. FIG. 174(*c*) shows a configuration in which the anti-reflecting substrate 1741 is attached to the microlens substrate 132.

Needless to say, the display panel 863 of the invention described with reference to FIGS. 173(*a*) to 174(*c*) can be used not only as the light valve of the projection display apparatus but also as a light valve of the view finder of the invention as shown in FIG. 198, etc. head mounted display of FIG. 54, video camera of FIGS. 57 and 64, portable information terminal of FIG. 91, personal computer of FIGS. 94 and 111, or the like.

Obviously, the pixel 126 can be formed in the semipermeable specification described with reference to FIGS. 18, 19, 20, 164, 174, and the like.

In the configuration having a plurality of discharge lamps 15, flicker can be controlled. When the discharge lamp 15 is of the AC ignition type, turn-on and turn-off are alternately repeated. This is projected onto the screen and flicker occurs. In some cases, flicker occurs according to the driving state of the liquid crystal display panel 863. The turn-on state of the lamp is unstable just after the turn-on of the discharge lamp 15 and flicker may occur.

In the projection display apparatus of the invention, the discharge lamp 15*a* is turned on by a first inverter circuit (not shown) and the discharge lamp 15*b* is turned on by a second inverter circuit (not shown). That is, different sources are used to apply power to the discharge lamps 15*a* and 15*b*. Each inverter converts the power from the DC power source into AC power and applies the AC power to the discharge lamp 15. Obviously, a cyclotron converter may be used in place of the inverter, directly to phase-control the AC power, and apply it to the discharge lamp 15.

A separately excited inverter circuit may be also used. Naturally, a self-excited or WM type inverter circuit can be also used. Particularly, the self-excited inverter circuit is easy to control. The inverter is subjected to an AC voltage (current) phase control by a phase control circuit and outputs the resultant. The phase control circuit controls the gate of a thyristor in the inverter circuit. The phases of the AC voltage (current) are controlled so as to be different from each other by about 90 degrees. When the number of discharge lamps of a single projection display apparatus is two or more (n), the phase of the voltage of each discharge lamp is set to 180/n degrees or the phases of the voltages of at least two discharge lamps among the (n) discharge lamps are made different by 90 degrees.

The light of the discharge lamp 15*a* and that of the discharge lamp 15*b* are overlapped with each other on the screen. By making the phases of the voltages applied to the discharge lamps 15*a* and 15*b* different, flicker can be suppressed. According to experiments, when the phase of the voltage (current) applied to the discharge lamps 15*a* and 15*b* lies within the range from 70 to 110 degrees, the occurrence of flicker can be almost perfectly suppressed.

Figure 159:
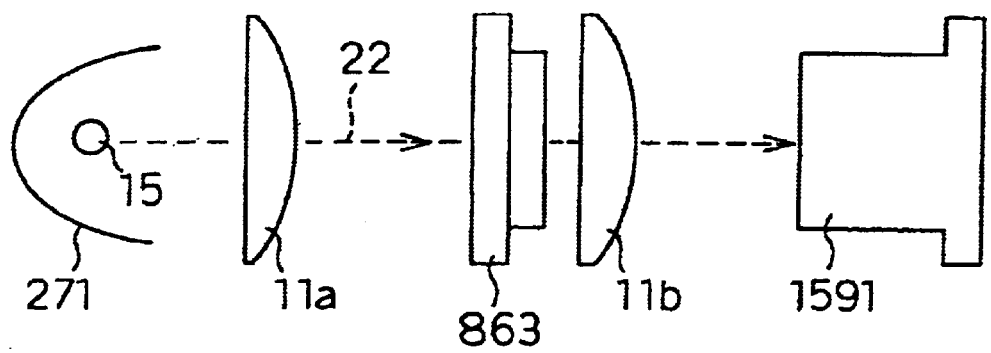
Figure 159:
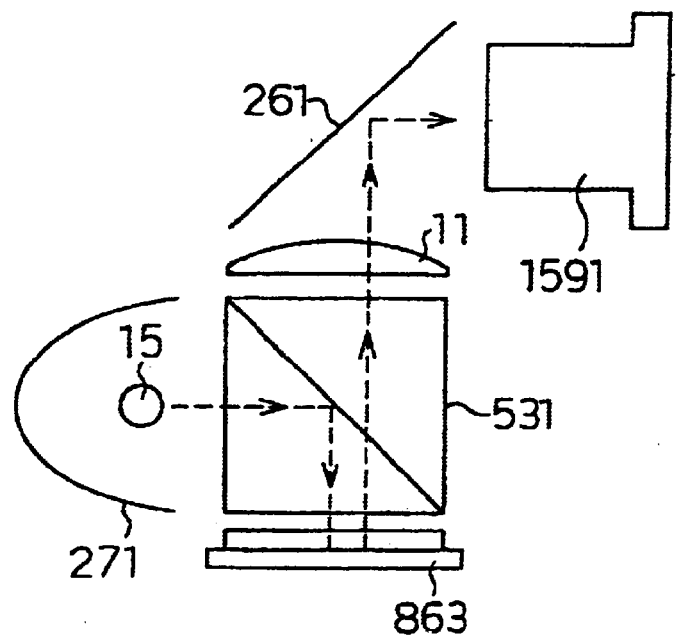

Obviously, the configuration having the reflecting prism 1864, lens arrays 1901 and 1092, and a plurality f lamps 15 shown in FIG. 186, the relation shown in FIG. 196, and the relation of the phases of voltages or currents applied to the plurality of lamps 15 and the like can be applied to the configuration of the projection display apparatus shown in FIGS. 159, 177, 183, and the like. On the contrary, the configurations of FIGS. 177, 183, and 191 can be added to the configurations of FIGS. 159 and 186. Some configurations can be applied to the view finder as shown in FIG. 106 and the like. As mentioned above, the techniques described in the specification can be mutually applied.

Apparently, the method of deviating the phases of the voltages (currents) applied to the two light emitting devices 15 by 114 as shown in FIG. 186 can be applied to the view finder using the plurality of light emitting devices 15 as shown in FIGS. 109 and 110. In FIGS. 109 and 110 and the like, AC power is supplied to the light emitting devices 15*a* and 15*b* and the driving voltages or the like are deviated by 114 phase. By the driving, flicker can be largely reduced and the brightness can be easily adjusted since it is sufficient to change the duty ratio of the light emitting devices 15 in an AC manner.

In the view finder and video display apparatus of the invention, the color image is displayed by using mainly color filters. The invention is not limited to the technique. It is also possible to display a color image by time-divisionally turning on LEDs of R, G, and B or the like and synchronously, time-divisionally displaying images of R, G, and B by the display panel without forming the color filters on the display panel. This can be applied to FIGS. 177, 183, 186, and the like.

In order to realize the method, a liquid crystal mode and material having high response are necessary. As a high-speed liquid crystal mode, there are an OCB mode, a ferroelectric mode liquid crystal, and a very high speed TN liquid crystal developed by Meruku Company.

As a method of switching the light emitting colors to R, G, and B at high speed, besides the LEDs, a high-speed three-color backlight using a fluorescent lamp developed by Bright Lab. can be used. A method of rotating a color wheel in which R, G, B are formed can be also used. Naturally, the technical idea of the invention can be also applied to a monochroic display panel.

Although it has been described that a substrate such as the glass substrate, transparent ceramics substrate, resin substrate, monocrystal silicon substrate, or metal substrate is used as each of the counter substrate 122 and the array substrate 121, a film such as a film like resin film or sheet may be used as each of the counter substrate 122 and the array substrate 121. For example, polyimide, PVA, crosslinked polyethylene, polypropylene, polyester sheet, or the like can be used. As disclosed in Japanese Laid-open Patent Application No. 2-317222, in the case of the PD liquid crystals, the counter electrode or TFT can be formed directly in the liquid crystal layer. That is, the array substrate or counter substrate are unnecessary from the viewpoint of configuration. For example, in the case of the IPS mode (comb electrode method) developed by Hitachi, Ltd., no counter electrode is necessary for the counter substrate.

The active matrix type in which switching devices such as TFT, MIM, or thin film diode (TFD) are arranged every pixel electrode has been described in the embodiments. The active matrix type includes not only the liquid crystal display panel but also micromirrors, and a DMD (DLP) developed by TI Company for displaying an image according to a change in the angle. The number of the switching device such as TFT 201 is not limited to one per pixel. A plurality of switching devices may be also connected. It is preferable to adopt the LDD (low doping drain) structure for the TFT.

Obviously, the technical idea of the invention can be applied to a display panel for displaying simple marks, characters, symbols, and the like of 8 segments or the like. For example, the technical idea of the display panel in the semi-permeable specification shown in FIGS. 18 and 164 and the display panel having the microlenses shown in FIG. 172 can be applied to an 8-segment display panel. A view finder of FIG. 1 using an 8-segment display panel can be also constructed.

Although not mentioned, the techniques described with reference to the drawings in the invention can be applied to the other embodiments. For example, the display panel having the configuration of FIGS. 18, 14, and 20 can be applied to the view finder of FIG. 1. A Fresnel lens as indicated by 11b in FIG. 52 can be used as the condenser lens 11 in FIG. 1. The configuration of FIG. 21 can be developed to the configuration of FIG. 91. The display panel shown in FIGS. 18, 172, or 185 can be used for the direct-view display apparatus as shown in FIG. 160. The display panel as shown in FIGS. 18, 131, 156, 164, 166, 174, 176, or the like can be applied to the view finder of FIG. 1, the projection display apparatus of FIG. 183, and the like.

It is also possible to form the microlens of the display panel of FIG. 172 by using the method of manufacturing the microlens of FIG. 89. The driving method of FIG. 122 can be applied to the display panels of the invention as shown in FIGS. 18, 172, 185, and the like, the video display apparatus of FIGS. 69, 82, and the like. Ditto for the manufacturing method of FIG. 16.

Although the display panel 863 and the display panel used for the display apparatus of the invention have been described mainly as a PD liquid crystal display panel, the invention is not limited to the PD liquid crystal display panel. It can be applied to other display panels such as STN liquid crystal display panel, ECB display panel, DAP display panel, TN liquid crystal display panel, ferroelectric liquid crystal panel, DSM (Dynamic Scattering Mode) panel, vertical alignment (VA) mode display panel, IPS mode display panel, and guest host display panel. It is also possible to make the light modulating layer 127 by using a solid inorganic material such as PLZT. The technical idea of the invention is not limited to the active matrix type display panel but can be applied to a simple matrix type display panel, display panel of figure or character of 7-segment or the like, optical writing type display panel; thermal writing type display panel, and the like.

Apparently, the display panel, video display apparatus, and the like of the invention can be applied and developed to the projection display apparatus (projector) as shown in FIG. 159(a). The display panel of the invention or the like is used as a light valve. Light from the arc discharge lamp 15 such as a halogen lamp, xenon lamp, extra-high pressure mercury lamp, or metal halide lamp is condensed by the concave mirror 271. The condensed light goes out from the lens 11 and is incident on the projection lens 1591. The projection lens 1591 enlargedly projects the display image on the display panel 863 of the invention or the like onto a screen (not shown).

In the portable information terminal and direct-view video display apparatus shown in FIGS. 11, 111, and the like, the light emitting device 15 and its related matters, display panel and its related matters, numerical expressions of relations, and the like which have been described by many embodiments of FIGS. 1, 49, 53, 57, 58, 87, 107, 106, and the like can be also applied.

The display panel 863 has the color filter 124, and a color image can be displayed by either a single display panel or three display panels corresponding to R, G, and B. A display panel of monochroic display may be also used. Obviously, the display panel described in the specification can be used for any of the view finder, video display apparatus, projection display apparatus, and the like described in the specification.

The projection display apparatus of the invention can be constructed in a rear type in which the screen and the projection lens 1591 are integrated or a front type in which they are separated. As shown in FIG. 159(b), when the display panel 863 is of the reflecting type, a projection display apparatus can be constructed by using the PBS (Polarization Beam Splitter) 531 and the half mirror.

Obviously, the invention can be adapted and applied or developed to video camera, liquid crystal projector, stereoscopic television, projection television, view finder, monitor of a portable telephone, portable information terminal, digital camera, head mounted display, direct-view monitor display, note-sized personal computer, monitor of video camera, monitor of electronic still camera, automatic teller machine, monitor of public telephone, monitor of television telephone, personal computer monitor, liquid crystal watch, liquid crystal display monitor of household electric equipment such as microwave oven and rice cooker, time indicator of stationary clock, pocket game device, backlight for display panel, and the like.

The video camera includes not only a camera using a video tape but also a camera for recording a video image onto a floppy disk (FD), magnetooptic recording disk (MO), optical disk (MD), digital video disk (DVD), and the like, an electronic still camera, and an electronic camera for recording into a solid memory such as stick memory or semiconductor.

What is claimed is:

1. A view finder comprising light generating means, a lens that converts light emitted from the light generating means into substantially parallel light, display panel of a reflecting type that reflects the substantially parallel light as a display image, and a magnification lens for enlarging the display image observed by an observer.

2. A view finder comprising a LED for emitting a while light, a concave transparent block having reflecting means on the back face, display panel of a transmitting type, and a magnification lens for allowing a display image on the display panel to be enlargedly observed by the observer, wherein the light emitted from the white LED is converted by the reflecting means into substantially parallel light and illuminates the display panel.

* * * * *